United States Patent
Veselova et al.

(10) Patent No.: US 11,803,544 B2
(45) Date of Patent: Oct. 31, 2023

(54) MISSING DATA-BASED INDEXING IN DATABASE SYSTEMS

(71) Applicant: Ocient Holdings LLC, Chicago, IL (US)

(72) Inventors: Anna Veselova, Chicago, IL (US); Greg R. Dhuse, Chicago, IL (US); Matthew Ashbeck, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 101 days.

(21) Appl. No.: 17/450,109

(22) Filed: Oct. 6, 2021

(65) Prior Publication Data
US 2023/0107652 A1    Apr. 6, 2023

(51) Int. Cl.
| | |
|---|---|
| *G06F 16/00* | (2019.01) |
| *G06F 16/2453* | (2019.01) |
| *G06F 16/22* | (2019.01) |
| *G06F 11/34* | (2006.01) |
| *G06F 16/25* | (2019.01) |
| *G06F 16/2455* | (2019.01) |

(52) U.S. Cl.
CPC .... *G06F 16/24542* (2019.01); *G06F 11/3452* (2013.01); *G06F 16/2272* (2019.01); *G06F 16/24552* (2019.01); *G06F 16/252* (2019.01)

(58) Field of Classification Search
CPC .......... G06F 16/24542; G06F 16/2272; G06F 16/252; G06F 16/24552
USPC ....................................................... 707/769
See application file for complete search history.

(56) References Cited

U.S. PATENT DOCUMENTS

| | | |
|---|---|---|
| 5,548,770 A | 8/1996 | Bridges |
| 6,230,200 B1 | 5/2001 | Forecast |
| 6,633,772 B2 | 10/2003 | Ford |
| 7,499,907 B2 | 3/2009 | Brown |
| 7,908,242 B1 | 3/2011 | Achanta |
| 2001/0051949 A1 | 12/2001 | Carey |
| 2002/0032676 A1 | 3/2002 | Reiner |
| 2004/0162853 A1 | 8/2004 | Brodersen |
| 2008/0133456 A1 | 6/2008 | Richards |
| 2009/0063893 A1 | 3/2009 | Bagepalli |

(Continued)

OTHER PUBLICATIONS

A new high performance fabric for HPC, Michael Feldman, May 2016, Intersect360 Research.

(Continued)

*Primary Examiner* — Chelcie L Daye
(74) *Attorney, Agent, or Firm* — GARLICK & MARKISON; Katherine C. Stuckman; Bruce E. Stuckman

(57) ABSTRACT

A method for execution by at least one processor of a database system includes storing a plurality of column values for a first column of a plurality of rows. Each of a set of missing data-based conditions for the first column are indexed via an indexing scheme. A subset of the set of missing data-based conditions that satisfy a query predicate of a query are identified. An IO pipeline for access of the first column based on the query predicate and further based on the subset of the set of missing data-based conditions is generated. The IO pipeline is applied in conjunction with execution of the query by applying at least one index element to identify a proper subset of the plurality of rows based on index data of the indexing scheme, and by generating a query resultant based on the proper subset.

20 Claims, 119 Drawing Sheets

(56) References Cited

U.S. PATENT DOCUMENTS

| | | | |
|---|---|---|---|
| 2009/0183167 A1 | 7/2009 | Kupferschmidt | |
| 2010/0082577 A1 | 4/2010 | Mirchandani | |
| 2010/0241646 A1 | 9/2010 | Friedman | |
| 2010/0274983 A1 | 10/2010 | Murphy | |
| 2010/0312756 A1 | 12/2010 | Zhang | |
| 2011/0219169 A1 | 9/2011 | Zhang | |
| 2012/0109888 A1 | 5/2012 | Zhang | |
| 2012/0151118 A1 | 6/2012 | Flynn | |
| 2012/0185866 A1 | 7/2012 | Couvee | |
| 2012/0254252 A1 | 10/2012 | Jin | |
| 2012/0311246 A1 | 12/2012 | McWilliams | |
| 2013/0332484 A1 | 12/2013 | Gajic | |
| 2014/0047095 A1 | 2/2014 | Breternitz | |
| 2014/0136510 A1 | 5/2014 | Parkkinen | |
| 2014/0188841 A1 | 7/2014 | Sun | |
| 2015/0205607 A1 | 7/2015 | Lindholm | |
| 2015/0244804 A1 | 8/2015 | Warfield | |
| 2015/0248366 A1 | 9/2015 | Bergsten | |
| 2015/0293966 A1 | 10/2015 | Cai | |
| 2015/0310045 A1 | 10/2015 | Konik | |
| 2016/0034547 A1 | 2/2016 | Lerios | |
| 2020/0019633 A1* | 1/2020 | Kathirvel | G06N 20/00 |

OTHER PUBLICATIONS

Alechina, N. (2006-2007) B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066145; dated Mar. 5, 2018; 13 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends in Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10 computing device 18 computing device 18 computing device 18 node 37 node 37

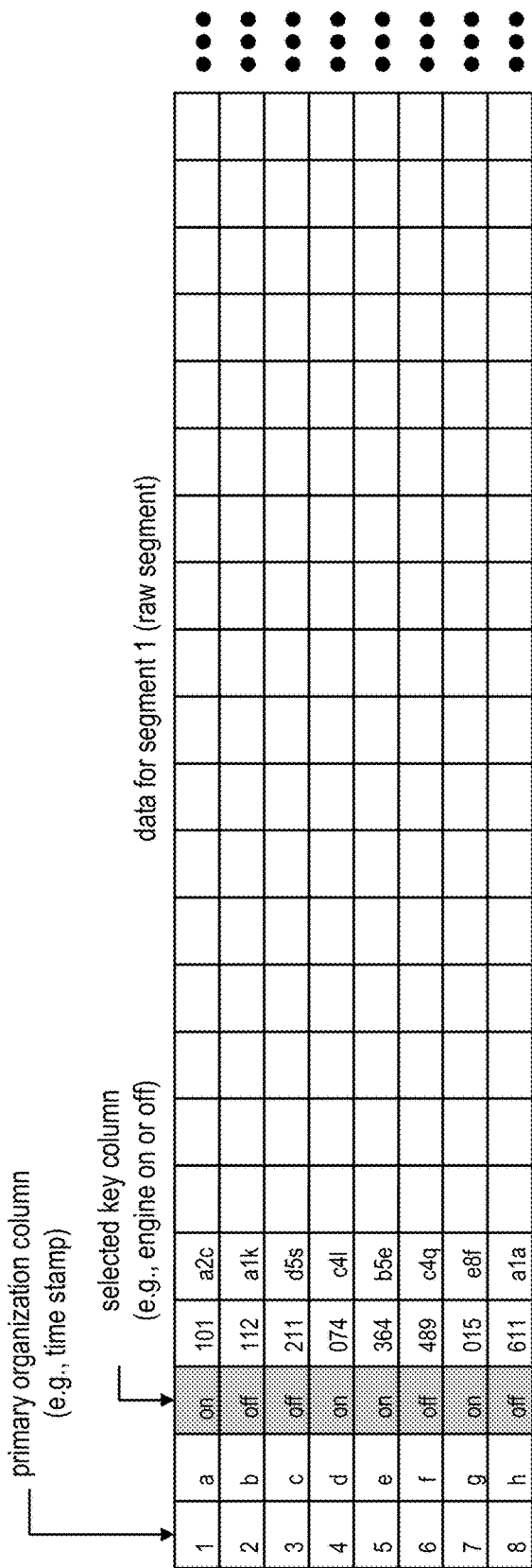

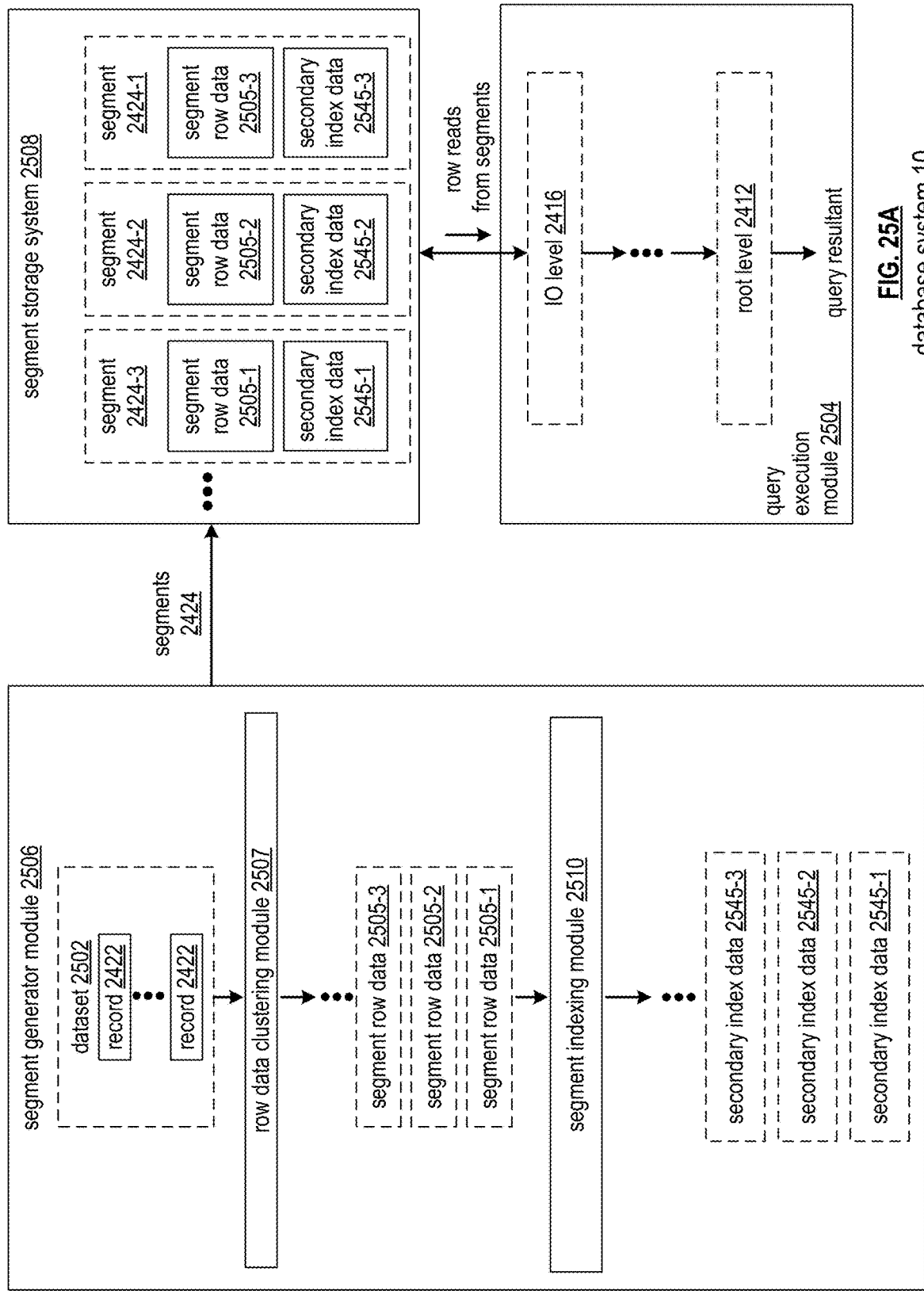

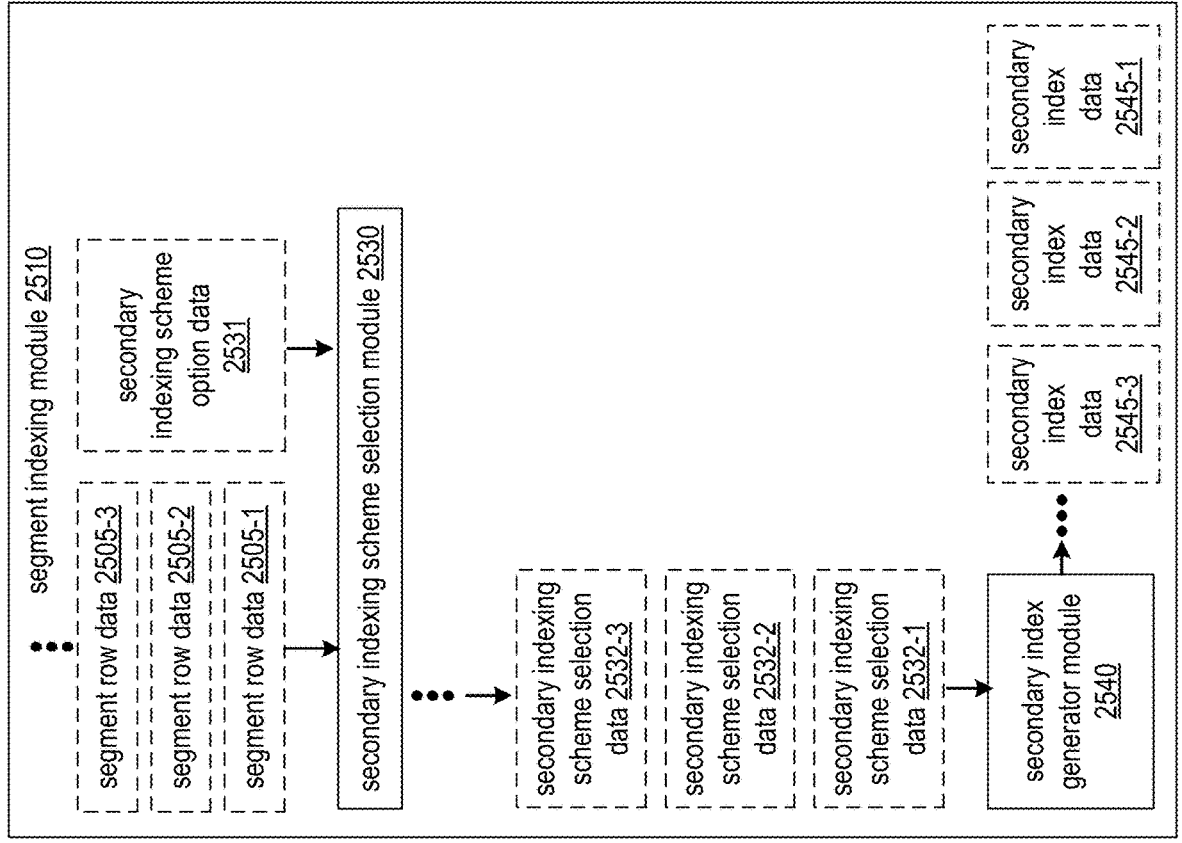

segment indexing module 2510

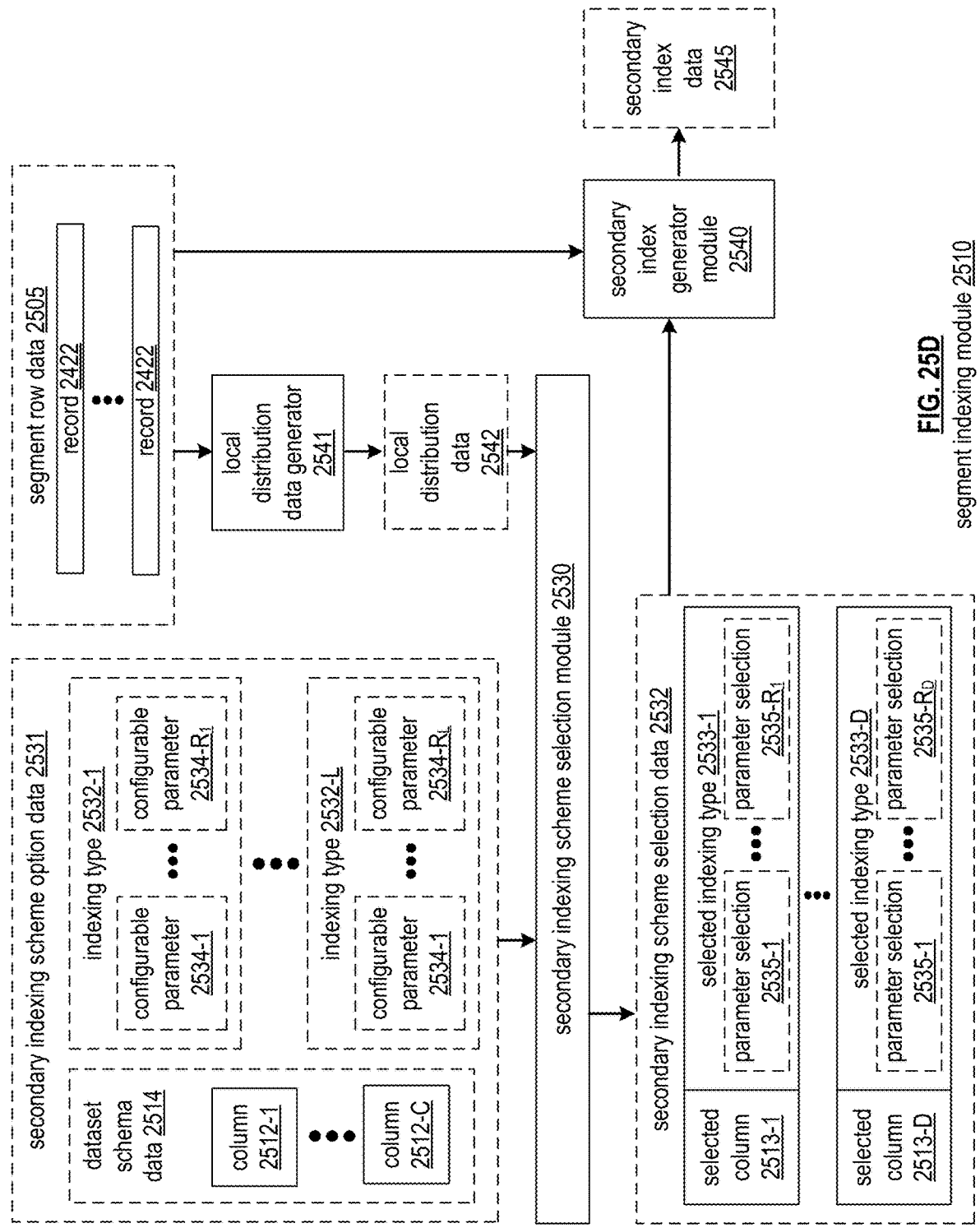

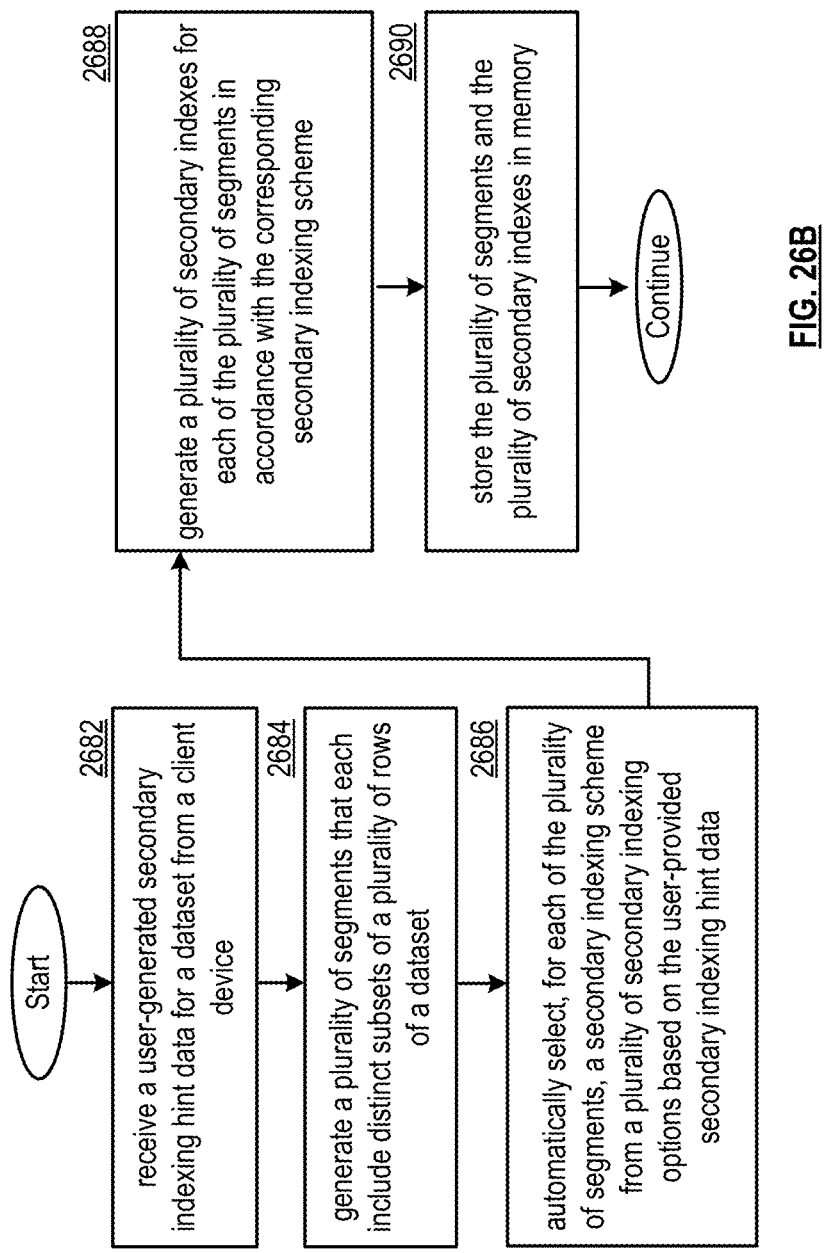

database system 10

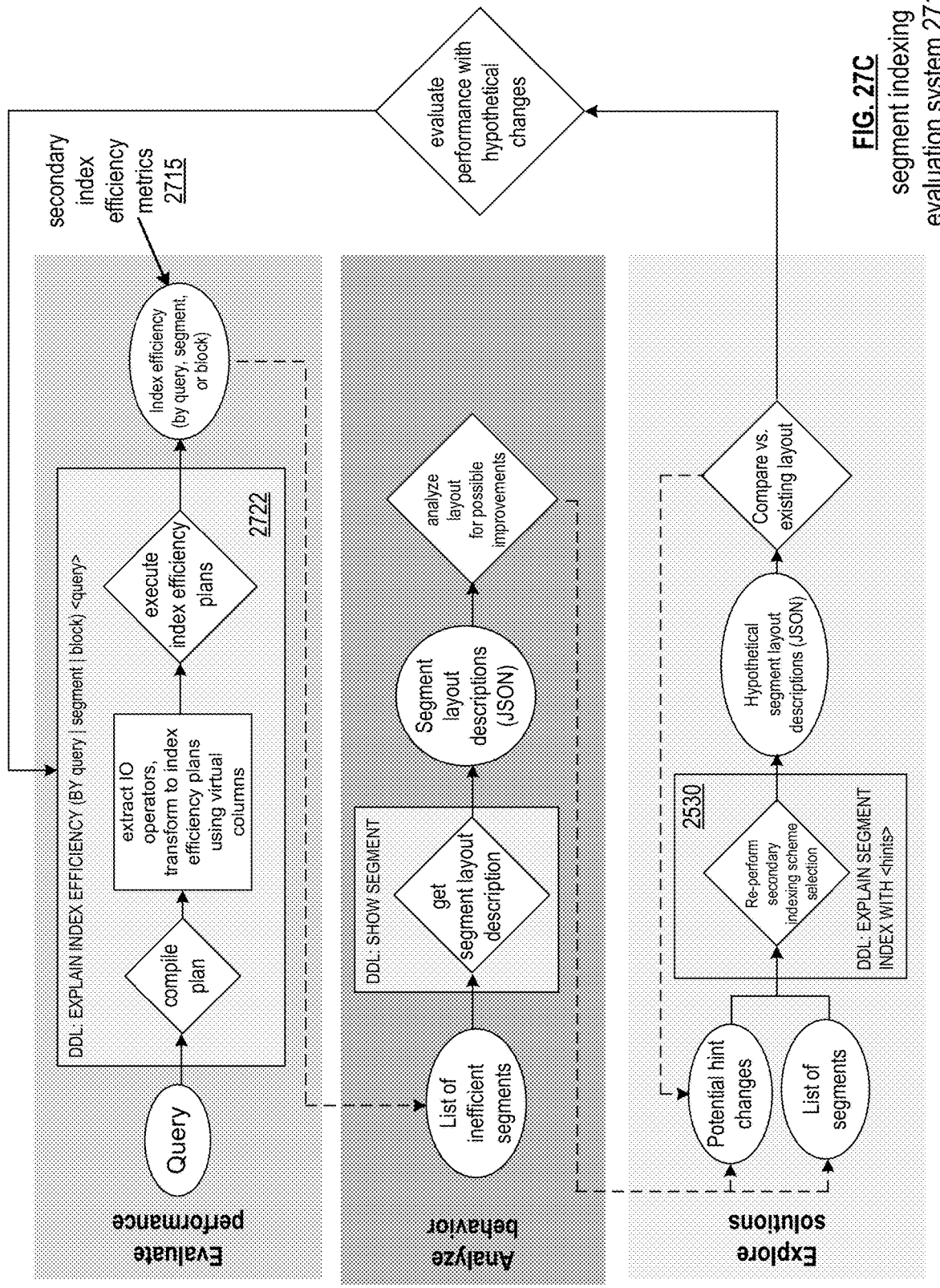

query execution module 2504

IO operator execution module 2840 query processing system 2802

IO pipeline 2835 query processing system 2802

IO operator execution module 2840

IO operator execution module 2840 query processing system 2802

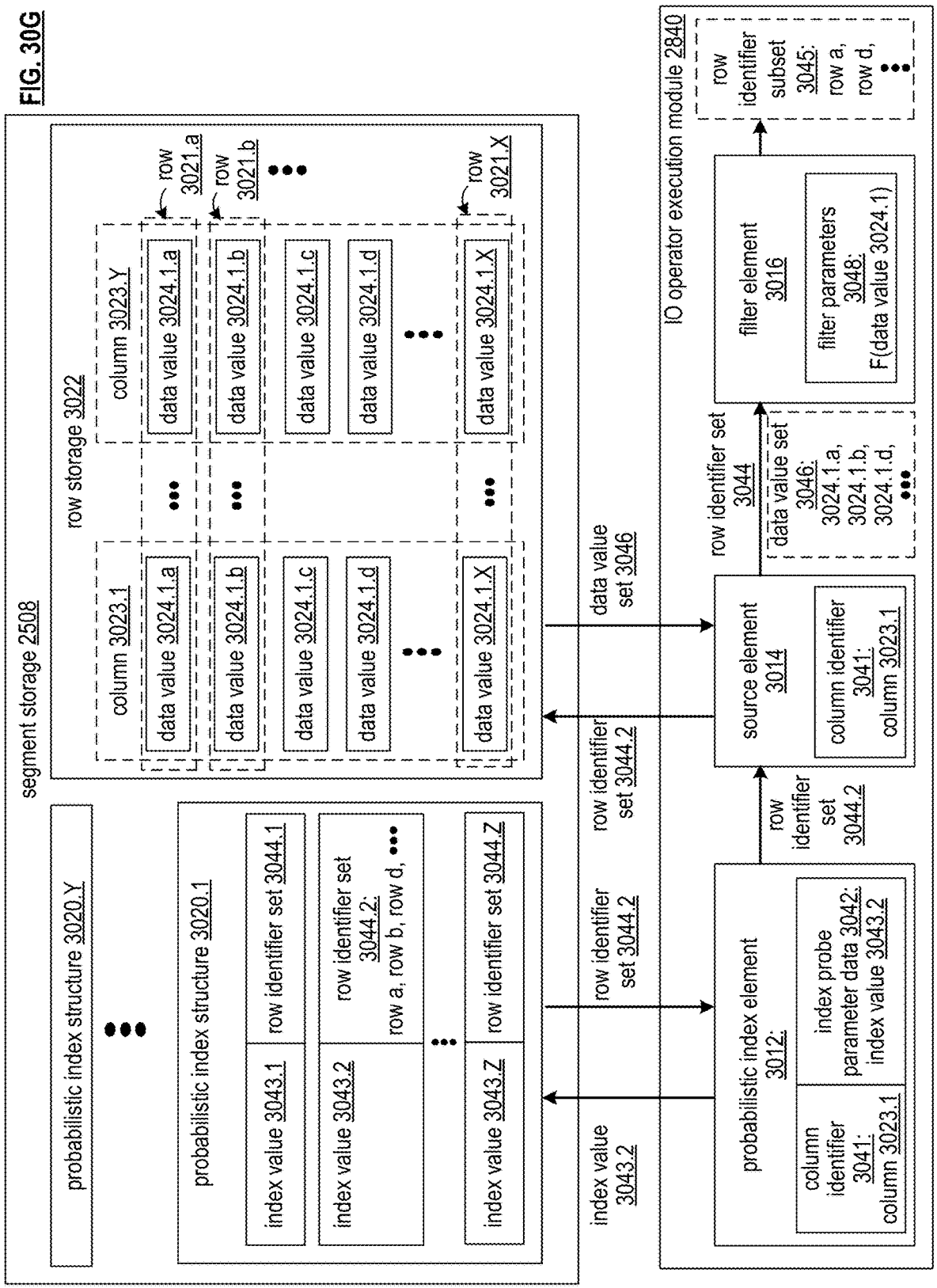

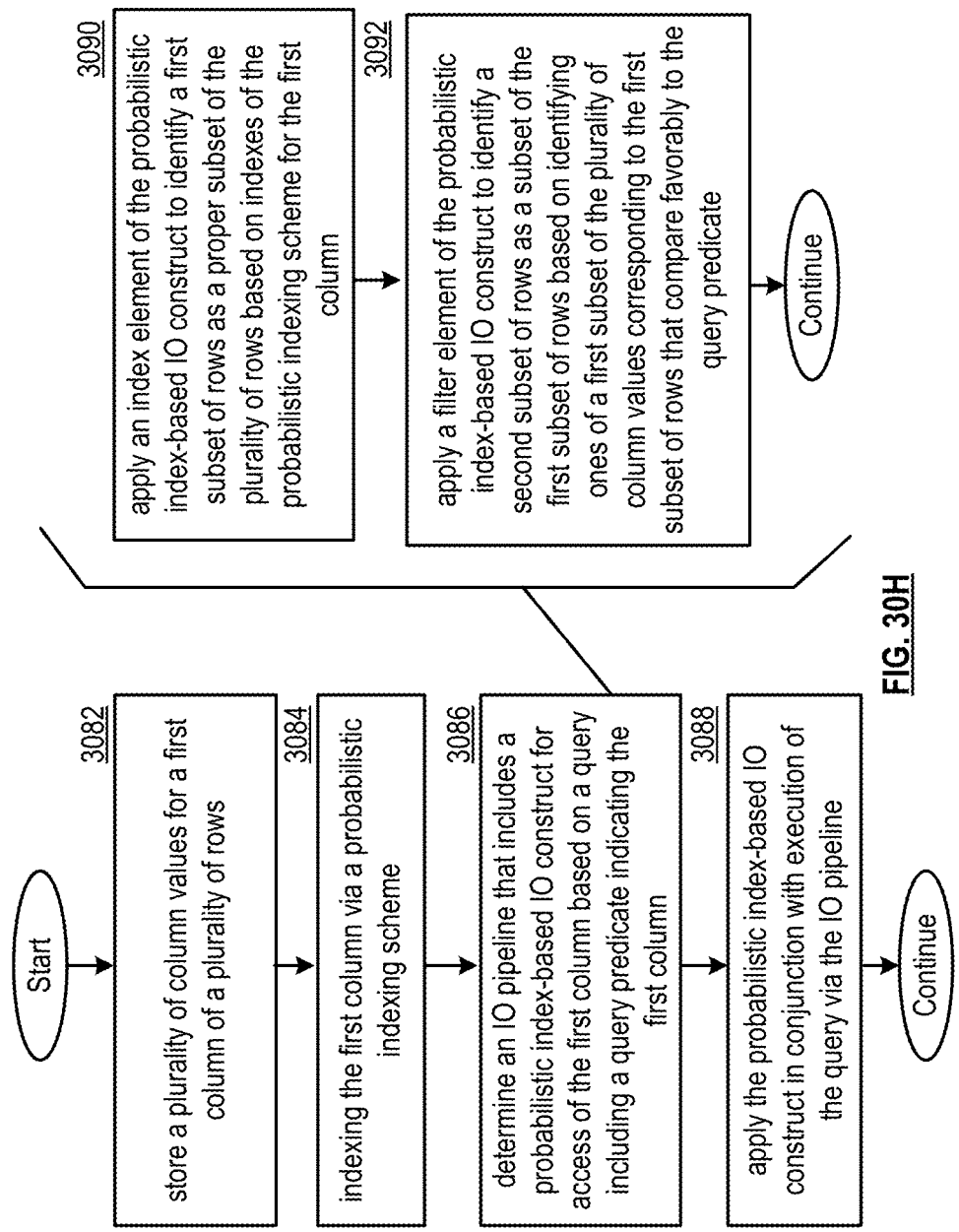

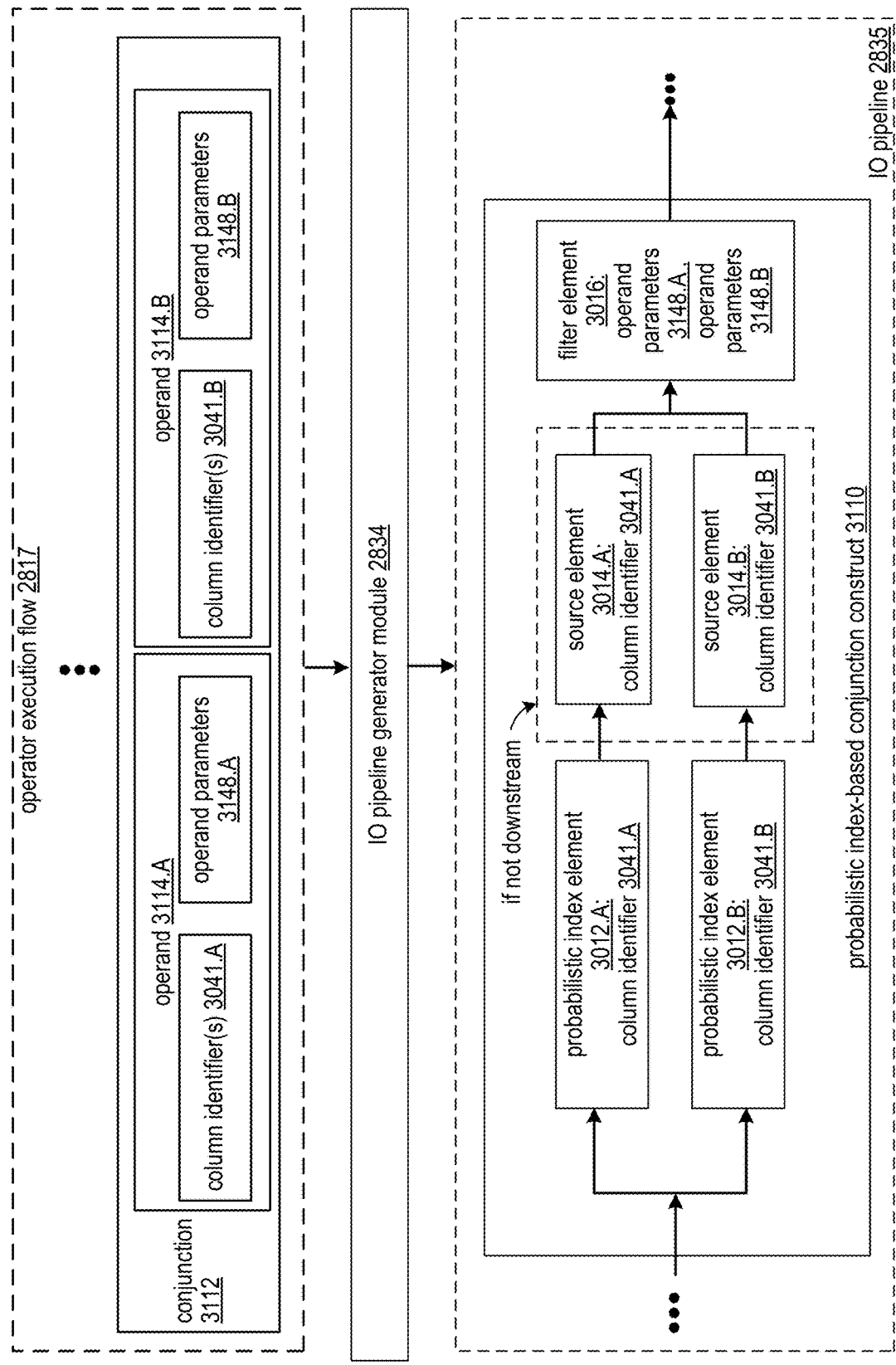

IO operator execution module 2840

IO operator execution module 2840

IO operator execution module 2840

IO operator execution module 2840 query processing system 2802

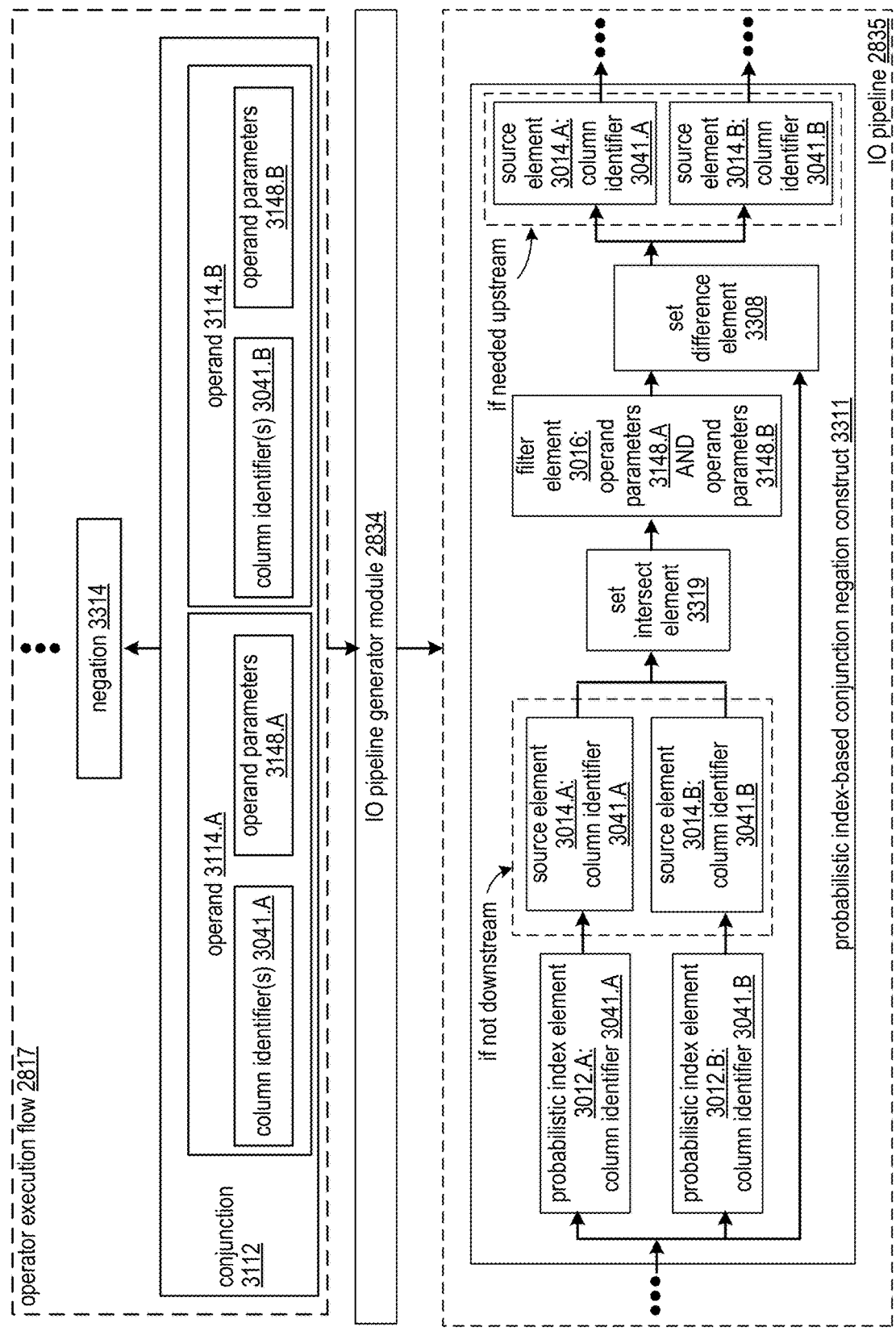

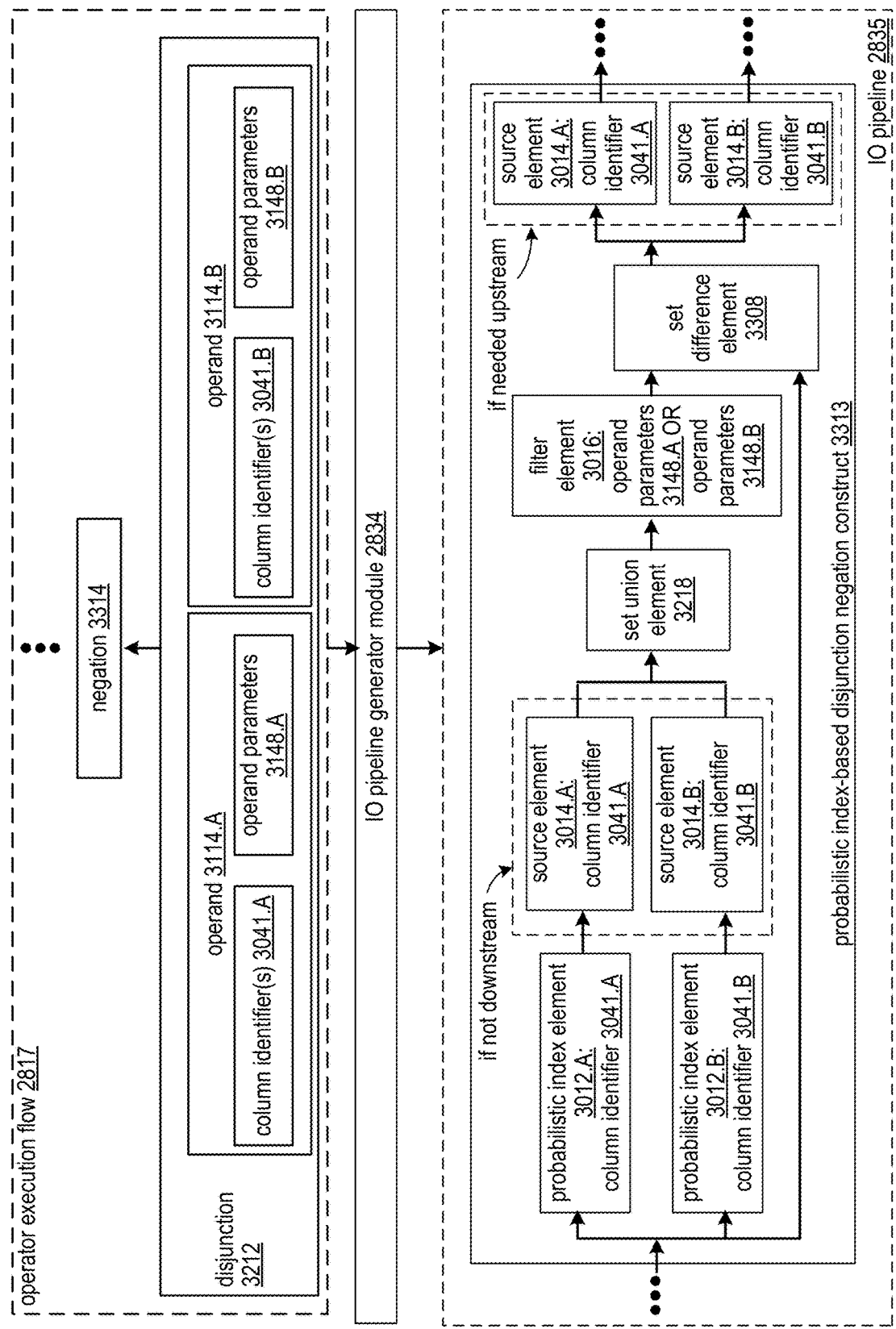

query processing system 2802

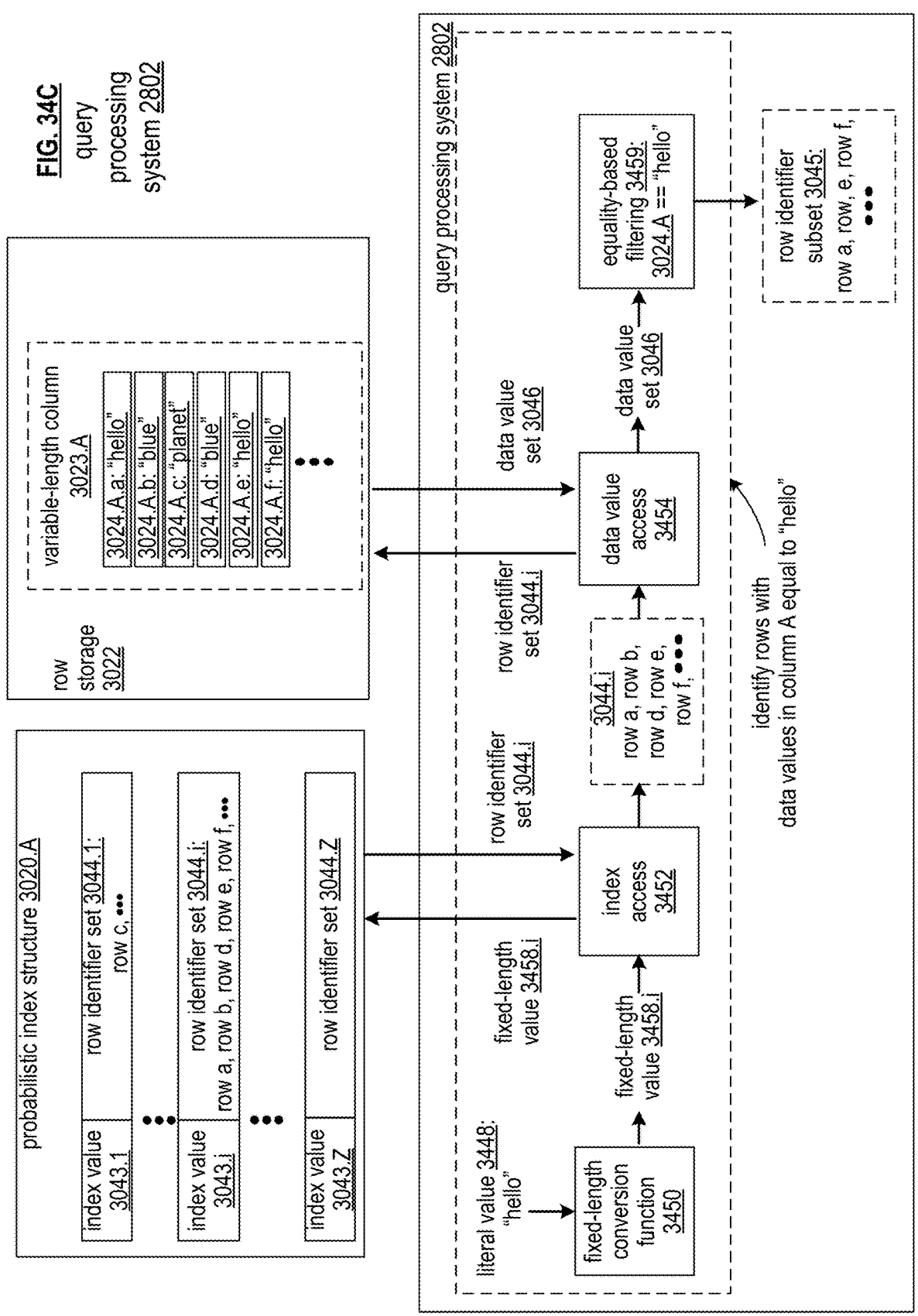

segment indexing module 2510 database system 10

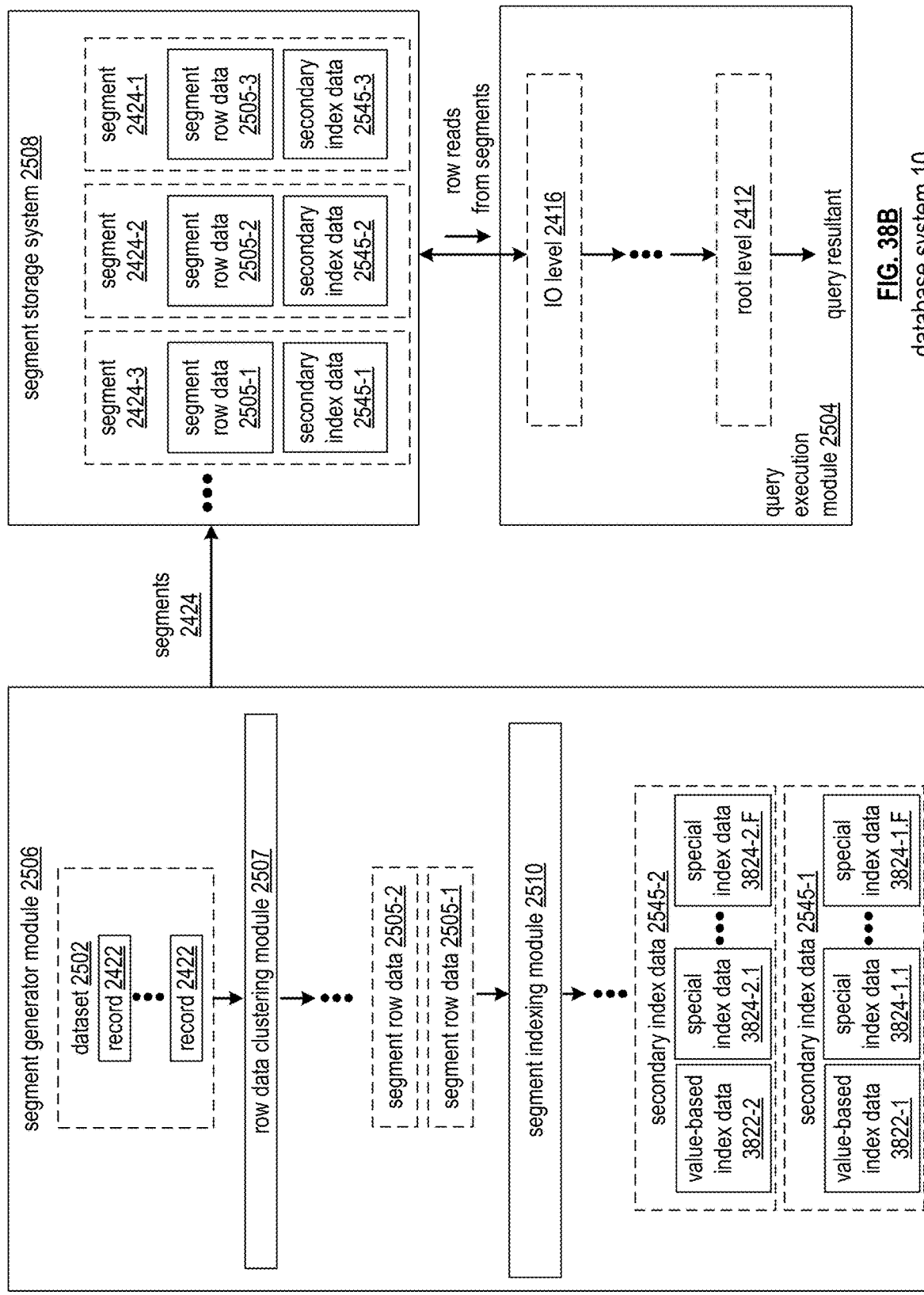

database system 10 query processing system 2802

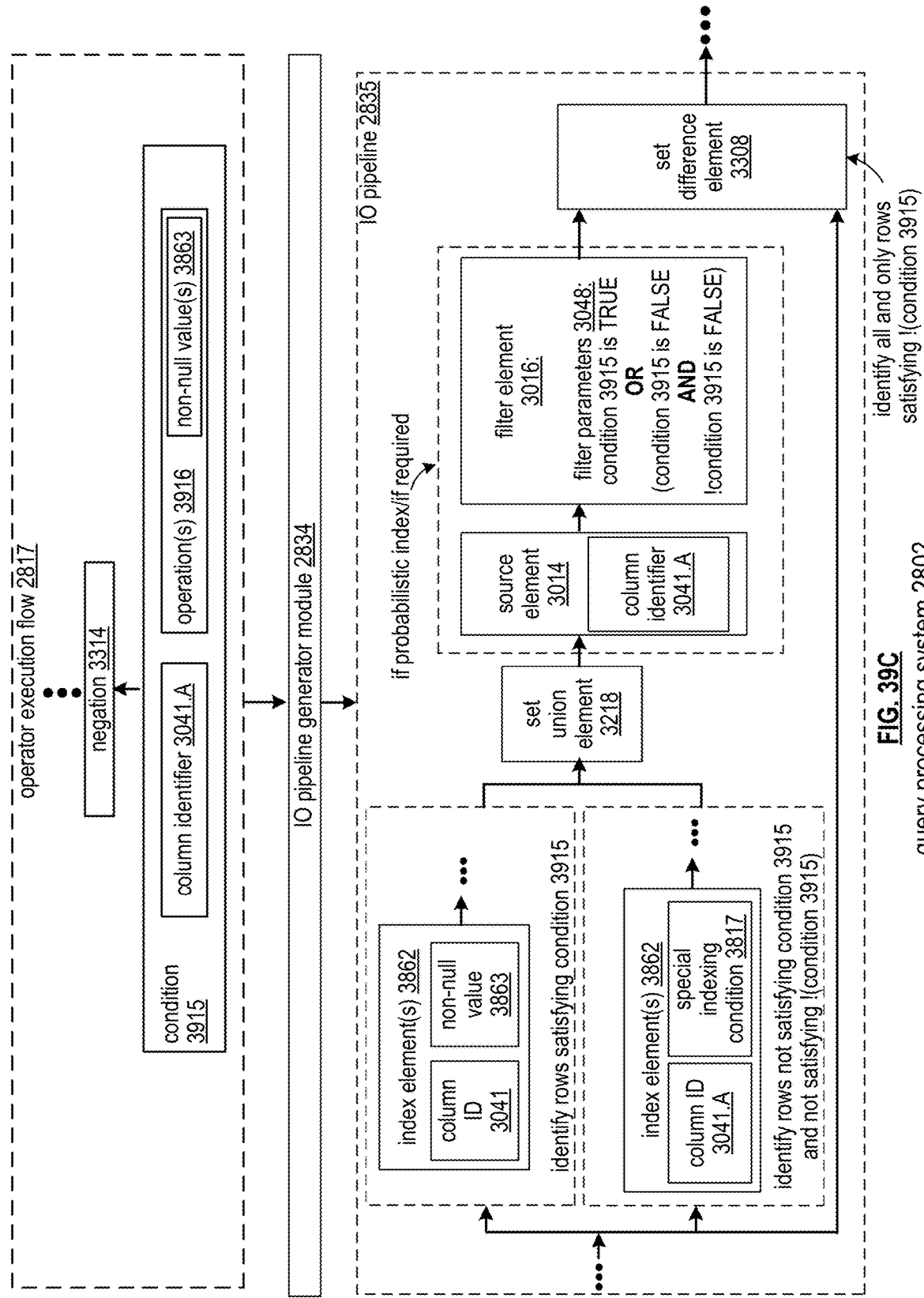

query processing system 2802

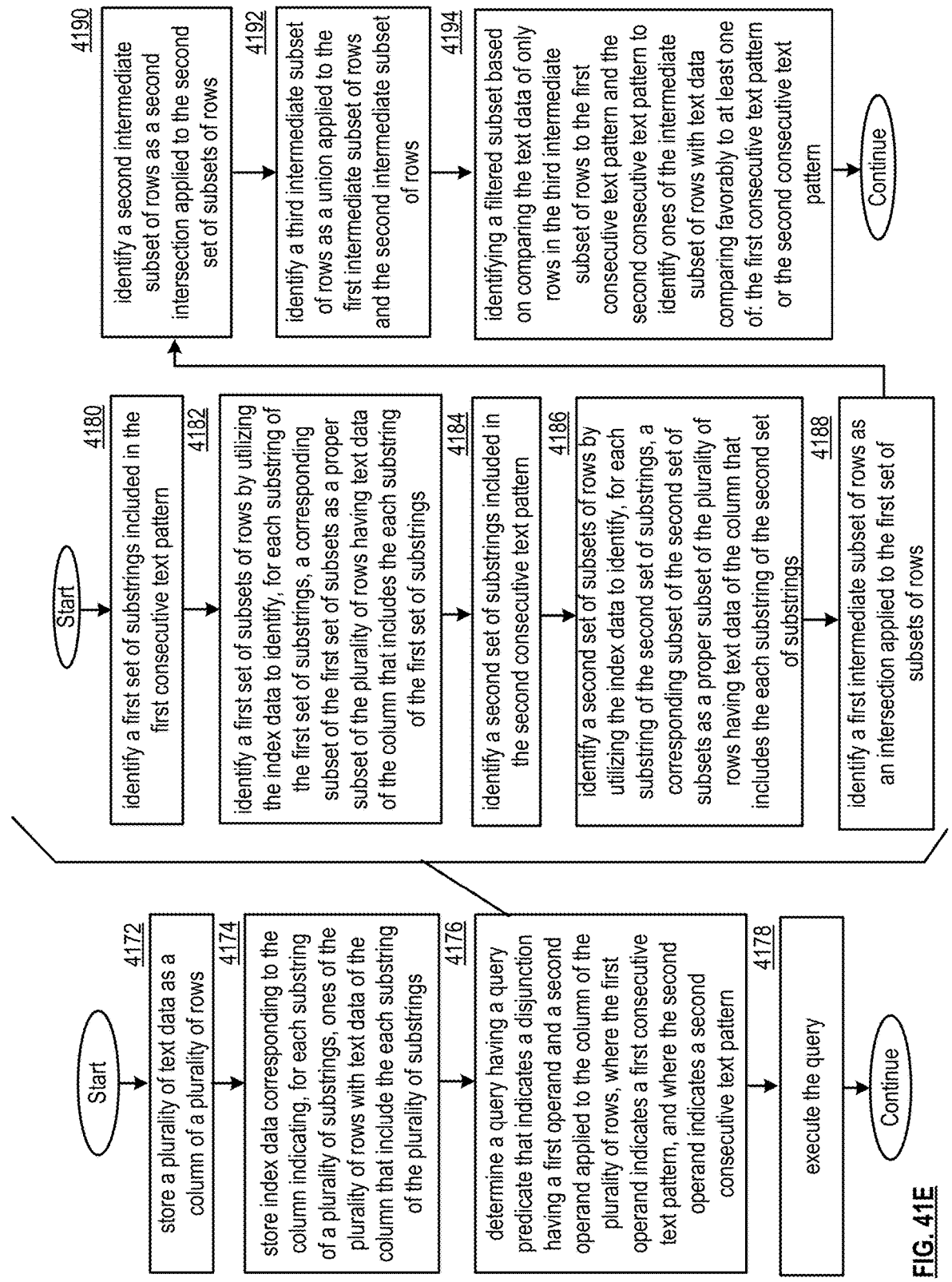

query processing system 2802 query processing system 2802

MISSING DATA-BASED INDEXING IN DATABASE SYSTEMS

CROSS-REFERENCE TO RELATED APPLICATIONS

Not Applicable

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This disclosure relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with various embodiments;

Figure 25C:
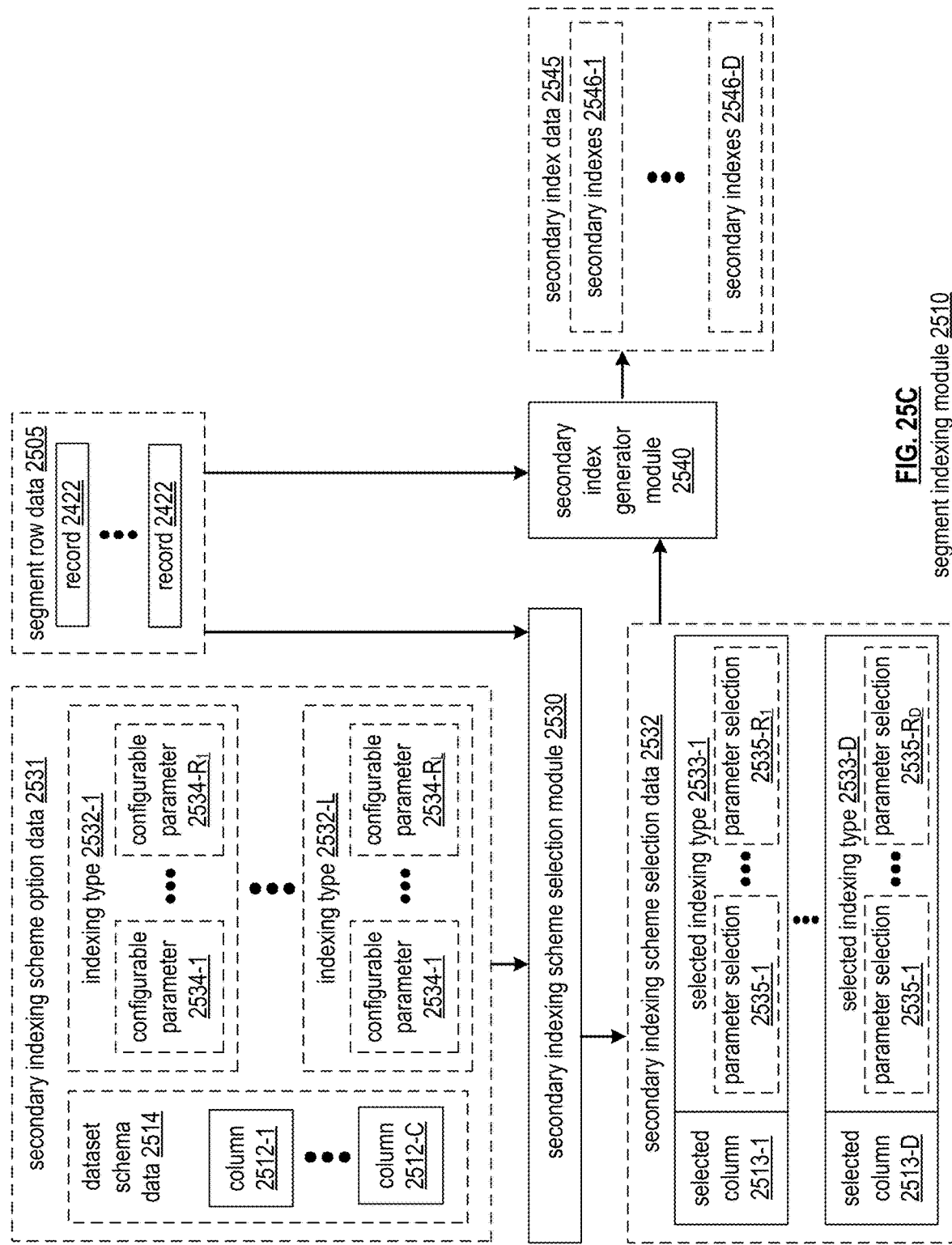
FIGS. 25B-25D are a schematic block diagrams of a segment indexing module in accordance with various embodiments.
Figure 25E:
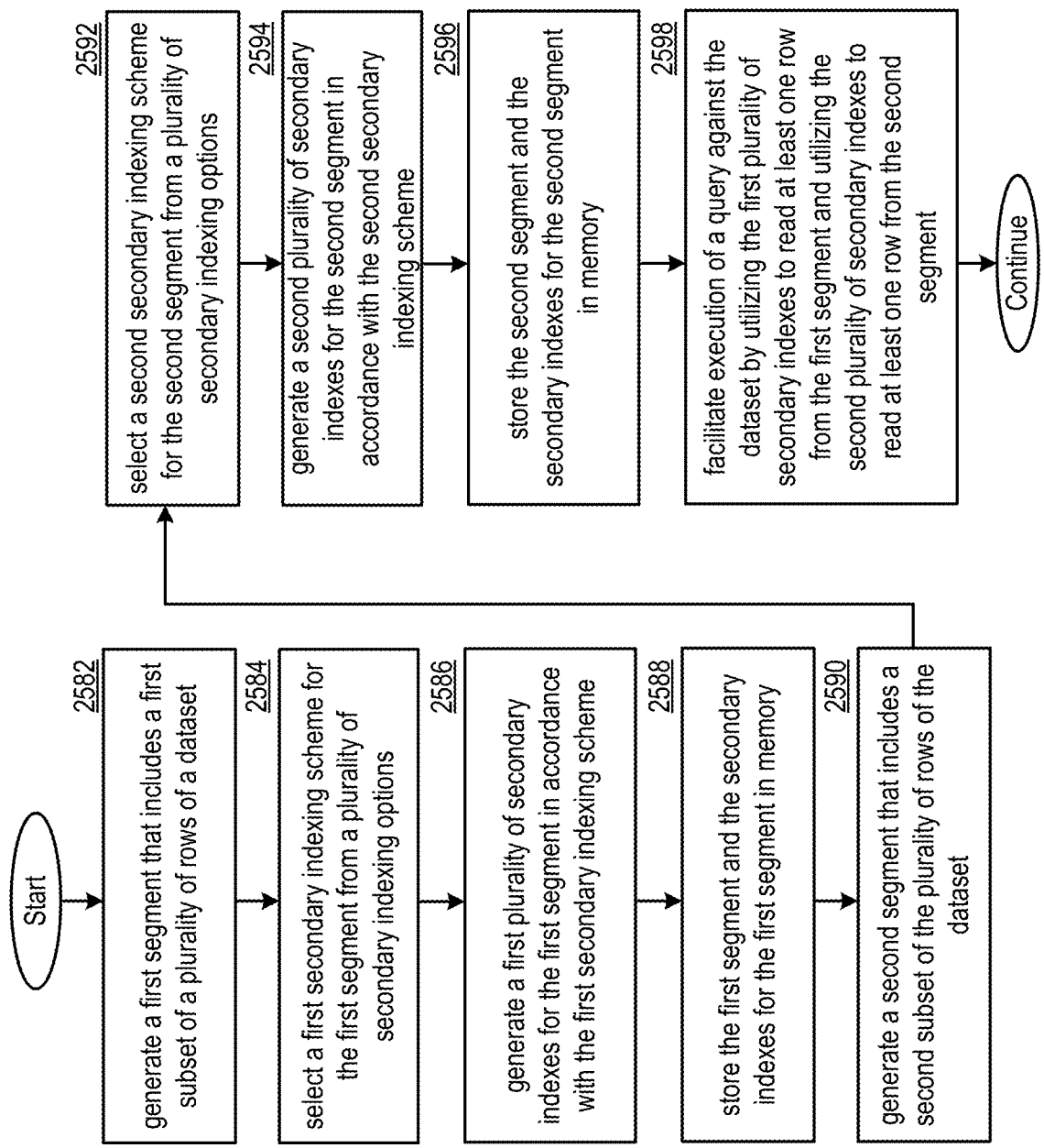
FIG. 25A is a schematic block diagram of a database system that implements a segment generator module, a segment storage module, and a query execution module.
Figure 26A:
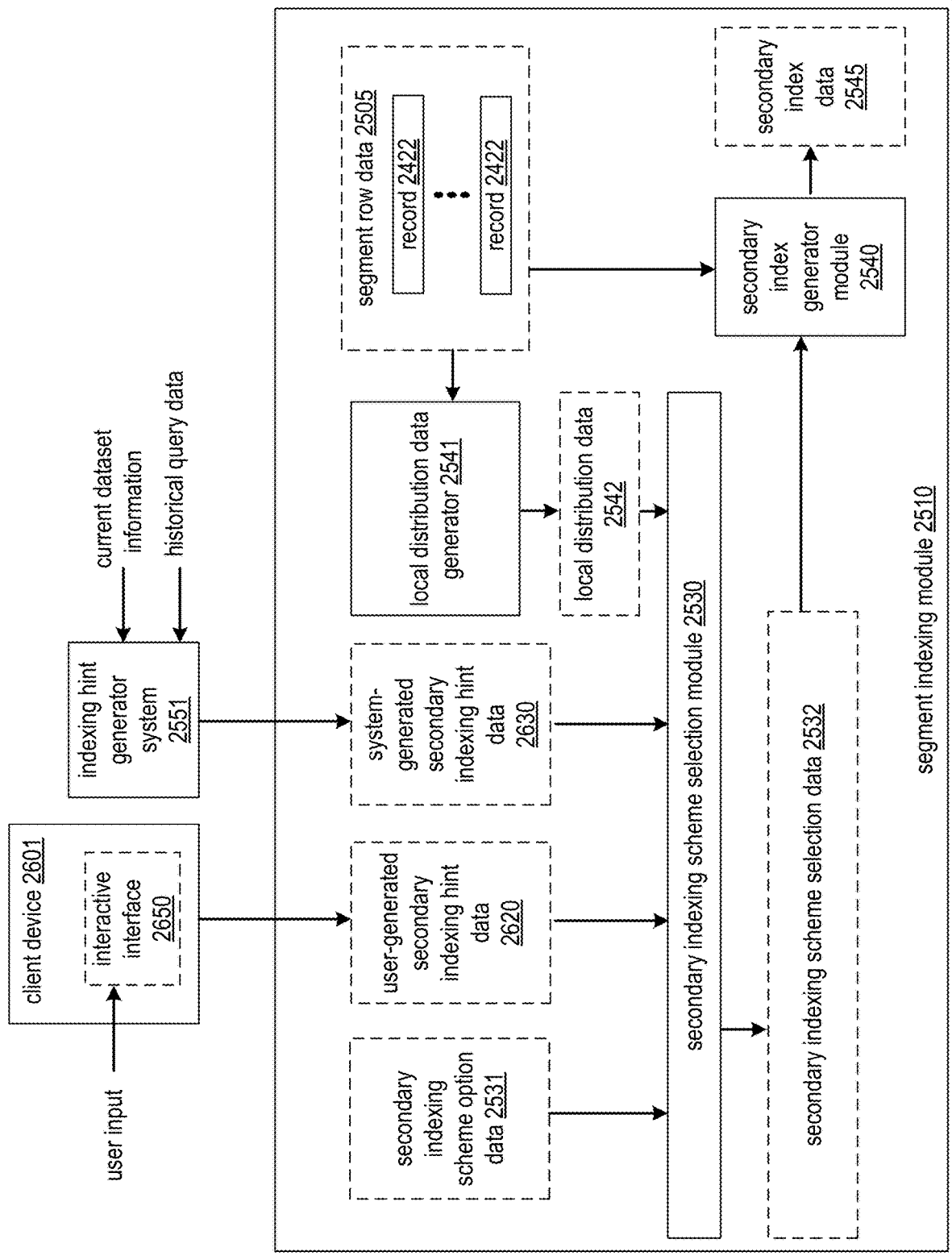
Figure 27A:
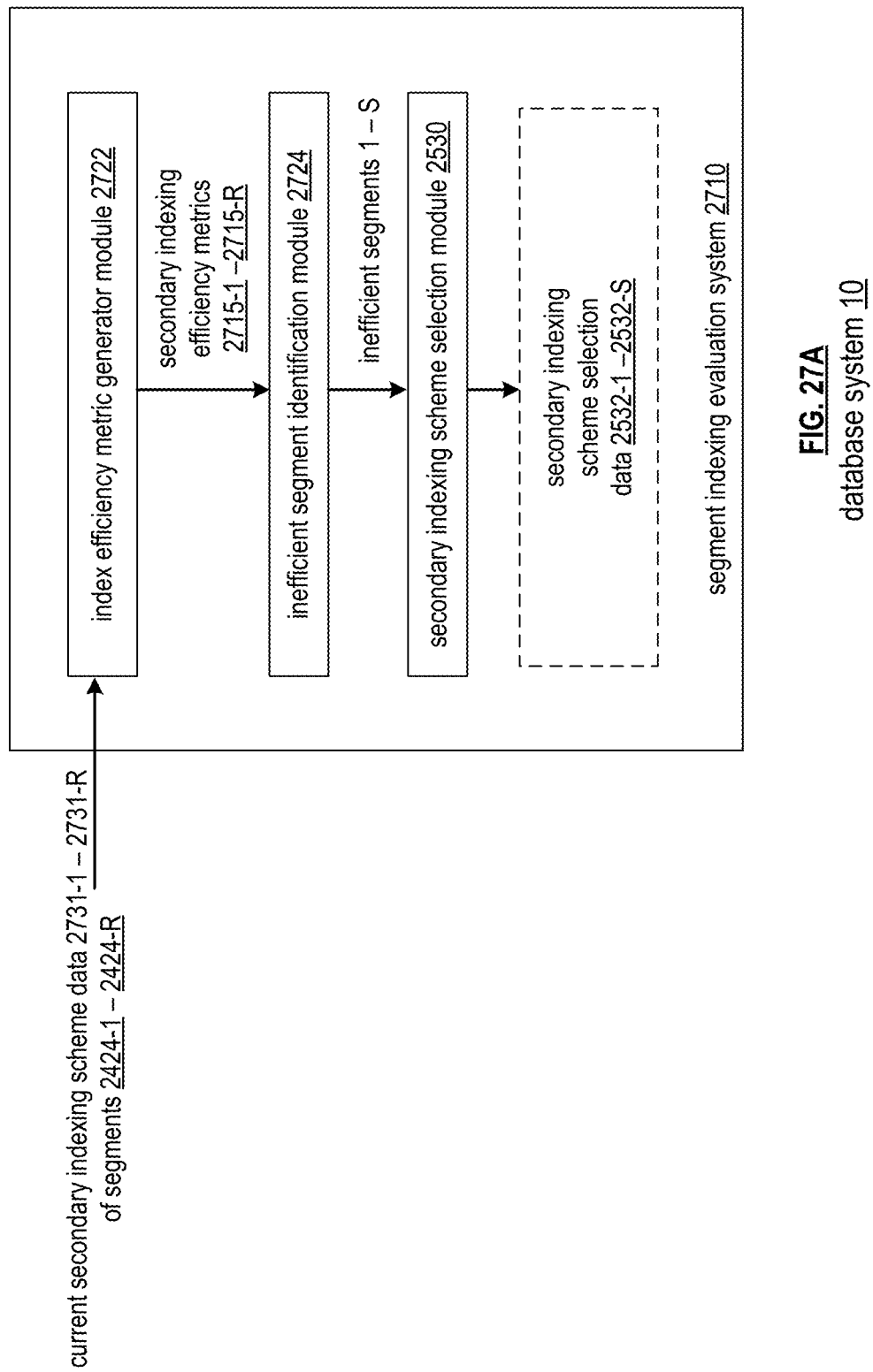
Figure 27B:
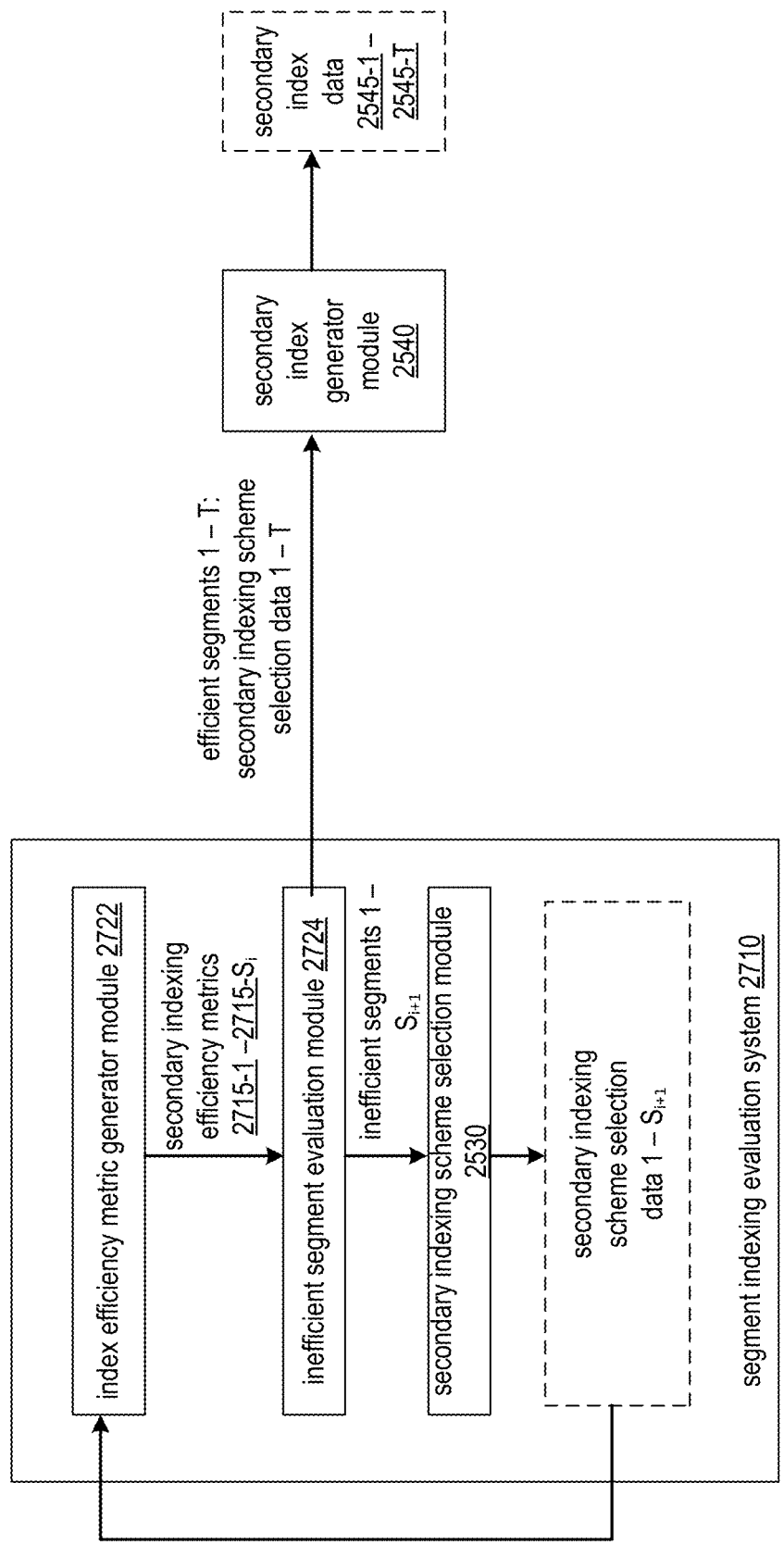
Figure 27D:
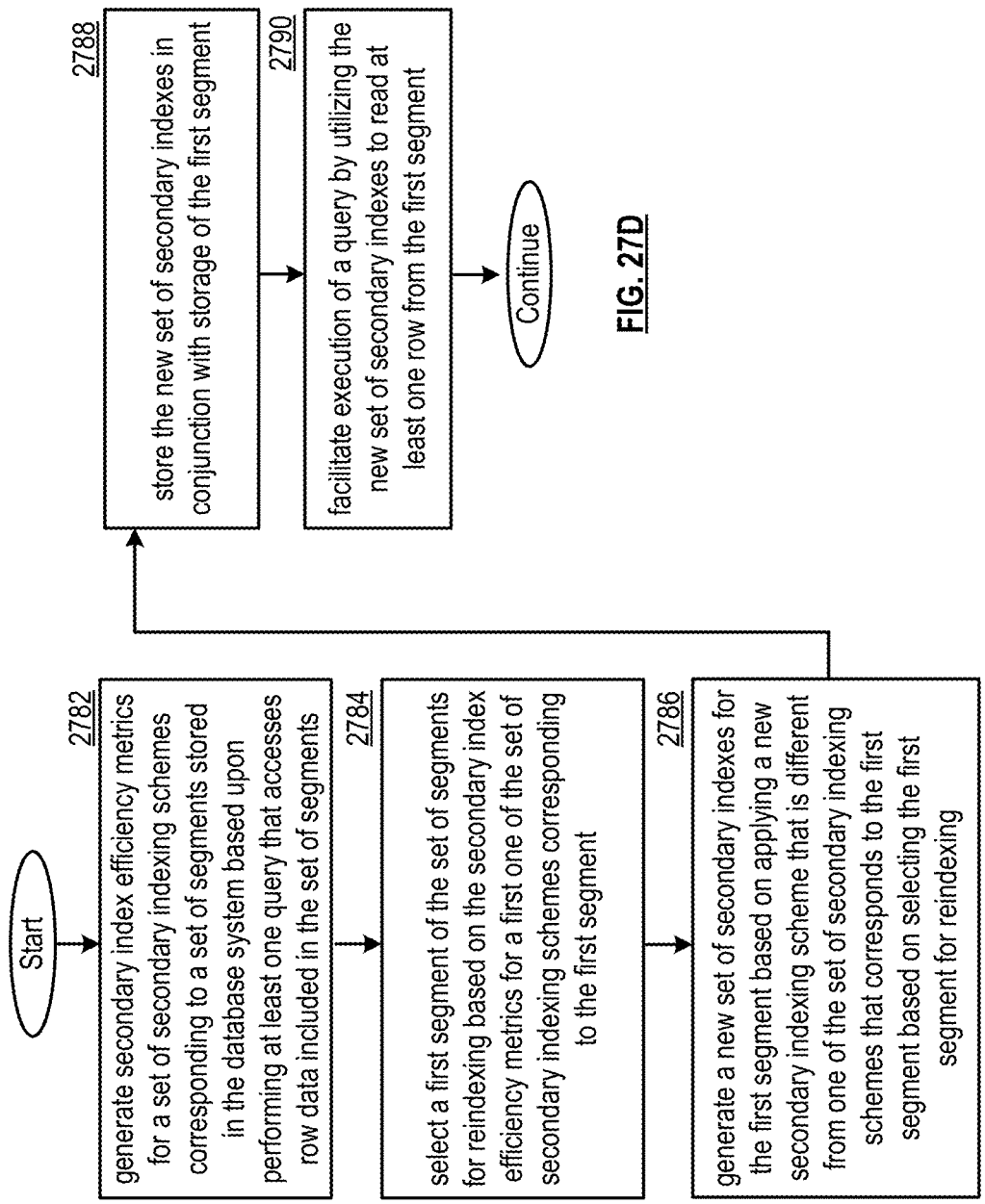
Figure 28A:
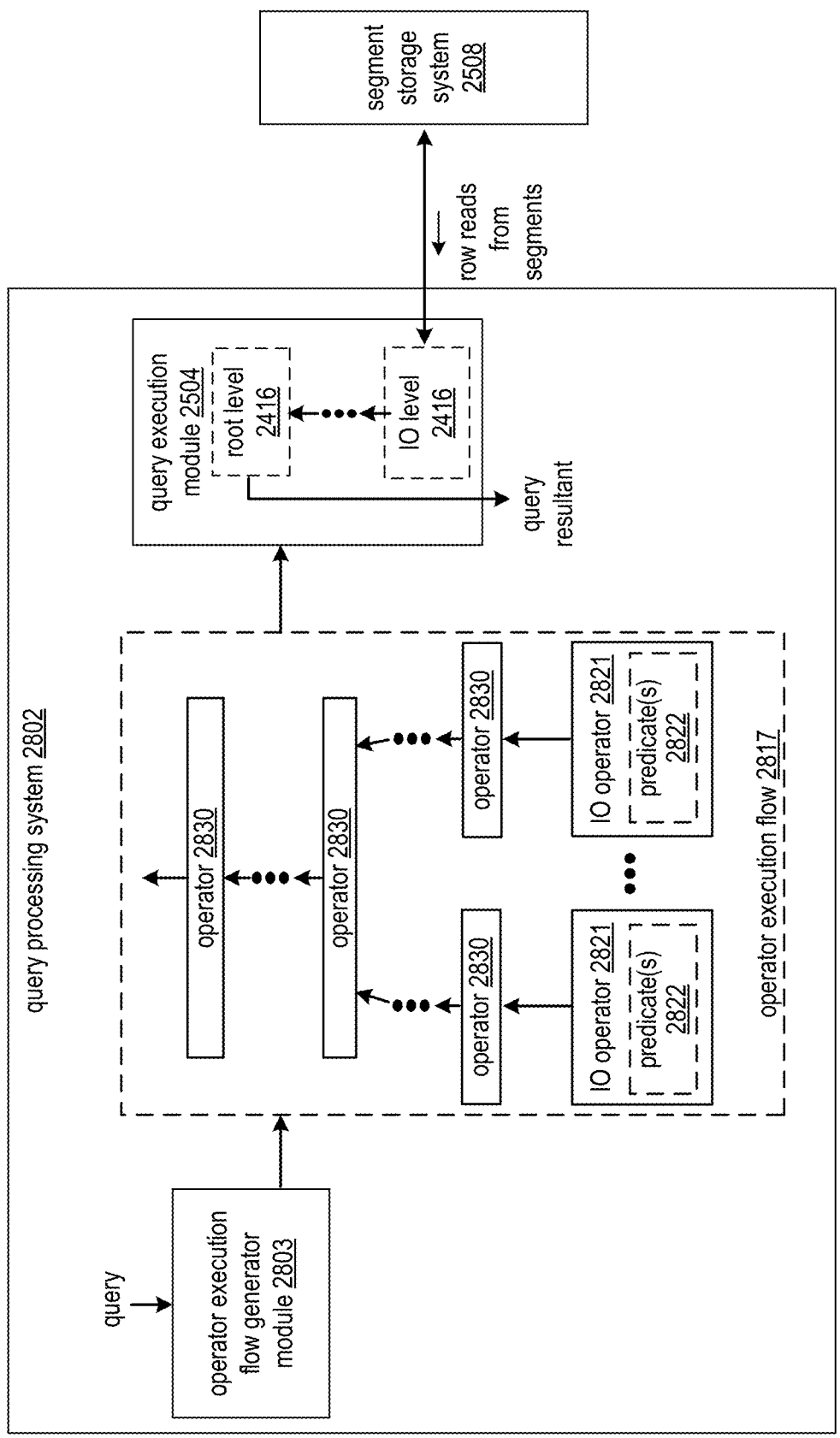
Figure 28B:
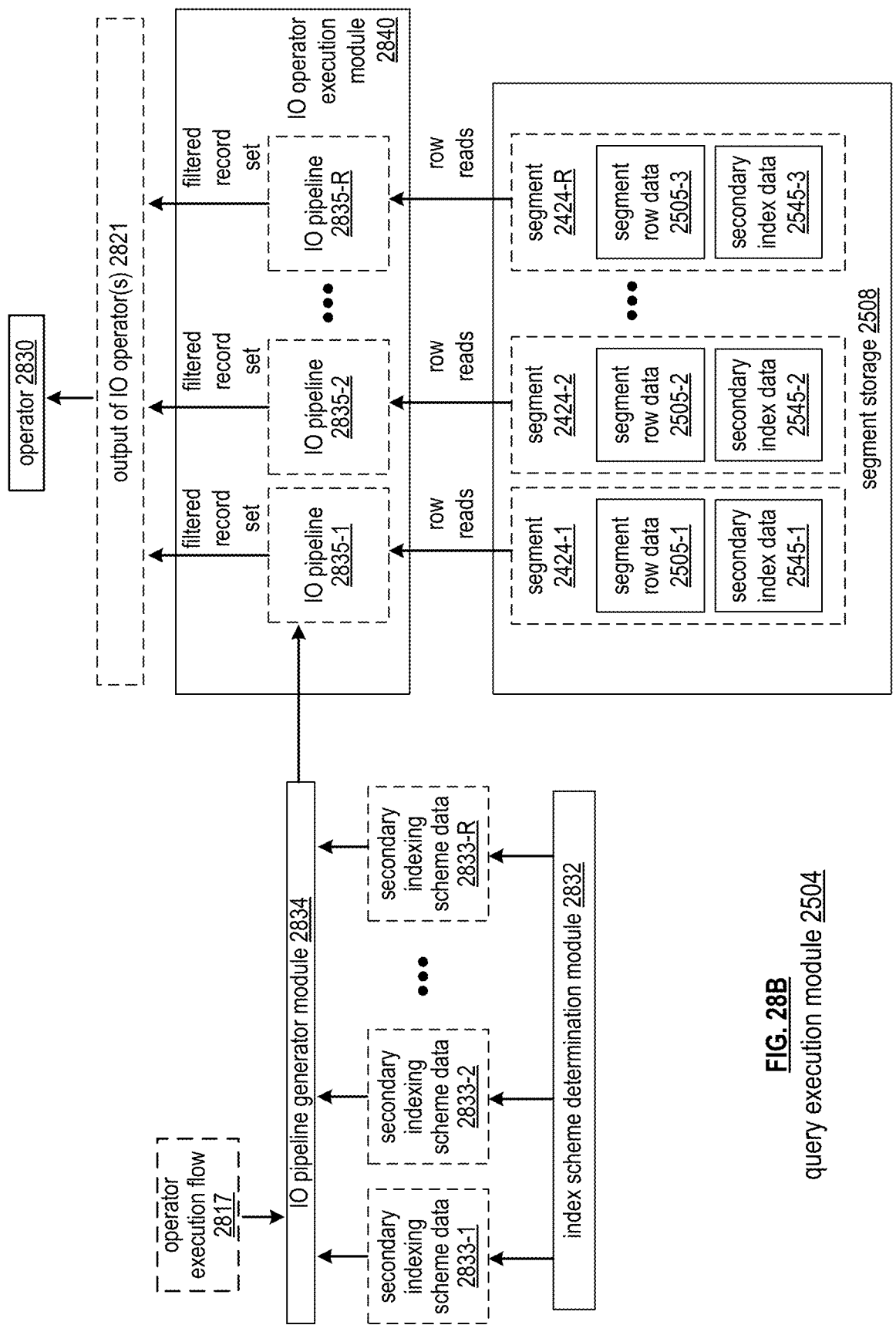
Figure 28C:
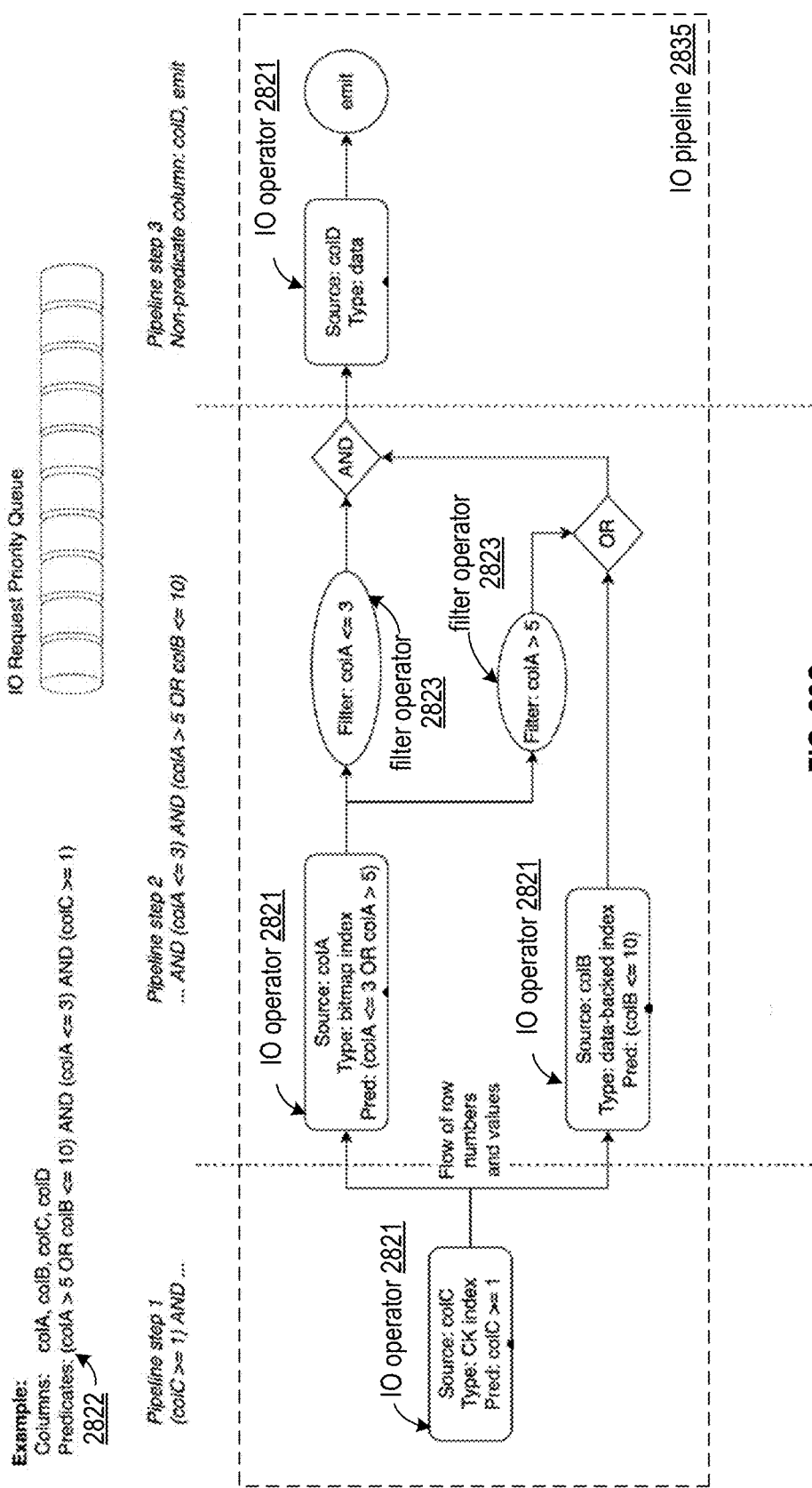
Figure 28D:
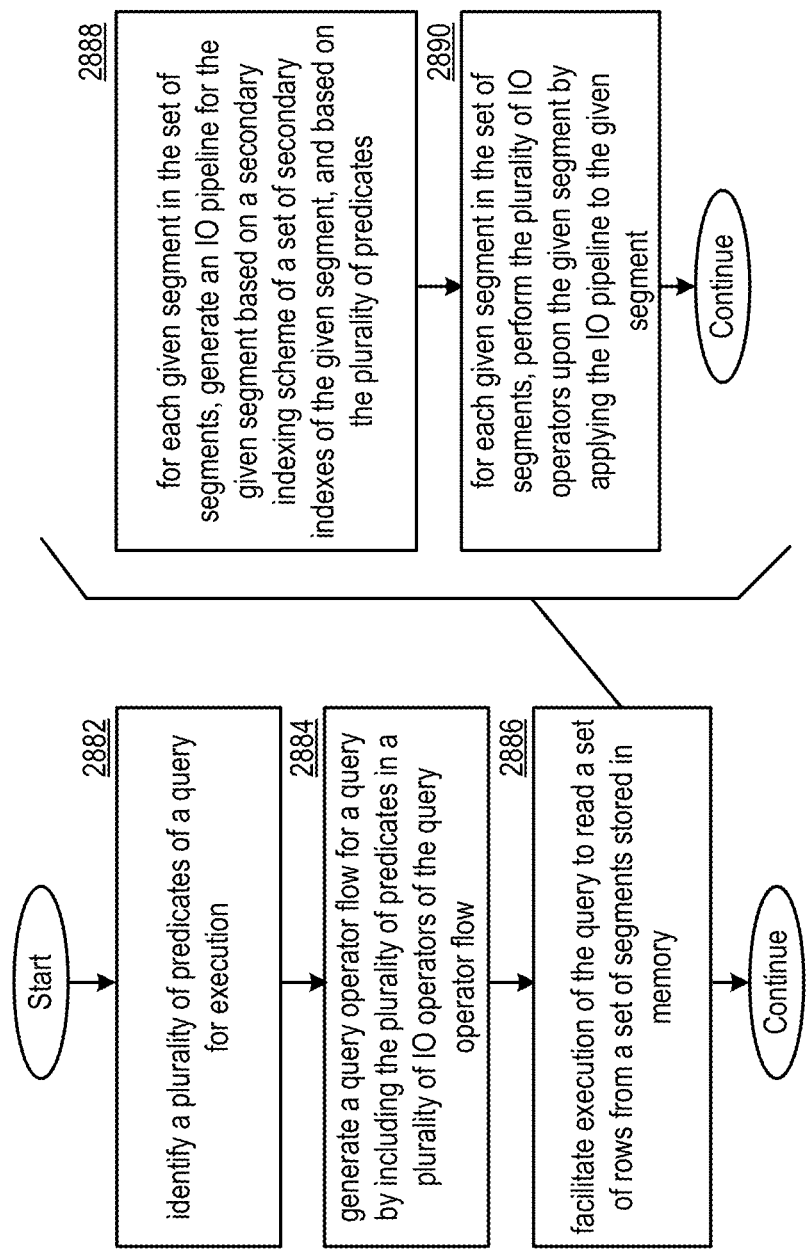
Figure 29A:
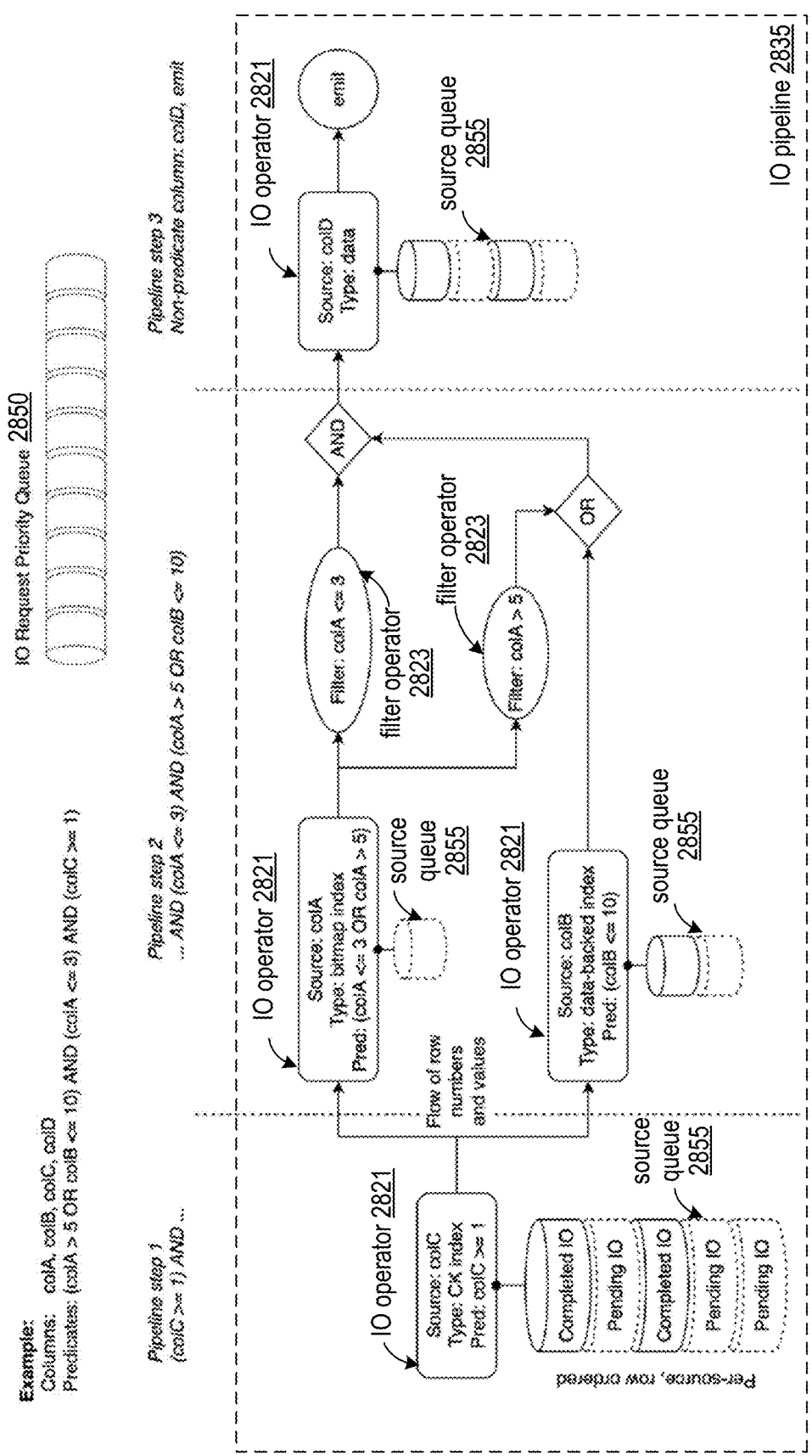
Figure 29B:
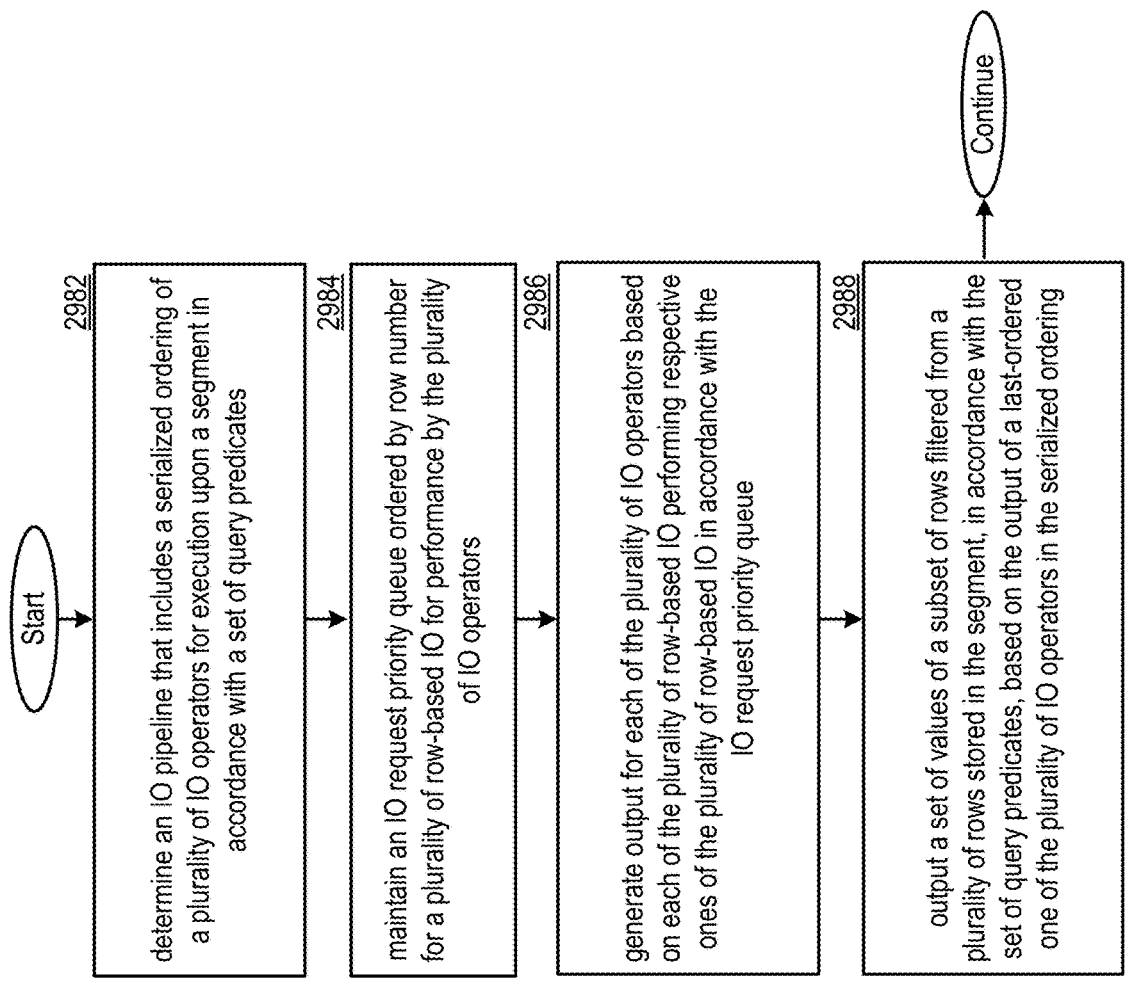
Figure 30A:
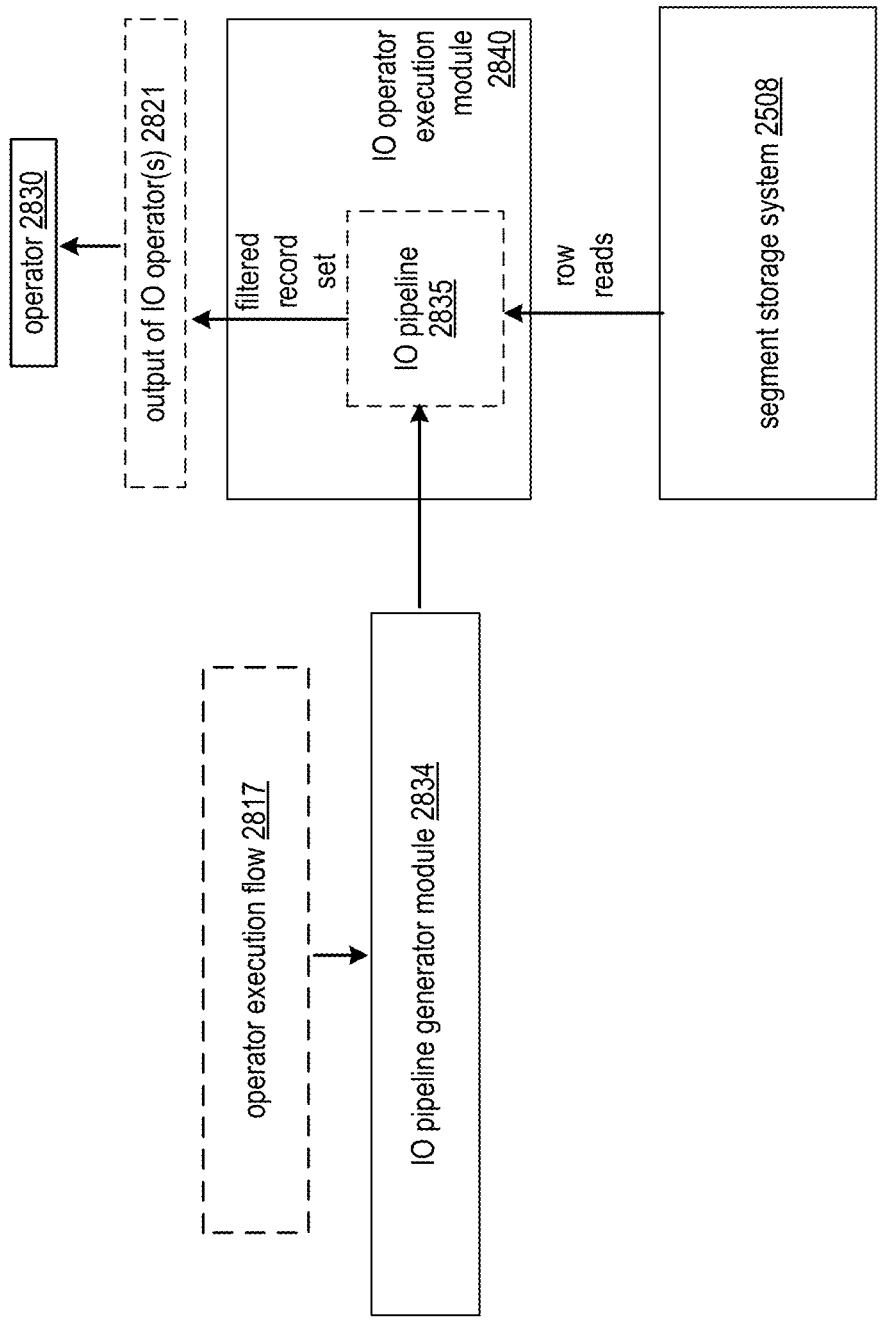
Figure 30B:
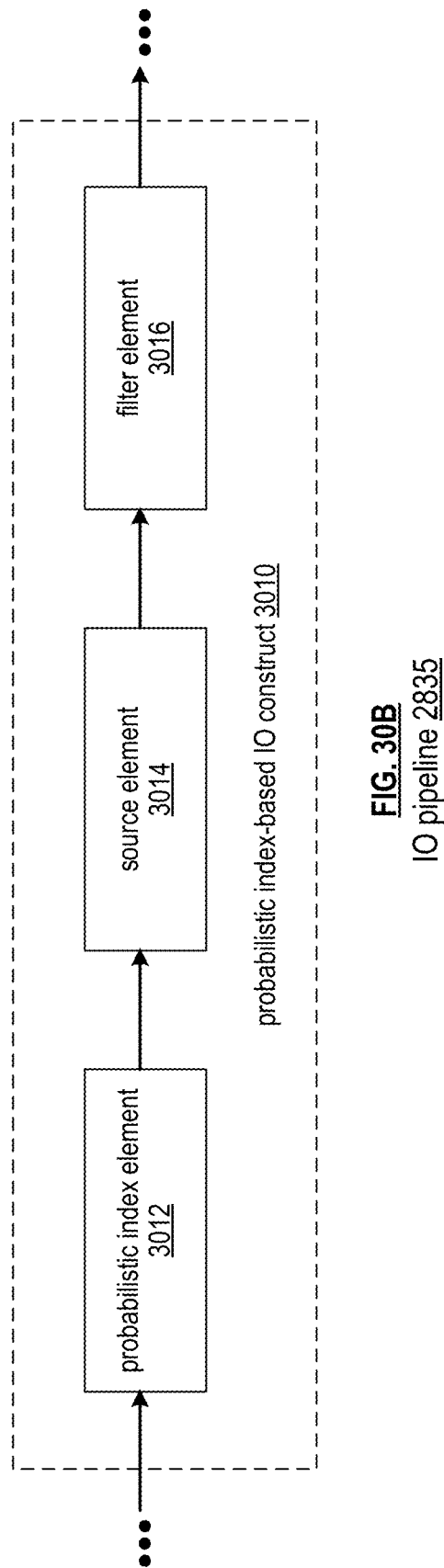
Figure 30C:
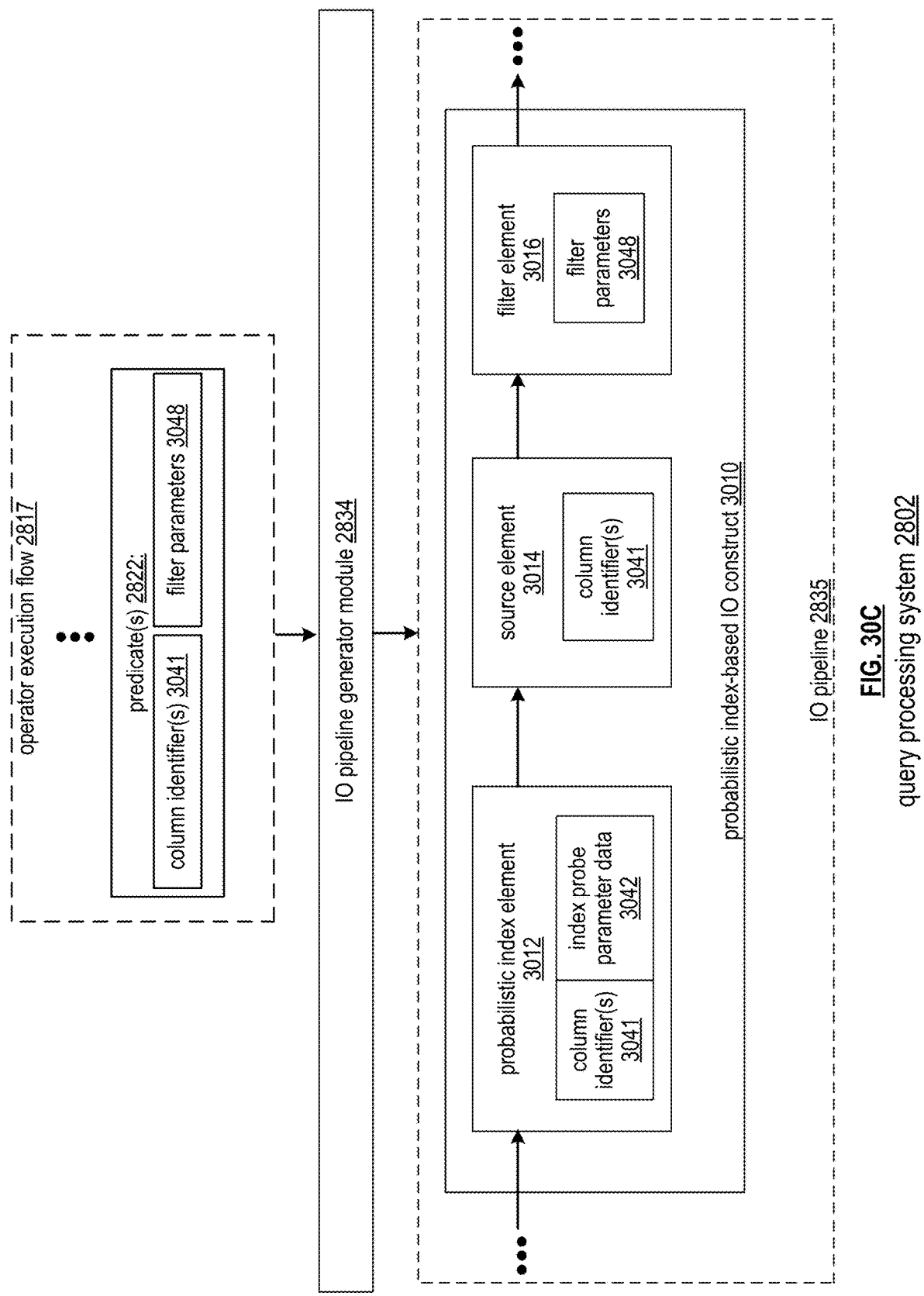
Figure 31B:
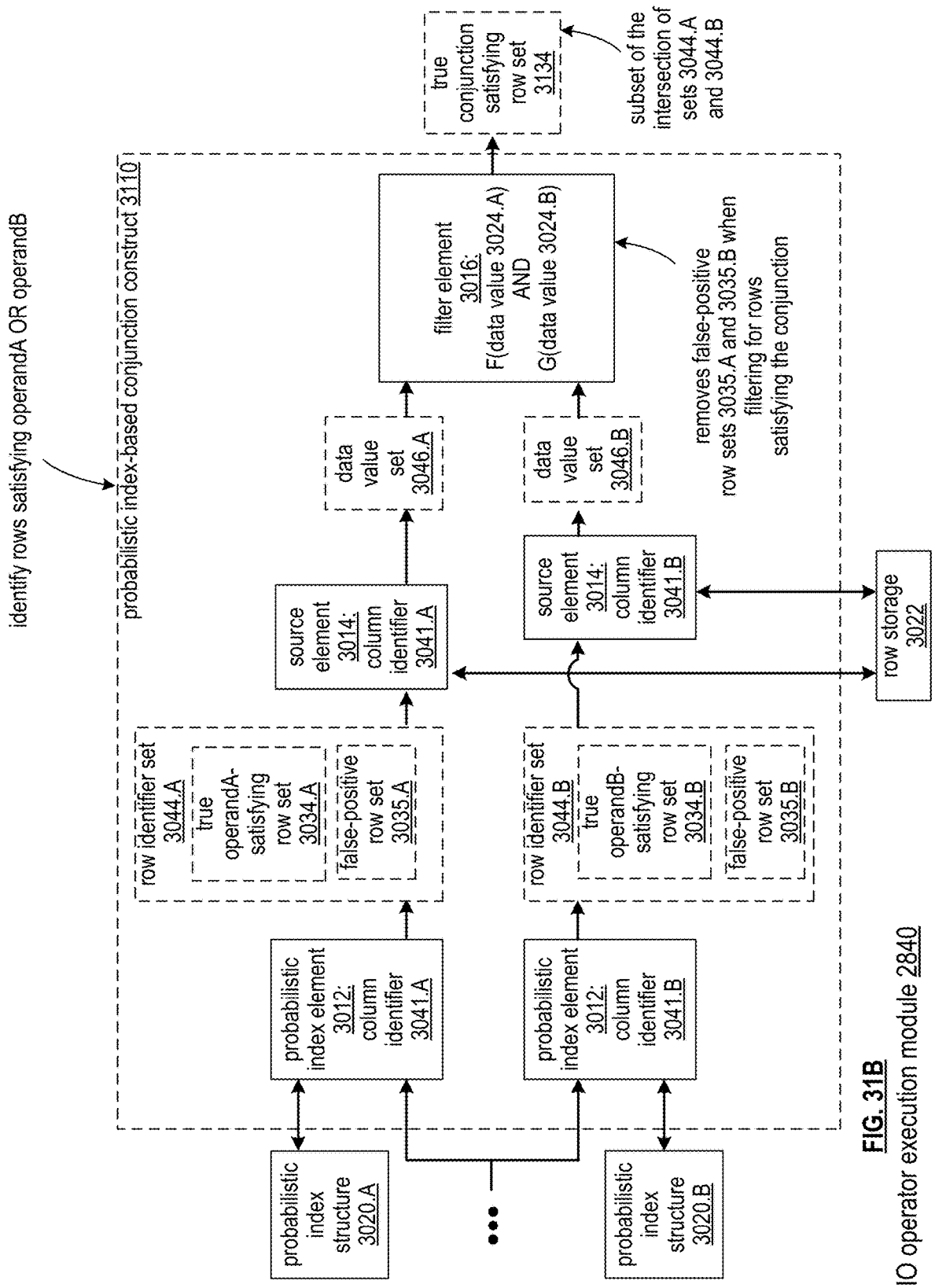
Figure 31C:
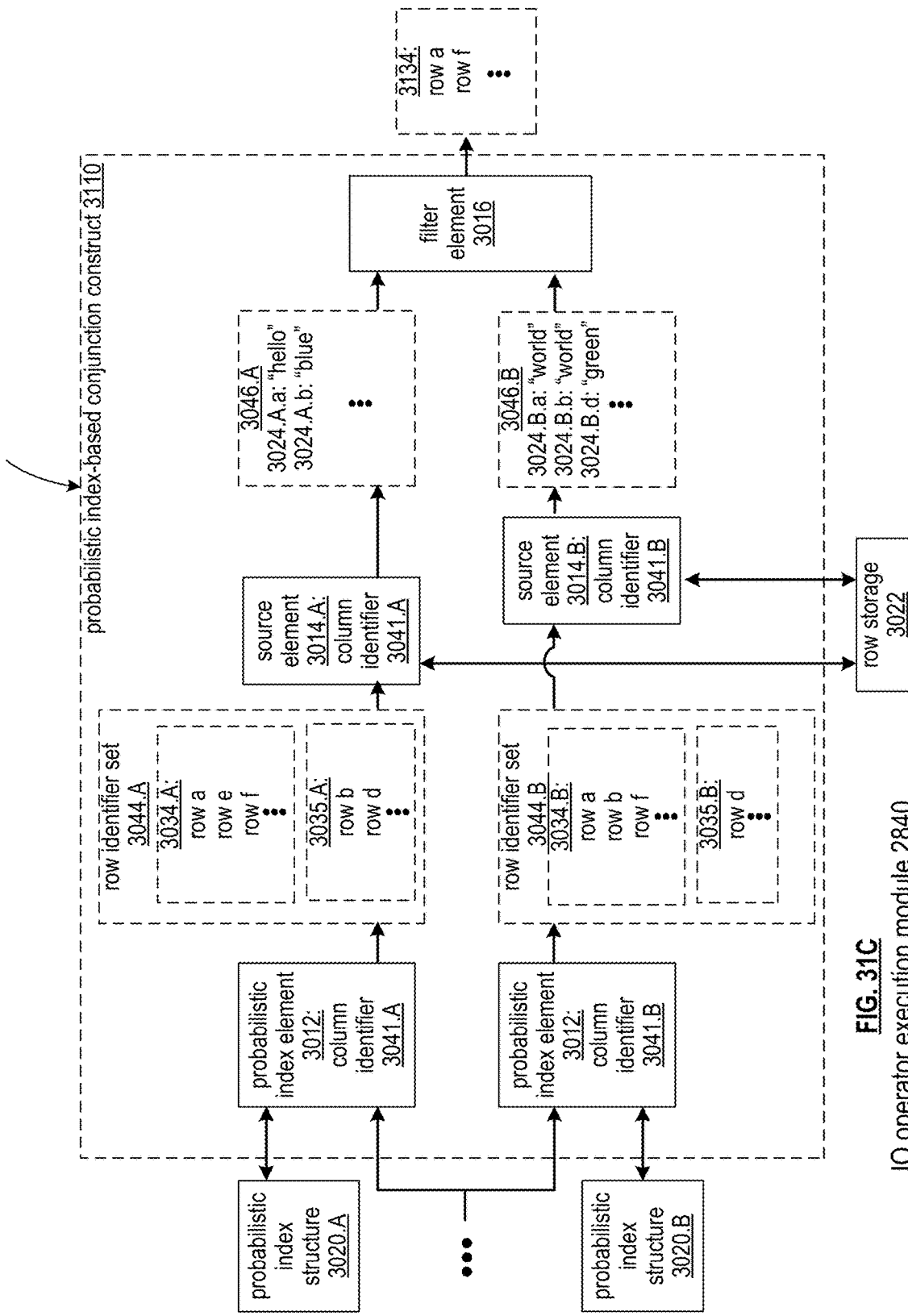
Figure 31D:
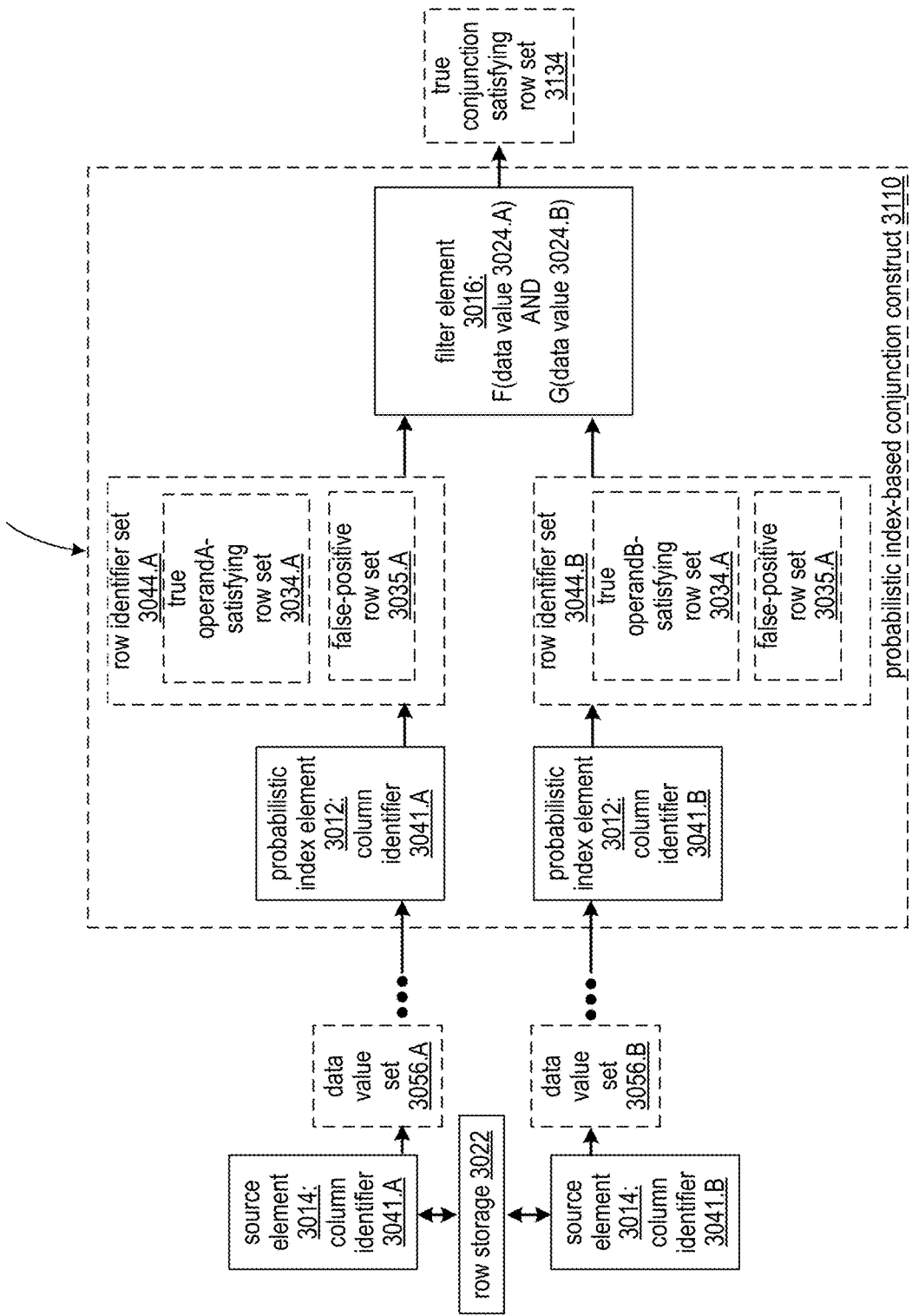
Figure 31E:
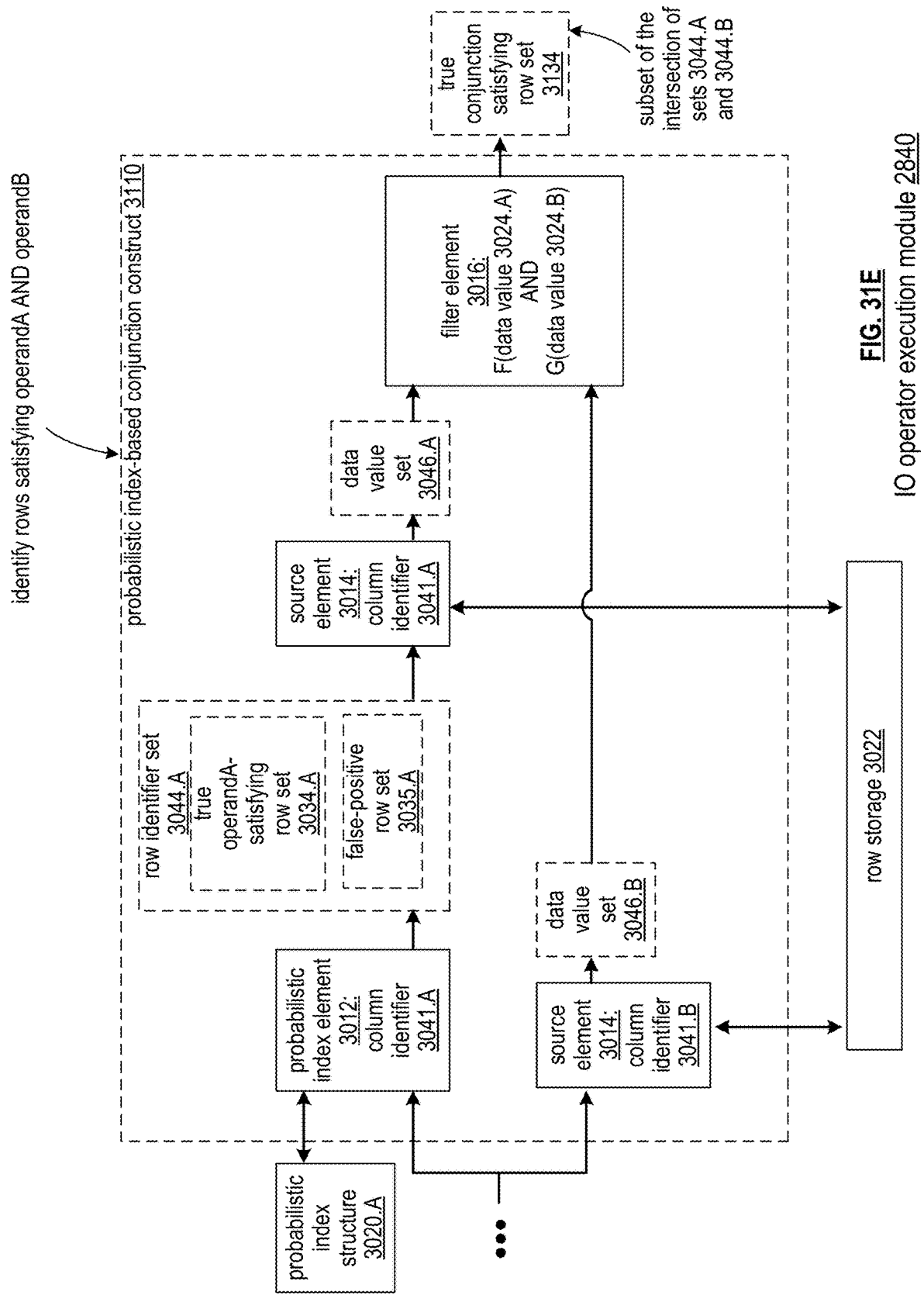
Figure 31F:
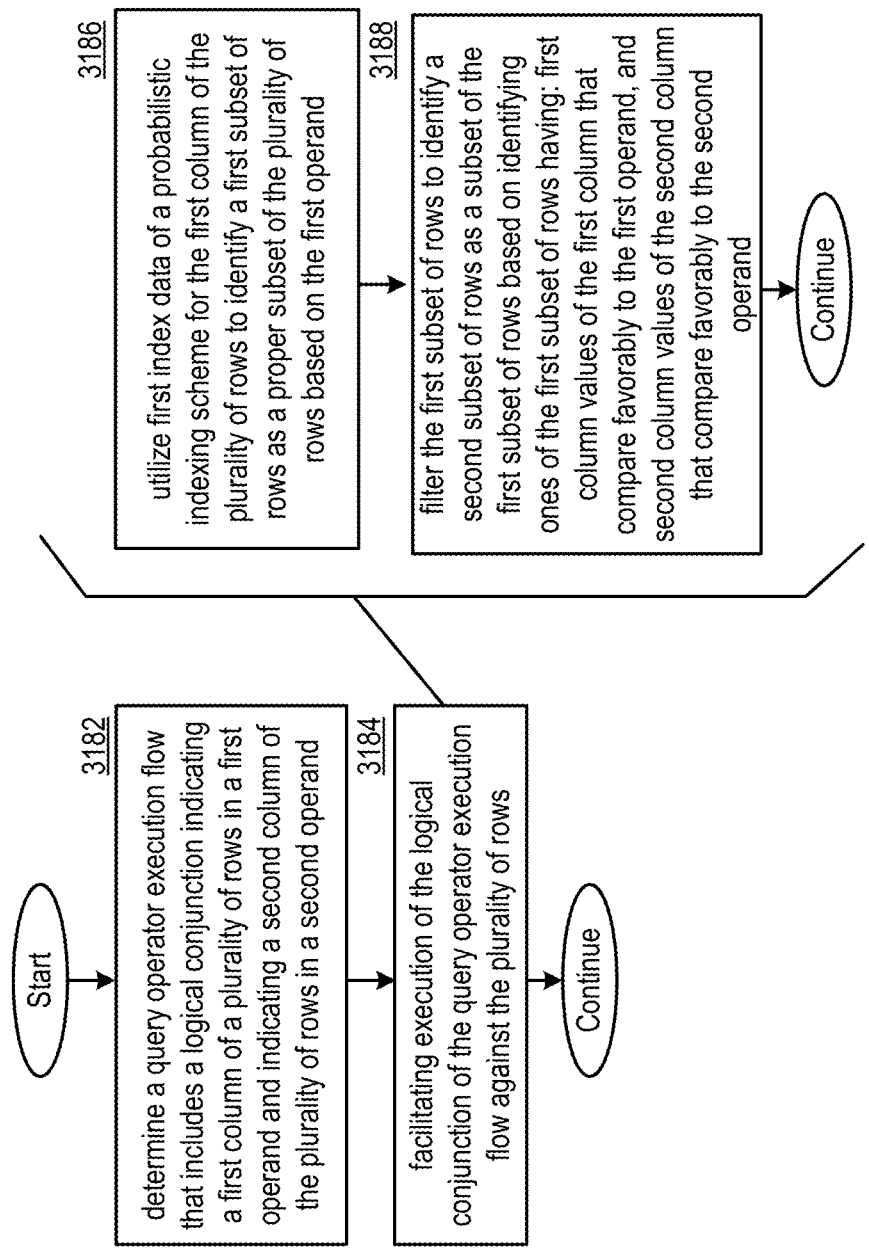
Figure 32A:
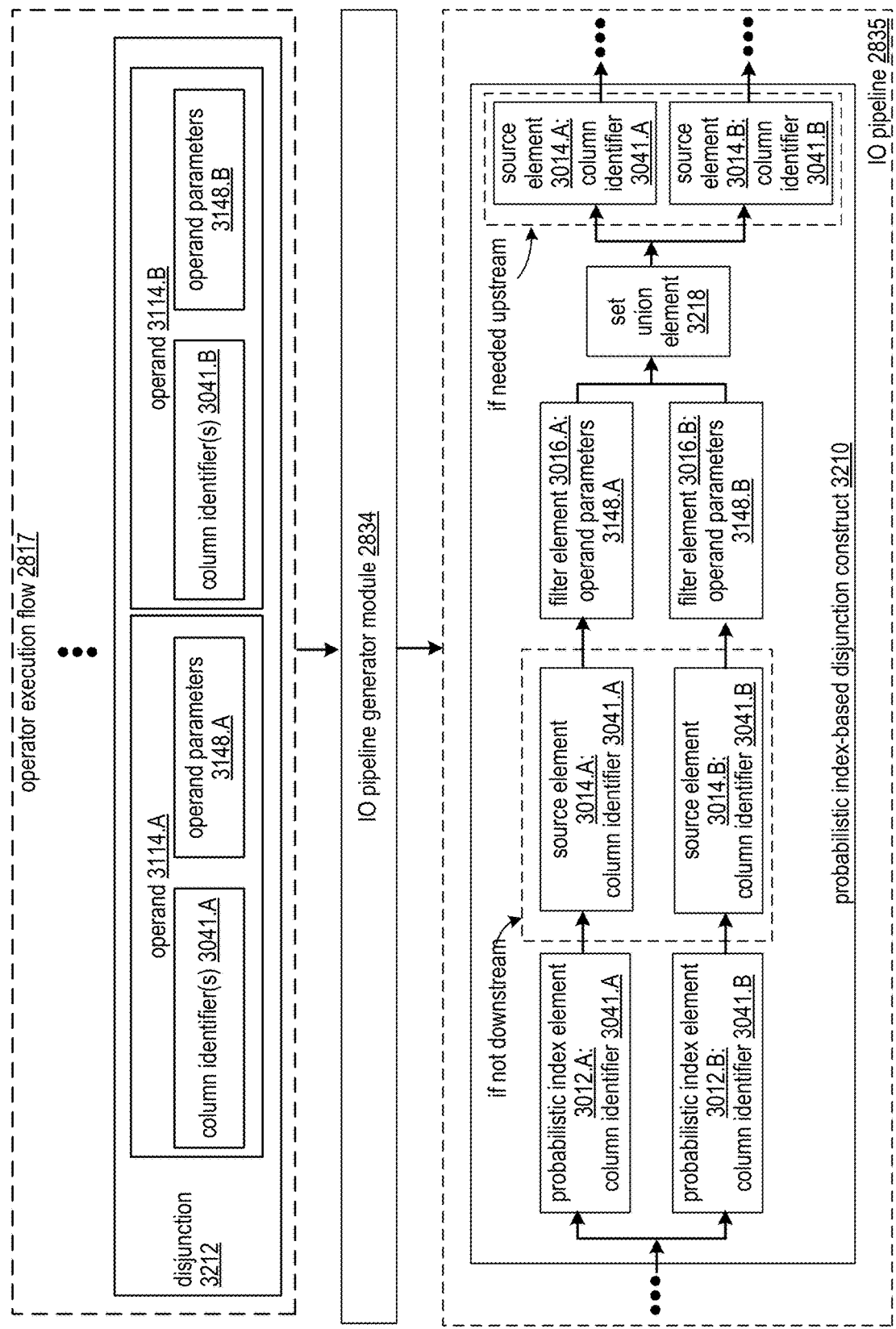
Figure 32B:
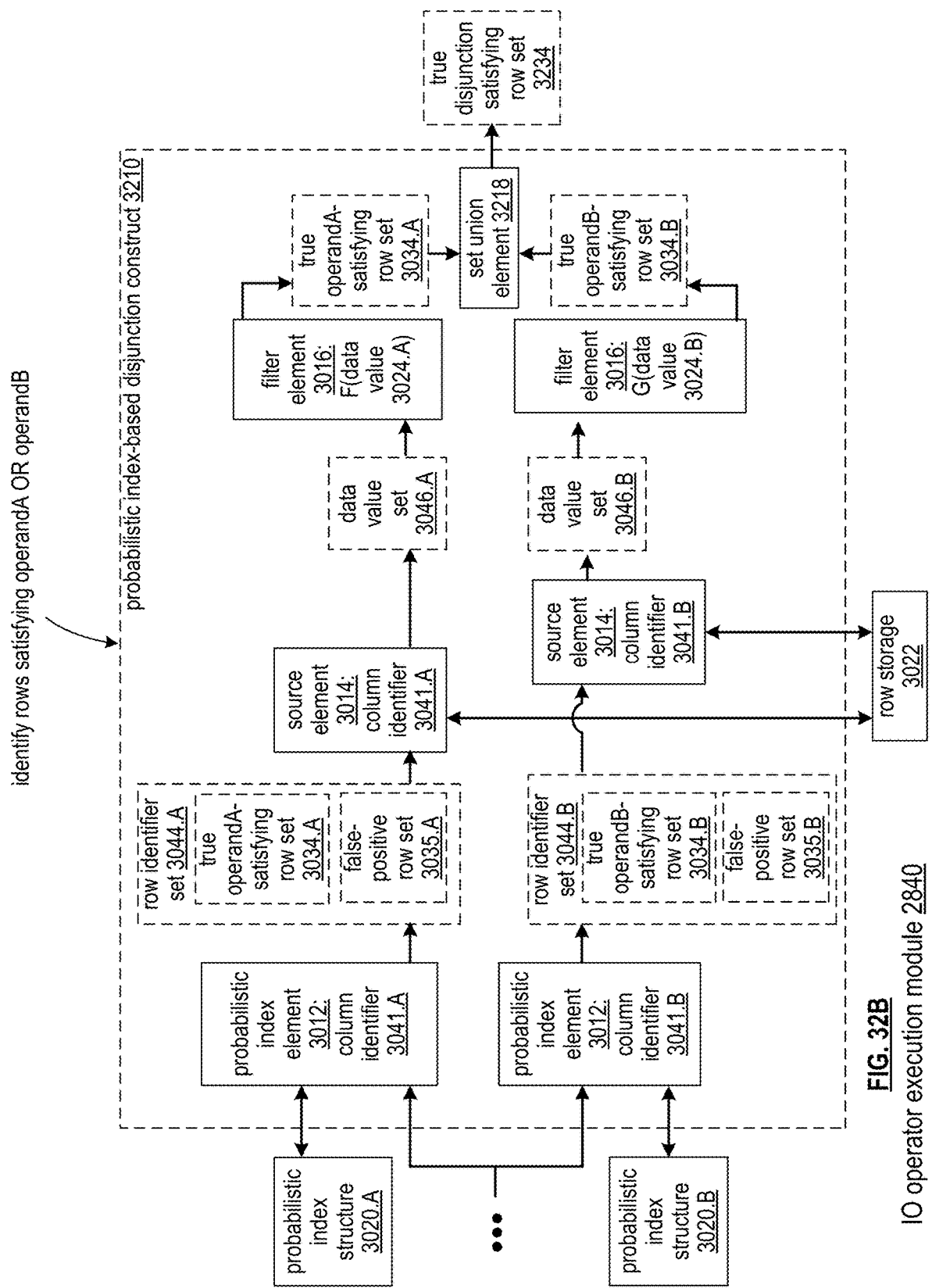
Figure 32C:
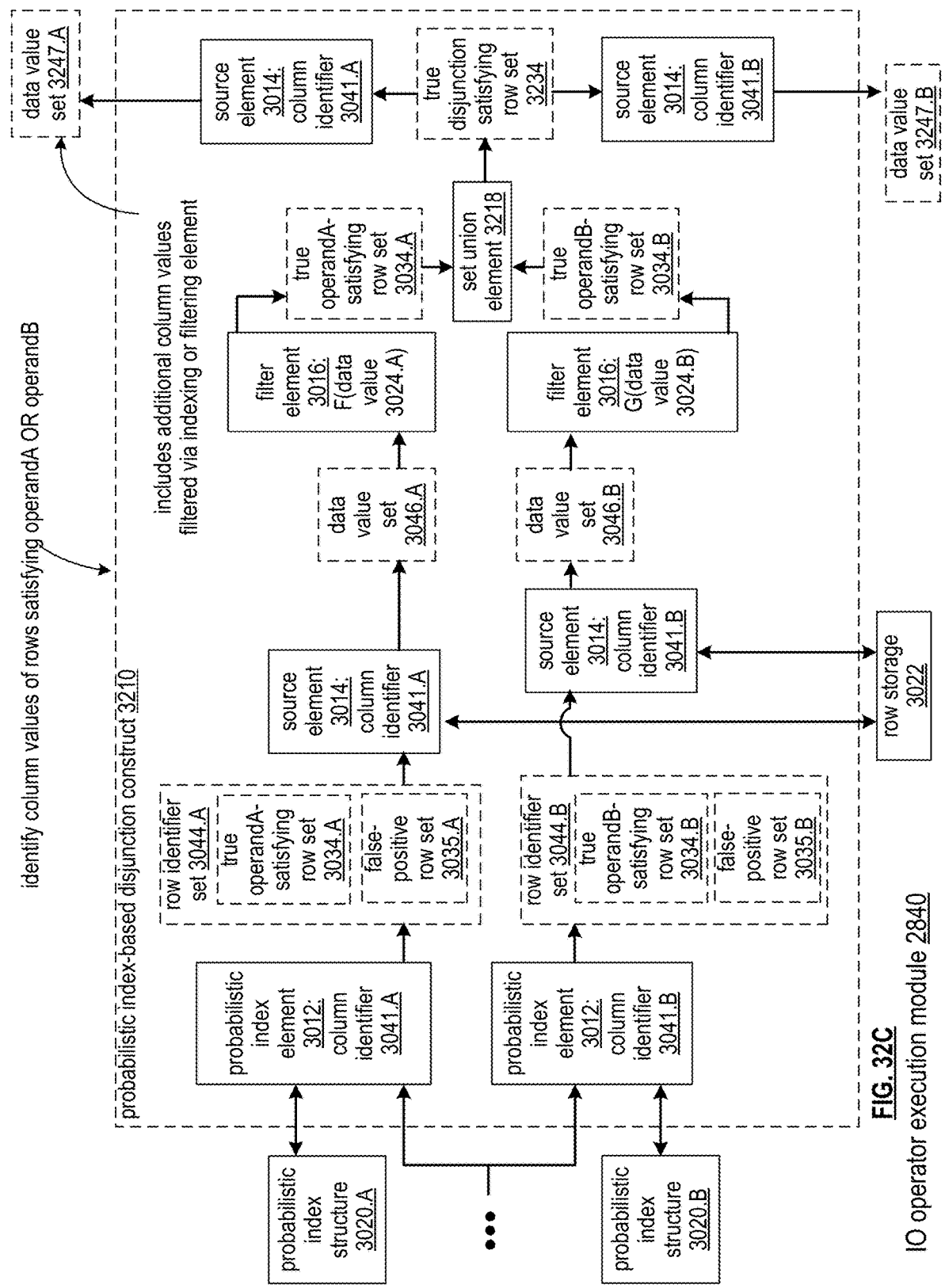
Figure 32D:
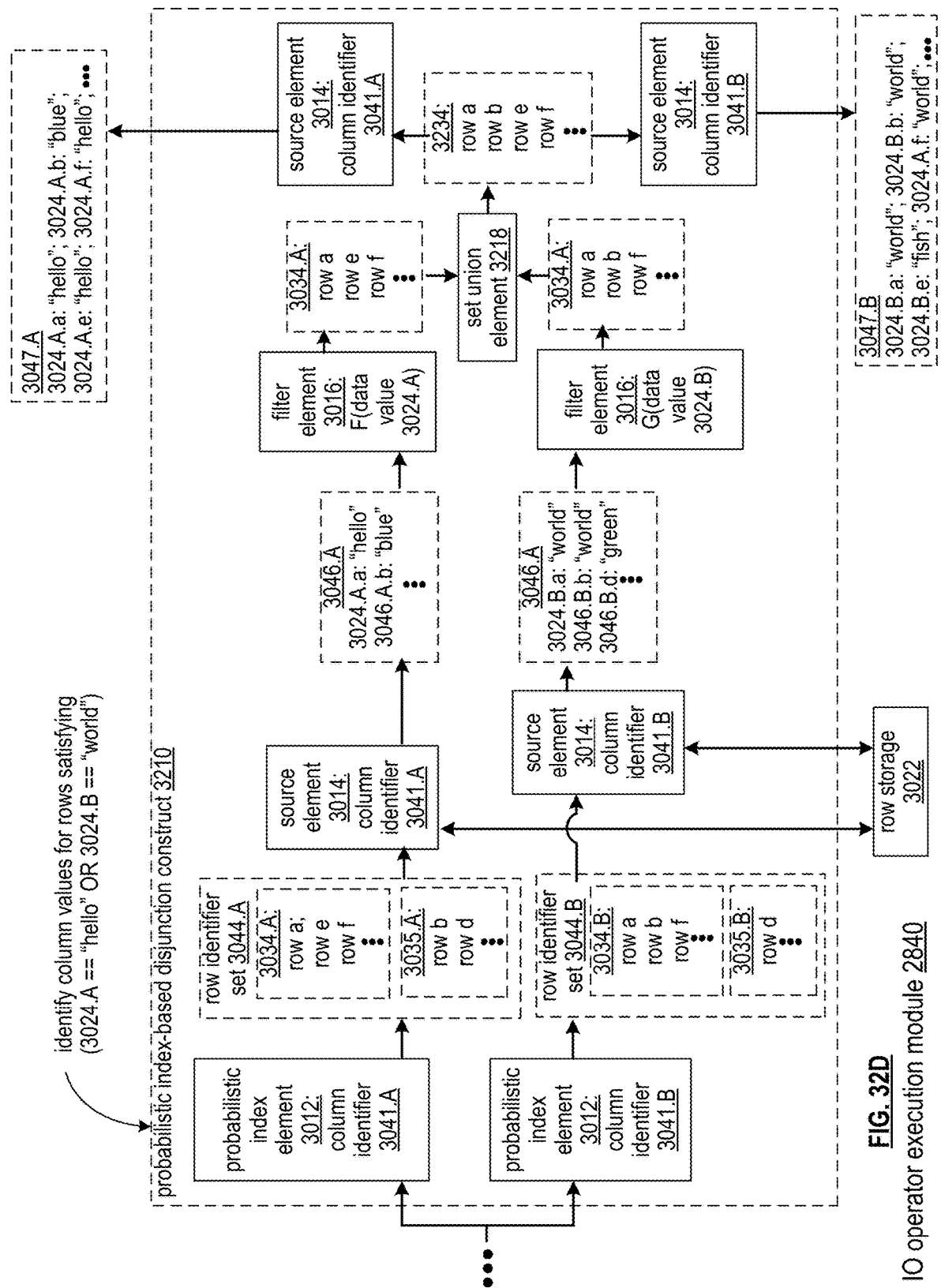
Figure 32E:
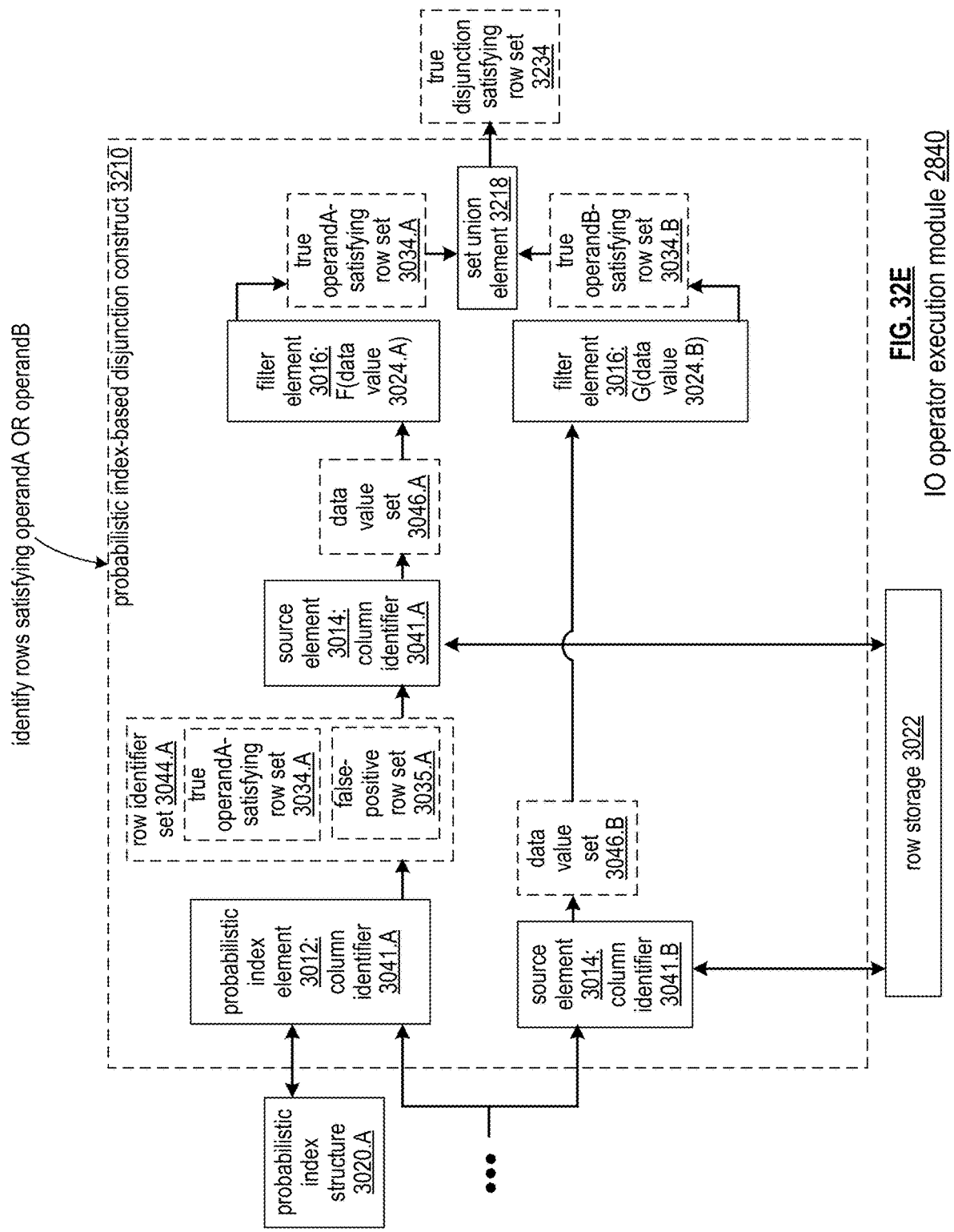
Figure 32F:
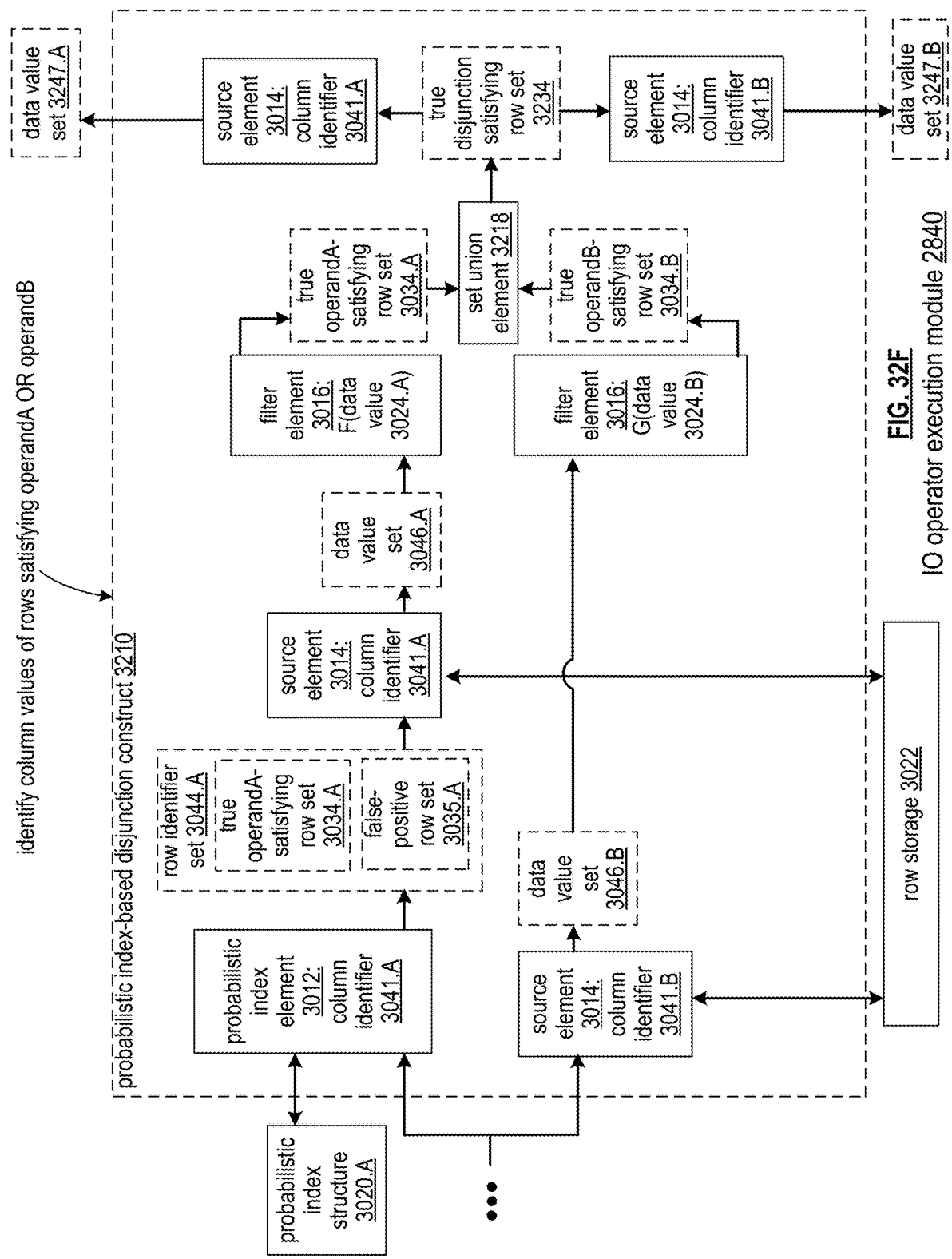
Figure 32G:
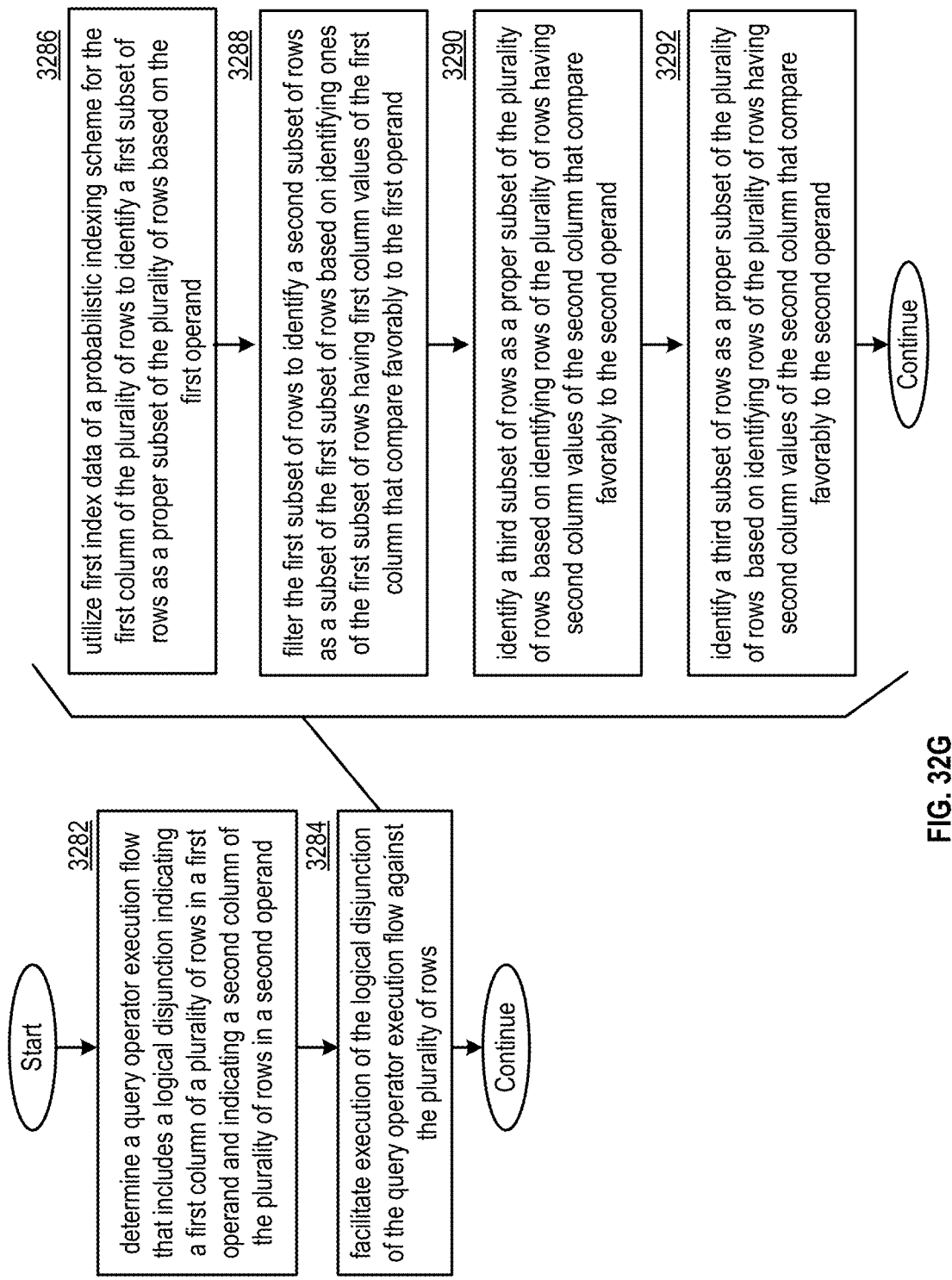
Figure 33A:
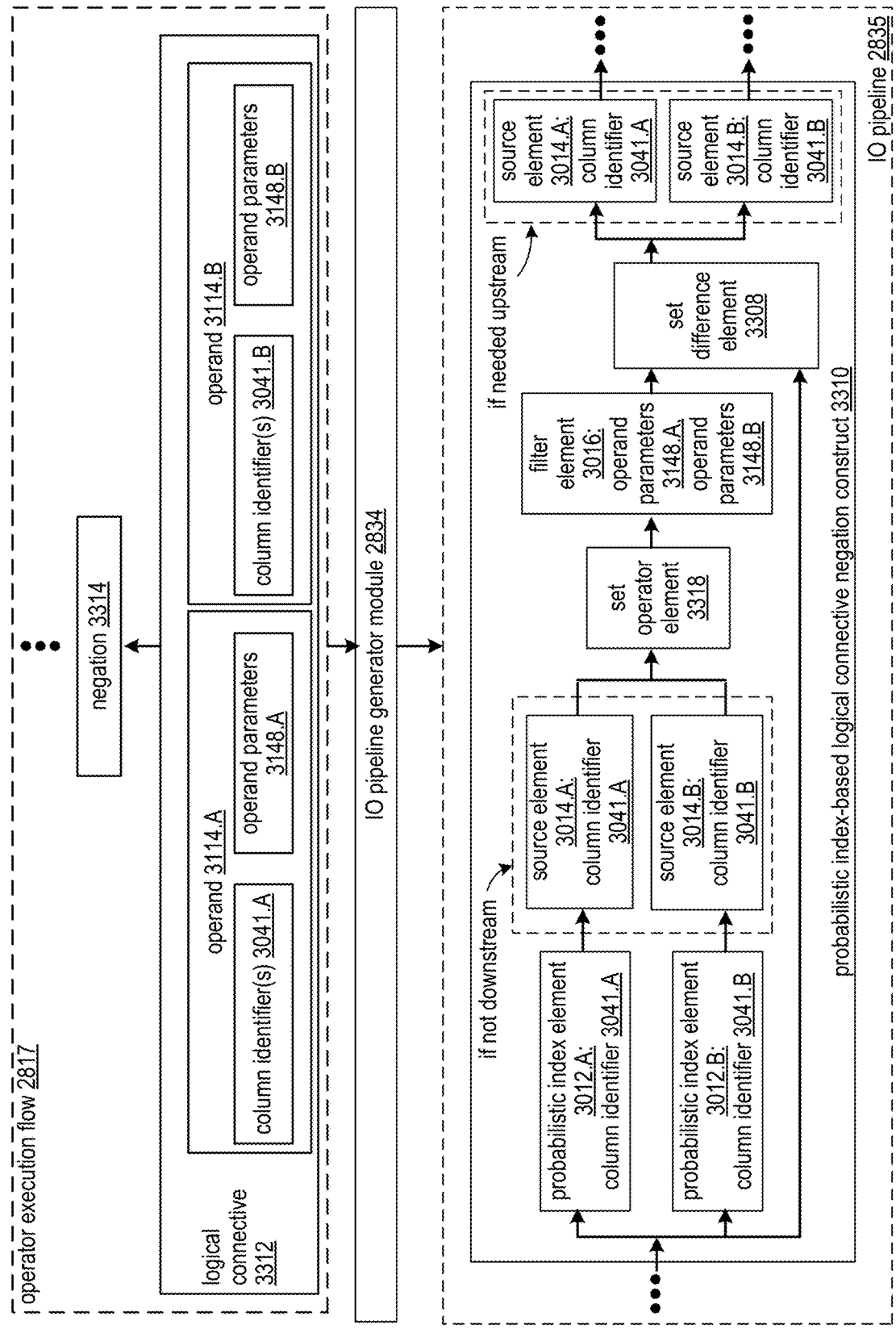
Figure 33C:
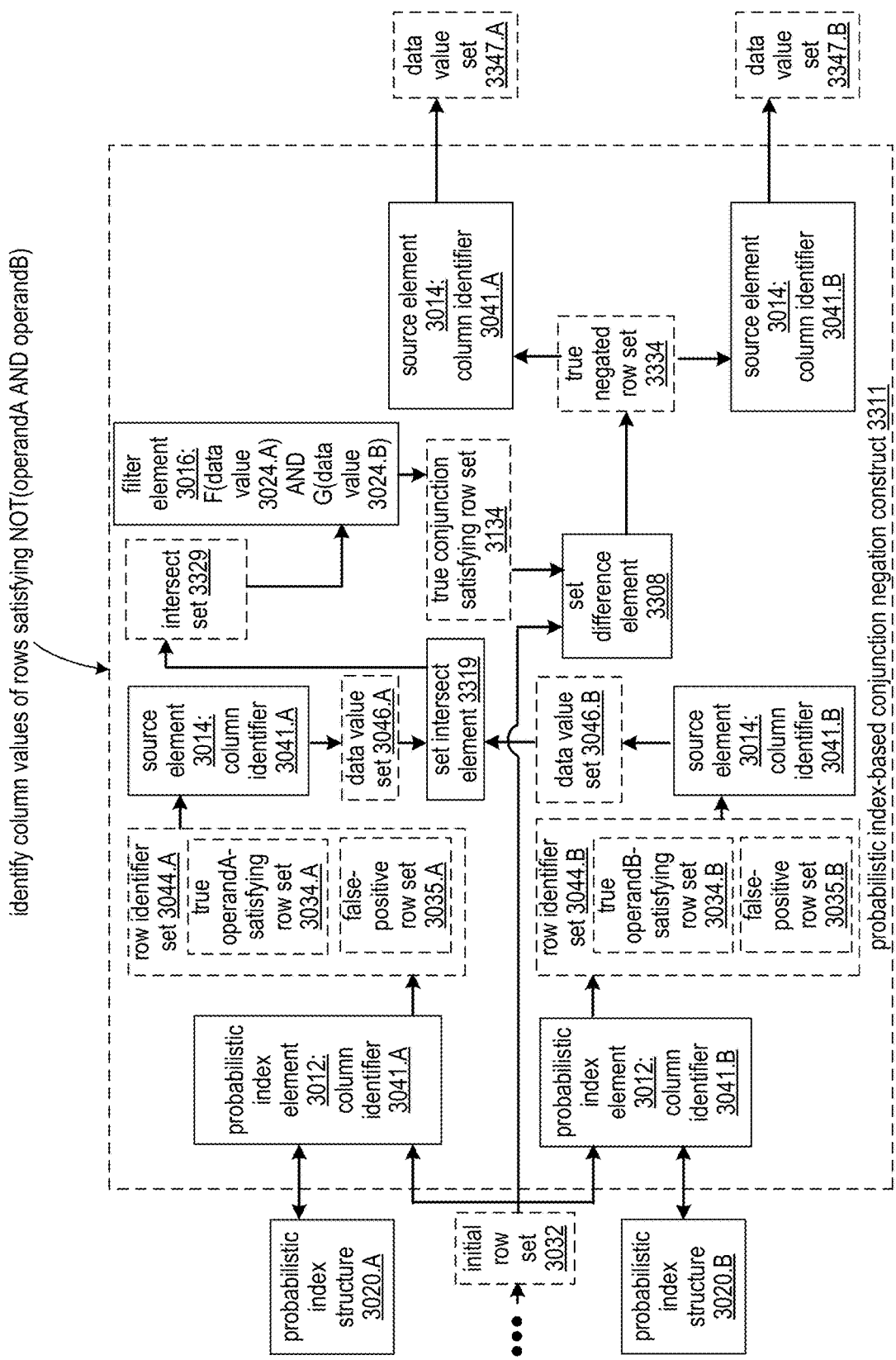
Figure 33D:
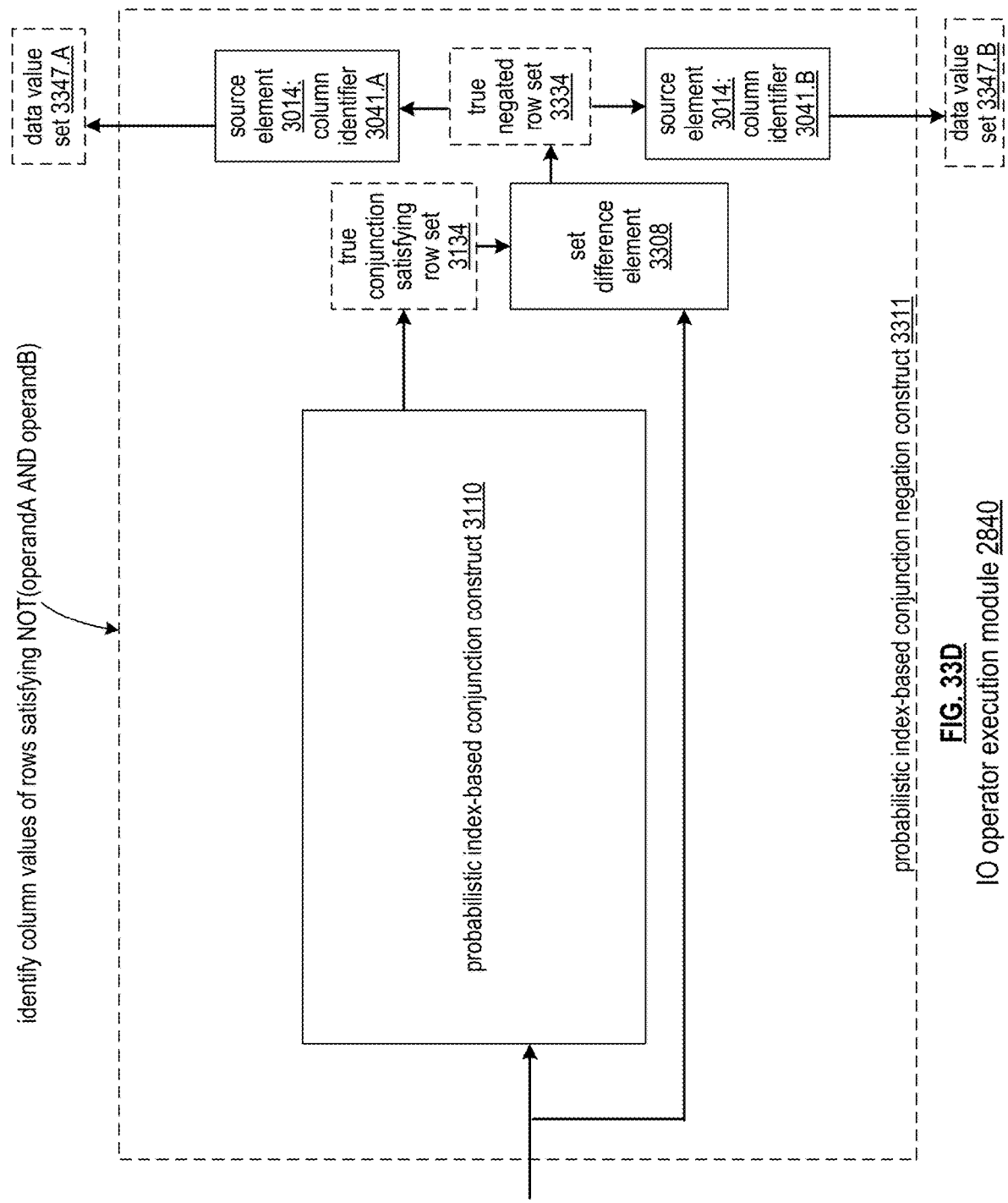
Figure 33F:
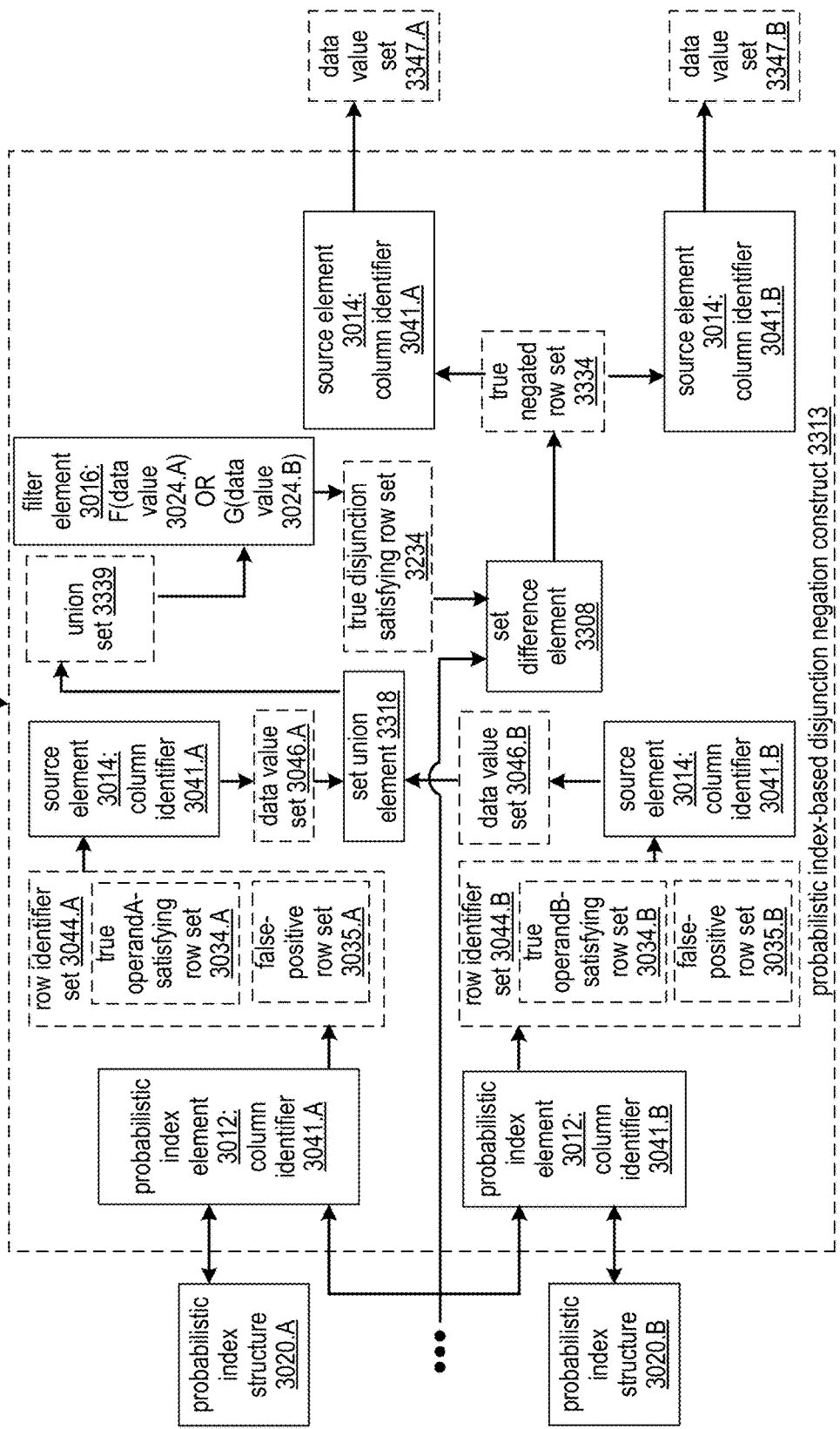
Figure 33G:
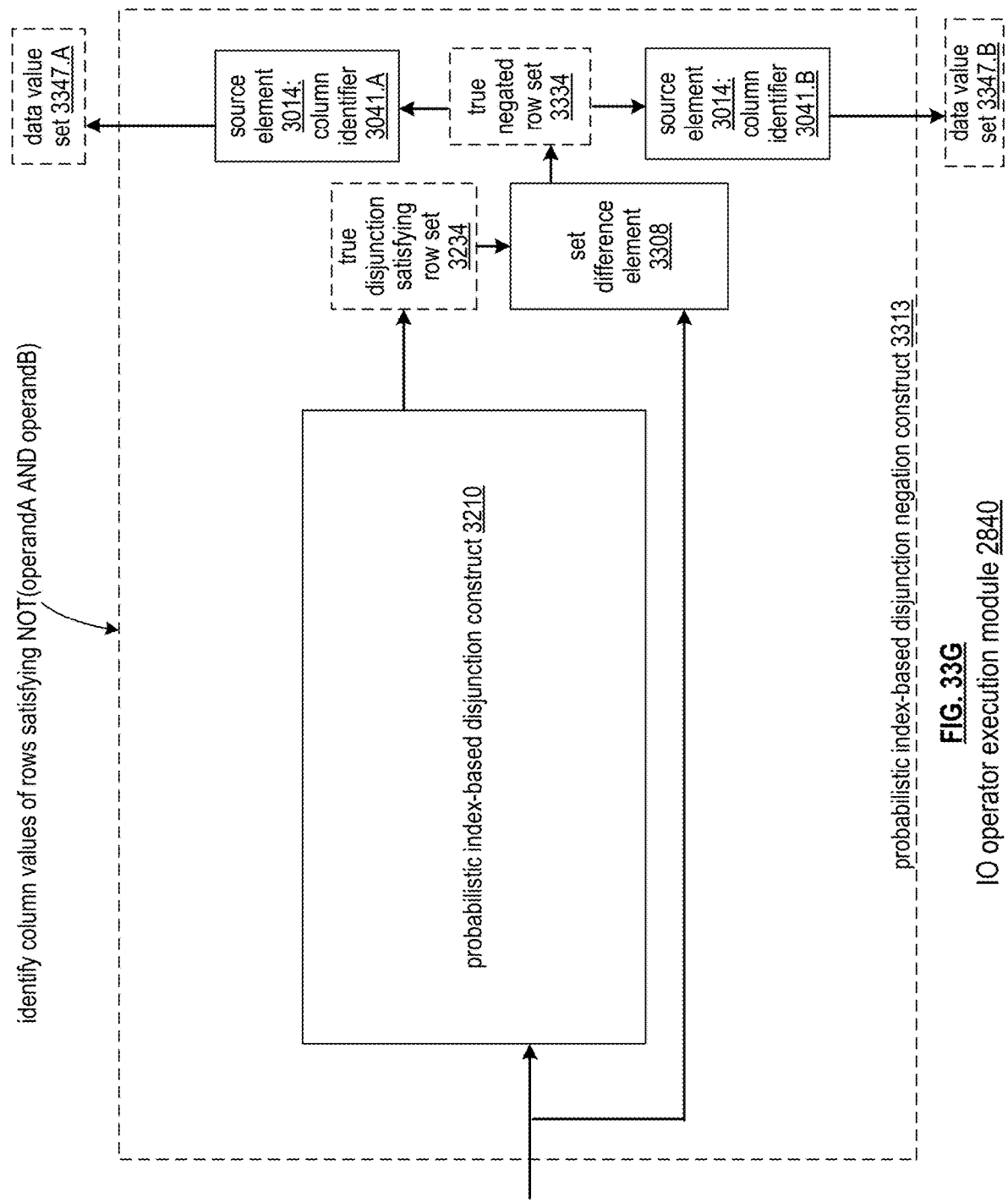
Figure 33H:
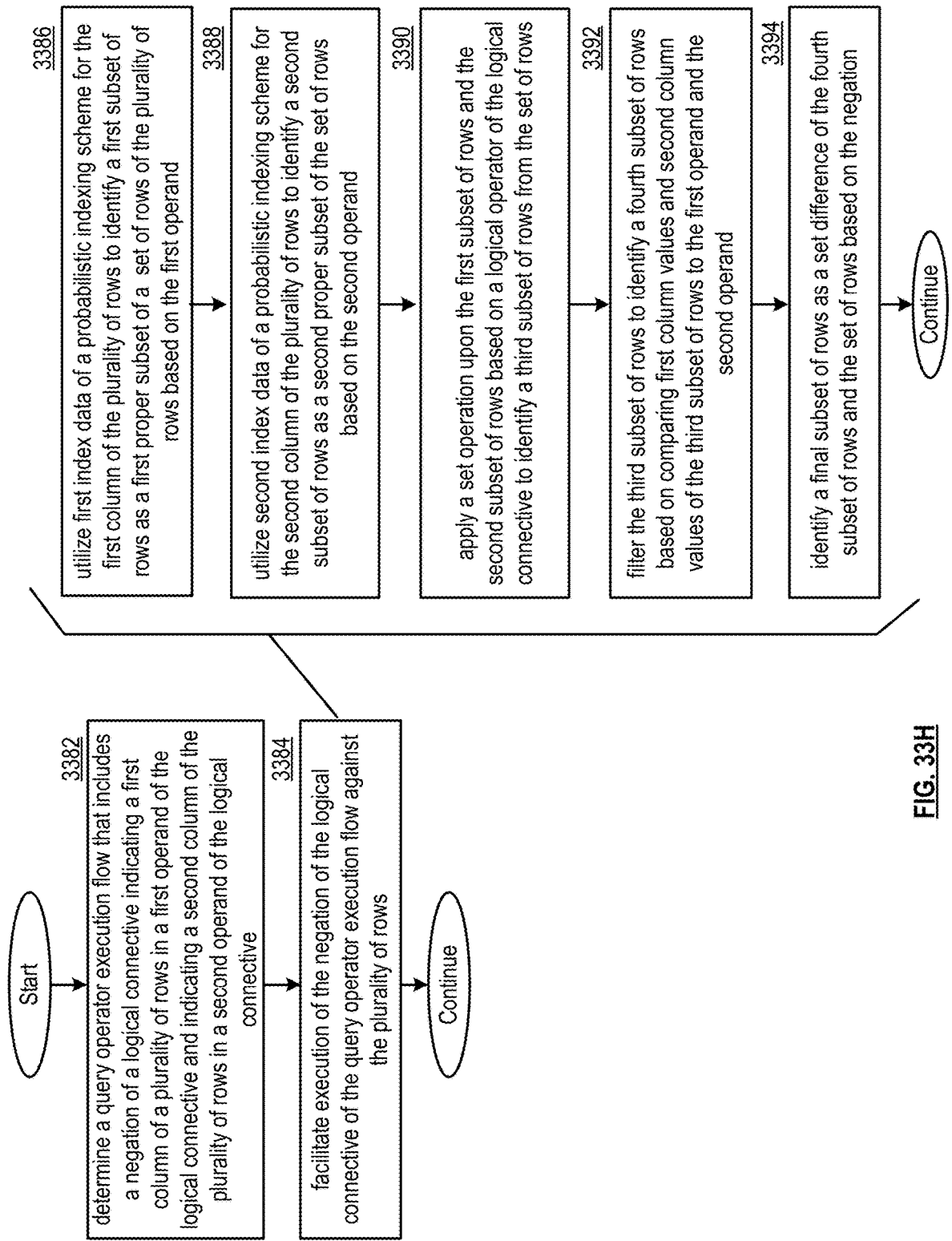
Figure 34A:
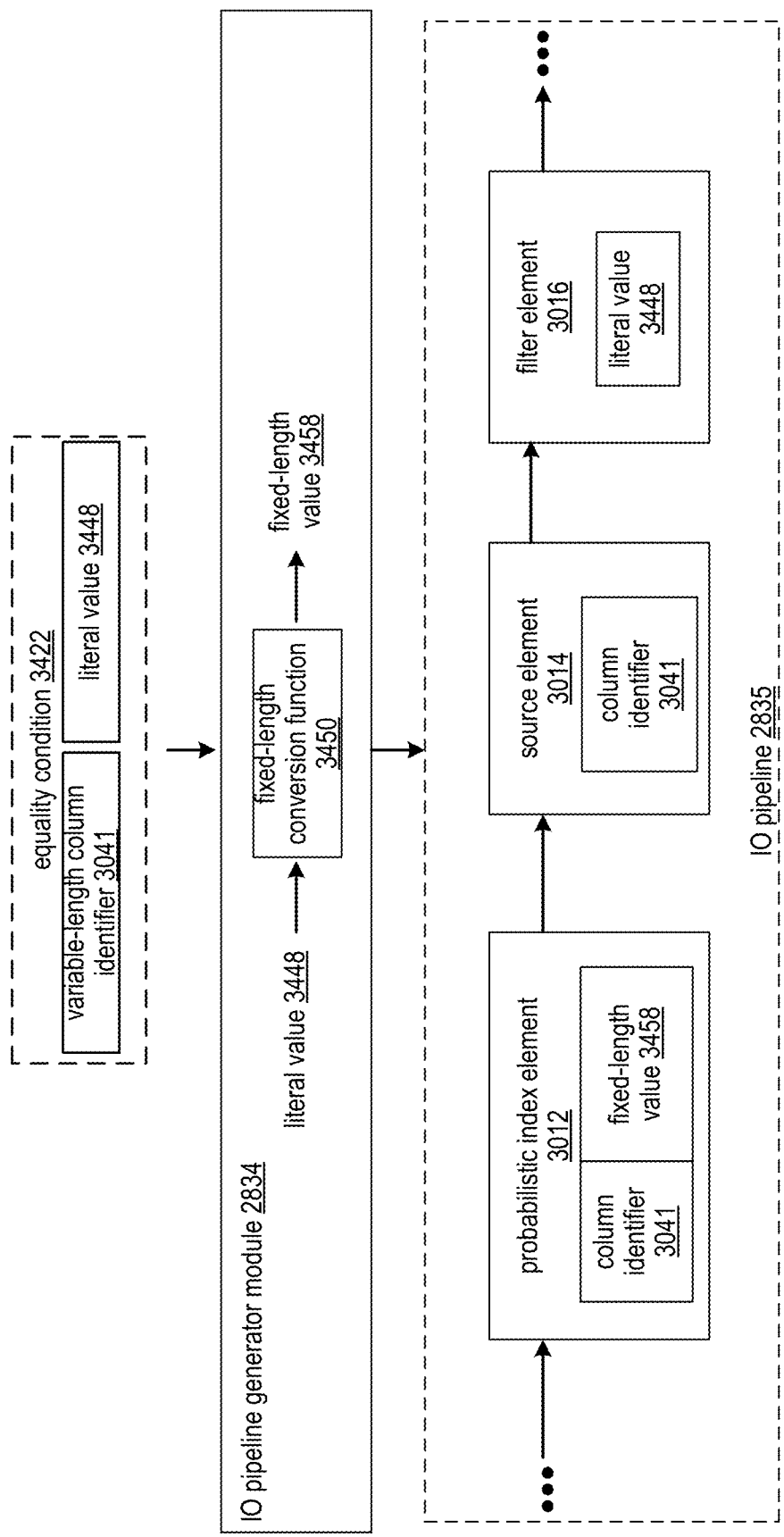
Figure 34B:
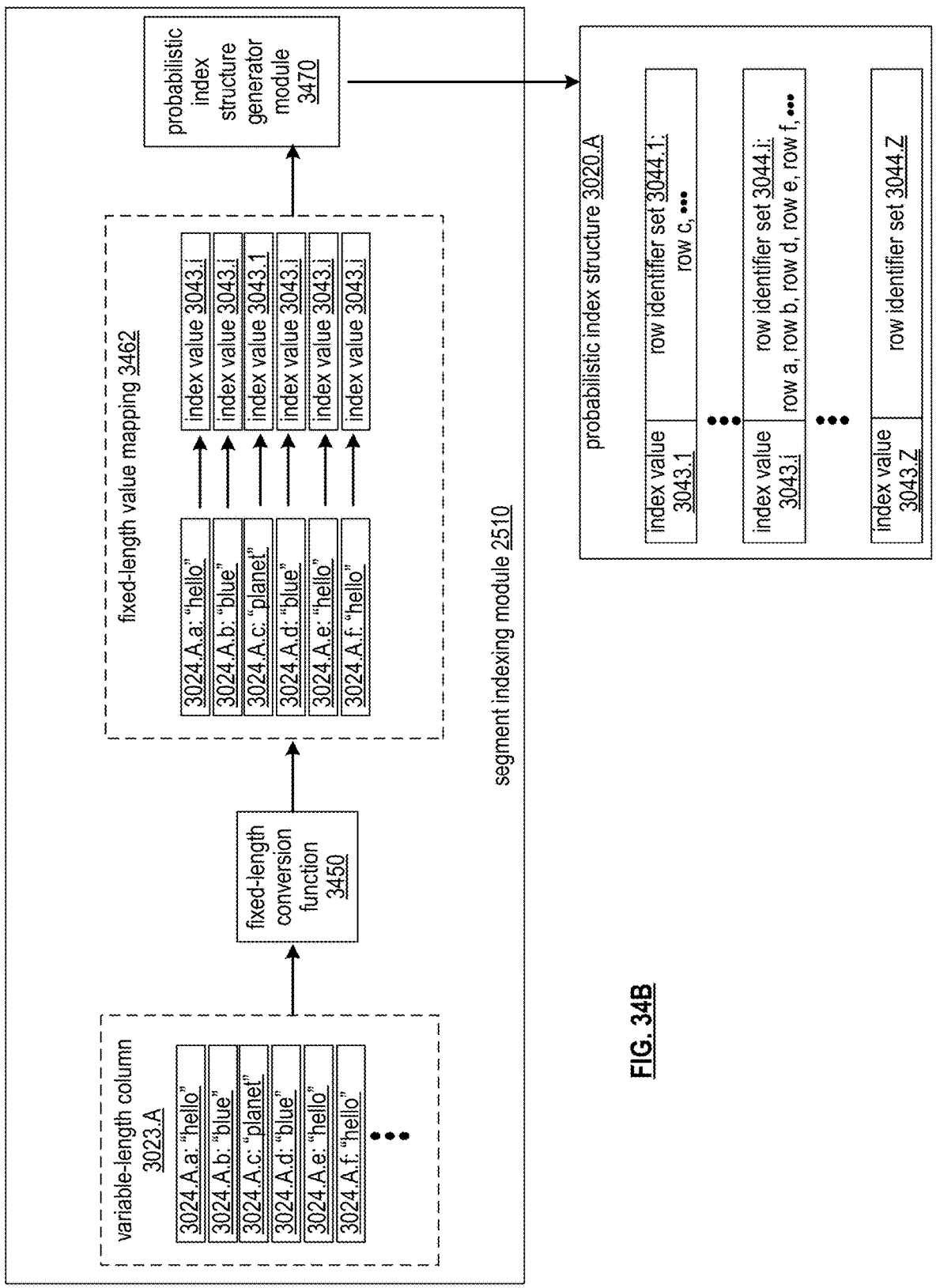
Figure 34D:
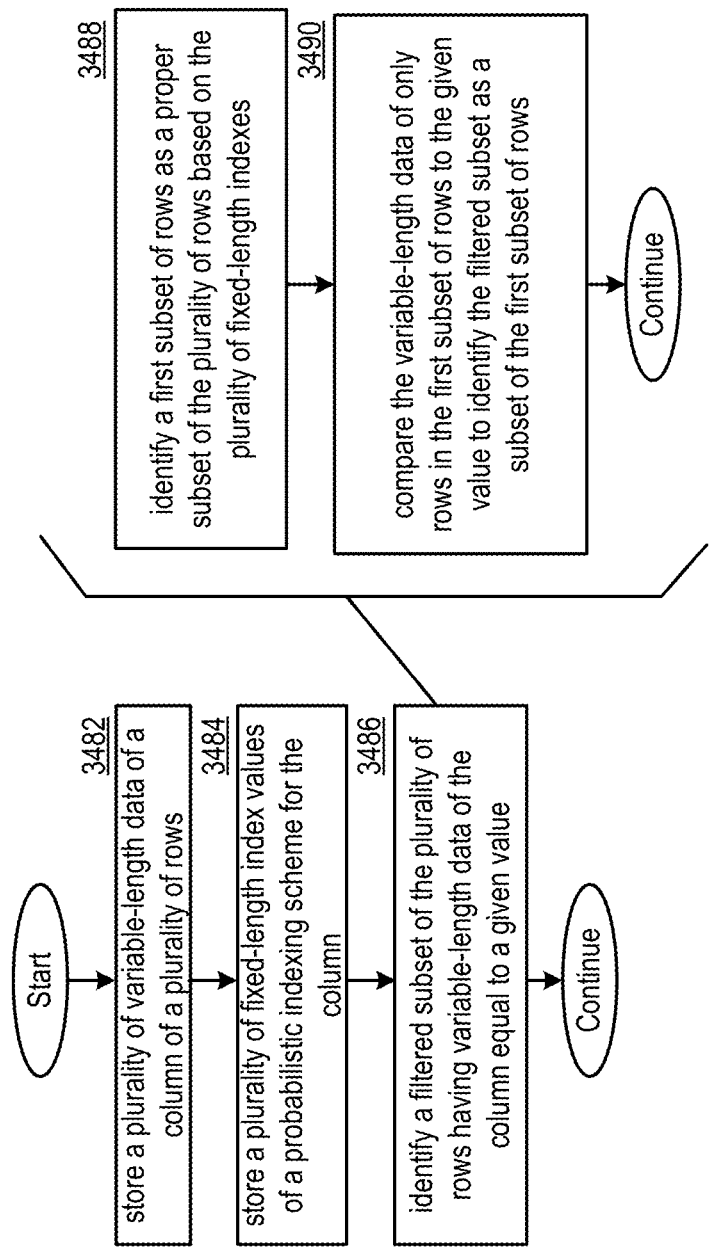
Figure 35A:
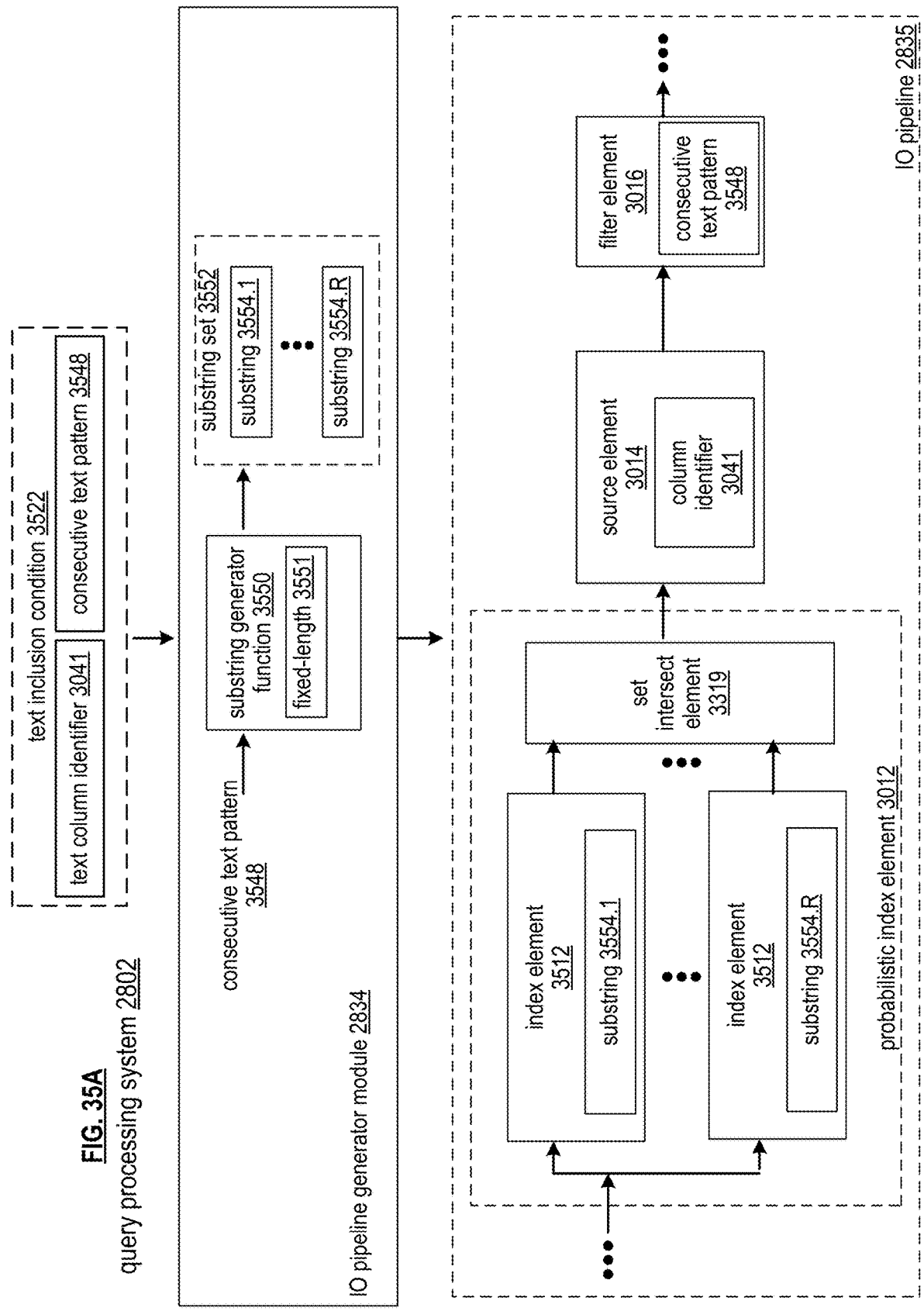
Figure 35B:
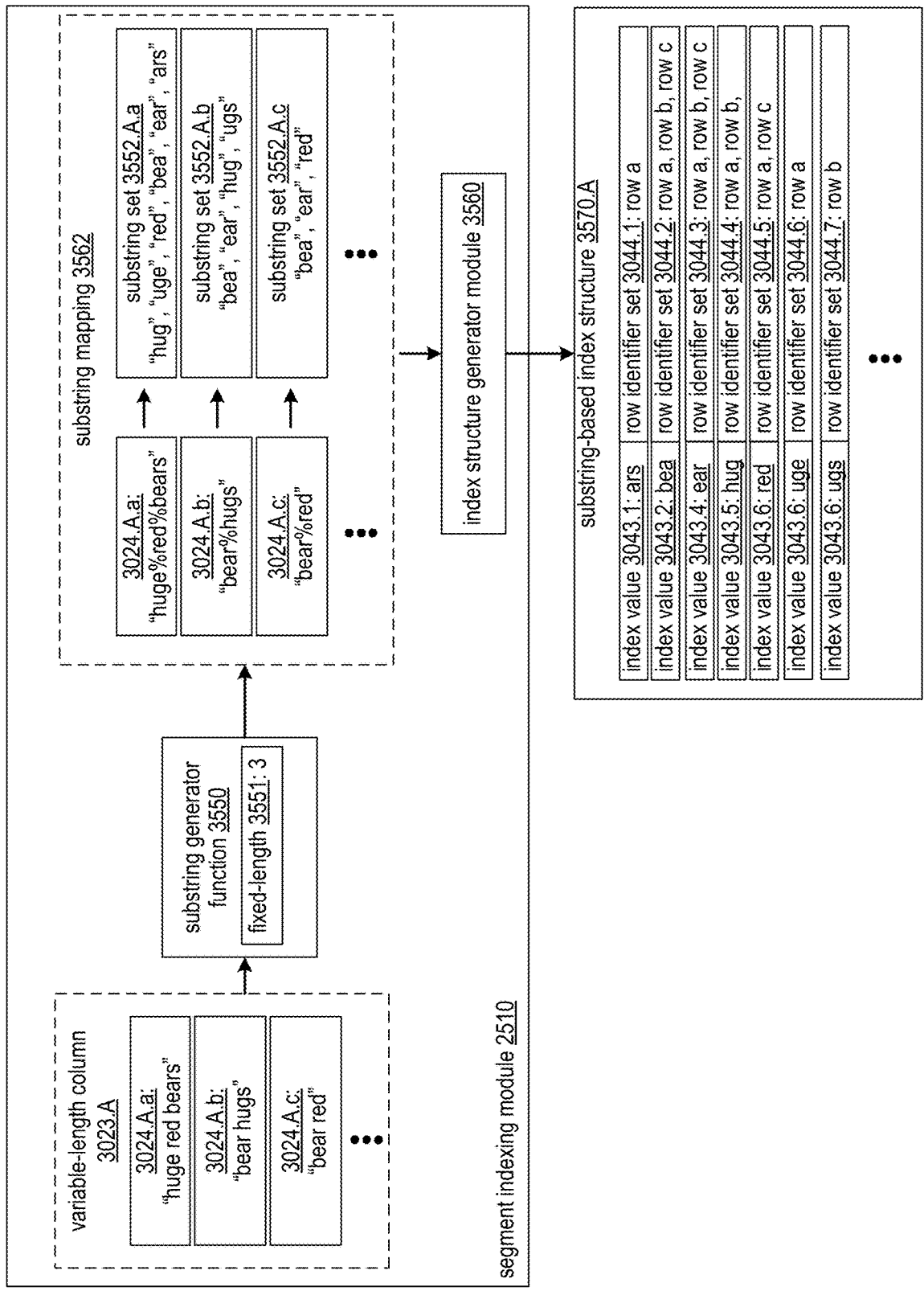
Figure 35C:
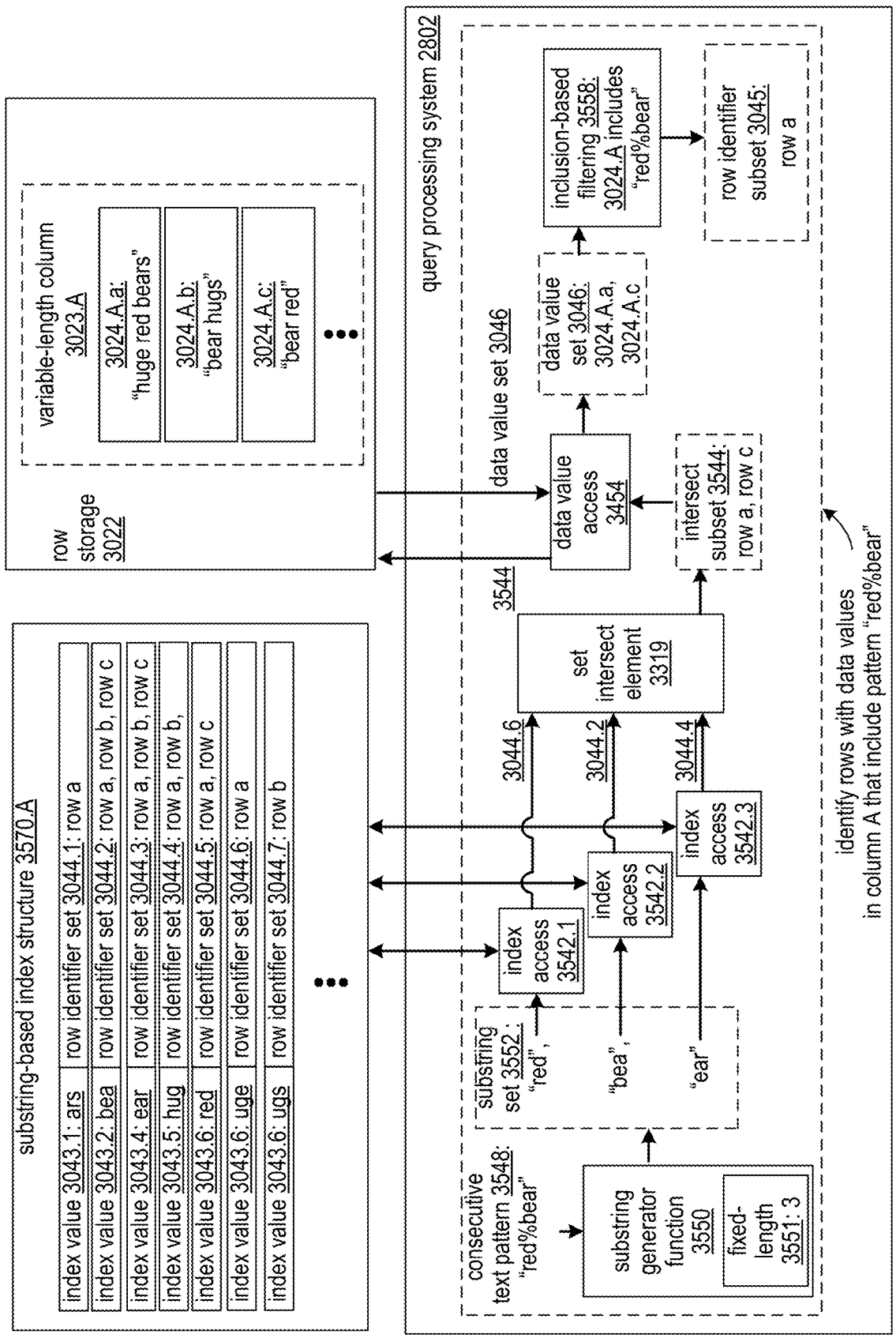
Figure 35D:
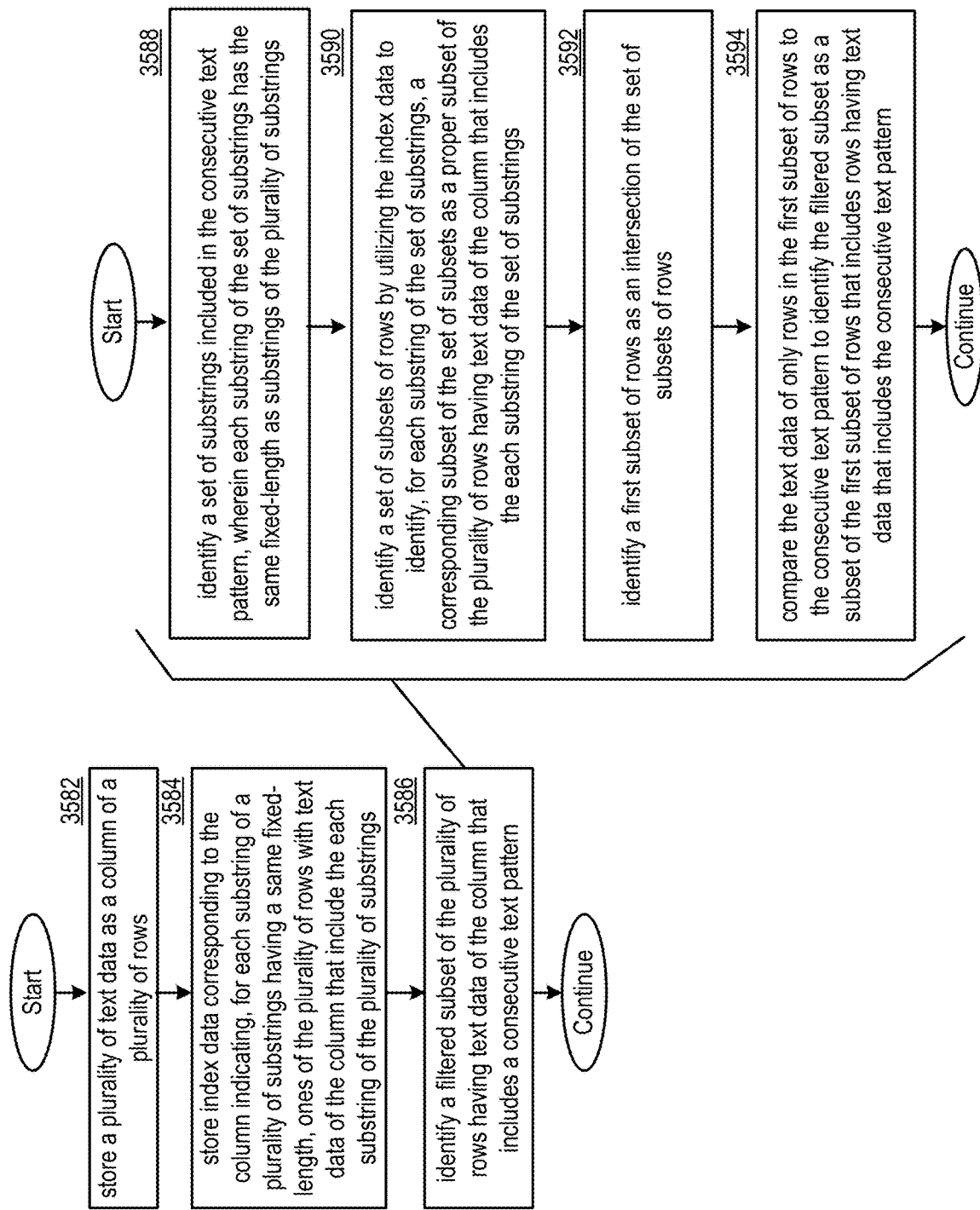
Figure 36A:
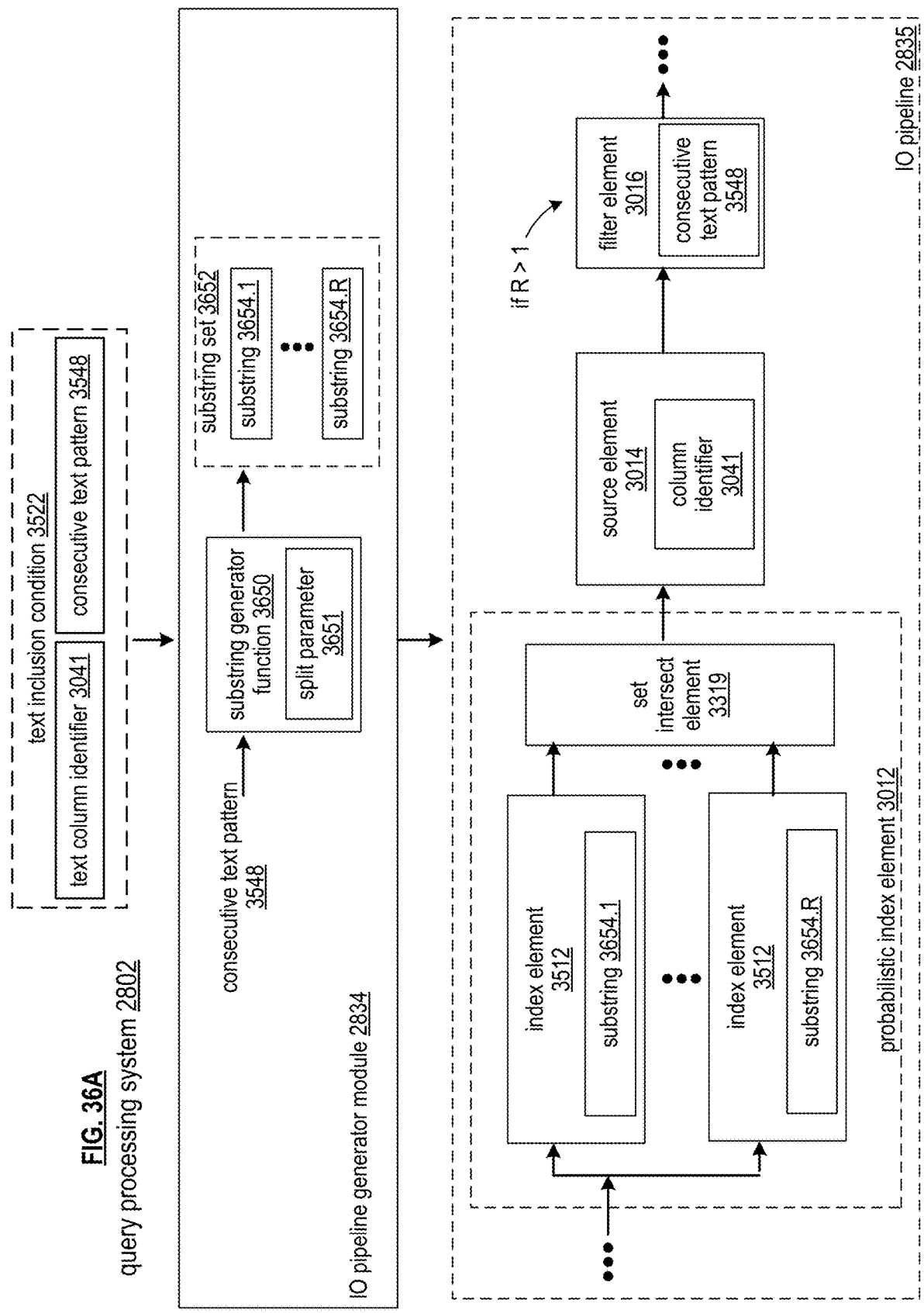
Figure 36B:
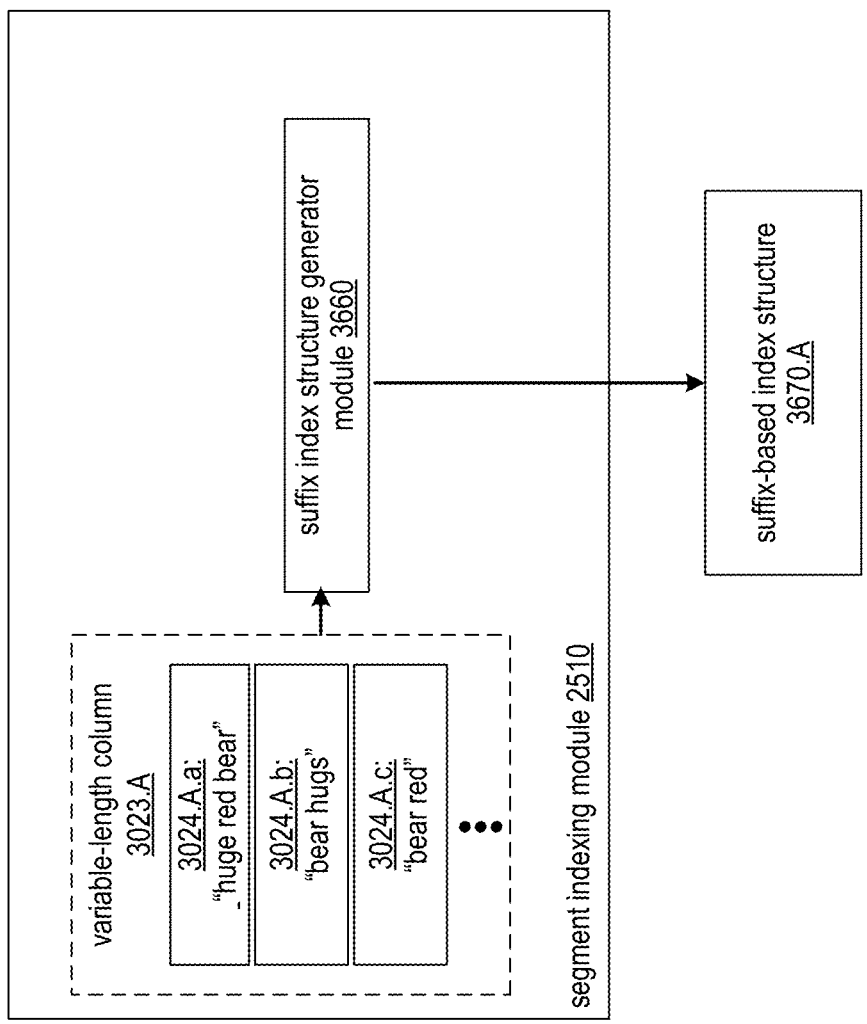
Figure 36C:
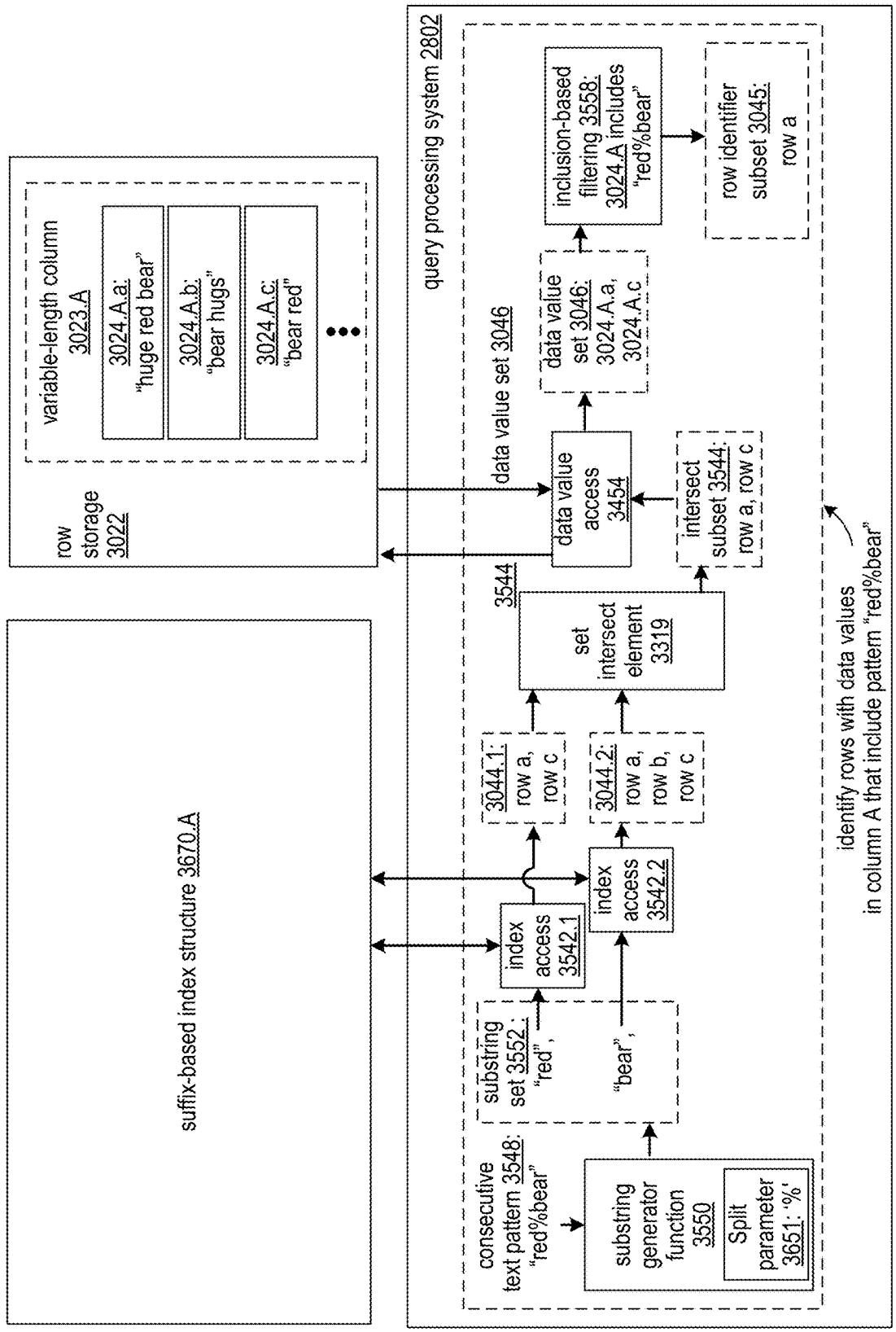
Figure 36D:
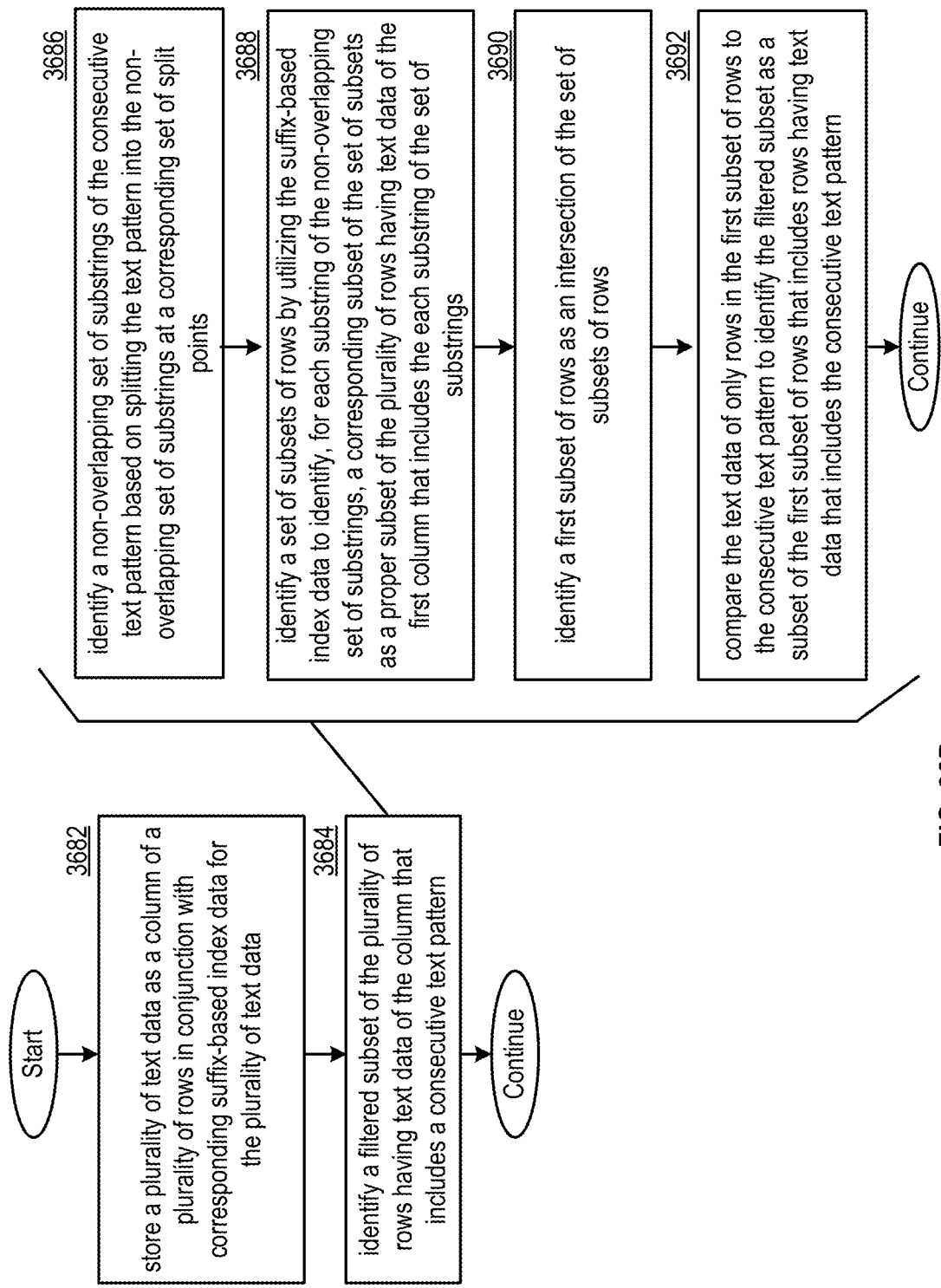
Figure 37A:
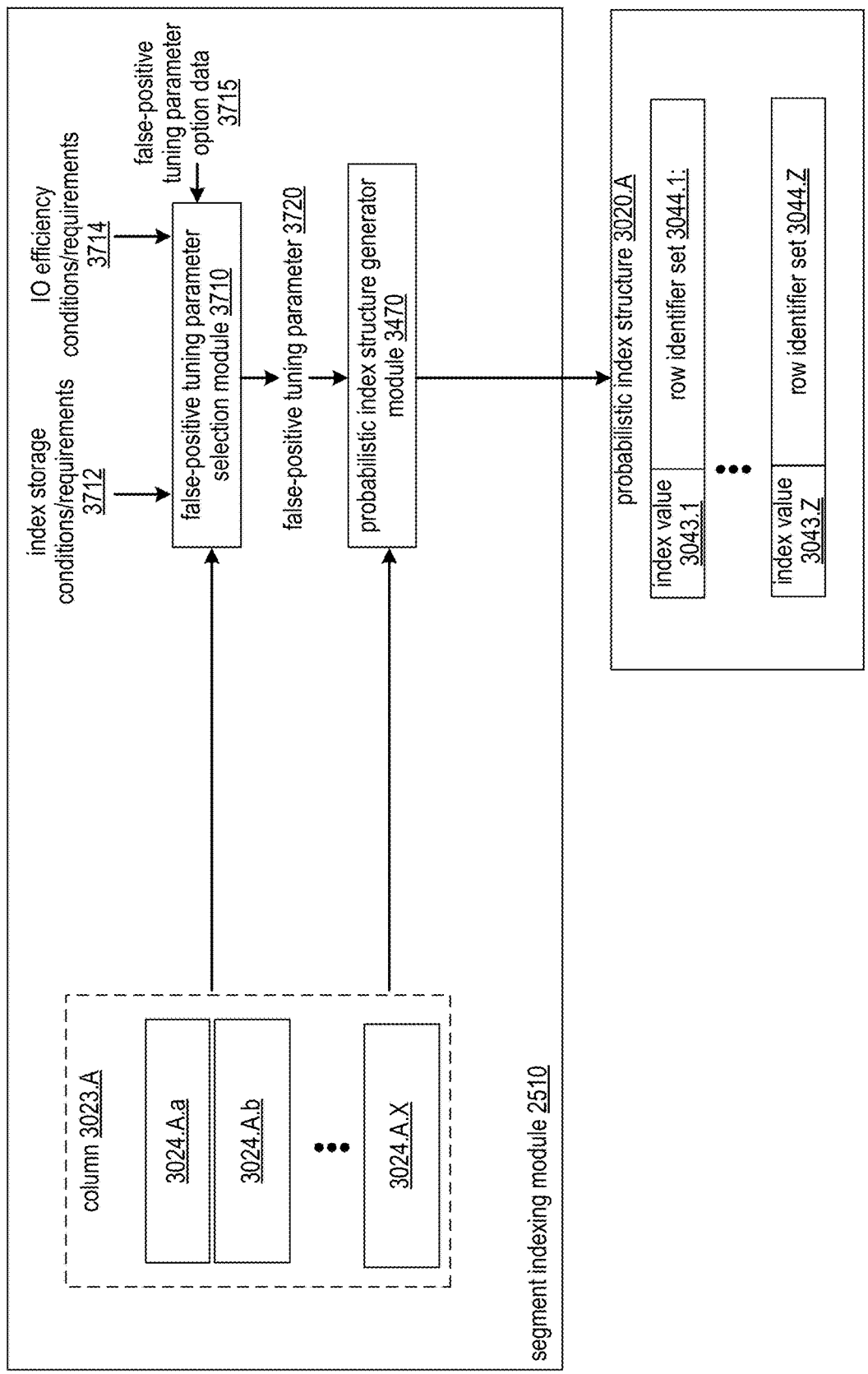
Figure 37B:
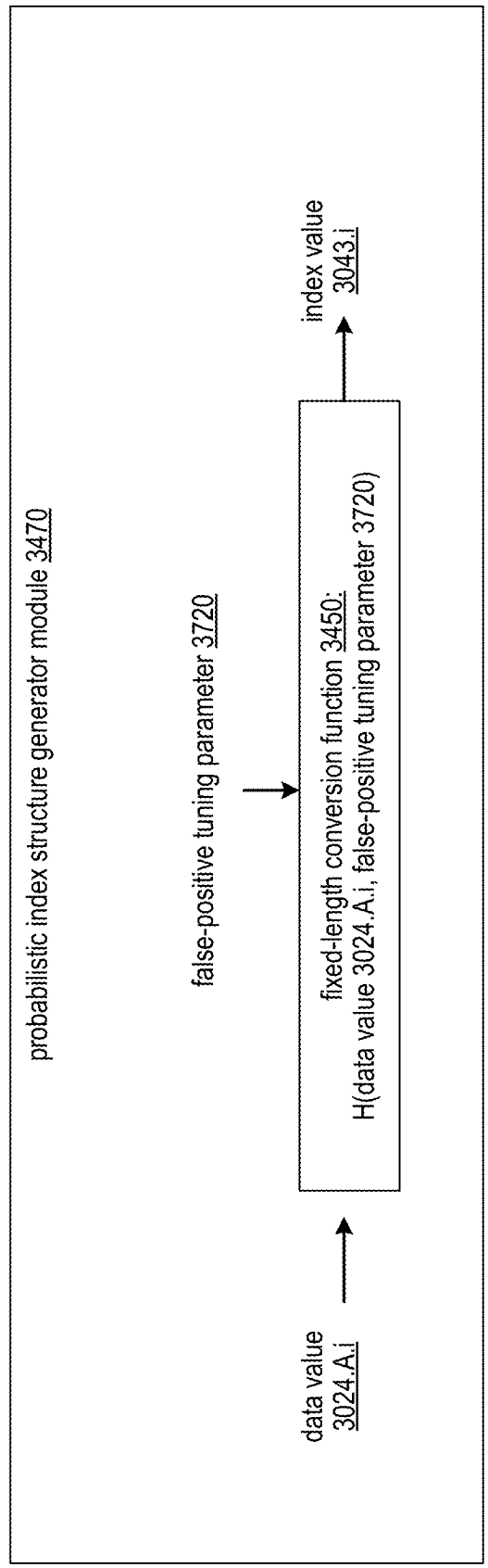
Figure 37C:
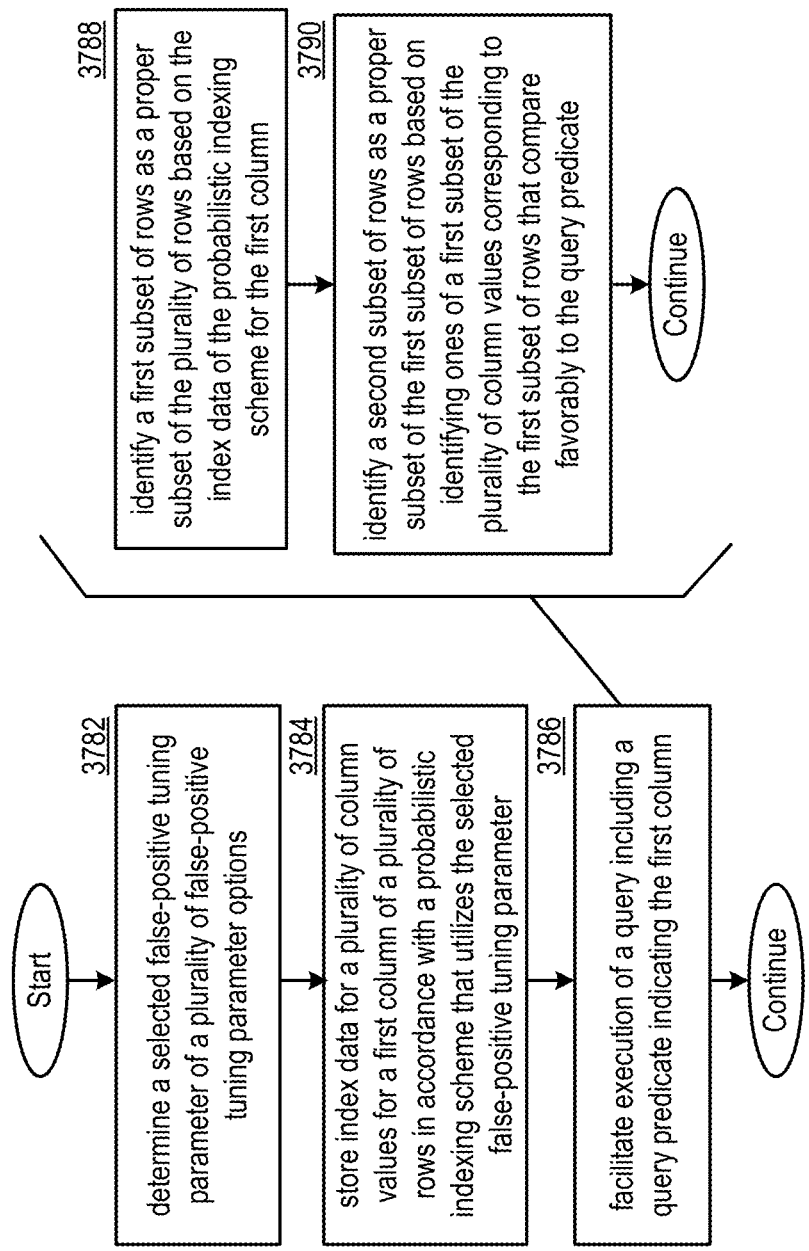
Figure 38A:
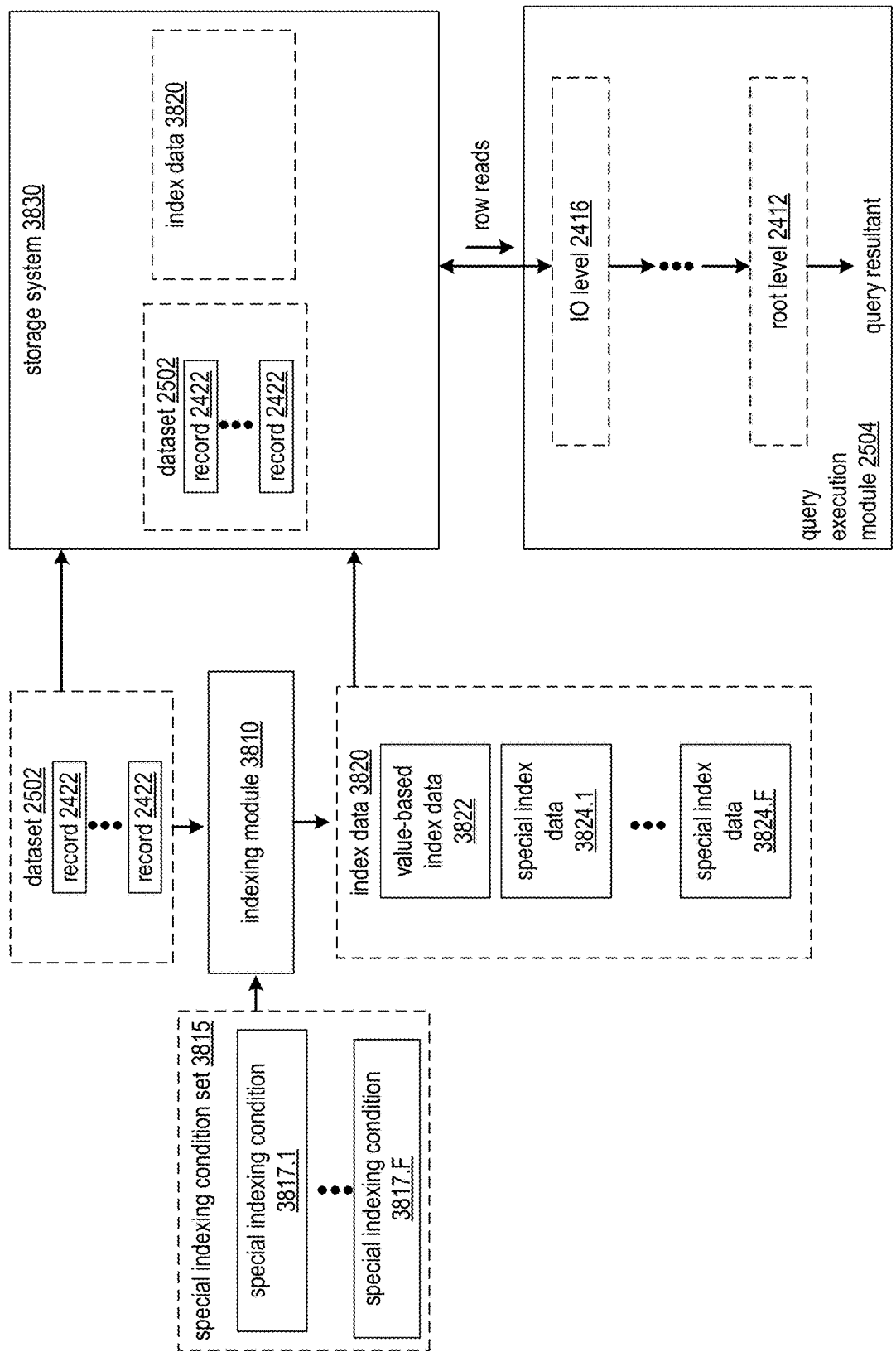
Figure 38C:
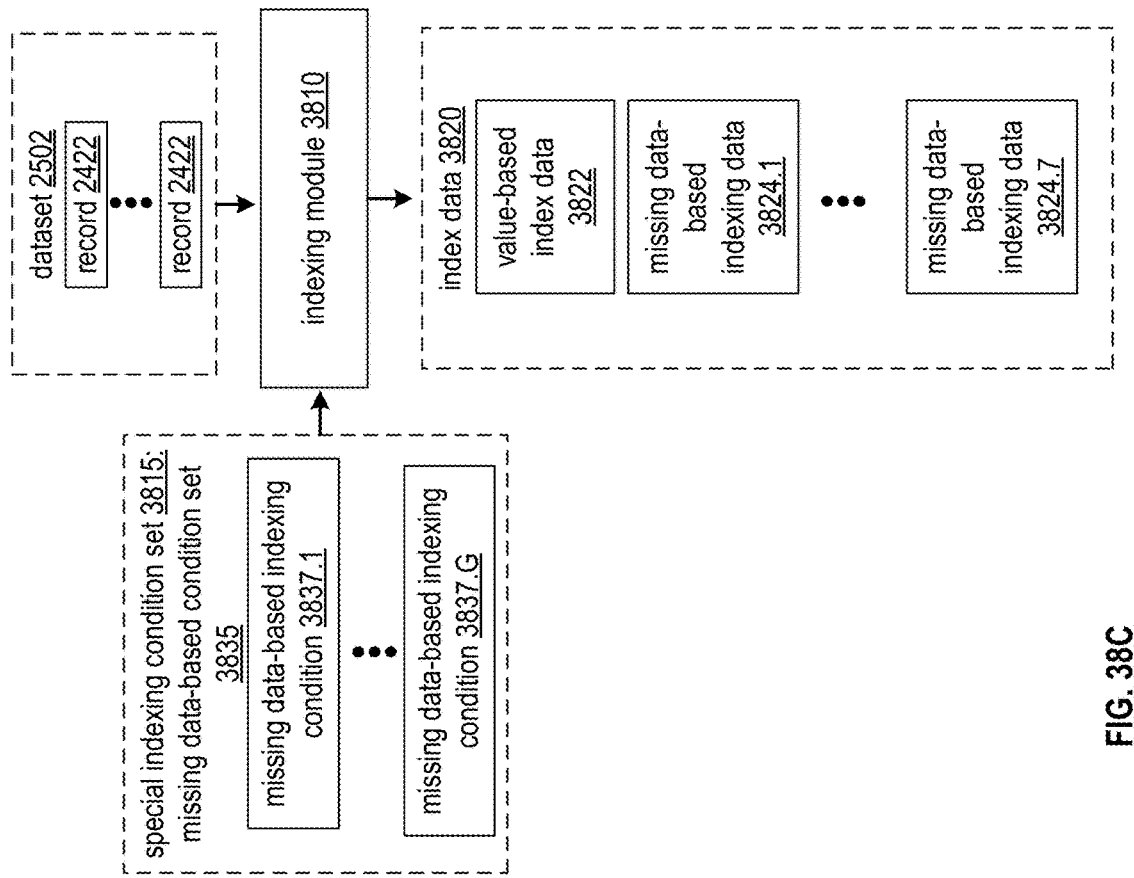
Figure 38D:
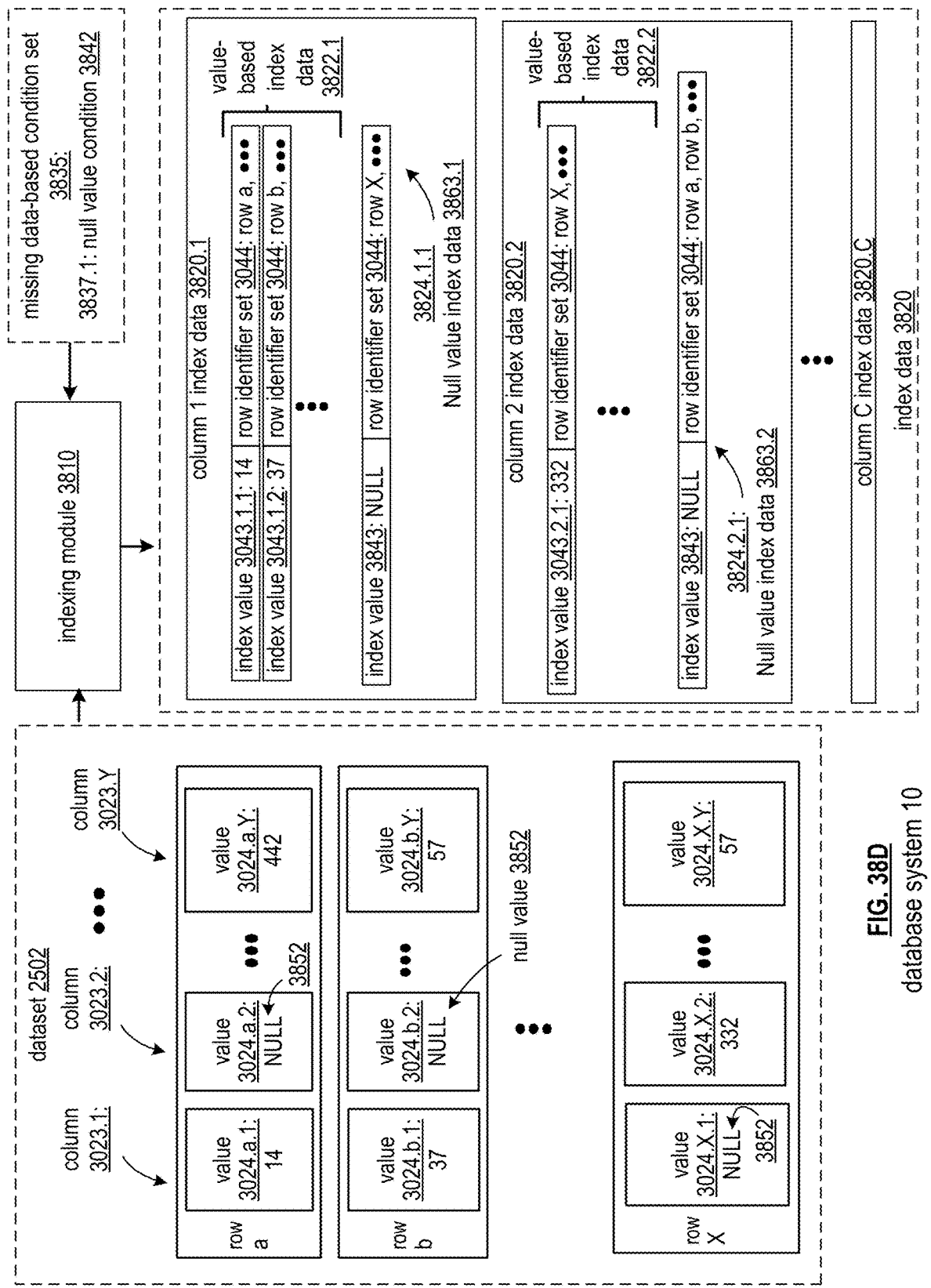
Figure 38E:
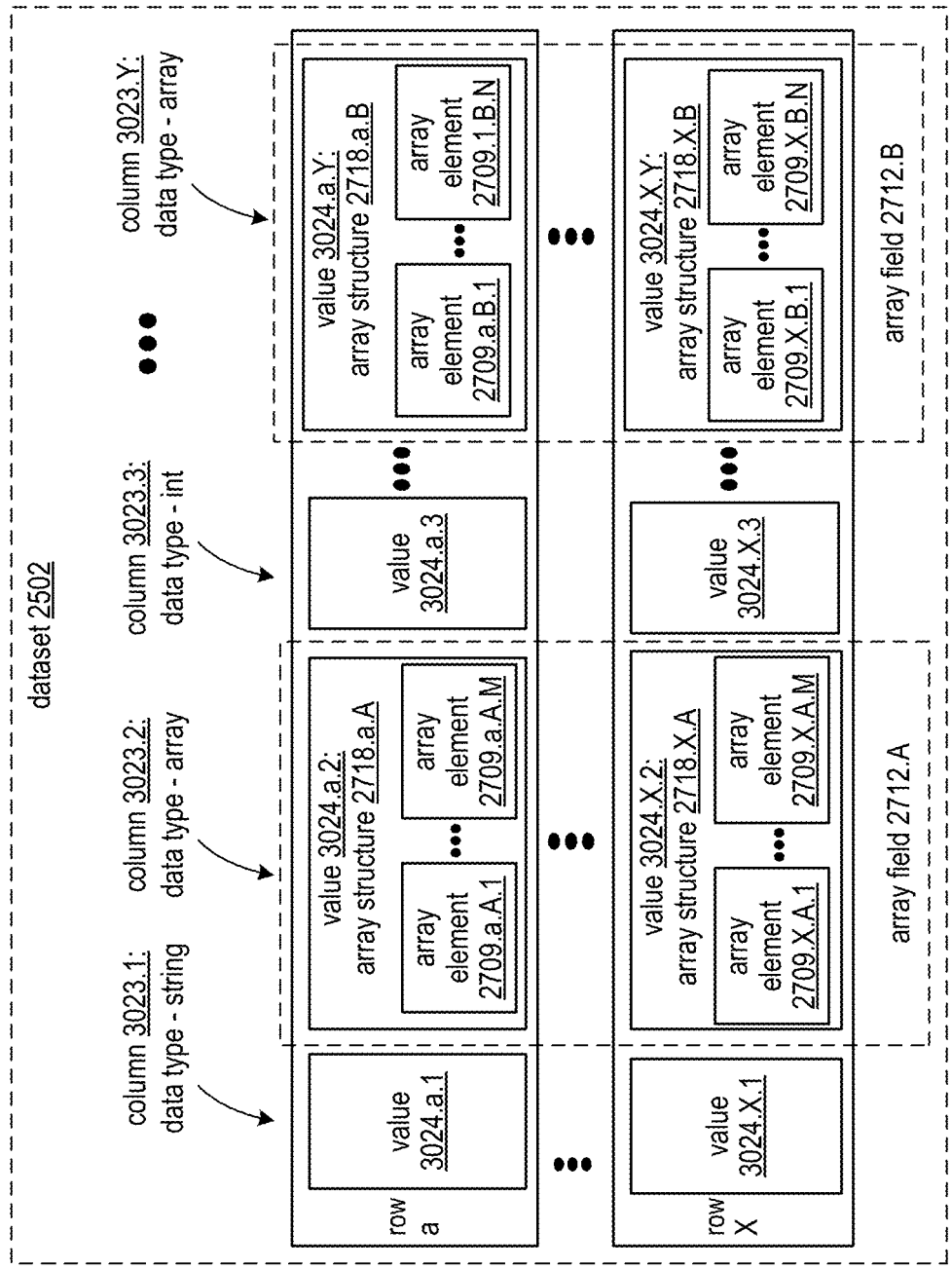
Figure 38F:
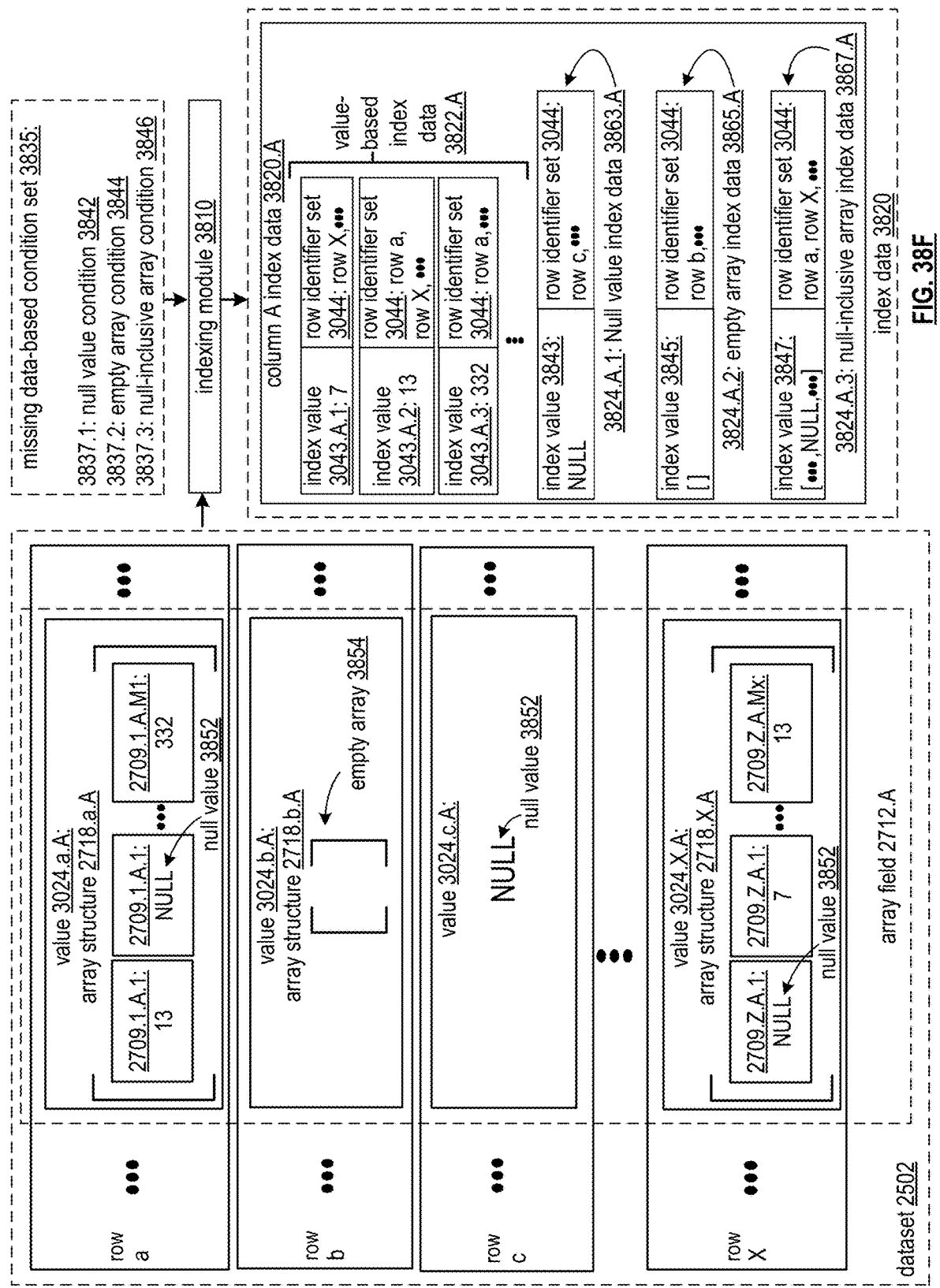
Figure 38G:
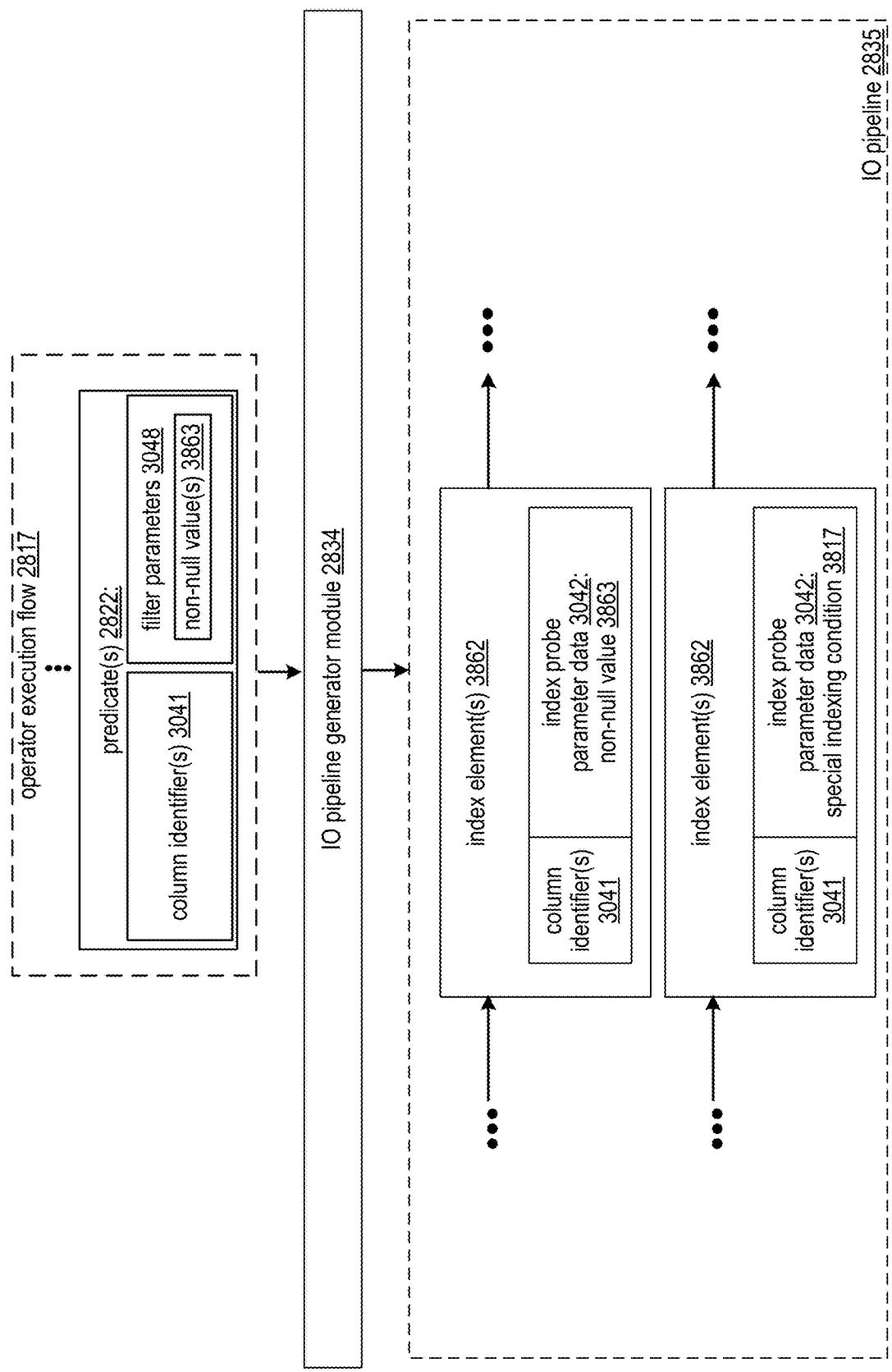
Figure 38H:
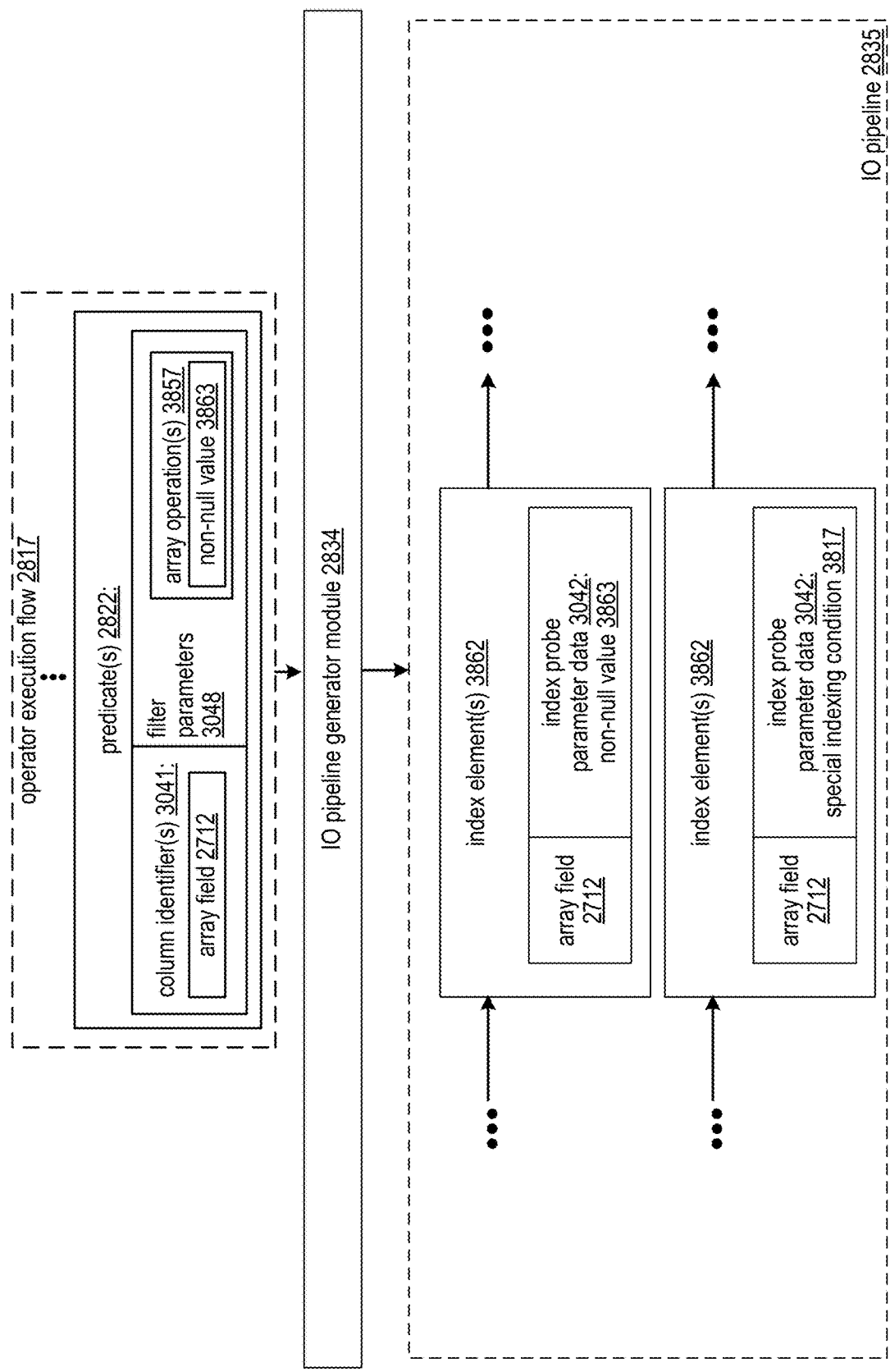
Figure 38I:
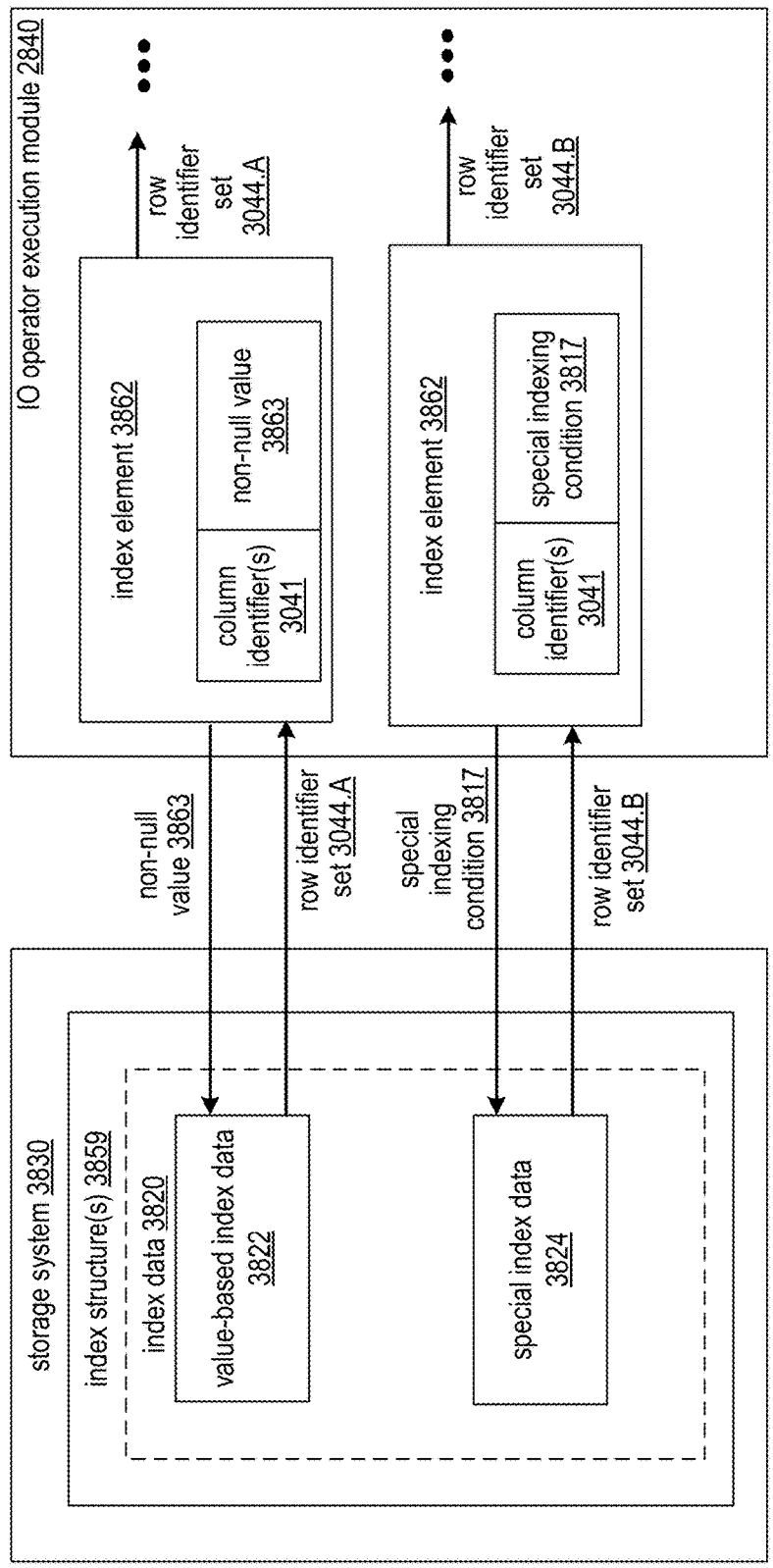
Figure 38J:
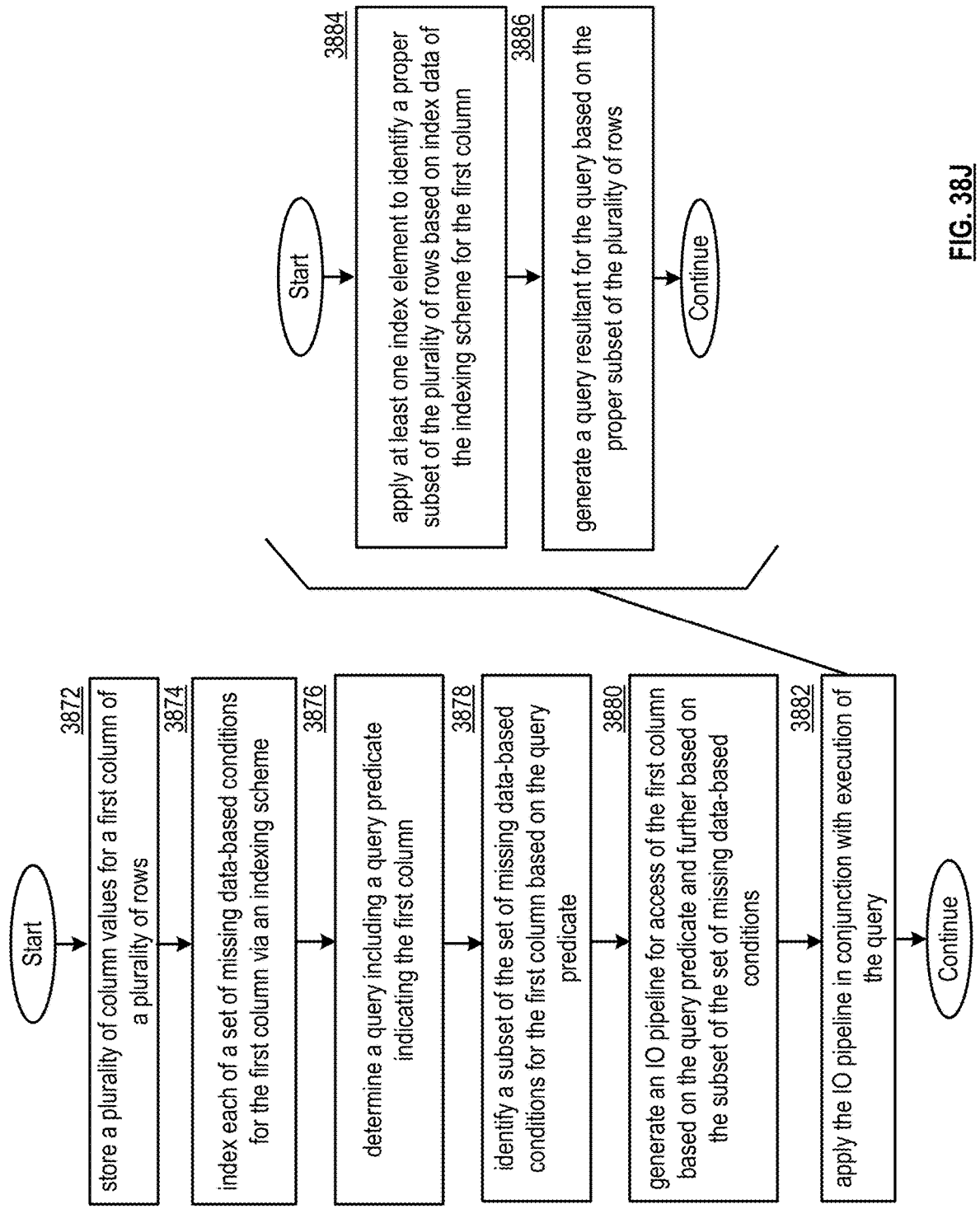
Figure 38K:
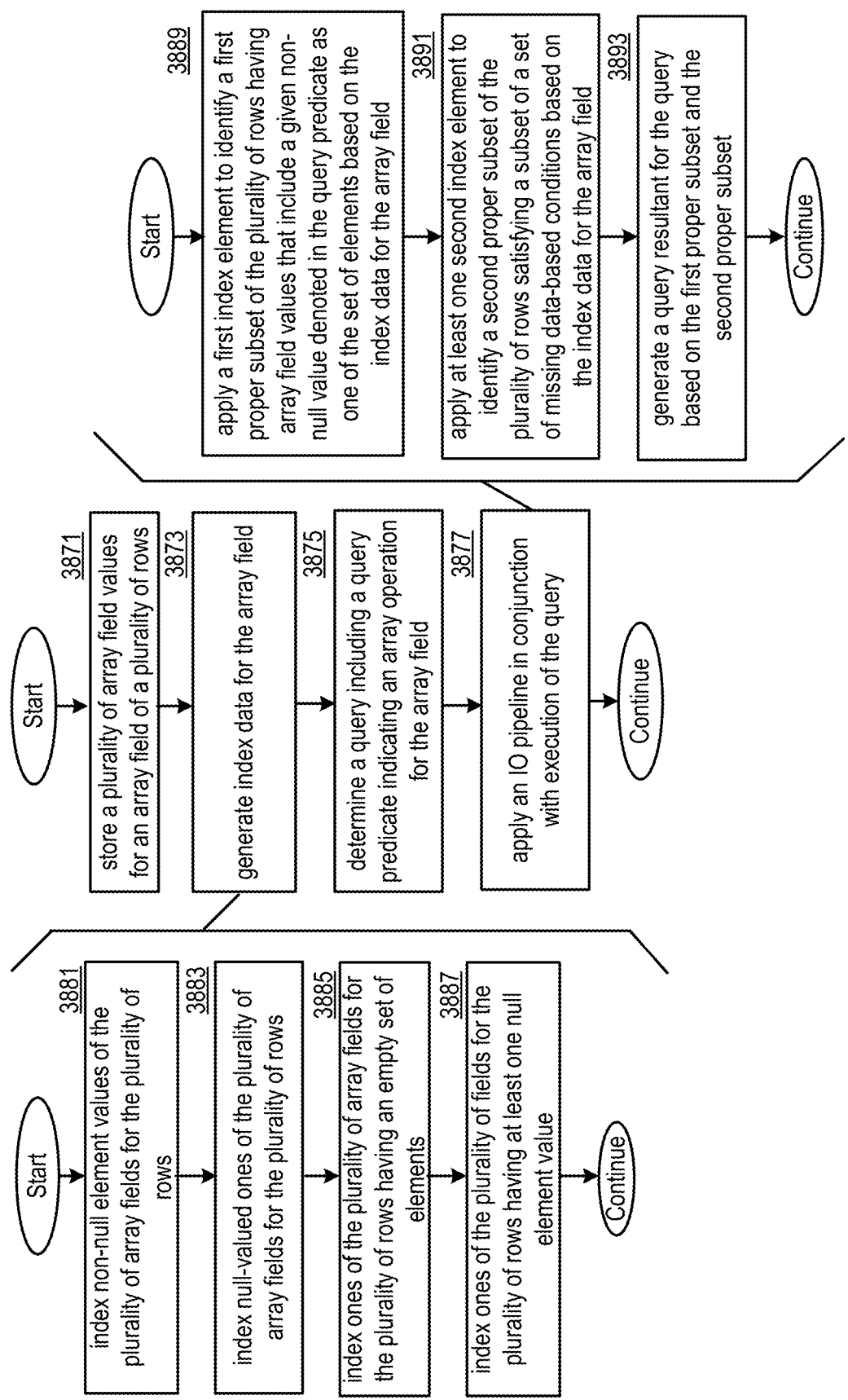
Figure 39A:
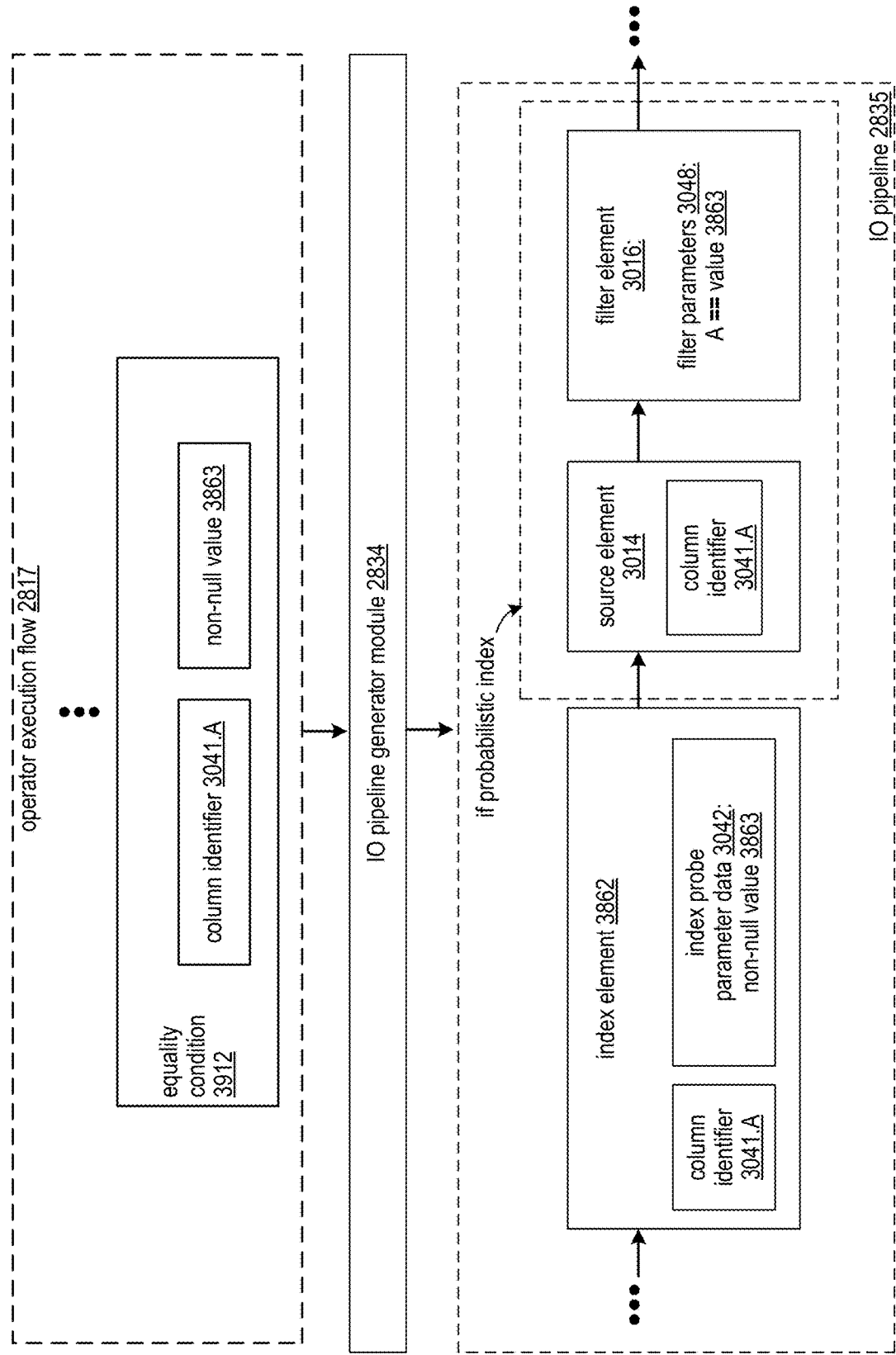
Figure 39B:
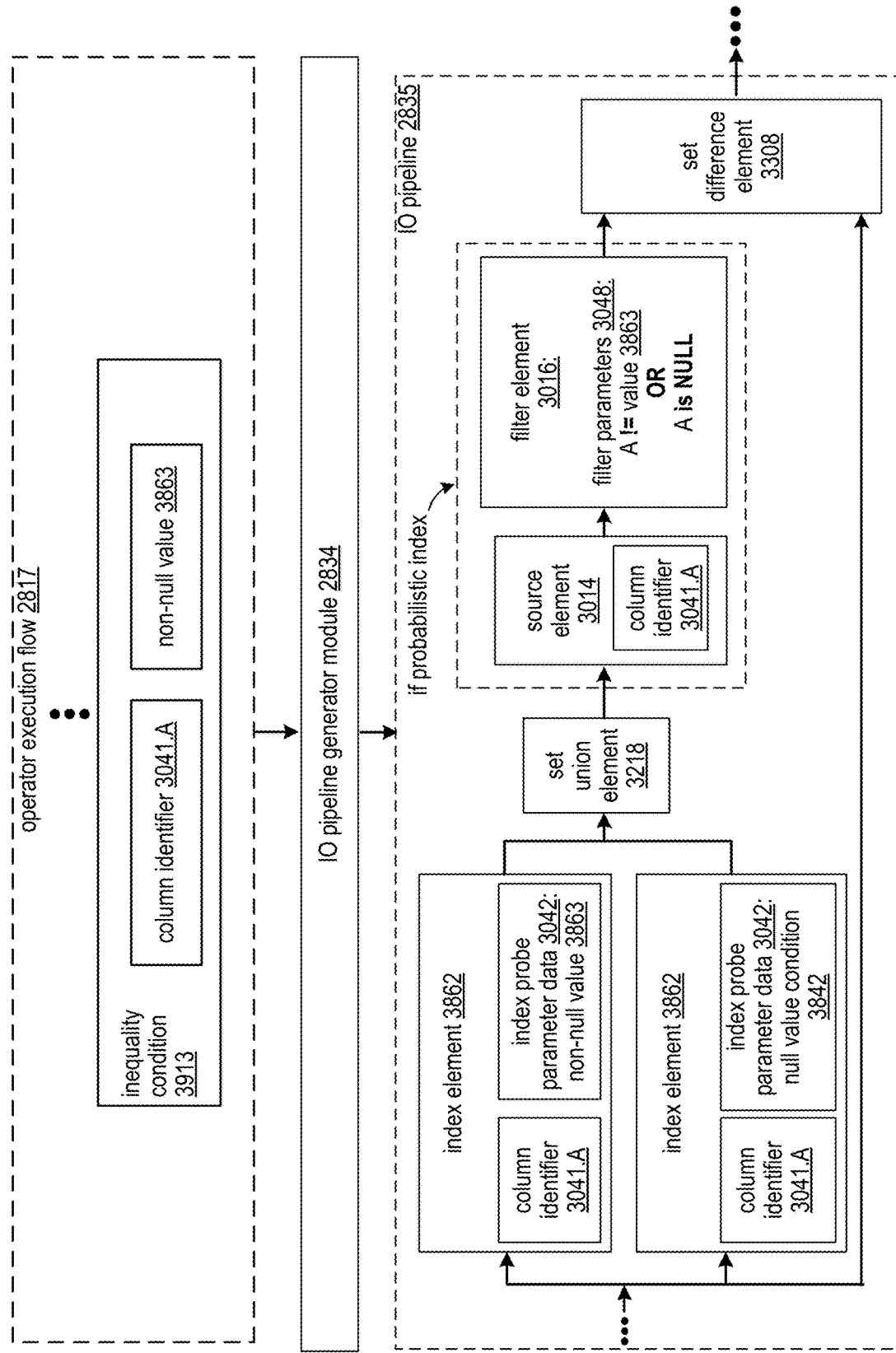
Figure 39D:
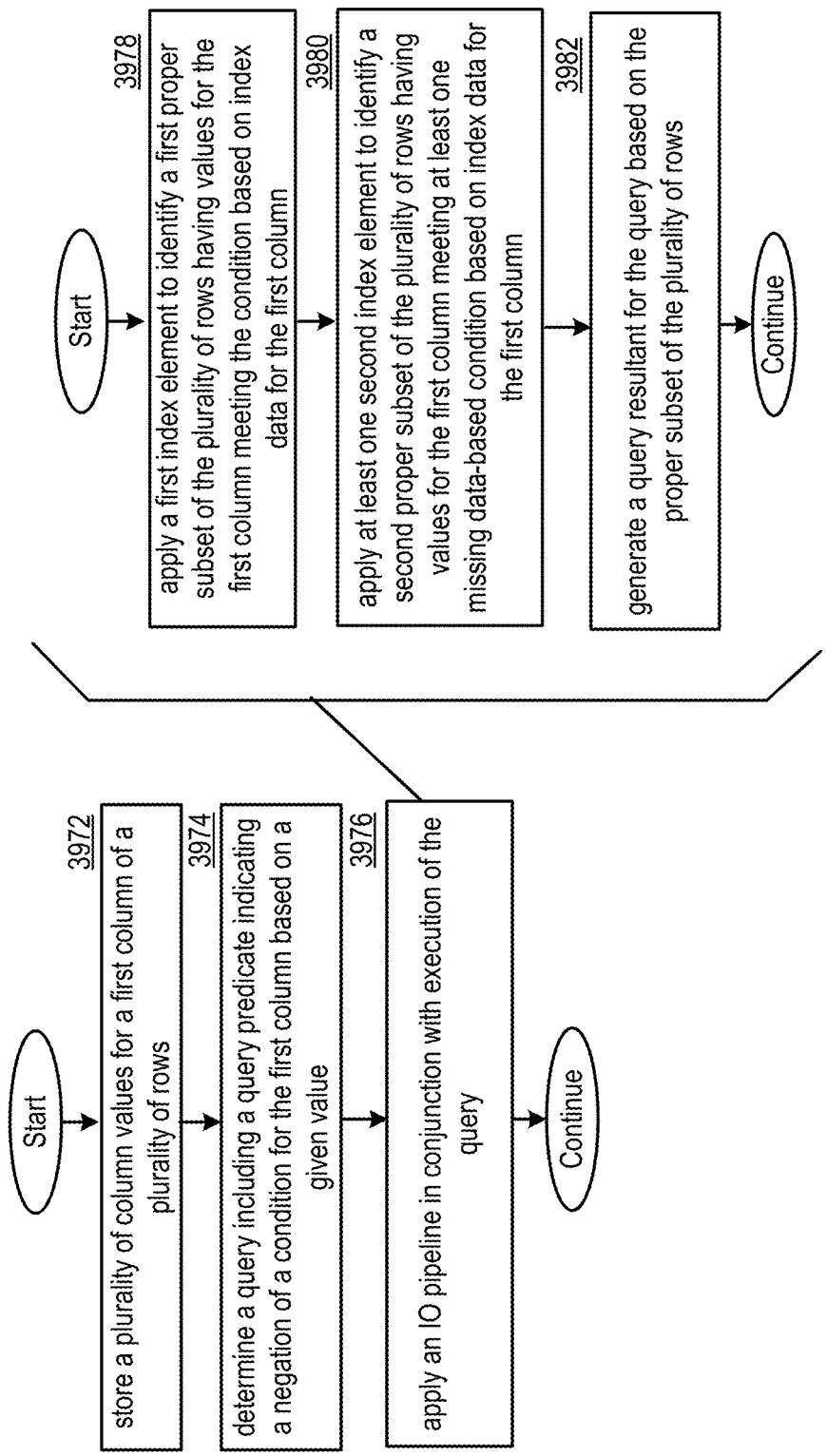
Figure 40A:
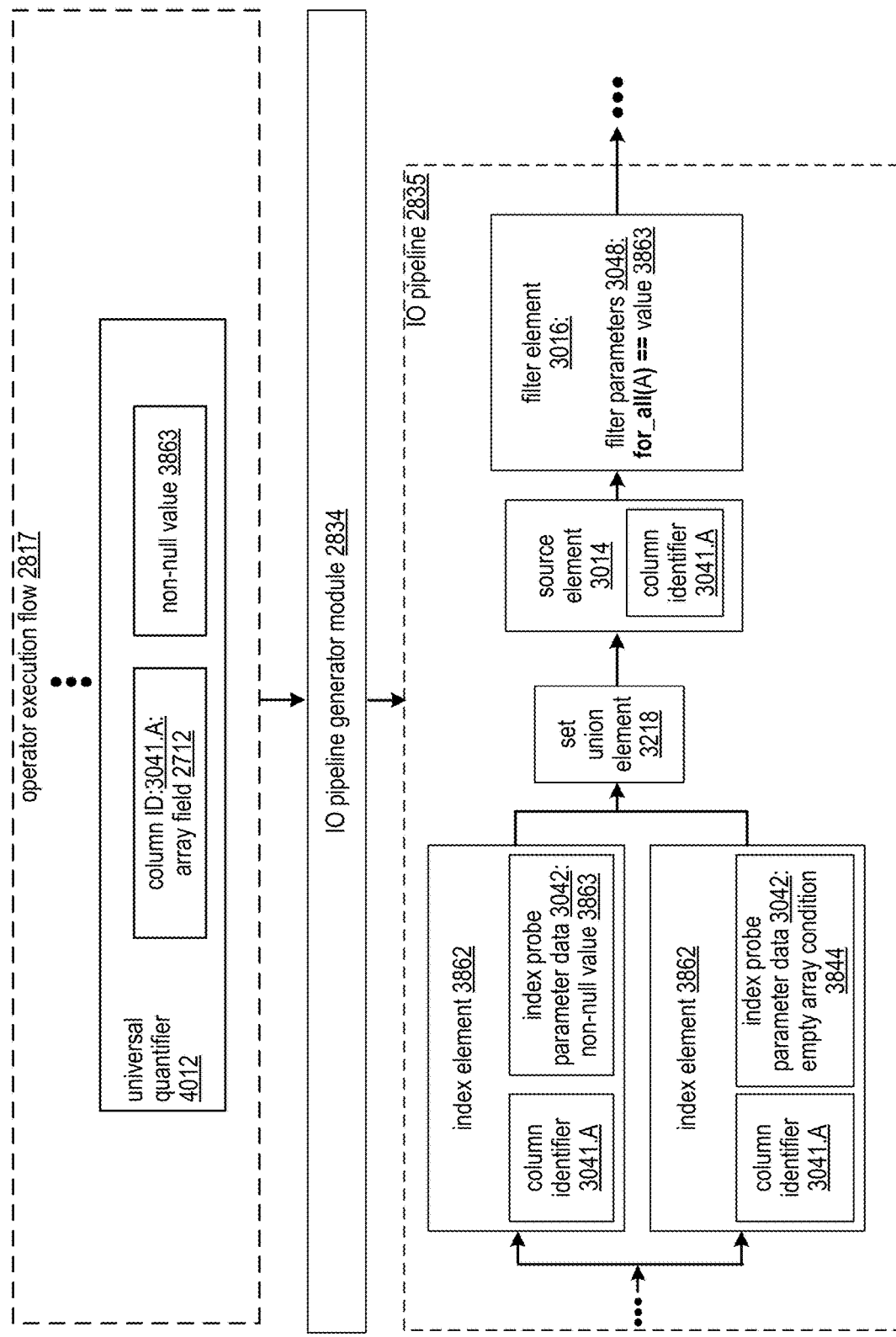
Figure 40B:
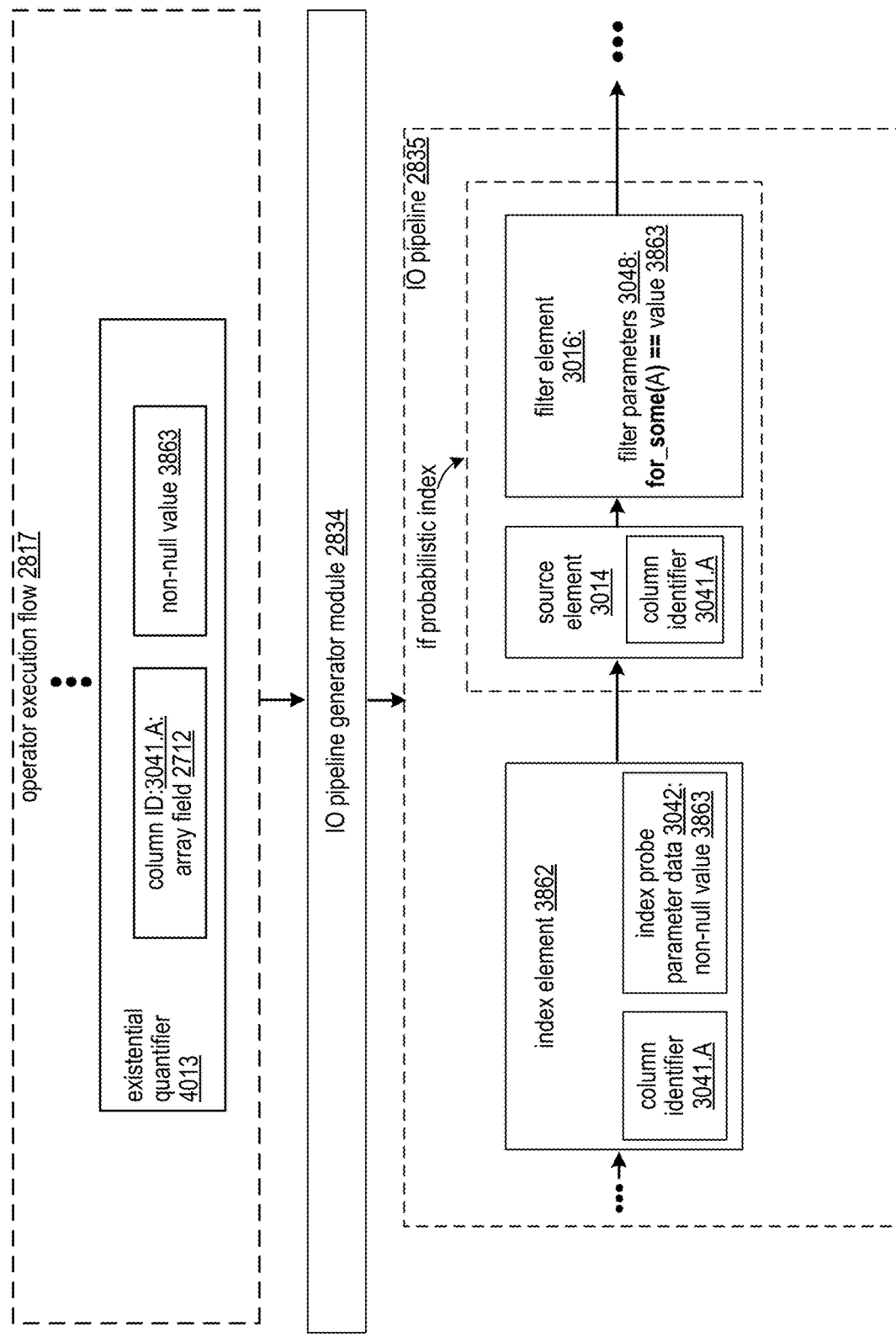
Figure 40C:
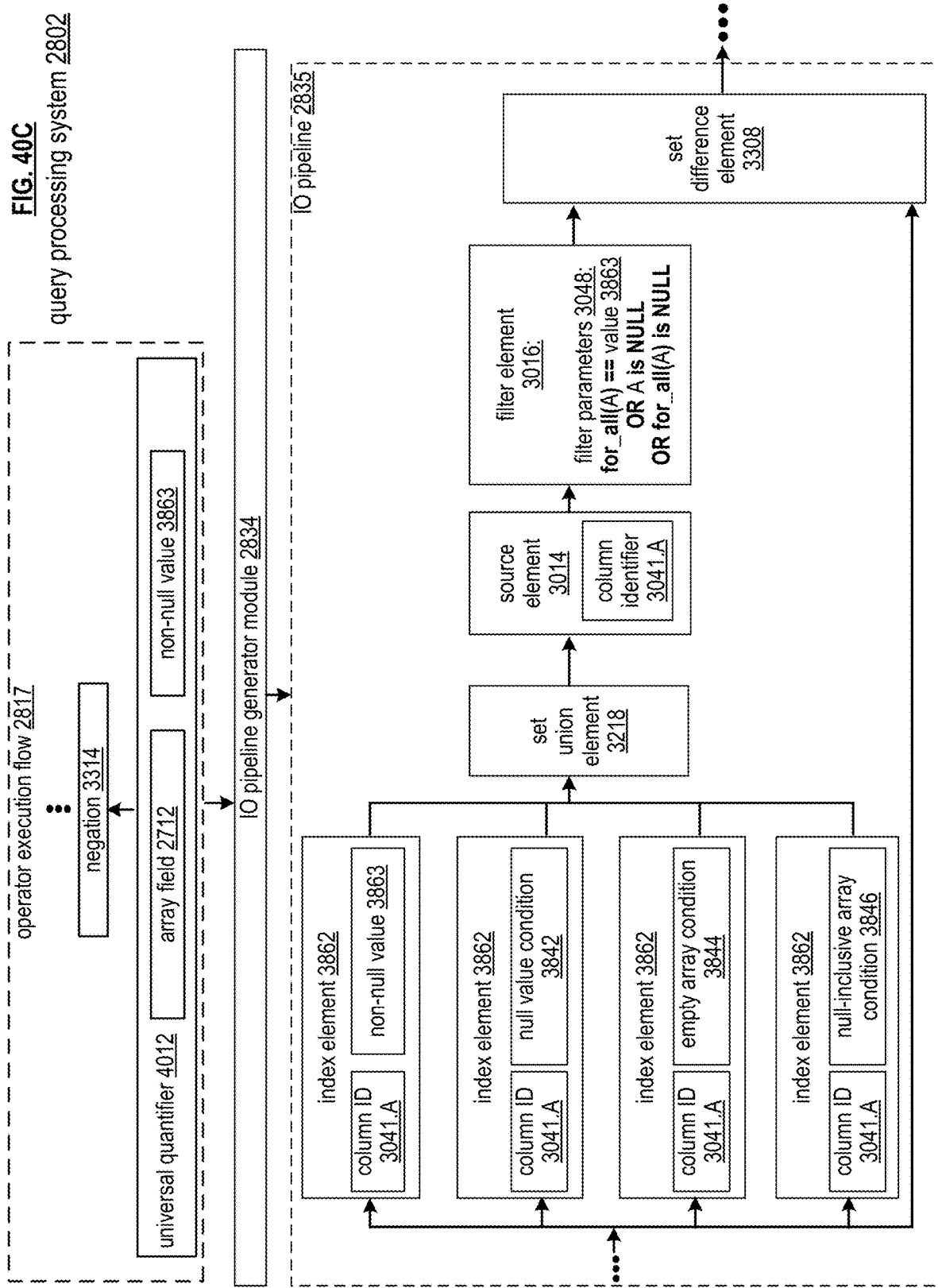
Figure 40D:
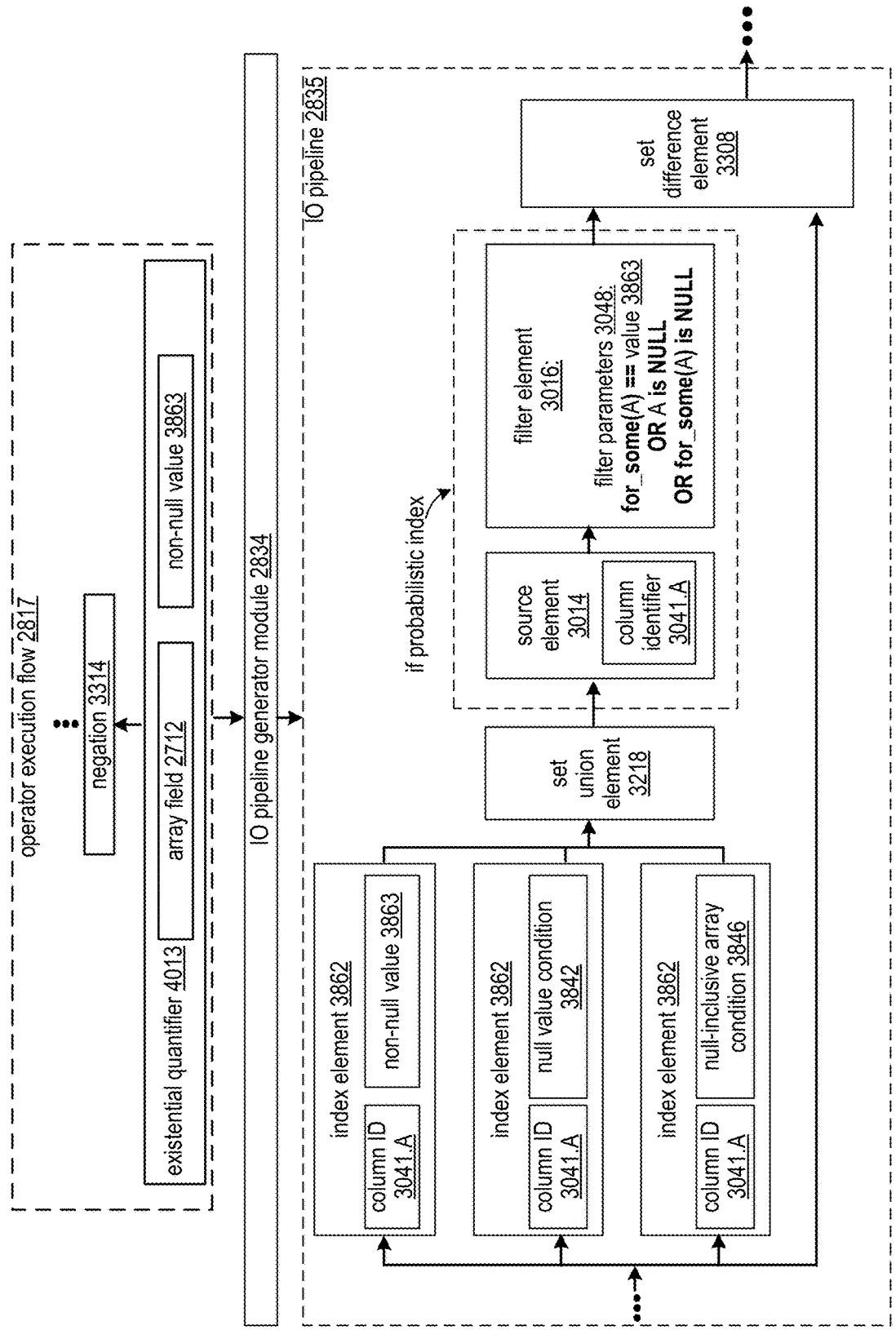
Figure 40E:
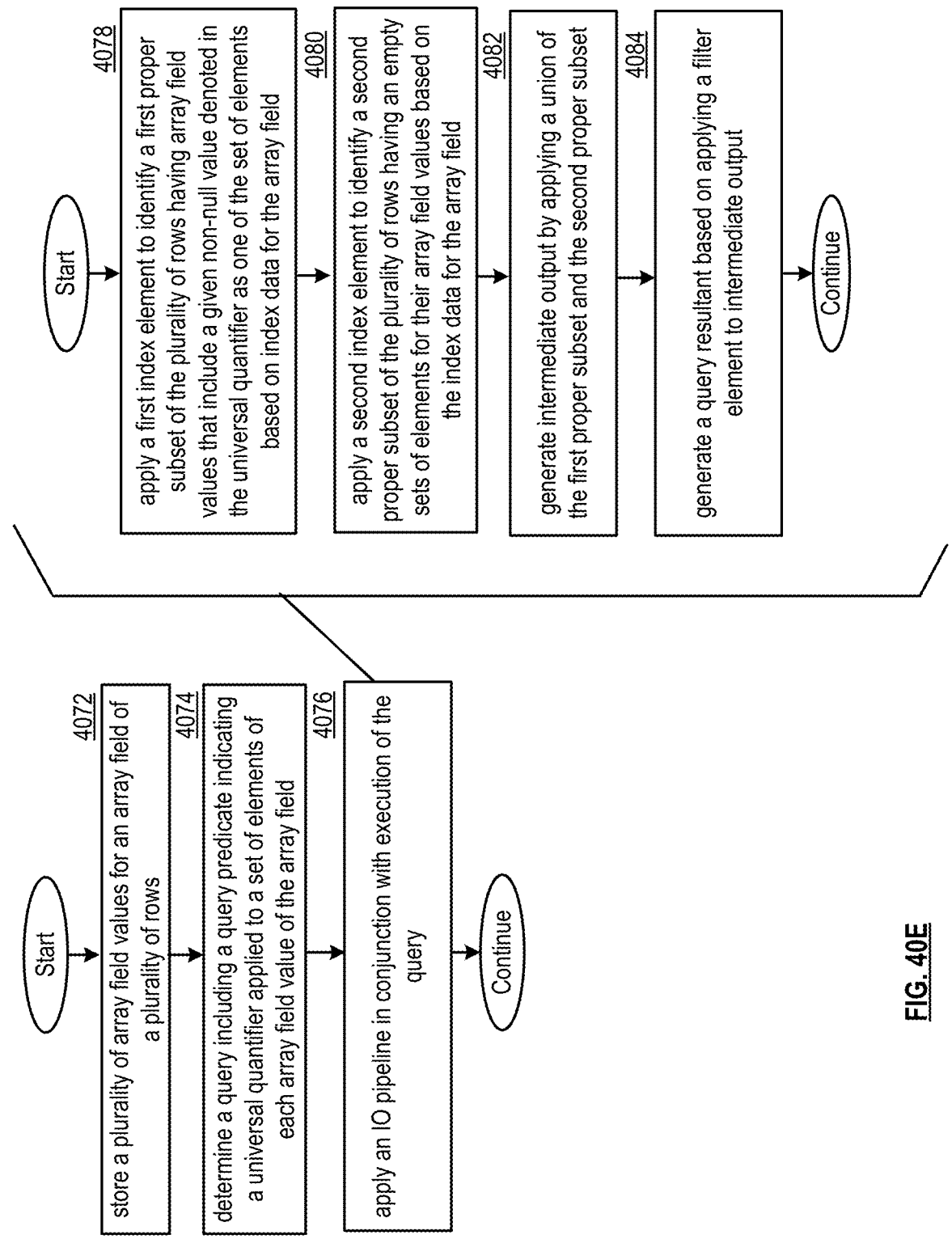
Figure 40F:
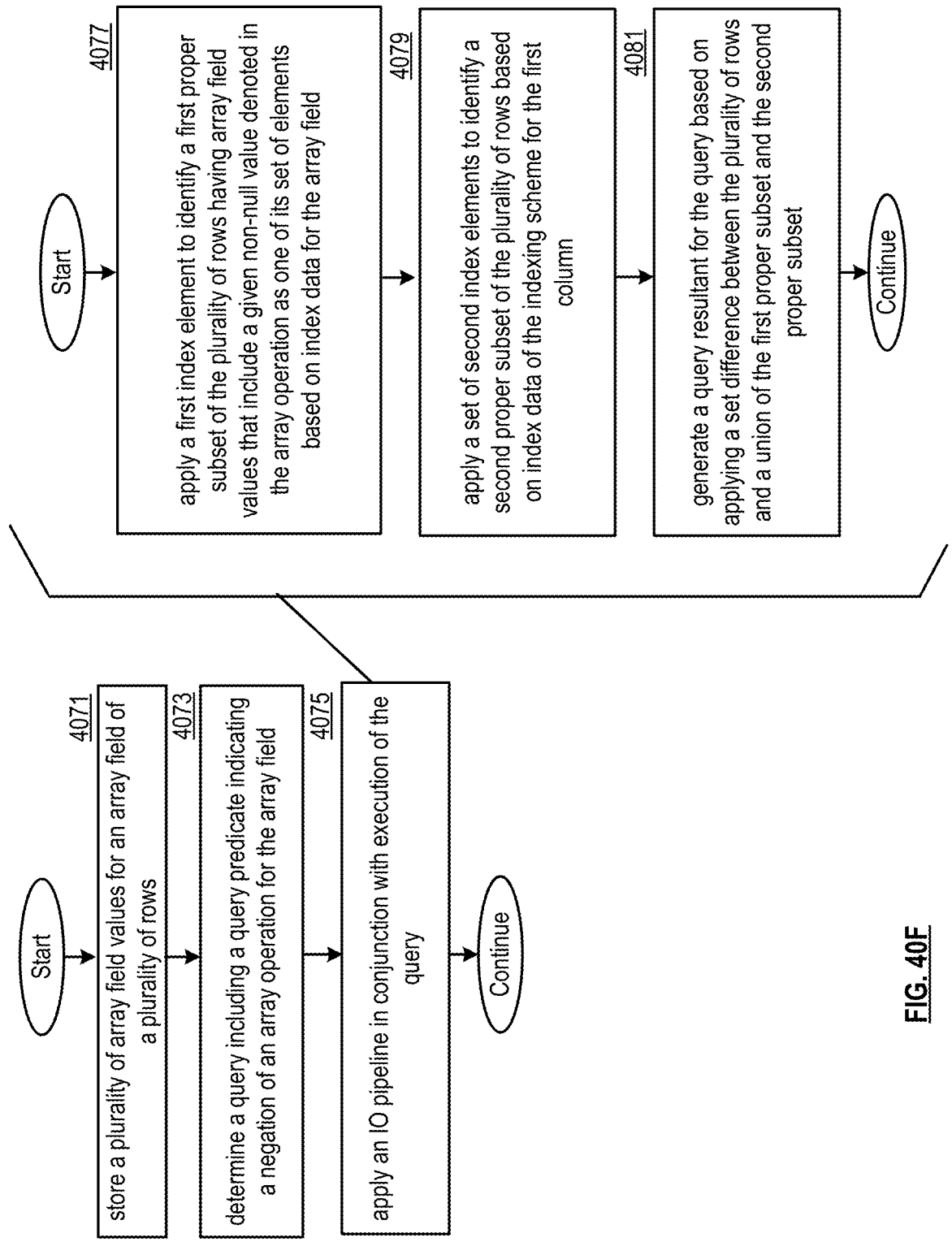
Figure 41A:
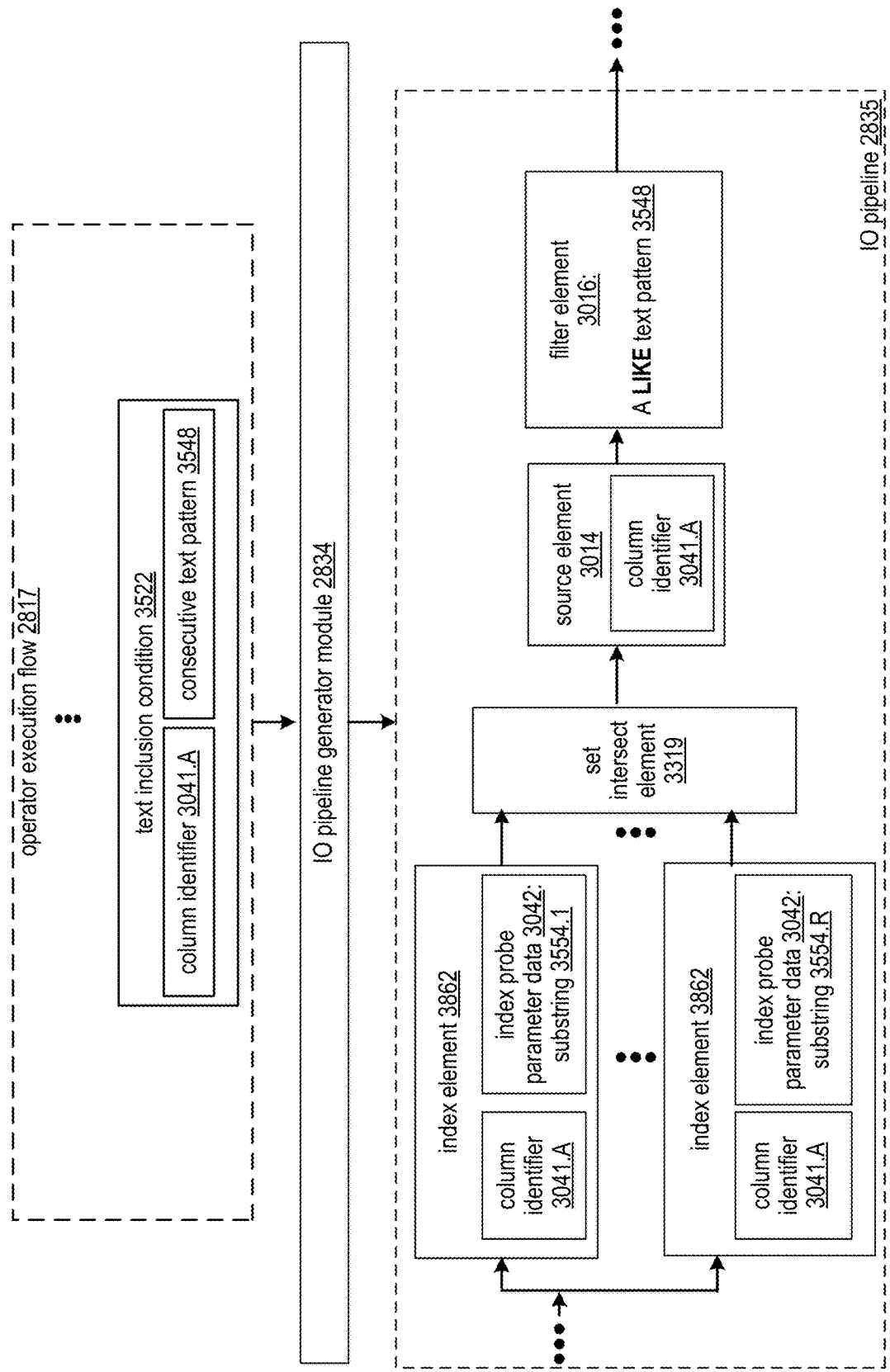
Figure 41B:
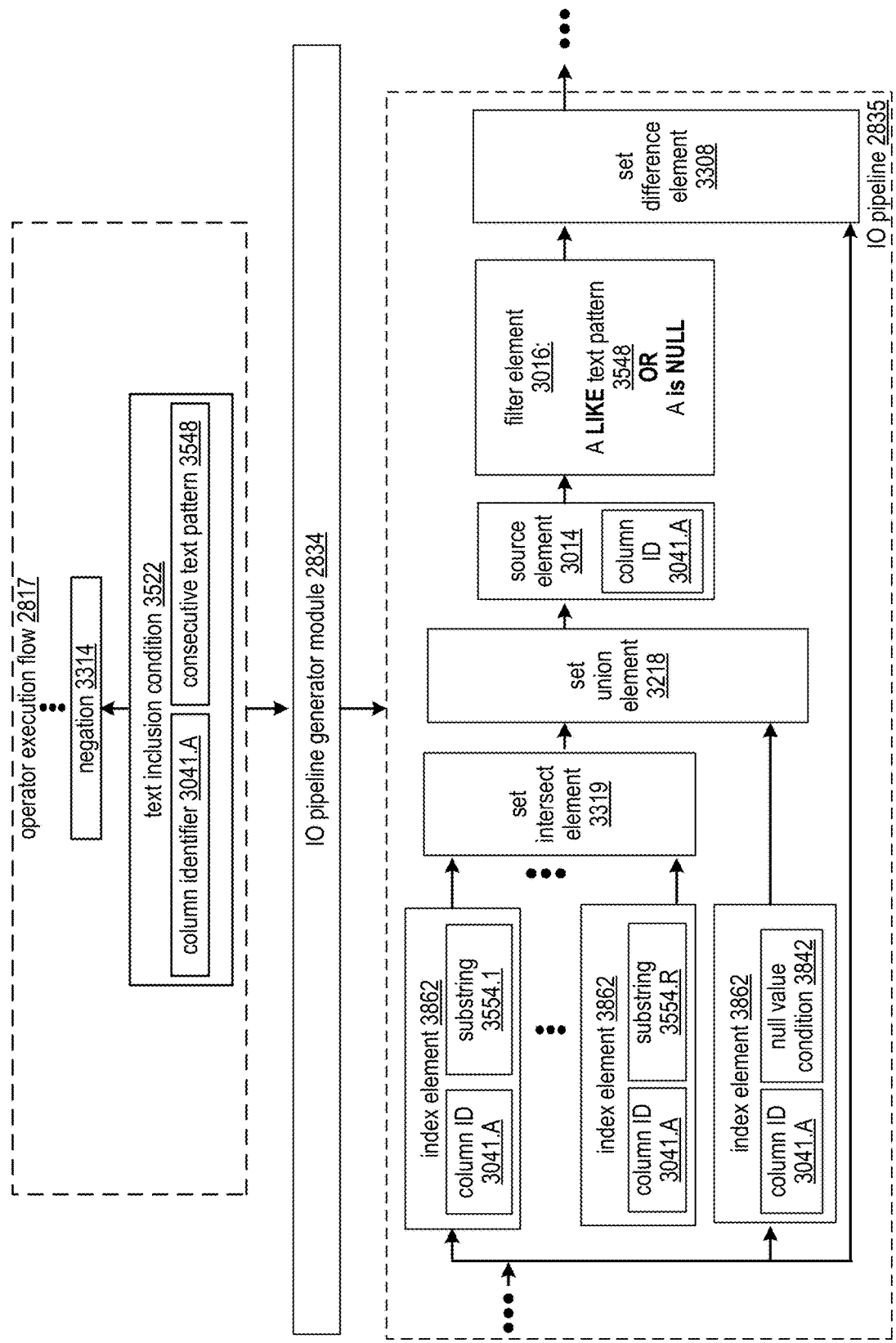
Figure 41C:
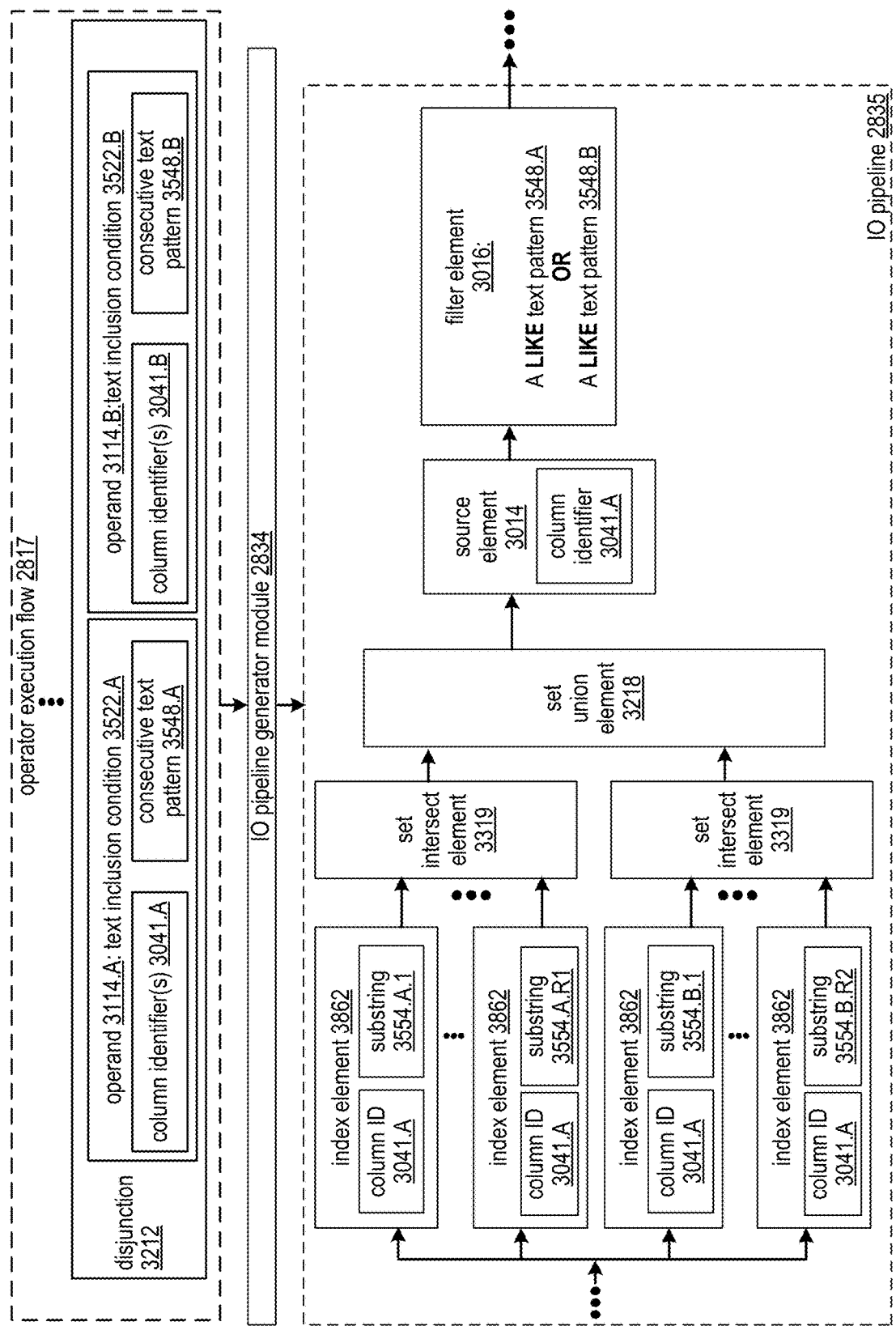
Figure 41D:
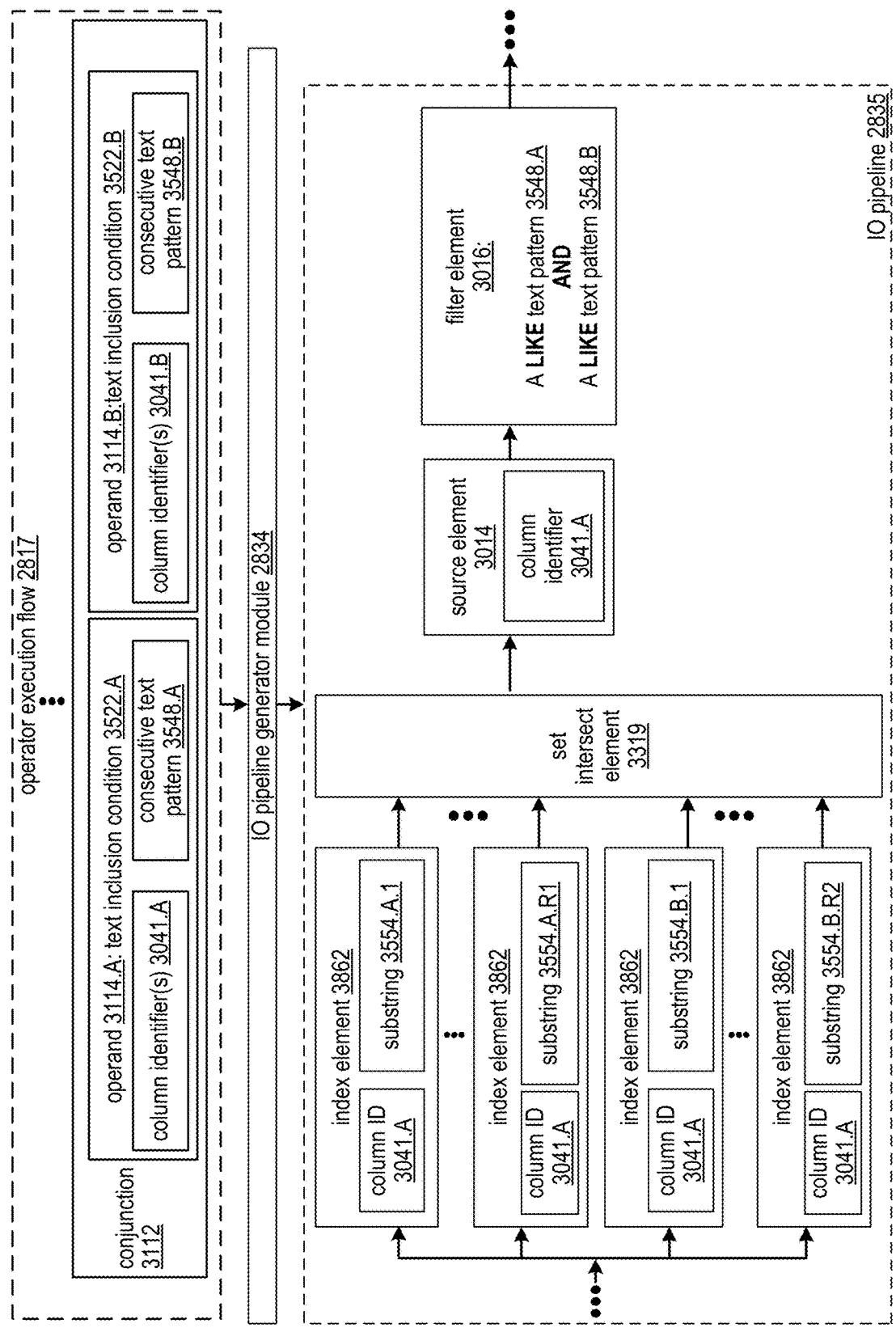
Figure 41F:
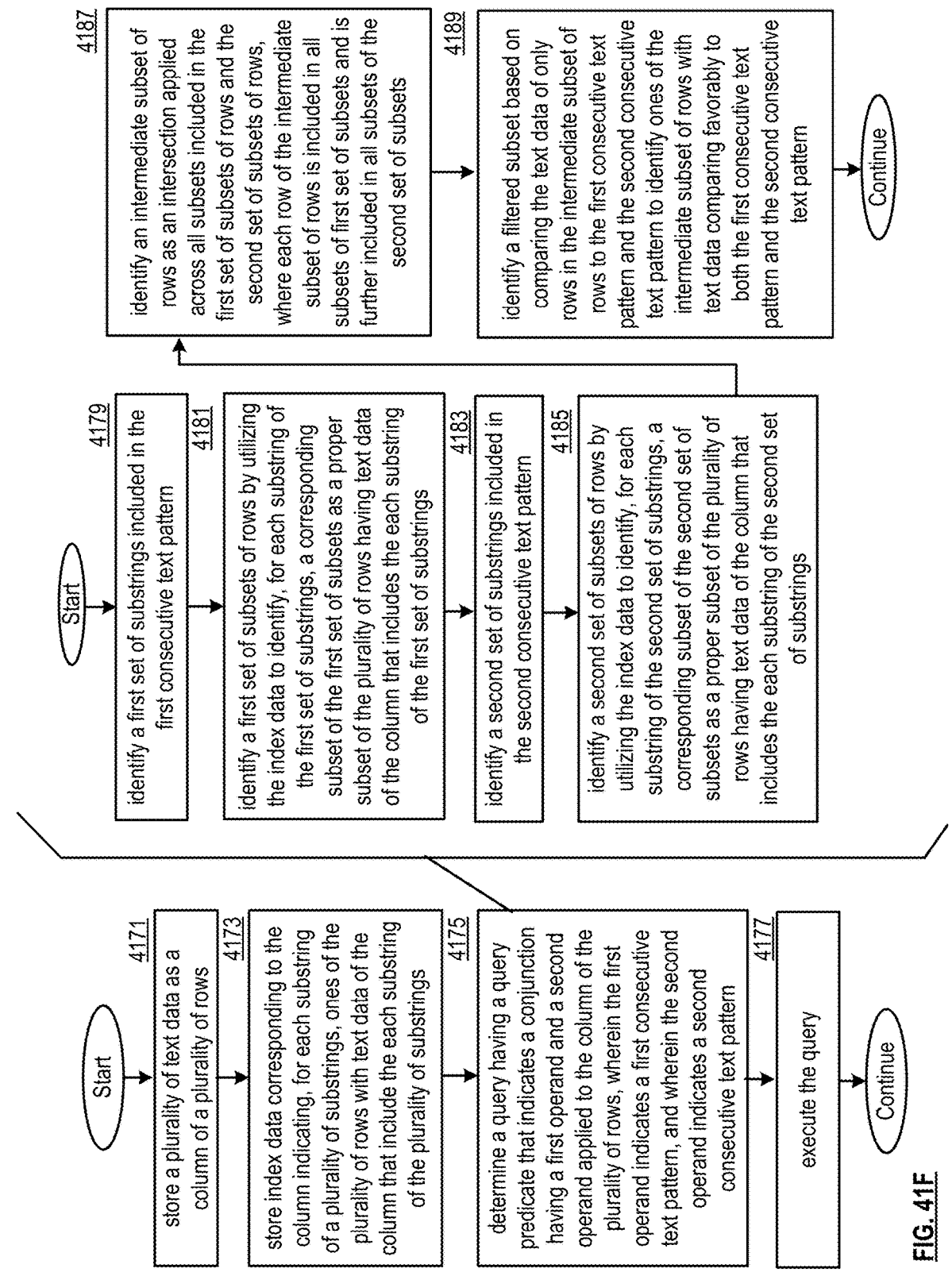
Figure 42A:
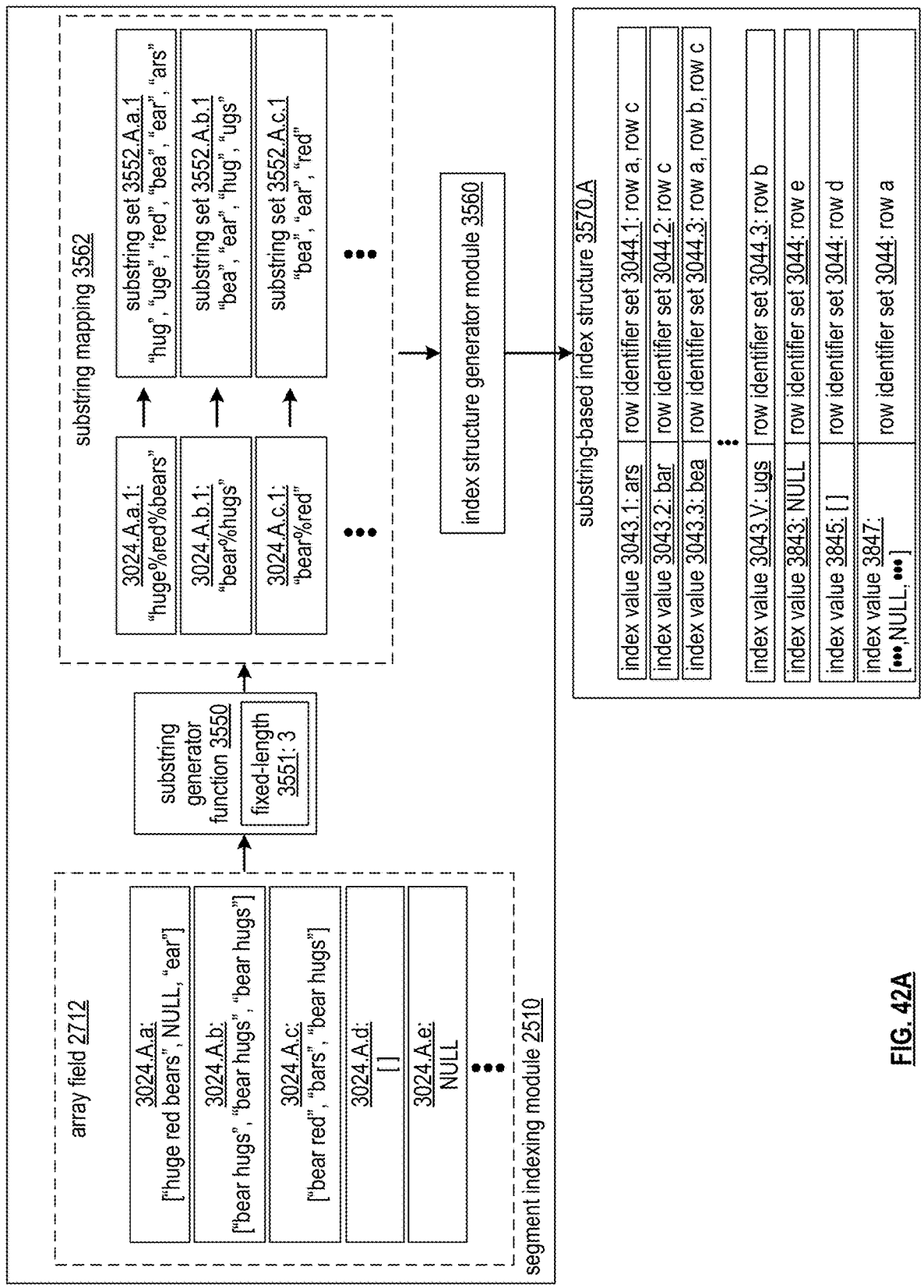
Figure 42B:
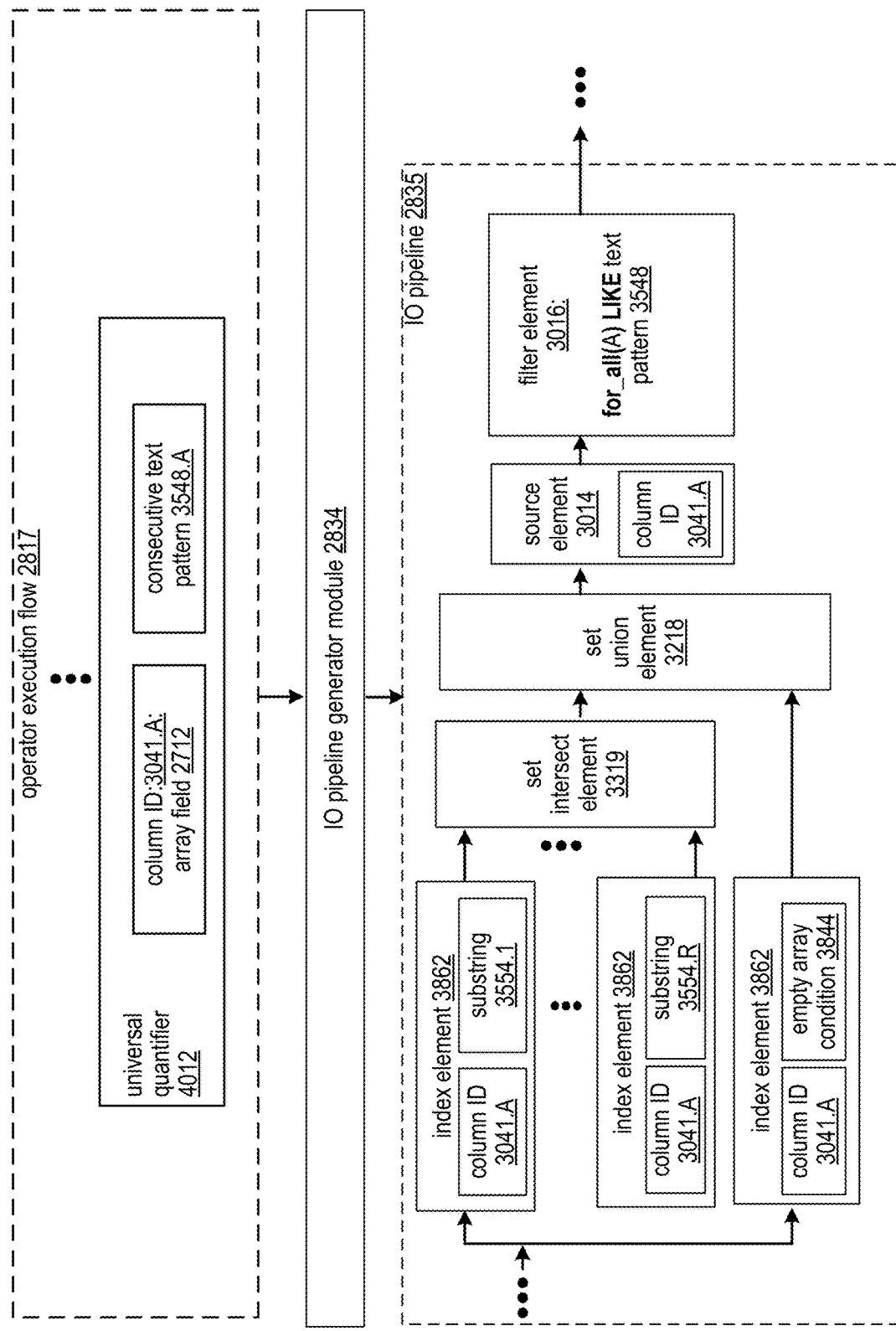
Figure 42C:
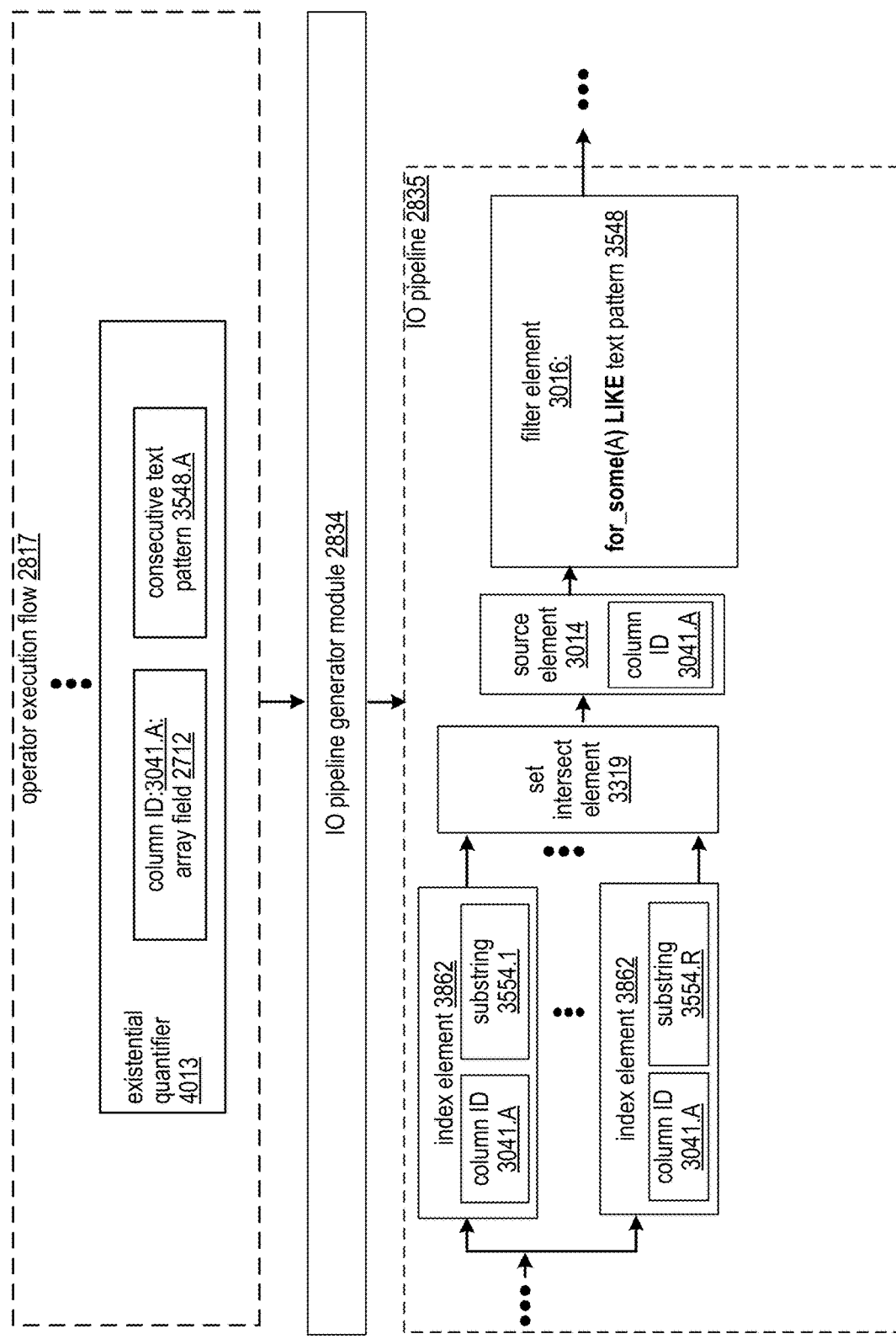
Figure 42D:
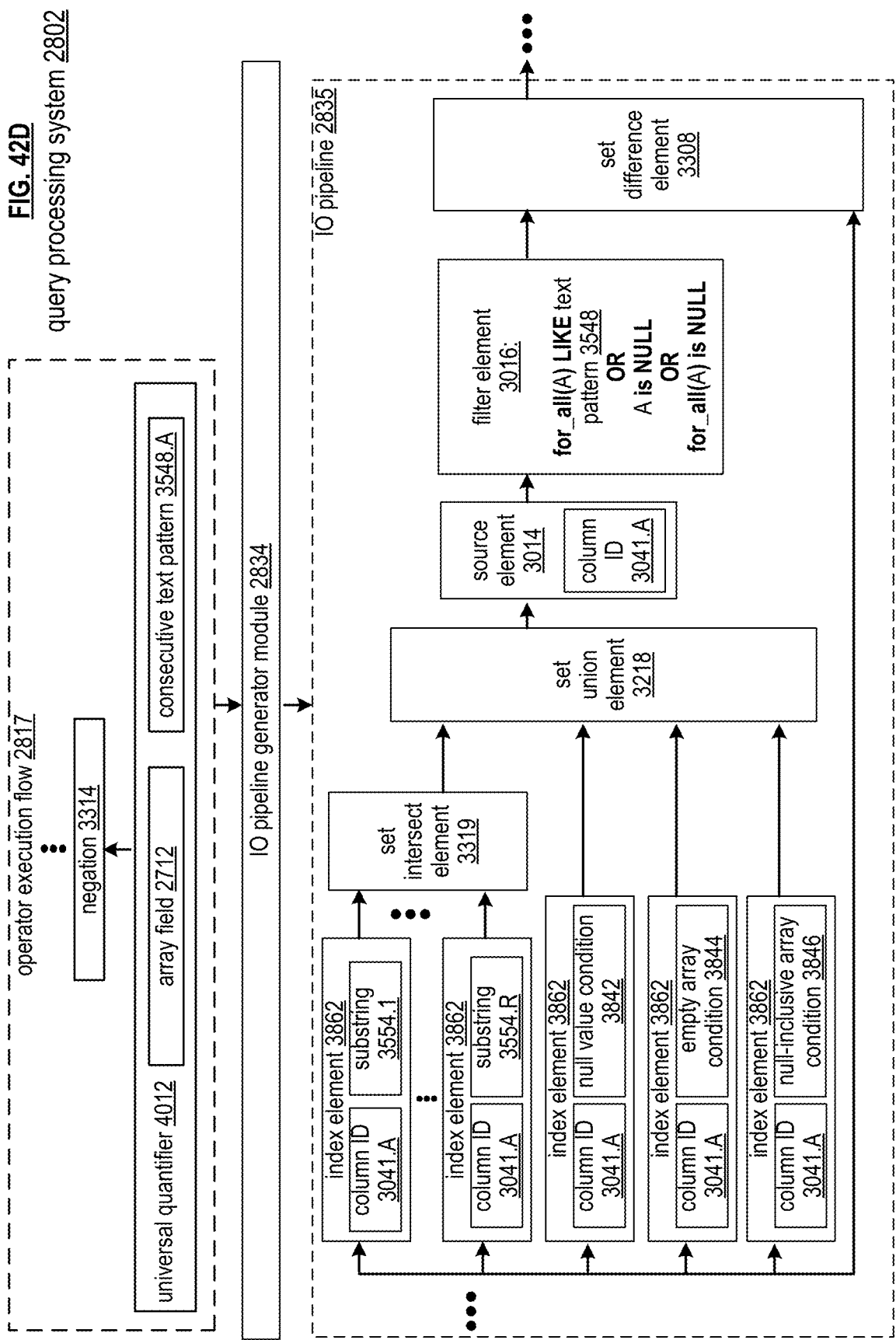
Figure 42E:
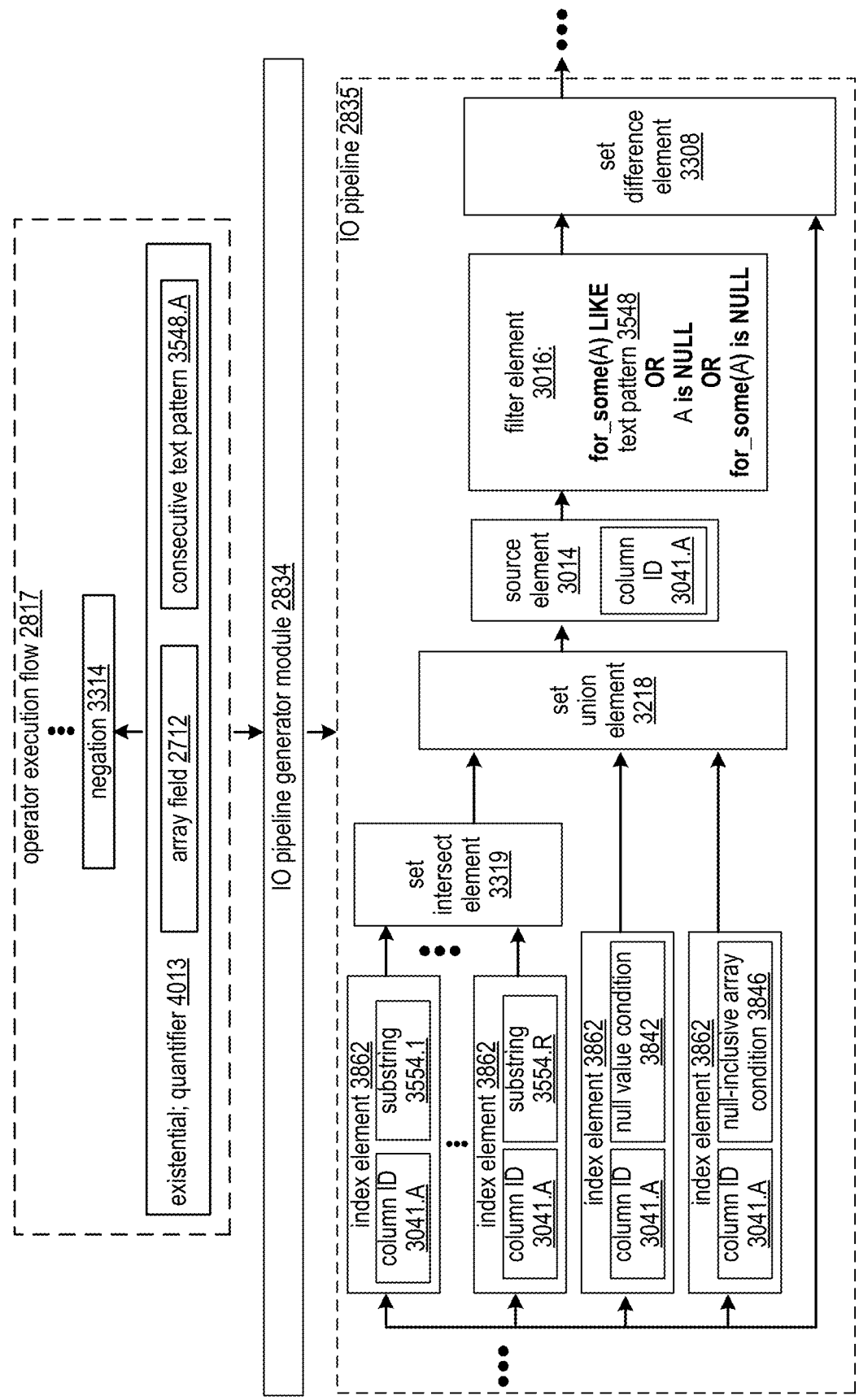
Figure 42F:
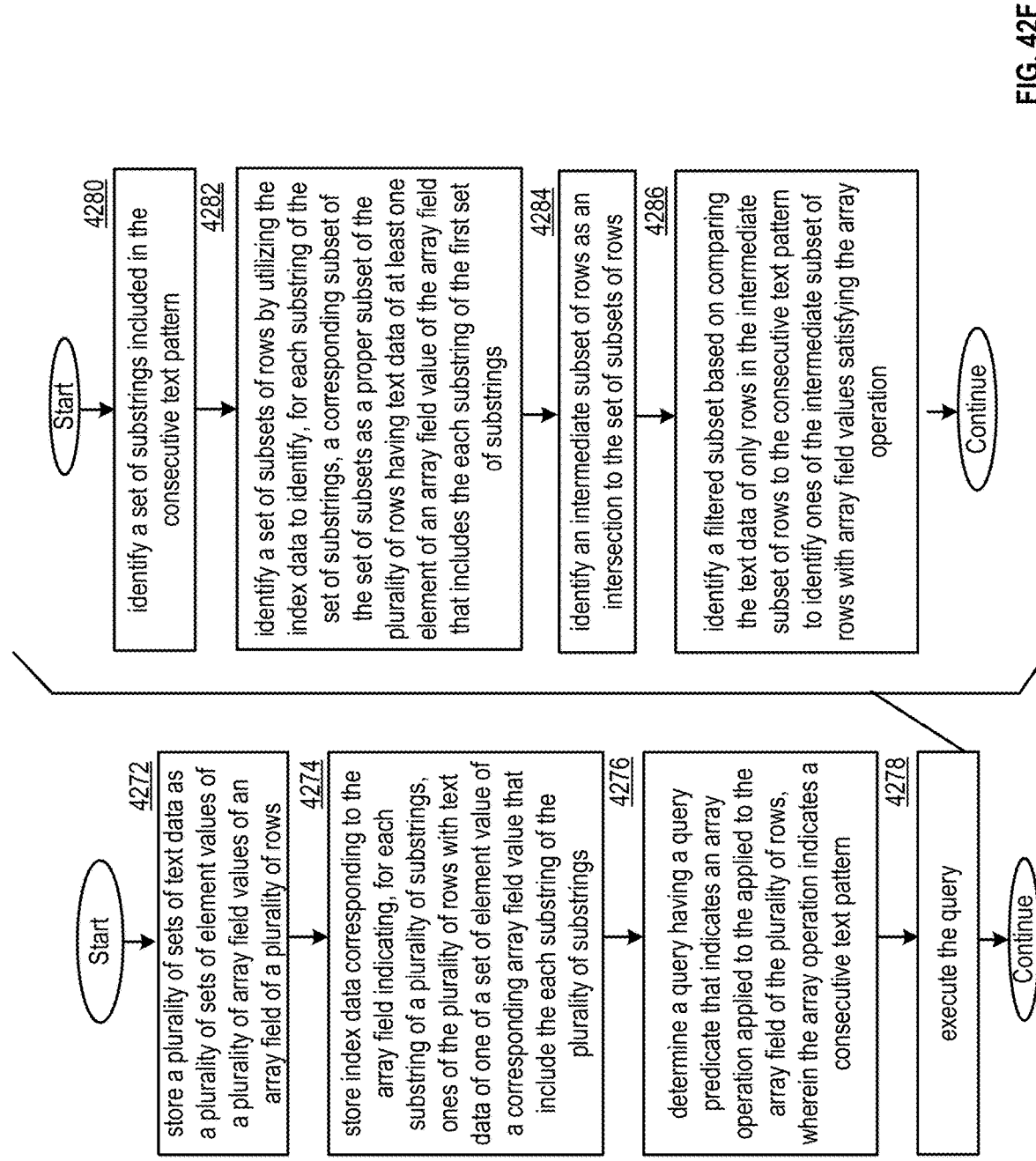

FIG. 25E a logic diagram illustrating a method of selecting and generating secondary indexes for different segments in accordance with various embodiments;

FIG. 26A is a schematic block diagrams of a segment indexing module that utilizes secondary indexing hint data in accordance with various embodiments;

FIG. 26B a logic diagram illustrating a method of selecting and generating secondary indexes for segments based on secondary indexing hint data in accordance with various embodiments;

FIGS. 27A-27C are schematic block diagrams of a segment indexing evaluation system 2710 in accordance with various embodiments;

FIG. 27D a logic diagram illustrating a method of evaluating segments for re-indexing in accordance with various embodiments;

FIG. 28A is a schematic block diagram of a query processing system in accordance with various embodiments;

FIG. 28B is a schematic block diagram of a query execution module that implements an IO pipeline generator module and an IO operator execution module in accordance with various embodiments;

FIG. 28C is a schematic block diagram of an example embodiment of an IO pipeline in accordance with various embodiments;

FIG. 28D is a logic diagram illustrating a method of performing IO operators upon different segments in query execution accordance with various embodiments;

FIG. 29A is a schematic block diagram of an IO operator execution module that executes an example IO pipeline in accordance with various embodiments;

FIG. 29B is a logic diagram illustrating a method of executing row-based reads of an IO pipeline in accordance with various embodiments;

FIG. 30A is a schematic block diagram of a query processing system that implements an IO pipeline generator module and an IO operator execution module in accordance with various embodiments;

FIG. 30B illustrates a probabilistic index-based IO construct of an IO pipeline in accordance with various embodiments;

FIG. 30C illustrates generation of a probabilistic index-based IO construct of an IO pipeline based on a predicate of an operator execution flow in accordance with various embodiments;

FIGS. 30D-30G illustrate example execution of example probabilistic index-based IO constructs via an IO operator execution module in accordance with various embodiments;

FIG. 30H is a logic diagram illustrating a method of utilizing probabilistic indexing in accordance with various embodiments;

FIG. 31A illustrates generation of a probabilistic index-based conjunction construct of an IO pipeline based on a conjunction of an operator execution flow in accordance with various embodiments;

FIGS. 31B-31E illustrate example execution of example probabilistic index-based conjunction constructs via an IO operator execution module in accordance with various embodiments;

FIG. 31F is a logic diagram illustrating a method of utilizing probabilistic indexing to implement conjunction in accordance with various embodiments;

FIG. 32A illustrates generation of a probabilistic index-based disjunction construct of an IO pipeline based on a disjunction of an operator execution flow in accordance with various embodiments;

FIGS. 32B-32F illustrate example execution of example probabilistic index-based disjunction constructs via an IO operator execution module in accordance with various embodiments;

FIG. 32G is a logic diagram illustrating a method of utilizing probabilistic indexing to implement disjunction in accordance with various embodiments;

FIG. 33A illustrates generation of a probabilistic index-based logical connective negation construct of an IO pipeline based on a disjunction of an operator execution flow in accordance with various embodiments;

FIGS. 33B-33G illustrate example execution of example probabilistic index-based logical connective negation constructs via an IO operator execution module in accordance with various embodiments;

FIG. 33H is a logic diagram illustrating a method of utilizing probabilistic indexing to implement negation of a logical connective in accordance with various embodiments;

FIG. 34A illustrates generation of an IO pipeline based on an equality condition for variable-length data in accordance with various embodiments;

FIG. 34B illustrates an embodiment of a segment indexing module that generates a probabilistic index structure for a variable-length column;

FIG. 34C illustrates example execution of an example IO pipeline via an IO operator execution module in accordance with various embodiments;

FIG. 34D is a logic diagram illustrating a method of utilizing indexed variable-length data in accordance with various embodiments;

FIG. 35A illustrates generation of an IO pipeline based on inclusion of a consecutive text pattern in accordance with various embodiments;

FIG. 35B illustrates an embodiment of a segment indexing module that generates a subset-based index structure for text data;

FIG. 35C illustrates example execution of an example IO pipeline via an IO operator execution module in accordance with various embodiments;

FIG. 35D is a logic diagram illustrating a method of utilizing indexed text data in accordance with various embodiments;

FIG. 36A illustrates generation of an IO pipeline based on inclusion of a consecutive text pattern in accordance with various embodiments;

FIG. 36B illustrates an embodiment of a segment indexing module that generates a suffix-based index structure for text data;

FIG. 36C illustrates example execution of an example IO pipeline via an IO operator execution module in accordance with various embodiments;

FIG. 36D is a logic diagram illustrating a method of utilizing indexed text data in accordance with various embodiments;

FIG. 37A illustrates an embodiment of a segment indexing module that generates a probabilistic index structure based on a false-positive tuning parameter in accordance with various embodiments;

FIG. 37B illustrates an embodiment of a probabilistic index structure generator module of a segment indexing module that implements a fixed-length conversion function based on a false-positive tuning parameter in accordance with various embodiments;

FIG. 37C is a logic diagram illustrating a method of utilizing an indexing scheme with a selected false-positive tuning parameter in accordance with various embodiments;

FIG. 38A is a schematic block diagram of a database system that implements an indexing module that generates special index data in accordance with various embodiments;

FIG. 38B is a schematic block diagram of a database system that implements a segment generator module that generates special index data in accordance with various embodiments;

FIG. 38C is a schematic block diagram of a database system that implements an indexing module that generates that generates missing data-based index data in accordance with various embodiments;

FIG. 38D is a schematic block diagram of a database system that implements an indexing module that generates that generates null value index data for an example dataset in accordance with various embodiments;

FIG. 38E illustrates an example dataset that includes at least one array field in accordance with various embodiments;

FIG. 38F is a schematic block diagram of a database system that implements an indexing module that generates that generates null value index data, empty array index data, and/or null-inclusive array index data for an example dataset in accordance with various embodiments;

FIG. 38G illustrates generation of an IO pipeline based on filter parameters indicating a non-null value in accordance with various embodiments;

FIG. 38H illustrates generation of an IO pipeline based on filter parameters indicating an array operation upon a non-null value in accordance with various embodiments;

FIG. 38I illustrates execution of an IO pipeline via an IO operator execution module in accordance with various embodiments;

FIG. 38J is a logic diagram illustrating a method for execution in accordance with various embodiments;

FIG. 38K is a logic diagram illustrating a method for execution in accordance with various embodiments;

FIG. 39A illustrates generation of an example IO pipeline based on an equality condition in accordance with various embodiments;

FIG. 39B illustrates generation of an example IO pipeline based on an inequality condition in accordance with various embodiments;

FIG. 39C illustrates generation of an example IO pipeline based on a negation of a condition in accordance with various embodiments;

FIG. 39D is a logic diagram illustrating a method for execution in accordance with various embodiments;

FIG. 40A illustrates generation of an example IO pipeline based on a universal quantifier in accordance with various embodiments;

FIG. 40B illustrates generation of an example IO pipeline based on an existential quantifier in accordance with various embodiments;

FIG. 40C illustrates generation of an example IO pipeline based on a negation of a universal quantifier in accordance with various embodiments;

FIG. 40D illustrates generation of an example IO pipeline based on a negation of an existential quantifier in accordance with various embodiments;

FIG. 40E is a logic diagram illustrating a method for execution in accordance with various embodiments;

FIG. 40F is a logic diagram illustrating a method for execution in accordance with various embodiments;

FIG. 41A illustrates generation of an example IO pipeline based on a text inclusion condition in accordance with various embodiments;

FIG. 41B illustrates generation of an example IO pipeline based on a negation of a text inclusion condition in accordance with various embodiments;

FIG. 41C illustrates generation of an example IO pipeline based on a disjunction of text inclusion conditions in accordance with various embodiments;

FIG. 41D illustrates generation of an example IO pipeline based on a conjunction of text inclusion conditions in accordance with various embodiments;

FIG. 41E is a logic diagram illustrating a method for execution in accordance with various embodiments;

FIG. 41F is a logic diagram illustrating a method for execution in accordance with various embodiments;

FIG. 42A is a schematic block diagram of a segment indexing module that generates a substring-based index structure for an array field in accordance with various embodiments;

FIG. 42B illustrates generation of an example IO pipeline based on a universal quantifier for inclusion of a consecutive text pattern in accordance with various embodiments;

FIG. 42C illustrates generation of an example IO pipeline based on an existential quantifier for inclusion of a consecutive text pattern in accordance with various embodiments;

FIG. 42D illustrates generation of an example IO pipeline based on a negation of a universal quantifier in accordance with various embodiments;

FIG. 42E illustrates generation of an example IO pipeline based on a negation of an existential quantifier in accordance with various embodiments; and FIG. 42F is a logic diagram illustrating a method for execution in accordance with various embodiments.

DETAILED DESCRIPTION OF THE INVENTION

Figure 1:
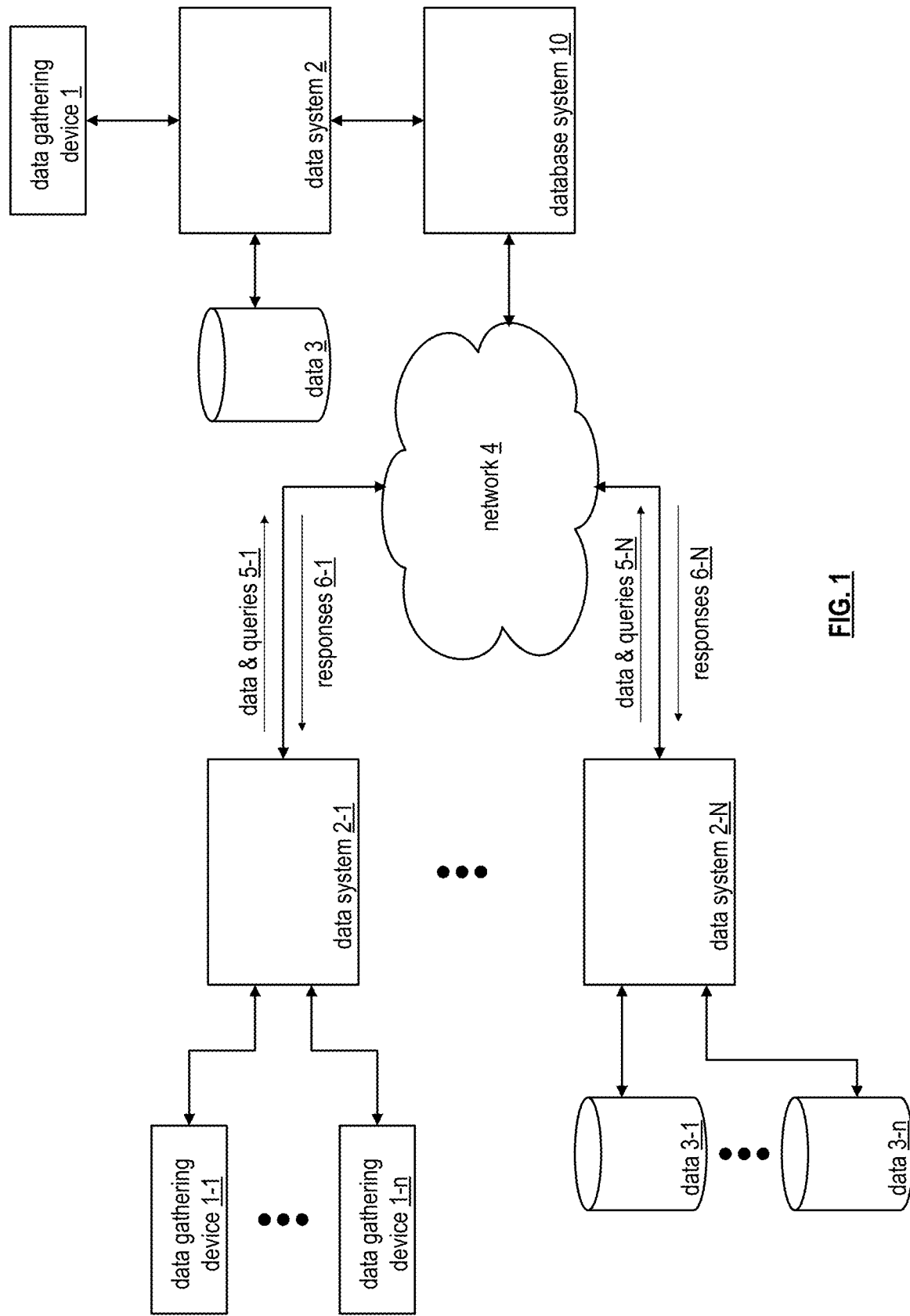
FIG. 1 is a schematic block diagram of an embodiment of a large scale data processing network that includes a database system in accordance with various embodiments.

FIG. 1 is a schematic block diagram of an embodiment of a large-scale data processing network that includes data gathering devices (1, 1-1 through 1-$n$), data systems (2, 2-1 through 2-N), data storage systems (3, 3-1 through 3-$n$), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
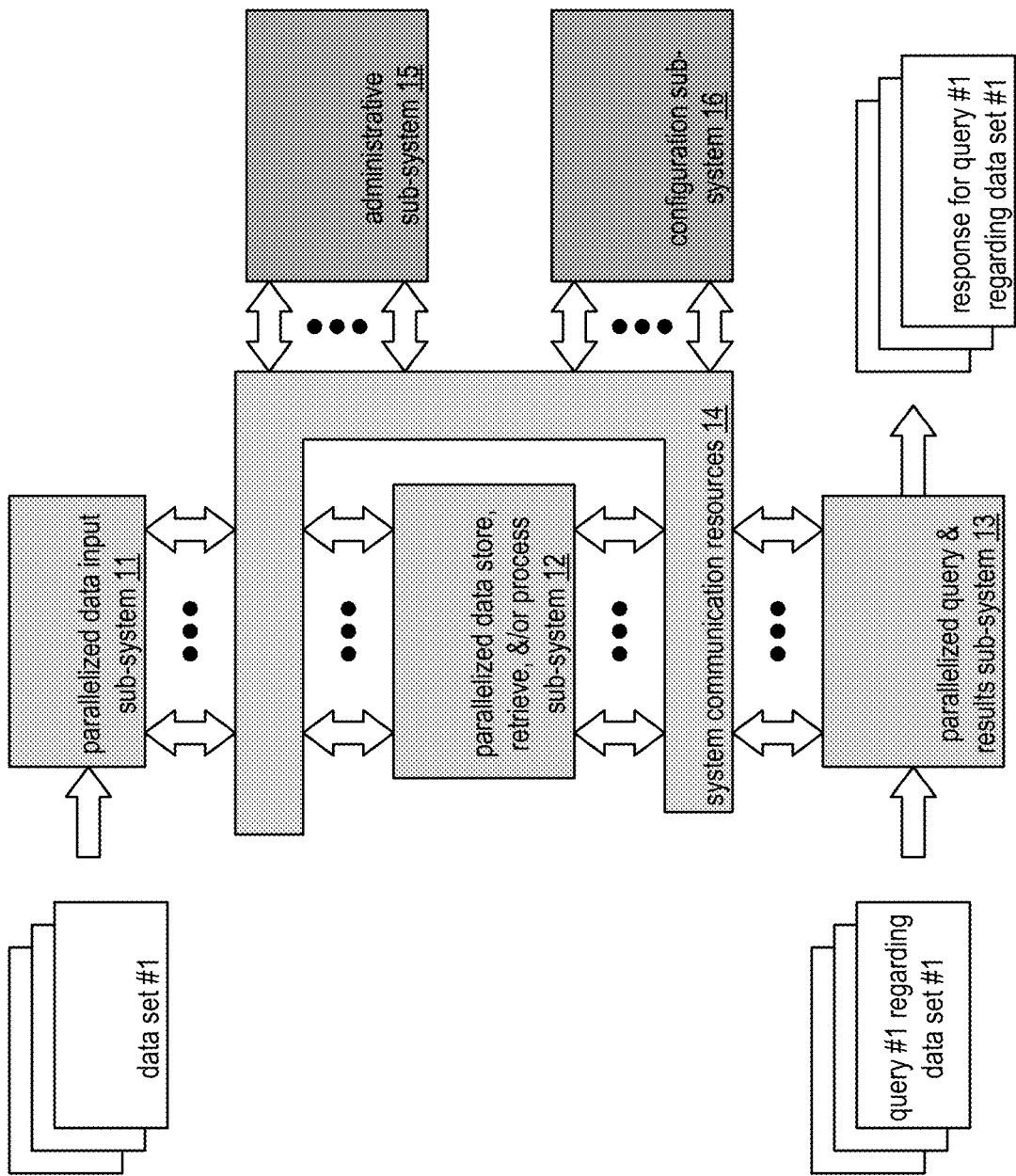
FIG. 1A is a schematic block diagram of an embodiment of a database system in accordance with various embodiments.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
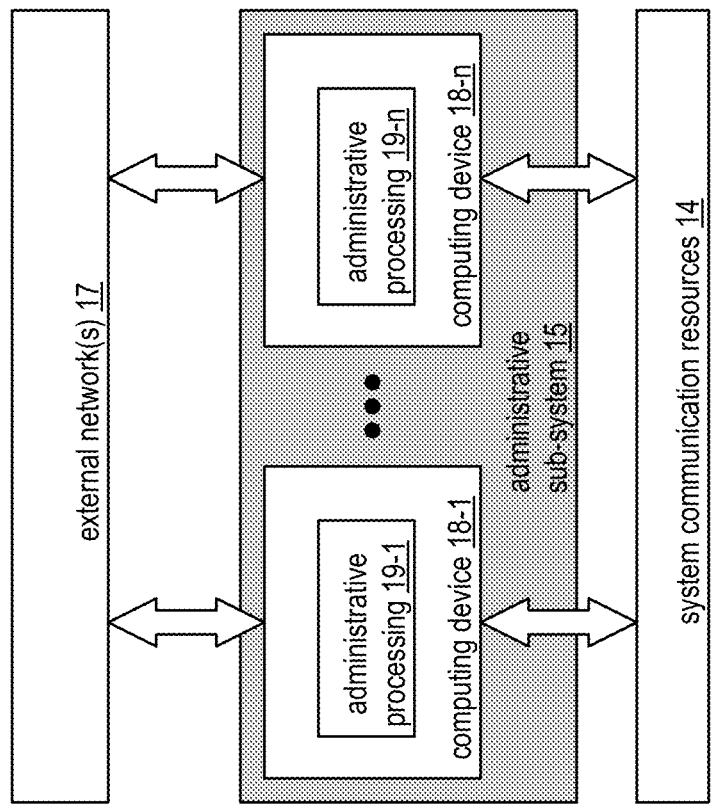
FIG. 2 is a schematic block diagram of an embodiment of an administrative sub-system in accordance with various embodiments.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
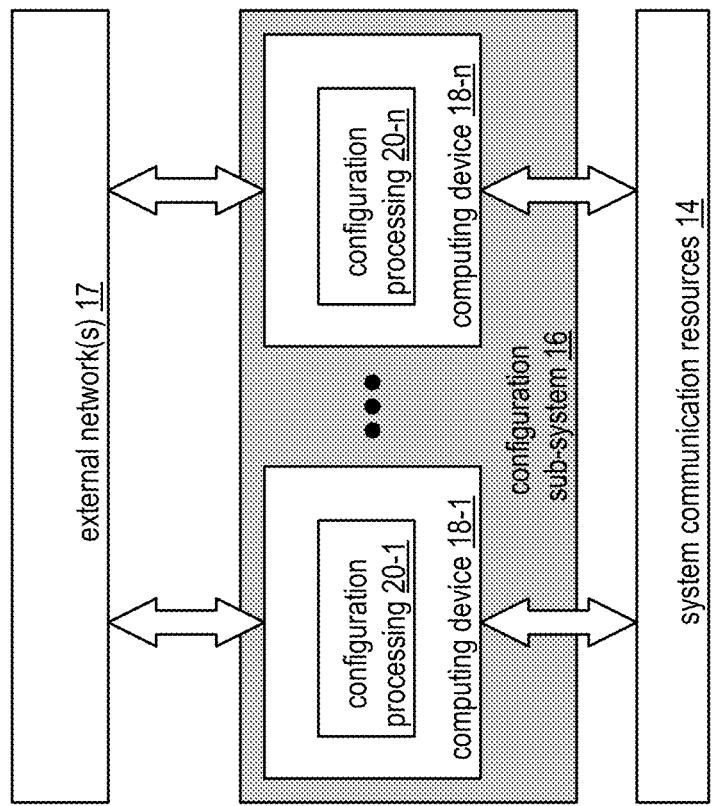
FIG. 3 is a schematic block diagram of an embodiment of a configuration sub-system in accordance with various embodiments.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
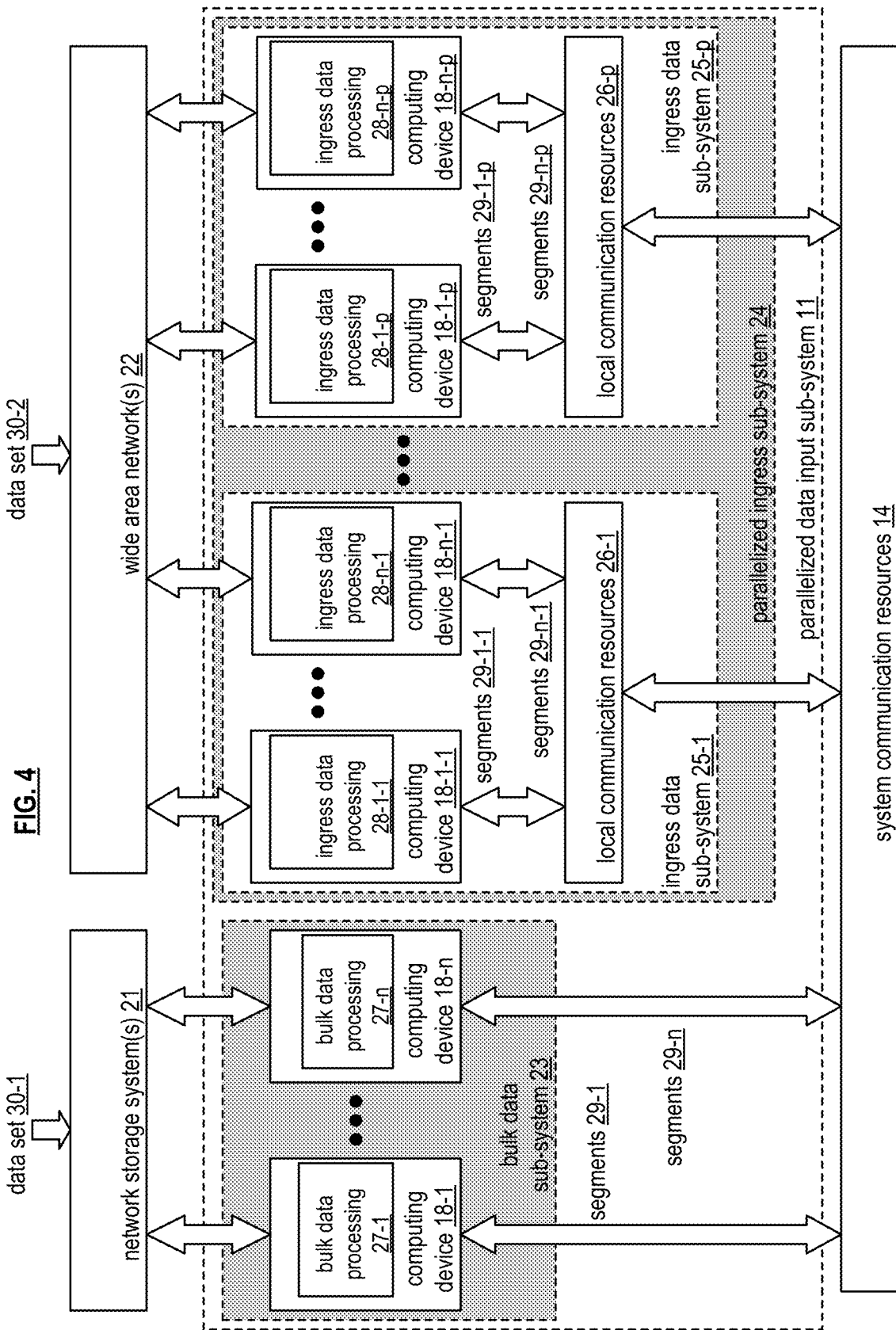
FIG. 4 is a schematic block diagram of an embodiment of a parallelized data input sub-system in accordance with various embodiments.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
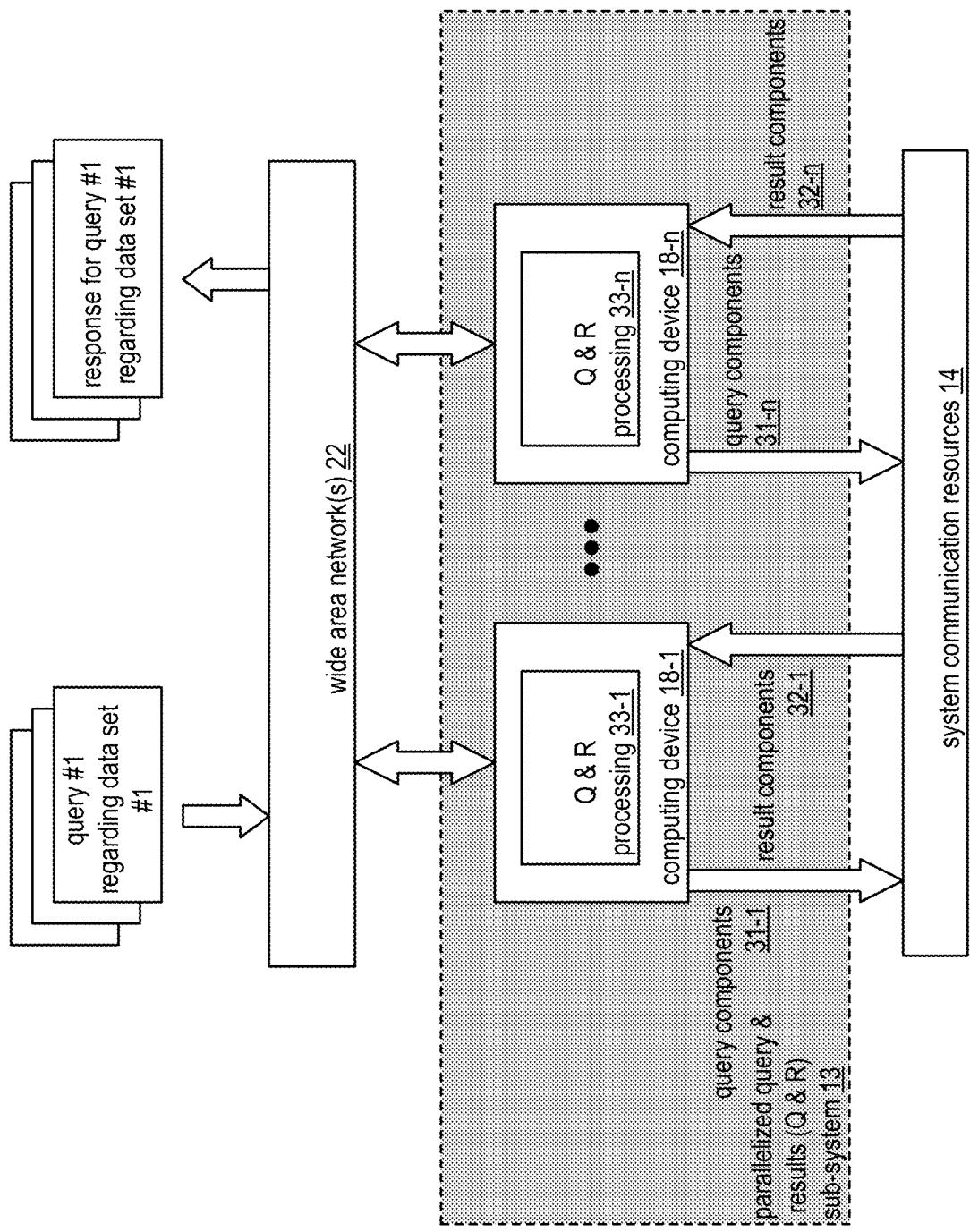
FIG. 5 is a schematic block diagram of an embodiment of a parallelized query and response (Q&R) sub-system in accordance with various embodiments.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
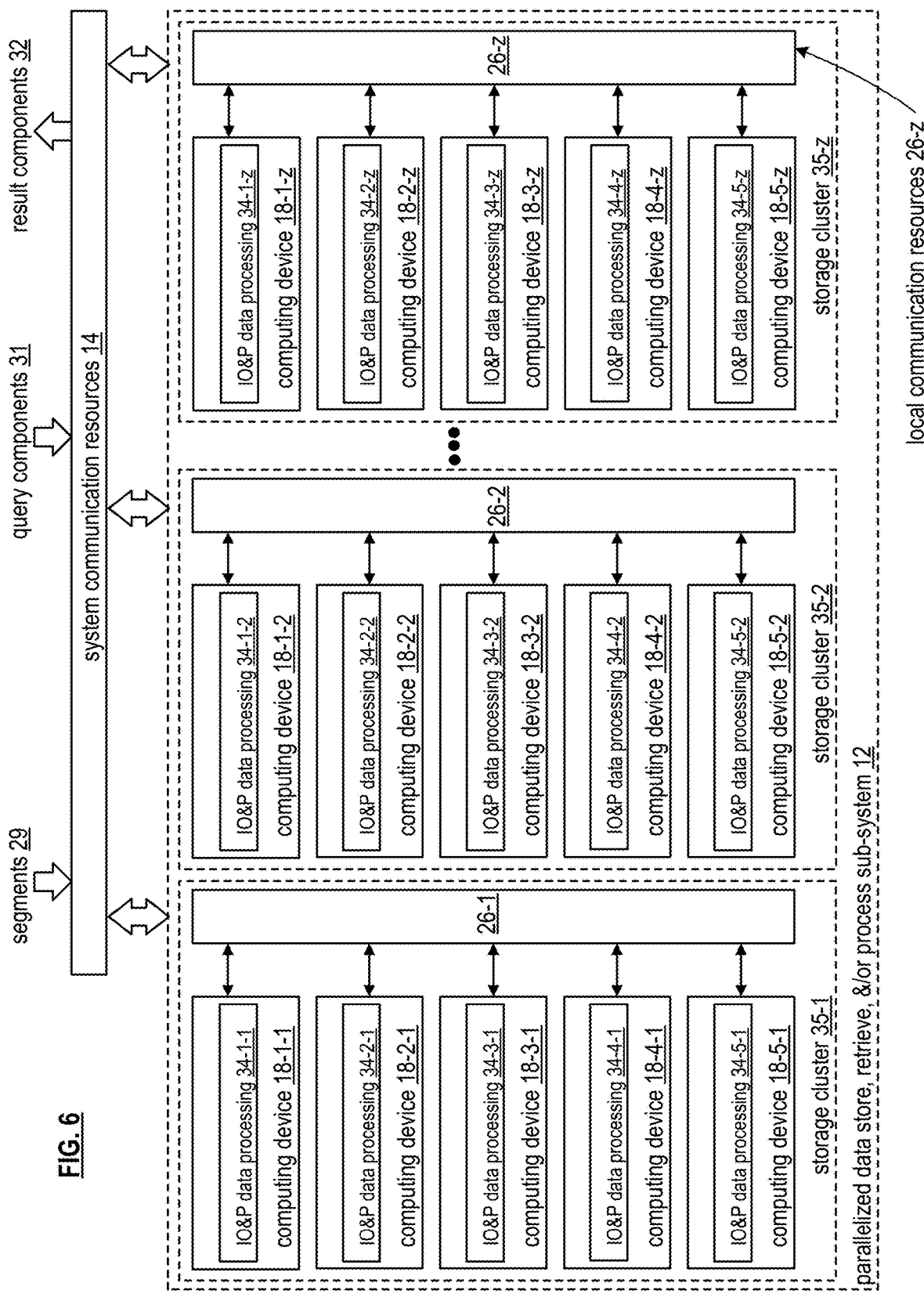
FIG. 6 is a schematic block diagram of an embodiment of a parallelized data store, retrieve, and/or process (IO& P) sub-system in accordance with various embodiments.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
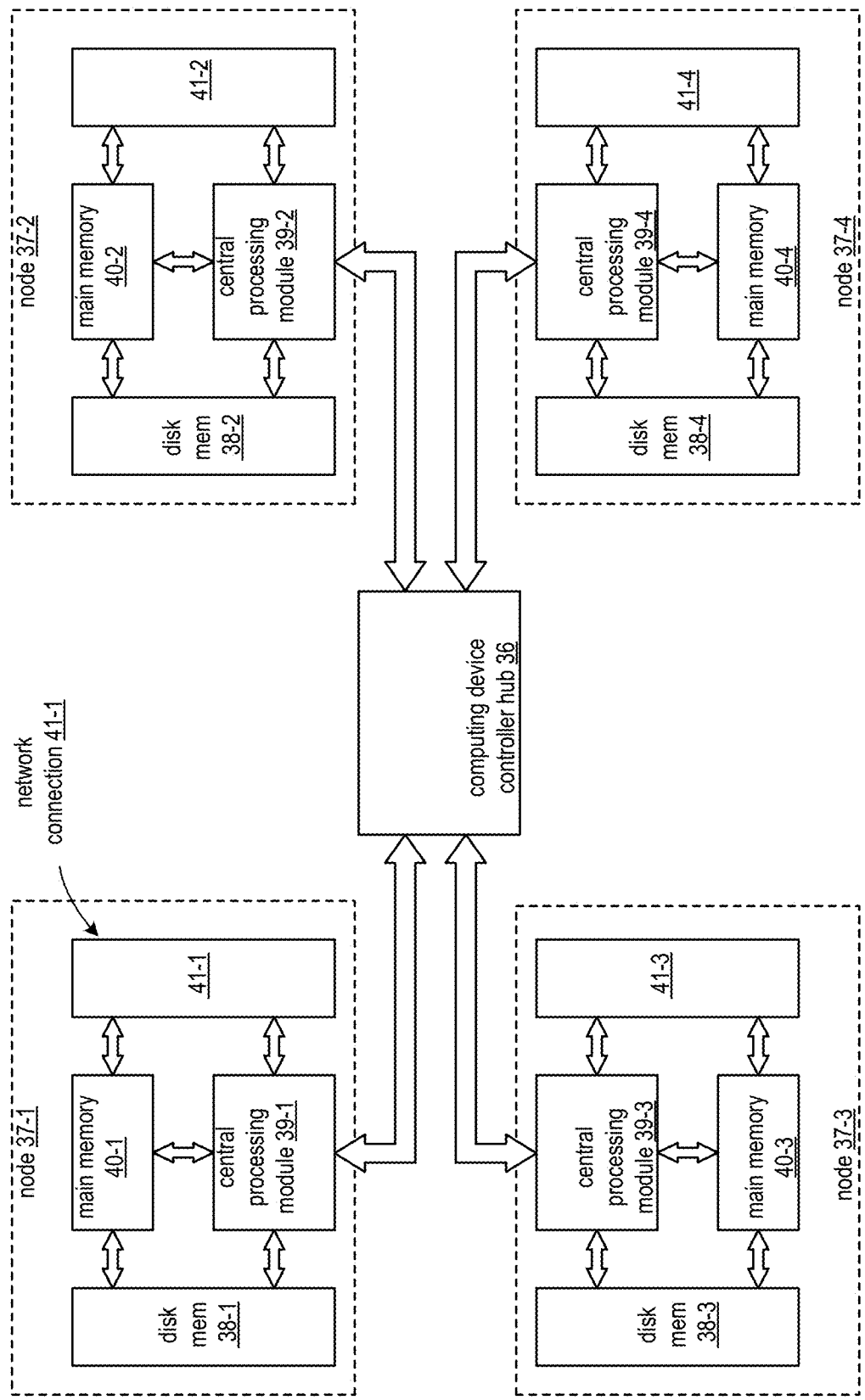
FIG. 7 is a schematic block diagram of an embodiment of a computing device in accordance with various embodiments.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
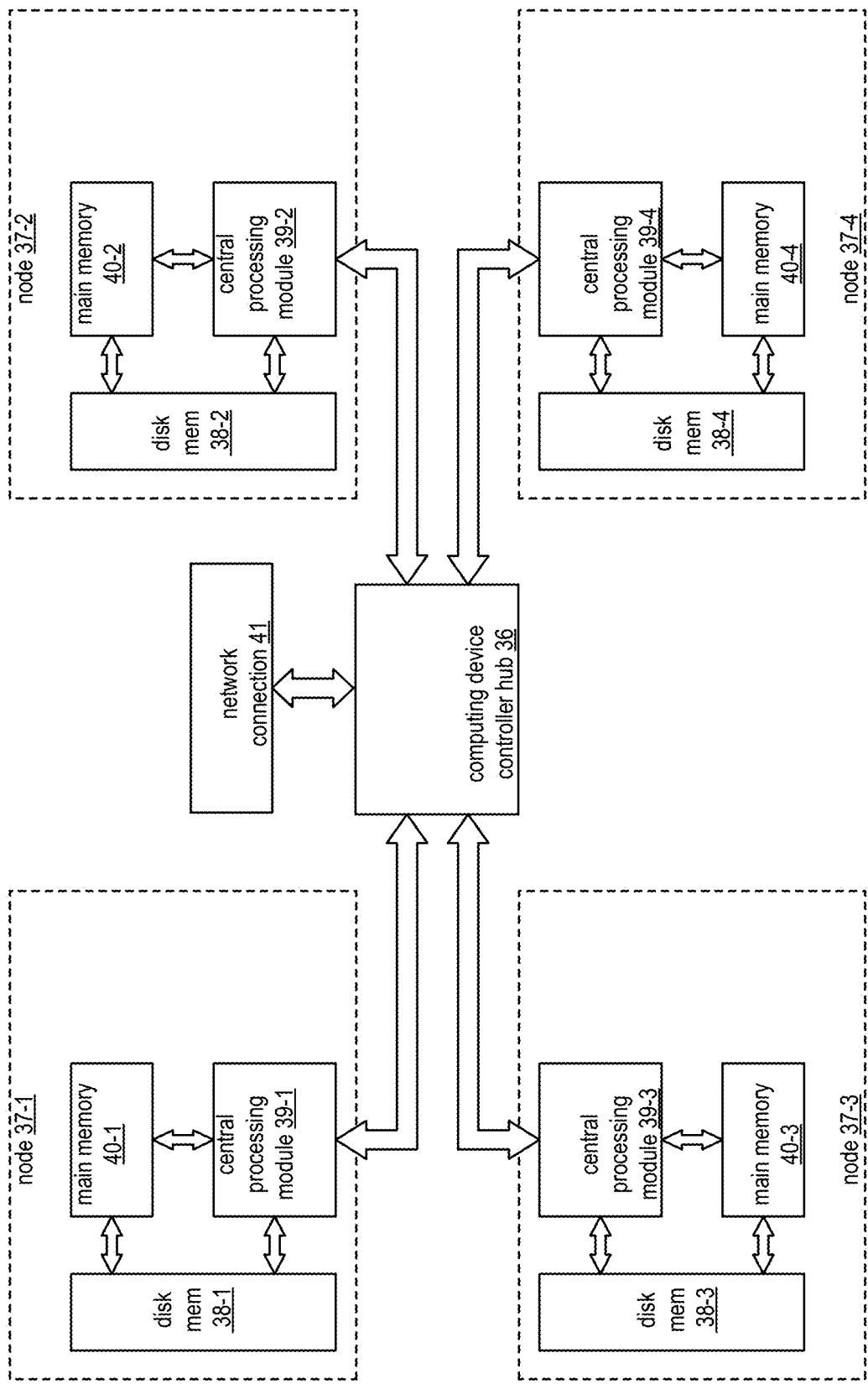
FIG. 8 is a schematic block diagram of another embodiment of a computing device in accordance with various embodiments.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
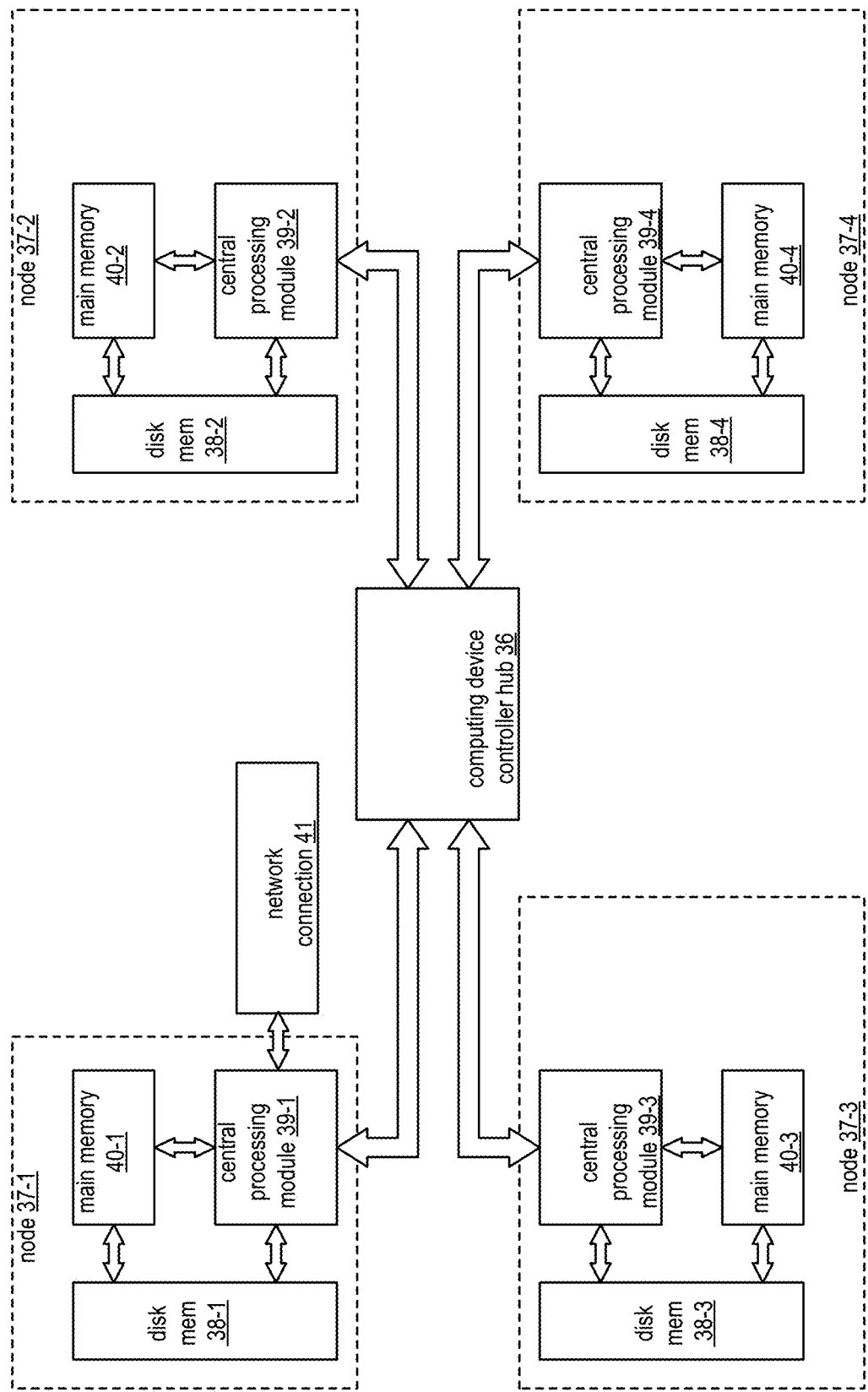
FIG. 9 is a schematic block diagram of another embodiment of a computing device in accordance with various embodiments.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
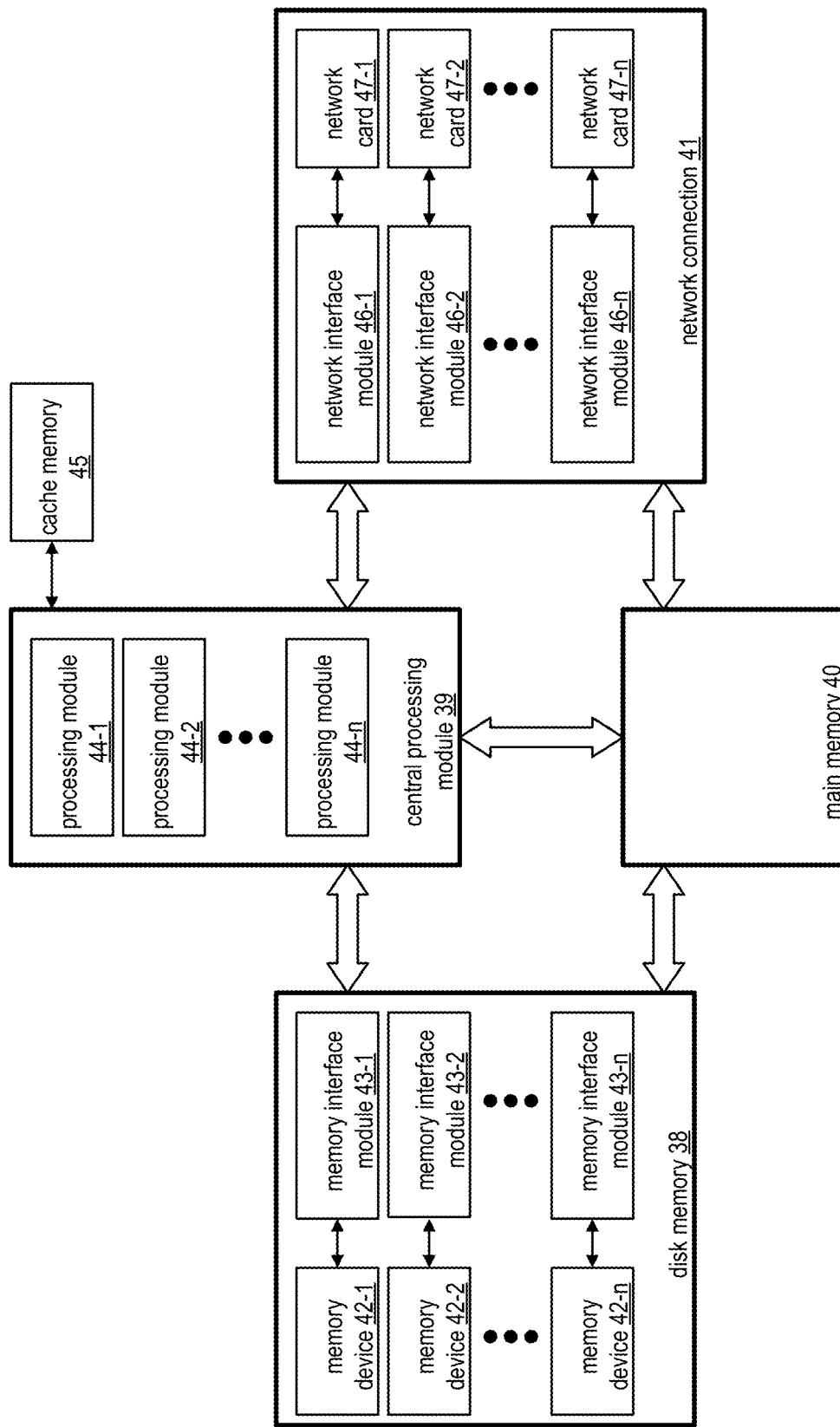
FIG. 10 is a schematic block diagram of an embodiment of a node of a computing device in accordance with various embodiments.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-*n* and a plurality of network cards 47-1 through 47-*n*. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-*n* include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
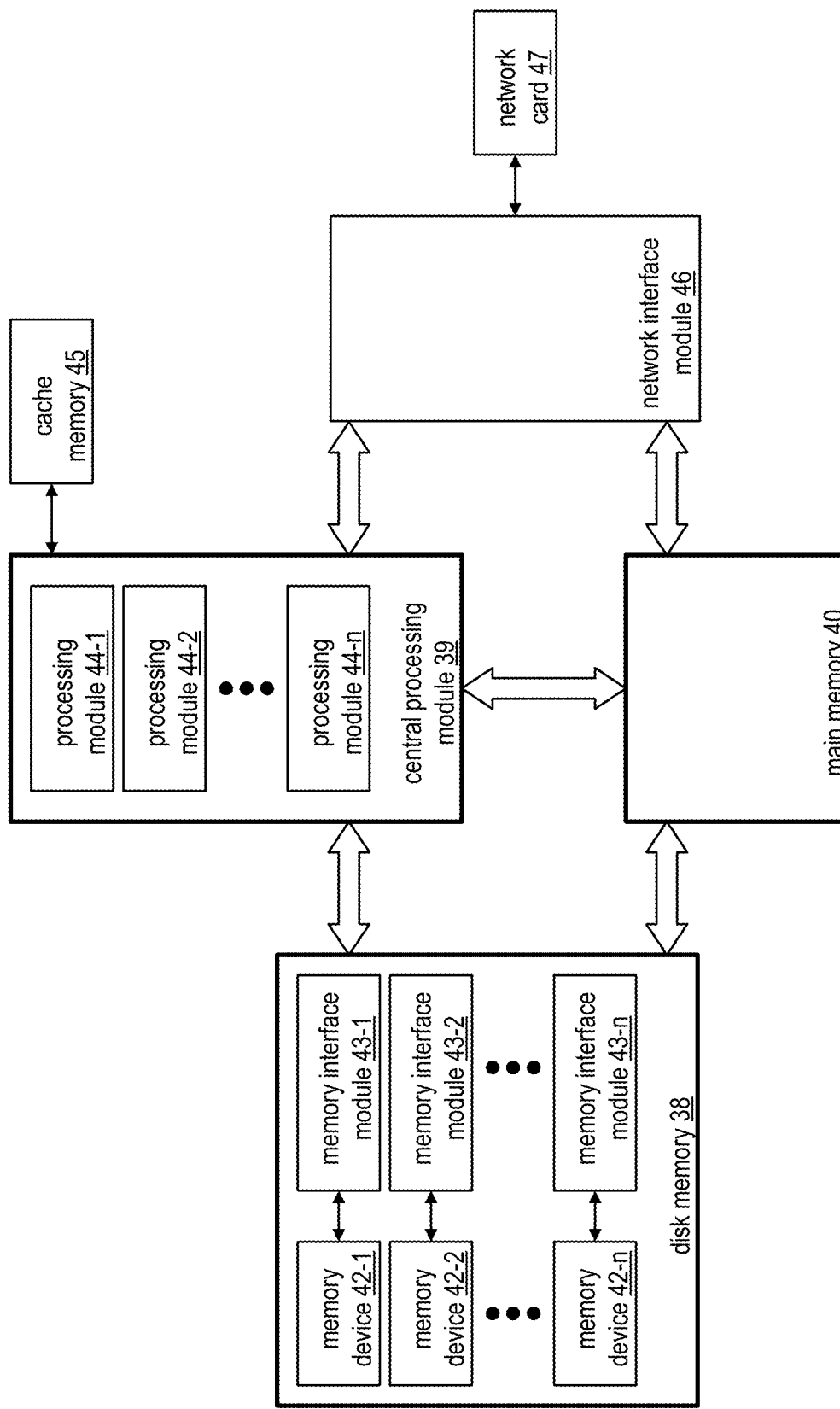
FIG. 11 is a schematic block diagram of an embodiment of a node of a computing device in accordance with various embodiments.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
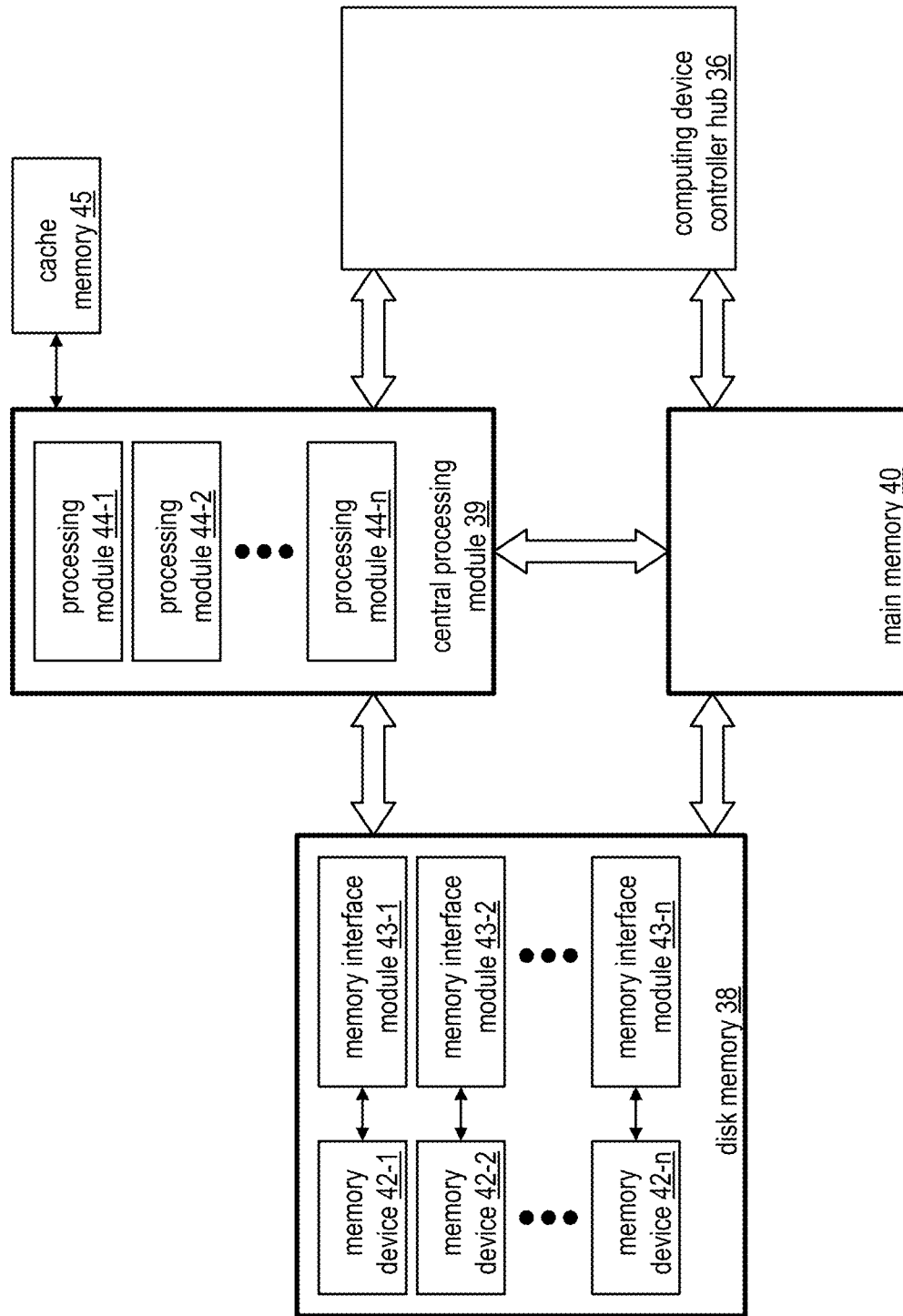
FIG. 12 is a schematic block diagram of an embodiment of a node of a computing device in accordance with various embodiments.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
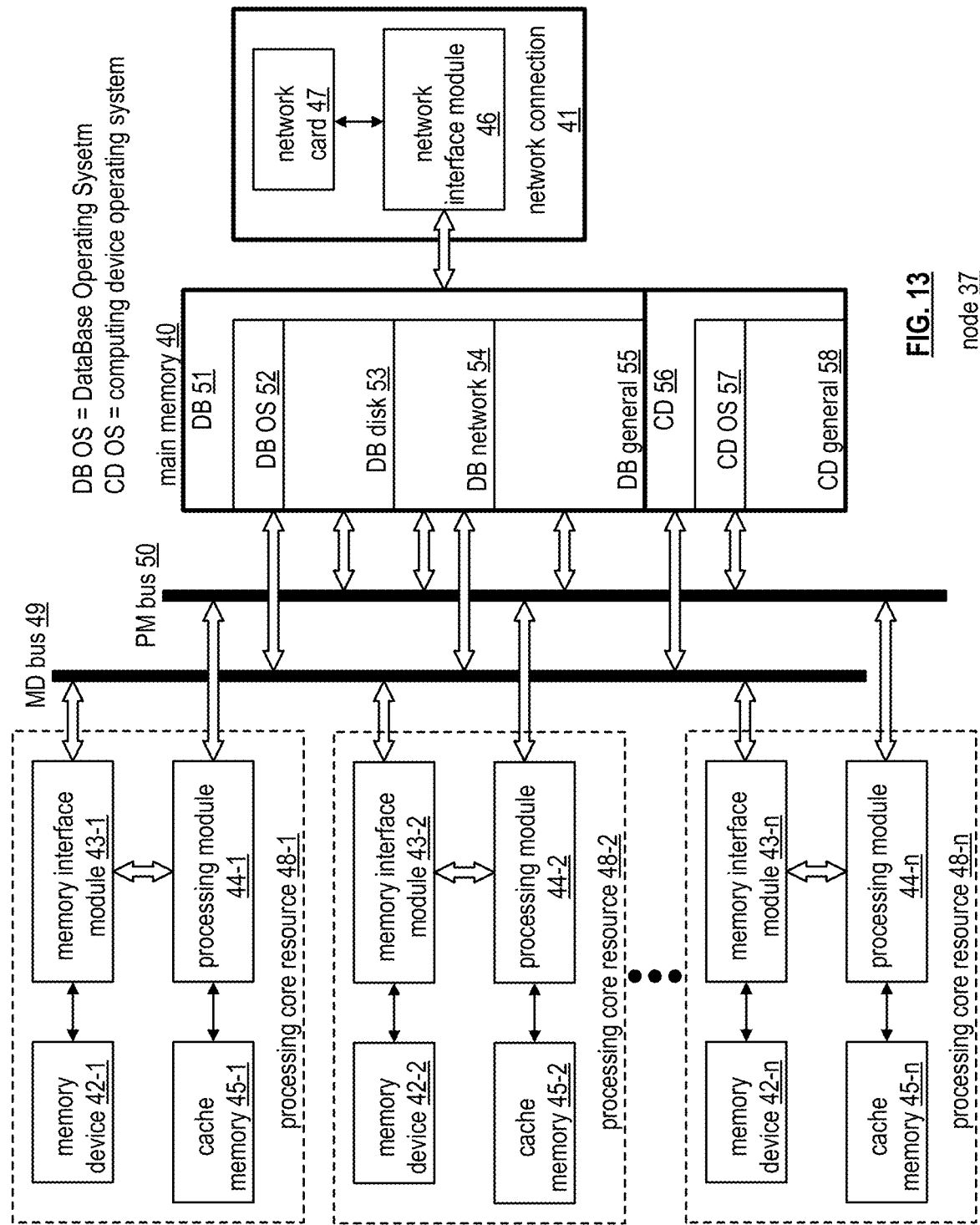
FIG. 13 is a schematic block diagram of an embodiment of a node of a computing device in accordance with various embodiments.

FIG. 13 is a schematic block diagram of another embodiment of a node 37 of computing device 18 that includes processing core resources 48-1 through 48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n*. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
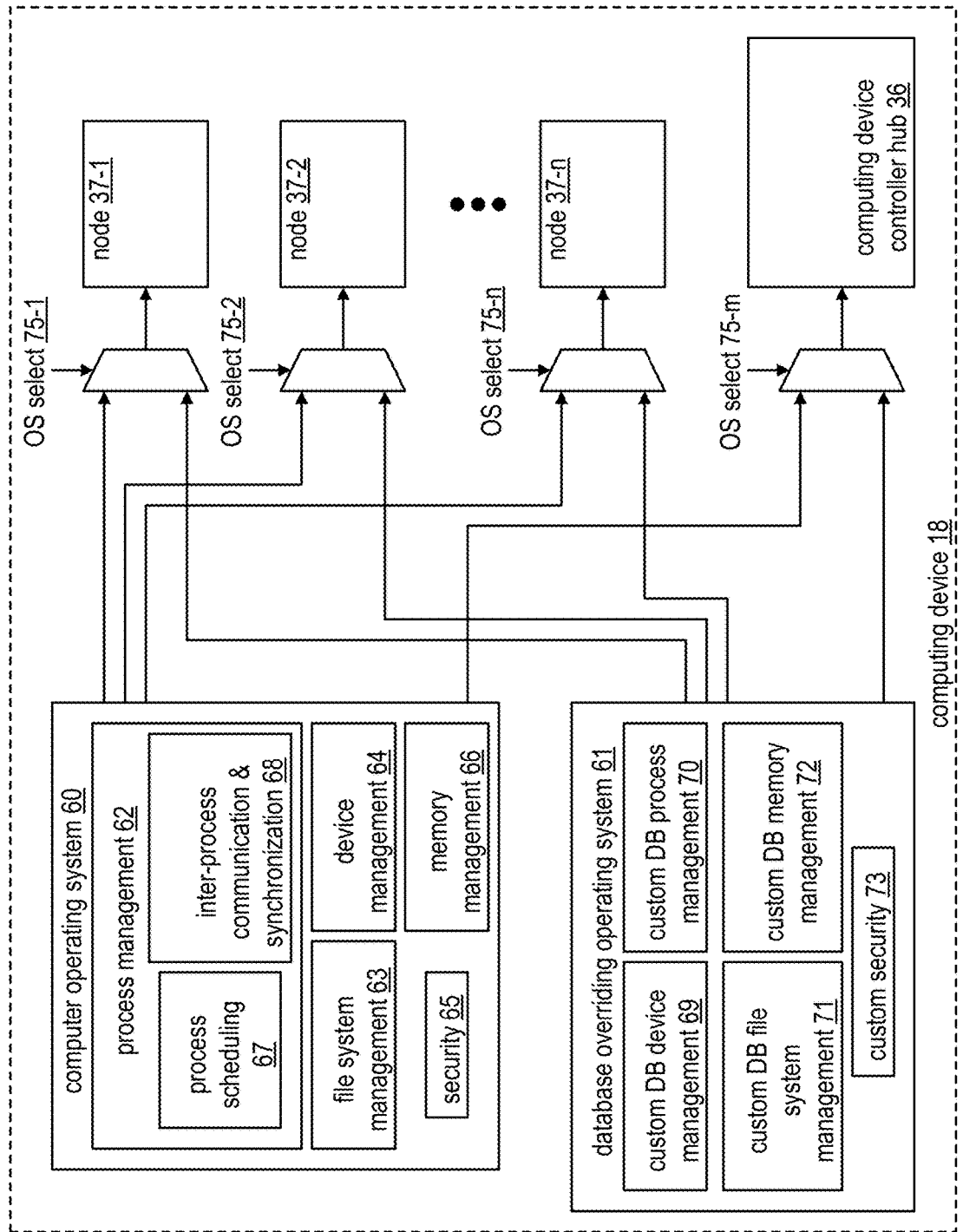
FIG. 14 is a schematic block diagram of an embodiment of operating systems of a computing device in accordance with various embodiments.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

The database system 10 can be implemented as a massive scale database system that is operable to process data at a massive scale. As used herein, a massive scale refers to a massive number of records of a single dataset and/or many datasets, such as millions, billions, and/or trillions of records that collectively include many Gigabytes, Terabytes, Petabytes, and/or Exabytes of data. As used herein, a massive scale database system refers to a database system operable to process data at a massive scale. The processing of data at this massive scale can be achieved via a large number, such as hundreds, thousands, and/or millions of computing devices 18, nodes 37, and/or processing core resources 48 performing various functionality of database system 10 described herein in parallel, for example, independently and/or without coordination.

Such processing of data at this massive scale cannot practically be performed by the human mind. In particular, the human mind is not equipped to perform processing of data at a massive scale. Furthermore, the human mind is not equipped to perform hundreds, thousands, and/or millions of independent processes in parallel, within overlapping time spans. The embodiments of database system 10 discussed herein improves the technology of database systems by enabling data to be processed at a massive scale efficiently and/or reliably.

In particular, the database system 10 can be operable to receive data and/or to store received data at a massive scale. For example, the parallelized input and/or storing of data by the database system 10 achieved by utilizing the parallelized data input sub-system 11 and/or the parallelized data store, retrieve, and/or process sub-system 12 can cause the database system 10 to receive records for storage at a massive scale, where millions, billions, and/or trillions of records that collectively include many Gigabytes, Terabytes, Petabytes, and/or Exabytes can be received for storage, for example, reliably, redundantly and/or with a guarantee that no received records are missing in storage and/or that no received records are duplicated in storage. This can include processing real-time and/or near-real time data streams from one or more data sources at a massive scale based on facilitating ingress of these data streams in parallel. To meet the data rates required by these one or more real-time data streams, the processing of incoming data streams can be distributed across hundreds, thousands, and/or millions of computing devices 18, nodes 37, and/or processing core resources 48 for separate, independent processing with minimal and/or no coordination. The processing of incoming data streams for storage at this scale and/or this data rate cannot practically be performed by the human mind. The processing of incoming data streams for storage at this scale and/or this data rate improves database system by enabling greater amounts of data to be stored in databases for analysis and/or by enabling real-time data to be stored and utilized for analysis. The resulting richness of data stored in the database system can improve the technology of database systems by improving the depth and/or insights of various data analyses performed upon this massive scale of data.

Additionally, the database system 10 can be operable to perform queries upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to retrieve stored records at a massive scale and/or to and/or filter, aggregate, and/or perform query operators upon records at a massive scale in conjunction with query execution, where millions, billions, and/or trillions of records that collectively include many Gigabytes, Terabytes, Petabytes, and/or Exabytes can be accessed and processed in accordance with execution of one or more queries at a given time, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can be distributed across hundreds, thousands, and/or millions of computing devices 18, nodes 37, and/or processing core resources 48 for separate, independent processing with minimal and/or no coordination. The processing of queries at this massive scale and/or this data rate cannot practically be performed by the human mind. The processing of queries at this massive scale improves the technology of database systems by facilitating greater depth and/or insights of query resultants for queries performed upon this massive scale of data.

Furthermore, the database system 10 can be operable to perform multiple queries concurrently upon data at a massive scale. For example, the parallelized retrieval and processing of data by the database system 10 achieved by utilizing the parallelized query and results sub-system 13 and/or the parallelized data store, retrieve, and/or process sub-system 12 can cause the database system 10 to perform multiple queries concurrently, for example, in parallel, against data at this massive scale, where hundreds and/or thousands of queries can be performed against the same, massive scale dataset within a same time frame and/or in overlapping time frames. To execute multiple concurrent queries against a massive scale of records in a reasonable amount of time such as a small number of seconds, minutes, or hours, the processing of a multiple queries can be distributed across hundreds, thousands, and/or millions of computing devices 18, nodes 37, and/or processing core resources 48 for separate, independent processing with minimal and/or no coordination. A given computing devices 18, nodes 37, and/or processing core resources 48 may be responsible for participating in execution of multiple queries at a same time and/or within a given time frame, where its execution of different queries occurs within overlapping time frames. The processing of many, concurrent queries at this massive scale and/or this data rate cannot practically be performed by the human mind. The processing of concurrent queries improves the technology of database systems by facilitating greater numbers of users and/or greater numbers of analyses to be serviced within a given time frame and/or over time.

Figure 15:
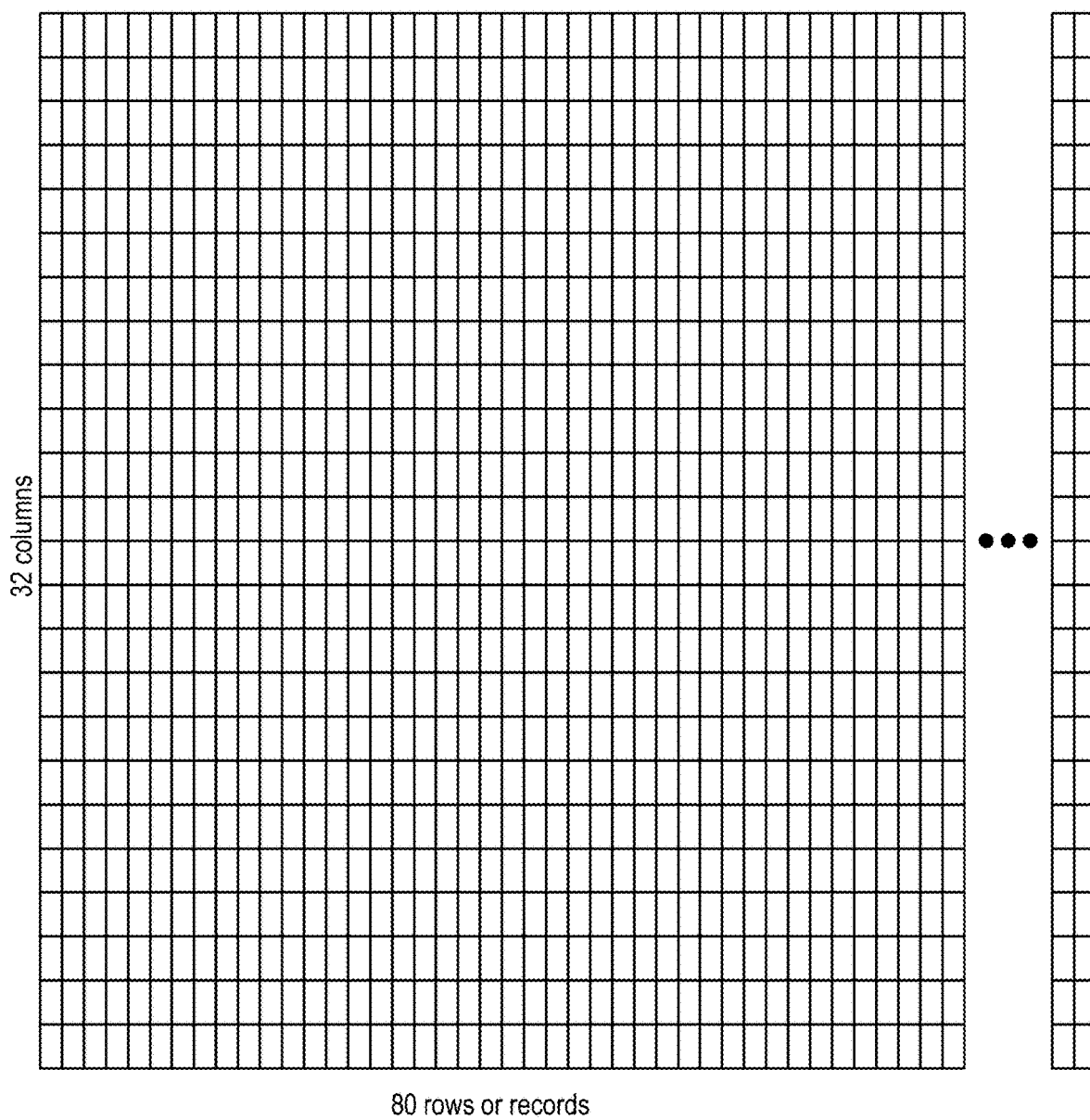

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data to financial data, to employee data, to medical data, and so on.

Figure 16:
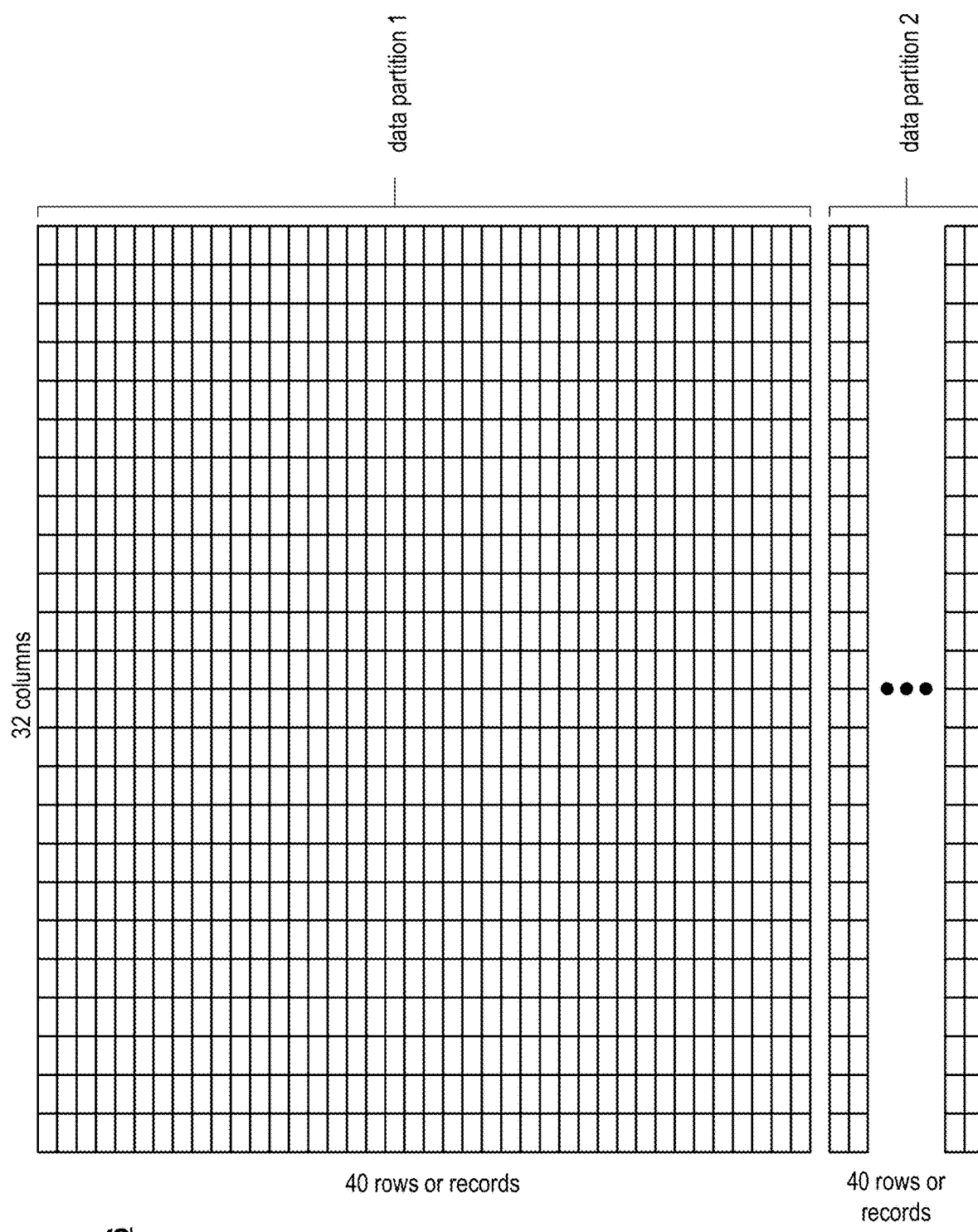

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
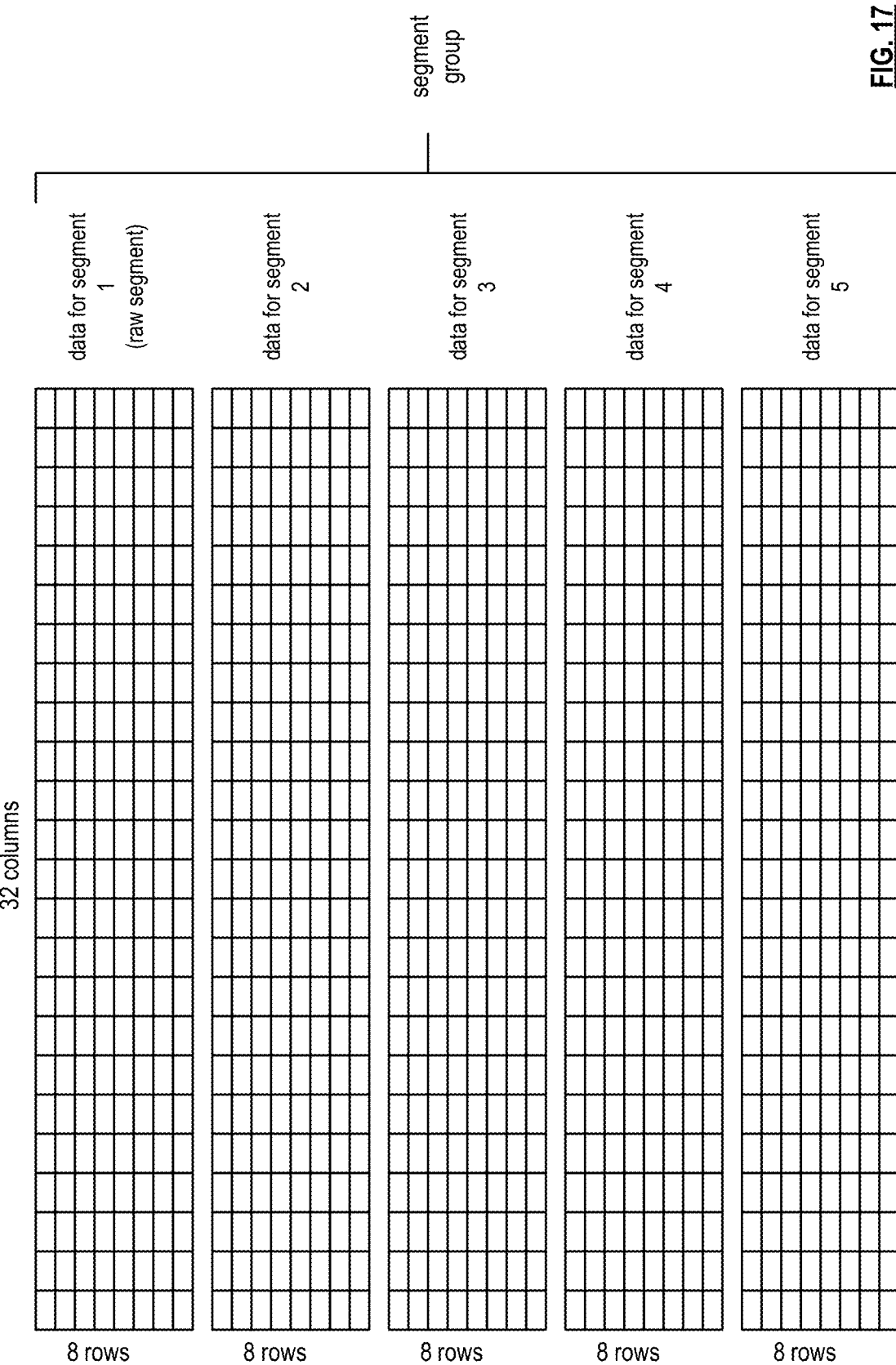

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
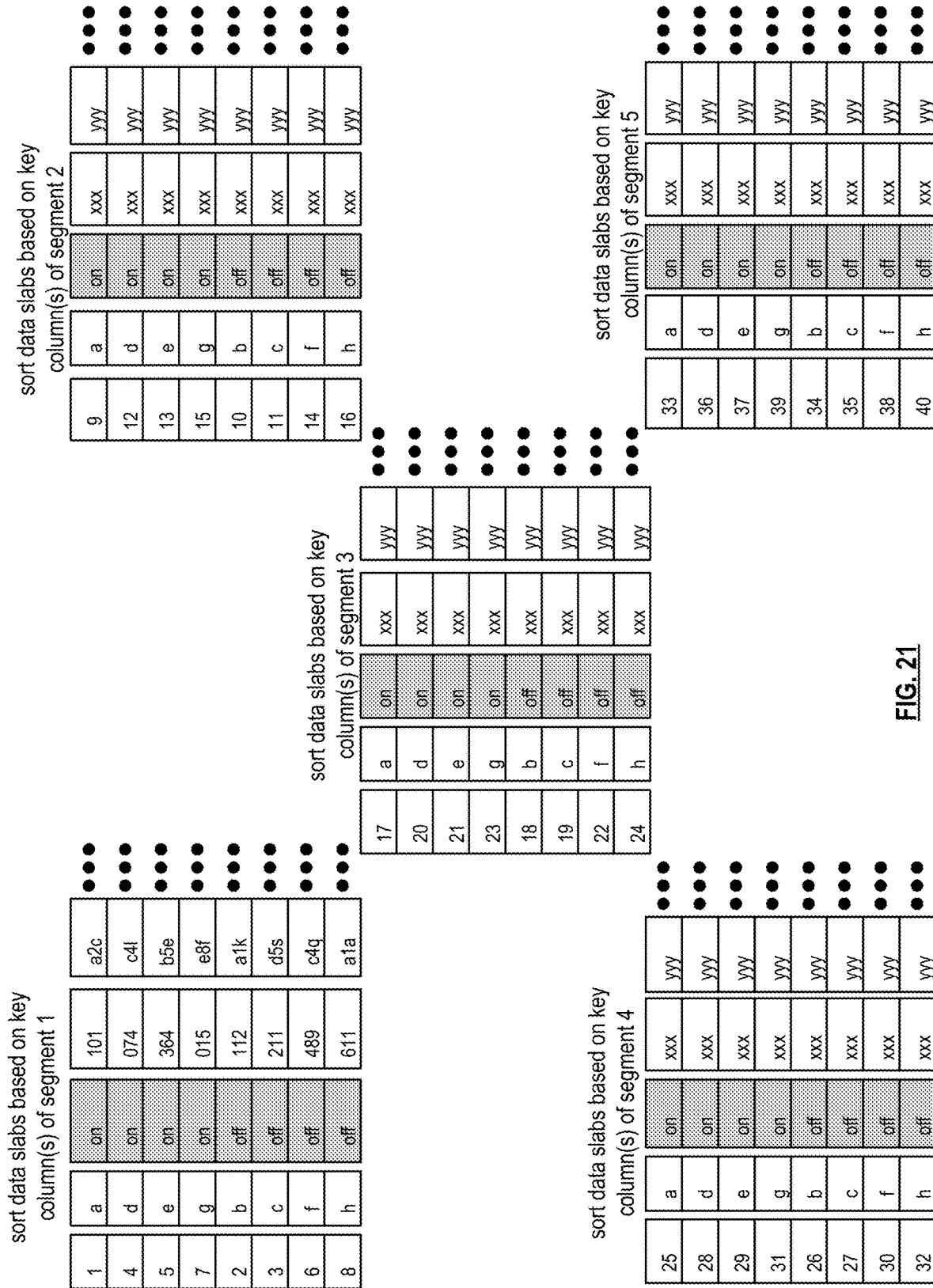

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
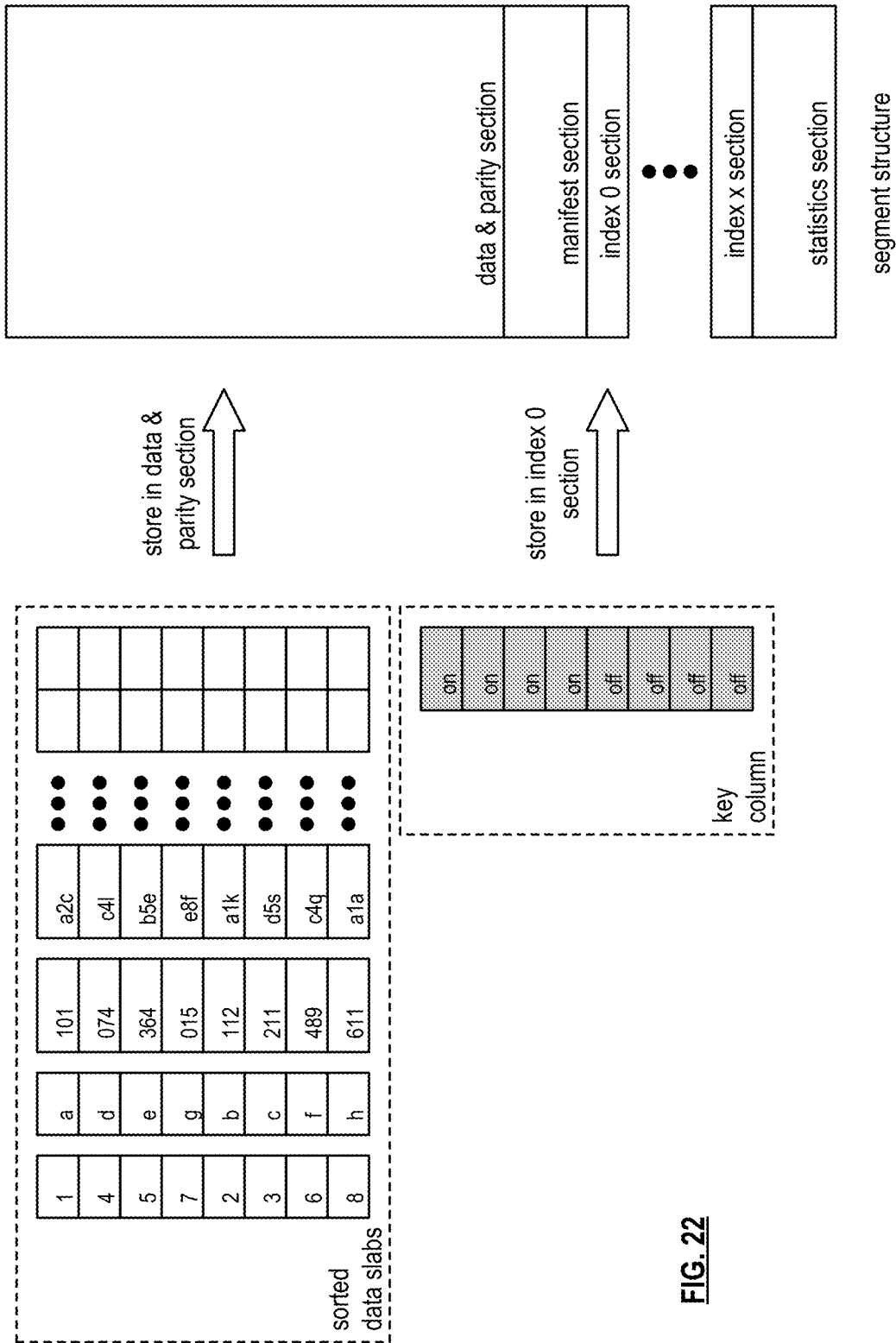

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
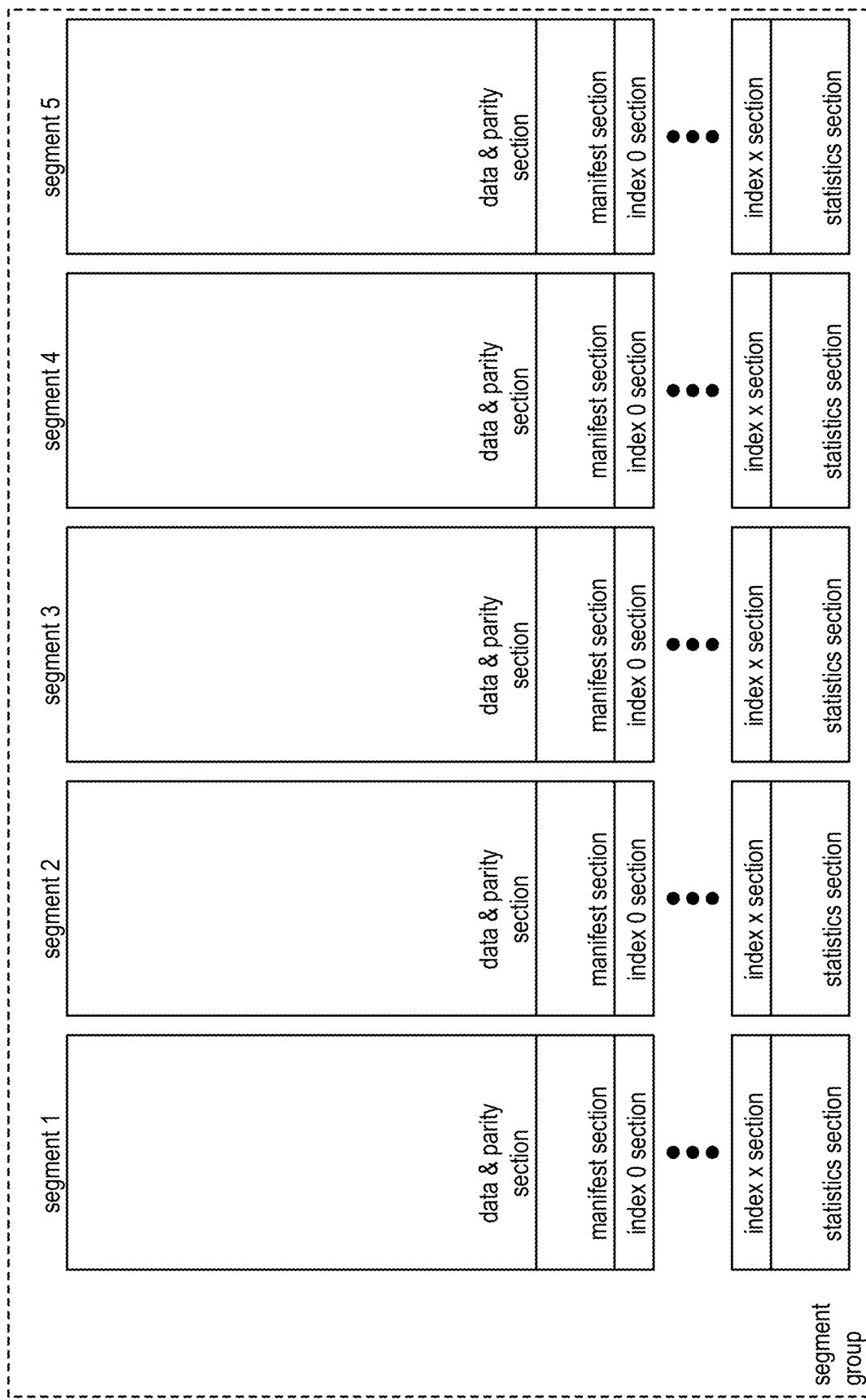

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
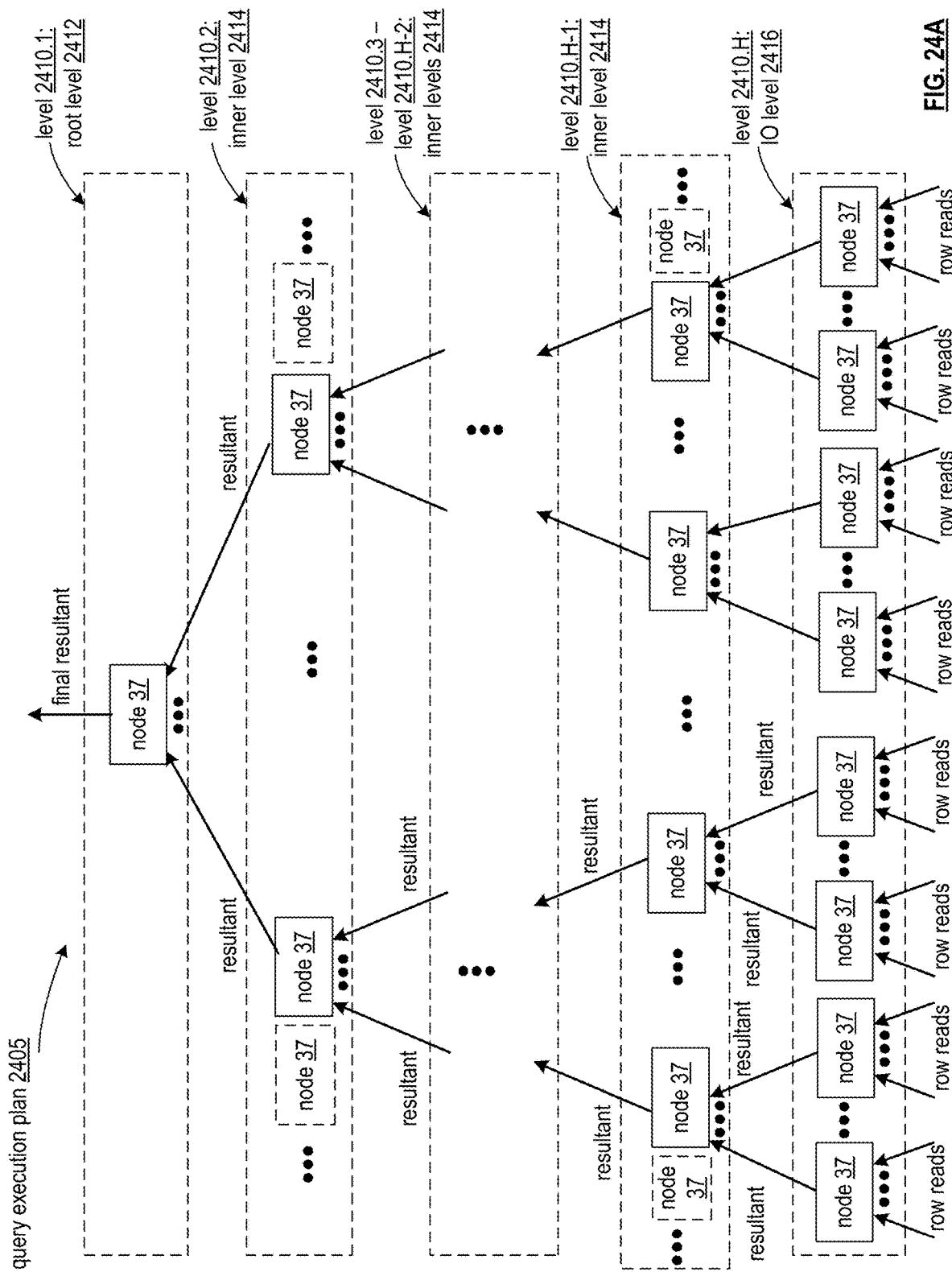
FIG. 24A is a schematic block diagram of a query execution plan implemented via a plurality of nodes in accordance with various embodiments.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
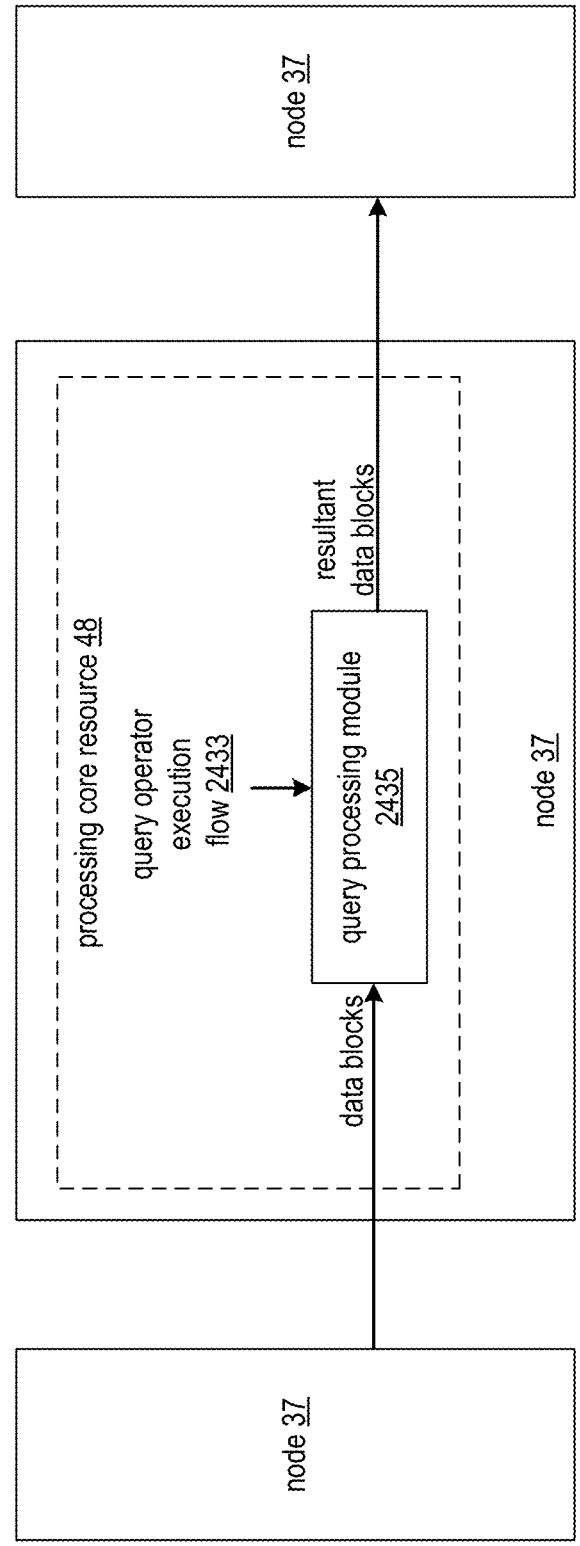
FIGS. 24B-24D are schematic block diagrams of embodiments of a node that implements a query processing module in accordance with various embodiments.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-*n*, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-*n* of a same node 37 can be executing at least one query concurrently via their own query processing module 2435, where a single node 37 implements each of set of operator processing modules 2435-1-2435-*n* via a corresponding one of the set of processing core resources 48-1-48-*n*. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-*n* of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
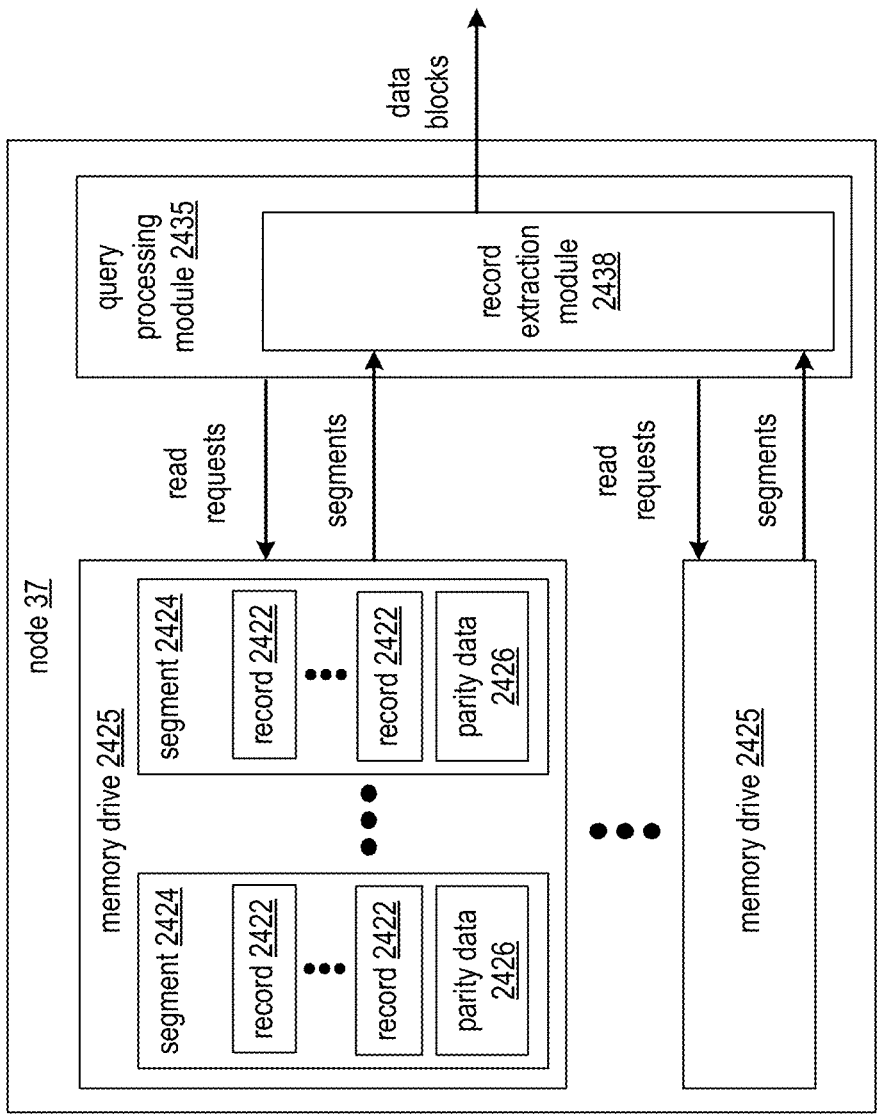
Figure 24D:
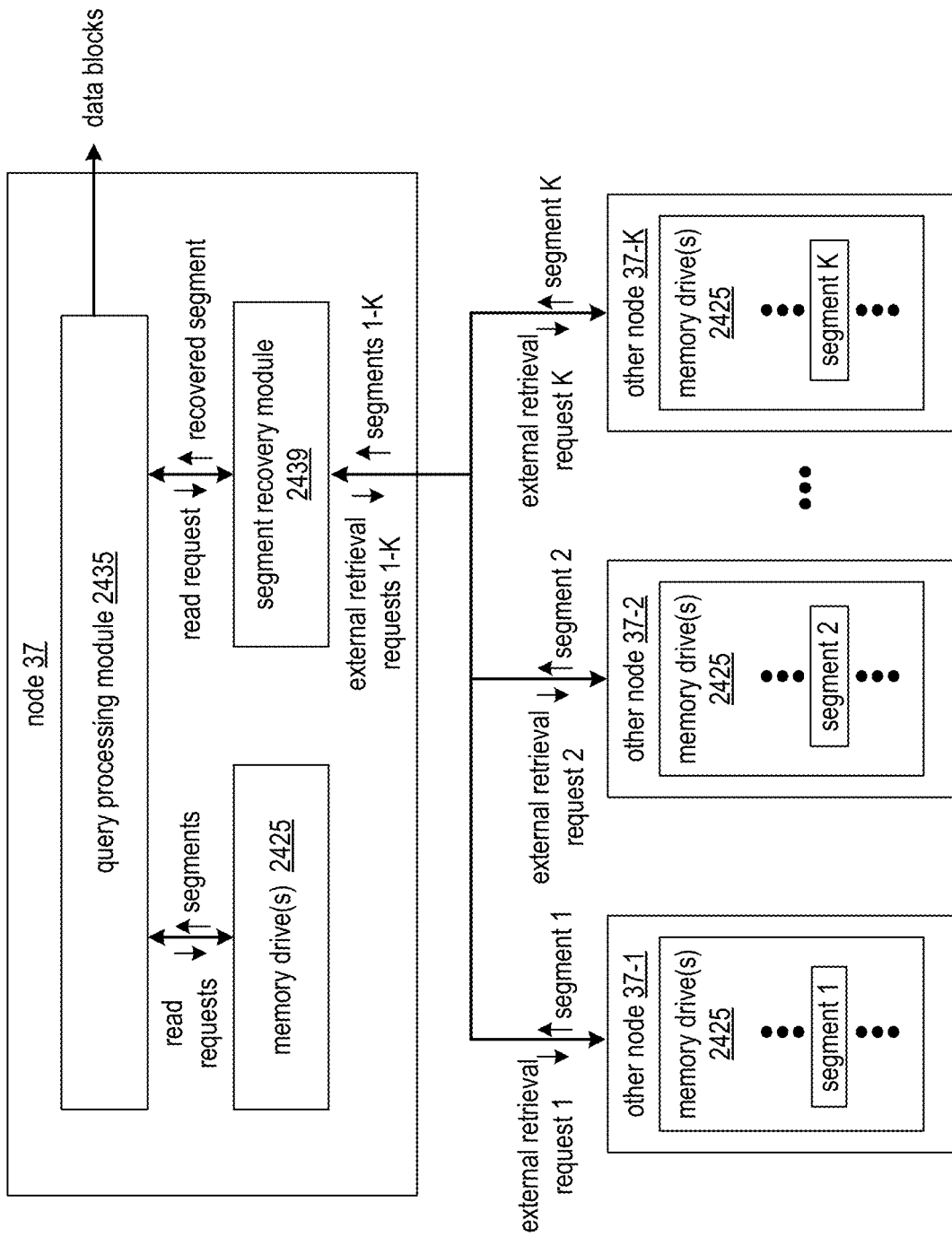

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

FIGS. 25A-29B present embodiments of a database system 10 that implements a segment indexing module 2510 to generate secondary index data 2545 for each given segment that includes a plurality of secondary indexes utilized in query executions. Unlike typical database systems, the embodiments of FIGS. 25A-29B present a per-segment secondary indexing strategy: rather than utilizing a common scheme across all segments storing records from a same database table and/or same dataset of records, different types of secondary indexes for different columns and/or in accordance with different secondary indexing schemes can be selected and generated for each given segment.

These different secondary indexing schemes are then utilized to efficiently accessing the records included in corresponding different segments in conjunction with performing query executions. For example, in order to support various index types, query predicates can be pushed down into the IO operator, where the operator guarantees to return all records that match the predicates it is given, regardless of whether it does a full table scan-and-filter or whether it is able to take advantage of deterministic or probabilistic indexes internally.

This can be advantageous in cases where, as large volumes of incoming data for a given dataset are received over long periods of time, the distribution of the data is not necessarily fixed or known at the onset of storing the corresponding rows and/or is not necessarily constant over time. Rather than applying a same secondary indexing scheme for all segments storing a table/set of rows, secondary indexes can be determined on a segment-by-segment basis, for example, based on changes in data distribution over time that causes different segments to have different local data distributions of values in their respective records. Supporting heterogeneous segments in this manner provides the flexibility needed in long-lived systems. This improves the technology of database systems by enabling improved IO efficiency for each individual segment, where data distribution changes over time are handled via selection of appropriate indexes for different groupings of data received over time.

As illustrated in FIG. 25A, a segment generator module 2506 can generate segments 2424 from one or more datasets 2502 of a plurality of records 2422 received all at once and/or received in a stream of incoming data over time. The segment generator module 2506 can be implemented via the parallelized data input sub-system 11 of FIG. 4, for example, by utilizing one or more ingress data sub-systems 25 and/or via the bulk data sub-system 23. The segment generator module 2506 can be optionally implemented via one or more computing devices 18 and/or via other processing and/or memory resources of the database system 10. The one or more datasets 2502 can be implemented as data sets 30 of FIG. 4.

The segment generator module 2506 can implement a row data clustering module 2507 to identify and segregate the dataset 2502 into different groups for inclusion in different segment groups and/or individual segments. Note that the segment generator module 2506 can implement a row data clustering module 2507 for generating segments from multiple different datasets with different types of records, records from different data sources, and/or records with different columns and/or schemas, where the records of different datasets are identified and segregated into different segment groups and/or individual segments, where different segments can be generated to include records from different datasets.

The row data clustering module 2507 can be implemented via one or more computing devices 18 and/or via other processing and/or memory resources of the database system 10. The row data clustering module can be implemented to generate segments from rows of records in a same or similar fashion discussed in conjunction with some or all of FIGS. 15-23. In some cases, the identification and segregating of the dataset 2502 into different groups for inclusion in different segment groups and/or individual segments is based on a cluster key, such as values of one or more predetermined columns of the dataset, where records 2422 with same and/or similar values of the one or more predetermined columns of the cluster key are selected for inclusion in a same segment, and/or where records 2422 with different and/or dissimilar values of the one or more predetermined columns of the cluster key are selected for inclusion in different segments.

Applying the segment generator module 2506 can include selecting and/or generating, for each segment being generated, segment row data 2505 that includes a subset of records 2422 of dataset 2502. Segment row data 2505 can be generated to include the subset of records 2422 of a corresponding segment in a column-based format. The segment row data 2505 can optionally be generated to include parity data such as parity data 2426, where the segment row data 2505 is generated for each segment in a same segment group of multiple segments by applying a redundancy storage encoding scheme to the subset of records 2422 of segment row data 2505 selected for the segments in the segment group as discussed previously.

The segment generator module 2506 can further implement a segment indexing module 2510 that generates secondary indexing data 2545 for a given segment based on the segment row data 2505 of the given segment. The segment indexing module 2510 can optionally further generate indexing data corresponding to cluster keys and/or primary indexes of the segment row data 2505 of the given segment.

The segment indexing module 2510 can generate secondary indexing data 2545 for a given segment as a plurality of secondary indexes that are included in the given segment 2424 and/or are otherwise stored in conjunction with the given segment 2424. For example, the plurality of secondary indexes of a segment's secondary indexing data 2545 can be stored in one or more index sections 0-x of the segment as illustrated in FIG. 23.

The secondary indexing data 2545 of a given segment can include one or more sets of secondary indexes for one or more columns of the dataset 2502. The one or more columns of the secondary indexing data 2545 of a given segment can be different from a key column of the dataset 2502, can be different from a primary index of the segment, and/or can be different from the one or more columns of the clustering key utilized by the row data clustering module 2507 identify and segregate the dataset 2502 into different groups for inclusion in different segment groups and/or individual segments.

In some cases, the segment row data 2505 is formatted in accordance with a column-based format for inclusion in the segment. In some cases, the segment 2424 is generated with a layout in accordance with the secondary indexing data 2545, for example, where the segment row data 2505 is optionally formatted based on and/or in accordance with secondary indexing type of the secondary indexing data 2545. Different segments 2424 with secondary indexing data 2545 in accordance with different secondary indexing types can therefore be generated to include their segment row data 2505 in accordance with different layouts and/or formats.

As segment row data 2505 and secondary indexing data 2545 is generated in conjunction with generating corresponding segments 2424 over time from the dataset 2502, the segment row data 2505 and secondary indexing data 2545 are sent to a segment storage system 2508 for storage. The segment storage system 2508 can be implemented via one or more computing devices 18 of the database system 10 and/or other memory resources of the database system 10.

For example, the segment storage system 2508 can include a plurality of memory drives 2425 of a plurality of nodes 37 of the database system 10. Alternatively or in addition, the segment storage system 2508 can be implemented via computing devices 18 of one or more storage clusters 35. The segment generator module 2506 can send its generated segments to the segment storage system 2508 via system communication resources 14 and/or via other communication resources.

A query execution module 2504 can perform query execution of various queries over time, for example, based on query requests received from and/or generated by client devices, based on configuration information, and/or based on user input. This can include performing queries against the dataset 2502 by performing row reads to the records 2422 of the dataset 2502 included in various segments 2424 stored by the segment storage system 2508. The query execution module 2504 can be implemented by utilizing the parallelized query and results subsystem 13 of FIG. 5 and/or can be implemented via other processing and/or memory resources of the database system 10.

For example, the query execution module 2504 can perform query execution via a plurality of nodes 37 of a query execution plan 2405 as illustrated in FIG. 24A, where a set of nodes 37 at IO level 2416 include memory drives 2425 that implement the segment storage system 2508 and each store a proper subset of the set of segments 2424 stored by the segment storage system 2508, and where this set of nodes further implement the query execution module 2504 by performing row reads their respective stored segments as illustrated in FIG. 24C and/or by reconstructing segments from other segments in a same segment group as illustrated in FIG. 24D. The data blocks outputted by nodes 37 at IO level 2416 can include records 2422 and/or a filtered set of records 2422 as required by the query, where nodes 37 at one or more inner levels 2414 and/or root level 2412 further perform query operators in accordance with the query to render a query resultant generated by and outputted by a root level node 37 as discussed in conjunction with FIGS. 24A-24D.

The secondary indexing data 2545 of various segments can be accessed during query executions to enable more efficient row reads of records 2422 included in the segment row data 2505 of the various segments 2424. For example, in performing the row reads at the IO level 2416, the query execution module 2504 can access and utilize the secondary indexing data 2545 of one or more segments being read for the query to facilitate more efficient retrieval of records from segment row data 2505. In some cases, the secondary indexing data 2545 of a given segment enables selection of and/or filtering of rows required for execution of a query in accordance with query predicates or other filtering parameters of the query.

FIG. 25B illustrates an embodiment of the segment indexing module 2510. Some or all features and/or functionality of the segment indexing module 2510 of FIG. 25B can be utilized to implement the segment indexing module 2510 of FIG. 25A and/or any other embodiment of the segment indexing module 2510 discussed herein.

The segment indexing module 2510 can implement a secondary indexing scheme selection module 2530. To further improve efficiency in accessing records 2422 of various segments 2424 in conjunction with execution of various queries, different segments can have their secondary indexing data 2545 generated in accordance with different secondary indexing schemes, where the secondary indexing scheme is selected for a given segment to best improve and/or optimize the IO efficiency for that given segment.

In particular, the secondary indexing scheme selection module 2530 is implemented to determine the existence, utilized columns, type, and/or parameters of secondary indexes on a per-segment basis rather than globally. When a segment 2424 is generated and/or written, the secondary indexing scheme selection module 2530 generates secondary indexing scheme selection data 2532 by selecting which index strategies to employ for that segment. The secondary indexing scheme selection data 2532 can correspond to selection of a utilized columns, type, and/or parameters of secondary indexes of the given segments from a discrete and/or continuous set of options indicated in secondary indexing scheme option data 2531.

The selection of each segment's secondary indexing scheme selection data 2532 can be based on the corresponding segment row data 2505, such as local distribution data determined for the corresponding segment row data 2505 as discussed in conjunction with FIG. 25D. This selection can optionally be further based on other information generated automatically and/or configured via user input, such as the user-generated secondary indexing hint data and/or system-generated secondary indexing hint data discussed in conjunction with FIG. 26A.

The secondary indexing scheme selection data 2532 can indicate index types and/or parameters selected for each column. In some embodiments, the secondary indexing scheme selection data 2532 can indicate a revision of the secondary indexing scheme selection module 2530 used to determine the secondary indexing scheme selection data 2532.

The secondary indexing scheme selection data 2532 of a given segment can be utilized to generate corresponding secondary indexing data 2545 for the corresponding segment row data 2505 of the given segment 2424. The secondary indexing data 2545 of each segment is thus generated accordance with the columns, index type, and/or parameters for selected for secondary indexing of the segment by the secondary indexing scheme selection module 2530.

Some or all of the secondary indexing scheme selection data 2532 can be stored as segment layout description data that is mapped to the respective segment. The segment layout description data for each segment can be extractible to identify the index types and/or parameters for each column indexed for the segment, and/or to determine which version of the secondary indexing scheme selection module 2530 was utilized to generate the corresponding secondary indexing scheme selection data 2532. For example, the segment layout description data is stored and/or is extractible in accordance with a JSON format.

FIG. 25C illustrates an embodiment of the segment indexing module 2510. Some or all features and/or functionality of the segment indexing module 2510 of FIG. 25C can be utilized to implement the segment indexing module 2510 of FIG. 25B and/or any other embodiment of the segment indexing module 2510 discussed herein.

The discrete and/or continuous set of options indicated in secondary indexing scheme option data 2531 can include a plurality of indexing types 2532-1-2532-L. Each indexing type 2532-1-2532-L be applied to one column of the dataset 2502 and/or to a combination of multiple columns of the dataset 2502.

In some cases, the set of indexing types 2532-1-2532-L can include one or more secondary index types utilized in database systems. In some cases, the set of indexing types 2532-1-2532-L includes one or more of the following index types:

Cluster Key (used in conjunction): When cluster key columns are used in conjunction with other columns, the cluster key index can be first used to limit the row range considered by other indexes.

Cluster Key (used in disjunction): When cluster key columns are used in a disjunction with other columns, they can be treated like other secondary indexes.

Inverted Index: This type can be implemented as a traditional inverted index mapping values to a list of rows containing that value.

Bitmap index: This type can be implemented as, logically, a |rows|×|column| bitmap where the bit at (R, C) indicates whether row R contains value C. This can be highly compressed.

Bitmap index with binning/Column imprint: This type can be implemented as a Bitmap index variant where each bit vector represents a value range, similar to a histogram bucket. This type can handle high-cardinality columns. When rows are also binned (by, for example, cache-line), this becomes a "column imprint."

Bloom filter: This type can be implemented as a probabilistic structure trading some false-positive rate for reduced index size. For example, a bloom filter where the bit at hashK(R . . . C) indicates whether row R may contain value C. In modeling, storing a small bloom filter corresponding to each logical block address (LBA) can have a good space/false-positive tradeoff and/or can eliminates hashing overhead by allowing the same hash values to be used when querying each LBA.

SuRF: This type can be implemented as a probabilistic structure, which can support a range of queries. This type can optionally be used to determine whether any value in a range exists in an LBA.

Projection index: This type can be implemented where a duplicate of a given column or column tuple is sorted differently than the cluster key. For example, a compound index on (foo DESC, bar ASC) would duplicate the contents of columns foo and bar as 4-tuples (foo value, bar value, foo row number, bar row number) sorted in the given order.

Data-backed "index": This type can be implemented to scan and filter an entire column, using its output as an index into non-index columns. In some cases, this type requires no changes to storage.

Filtering index/zonemaps (Min/max, discrete values): This type can be implemented as a small filtering index to short-circuit queries. For example, this type can include storing the min and max value or the set of distinct values for a column per-segment or per-block. In some cases, this type is only appropriate when a segment or block contains a small subset of the total value range.

Composite index: This type can be implemented to combines one or more indexes for a single column, such as one or more index types of the set of index type options. For example, a block-level probabilistic index is combined with a data-backed index for a given column.

In some cases, the set of indexing types 2532-1-2532-L can include one or more probabilistic indexing types corresponding to a probabilistic indexing scheme discussed in conjunction with FIGS. 30A-37C. In some cases, the set of indexing types 2532-1-2532-L can include one or more subset-based indexing types corresponding to an inverted indexing scheme as discussed in conjunction with FIGS.

34A-34D. In some cases, the set of indexing types 2532-1-2532-L can include one or more subset-based indexing types corresponding to a subset-based indexing scheme discussed in conjunction with FIG. 35A-35D. In some cases, the set of indexing types 2532-1-2532-L can include one or more suffix-based indexing types corresponding to a subset-based indexing scheme discussed in conjunction with FIG. 36A-36D.

This set of columns to which some or all of the plurality of indexing types 2532-1-2532-L can be selected for application can be indicated in the secondary indexing scheme option data 2531 as dataset schema data 2514, indicating the set of columns 2512-1-2512-C of the dataset 2502 and optionally indicating the datatype of each of the set of columns 2512-1-2512-C. Different datasets 2502 can have different dataset schema data 2514 based on having records that include different sets of data and/or types of data in accordance with different sets of columns.

One or more of the plurality of indexing types 2532-1-2532-L can be further configurable via one or more configurable parameters 2534. Different ones of the plurality of indexing types 2532-1-2532-L can have different sets of and/or numbers of configurable parameters 2534-1-2534-R, based on the parameters that are appropriate to the corresponding indexing type. In some cases, at least one of the configurable parameters 2534 can have its corresponding one or more values selected from a continuous set of values and/or options. In some cases, at least one of the configurable parameters 2534 can have its corresponding one or more values selected from a discrete set of values and/or options. Ranges, sets of valid options, and/or other constraints to the configurable parameters 2534 of some or all of the more of the plurality of indexing types 2533 can be indicated in the secondary indexing scheme option data 2531.

In some cases, at least one of the configurable parameters 2534 can correspond to a false-positive tuning parameter of a probabilistic indexing scheme as discussed in conjunction with FIGS. 30A-37C. For example, the false-positive tuning parameter of a probabilistic indexing scheme is selected as a configurable parameter 2534 as discussed in conjunction with FIGS. 37A-37C.

The secondary indexing scheme selection module 2530 can determine which columns of the set of columns 2512-1-2512-C will be indexed via secondary indexes for the segment row data 2505 of a given segment by selecting a set of selected columns 2513-1-2513-D as a subset of the set of columns set of columns 2512-1-2512-C. This can include selecting a proper subset of the set of columns 1-C. This can include selecting none of the columns 1-C. This can include selection all of the columns 1-C. The selected columns 2513-1-2513-D for the given segment can be indicated in the resulting secondary indexing scheme selection data 2532. Different sets of selected columns 2513-1-2513-D and/or different numbers of selected columns 2513-1-2513-D can be selected by the secondary indexing scheme selection module 2530 for different segments.

The secondary indexing scheme selection module 2530 can further determine which one of more of the set of indexing types 2532-1-2532-L will be utilized for each selected column 2513-1-2513-D. In this example, selected indexing type 2533-1 is selected from the set of indexing types 2532-1-2532-L to index selected column 2513-1, and selected indexing type 2533-D is selected from the set of indexing types 2532-1-2532-L to index selected column 2513-D.

For a given column selected to be indexed, a single index type can be selected for indexing the column, as illustrated in this example. In some cases, multiple different index types are optionally selected for indexing the column of a given segment, where a plurality of indexes are generated for the column for each of the multiple different index types.

For a given segment, different selected columns can have same or different ones of the set of indexing types 2532-1-2532-L selected. For example, for a given segment, a first indexing type is selected for indexing a first column of the dataset, and a second indexing type is selected for indexing a second column of the dataset.

Different segments with the same set of selected columns 2513-1-2513-D can have the same or different ones of the set of indexing types 2532-1-2532-L selected for the same column. For example, a particular column is selected to be indexed for both a first segment and a second segment. A first one of the set of indexing types 2532-1-2532-L is selected to index the particular column for the first segment, and a second one of the set of indexing types 2532-1-2532-L is selected to index the particular column for the second segment. As a particular example, a bloom filter is selected to index the particular column for the first segment, and a b-tree is selected to index the given column for the second segment.

The secondary indexing scheme selection module 2530 can further configure the parameters of each selected indexing type 2533-1-2533-D. This can include selecting, for each selected indexing type 2533, a set of one or more selected parameters 2535-1-2535-R, where each selected parameter 2535 is a selected value and/or option for the corresponding configurable parameter 2534 of the corresponding indexing type 2533.

For a given segment, different selected columns can have same ones of the set of indexing types 2532-1-2532-L selected with the same or different selected parameters. For example, for a given segment, a particular indexing type is selected for indexing a first column of the dataset with a first set of selected parameters 2535-1-2535-R, and the same particular indexing type is selected for indexing a second column of the dataset with a second set of selected parameters 2535-1-2535-R with value that are different from the first set of selected parameters 2535-1-2535-R.

Different segments with the same set of selected indexing types 2533-1-2533-D for the same set of selected columns 2513-1-2513-D with the same or different selected parameters. For example, a particular column is selected to be indexed for both a first segment and a second segment via a particular indexing type. A first set of selected parameters 2535-1-2535-R are selected for indexing the particular column via the particular indexing type for the first segment, and a different, second set of selected parameters 2535-1-2535-R are selected for indexing the particular column via the particular indexing type for the second segment.

In some cases, none of the parameters of a given selected indexing type 2533 are configurable, and no parameters values are selected for the given selected indexing type 2533. For example, this given selected indexing type 2533 is applied by the secondary index generator module 2540 to generate the plurality of indexes in accordance with predetermined parameters of the selected indexing type 2533.

FIG. 25D illustrates another embodiment of the segment indexing module 2510. Some or all features and/or functionality of the segment indexing module 2510 of FIG. 25D can be utilized to implement the segment indexing module 2510 of FIG. 25B and/or any other embodiment of the segment indexing module 2510 discussed herein.

As illustrated in FIG. 25D, local distribution data 2542 can be generated for each segment row data 2505 via a local distribution data generator 2541. The secondary indexing scheme selection module 2530 generates the secondary indexing scheme selection data 2532 for a given segment based on the local distribution data 2542 of the given segment. Different segments 2424 can thus have different secondary indexing scheme selection data 2532 based on having different local distribution data 2542.

As a result, it can be normal for different segments of the same dataset 2502, such as a same database table, to have secondary index data in accordance with different columns of the dataset, different index types, and/or parameters. Furthermore, it can be advantageous for different segments of the same dataset 2502, such as a same database table, to have different secondary index data when these different segments have different local distribution data. In particular, the different secondary indexing scheme employed for different segments can be selected by the secondary indexing scheme selection module 2530 to leverage particular aspects of their respective local distribution data to improve IO efficiency during row reads.

The local distribution data for given segment row data 2505 can indicate the range, mean, variance, histogram data, probability density function data, and/or other distribution information for values of one or more columns in the set of records included in the given segment row data 2505. The local distribution data for given segment row data 2505 can indicate column cardinality, column range, and/or column distribution of one or more columns of the dataset for records 2422 included in the given segment row data 2505. The local distribution data for given segment row data 2505 can be optionally generated based on sampling only a subset of values included in records of the segment row data 2505, where the local distribution data is optionally probabilistic and/or statistical information. The local distribution data for given segment row data 2505 can be optionally generated based on sampling all values included in records of the segment row data 2505, where the local distribution data indicates the true distribution of the records in the segment. The local distribution data for given segment row data 2505 can optionally generated as some or all of the statistics section of the corresponding segment, for example, as illustrated in FIGS. 22 and 23.

In some cases, the secondary indexing scheme selection module 2530 can generate the secondary indexing scheme selection data 2532 by performing one or more heuristic functions and/or optimizations. In particular, the selected columns, corresponding selected indexing types, and/or corresponding selected parameters can be selected for a given segment by performing the performing one or more heuristic functions and/or optimizations. The one or more heuristic functions and/or optimizations can generate the secondary indexing scheme selection data 2532 as functions of: the segment row data 2505 for the given segment; local distribution data 2542 determined for the segment row data 2505 for the given segment; user-generated secondary indexing hint data, system-generated secondary indexing hint data, and/or other information.

The one or more heuristic functions and/or optimizations can be configured via user input, can be received from a client device or other computing device, can be automatically generated, and/or can be otherwise determined. For example, a user or administrator can configure the more heuristic functions and/or optimizations via administrative sub-system 15 and/or configuration sub-system 16.

In cases where the one or more heuristic functions and/or optimizations are configured, the one or more heuristic functions and/or optimizations can optionally change over time, for example, based on new heuristic functions and/or optimization functions being introduced and/or based existing heuristic functions and/or optimization functions being modified. In such cases, newer segments generated from more recently received data of the dataset 2502 can have secondary indexing scheme selection data 2532 generated based on applying the more recently updated heuristic functions and/or optimization functions, while older segments generated from older received data of the dataset 2502 can have secondary indexing scheme selection data 2532 generated based on prior versions of heuristic functions and/or optimization functions. In some cases, one or more older segments can optionally be identified for re-indexing by applying the more recently updated heuristic functions and/or optimization functions to generate new secondary indexing scheme selection data 2532 for these older segments, for example, based on application of these more recently updated heuristic functions and/or optimization functions rendering secondary indexing scheme selection data 2532 with more efficient row reads to these one or more older segments. Such embodiments are discussed in further detail in conjunction with FIGS. 27A-27C.

The secondary index generator module 2540 can generate indexes for a given segment by indexing each selected column 2513 indicated in the secondary indexing scheme selection data 2532 for the given segment in accordance with the corresponding selected indexing type 2533 indicated in the secondary indexing scheme selection data 2532 for the given segment, and/or in accordance with the parameter selections 2535-1-2535-R indicated in the secondary indexing scheme selection data 2532 for the corresponding selected indexing type 2533. In this example, as D selected columns are indicated to be indexed via selected indexing types 2533-1-2533-D, D sets of secondary indexes 2546-1-2546-D are thus generated via the secondary index generator module. Each set of secondary indexes 2546 indexes the corresponding selected column 2513 via the corresponding selected indexing type 2533 in accordance with the corresponding parameter selections 2535-1-2535-R.

Some or all of the secondary indexing scheme option data 2531 can be configured via user input, can be received from a client device or other computing device, can be automatically generated, and/or can be otherwise determined. For example, a user or administrator can configure the secondary indexing scheme option data 2531 via administrative sub-system 15 and/or configuration sub-system 16.

In cases where the secondary indexing scheme option data 2531 is configured, the secondary indexing scheme option data 2531 can optionally change over time, for example, based on new indexing types being introduced and/or based on the query execution module 2504 being updated to enable access and use of to these new indexing types during row reads of query executions.

In such cases, newer segments generated from more recently received data of the dataset 2502 may have columns indexed via these newer indexing types based on these newer indexing types being available as valid options indicated in the secondary indexing scheme option data 2531 when these newer segments were indexed. Meanwhile, older segments generated from older received data of the dataset 2502 may have columns indexed via these newer indexing types because they were not yet valid options of the secondary indexing scheme option data 2531 when these older segments were indexed. In some cases, one or more older segments can optionally be identified for re-indexing via these newer indexing types, for example, based on a newly available indexing type being more efficient for IO of these one or more older segments. Such embodiments are discussed in further detail in conjunction with FIGS. 27A-27C.

In some embodiments, the selection and use of various secondary indexing schemes for various segments can be communicated to end-users and/or administrators of the database system 10. For example, an interactive interface displayed on a display device of a client device communicating with the database system 10 can enable users to create a new table as a new dataset 250 and/or add a column to an existing table; display and/or select whether that a secondary indexing scheme will improve performance for a given query profile; and/or add a new secondary indexing scheme as a new option in the secondary indexing scheme option data. In some cases, for a newly added secondary indexing scheme some or all future segments generated will include secondary indexes on the specified columns where appropriate; some or all future queries that can make use of this index will do so on the segments that contain the new secondary indexing scheme; the number of segments that contain this secondary indexing scheme can be displayed to the end-user. In some embodiments, secondary indexing schemes that are no longer needed can be dropped from consideration as options for future segments.

The segment generator module 2506, segment storage system 2508, and/or query execution module 2504 of FIGS. 25A-25D can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the segment generator module 2506, segment storage system 2508, and/or query execution module 2504 of FIGS. 25A-25D can be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the segment generator module 2506, segment storage system 2508, and/or query execution module 2504 at a massive scale.

The generation of segments by the segment generator module cannot practically be performed by the human mind, particularly when the database system 10 is implemented to store and perform queries against records at a massive scale as discussed previously. In particular, the human mind is not equipped to perform segment generation and/or segment indexing for millions, billions, and/or trillions of records stored as many Terabytes, Petabytes, and/or Exabytes of data. Furthermore, the human mind is not equipped to distribute and perform segment indexing and/or segment generation as multiple independent processes, such as hundreds, thousands, and/or millions of independent processes, in parallel and/or within overlapping time spans.

The execution of queries by the query execution module cannot practically be performed by the human mind, particularly when the database system 10 is implemented to store and perform queries against records at a massive scale as discussed previously. In particular, the human mind is not equipped to read and/or process millions, billions, and/or trillions of records stored as many Terabytes, Petabytes, and/or Exabytes of records in conjunction with query execution. Furthermore, the human mind is not equipped to distribute and perform record reading and/or processing as multiple independent processes, such as hundreds, thousands, and/or millions of independent processes, in parallel and/or within overlapping time spans.

In various embodiments, a segment indexing module includes at least one processor; and a memory that stores operational instructions. The operational instructions, when executed by the at least one processor, cause the segment indexing module to select a first secondary indexing scheme for a first segment that includes a first plurality of rows from a plurality of secondary indexing options. A first plurality of secondary indexes for the first segment is generated in accordance with the first secondary indexing scheme. The first segment and the secondary indexes for the first segment are stored in memory. A second secondary indexing scheme is selected for a second segment that includes a second plurality of rows from the plurality of secondary indexing options, where the second secondary indexing scheme is different from the first secondary indexing scheme. A second plurality of secondary indexes for the second segment is generated in accordance with the second secondary indexing scheme. The second segment and the secondary indexes for the second segment are stored in memory.

FIG. 25E illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 25E. In particular, a node 37 can utilize the query processing module 2435 to execute some or all of the steps of FIG. 25E, where multiple nodes 37 implement their own query processing modules 2435 to independently execute the steps of FIG. 25E, for example, to facilitate execution of a query as participants in a query execution plan 2405. Some or all of the method of FIG. 25E can be performed by the segment generator module 2506. In particular, some or all of the method of FIG. 25E can be performed by a secondary indexing scheme selection module 2530 and/or a secondary index generator module 2540 of a segment indexing module 2510. Some or all of the method of FIG. 25E can be performed via communication with and/or access to a segment storage system 2508, such as memory drives 2425 of one or more nodes 37. Some or all of the method of FIG. 25E can be performed via a query execution module 2504. Some or all of the steps of FIG. 25E can optionally be performed by any other processing module of the database system 10. Some or all of the steps of FIG. 25E can be performed to implement some or all of the functionality of the segment indexing module 2510 as described in conjunction with FIGS. 25A-25D. Some or all of the steps of FIG. 25E can be performed to implement some or all of the functionality regarding execution of a query via the plurality of nodes in the query execution plan 2405 as described in conjunction with FIGS. 24A-24E. Some or all steps of FIG. 25E can be performed by database system 10 in accordance with other embodiments of the database system 10 and/or nodes 37 discussed herein.

Step 2582 includes generating a first segment that includes a first subset of a plurality of rows of a dataset. Step 2584 includes selecting a first secondary indexing scheme for the first segment from a plurality of secondary indexing options. Step 2586 includes generating a first plurality of secondary indexes for the first segment in accordance with the first secondary indexing scheme. Step 2588 includes storing the first segment and the secondary indexes for the first segment in memory.

Step 2590 includes generating a second segment that includes a second subset of the plurality of rows of the dataset. Step 2592 includes selecting a second secondary indexing scheme for the second segment from a plurality of secondary indexing options. Step 2594 includes generating a second plurality of secondary indexes for the second segment in accordance with the second secondary indexing scheme. Step 2596 includes storing the second segment and the secondary indexes for the second segment in memory. Step 2598 includes facilitating execution of a query against the dataset by utilizing the first plurality of secondary indexes to read at least one row from the first segment and utilizing the second plurality of secondary indexes to read at least one row from the second segment.

In various embodiments, the first segment and the second segment are generated by a segment generator module 2506. In particular, the first segment and the second segment can be generated by utilizing a row data clustering module 2507, and/or the first segment and the second segment are generated as discussed in conjunction with FIGS. 15-23. The first segment can include first segment row data 2505 that includes a first plurality of records 2422 of a dataset 2502, and/or the second segment can include second segment row data 2505 that includes a second plurality of records 2422 of the dataset 2502. For example, the segment row data 2505 for each segment is generated from the corresponding plurality of records 2422 in conjunction with a column-based format. The first segment and second segment can be included in a plurality of segments a plurality of segments generated to each include distinct subsets of a plurality of rows, such as records 2422, of the dataset.

In various embodiments, the method includes generating first local distribution information for the first segment, where the first secondary indexing scheme is selected for the first segment from a plurality of secondary indexing options based on the first local distribution information. The method can further include generating second local distribution information for the second segment, where the second secondary indexing scheme is selected for the second segment from a plurality of secondary indexing options based on the second local distribution information, and where the second secondary indexing scheme is different from the first secondary indexing scheme based on the second local distribution information being different from the first local distribution information.

In various embodiments, the plurality of secondary indexing options includes a set of secondary indexing options corresponding to different subsets of a set of columns of the database table. The first secondary indexing scheme can include indexing a first subset of the set of columns, the second secondary indexing scheme can include indexing a second subset of the set of columns, and a set difference between the first subset and the second subset can be non-null.

In various embodiments, the plurality of secondary indexing options includes a set of secondary indexing types that includes at least one of: a bloom filter, a projection index, a data-backed index, a filtering index, a composite index, a zone map, a bit map, or a B-tree. The first secondary indexing scheme can include generating the first plurality of indexes in accordance with a first one of the set of secondary indexing types, and the secondary indexing scheme includes generating the second plurality of indexes in accordance with a second one of the set of secondary indexing types.

In various embodiments, the plurality of secondary indexing options includes a set of secondary indexing types. A first one of the secondary indexing types can include a first set of configurable parameters. Selecting the first secondary indexing scheme can include selecting the first one of the set of secondary indexing types and/or can include further selecting first parameter selections for each of the first set of configurable parameters for the first one of the set of secondary indexing types. Selecting the second secondary indexing scheme can include selecting the first one of the set of secondary indexing types and/or can include further selecting second parameter selections for each of the first set of configurable parameters for the first one of the set of secondary indexing types. The second parameter selection can be different from the first parameter selections.

In various embodiments, the first plurality of secondary indexes is different from a plurality of primary indexes of the first segment. The second plurality of secondary indexes can be different from a plurality of primary indexes of the second segment.

In various embodiments, the first segment is generated in a first temporal period, and the second segment is generated in a second temporal period that is after the first temporal period. After the first temporal period and prior to the second temporal period, the method can include updating the plurality of secondary indexing options to include a new secondary indexing option. The second secondary indexing scheme can be different from the first secondary indexing scheme based on the secondary indexing scheme being selected as the new secondary indexing option.

In various embodiments, selecting the first secondary indexing scheme for the first segment from the plurality of secondary indexing options can be based on first local distribution information corresponding to the first segment, user-provided hint data, and/or system-provided hint data. Selecting the second secondary indexing scheme for the second segment from the plurality of secondary indexing options can be based on second local distribution information corresponding to the second segment, user-provided hint data, and/or system-provided hint data.

In various embodiments, a non-transitory computer readable storage medium includes at least one memory section that stores operational instructions that, when executed by a processing module that includes a processor and a memory, causes the processing module to: generate a first segment that includes a first subset of a plurality of rows of a dataset; select a first secondary indexing scheme for the first segment from a plurality of secondary indexing options; generate a first plurality of secondary indexes for the first segment in accordance with the first secondary indexing scheme; store the first segment and the secondary indexes for the first segment in memory; generate a second segment that includes a second subset of the plurality of rows of the dataset; select a second secondary indexing scheme for the second segment from the plurality of secondary indexing options, where the second secondary indexing scheme is different from the first secondary indexing scheme; generate a second plurality of secondary indexes for the second segment in accordance with the second secondary indexing scheme; store the second segment and the secondary indexes for the second segment in memory; and/or facilitate execution of a query against the dataset by utilizing the first plurality of secondary indexes to read at least one row from the first segment and utilizing the second plurality of secondary indexes to read at least one row from the second segment.

FIG. 26A presents an embodiment of a segment indexing module 2510. Some or all features and/or functionality of the segment indexing module 2510 of FIG. 26A can be utilized to implement the segment indexing module 2510 of FIG. 25B and/or any other embodiment of the segment indexing module 2510 discussed herein.

As discussed in conjunction with FIG. 25D, the secondary indexing scheme selection module 2530 can generate secondary indexing scheme selection data for each given segment as selections of one or more indexing schemes from a set of options indicated in secondary indexing scheme option data 2531, based on each given segment's local distribution data 2542. As illustrated in FIG. 26A, generating the secondary indexing scheme selection data for each given segment can alternatively or additionally be based on user-generated secondary indexing hint data 2620 and/or system-generated secondary indexing hint data 2630.

Unlike the local distribution data 2542 which is determined for each segment individually, the user-generated secondary indexing hint data 2620 and/or system-generated secondary indexing hint data 2630 can apply to the dataset 2502 as a whole, where same user-generated secondary indexing hint data 2620 and/or system-generated secondary indexing hint data 2630 is utilized by the secondary indexing scheme selection module 2530 to generate secondary indexing scheme selection data 2532 for many different segments with segment row data 2505 from the dataset 2502.

In some cases, only user-generated secondary indexing hint data 2620 is determined and utilized by the secondary indexing scheme selection module 2530, where system-generated secondary indexing hint data 2630 is not utilized. In some cases, only system-generated secondary indexing hint data 2630 is determined and utilized by the secondary indexing scheme selection module 2530, where user-generated secondary indexing hint data 2620 is not utilized.

The user-generated secondary indexing hint data 2620 can be configured via user input, can be received from a client device or other computing device, and/or can be otherwise determined. As illustrated in FIG. 26A, the user-generated secondary indexing hint data 2620 can be generated by a client device 2601 communicating with the database system 10. For example, a user or administrator can configure the user-generated secondary indexing hint data 2620 via administrative sub-system 15 and/or configuration sub-system 16, where client device 2601 communicates with and/or is implemented in conjunction with administrative sub-system 15 and/or configuration sub-system 16. The client device 2601 can be implemented as a computing device 18 and/or any other device that includes processing resources, memory resources, a display device, and/or a user input device.

The client device 2601 can generate the user-generated secondary indexing hint data 2620 based on user input to an interactive interface 2650. The interactive interface can display one or more prompts for a user to enter the user-generated secondary indexing hint data 2620 for the dataset 2502. For example, the interactive interface is displayed and/or the user-generated secondary indexing hint data 2620 is generated by the client device 2601 in conjunction with execution of application data associated with the database system 10 that is received by the client device 2601 and/or stored in memory of the client device 2601 for execution by the client device 2601. As another example, the interactive interface is displayed in conjunction with a browser application associated with the database system 10 and accessed by the client device 2601 via a network.

The user-generated secondary indexing hint data 2620 can indicate information provided by the user regarding: known and/or predicted trends of the data in dataset 2502; known and/or predicted trends of the queries that will be performed upon the dataset 2502; and/or other information that can be useful in selecting secondary indexing schemes for segments storing data of the dataset that will render efficient row reads during query executions. In particular, user-generated secondary indexing hint data 2620 can indicate: "add-column-like" information and/or other information indicating an ordered or unordered list of columns that are known and/or expected to be commonly queried together; a known and/or expected probability value and/or relative likelihood for some or all columns to appear in a query predicate; a known and/or estimated probability value and/or relative likelihood for some or all columns to appear in one or more particular types of query predicates, such as equality-based predicates and/or range-based predicates; a known and/or estimated column cardinality of one or more columns; a known and/or estimated column distribution of one or more columns; a known and/or estimated numerical range of one or more columns; a known and/or estimated date or time-like behavior of one or more columns; and/or other information regarding the dataset 2502 and/or queries to be performed against the dataset 2502.

These user insights regarding the dataset 2502 and/or queries that will be performed against the dataset 2502 indicated in user-generated secondary indexing hint data 2620 can improve the performance of secondary indexing scheme selection module 2530 in generating secondary indexing scheme selection data 2532 that will render efficient row reads during query executions. These insights can be particular useful if the entirety of the dataset 2502 has not been received, for example, where the dataset 2502 is a stream of records that is received over a lengthy period of time, and thus distribution information for the dataset 2502 is unknown. This improves database systems by enabling intelligent selection of secondary indexing schemes based on user-provided distribution characteristics of the dataset when this information would otherwise be unknown.

These insights can also be useful in identifying which types of queries will be commonly performed and/or most important to end users, which further improves database systems by ensuring the selection of secondary indexing schemes for indexing of segments is relevant to the types of queries that will be performed. For example, this can help ensure that secondary indexing schemes that leverage these types of queries are selected for use to best improve IO efficiency based on the user-generated secondary indexing hint data 2620 indicating types of queries will be performed frequently. This helps ensure that other secondary indexing schemes that would rarely be useful in improving IO efficiency are thus not selected due to the user-generated secondary indexing hint data 2620 indicating types of query predicates that enable use of these secondary indexing schemes not being expected to be included in queries.

In some cases, the user-generated secondary indexing hint data 2620 does not include any selection of secondary indexing schemes to be utilized on some or all segments of the dataset 2502. In particular, the user-generated secondary indexing hint data 2620 can be implemented to serve as suggestions and/or added insight that can optionally be ignored by the secondary indexing scheme selection module 2530 in generating secondary indexing scheme selection data 2532. In particular, rather than enabling users to simply dictate which secondary indexing scheme will be used for a particular dataset based on their own insights, the user's insights are used as a tool to aid the secondary indexing scheme selection module 2530 in making intelligent selections.

Rather than relying solely on the secondary indexing scheme selection module 2530, the user-generated secondary indexing hint data 2620 can be configured to weigh the user-generated secondary indexing hint data 2620 in conjunction with other information, such as the local distribution information and/or the system-generated secondary indexing hint data 2630. For example, a heuristic function and/or optimization is performed as a function of the user-generated secondary indexing hint data 2620, the local distribution information, and/or the system-generated secondary indexing hint data 2630. This improves database systems by ensuring that inaccurate and/or misleading insights of user-generated secondary indexing hint data 2620 are not automatically applied in selecting secondary indexing schemes that would render sub-optimal IO efficiency. Furthermore, enabling users to simply dictate which secondary indexing scheme should be applied for a given dataset would render all segments of a given dataset having a same, user-specified index, and the added efficiency of per-segment indexing discussed previously would be lost.

Furthermore, in some cases, user-generated secondary indexing hint data 2620 can be ignored and/or can be de-weighted over time based on contradicting with local distribution data 2542 and/or system-generated secondary indexing hint data 2630. In some cases, user-generated secondary indexing hint data 2620 can be removed entirely from consideration. In such embodiments, the user can be prompted via the interactive interface to enter new user-generated secondary indexing hint data 2620 and/or can be alerted that their user-generated secondary indexing hint data 2620 is inconsistent with local distribution data 2542 and/or system-generated secondary indexing hint data 2630.

The system-generated secondary indexing hint data 2630 can be generated automatically by an indexing hint generator system 2551, which can be implemented by the segment indexing module 2510, by one or more computing devices 18, and/or by other processing resources and/or memory resources of the database system 10. Unlike the user-generated secondary indexing hint data 2620, the system-generated secondary indexing hint data 2630 can be generated without human intervention and/or the system-generated secondary indexing hint data 2630 is not based on user-supplied information. Instead, the system-generated secondary indexing hint data 2630 can be generated based on: current dataset information, such as distribution information for the portion of dataset 2502 that has been received and/or stored in segments 2424; historical query data, such as a log of queries that have been performed, queries that are performed frequently, queries flagged as having poor IO efficiency, and/or other information regarding previously performed queries; current and/or historical system health, memory, and/or performance information such as memory utilization of segments with various secondary indexing schemes and/or IO efficiency of segments with various indexing schemes; and/or other information generated by and/or tracked by database system 10.

As a particular example, the system-generated secondary indexing hint data 2630 can indicate current column cardinality, range, and or distribution of one or more columns. As another a particular example, the system-generated secondary indexing hint data 2630 can indicate "add-column-like" information and/or other information indicating an ordered or unordered list of columns that are commonly queried together, derived from some or all previous queries such as historically slow queries and/or common queries.

Different datasets 2502 can have different user-generated secondary indexing hint data 2620 and/or system-generated secondary indexing hint data 2630. The same dataset 2502 can have different user-generated secondary indexing hint data 2620 configured by different users. The same dataset 2502 can have different secondary indexing hint data 2620 and/or system-generated secondary indexing hint data 2630 generated over time, for example, where the user-generated secondary indexing hint data 2620 and/or system-generated secondary indexing hint data 2630 optionally updated over time, and where segments are indexed by utilizing the most recent user-generated secondary indexing hint data 2620 and/or most recent system-generated secondary indexing hint data 2630.

In such cases, newer segments generated from more recently received data of the dataset 2502 can have secondary indexing scheme selection data 2532 generated based on applying more recently updated user-generated secondary indexing hint data 2620 and/or system-generated secondary indexing hint data 2630, while older segments generated from older received data of the dataset 2502 can have secondary indexing scheme selection data 2532 generated based on prior versions of user-generated secondary indexing hint data 2620 and/or system-generated secondary indexing hint data 2630. In some cases, one or more older segments can optionally be identified for re-indexing by applying the more recently updated user-generated secondary indexing hint data 2620 and/or system-generated secondary indexing hint data 2630 to generate new secondary indexing scheme selection data 2532 for these older segments, for example, based on application of these user-generated secondary indexing hint data 2620 and/or system-generated secondary indexing hint data 2630 rendering secondary indexing scheme selection data 2532 with more efficient row reads to these one or more older segments. Such embodiments are discussed in further detail in conjunction with FIGS. 27A-27C.

In some cases, newly generated and/or newly received user-generated secondary indexing hint data 2620 and/or system-generated secondary indexing hint data 2630 can be "tested" prior to being automatically utilized by the secondary indexing scheme selection module 2530 to determine whether they would render secondary indexing selections that induce favorable IO efficiency and/or improved IO efficiency for currently stored segments. For example, a user can elect to perform this test for their proposed user-generated secondary indexing hint data 2620 and/or the database system 10 can automatically perform this test prior to any reliance upon user-generated secondary indexing hint data 2620 in generating secondary indexes for new segments.

This testing can be performed by re-evaluating the secondary indexing schemes for one or more currently stored segments based on applying the proposed user-generated secondary indexing hint data 2620 as input to the secondary indexing scheme selection module 2530 for an existing segment, determining if this would render a different secondary indexing scheme selection for the existing segment, testing the different secondary indexing scheme selection for the existing segment via one or more test queries to determine whether or not the IO efficiency for the segment would improve and/or be sufficiently efficient when this different secondary indexing scheme selection is applied; selecting to adopt the proposed user-generated secondary indexing hint data 2620 when at least a threshold number and/or percentage of existing segments have improved IO efficiency and/or have sufficient IO efficiency with different secondary indexing scheme selections generated by applying the adopt the proposed user-generated secondary indexing hint data; and/or selecting to not adopt the proposed user-generated secondary indexing hint data 2620 when at least a threshold number and/or percentage of existing segments do have not improved IO efficiency and/or do not have sufficient IO efficiency with different secondary indexing scheme selections generated by applying the adopt the proposed user-generated secondary indexing hint data. Some or all of this process can optionally be performed by implementing the segment indexing evaluation system of FIGS. 27A-27C.

In various embodiments, a segment indexing module includes at least one processor and a memory that stores operational instructions. The operational instructions, when executed by the at least one processor, cause the segment indexing module to receive a user-generated secondary indexing hint data for a dataset from a client device. The client device generated the user-generated hint data based on user input in response to at least one prompt displayed by an interactive interface displayed via a display device of the client device. A plurality of segments each include distinct subsets of a plurality of rows of a database table. for each of the plurality of segments, a secondary indexing scheme is automatically selected from a plurality of secondary indexing options based on the user-provided secondary indexing hint data. A plurality of secondary indexes is generated for each of the plurality of segments in accordance with the corresponding secondary indexing scheme. The plurality of segments and the plurality of secondary indexes are stored in memory.

FIG. 26B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 26B. In particular, a node 37 can utilize the query processing module 2435 to execute some or all of the steps of FIG. 26B. Some or all of the method of FIG. 26B can be performed by the segment generator module 2506. In particular, some or all of the method of FIG. 26B can be performed by a secondary indexing scheme selection module 2530 and/or a secondary index generator module 2540 of a segment indexing module 2510. Some or all of the method of FIG. 26B can be performed via communication with and/or access to a segment storage system 2508, such as memory drives 2425 of one or more nodes 37. Some or all of the method of FIG. 26B can be performed via a query execution module 2504. Some or all of the steps of FIG. 26B can optionally be performed by any other processing module of the database system 10. Some or all of the steps of FIG. 26B can be performed to implement some or all of the functionality of the segment indexing module 2510 as described in conjunction with FIGS. 25A-25C and/or FIG. 26A. Some or all steps of FIG. 26B can be performed by database system 10 in accordance with other embodiments of the database system 10 and/or nodes 37 discussed herein. Some or all of the steps of FIG. 26B can be executed in conjunction with execution of some or all steps of FIG. 25E.

Step 2682 includes receiving a user-generated secondary indexing hint data for a dataset from a client device. Step 2684 includes generating a plurality of segments that each include distinct subsets of a plurality of rows of a dataset. Step 2686 includes automatically selecting, for each of the plurality of segments, a secondary indexing scheme from a plurality of secondary indexing options based on the user-provided secondary indexing hint data. Step 2688 includes generating a plurality of secondary indexes for each of the plurality of segments in accordance with the corresponding secondary indexing scheme. Step 2690 includes storing the plurality of segments and the plurality of secondary indexes in memory.

In various embodiments, the user-generated secondary indexing hint data indicates query predicate trend data for future queries to be performed by at least one user against the dataset. In various embodiments, the query predicate trend data indicates an ordered list of columns commonly queried together and/or a relative likelihood for a column to appear in a predicate. In various embodiments, the user-generated secondary indexing hint data indicates estimated distribution data for a future plurality of rows of the dataset to be received by the database system for storage. In various embodiments, the estimated distribution data indicates an estimated column cardinality of the future plurality of rows of the dataset and/or an estimated column distribution of the future plurality of rows of the dataset.

In various embodiments, the method includes automatically generating system-generated secondary indexing hint data for the dataset. Automatically selecting the secondary indexing scheme is based on applying a heuristic function to the user-provided secondary indexing hint data and the system-generated secondary indexing hint data. In various embodiments, the system-generated secondary indexing hint data is generated based on accessing a log of previous queries performed upon the dataset, and/or generating statistical data for current column values of one or more columns of currently-stored rows of the dataset. In various embodiments the system-generated secondary indexing hint data indicates a current column cardinality; a current distribution of the data; a current column distribution; a current column range; and/or sets of columns commonly queried together, for example, in historically slow queries, common queries, and/or across all queries.

In various embodiments, a heuristic function is further applied to local distribution data generated for each segment. In various embodiments, the method includes generating and/or determining the local distribution data for each segment.

In various embodiments, the method includes ignoring and/or removing at least some of the user-provided secondary indexing hint data based on the system-generated secondary indexing hint data contradicting the user-provided secondary indexing hint data. In various embodiments, the user-provided secondary indexing hint data does not include selection of a secondary indexing scheme to be applied to the plurality of segments. For example, different secondary indexing schemes are applied to different segments despite being selected based on the same user-provided secondary indexing hint data.

In various embodiments the method includes receiving updated user-provided secondary indexing hint data from the client device, for example, after receiving the user-provided secondary indexing hint data. The secondary indexing scheme utilized for a more recently generated one of the plurality of segments is different from the secondary indexing scheme utilized for a less recently generated one of the plurality of segments based receiving the updated user-provided secondary indexing hint data after generating the first one of the plurality of segments and before generating the second of the plurality of segments.

In various embodiments, a non-transitory computer readable storage medium includes at least one memory section that stores operational instructions that, when executed by a processing module that includes a processor and a memory, causes the processing module to: receive a user-generated secondary indexing hint data for a dataset from a client device, where the client device generated the user-generated hint data based on user input in response to at least one prompt displayed by an interactive interface displayed via a display device of the client device; generate a plurality of segments that each include distinct subsets of a plurality of rows of a dataset; automatically select, for each of the plurality of segments, a secondary indexing scheme from a plurality of secondary indexing options based on the user-provided secondary indexing hint data; generate a plurality of secondary indexes for each of the plurality of segments in accordance with the corresponding secondary indexing scheme; and/or store the plurality of segments and the plurality of secondary indexes in memory.

FIGS. 27A-27C present embodiments of a segment indexing evaluation system 2710. The segment indexing evaluation system 2710 can be implemented via one or more computing devices 18 of the database system 10 and/or can be implemented via other processing resources and/or memory resources of the database system 10. The segment indexing evaluation system 2710 can optionally be implemented in conjunction with the segment indexing module 2510 of FIGS. 25A-26B.

Existing segments can be reindexed, for example, in order to take advantage of new hints, new index types, bug fixes, or updated heuristics. Reindexing can happen over time on a live system since segments for a dataset 2502 are heterogeneous. During reindexing, the secondary indexing scheme is evaluated for each segment to determine whether re-indexing would produce a different layout. For each segment group to be re-indexed, all existing segments in the group are read and new segments are created using the updated index layout. Once the new segments are written, segment metadata is updated for future queries and the old segment group can be removed.

The segment indexing evaluation system 2710 can be implemented to evaluate index efficiency for particular segments to determine whether and/or how their secondary index structure should be changed. This can include identifying existing segments for re-indexing and identifying a new secondary indexing scheme for these existing segments that are determined and/or expected to be more efficient for IO efficiency of segments than their current secondary indexing scheme. The segment indexing evaluation system 2710 can be implemented to automatically re-index existing segments under a newly selected secondary indexing scheme determined for the existing segments. This improves the technology of database systems to enable the indexing schemes of particular segments to be altered to improve the IO efficiency of these segments, which improves the efficiency of query executions.

This further improves the technology of database systems by enabling the per-segment indexing discussed previously to be adaptive to various changes over time. In particular, segments can be identified for reindexing and/or can be re-indexed via a new secondary indexing scheme based on: identifying segments with poor IO efficiency in one or more recently executed queries; changes in types of queries being performed against the dataset 2502; new types of secondary indexes that are supported as options in the secondary indexing scheme option data 2531; new heuristic functions and/or optimizations utilized by the secondary indexing scheme selection module 2530; receiving updated user-generated secondary indexing hint data 2620; automatically generating updated system-generated secondary hint data 2630; and/or other changes.

FIG. 27A presents an embodiment of a segment indexing evaluation system 2710 of database system 10 that implements an index efficiency metric generator module 2722, an inefficient segment identification module 2724, and a secondary indexing scheme selection module 2530. The secondary indexing scheme selection module 2530 can be implemented utilizing some or all features and/or functionality of embodiments of the secondary indexing scheme selection module 2530 discussed in conjunction with FIGS. 25A-25D and/or FIG. 26A.

In this example, a set of segments 1-R can be evaluated for re-indexing. For example, this evaluation is initiated based on a determination to evaluate the set of segments 1-R. This determination can be based on: a predetermined schedule and/or time period to re-evaluate indexing of the set of segments; identifying segments 1-R as having poor IO efficiency in one or more recently executed queries; changes in types of queries being performed against the dataset 2502; introducing new types of secondary indexes that are supported as options in the secondary indexing scheme option data 2531; introducing new heuristic functions and/or optimizations utilized by the secondary indexing scheme selection module 2530; receiving updated user-generated secondary indexing hint data 2620; automatically generating updated system-generated secondary hint data 2630; receiving a request and/or instruction to re-evaluate indexing of the set of segments; receiving a request from client device 2601 to evaluate how indexing of the set of segments would change in light of a newly supplied user-generated secondary indexing hint data 2620; detected degradation in query efficiency; and/or another determination.

The set of segments 1-R can correspond to all segments in the database system and/or can correspond to all segments storing records of dataset 2502. The set of segments 1-R can alternatively correspond to a proper subset of segments in the database system and/or a proper subset of segments storing records of dataset 2502. This proper subset can be selected based on identifying segments as having poor IO efficiency in one or more recently executed queries. This proper subset can be selected based on identifying segments whose secondary indexing scheme was selected and generated before a predefined time and/or date. This proper subset can be selected based on identifying segments with segment layout indicating their secondary indexing scheme was selected in via a revision of the secondary indexing scheme selection module 2530 that is older than a current revision of the secondary indexing scheme selection module 2530 and/or a predetermined threshold revision of the secondary indexing scheme selection module 2530. This proper subset can be selected based on identifying segments whose secondary indexing scheme was selected based on: an version of the heuristic functions and/or optimizations utilized by the secondary indexing scheme selection module 2530 that is older than a current version of the heuristic functions and/or optimizations utilized by the secondary indexing scheme selection module 2530; a version of the user-generated secondary indexing hint data 2620 that is older than the current version of user-generated secondary indexing hint data 2620 utilized by the secondary indexing scheme selection module 2530; a version of the system-generated secondary indexing hint data 2630 that is older than the current version of the user-generated secondary indexing hint data 2620 utilized by the secondary indexing scheme selection module 2530; an older version of the secondary indexing scheme option data 2531 that does not include at least one new secondary indexing type that is included in the current version of the secondary indexing scheme option data 2531 utilized by the secondary indexing scheme selection module 2530.

The current secondary indexing scheme data 2731 of each of the set of segments 1-R can be determined based on accessing the segments 1-R in memory, based on accessing metadata of the segments 1-R, based on tracked information regarding the previous selection of their respective secondary indexing schemes, and/or another determination. The current secondary indexing scheme data 2731 of a given segment can indicate the secondary indexing scheme selection data 2532 that was utilized to generate the secondary index data 2545 of the segment when the segment was generated and/or in a most recent re-indexing of the segment; the secondary index data 2545 itself; information regarding the layout of the segment and/or format of the segment row data 2505 induced by the currently utilized secondary indexing scheme; and/or other information regarding the current secondary indexing schemes for the segment.

Secondary indexing efficiency metrics 2715-1-2715-R can be generated for the identified set of segments 2424-1-2424-R via an index efficiency metric generator module 2722 based on their respective current secondary indexing scheme data 2731-1-2731-R. The index efficiency metric generator module 2722 can perform one or more queries, such as a set of test queries, upon the dataset 2502 and/or upon individual ones of the set of segments to generate the secondary indexing efficiency metrics 2715-1-2715-R. The set of test queries can be predetermined, can be configured via user input, can be based on a log of common and/or recent queries, and/or can be based on previously performed queries with poor efficiency.

In some cases, secondary indexing efficiency metrics 2715 are automatically generated for segments as they are accessed in various query executions, and the index efficiency metric generator module 2722 can optionally utilize these tracked secondary indexing efficiency metrics 2715 by accessing a memory that in memory that stores the tracked secondary indexing efficiency metrics 2715 instead of or in addition to generating new secondary indexing efficiency metrics 2715-1-2715-R via execution of new queries.

In some embodiments, rather than running the set of test queries on the actual segments, a set of virtual columns can be generated for the segments 2424-1-2424-R based on their current secondary indexing scheme data 2731-1-2731-R and the set of test queries can be performed utilizing the virtual columns. This mechanism be ideal when the index efficiency metric generator module 2722 is utilized to generate secondary indexing efficiency metrics 2715 for proposed secondary indexing schemes of these segments rather than their current secondary indexing schemes, as discussed in further detail in conjunction with FIG. 27B.

The secondary indexing efficiency metrics 2715 of a given segment can be based on raw metrics indicating individual values and/or blocks that are read, processed, and/or emitted. These raw metrics can be tracked in performance of the set of test queries to generate the secondary indexing efficiency metrics 2715.

A block that is read, processed, and/or emitted can include values of multiple records included a given segment, where a given segment includes many blocks. For example, these blocks are implemented as the coding blocks within a segment discussed previously and/or are implemented as 4 Kilo-byte data blocks. These blocks can optionally be a fixed size, or can have variable sizes.

One of these raw metrics that can be tracked in performance of the set of test queries for a given segment can correspond to a "values read" metric. The "values read" metric can be tracked as a collection of value-identifiers for blocks and/or individual values included in the segment that were read from disk. In some cases, this metric has block-level granularity.

Another one of these raw metrics that can be tracked in performance of the set of test queries for a given segment can correspond to a "values processed" metric. The "values processed" metric can be tracked as a collection of value identifiers for blocks and/or individual records included in the segment that were processed by the IO operator. This collection of value identifiers corresponding to values processed by the IO operator is always a subset of the collection of value identifiers that were read, and may be smaller when indexing allows decompression of specific rows in a block. In bytes, this metric may be larger than bytes read due to decompression. This metric can also have metric also have block-level granularity in cases where certain compression schemes that do not allow random access are utilized.

Another one of these raw metrics that can be tracked in performance of the set of test queries for a given segment can correspond to a "values emitted" metric. The "values emitted" metric can be tracked as a map of a collection of value-identifiers which satisfy all predicates and are emitted upstream. For example, this can include the number of blocks outputted as output data blocks of the IO operator and/or of one or more IO level nodes. The predicates can correspond to all query predicates that are pushed-down to one or more IO operators of the query that are executed in accordance with an IO pipeline as discussed in further detail in conjunction with FIGS. 28A-29B.

The raw metrics tracked for each given segment can be utilized to calculate one or more efficiency values of the secondary indexing efficiency metrics 2715. The secondary indexing efficiency metrics 2715 can include an IO efficiency value for the given segment. The IO efficiency value is computed with block granularity, and can be calculated as a proportion of blocks read that have an emitted value. For example, the IO efficiency value can be calculated by dividing the number of unique blocks with at least one emitted value indicated in the "values emitted" metric by the number of unique blocks read indicated in the "values read" metric. A perfect value of 1 means that every block that was read was needed to satisfy the plan. IO efficiency values indicating higher proportions of values that are read also being emitted constitute better IO efficiency, and thus more favorable secondary indexing efficiency metrics 2715, than lower proportions of values that are read also being emitted.

The secondary indexing efficiency metrics 2715 can include an IO efficiency value for the given segment. The IO efficiency value can have a block granularity, and can be calculated as a proportion of blocks read that have an emitted value. For example, the IO efficiency value can be calculated by dividing the number of unique blocks with at least one emitted value indicated in the "values emitted" metric by the number of unique blocks read indicated in the "values read" metric. A perfect value of 1 means that every block that was read was needed to satisfy the plan. IO efficiency values indicating higher proportions of values that are read also being emitted constitute better IO efficiency, and thus more favorable secondary indexing efficiency metrics 2715, than IO efficiency values indicating lower proportions of values that are read also being emitted.

The secondary indexing efficiency metrics 2715 can include a processing efficiency value for the given segment. The processing efficiency value can have a byte granularity, and can be calculated as a proportion of bytes processed that are emitted as values. For example, the processing efficiency value can be calculated by dividing the sum of bytes emitted as indicated in the "values emitted" metric by the sum of byes processed as indicated in the "values processed" metric. A perfect value of 1 means that every byte processed by the IO operator was needed to satisfy the plan. Processing efficiency values indicating higher proportions of bytes that are processed also being emitted constitute better processing efficiency, and thus more favorable secondary indexing efficiency metrics 2715, than processing efficiency values indicating lower proportions of bytes that are processed also being emitted.

The inefficient segment identification module 2724 can identify a subset of the segments 1-R as inefficient segments, illustrated in FIG. 27A as inefficient segments 1-S. These inefficient segments can be identified based on having unfavorable secondary indexing efficiency metrics 2715. For example, the secondary indexing efficiency metrics 2715 of a segment are identified as unfavorable based on the IO efficiency value being lower than, indicating lower efficiency than, and/or otherwise comparing unfavorably to a predetermined IO efficiency value threshold. As another example, the secondary indexing efficiency metrics 2715 of a segment are identified as unfavorable based on the processing efficiency value being lower than, indicating lower efficiency than, and/or otherwise comparing unfavorably to a predetermined processing efficiency value threshold. In some cases, none of the segments are identified as inefficient based on all having sufficient secondary indexing efficiency metrics 2715. In some cases, all of the segments are identified as inefficient based on all having insufficient secondary indexing efficiency metrics 2715.

The secondary indexing scheme selection module 2530 can generate secondary indexing scheme selection data 2532 for each of the set of inefficient segments 1-S. The secondary indexing scheme selection data 2532 for some or all of the inefficient segments 1-S can indicate a different secondary indexing scheme from their current different secondary indexing scheme.

The secondary indexing scheme selection module 2530 can be implemented in a same or similar fashion as discussed in conjunction with FIGS. 25A-26B. In some embodiments, the secondary indexing scheme selection module 2530 can further utilize the current secondary indexing scheme data 2731-2731-R, such as the current indexing type and/or segment layout information to make its selection. For example, the secondary indexing scheme selection module 2530 can perform analysis of the current secondary indexing scheme data 2731 for each given segment to automatically identify possible improvements, and/or can generate the secondary indexing scheme selection data 2532 for each given segment as a function of its current secondary indexing scheme data 2731.

As a particular example, a segment layout description for each segment can be extracted for correlation with efficiency metrics. This layout description can indicate the index types and parameters chosen for each column, along with the revision of the secondary indexing scheme selection module 2530 used to determine that layout.

In some embodiments, the segment indexing evaluation system 2710 can facilitate display of the current secondary indexing scheme data 2731 of inefficient segments 1-S to a user, for example, via a display device of client device 2601. This can include displaying the current indexing strategy and/or other layout information for the inefficient segments. This can include displaying their secondary indexing efficiency metrics 2715 and/or some or all of the raw metrics tracked in performing the test queries.

In some cases, the secondary indexing scheme selection module 2530 can generate the indexing scheme selection data 2532 based on user interaction with an interactive interface, such as interactive interface 2650 of client device 2601 and/or another client device utilized by an administrator, developer, or different user, in response to reviewing some or all of this displayed information. This can include prompting the user to select whether to adopt the new secondary indexing schemes selected for these segments or to maintain their current secondary indexing schemes. In some embodiments, the user can be prompted to enter and/or select proposed user-generated secondary indexing hint data 2620 for these poor-performing segments based on the current indexing strategy and/or other layout information. In some cases, proposed hint data can be automatically determined and displayed. This proposed hint data can be generated based on automatically generating system-generated secondary indexing hint data 2630, for example, based on the current secondary indexing scheme data 2731 and/or their poor efficiency. This proposed hint data can be automatically populated with recent user-generated secondary indexing hint data 2620 and/or system-generated secondary indexing hint data 2630 used to index newer segments, where these proposed hints that may be relevant to older segments as well.

In some embodiments, the secondary indexing scheme selection data 2532 for some or all of the inefficient segments 1-S is automatically utilized to generate respective secondary index data 2545 for inefficient segments 1-S via secondary index generator module 2540. This can include reformatting segment row data 2505 and/or otherwise changing the layout of the segment 2424 to accommodate the new secondary indexing scheme.

In other cases, the secondary indexing scheme selection data 2532 generated for some or all of the inefficient segments 1-S is considered a proposed secondary indexing scheme that undergoes evaluation prior to being adopted. The process discussed in conjunction with FIG. 27A can be repeated using the proposed new indexing strategies for these segments rather than the current secondary indexing scheme data.

FIG. 27B presents an embodiment of a segment indexing evaluation system 2710 that repeats this process for proposed new strategies indicated in secondary indexing scheme selection data 2532. Some or all features of the segment indexing evaluation system 2710 of FIG. 27B can be utilized to implement the segment indexing evaluation system 2710 of FIG. 27A and/or any other embodiment of the segment indexing evaluation system 2710 discussed herein.

The secondary indexing scheme selection data 2532 generated for some or all of the inefficient segments 1-S are processed via index efficiency metric generator module 2722 to generate secondary indexing efficiency metrics 2715 for the inefficient segments 1-S, indicating the level of efficiency that would be induced if the proposed secondary indexing scheme indicated in the secondary indexing scheme selection data 2532 were to be adopted. For example, virtual columns are determined for each segment 1-S in accordance with the proposed secondary indexing scheme, and these virtual columns are utilized to perform the set of test queries and generate the secondary indexing efficiency metrics 2715 indicating efficiency of the proposed secondary indexing scheme for each segment.

The inefficient segment identification module 2724 can be utilized to determine whether these proposed secondary indexing scheme are efficient or inefficient. This can include identifying a set of efficient segment based on these segments having favorable secondary indexing efficiency metrics 2715 for their proposed secondary indexing schemes. This can include identifying a set of inefficient segment based on these segments having unfavorable secondary indexing efficiency metrics 2715 for their proposed secondary indexing schemes, for example, based on comparison of the IO efficiency value and/or processing efficiency value to corresponding threshold values as discussed previously.

In some cases, determining whether a segment's secondary indexing efficiency metrics 2715 for their proposed secondary indexing schemes are favorable optionally includes comparing the secondary indexing efficiency metrics 2715 for the proposed secondary indexing scheme of the segment to the secondary indexing efficiency metrics 2715 for the current secondary indexing scheme. For example, a proposed secondary indexing schemes is only adopted for a corresponding segment if it has more favorable secondary indexing efficiency metrics 2715 than the secondary indexing efficiency metrics 2715 of the current secondary indexing scheme.

As proposed new indexing strategies render acceptable secondary indexing efficiency metrics for their corresponding segments, these segments can be re-indexed using their corresponding new indexing strategy. If the proposed new indexing strategies do not render acceptable secondary indexing efficiency metrics for their corresponding segments, the re-indexing attempt can be abandoned where their current indexing scheme is maintained, and/or additional iterations of this process can continue to evaluate additional proposed secondary indexing schemes for potential adoption in this fashion.

This is illustrated in FIG. 27B, where a set of inefficient segments 1-Si identified in an ith iteration of the process each have proposed secondary indexing schemes selected via a secondary indexing scheme selection module 2530. A first subset of this set of inefficient segments, denoted as segments 1-T, have favorable secondary indexing efficiency metrics 2715 for their proposed new indexing strategies, and have secondary indexes generated accordingly. A second subset of this set of inefficient segments, denoted as segments 1-Si+1, have unfavorable secondary indexing efficiency metrics 2715, and thus optionally have subsequently proposed secondary indexing schemes that are evaluated for adoption via an (i+1)th iteration.

In some embodiments, with each iteration, a new, hypothetical segment layout description for an existing segment corresponding to the proposed secondary indexing scheme for the existing segment can be presented to the presented to the user via interactive interface 2650. The interactive interface 2650 can optionally prompt the user to add or remove user-generated secondary indexing hint data 2620 in order to see the results of potential changes on the segment layout, where the process can be re-performed with user-supplied changes to the user-generated secondary indexing hint data 2620. This functionality can be ideal in enabling end-users, developers, and/or administrators to evaluate the effectiveness of user-generated secondary indexing hint data 2620.

In some embodiments, this process is performed to identify poor or outdated user-generated secondary indexing hint data 2620 supplied by users that rendered selection of secondary indexing schemes that caused respective segments to have poor efficiency metrics. In some cases, these poor hints are automatically removed from consideration in generating new segments and/or users are alerted that these hints are not effective via interactive interface 2650. In some cases, the heuristic functions and/or optimizations utilized by the secondary indexing scheme selection module 2530 are automatically updated over time to de-weight and/or adjust to the importance of user-provided hints relative to system-provided hints based on how effectively prior and/or current user-generated secondary indexing hint data 2620 improved efficiency relative to system-generated secondary indexing hint data 2630.

In some cases, the index efficiency metric generator module 2722 and inefficient segment identification module 2724 are utilized to evaluate proposed secondary indexing scheme selections for all newly generated segments. For example, the process implemented by the segment indexing evaluation system 2710 of in FIG. 27B can be utilized to implement the secondary indexing module 2510 of FIG. 25A and/or any other embodiment of the secondary indexing module 2510 discussed herein. In such cases, the secondary indexing scheme selection data 2532 generated for new segments is first evaluated via generation of corresponding secondary indexing efficiency metrics 2715 by applying the index efficiency metric generator module 2722 to the secondary indexing scheme selection data 2532, where multiple iterations of the process of FIG. 27B may ensure to ensure the ultimately selected secondary indexing scheme for each segment is expected to yield sufficiently efficient IO in query executions.

In some embodiments, space efficiency of index structures is alternatively or additionally evaluated. For example, a current index structure may induce efficient metrics for a given segment, but other index strategies with much cheaper storage requirements can be tested and determined to render favorable efficiency metrics. This can trigger re-indexing of segments to improve space efficiency without sacrificing IO efficiency or processing efficiency.

In such embodiments, instead of or in addition to identifying inefficient segments 1-S for re-indexing, the segment indexing evaluation system 2710 can optionally identify segments with unnecessarily complicated secondary indexing schemes and/or with secondary indexing schemes that require larger amounts of memory. In some cases, these segments can have their indexing schemes re-evaluated in a similar fashion to determine whether a less complicated and/or less memory intensive secondary indexing scheme could be utilized for the segment that would still yield favorable index efficiency metrics. The segment indexing evaluation system 2710 can identify such secondary indexing schemes for these and generate corresponding secondary index data 2545 for these segments accordingly.

FIG. 27C illustrates an example embodiment of the process performed by the segment indexing evaluation system 2710 to evaluate efficiency of one or more proposed secondary indexing schemes for corresponding segments. Some or all features and/or functionality of the segment indexing evaluation system 2710 can be utilized to implement the segment indexing evaluation system 2710 of FIG. 27A, FIG. 27B, and/or any other embodiment of the segment indexing evaluation system 2710 discussed herein.

In various embodiments, a segment indexing evaluation system includes at least one processor and a memory that stores operational instructions. The operational instructions, when executed by the at least one processor, cause the segment indexing evaluation system to generate secondary index efficiency metrics for a set of secondary indexing schemes corresponding to a set of segments stored in the database system based upon performing at least one query that accesses row data included in the set of segments. A first segment of the set of segments is selected for reindexing based on the secondary index efficiency metrics for a first one of the set of secondary indexing schemes corresponding to the first segment. A new set of secondary indexes are generated for the first segment based on applying a new secondary indexing scheme that is different from one of the set of secondary indexing schemes that corresponds to the first segment based on selecting the first segment for reindexing. The new set of secondary indexes are stored in conjunction with storage of the first segment. Execution of a query can be facilitated by utilizing the new set of secondary indexes to read at least one row from the first segment.

FIG. 27D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27D. In particular, a node 37 can utilize the query processing module 2435 to execute some or all of the steps of FIG. 27D. Some or all of the method of FIG. 27D can be performed by the segment indexing evaluation system 2710, for example, by implementing the index efficiency metric generator module 2722, the inefficient segment identification module 2724, and/or the secondary indexing scheme selection module 2530. Some or all of the method of FIG. 27D can be performed by the segment generator module 2506. In particular, some or all of the method of FIG. 27D can be performed by a secondary indexing scheme selection module 2530 and/or a secondary index generator module 2540 of a segment indexing module 2510. Some or all of the method of FIG. 27D can be performed via communication with and/or access to a segment storage system 2508, such as memory drives 2425 of one or more nodes 37. Some or all of the method of FIG. 27D can be performed via a query execution module 2504. Some or all of the steps of FIG. 27D can optionally be performed by any other processing module of the database system 10. Some or all of the steps of FIG. 27D can be performed to implement some or all of the functionality of the segment indexing evaluation module 2710 as described in conjunction with FIGS. 27A-27C. Some or all steps of FIG. 27D can be performed by database system 10 in accordance with other embodiments of the database system 10 and/or nodes 37 discussed herein. Some or all of the steps of FIG. 27D can be executed in conjunction with execution of some or all steps of FIG. 25E and/or FIG. 26B.

Step 2782 includes generating secondary index efficiency metrics for a set of secondary indexing schemes corresponding to a set of segments stored in the database system based upon performing at least one query that accesses row data included in the set of segments. Step 2784 includes selecting a first segment of the set of segments for reindexing based on the secondary index efficiency metrics for a first one of the set of secondary indexing schemes corresponding to the first segment. Step 2786 includes generating a new set of secondary indexes for the first segment based on applying a new secondary indexing scheme that is different from one of the set of secondary indexing schemes that corresponds to the first segment based on selecting the first segment for reindexing. Step 2788 includes storing the new set of secondary indexes in conjunction with storage of the first segment. Step 2790 includes facilitating execution of a query by utilizing the new set of secondary indexes to read at least one row from the first segment.

In various embodiments, at least one of the set of secondary indexing schemes is currently utilized in query executions for access to rows of the corresponding one of a set of segments. In various embodiments, at least one of the set of secondary indexing schemes is a proposed indexing scheme for the corresponding one of a set of segments.

In various embodiments, the method includes selecting the new secondary indexing scheme as a proposed indexing scheme for the first segment based on selecting the first segment for reindexing, and/or generating secondary index efficiency metrics for the new secondary indexing scheme based on selecting the new secondary indexing scheme as the proposed indexing scheme for the first segment. Generating the new set of secondary indexes for the first segment is based on the secondary index efficiency metrics for the new secondary indexing scheme being more favorable than the secondary index efficiency metrics for the first one of the set of secondary indexing schemes.

In various embodiments, the method includes selecting a second segment of the set of segments for reindexing based on the secondary index efficiency metrics for a second one of the set of secondary indexing schemes corresponding to the second segment. The method can include selecting a second new secondary indexing scheme as a proposed indexing scheme for the second segment based on selecting the second segment for reindexing. The method can include generating secondary index efficiency metrics for the second new secondary indexing scheme based on selecting the second new secondary indexing scheme as the proposed indexing scheme for the second segment. The method can include selecting a third new secondary indexing scheme as another proposed indexing scheme for the second segment based on the secondary index efficiency metrics for the second new secondary indexing scheme comparing unfavorably to a secondary index efficiency threshold. The method can include generating secondary index efficiency metrics for the third new secondary indexing scheme based on selecting the third new secondary indexing scheme as the another proposed indexing scheme for the second segment. The method can include generating a new set of secondary indexes for the second segment by applying the third new secondary indexing scheme based on the secondary index efficiency metrics for the third new secondary indexing scheme being more favorable than the secondary index efficiency metrics for the second new secondary indexing scheme.

In various embodiments, the method includes selecting a subset of the set of segments for reindexing that includes the first segment based on identifying a corresponding subset the set of secondary indexing schemes with secondary index efficiency metrics that compare unfavorably to a secondary index efficiency threshold.

In various embodiments, the method includes selecting the at least one query based on receiving select query predicates generated via user input and/or based on identifying common query predicates in a log of historically performed queries and/or a recent query predicates in a log of historically performed queries.

In various embodiments, the index efficiency metrics include: an IO efficiency metric, calculated for each segment as a proportion of blocks read from the each segment that have an emitted value in execution of the at least one query; and/or a processing efficiency metric calculated for each segment as a proportion of bytes read from the each segment that are emitted as values in execution of the at least one query.

In various embodiments, the method includes facilitating display, via an interactive interface, of a prompt to enter user-generated secondary indexing hint data for secondary indexing of the first segment based on selecting the first segment for reindexing. User-generated secondary indexing hint data is received based on user input to the prompt. The new secondary indexing scheme for the first segment is selected based on the user-generated secondary indexing hint data.

In various embodiments, the method includes determining to generate the secondary index efficiency metrics for a set of secondary indexing schemes corresponding to a set of segments. This determination can be based on: detecting degradation in query efficiency; introduction of a new secondary index type that can be implemented in reindexed segments, where the new secondary indexing scheme is selected as the a new secondary index type; introduction of a new heuristic and/or optimization function for implementation in selecting new indexing strategies to re-index segments, where the new secondary indexing scheme is selected based on utilizing heuristic and/or optimization function; receiving new user-provided secondary indexing hint data and/or new user-provided secondary indexing hint data system-provided hint data, where the secondary index efficiency metrics are generated to evaluate whether applying this new hint data would improve efficiency of existing segments; and/or determining other information. The secondary index efficiency metrics can be generated based on determining to generate the secondary index efficiency metrics.

In various embodiments, a non-transitory computer readable storage medium includes at least one memory section that stores operational instructions that, when executed by a processing module that includes a processor and a memory, causes the processing module to: generate secondary index efficiency metrics for a set of secondary indexing schemes corresponding to a set of segments stored in the database system based upon performing at least one query that accesses row data included in the set of segments; select a first segment of the set of segments for reindexing based on the secondary index efficiency metrics for a first one of the set of secondary indexing schemes corresponding to the first segment; generate a new set of secondary indexes for the first segment based on applying a new secondary indexing scheme that is different from one of the set of secondary indexing schemes that corresponds to the first segment based on selecting the first segment for reindexing; store the new set of secondary indexes in conjunction with storage of the first segment; and/or facilitate execution of a query by utilizing the new set of secondary indexes to read at least one row from the first segment.

FIGS. 28A-28C present embodiments of a query processing module 2802 that executes queries against dataset 2502 via a query execution module 2504. In particular, to guarantee that these queries execute correctly despite requiring IO performed on segments with different secondary indexing schemes selected and generated as discussed in conjunction with some or all features and/or functionality of the segment indexing module 2510 and/or the segment indexing evaluation system 2710, performing IO operators for each given segment is based on the secondary indexing for each given segment. To ensure all segments are uniformly read and filtered for a given query, despite having different secondary indexing schemes, all query predicates can be pushed to the IO operator level. The IO operators can be processed differently for different segments based on their respective indexes via IO pipelines determined for each segment, but are guaranteed to render the appropriate predicate-based filtering regardless of how and/or whether indexes are applied for each segment. This improves database systems by guaranteeing query resultants are correct in query executions, while enabling each segment to perform IO operators efficiently based on having their own secondary indexing scheme that may be different from that of other segments.

FIG. 28A illustrates an embodiment of a query processing module 2802 that includes an operator execution flow generator module 2803 and a query execution module 2504. Some or all features and/or functionality of the query execution module 2504 of FIG. 28A can be utilized to implement the query execution module 2504 of FIG. 25A and/or any other embodiment of the query execution module 2504 discussed herein.

The operator execution flow generator module 2803 can be implemented via one or more computing devices and/or via other processing resources and/or memory resources of the database system 10. The operator execution flow generator module 2803 can generate an operator execution flow 2817, indicating a flow of operators 2830 of the query to be performed by the query execution module 2504 to execute the query in accordance with a serial and/or parallelized ordering. Different portions of the operator execution flow 2817 can optionally be performed by nodes at different corresponding levels of the query execution plan 2405.

At the bottom of the operator execution flow 2817, one or more IO operators 2821 are included. These operators are performed first to read records required for execution of the query from corresponding segments. For example, the query execution module 2504 performs a query against dataset 2502 by accessing records of dataset 2502 in respective segments. As a particular example, nodes 37 at IO level 2416 each perform the one or more IO operators 2821 to read records from their respective segments.

Rather than generating an operator execution flow 2817 that with IO operators 2821 that are executed in an identical fashion across all segments, for example, by applying index probing or other use of indexes to filter rows uniformly across all IO operators for all segments, the execution of IO operators must be adapted to account for different secondary indexing schemes that are utilized for different segments. To guarantee query correctness, all IO operators must be guaranteed to filter the correct set of records when performing record reads in the same fashion.

This can be accomplished by pushing all of the query predicates 2822 of the given query down to the IO operators. Executing the IO operators via query execution module 2504 includes applying the query predicates 2822 to filter records from segments accordingly 2424. In particular, performing the IO operators to perform rows reads for different segment requires that the IO operators are performed differently. For example index probing operations or other filtering via IO operators may be possible for automatically applying query predicates 2822 in performing row reads for segment indexed via a first secondary indexing scheme. However, this same IO process may not be possible for a second segment indexed via a different secondary indexing scheme. In this case, an identical filtering step would be required after reading the rows from the second segment.

FIG. 28B illustrates an embodiment of a query execution module 2504 that accomplishes such differences in IO operator execution via selection of IO pipelines on a segment-by-segment basis. Some or all features and/or functionality of the query execution module 2504 of FIG. 28B can be utilized to implement the query execution module 2504 of FIG. 28A, and/or any other embodiment of the query execution module 2504 described herein.

The construction of an efficient IO pipeline for a given query and segment can be challenging. While a trivial scan-and-filter pipeline can satisfy many queries, most efficiency gains from building an IO pipeline that uses a combination of indexes, dependent sources, and filters to minimize unneeded IO. As a result, different elements must be used depending on the predicates involved, the indexes present in that segment, the presence or absence of variable-length skip lists, and the version of the cluster key index.

The query execution module 2504 can include an index scheme determination module 2832 that determines the secondary indexing scheme data 2833-1-2833-R indicating the secondary indexing scheme utilized for each of a set of segments 1-R to be accessed in execution of a given query. For example, the secondary indexing scheme data 2833-1-2833-R is mapped to the respective segments in memory accessible by the query execution module 2504, is received by the query execution module 2504, and/or is otherwise determined by the query execution module 2504. This can include extracting segment layout description data stored for each segment 1-R.

An IO pipeline generator module 2834 can select a set of IO pipelines 2835-1-2835-R for performance upon each segment 1-R to implement the IO operators of the operator execution flow 2817. In particular, each IO pipeline 2835 can be determined based on: the pushed to the IO operators in the operator execution flow 2817, and/or the secondary indexing scheme data 2833 for the corresponding segment. Different IO pipelines can be selected for different segments based on the different segments having different secondary indexing schemes.

An IO operator execution module 2840 can apply each IO pipeline 2835-1-2835-R to perform the IO operators of the operator execution flow 2817 for each corresponding segment 2424-1-2424-R. Performing a given IO pipeline can include accessing the corresponding segment in segment storage system 2508 to read rows, utilizing the segment's secondary indexing scheme as appropriate and/or as indicated by the IO pipeline. Performing a given IO pipeline can optionally include performing additional filtering operators in accordance with a serial and/or parallelized ordering, for example, based on the corresponding segment not having a secondary indexing scheme that corresponds to corresponding predicates. Performing a given IO pipeline can include ultimately generating a filtered record set emitted by the given IO pipeline 2835 as output. The output of one or more IO operators 2821 as a whole, when applied to all segments 1-R, corresponds to the union of the filtered record sets generated by applying each IO pipeline 2835-1-2835-R to their respective segment. This output can be input to one or more other operators 2830 of the operator execution flow 2817, such as one or more aggregations and/or join operators applied the read and filtered records.

In some embodiments, a given node 37 implements its own index scheme determination module 2832, its own IO pipeline generator module 2834, and/or its own IO operator execution module 2840 to perform IO operations upon its own set of segments 1-R. for example, each of a plurality of nodes 37 participating at the IO level 2416 of a corresponding query execution plan 2405 generates and executes IO pipelines 2835 for its own subset of a plurality of segments required for execution of the query, such as the ones of the plurality of segments stored in its memory drives 2425.

In some embodiments, the IO pipeline for a given segment is selected and/or optimized based on one or more criteria. For example, the serialized ordering of a plurality of columns to be sources via a plurality of corresponding IO operators is based on distribution information for the column, such as probability distribution function (PDF) data for the columns, for example, based on selecting columns expected to filter the greatest number of columns to be read and filtered via IO operators earlier in the serialized ordering than IO operators for other columns. As another example, the serialized ordering of a plurality of columns to be sources via a plurality of corresponding IO operators is based on the types of secondary indexes applied to each column, where columns with more efficient secondary indexes and/or secondary indexing schemes that are more applicable to the set of query predicates 2822 are selected to be read and filtered via IO operators earlier in the serialized ordering than IO operators for other columns. As another example, index efficiency metrics and/or query efficiency metrics can be measured and tracked overtime for various query executions, where IO pipelines with favorable past efficiency and/or performance for a given segment and/or for types of secondary indexes are selected over other IO pipelines with less favorable past efficiency and/or performance.

FIG. 28C illustrates an example embodiment of an IO pipeline 2835. For example, the IO pipeline 2835 of FIG. 18C was selected, via IO pipeline generator module 2834, for execution via IO operator execution module 2840 upon a corresponding segment 2424 in conjunction with execution of a corresponding query. In this example, the corresponding query involves access to a dataset 2502 with columns colA, colB, colC, and colD. The predicates 2822 for this query that were pushed to the IO operators includes (colA>5 OR colB<=10) AND (colA<=3) AND (colC>=1).

As illustrated in FIG. 28C, the IO pipeline 2835 can include a plurality of pipeline elements, which can be implemented as various IO operators 2821 and/or filtering operators 2823. A serial ordering of the plurality of pipeline elements can be in accordance with a plurality of pipeline steps. Some of pipeline elements can be performed in parallel, for example, based on being included in a same pipeline step. This plurality of pipeline steps can be in accordance with subdividing portions of the query predicates 2822. IO operators performed in parallel can be based on logical operators included in the query predicates 2822, such as AND and/or OR operators. A latency until value emission can be proportional to the number of pipeline steps in the IO pipeline.

Each of the plurality of IO operators can be executed to access values of records 2422 in accordance with the query, and thus sourcing values of the segment as required for the query. Each of these IO operators 2821 can be denoted with a source, identifying which column of the dataset 2502 is to be accessed via this IO operator. In some cases, a column group of multiple columns is optionally identified as the source for some IO operators, for example, when compound indexes are applied to this column group for the corresponding segment.

Each of these index source IO operators 2821, when executed for the given segment, can output a set of row numbers and/or corresponding values read from the corresponding segment. In particular, IO operators 2821 can utilize a set of row numbers to consider as input, which can be produced as output of one or more prior IO operators. The values produced by an IO operator can be decompressed in order to be evaluated as part of one or more predicates.

Depending on the type of index employed and/or the placement in the IO pipeline 2835, some IO operators 2821 may emit only row numbers, some IO operators 2821 may emit only data values, and/or some IO operators 2821 may emit both row and data values. Depending on the type of index employed, a source element can be followed by a filter that filters rows from a larger list emitted by the source element based on query predicates.

Some or all of the plurality of IO operators 2821 of the IO pipeline 2835 of a given segment can correspond to index sources that utilize primary indexes, cluster key indexes and/or secondary indexes of the corresponding segment to filter ones of the row numbers and/or corresponding values in their respective output when reading from the corresponding segment. These index source IO operators 2821 can further be denoted with an index type, identifying which type of indexing scheme is utilized for access to this source based on the type of indexing scheme was selected and applied to the corresponding column of the corresponding segment, and/or a predicate, which can be a portion of query predicates 2822 applicable to the corresponding source column to be applied when performing the IO upon the segment by utilizing the indexes.

These IO operators 2821 can utilize the denoted predicate as input for internal optimization. This filter predicate can be pushed down into each corresponding index, allowing them to implement optimizations. For example, bitmap indexes only need to examine the columns for a specific range or values.

These index source IO operators 2821 output only a subset of set of row numbers and/or corresponding value identified to meet the criteria of corresponding predicates based on utilizing the corresponding index type of the corresponding source for the corresponding segment. In this example, the IO operators 2821 sourcing colA, colB, and colC are each index source IO operators 2821.

Some or all of the plurality of IO operators 2821 of the IO pipeline 2835 of a given segment can correspond to table data sources. These table data source IO operators 2821 can be applied to columns without an appropriate index and/or can be applied to columns that are not mentioned in query predicates 2822. In this example, the IO operators 2821 sourcing colD is a table data source, based on colD not being mentioned in query predicates 2822. These table data source IO operators can perform a table scan to produce values for a given column. When upstream in the IO pipeline, these table data source IO operators 2821 can skip rows not included in their input list of rows received as output of a prior IO operator when performing the table scan. Some or all these IO operators 2821 can produce values for the cluster key for certain rows, for example, when only secondary indexes are utilized.

Some or all of the plurality of IO operators 2821 of the IO pipeline 2835 of a given segment can correspond to default value sources. These default source IO operators 2821 can always output a default value for a given source column when this column is not present in the corresponding segment.

The various index source, table data source, and default IO operators 2821 included in a given IO pipeline can correspond to various type of pipeline elements that can be included as elements of the IO pipeline. These types can include:

Cluster key index source pipeline element: This type of pipeline element implements a cluster key index search and scan and/or sources values from one or more cluster key columns. When upstream of another source, this IO operator returns values that correspond to the downstream rows that also match this element's predicates (if any)

Legacy clustery key index source pipeline element: This type of pipeline element can implement a cluster key index search and scan, and/or can source values for older segments without row numbers in the cluster key. In some cases, this type of pipeline element is not ever utilized upstream of other pipeline elements.

Inverted index source pipeline element: This type of pipeline element produces values for columns of non-compound types, and/or only row numbers for compound type.

A fixed length table source pipeline element: This type of pipeline element produces values in a fixed-length column. When upstream of another source, skipping blocks containing only rows that have already been filtered and returning only values corresponding to those rows.

A variable length scan table source pipeline element: this type of pipeline element Produces every value in a variable-length column without loading a skip list of row numbers to skip. This type of pipeline element can be faster than variable Length Table Source Pipeline elements. In some embodiments, this type is never used upstream of any other pipeline elements based on being less efficient in scanning a subset of rows.

A variable length table source pipeline element: this type of pipeline element produces values in a variable-length column when a skip list of row numbers to skip is present. In some embodiments, this type of pipeline element is always used upstream of another pipeline element based on efficiently skipping blocks that do not contain any row in the downstream list.

A default value source pipeline element: this type of pipeline element emits default values for a column for any row requested.

The IO pipeline 2835 can further include filtering operators 2823 that filter values outputted by sources serially before these filters based on portions of the query predicates 2822. The filtering operators 2823 can serve as a type of pipeline element that evaluates a predicate expression on each incoming row, filtering rows that do not pass. In some embodiments, every column in the provided predicate must be sourced by other pipeline elements downstream of this pipeline element. In particular, these filtering operators 2823 can be required for some segments that do not have secondary indexes for one or more columns indicated in the query predicates 2822, where the column values of all rows of such columns are first read via a table data source IO operator 2821, and where one or more corresponding filtering operators 2823 are applied to filter the rows accordingly. In some embodiments, the IO pipeline 2835 can further include logical operators such as AND and/or OR operators as necessary for the corresponding query predicates 2822.

In some embodiments, all possible secondary indexing schemes of the secondary indexing scheme option data 2531 that can be implemented in segments for use in query execution are required to receive a list of predicates to evaluate as input, and return a list of rows that pass those predicates as output, where execution of an index source IO operator includes utilizing the corresponding predicates of the of index source IO operator to evaluate return a list of rows that pass those predicates as output. These row lists can be filtered and/or merged together in the IO pipeline as different indexes are used for the same query via different IO operators. Once the final row list is calculated, columns that are required for the query, but do not yet have values generated by the pipeline, can be read off disk.

In some embodiments, variable length columns are stored as variable-length quantity (VLQ) prefixed regions in row order. For example, VLQs and row data can span across 4 Kilo-byte blocks. Seeking to a given row number can include starting at the first row and cursing through all of the data. Information on a per-LCK basis that enables seeking to the first byte in a variable length column for that key can be stored and utilized. However, in segments with high clustering this can be a large portion of the column span. In order to enable efficient row value lookups by row number for variable length columns, a row offset lookup structure for variable length columns can be included. These can be similar to the fixed length lookup structures used in decompression, but with extra variable-length specific information.

For example, a skip list can be built for every column. For variable length columns, the skip list can encode an extra byte offset of first row, and can be in accordance with a different structure than that of fixed length columns, new skip list structure can be required. Performing IO can include loading skip lists for variable length columns in the query into memory. Given a row number, the first entry that has a larger first row number can be identified. The previous entry in the skip list can be accessed, and one or more blocks that contain the value can be read. In some cases, the subsequent block must always be read based on the end location of the row being unknown. In some cases, every variable length column read can include reads to two 4 Kilo-byte blocks. In some cases, each 4 Kilo-byte data block of segment row data 2505 can be generated to include block delta encoded row offsets and/or a byte offset of first row.

In some embodiments, for queries that use secondary indexes and require cluster key column emission but don't actually require to search the cluster key index, look up of cluster key values by row number can be implemented via the addition of row numbers in the primary cluster key index. This can include adding row ranges to index partition information in index headers and/or Adding row offset in the index. When IO is performed, the index partition a row falls into can be determined, a binary search for a cluster key that contains can be performed, and/or the cluster key can be emitted.

In this example, this example IO pipeline 2835 for this set of example query predicates 2822 can be generated for a first given segment based on colC having a cluster key (CK) index for the first given segment; based on colA having a bitmap index for the first given segment; and/or based on colB having a data-backed index for the first given segment. For example, these index types for colA and colB are secondary index types that were selected via the secondary indexing scheme selection module 2530 when the segment was generated and/or evaluated for re-indexing as discussed previously. The respective secondary index data 2545 for colA and colB of this first given segment was generated by the secondary index generator module accordingly to include a bitmap index for colA and a data-backed index for colB. When this IO pipeline 2835 for the first segment is executed, the secondary index data 2545 the bitmap index for colA and a data-backed index for colB of the secondary index data 2545 is accessed to perform their respective IO operators 2821.

While not illustrated, consider a second segment upon which this same query is performed. A different IO pipeline 2835 for this set of example query predicates 2822 can be generated for the second given segment based on the second given segment having different secondary indexing schemes for colA and colB. For example, colA has a bloom filter index and colB has not indexing. The IO operator 2821 sourcing colA in the IO pipeline 2835 for this second segment can thus be generated with an index type of a bloom filter, and/or can similarly the (colA<=3 OR colA>5) predicates. IO operator 2821 sourcing colA in the IO pipeline 2835 for this second segment can be a table data source IO operator based on colB having no secondary indexes in the second segment. A separate filtering operator 2823 can be applied serially after the table data source IO operator sourcing colB to apply the respective (colB<=10) predicate. In particular, this separate filtering operator 2823 can filter the outputted values received from the table data source IO operator for colB by selecting only the values that are less than or equal to 10.

IO operators 2821 and/or filtering operators 2823 further along the pipeline that are serially after prior IO operators 2821 and/or filtering operators 2823 in a serialized ordering of the IO pipeline can utilize output of prior IO operators 2821 and/or filtering operators 2823 as input. In particular, IO operators that receive row numbers from prior ones IO operators in the serial ordering can perform their reads by only accessing rows with the corresponding row numbers outputted by a prior IO operator.

Each pipeline element (e.g. IO operators, filter operators, and/or logical operators) of an IO pipeline can either to union or intersect its incoming row lists from prior pipeline elements in the IO pipeline. In some embodiments, an efficient semi-sparse row list representation can be utilized for fast sparse operations. In some embodiments, pipeline can be optimized to cache derived values (such as filtered row lists) to avoid re-computing them in subsequent pulls.

In this example, the IO operator 2821 sourcing colC outputs a first subset of row numbers of a plurality of row numbers of the segment based on identifying only rows with colC values greater than or equal to 1, based on utilizing the cluster key index for colC. The IO operator 2821 sourcing colA receives this first subset of the plurality of row numbers outputted by the IO operator 2821 sourcing colC, and only access rows with row numbers in the first subset. The first subset is further filtered into a second subset of the first subset by identifying rows with row numbers in the first subset with colA values that are either less than or equal to 3 of are greater than 5, based on utilizing the bitmap index for colA.

Similarly, the IO operator 2821 sourcing colB receives the first subset of the plurality of row numbers outputted by the IO operator 2821 sourcing colC, and also only access rows with row numbers in the first subset. The first subset is filtered into a third subset of the first subset by identifying rows with row numbers in the first subset with colB values that are either less than or equal to 10, based on utilizing the data-backed index for colB. The IO operator 2821 sourcing colB can be performed in parallel with the IO operator 2821 sourcing colA because neither IO operators is dependent on the other's output.

The union of the second subset and third subset are further filtered based on the filtering operators 2823 and logical operators to satisfy the required conditions of the query predicates 2822, where a final set of row numbers utilized as input to the final IO operator sourcing colD includes only the row numbers with values in colA, colB, and colC that satisfy the query predicates 2822. This final set of row numbers is thus utilized by the final IO operator sourcing colD to produce the values emitted for the corresponding segment, where this IO operator reads values of colD for only the row numbers indicated in its input set of row numbers.

The query processing system 2802 of FIGS. 28A-28C can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the operator execution flow generator module 2803 and/or the query execution module 2504 can be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the operator execution flow generator module 2803 and/or the query execution module 2504 at a massive scale. The IO pipeline generator module 2834, the index scheme determination module 2832, and/or the IO operator execution module of the query execution module can be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the operator execution flow generator module 2803 and/or the query execution module 2504 at a massive scale.

The execution of queries by the query execution module cannot practically be performed by the human mind, particularly when the database system 10 is implemented to store and perform queries against records at a massive scale as discussed previously. In particular, the human mind is not equipped to perform IO pipeline generation and/or processing for millions, billions, and/or trillions of records stored as many Terabytes, Petabytes, and/or Exabytes of data. Furthermore, the human mind is not equipped to distribute and perform IO pipeline generation and/or processing as multiple independent processes, such as hundreds, thousands, and/or millions of independent processes, in parallel and/or within overlapping time spans.

In various embodiments, a query processing system includes at least one processor; and a memory that stores operational instructions. The operational instructions, when executed by the at least one processor, cause the query processing system to identify a plurality of predicates of a query for execution. A query operator flow for is generated a query by including the plurality of predicates in a plurality of IO operators of the query operator flow. Execution of the query is facilitated by, for each given segment of a set of segments stored in memory: generating an IO pipeline for each given segment based on a secondary indexing scheme of a set of secondary indexes of the each segment and based on plurality of predicates, and performing the plurality of IO operators upon each given segment by applying the IO pipeline to the each segment.

FIG. 28D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28D. In particular, a node 37 can utilize the query processing module 2435 to execute some or all of the steps of FIG. 28D, where multiple nodes 37 implement their own query processing modules 2435 to independently execute the steps of FIG. 28D, for example, to facilitate execution of a query as participants in a query execution plan 2405. Some or all of the method of FIG. 28D can be performed by the query processing system 2802, for example, by utilizing an operator execution flow generator module 2803 and/or a query execution module 2504. In particular, some or all of the method of FIG. 29B can be performed by the IO pipeline generator module 2834, the index scheme determination module 2832, and/or the IO operator execution module 2840. Some or all of the method of FIG. 28D can be performed via communication with and/or access to a segment storage system 2508, such as memory drives 2425 of one or more nodes 37. Some or all of the steps of FIG. 28D can optionally be performed by any other processing module of the database system 10. Some or all of the steps of FIG. 28D can be performed to implement some or all of the functionality of the segment processing module 2502 as described in conjunction with FIGS. 28A-28C. Some or all of the steps of FIG. 28D can be performed to implement some or all of the functionality regarding execution of a query via the plurality of nodes in the query execution plan 2405 as described in conjunction with FIGS. 24A-24E. Some or all steps of FIG. 28D can be performed by database system 10 in accordance with other embodiments of the database system 10 and/or nodes 37 discussed herein. Some or all steps of FIG. 28D can be performed in conjunction with some or all steps of FIG. 25E, FIG. 26B, and/or FIG. 27D. For example, some or all steps of FIG. 28D can be utilized to implement step 2598 of FIG. 25E and/or step 2790 of FIG. 27D.

Step 2882 includes identifying a plurality of predicates of a query for execution. Step 2884 includes generating a query operator flow for a query by including the plurality of predicates in a plurality of IO operators of the query operator flow. Step 2886 includes facilitating execution of the query to read a set of rows from a set of segments stored in memory.

Performing step 2886 can include performing steps 2888 and/or 2890 for each given segment of the set of segments. Step 2888 includes generating an IO pipeline for each given segment based on a secondary indexing scheme of a set of secondary indexes of the given segment, and based on the plurality of predicates. Step 2890 includes performing the plurality of IO operators upon the given segment by applying the IO pipeline to the given segment.

In various embodiments, the set of segments are stored in conjunction with different ones of a plurality of corresponding secondary indexing schemes. In various embodiments, a first IO pipeline is generated for a first segment of the set of segments, and a second IO pipeline is generated for a second segment of the set of segments. The first IO pipeline is different from the second IO pipeline based on the set of secondary indexes of the first segment being in accordance with a different secondary indexing scheme than the set of secondary indexes of the second segment.

In various embodiments, performing the plurality of IO operators upon at least one segment of the set of segments includes utilizing the set of secondary indexes of the at least one segment in accordance with the IO pipeline to read at least one row from the at least one segment. In various embodiments, performing the plurality of IO operators upon at least one segment of the set of segments includes filtering at least one row from inclusion in output of the plurality of IO operators based on the plurality of predicates. The set of rows is a proper subset of a plurality of rows stored in the plurality of segments based on the filtering of the at least one row. In various embodiments, the IO pipeline of at least one segment of the set of segments includes at least one source element and further includes at least one filter element. The at least one filter element can be based on at least some of the plurality of predicates.

In various embodiments, generating the IO pipeline for each segment includes selecting the IO pipeline from a plurality of valid IO pipeline options for each segment. In various embodiments selecting the IO pipeline from a plurality of valid IO pipeline options for each segment is based on index efficiency metrics generated for previously utilized IO pipelines of previous queries.

In various embodiments, the IO pipeline is generated for each given segment by one of the plurality of nodes that stores the given segment. Each of the plurality of IO operators are performed upon each segment by the one of the plurality of nodes that stores the given segment. A first node storing a first segment of the set of segments generates the IO pipeline for the first segment and performs the plurality of IO operators upon the first segment, and a second node storing a second segment of the set of segments generates the IO pipeline for the second segment and performs the plurality of IO operators upon the second segment.

In various embodiments, the query operator flow includes a plurality of additional operators, such as aggregation operators and/or join operators, for performance upon the set of rows read from the set of segments via performance of the plurality of IO operators. In various embodiments, the plurality of IO operators are performed by nodes at an IO level of a query execution plan, and these nodes send their output to other nodes at an inner level of the query execution plan, where these additional operators are performed by nodes at an inner level and/or root level of a query execution plan.

In various embodiments, a non-transitory computer readable storage medium includes at least one memory section that stores operational instructions that, when executed by a processing module that includes a processor and a memory, causes the processing module to: identify a plurality of predicates of a query for execution; generate a query operator flow for a query by including the plurality of predicates in a plurality of IO operators of the query operator flow; and/or facilitate execution of the query by, for each given segment of a set of segments stored in memory, generating an IO pipeline for each given segment based on a secondary indexing scheme of a set of secondary indexes of the each segment and based on plurality of predicates, and/or performing the plurality of IO operators upon each given segment by applying the IO pipeline to the each segment.

FIG. 29A illustrates an embodiment of an IO operator execution module 2840 that executes the example IO pipeline 2835 of FIG. 28C. Some or all features and/or functionality of the IO operator execution module 2840 of FIG. 29A can be utilized to implement the IO operator execution module 2840 of FIG. 28B and/or any other embodiments of the IO operator execution module 2840 discussed herein.

As discussed in conjunction with FIG. 28C, an IO pipeline 2835 for a given segment can have multiple IO operators 2821 for multiple corresponding sources. Each of these IO operators 2821 is responsible for makings its own requests to the corresponding segment to access rows, for example, by applying a corresponding index and/or corresponding predicates. Each IO operator can thus generate their output as a stream of output, for example, from a stream of corresponding input row numbers outputted by one or more prior IO operators in the serialized ordering.

Each IO operator 2821 can maintain their own source queue 2855 based on the received flow of row numbers from prior sources. For example, as row numbers are received as output from a first IO operator for a first corresponding source, corresponding IO requests indicating these row numbers are appended to the source queue 2855 for a subsequent, second IO operator that is after the first IO operator in the serialized ordering. IO requests with lower row numbers are prioritized in the second IO operator's source queue 2855 are executed before IO requests higher row numbers, and/or IO requests are otherwise ordered by row number in source queues 2855 accordance with a common ordering scheme across all IO operators. In particular, to prevent pipeline stall, the source queues 2855 of all different IO operators can all be ordered in accordance with a shared ordering scheme, for example, where lowest row numbers in source queues 2855 can therefore be read first in source queues for all sources.

As each IO operator reads blocks from disk via a plurality of IO requests, they can each maintain an ordered list of completed and pending requests in their own source queue. The IO operators can serve both row lists and column views (when applicable) from that data.

The shared ordering scheme can be in accordance with an ordering of a shared IO request priority queue 2850. For example, the shared IO request priority queue 2850 is prioritized by row number, where lower row numbers are ordered before higher row numbers. This shared IO request priority queue 2850 can include all IO requests for the IO pipeline across all source queues 2855, prioritized by row number.

For example, the final IO operator 2821 sourcing colD can make requests and read values before the first IO operator 2821 sourcing colC has finished completing all requests to output row numbers of the segment based on the value of colC based on all IO operators making requests in accordance with the shared IO request priority queue 2850.

As a particular example, IO requests across the IO pipeline as a whole are made to the corresponding segment one at a time. At a given time, a lowest row number pending an IO request by one of the plurality of IO operators is read before any other pending IO requests with higher corresponding row numbers based on being most favorably ordered in the shared IO request priority queue 2850. This enables progress to be made for lower row numbers through the IO pipeline, for example, to conserve memory resources. In some embodiments, vectorized reads can be built from the priority queue when enough requests present and/or when IO is forced, for example, for final reads via a final IO operator in the serialized ordering of the pipeline.

The source queue 2855 of a given IO operator can include a plurality of pending IO and completed IO by the corresponding IO operator. For example, completed IO can persist in the corresponding IO operator's queue until the corresponding output, such as a row number or value is processed by a subsequent IO operator to generate its own output.

In general, each disk block needs to be read only once. Multiple row lists and column views can be served from a single block. The IO pipeline can support read-ahead within a pipeline and also into the next pipeline in order to maintain deep IO queues.

The priority queue ordering can be also utilized in cases of pipeline deadlock to enable progress on a current row of need when more memory is needed: necessary memory blocks can be allocated by identifying the lowest priority completed IO in the priority queue. When more memory is available, IO operators can read-ahead to maintain a number of in-flight requests. During an out of memory (OOM) event, completed IO can be dropped and turned back into pending IO, which can be placed back in the request queue. In particular, in an OOM condition, read-ahead blocks may need to be discarded and re-read on the subsequent pull when resources are available. Higher row numbers can be discarded first in these cases, for example, from the tail of source queues 2855, to maintain forward progress. In some embodiments, because rows are pulled in order, column leveling is not an issue. In some embodiments, if the current completed IO for a source is dropped, the pipeline will stall until it can be re-read.

In various embodiments, a query processing system includes at least one processor and a memory that stores operational instructions. The operational instructions, when executed by the at least one processor, cause the query processing system to determine an IO pipeline that includes a serialized ordering of a plurality of IO operators for execution upon a segment in accordance with a set of query predicates. An IO request priority queue ordered by row number for a plurality of row-based IO for performance by the plurality of IO operators is maintained. Output for each of the plurality of IO operators is generated based on each of the plurality of row-based IO performing respective ones of the plurality of row-based IO in accordance with the IO request priority queue. A set of values of a proper subset of rows filtered from a plurality of rows stored in the segment are outputted, in accordance with the set of query predicates, based on the output of a last-ordered one of the plurality of IO operators in the serialized ordering.

FIG. 29B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29B. In particular, a node 37 can utilize the query processing module 2435 to execute some or all of the steps of FIG. 29B, where multiple nodes 37 implement their own query processing modules 2435 to independently execute the steps of FIG. 29B, for example, to facilitate execution of a query as participants in a query execution plan 2405. Some or all of the method of FIG. 29B can be performed by the query processing system 2802, for example, by utilizing an operator execution flow generator module 2803 and/or a query execution module 2504. In particular, some or all of the method of FIG. 29B can be performed by the IO pipeline generator module 2834, the index scheme determination module 2832, and/or the IO operator execution module 2840. Some or all of the method of FIG. 29B can be performed via communication with and/or access to a segment storage system 2508, such as memory drives 2425 of one or more nodes 37. Some or all of the steps of FIG. 29B can optionally be performed by any other processing module of the database system 10. Some or all of the steps of FIG. 29B can be performed to implement some or all of the functionality of the segment processing module 2502 as described in conjunction with FIGS. 28A-28C and/or FIG. 29B. Some or all of the steps of FIG. 29B can be performed to implement some or all of the functionality regarding execution of a query via the plurality of nodes in the query execution plan 2405 as described in conjunction with FIGS. 24A-24E. Some or all steps of FIG. 29B can be performed by database system 10 in accordance with other embodiments of the database system 10 and/or nodes 37 discussed herein. Some or all steps of FIG. 29B can be performed in conjunction with some or all steps of FIG. 25E, FIG. 26B, FIG. 27D, and/or FIG. 28D. For example, some or all steps of FIG. 29B can be utilized to implement step 2598 of FIG. 25E, step 2790 of FIG. 27D, and/or step 2890 of FIG. 28D.

Step 2982 includes determining an IO pipeline that includes a serialized ordering of a plurality of IO operators for execution upon a segment in accordance with a set of query predicates. Step 2984 includes maintaining an IO request priority queue ordered by row number for a plurality of row-based IO for performance by the plurality of IO operators. Step 2986 includes generating output for each of the plurality of IO operators based on each of the plurality of row-based IO performing respective ones of the plurality of row-based IO in accordance with the IO request priority queue. Step 2988 includes outputting a set of values of a subset of rows filtered from a plurality of rows stored in the segment, in accordance with the set of query predicates, based on the output of a last-ordered one of the plurality of IO operators in the serialized ordering.

In various embodiments, the subset of rows is a proper subset of the plurality of rows based on at least one row of the plurality of rows being filtered out by one of the plurality of IO operators due to not meeting the filtering requirements of the set of query predicates. Alternatively, the subset of rows includes all of the plurality of rows based on no rows in the plurality of rows being filtered out by any of the plurality of IO operators due to all rows in the plurality of rows meeting the filtering requirements of the set of query predicates. As another example, the subset of rows includes none of the plurality of rows based on all rows in the plurality of rows being filtered out by the plurality of IO operators due to no rows in the plurality of rows meeting the filtering requirements of the set of query predicates.

In various embodiments, subsequent ones of the plurality of IO operators in the serialized ordering generate their output by utilizing output of prior ones of the ones of the plurality of IO operators in the serialized ordering. In various embodiments, output of each of the plurality of IO operators includes a flow of data ordered by row number based on performing respective ones of the plurality of row-based IO in accordance with the IO request priority queue. In various embodiments, the flow of data outputted by each of the plurality of IO operators includes a flow of row numbers ordered by row number and/or a flow of values of at least one column of rows in the plurality of rows, ordered by row number.

In various embodiments, the segment includes a plurality of secondary indexes generated in accordance with a secondary indexing scheme. The proper subset of rows are filtered from a plurality of rows stored in the segment based on at least one of the plurality of IO operators generating its output as a filtered subset of rows read in its respective ones of the plurality of row-based IO by utilizing the plurality of secondary indexes.

In various embodiments, the plurality of secondary indexes includes a first set of indexes for a first column of the plurality of rows stored in the segment in accordance with a first type of secondary index, and the plurality of secondary indexes includes a second set of indexes for a second column of the plurality of rows stored in the segment in accordance with a second type of secondary index. A first one of the plurality of IO operators generates its output in accordance with a first predicate of the set of predicates corresponding to the first column by utilizing the first set of indexes, and a second one of the plurality of IO operators generates its output in accordance with a second predicate of the set of predicates corresponding to the second column by utilizing the second set of indexes.

In various embodiments, the IO pipeline further includes at least one filtering operator, and the proper subset of rows of the plurality of rows stored is further filtered in by the at least one filtering operator. In various embodiments, the at least one filtering operator is in accordance with one of the set of predicates corresponding to one column of the plurality of rows based on the segment not including any secondary indexes corresponding to the one column.

In various embodiments, generating output for each of the plurality of operator includes, via a first one of the plurality of IO operators, generating first output that includes a first set of row numbers as a proper subset of a plurality of row numbers of the segment via by performing a first set of row-based IO of the plurality of row-based IO in accordance with the IO request priority queue. Generating output for each of the plurality of operators can further include, via a second one of the plurality of IO operators that is serially ordered after the first one of the plurality of IO operators in the serialized ordering, generating second output that includes a second set of row numbers as a proper subset of the first set of row numbers by performing a second set of row-based IO of the plurality of row-based IO for only row numbers included in the first set of row numbers, in accordance with the IO request priority queue.

In various embodiments, the first set of row-based IO includes reads to a first column of the plurality of rows, and the second set of row-based IO includes reads to a second column of the plurality of rows. The first set of row numbers are filtered from the plurality of row numbers by the first one of the plurality of IO operators based on applying a first one of the set of predicates to values of the first column. The second set of row numbers are filtered from first set of row numbers by the second one of the plurality of IO operators based on applying a second one of the set of predicates to values of the second column.

In various embodiments, the serialized ordering of the plurality of IO operators includes a parallelized set of IO operators that is serially after the first one of the plurality of IO operators. The parallelized set of IO operators includes the second one of the plurality of IO operators and further includes a third IO operator of the plurality of IO operators. Generating output for each of the plurality of operators can further include, via the third one of the plurality of IO operators, generating third output that includes a third set of row numbers as a second proper subset of the first set of row number of the segment by performing a second set of row-based IO of the plurality of row-based IO for only row numbers included in the first set of row numbers, in accordance with the IO request priority queue.

In various embodiments, the method further includes generating fourth output via a fourth one of the plurality of IO operators that is serially after the parallelized set of IO operators that corresponds to a proper subset of rows included in a union of outputs of the parallelized set of IO operators.

In various embodiments, respective ones of the plurality of row-based IO are maintained in a queue by the each of the plurality of IO operators in accordance the ordering of the IO request priority queue. In various embodiments, the queue maintained by the each given IO operator of the plurality of IO operators includes a set of IO competed by the given IO operator and further includes a set of IO pending completion by the given IO operator.

In various embodiments, the method includes detecting an out-of-memory condition has been met, and/or removing a subset of the plurality of row-based IO from the queues maintained by the each of the plurality of IO operators by selecting ones of the plurality of row-based IO that are least favorably ordered in the IO request priority queue. In various embodiments, at least one of the plurality of row-based IO removed from a queue maintained by one of the plurality of IO operators was already completed by the one of the one of the plurality of IO operators. The at least one of the plurality of row-based IO is added to the queue maintained by one of the plurality of IO operators as pending completion based on being removed from the queue in response to detecting that memory is again available. The one of the plurality of IO operators re-performs the at least one of the plurality of row-based IO based on being indicated in the queue as pending completion.

In various embodiments, a non-transitory computer readable storage medium includes at least one memory section that stores operational instructions that, when executed by a processing module that includes a processor and a memory, causes the processing module to: determine an IO pipeline that includes a serialized ordering of a plurality of IO operators for execution upon a segment in accordance with a set of query predicates; maintain an IO request priority queue ordered by row number for a plurality of row-based IO for performance by the plurality of IO operators; generate output for each of the plurality of IO operators based on each of the plurality of row-based IO performing respective ones of the plurality of row-based IO in accordance with the IO request priority queue; and/or output a set of values of a proper subset of rows filtered from a plurality of rows stored in the segment, in accordance with the set of query predicates, based on the output of a last-ordered one of the plurality of IO operators in the serialized ordering.

FIGS. 30A-37C present embodiments of a database system 10 that utilize probabilistic indexing to index data in one or more columns and/or fields of one or more datasets in accordance with a corresponding indexing scheme, such as a secondary indexing scheme. As used herein, a probabilistic indexing scheme can correspond to any indexing scheme that, when accessed for a given query predicate or other condition, returns a superset of rows and/or records that is guaranteed to include the full, true set of rows satisfying the query predicate. This superset of rows can further include additional rows that are "false-positives" for the given query predicate, due to the nature of the probabilistic indexing scheme. Differentiating these false-positive rows from the true set of rows can require accessing their respective data values, and comparing these values to the query predicate to determine which rows belong in the true set of rows.

As the superset of rows is guaranteed to include all rows satisfying the query predicate, only data values for rows included in the superset indicated by the indexing scheme need be accessed. For some probabilistic indexing schemes, this superset of rows may be a small subset of the full set of rows that would otherwise need be accessed if the indexing scheme were not utilized, which improves IO efficiency over the case where no index were utilized as a smaller proportion of data values need be read. For example, a superset of 110 rows is returned based on accessing a probabilistic index structure stored to index a given column of a dataset that includes 1 million rows, and the true set of rows corresponds to 100 rows of this superset of 110 rows. Rather than the data values for all 1 million rows in the data set, only the identified 110 data values for the column are read from memory, enabling the 10 false positive rows to be identified and filtered out.

This can be particularly desirable when the data values correspond to large values, text data, unstructured data, and/or variable length values that are expensive to read from memory and/or to temporarily store for comparison to filtering parameters and/or for movement between nodes implementing a query execution plan. While probabilistic indexes often support fixed-length columns, this construct can be implemented to apply a probabilistic index to variable-length columns, such as varchar data types, string data types, and/or text values. For example, the variable-length data of a variable-length column can be indexed via a probabilistic index based on hashing the variable-length values of this variable-length column, which is probabilistic in nature due to hash collisions where multiple data values hash to the same values, and utilizing the index for queries for equality with a particular value may include other values due to these hash collisions.

While a perfect indexing scheme that guarantees exactly the true set of rows be read could further improve IO efficiency, the corresponding index structure can be costly to store in memory and/or may be unreasonable for certain data types, such as variable-length column data. In particular, a probabilistic index structure indexing a given column may be far more memory efficient than a perfect indexing scheme particularly when the column values of the column are variable-length and/or have high cardinality A probabilistic indexing structure, while requiring false-positive rows be read and filtered, can thus be preferred over a perfect indexing structure for some or all columns as it can handle variable-length data and/or requires fewer memory resources for storage.

Thus, the utilization of probabilistic indexing schemes in query execution as discussed in conjunction with one or more embodiments described in conjunction with FIGS. 30A-37C improves the technology of database systems by balancing a trade-off of IO efficiency with index storage efficiency. In some cases, this trade-off is selected and/or optimized based on selection of a false-positive tuning parameter dictating a false-positive rate of the probabilistic indexing scheme. The utilization of probabilistic indexing schemes in query execution as discussed in conjunction with one or more embodiments described in conjunction with FIGS. 30A-37C alternatively or additionally improves the technology of database systems by indexing of variable-length data, such as varchar data values, string data values, text data values, or other types of variable-length data, enabling more efficient IO efficiency when accessing variable-length data in query in query executions for queries with query predicates that involve corresponding variable-length columns. The utilization of probabilistic indexing schemes in query execution as discussed in conjunction with one or more embodiments described in conjunction with FIGS. 30A-37C alternatively or additionally improves the technology of database systems by enabling storage-efficient indexes for variable-length data as fixed-length index values of a probabilistic indexing scheme, such as an inverted index structure or suffix-based index structure, while guaranteeing that any false-positive rows induced by the use of a probabilistic index are filtered out to guarantee query correctness.

Furthermore, the utilization of probabilistic indexing schemes in query execution as discussed in conjunction with one or more embodiments described in conjunction with FIGS. 30A-37C improves the technology of database systems by enabling this improved functionality at a massive scale. In particular, the database system 10 can be implemented at a massive scale as discussed previously, and probabilistic indexing schemes can index column data of records at a massive scale. Index data of the probabilistic indexing scheme can be stored at a massive scale, where millions, billions, and/or trillions of records that collectively include many Gigabytes, Terabytes, Petabytes, and/or Exabyte are indexed via probabilistic indexing schemes. Index data of the probabilistic indexing scheme can be accessed at a massive scale, where millions, billions, and/or trillions of records that collectively include many Gigabytes, Terabytes, Petabytes, and/or Exabyte are indexed via probabilistic indexing schemes are accessed in conjunction with one or more queries, for example, reliably, redundantly and/or with a guarantee that no records are inadvertently missing from representation in a query resultant and/or duplicated in a query resultant. To execute a query against a massive scale of records in a reasonable amount of time such as a small number of seconds, minutes, or hours, the processing of a given query can include distributing access of index data of one or more probabilistic indexing schemes across hundreds, thousands, and/or millions of computing devices 18, nodes 37, and/or processing core resources 48 for separate, independent processing with minimal and/or no coordination.

Embodiments of probabilistic indexing schemes described in conjunction with FIGS. 30A-37C can be implemented to index at least one column of at least one dataset stored in the database system 10 as a primary and/or secondary index. In some embodiments, multiple different columns of a given dataset have their data indexed via respective probabilistic indexing schemes of the same or different type and/or with the same or different parameters. In some embodiments, only some segments storing data values for rows for a given dataset have a given column indexed via a probabilistic indexing scheme, while other columns storing data values for rows for a given dataset have a given column index via different indexing schemes and/or do not have the given column indexed. For example, a given column is optionally indexed differently for different segments as discussed in conjunction with FIGS. 26A-29B, where only some segments utilize a probabilistic indexing scheme for the given column. In some embodiments, all segments storing data values for rows for a given dataset have a given column indexed via a same probabilistic indexing scheme, for example, in index data included in individual respective segments and/or in common index data accessible for all segments. While the examples of FIGS. 30A-37C discuss rows stored in segment structured as described previously, utilization of the probabilistic indexing FIGS. 30A-37C can be similarly utilized for any dataset, stored in any storage format, that includes data values for a plurality of fields, such as the columns in the examples of FIGS. 30A-37C, of a plurality of records, such as the rows in the examples of FIGS. 30A-37C.

As discussed in further detail herein, an IO pipeline, such as an IO pipeline 2835 as discussed in conjunction with FIGS. 28A-29B, can be constructed to access and handle these probabilistic indexes accordingly to ensure that exactly the true row set satisfying a given query predicate are returned, with no false-positive rows. A given IO pipeline 2835 of FIGS. 30A-37C can be performed for a given segment storing rows of a given dataset being accessed, can be performed for a proper subset segments storing the given dataset being accessed, and/or can be performed for all segments storing the given dataset being accessed. A given IO pipeline 2835 of FIGS. 30A-37C can optionally performed for access of some or all row data of a given dataset stored in any storage format, where rows are accessed via a different storage scheme than that of the segments described herein.

As illustrated in FIG. 30A, a query processing system 2802 can implement an IO pipeline generator module 2834 via processing resources of the database system 10 to determine an IO pipeline 2835 for execution of a given query based on an operator execution flow 2817 determined for the given query, for example, as discussed in conjunction with FIGS. 28A-28D. The IO pipeline generator module 2834 can be implemented via one or more nodes 37 of one or more computing devices 18 in conjunction with execution of a given query. For example, the operator execution flow 2817 is determined for a given query, for example, based on processing and/or optimizing a given query expression.

An IO operator execution module 2840 can execute the IO pipeline 2835 to render a filtered row set from a full set of rows of a corresponding dataset against which the given query is executed. This can include performing row reads based on accessing index data and/or raw data values for rows stored in one or more segments of a segment storage system 2508, for example, as discussed in conjunction with FIGS. 28A-28D. This filtered row set can correspond to output of IO operators 2821 of the operator execution flow 2817 as discussed in conjunction with FIGS. 28A-28D. However, all segments can optionally be indexed in a same fashion, where the same IO pipeline is optionally applied to all segments based on utilizing same indexing schemes. The IO operator execution module 2840 can execute the IO pipeline 2835 via one or more processing resources, such as a plurality of nodes 37 independently performing row reads at an IO level 2416 of a query execution plan 2405 as discussed in conjunction with FIGS. 24A-24D.

FIG. 30B illustrates an embodiment of a probabilistic index-based IO construct 3010 that can be included in IO pipeline 2835. For example, a given IO pipeline 2835 can include one or more probabilistic index-based IO constructs 3010 for one or more columns referenced in the given query that are indexed via probabilistic indexing schemes. A given IO pipeline 2835 can include multiple probabilistic index-based IO constructs 3010 for the same or different column. A given IO pipeline 2835 can include multiple probabilistic index-based IO constructs 3010 in different parallel tracks for processing independently in parallel, for example, via distinct processing resources such as distinct computing devices 18, distinct nodes 37, and/or distinct processing core resources 48.

The probabilistic index-based IO construct 3010 can include a probabilistic index element 3012, a source element 3014 downstream from the probabilistic index element 3012 and applied to output of the probabilistic index element 3012, and/or a filter element 3016 that is downstream from the source element 3014 and applied to output of the probabilistic index element 3012. The probabilistic index element 3012, source element 3014, and/or filter element 3016 of the probabilistic index-based IO construct 3010 can collectively function as an IO operator 2821 of FIG. 28B and/or FIG. 28C that utilizes index data of a probabilistic index structure to source data values for only a proper subset of a full set of rows. The probabilistic index element 3012 and/or source element 3014 can be implemented in a same or similar fashion as IO operators 2821 of FIGS. 28C and/or 29A. The filter element 3016 can be implemented in a same or similar fashion as filter operators 2823 of FIGS. 28C and/or 29A.

The IO operator execution module 2840 can execute the probabilistic index-based IO construct 3010 against a dataset via one or more processing resources, such as a plurality of nodes 37 independently performing row reads at an IO level 2416 of a query execution plan 2405 as discussed in conjunction with FIGS. 24A-24D. For example, the probabilistic index-based IO construct 3010 is applied to different segments storing rows of a same dataset via different corresponding nodes 37 storing these different segments as discussed previously.

FIG. 30C illustrates an embodiment of generation of an IO pipeline that includes at least one probabilistic index-based IO construct 3010 of FIG. 30B based on one or more predicates 2822 of an operator execution flow 2817. For example, some or all query predicates of a given query expression are pushed to the IO level for implementation via the IO pipeline as discussed in conjunction with FIGS. 28A-29B. Some or all query predicates can be otherwise implemented to identify and filter rows accordingly via a probabilistic index-based IO construct 3010.

The probabilistic index-based IO construct 3010 can be utilized to implement a given query predicate 2822 based on the probabilistic index element 3012 being applied to access index data for a given column identified via a column identifier 3041 indicated in the query predicate. Index probe parameter data 3042 indicating which rows be identified can be determined based on the filter parameters 3048. For example, filter parameters indicating equality with, being less than, and/or being greater than a given literal value can be applied to determine corresponding index probe values utilized to identify corresponding row identifiers, such as a set of row numbers, indicated by the corresponding index data for the column.

The set of row identifiers returned based on given index probe parameter data 3042 denoting given filter parameters 3048 of predicates 2822 can be guaranteed to include all row identifiers for all rows that satisfy the filter parameters 3048 of the predicate 2822 for the given column. However, the set of row identifiers returned based on given index probe parameter data 3042 may include additional row identifiers for rows that do not satisfy the filter parameters 3048 of the predicate 2822, which correspond to false-positive rows that need be filtered out to ensure query correctness.

The probabilistic index-based IO construct 3010 can be utilized to implement a given query predicate 2822 based on the source element 3014 being applied to access data values for the given column identified via the column identifier 3041 from memory. The source element 3014 can be applied such that only rows identified by the probabilistic index element 3012 be accessed.

The probabilistic index-based IO construct 3010 can be utilized to implement a given query predicate 2822 based on the filter element 3016 being applied to filter rows from the set of row identifiers returned by the probabilistic index element. In particular, the false-positives can be identified and removed to render only the true set of rows satisfying the given filter parameters 3048 based on utilizing the data values of the given column read for the rows in the set of rows row identifiers returned by the probabilistic index element. Ones of this of rows row identifiers with data values of the given column meeting and/or otherwise comparing favorably to the filter parameters are maintained as true-positives included in the true set of rows, while other ones of this of rows row identifiers with data values of the given column not meeting or otherwise comparing unfavorably to the filter parameters are removed.

Figure 30D:
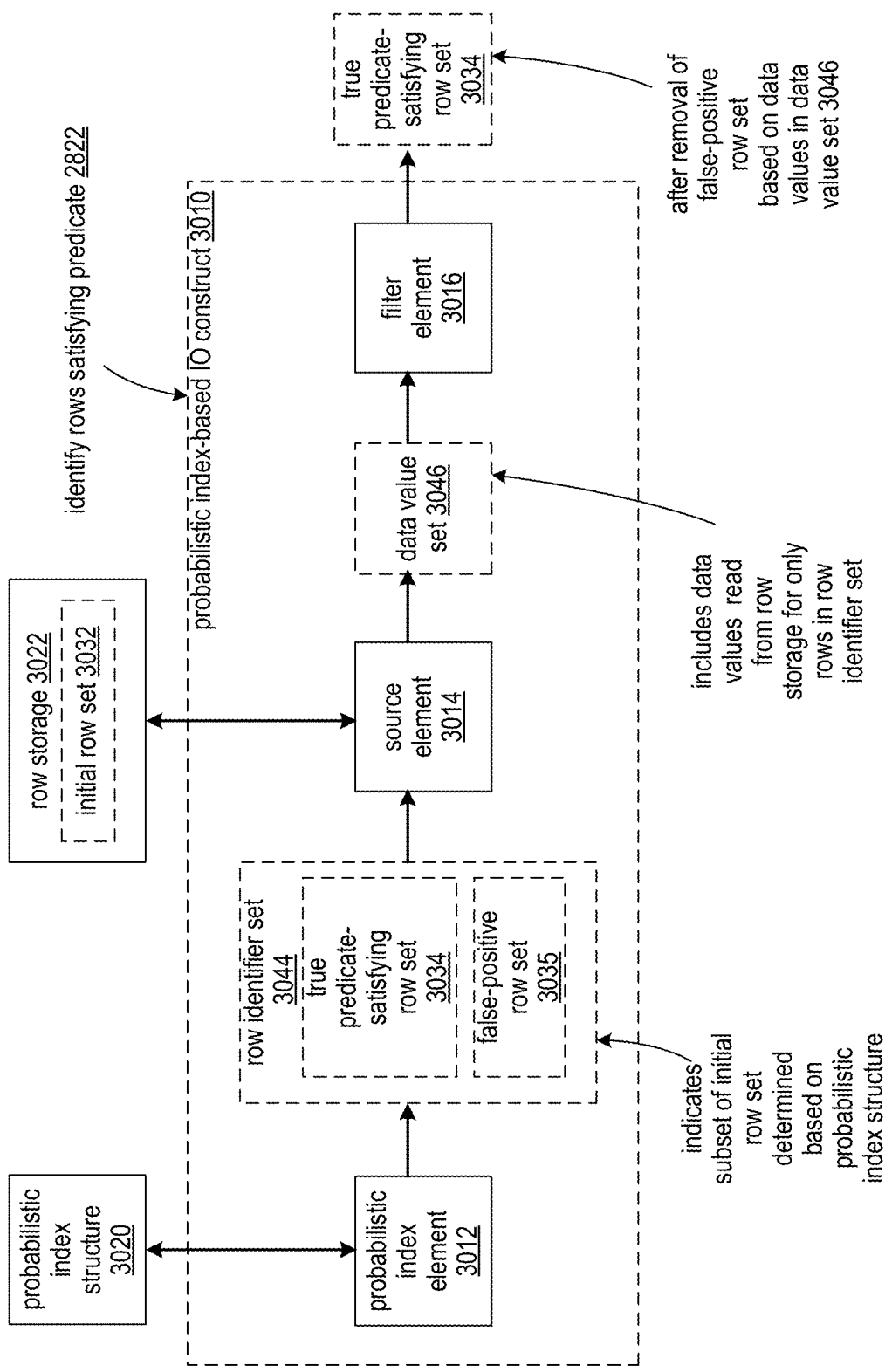

FIG. 30D illustrates an example of execution of a probabilistic index-based IO construct 3010 via an IO operator execution module 2840. The probabilistic index element 3012 is applied to access a probabilistic index structure 3020 to render a row identifier set 3044 indicating a set of row identifiers, for example, based on the index probe parameter data 3042. The probabilistic index structure 3020 can include index data in accordance with a probabilistic index scheme for a corresponding column of the given dataset. This index data of probabilistic index structure 3020 for a given column can be stored in memory of the database system, such as via memory resources such as memory drives 2425 of one or more nodes 37, for example, such as a secondary index 2545 of the given column included in secondary index data 2545 of one or more segments 2424 generated and stored by the database system 10 as discussed in conjunction with FIGS. 25A-25E. In some cases, a given probabilistic index structure 3020 indexes multiple columns in tandem.

The row identifier set 3044 can include the true predicate-satisfying row set 3034 that includes all rows of the dataset satisfying one or more corresponding predicates 2822, for example, that were utilized to determine the index probe parameter data 3042 of the probabilistic index element 3012. The row identifier set 3044 can further include a false-positive row set 3035 that includes additional rows of the dataset that do not satisfy the one or more corresponding predicates 2822. For example, these rows are indexed via same index values as rows included in the true predicate-satisfying row set 3034.

The row identifier set 3044 can be a proper subset of an initial row set 3032. The initial row set 3032 can correspond to all rows of a corresponding dataset and/or all rows of a corresponding segment to which the corresponding probabilistic index-based IO construction 3010 of the IO pipeline is applied. In some cases the initial row set 3032 is a proper subset of all rows of the corresponding dataset and/or all rows of the corresponding segment based on prior utilization of other indexes and/or filters previously applied upstream in the IO pipeline, where the probabilistic index-based IO construct 3010 is applied to only rows in the pre-filtered set of rows implemented as the initial row set 3032.

In some cases, the false-positive row set 3035 is non-null, but is indistinguishable from the true predicate-satisfying row set 3034 due to the nature of the probabilistic indexing scheme until the respective data values are read and evaluated against the corresponding filtering parameters of the predicate 2822. In some cases, the false-positive row set 3035 is null, but it is not known whether the false-positive row set 3035 is null due to the nature of the probabilistic indexing scheme until the respective data values are read and evaluated against the corresponding filtering parameters of the predicate 2822. The true predicate-satisfying row set 3034 can also be null or non-null. In cases where the true predicate-satisfying row set 3034 is null but the false-positive row set 3035 is non-null, the resulting output of the probabilistic index-based IO construct 3010 will be null once filtering element 3016 is applied.

The row identifier set 3044 can be utilized by 3014 by a source element 3014 to read data values for corresponding rows in row storage 3022 to render a data value set 3046. This row storage 3022 can be implemented via memory of the database system 10, such as via memory resources such as memory drives 2425 of one or more nodes 37, for example, such as segment row data 2505 of one or more segments 2424 generated and stored by the database system 10 as discussed in conjunction with FIGS. 25A-25E. The data value set 3046 includes data values, such as data values of the given column 3023 for the source element 3014, for only rows indicated in the row identifier set 3044, rather than for all rows in the initial row set 3032. As discussed previously, this improves database system 10 efficiency by reducing the number of values that need be read from memory and that need be processed to identify the true predicate-satisfying row set 3034.

The data value set 3046 can be utilized by filter element 3016 to identify and remove the false-positive row set 3035. For example, each given data value of the data value set 3046 is processed via comparison to filtering parameters 3048 of the query predicate to determine whether the given data value satisfies the query predicate, where only the rows with data values satisfying the query predicate are identified in the outputted row set. This guarantees that the outputted row set corresponds to exactly the true predicate-satisfying row set 3034 based on guaranteeing that all out all rows in the false-positive row set 3035 are filtered out based on having data values comparing unfavorably to the corresponding predicate 2822.

The true predicate-satisfying row set 3034 outputted by a given probabilistic index-based IO construct 3010 can be included in and/or utilized to generate a query resultant. The true predicate-satisfying row set 3034 outputted by a given probabilistic index-based IO construct 3010 can be further processed in further operators of the IO pipeline 2835, and/or can be further processed via further operators of the query operator execution flow 2817, for example, via inner and/or root nodes of the query execution plan 2405.

The true predicate-satisfying row set 3034 can indicate only row identifiers, such as row numbers, for the rows of the true predicate-satisfying row set 3034, where this true predicate-satisfying row set 3034 is optionally further filtered and/or combined with other sets via further filtering operators and/or set operations via upstream operators of the IO pipeline 2835 and/or the query operator execution flow 2817. Corresponding data values of the data value set 3046 can optionally be outputted alternatively or in addition to the row identifiers, for example, based on the query resultant including the data values for the corresponding column, based on further processing of the data values upstream in the IO pipeline, and/or based on further processing of the data values via other operators of the IO pipeline 2835 and/or of the query operator execution flow 2817.

Figure 30E:
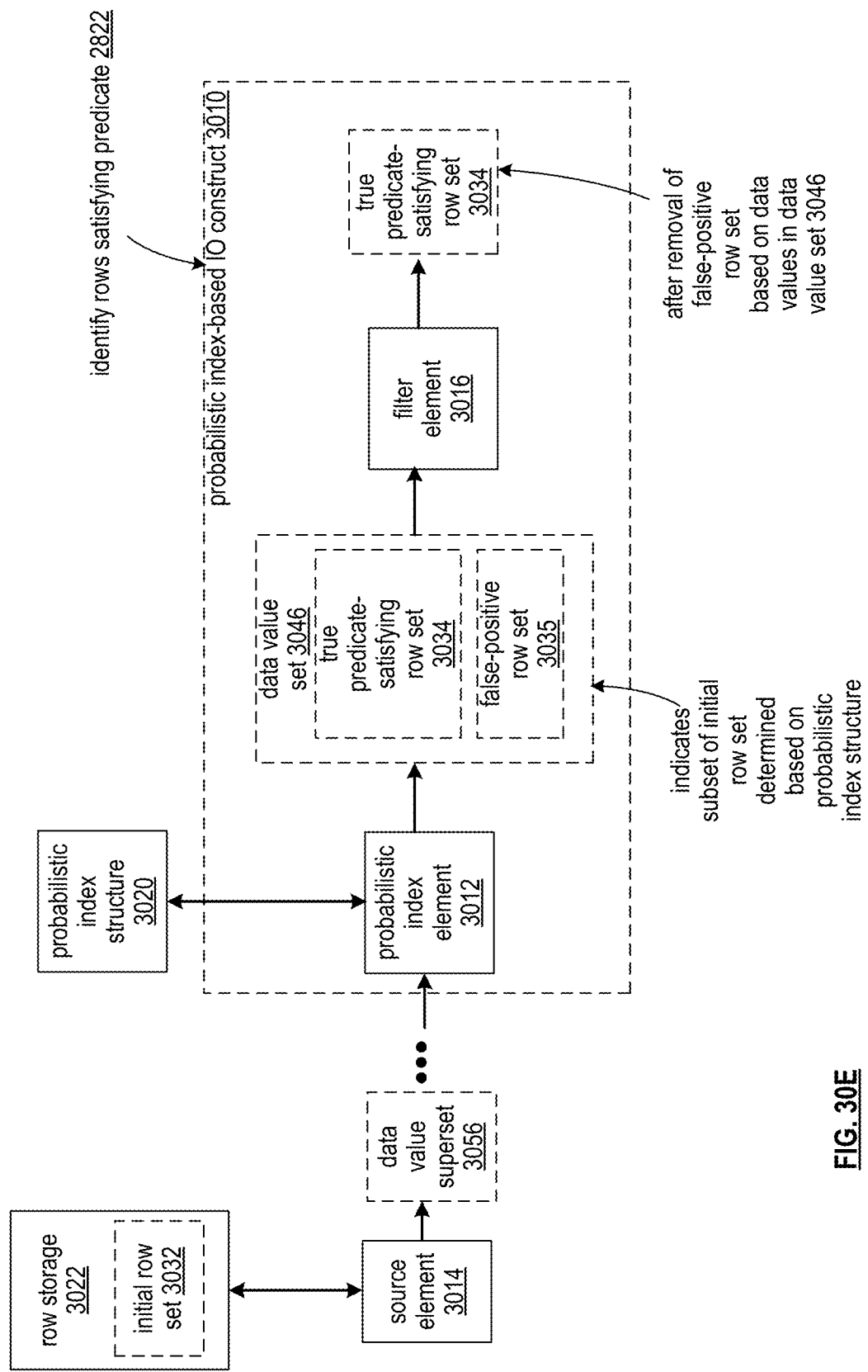

FIG. 30E illustrates an example of execution of a probabilistic index-based IO construct 3010 via an IO operator execution module 2840 that does not include source element 3014 based on the corresponding data values having been previously read upstream in the IO pipeline 2835. For example, rather than re-reading these values, the data values of data value set 3046 are identified from a previously-read data value superset 3056 that is a superset that includes data value set 3046. In particular, the data value set 3046 is identified after applying probabilistic index element 3012 based on identifying only ones of the data value superset 3056 for rows with row identifiers in the row identifier set 3044 identified by applying probabilistic index element 3012 as discussed in conjunction with FIG. 30D.

Figure 30F:
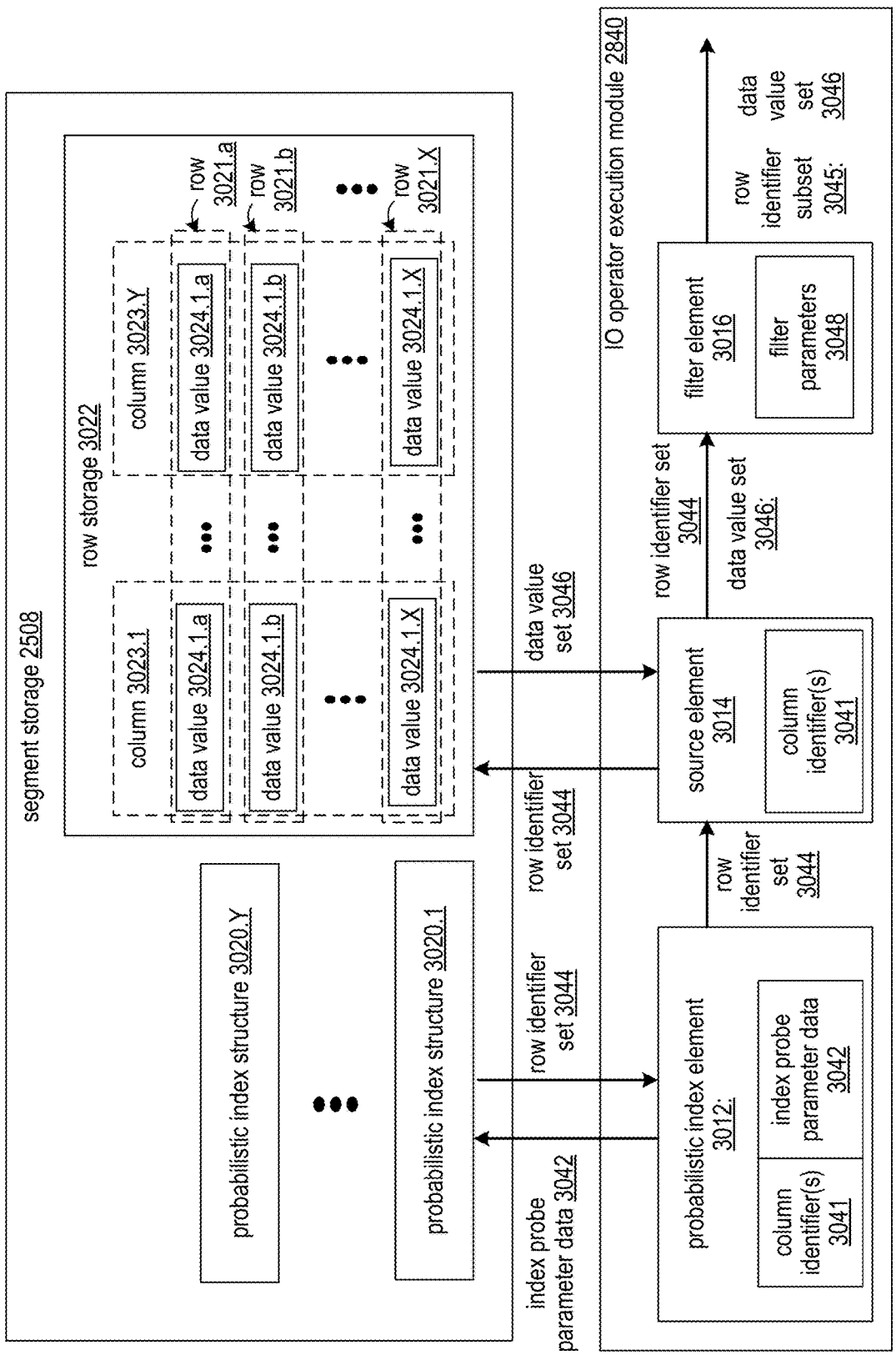

FIG. 30F illustrates an example embodiment of a query processing system 2802 that executes a probabilistic-index based IO construct 3010 via a probabilistic index structure 3020.1 for a given column 3023.1 of initial row set 3032 in row storage 3022 that includes X rows 3021.1-3021.X.

As illustrated, probabilistic index structure 3020.1 is one of a set of probabilistic index structures 3020 for some or all of a set of columns 3023.1-3023.Y. In this case, the probabilistic index structure 3020.1 is accessed based on the corresponding predicate 2822 involving column 3023.1. Note that some columns 3023 of the initial row set 3032 may be indexed via non-probabilistic indexing schemes and/or may not be indexed at all.

Different probabilistic index structures 3020 or different columns, such as two different given probabilistic index structures 3020.A and 3020.B of two columns 3023.A and 3023.B of the set of columns, can be stored via shared and/or distinct memory resources. Different probabilistic index structures for different columns, such as probabilistic index structures 3020.A and 3020.B, can be implemented as a combined index structure, or as distinct index structures based on different columns being indexed separately, being indexed via different indexing schemes, and/or being indexed with different parameters. A given segment can store multiple different probabilistic index structures for data values of multiple ones of the columns for its set of rows. A given probabilistic index structure 3020 of a given column of a given dataset can include multiple individual probabilistic index structures stored in each of a set of different segments, indexing different corresponding subsets of rows in the given dataset for the given column via the same or different probabilistic indexing scheme and/or via the same or different parameters.

FIG. 30G illustrates a particular example of the embodiment of FIG. 30F. Row identifier set 3044.2 is outputted by probabilistic index element 3012 based on utilizing index probe parameter data 3042 indicating index value 3043.2. The probabilistic index structure 3020.1 can be implemented as a mapping of index values to corresponding rows. For example, probabilistic index structure 3020 is implemented as an inverted index scheme and/or is implemented via a hash map and/or hash table data structure. For example, index values 3043 are generated by performing a hash function, mapping function, or other function upon corresponding data values. As a particular example, false-positives in row identifier sets outputted by probabilistic index element 3012 correspond to hash collisions of the probabilistic index structure and/or otherwise correspond to other mapping of multiple different data values to the same index value 3043.

In this case, row identifier set 3044.2 outputted by probabilistic index element 3012 indicates row a, row b, and row d, but not row c, based on the index value 3043.2 in the probabilistic index structure 3020.1 mapping to and/or otherwise indicating rows a, b, and d. The source element 3014 reads the data values 3024.1.a, 3024.1.b, and 3024.1.d accordingly. Filter element 3016 applies filter parameters indicating some function, such as a logical condition or predicate, of data values 3024.1 of column 3023.1, where row a and row d are identified in row identifier subset 3045 outputted by filtering element 3016 based on data value 3024.1.a and 3024.d satisfying filter parameters 3048, and based on data value 3024.1.c not satisfying filter parameters 3048. The row identifier subset 3045 is guaranteed to be equivalent to the true predicate-satisfying row set 3034 of row identifier set 3044.2, and is guaranteed to not include any rows of the false-positive row set 3035 of row identifier set 3044.2.

The query processing system 2802 of FIGS. 30A-30G can be implemented at a massive scale, for example, by being implemented by a database system 10 that is operable to receive, store, and perform queries against a massive number of records of one or more datasets, such as millions, billions, and/or trillions of records stored as many Terabytes, Petabytes, and/or Exabytes of data as discussed previously. In particular, the IO operator execution module 2840 of FIGS. 30A-30G can be implemented by a large number, such as hundreds, thousands, and/or millions of computing devices 18, nodes 37, and/or processing core resources 48 that perform independent processes in parallel, for example, with minimal or no coordination, to implement some or all of the features and/or functionality of the 30A-30G at a massive scale.

The utilization of probabilistic indexes by the IO operator execution module 2840 to execute probabilistic index-based IO constructs 3010 of IO pipelines 2835 cannot practically be performed by the human mind, particularly when the database system 10 is implemented to store and perform queries against records at a massive scale as discussed previously. In particular, the human mind is not equipped to generate a row identifier set 3044, read corresponding data values, and filter the corresponding data values for millions, billions, and/or trillions of records stored as many Terabytes, Petabytes, and/or Exabytes of data. Furthermore, the human mind is not equipped to distribute and perform these steps of an IO pipeline as multiple independent processes, such as hundreds, thousands, and/or millions of independent processes, in parallel and/or within overlapping time spans.

In various embodiments, a query processing system includes at least one processor and a memory that stores operational instructions. The operational instructions, when executed by the at least one processor, can cause the query processing system to: determine an IO pipeline that includes a probabilistic index-based IO construct for access of a first column of a plurality of rows based on a query including a query predicate indicating the first column; and/or apply the probabilistic index-based IO construct in conjunction with execution of the query via the IO pipeline. Applying the probabilistic index-based IO construct in conjunction with execution of the query via the IO pipeline can include: applying an index element of the probabilistic index-based IO construct to identify a first subset of rows as a proper subset of the plurality of rows based on index data of a probabilistic indexing scheme for the first column of the plurality of rows; and/or applying a filter element of the probabilistic index-based IO construct to identify a second subset of rows as a subset of the first subset of rows based on identifying ones of a first subset of a plurality of column values corresponding to the first subset of rows that compare favorably to the query predicate.

FIG. 30H illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30H. In particular, a node 37 can utilize the query processing module 2435 to execute some or all of the steps of FIG. 30H, where multiple nodes 37 implement their own query processing modules 2435 to independently execute the steps of FIG. 30H, for example, to facilitate execution of a query as participants in a query execution plan 2405. Some or all of the method of FIG. 30H can be performed by the query processing system 2802, for example, by utilizing an operator execution flow generator module 2803 and/or a query execution module 2504. For example, some or all of the method of FIG. 30H can be performed by the IO pipeline generator module 2834, the index scheme determination module 2832, and/or the IO operator execution module 2840. Some or all of the method of FIG. 30H can be performed via the query processing system 2802 based on implementing IO operator execution module of FIGS. 30A-30G that execute IO pipelines that include probabilistic index-based IO constructs 3010. Some or all of the method of FIG. 30H can be performed via communication with and/or access to a segment storage system 2508, such as memory drives 2425 of one or more nodes 37. Some or all of the steps of FIG. 30H can optionally be performed by any other processing module of the database system 10.

Some or all of the steps of FIG. 30H can be performed to implement some or all of the functionality of the segment processing module 2502 as described in conjunction with FIGS. 28A-28C and/or FIG. 29A. Some or all of the steps of FIG. 30H can be performed to implement some or all of the functionality regarding execution of a query via the plurality of nodes in the query execution plan 2405 as described in conjunction with FIGS. 24A-24E. Some or all steps of FIG. 30H can be performed by database system 10 in accordance with other embodiments of the database system 10 and/or nodes 37 discussed herein. Some or all steps of FIG. 30H can be performed in conjunction with some or all steps of FIG. 25E, FIG. 26B, FIG. 27D, FIG. 28D, and/or FIG. 29B. For example, some or all steps of FIG. 30H can be utilized to implement step 2598 of FIG. 25E, step 2790 of FIG. 27D, and/or step 2886 of FIG. 28D.

Step 3082 includes storing a plurality of column values for a first column of a plurality of rows. Step 3084 includes indexing the first column via a probabilistic indexing scheme. Step 3086 includes determining an IO pipeline that includes a probabilistic index-based IO construct for access of the first column based on a query including a query predicate indicating the first column. Step 3088 includes applying the probabilistic index-based IO construct in conjunction with execution of the query via the IO pipeline.

Performing step 3088 can optionally include performing step 3090 and/or step 3092. Step 3090 includes applying an index element of the probabilistic index-based IO construct to identify a first subset of rows as a proper subset of the plurality of rows based on index data of the probabilistic indexing scheme for the first column. Step 3092 includes applying a filter element of the probabilistic index-based IO construct to identify a second subset of rows as a subset of the first subset of rows based on identifying ones of a first subset of the plurality of column values corresponding to the first subset of rows that compare favorably to the query predicate. In various embodiments, the second subset of rows is a proper subset of the first subset of rows.

In various embodiments, applying the probabilistic index-based IO construct in conjunction with execution of the query via the IO pipeline further includes applying a source element of the probabilistic index-based IO construct to read the first subset of the plurality of column values corresponding to the first subset of rows. In various embodiments, the source element is applied after the index element in the IO pipeline, and/or the filter element is applied after the source element in the IO pipeline.

In various embodiments, the probabilistic indexing scheme is an inverted indexing scheme. In various embodiments, the first subset of rows are identified based on inverted index data of the inverted indexing scheme.

In various embodiments, the index data of the probabilistic indexing scheme includes a plurality of hash values computed by performing a hash function on corresponding ones of the plurality of column values. In various embodiments, the first subset of rows are identified based on a hash value computed for a first value indicated in the query predicate. In various embodiments, the plurality of column values for the first column are variable-length values, and/or the plurality of hash values are fixed-length values.

In various embodiments, the query predicate indicates an equality condition requiring equality with the first value. The first subset of rows can be identified based on having hash values for the first column equal to the hash value computed for the first value. A set difference between the first subset of rows and the second subset of rows can correspond to hash collisions for the hash value. The second subset of rows can be identified based on having column values for the first column equal to the first value.

In various embodiments, the second subset of rows includes every row of the plurality of rows with a corresponding column value of the first column comparing favorably to the query predicate. A set difference between the first subset of rows and the second subset of rows can include every row in the first subset of rows with a corresponding column value of the first column comparing unfavorably to the query predicate.

In various embodiments, the IO pipeline for the query includes a plurality of probabilistic index-based IO constructs based on a plurality of query predicates of the query that includes the query predicate. In various embodiments, the method further includes storing a second plurality of column values for a second column of the plurality of rows in conjunction the probabilistic indexing scheme. The probabilistic index-based IO construct can be a first one of the plurality of probabilistic index-based IO constructs, and/or a second one of the plurality of probabilistic index-based IO constructs can correspond to access to the second column based on another query predicate of the plurality of query predicates indicating the second column.

In various embodiments, the plurality of rows are stored via a set of segments. The IO pipeline can be generated for a first segment of the set of segments, and/or a second IO pipeline can be generated for a second segment of the set of segments. The IO pipeline can be different from the second IO pipeline based on the first segment utilizing the probabilistic indexing scheme for the first column and based on the second segment utilizing a different indexing scheme for the first column.

In various embodiments, the method further includes determining a selected false-positive tuning parameter of a plurality of false-positive tuning parameter options. The probabilistic indexing scheme for the first column can be in accordance with the selected false-positive tuning parameter, and/or a size of a set difference between the first subset of rows and the second subset of rows can be based on the selected false-positive tuning parameter.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a non-transitory computer readable storage medium includes at least one memory section that stores operational instructions that, when executed by a processing module that includes a processor and a memory, causes the processing module to: store a plurality of column values for a first column of a plurality of rows; index the first column via a probabilistic indexing scheme; determine an IO pipeline that includes a probabilistic index-based IO construct for access of the first column based on a query including a query predicate indicating the first column; and/or apply the probabilistic index-based IO construct in conjunction with execution of the query via the IO pipeline. Apply the probabilistic index-based IO construct in conjunction with execution of the query via the IO pipeline can include: applying an index element of the probabilistic index-based IO construct to identify a first subset of rows as a proper subset of the plurality of rows based on index data of the probabilistic indexing scheme for the first column; and/or applying a filter element of the probabilistic index-based IO construct to identify a second subset of rows as a subset of the first subset of rows based on identifying ones of a first subset of the plurality of column values corresponding to the first subset of rows that compare favorably to the query predicate.

FIGS. 31A-31F present embodiments of a database system implemented to utilize probabilistic indexing to implement conjunction in query executions. In particular, the probabilistic index-based IO construct 3010 of FIGS. 30A-30H can be adapted for implementation of conjunction. As an intersection inherently further filters rows for each operand of a conjunction, the filtering element can be applied to the output of both source elements after sourcing rows in parallel via the probabilistic indexing scheme for the respective operands of the intersection. This further improves the technology of database systems by optimizing query execution for operator execution flows that include conjunction logical constructs via probabilistic indexing schemes.

FIG. 31A illustrates an embodiment of generation of an IO pipeline that includes at least one probabilistic index-based conjunction construct 3110 based on a conjunction 3112 of an operator execution flow 2817. For example, the conjunction is included based on a corresponding query expression includes an AND operator and/or the corresponding operator execution flow 2817 including a set intersection. The conjunction can be implemented as some or all predicates 2822 of FIGS. 30A-30H. The conjunction 3112 can be implemented upstream and/or downstream of other query predicate constructs, such as other conjunctions 3112, disjunctions, negations, or other operators in the operator execution flow 2817.

The conjunction 3112 can indicate a set of operands 3114, which can include at least two operands 3114. Each operand 3114 can involve at least one corresponding column 3023 of the dataset identified via a corresponding one or more column identifiers. In this example, two operands 3114.A and 3114.B are included, where operand 3114.A indicates a first column 3023.A identified by column identifier 3041.A, and operand 3114.B indicates a second column 3023.B identified by column identifier 3041.B. While not illustrated, conjunctions 3112 can optionally indicate more than two operands in other embodiments.

Corresponding operand parameters 3148 can indicate requirements for the data values in the corresponding columns of the operand 3114. For example, only rows with column values meeting the operand parameters of all of the operands 3114 of the conjunction operator will be outputted in executing the conjunction of the operator execution flow. In this example, the operand parameters 3148.A can indicate a logical construct that evaluates to either true or false based on the data value of column A for the corresponding row. Similarly, the operand 3114.B can indicate a logical construct that evaluates to either true or false based on the data value of column B for the corresponding row. For example, the conjunction evaluates to true when the value of column A is equal to a first literal value and when the value of column A is equal to a second literal value. Any other type of operands not based on equality, such as conditions based on being less than a literal value, greater than a literal value, including a consecutive text pattern, and/or other conditional statements evaluating to either true or false can be implemented as operand parameters 3148.

The IO pipeline generator module 2834 can generate a corresponding IO pipeline 2835 based on pushing the conjunction 3112 to the IO level as discussed previously. This can include adapting the probabilistic index-based IO construct 3010 of FIGS. 30A-30H to implement a probabilistic index-based conjunction construct 3110. For example, the probabilistic index-based conjunction construct 3110 can be considered an adapted combination of multiple probabilistic index-based IO constructs 3010 in parallel to source and filter corresponding operands of the conjunction. However, the nature of logical conjunctions can be leveraged to reduce the number of filtering elements required, as a single filtering element 3016 can be implemented to filter out the false-positives sourced as a result of the probabilistic index while also implementing the set intersection required to implement the conjunction.

The probabilistic index-based conjunction construct 3110 can alternatively or additionally be considered a type of probabilistic index-based IO construct 3010 specific to implementing predicates 2822 that include conjunction constructs. The probabilistic index-based conjunction construct 3110 can be implemented upstream and/or downstream of other IO constructs of the IO pipeline, such as other IO probabilistic index-based IO constructs 3010 or other source utilize different non-probabilistic indexing schemes, and/or other constructs of the IO pipeline as discussed herein.

In particular, a set of index elements 3012 can be included as elements of parallel probabilistic index-based IO constructs 3010 based on the corresponding set of operands 3114 of the conjunction 3112 being implemented. For example, different processing core resources 48 and/or nodes 37 can be assigned to process the different index elements 3012, and/or the set of index elements 3012 can otherwise be processed in parallel. In this example, a set of two of index elements 3012.A and 3012.B are implemented for columns 3023.A and 3023.B, respectively based on these columns being indicated in the operands of the conjunction 3112. Index probe parameter data 3042 of each index element 3012 can be based on the operand parameters 3148 of the corresponding operand 3114. For example, index probe parameter data 3042.A of index element 3012.A indicates an index value determined based on the literal value to which the operand parameters 3148.A indicates the corresponding column value must be equal to satisfy the operand 3114.A, and/or index probe parameter data 3042.B of index element 3012.B can indicate an index value determined based on the literal value to which the operand parameters 3148.B indicates the corresponding column value must be equal to satisfy the operand 3114.B.

A set of source elements 3014 can be included in parallel downstream of the respective index elements. In some embodiments, the set of source elements 3014 are only included in cases where the column values were not previously sourced upstream of the probabilistic index-based conjunction construct 3110 for another use in other constructs of the IO pipeline. Different processing core resources 48 and/or nodes 37 can be assigned to process the different source elements 3014, and/or the set of source elements 3014 can otherwise be processed in parallel.

Each parallel track can be considered an adapted probabilistic index-based IO construct 3010. However, rather than also including each of a set of parallel filter elements 3016 in parallel to implement a set of full probabilistic index-based IO constructs 3010 of FIG. 30B in parallel, a single filter element can be implemented by the probabilistic index-based conjunction construct 3110 to filter the sets of rows identified via the set of parallel index elements 3012 based on the corresponding data values read via corresponding source elements 3014.

Execution of an example probabilistic index-based conjunction construct 3110 is illustrated in FIG. 31B. Each parallel probabilistic index element 3012 can access a corresponding probabilistic index structure 3020 for a corresponding column. In this example, both column 3023.A and column 3023.B are indexed via a probabilistic indexing scheme, and respective probabilistic index elements 3012.A and 3012.B access corresponding probabilistic index structures 3020.A and 3020.B.

This results in identification of a set of row identifier sets 3044 via each probabilistic index element 3012. As each operand 3114 can be treated as a given predicate 2822, each row identifier set 3044.A and 3044.B can be guaranteed to include the true predicate-satisfying row set 3034 satisfying the corresponding operand 3114.A and/or 3148.B, respectively, as discussed previously. Each row identifier set 3044.A and 3044.B may also have false positive rows of corresponding false-positive row sets 3035.A and 3035.B, respectively, that are not distinguishable from the corresponding true operand-satisfying row sets 3034 until the corresponding data values are read and processed as discussed previously.

Each source element 3014 can read rows of the corresponding row identifier set 3044 from row storage 3022, such as from one or more segments, to render a corresponding data value set 3046 as discussed previously. Filter element 3016 can be implemented to identify rows included in both row identifier sets 3044.A and 3044.B. However, because the row identifier sets may include false positives, the filter element 3016 must further evaluate column A data values of data value set 3046.A of these rows and evaluate column B data values of data value set 3046.B to determine whether they satisfy or otherwise compare favorably to the respective operands of the conjunction, thus further filtering out false-positive row sets 3035.A and 3035.B in addition to facilitating a set intersection. For example, a function F(data value 3024.A) is based on the operand 3114.A and, for a given data value 3024 of column A for a given row evaluates to either true or false, where the given row only satisfies the operand 3114.A when the function evaluates to true; and a function G(data value 3024.B) is based on the operand 3114.B and, for a given data value 3024 of column B for a given row evaluates to either true or false, where the given row only satisfies the operand 3114B when the function evaluates to true.

Only ones of the rows included in both row identifier sets 3044.A and 3044.B having data values in data value sets 3046.A and 3046.B that satisfy both operands 3114.A and 3148.B are included in a true conjunction satisfying row set 3134 outputted by the filter element 3016. This true conjunction satisfying row set 3134 can be guaranteed to be equivalent to a set intersection between the true operandA-satisfying row set 3034.A and the true operandB-satisfying row set 3034.B. Note that, due to the potential presence of false-positives in row identifier set 3044.A and/or 3044.B, the true conjunction satisfying row set 3134 may be a proper subset of the set intersection of row identifier sets 3044.A and 3044.B, and thus the filter element that evaluates data values of these rows is thus necessary to ensure that exactly the true conjunction satisfying row set 3134 is outputted by the probabilistic index-based conjunction construct 3110. A set difference between the set intersection of row identifier sets 3044.A and 3044.B, and the true conjunction satisfying row set 3134, can include: one or more rows included in false-positive row set 3035.A and in false-positive row set 3035.B; one or more rows included in false-positive row set 3035.A and in true operandB satisfying row set 3034.B; and/or one or more rows included in false-positive row set 3035.B and in true operandA satisfying row set 3034.A. In some cases, the true conjunction satisfying row set 3134 can be equivalent to the intersection of row identifier sets 3044.A and 3044.B when the intersection of row identifier sets 3044.A and 3044.B does not include any rows of false-positive row set 3035.A or 3035.B. The true conjunction satisfying row set 3134 can be guaranteed to be a subset of the intersection of row identifier sets 3044.A and 3044.B as either an equivalent set or a proper subset.

FIG. 31C illustrates a particular example of the execution of the probabilistic index-based conjunction construct 3110 of FIG. 31B. In this particular example, the probabilistic index-based conjunction construct 3110 is implemented to identify rows with a data value in column 3023.A equal to "hello" and a data value in column 3023.B equal to "world". In this example, a set of rows including a set of rows a, b, c, d, e, and f are included in an initial row set 3032 against which the conjunction is performed. Rows a, b, d, e, and f are included in the row identifier set 3044.A, for example, based on having data values of column A hashing to a same value indexed in the probabilistic index structure 3020.A or otherwise being indexed together, despite not all being equal to "hello". Rows a, b, d, and f are included in the row identifier set 3044.B, for example, based on having data values of column B hashing to a same value indexed in the probabilistic index structure 3020.B or otherwise being indexed together, despite not all being equal to "world". Their respective values are read from memory in row storage 3022, and filter element 3016 automatically filters out: row b due to having a column A value not equal to "hello," row d due to having a column A value not equal to "hello" nor a column B value equal to "world", and row e due to not being included in the row identifier set 3044.B, and thus being guaranteed to not satisfy the conjunction. Note that as row e was not included in the row identifier set 3044.B, its column B value is thus not read from row storage 3022 via source element 3014.B. Row c was never processed for inclusion by filter element 3016 as it was not identified in either row identifier set 3044.A or 3044.B utilized by filter element 3016, and also did not have data values read for either row A or row B.

FIG. 31D illustrates another example of execution of another embodiment of probabilistic index-based conjunction construct 3110 via an IO operator execution module 2840 that does not include source element 3014 for column A or column B based on the corresponding data values having been previously read upstream in the IO pipeline 2835. For example, as discussed in conjunction with FIG. 31E, rather than re-reading these values, the data values of data value set 3046.A and 3046.B are identified from a previously-read data value supersets 3056.A and 3056.B, respectively. In particular, data value set 3046.A is identified after applying corresponding probabilistic index element 3012 for column A based on identifying only ones of the corresponding data value superset 3056.A for rows with row identifiers in the row identifier set 3044.A identified by applying probabilistic index element 3012 for column A. Similarly, data value set 3046.B is identified after applying corresponding probabilistic index element 3012 for column B based on identifying only ones of the corresponding data value superset 3056.B for rows with row identifiers in the row identifier set 3044.B identified by applying probabilistic index element 3012 for column B. Note that in other embodiments, if column A was previously sourced upstream in the IO pipeline but column B was not, only a source element 3014 for column is included in the probabilistic index-based conjunction construct, or vice versa.

FIG. 31E illustrates another example of execution of another embodiment of probabilistic index-based conjunction construct 3110 via an IO operator execution module 2840 where not all columns of operands for the conjunction are indexed via a probabilistic indexing scheme. In this case, only column A is indexed via a probabilistic indexing scheme, while column B is indexed in a different manner or is not indexed at all. Column B can be sourced directly, where all data values of column B are read, or where a different non-probabilistic index is utilized to identify the relevant rows for column B satisfying operand B.

In various embodiments, a query processing system includes at least one processor and a memory that stores operational instructions. The operational instructions, when executed by the at least one processor, can cause the query processing system to: determine a query operator execution flow that includes a logical conjunction indicating a first column of a plurality of rows in a first operand and indicating a second column of the plurality of rows in a second operand; and/or facilitate execution of the logical conjunction of the query operator execution flow against the plurality of rows. Facilitating execution of the logical conjunction of the query operator execution flow against the plurality of rows can include: utilizing first index data of a probabilistic indexing scheme for the first column of the plurality of rows to identify a first subset of rows as a proper subset of the plurality of rows based on the first operand; and/or filtering the first subset of rows to identify a second subset of rows as a subset of the first subset of rows based on identifying ones of the first subset of rows having first column values of the first column that compare favorably to the first operand, and having second column values of the second column that compare favorably to the second operand.

FIG. 31F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31F. In particular, a node 37 can utilize the query processing module 2435 to execute some or all of the steps of FIG. 31F, where multiple nodes 37 implement their own query processing modules 2435 to independently execute the steps of FIG. 31F, for example, to facilitate execution of a query as participants in a query execution plan 2405.

Some or all of the method of FIG. 31F can be performed by the query processing system 2802, for example, by utilizing an operator execution flow generator module 2803 and/or a query execution module 2504. For example, some or all of the method of FIG. 31F can be performed by the IO pipeline generator module 2834, the index scheme determination module 2832, and/or the IO operator execution module 2840. Some or all of the method of FIG. 31F can be performed via the query processing system 2802 based on implementing IO operator execution module of FIGS. 31A-31E that execute IO pipelines that include probabilistic index-based conjunction constructs 3110. Some or all of the method of FIG. 31F can be performed via communication with and/or access to a segment storage system 2508, such as memory drives 2425 of one or more nodes 37. Some or all of the steps of FIG. 31F can optionally be performed by any other processing module of the database system 10.

Some or all of the steps of FIG. 31F can be performed to implement some or all of the functionality of the segment processing module 2502 as described in conjunction with FIGS. 28A-28C and/or FIG. 29A. Some or all of the steps of FIG. 31F can be performed to implement some or all of the functionality regarding execution of a query via the plurality of nodes in the query execution plan 2405 as described in conjunction with FIGS. 24A-24E. Some or all steps of FIG. 31F can be performed by database system 10 in accordance with other embodiments of the database system 10 and/or nodes 37 discussed herein. Some or all steps of FIG. 31F can be performed in conjunction with some or all steps of FIG. 25E, FIG. 26B, FIG. 27D, FIG. 28D, and/or FIG. 29B. For example, some or all steps of FIG. 31F can be utilized to implement step 2598 of FIG. 25E, step 2790 of FIG. 27D, and/or step 2886 of FIG. 28D. Some or all steps of FIG. 31F can be performed in conjunction with some or all steps of FIG. 30H.

Step 3182 includes determining a query operator execution flow that includes a logical conjunction indicating a first column of a plurality of rows in a first operand and indicating a second column of the plurality of rows in a second operand. Step 3184 includes facilitating execution of the logical conjunction of the query operator execution flow against the plurality of rows.

Performing step 3184 can include performing step 3186 and/or 3188. Step 3186 includes utilizing first index data of a probabilistic indexing scheme for the first column of the plurality of rows to identify a first subset of rows as a proper subset of the plurality of rows based on the first operand. Step 3188 includes filtering the first subset of rows to identify a second subset of rows as a subset of the first subset of rows based on identifying ones of the first subset of rows having first column values of the first column that compare favorably to the first operand, and having second column values of the second column that compare favorably to the second operand.

In various embodiments, facilitating execution of the logical conjunction of the query operator execution flow against the plurality of rows further includes reading a first set of column values from memory based on reading column values of the first column only for rows in the first subset of rows. Filtering the first subset of rows to identify the second subset of rows can include utilizing the first set of column values.

In various embodiments, facilitating execution of the logical conjunction of the query operator execution flow against the plurality of rows further includes utilizing second index data of a probabilistic indexing scheme for the second column of the plurality of rows to identify a third subset of rows as another proper subset of the plurality of rows based on the second operand. The second subset of rows can be further identified based on filtering the third subset of rows. The second subset of rows can be a subset of the third subset of rows. In various embodiments, facilitating execution of the logical conjunction of the query operator execution flow against the plurality of rows further includes reading a second set of column values from memory based on reading column values of the second column only for rows in the third subset of rows, where filtering the third subset of rows to identify the second subset of rows includes utilizing the second set of column values. In various embodiments, the first subset of rows and the third subset of rows are identified in parallel via a first set of processing resources and a second set of processing resources, respectively.

In various embodiments, the first index data of the probabilistic indexing scheme for the first column are a first plurality of hash values computed by performing a first hash function on corresponding first column values of the first column. The first subset of rows can be identified based on a first hash value computed for a first value indicated in the first operand. In various embodiments, second index data of the probabilistic indexing scheme for the second column can be a second plurality of hash values computed by performing a second hash function on corresponding second column values of the second column. The third subset of rows can be identified based on a second hash value computed for a second value indicated in the second operand. In various embodiments, the first operand indicates a first equality condition requiring equality with the first value. The first subset of rows can be identified based on having hash values for the first column equal to the first hash value computed for the first value. The second operand can indicate a second equality condition requiring equality with the second value. The third subset of rows can be identified based on having hash values for the second column equal to the second hash value computed for the second value.

In various embodiments, the second subset of rows includes every row of the plurality of rows with a corresponding first column value of the first column and second column value of the second column comparing favorably to the logical conjunction. The second subset of rows can be a proper subset of a set intersection of the first subset of rows and the third subset of rows and/or can be a non-null subset of the set intersection of the first subset of rows and the third subset of rows.

In various embodiments, the probabilistic indexing scheme is an inverted indexing scheme. The first subset of rows can be identified based on utilizing index data of the inverted indexing scheme. In various embodiments, a plurality of column values for the first column are variable-length values. In various embodiments, a plurality of hash values were generated from the plurality of column values for the first column based on the probabilistic filtering scheme. The plurality of hash values can be fixed-length values. Identifying the first subset of rows can be based on the plurality of hash values.

In various embodiments, at least one of the first subset of rows having a first column value for the first column that compares unfavorably to the first operand is included in the first subset of rows based on the probabilistic indexing scheme for the first column. In various embodiments, the at least one of the first subset of rows is not included in the second subset of rows based on the first column value for the first column comparing unfavorably to the first operand.

In various embodiments, facilitating execution of the logical conjunction of the query operator execution flow against the plurality of rows includes applying at least one probabilistic index-based IO construct of an IO pipeline generated for the query operator execution flow. For example, at least one probabilistic index-based IO construct of FIGS. 30A-30H is included in an IO pipeline utilized to facilitate execution of the logical conjunction of the query operator execution flow against the plurality of rows.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a non-transitory computer readable storage medium includes at least one memory section that stores operational instructions that, when executed by a processing module that includes a processor and a memory, causes the processing module to: determine a query operator execution flow that includes a logical conjunction indicating a first column of a plurality of rows in a first operand and indicating a second column of the plurality of rows in a second operand; and/or facilitate execution of the logical conjunction of the query operator execution flow against the plurality of rows. Facilitating execution of the logical conjunction of the query operator execution flow against the plurality of rows can include: utilizing first index data of a probabilistic indexing scheme for the first column of the plurality of rows to identify a first subset of rows as a proper subset of the plurality of rows based on the first operand; and/or filtering the first subset of rows to identify a second subset of rows as a subset of the first subset of rows based on identifying ones of the first subset of rows having first column values of the first column that compare favorably to the first operand, and having second column values of the second column that compare favorably to the second operand.

FIGS. 32A-32G present embodiments of a database system implemented to utilize probabilistic indexing to implement disjunction in query executions. In particular, the probabilistic index-based IO construct 3010 of FIGS. 30A-30H can be adapted for implementation of disjunction. However, rather than simply applying a set union element to probabilistic index-based IO constructs 3010 in parallel for operands of the disjunction, additional source elements may be required downstream of the respective union, as its indexing and/or filtering may eliminate some of the required column values.

FIG. 32A illustrates an embodiment of generation of an IO pipeline that includes at least one probabilistic index-based disjunction construct 3210 based on a disjunction 3212 of an operator execution flow 2817. For example, the disjunction is included based on a corresponding query expression includes an OR operator and/or the corresponding operator execution flow 2817 including a set union. The disjunction can be implemented as some or all predicates 2822 of FIGS. 30A-30H. The disjunction 3212 can be implemented upstream and/or downstream of other query predicate constructs, such as other disjunctions 3212, conjunctions 3112, negations, or other operators in the operator execution flow 2817.

The disjunction 3212 can indicate a set of operands 3114, which can include at least two operands 3114. Each operand 3114 can involve at least one corresponding column 3023 of the dataset identified via a corresponding one or more column identifiers. In this example, two operands 3114.A and 3114.B are included, where operand 3114.A indicates a first column 3023.A identified by column identifier 3041.A, and operand 3114.B indicates a second column 3023.B identified by column identifier 3041.B. While not illustrated, disjunctions 3212 can optionally indicate more than two operands in other embodiments. The operands 3114.A and

3114.B of FIGS. 32A-32F can be the same as or different from the operands 3114.A and 3114.B of FIGS. 31A-31E. Corresponding operand parameters 3148 can similarly indicate requirements for the data values in the corresponding columns of the operand 3114 as discussed in conjunction with FIG. 31A.

The IO pipeline generator module 2834 can generate a corresponding IO pipeline 2835 based on pushing the disjunction 3212 to the IO level as discussed previously. This can include adapting the probabilistic index-based IO construct 3010 of FIGS. 30A-30H to implement a probabilistic index-based disjunction construct 3210. For example, the probabilistic index-based disjunction construct 3210 can be considered an adapted combination of multiple probabilistic index-based IO constructs 3010 in parallel to source and filter corresponding operands of the disjunction to output a plurality of sets of filtered rows in parallel, and to then output a union of this plurality of sets of filtered rows via a set union element 3218.

The probabilistic index-based disjunction construct 3210 can alternatively or additionally be considered a type of probabilistic index-based IO construct 3010 specific to implementing predicates 2822 that include disjunction constructs. The probabilistic index-based disjunction construct 3210 can be implemented upstream and/or downstream of other IO constructs of the IO pipeline, such as other IO probabilistic index-based IO constructs 3010 or other source utilize different non-probabilistic indexing schemes, and/or other constructs of the IO pipeline as discussed herein.

In particular, a set of index elements 3012 can be included as elements of parallel probabilistic index-based IO constructs 3010 based on the corresponding set of operands 3114 of the disjunction 3212 being implemented. For example, different processing core resources 48 and/or nodes 37 can be assigned to process the different index elements 3012, and/or the set of index elements 3012 can otherwise be processed in parallel. In this example, a set of two of index elements 3012.A and 3012.B are implemented for columns 3023.A and 3023.B, respectively based on these columns being indicated in the operands of the disjunction 3212. Index probe parameter data 3042 of each index element 3012 can be based on the operand parameters 3148 of the corresponding operand 3114. For example, index probe parameter data 3042.A of index element 3012.A indicates an index value determined based on the literal value to which the operand parameters 3148.A indicates the corresponding column value must be equal to satisfy the operand 3114.A, and/or index probe parameter data 3042.B of index element 3012.B can indicate an index value determined based on the literal value to which the operand parameters 3148.B indicates the corresponding column value must be equal to satisfy the operand 3114.B.

A set of source elements 3014 can be included in parallel downstream of the respective index elements. In some embodiments, the set of source elements 3014 are only included in cases where the column values were not previously sourced upstream of the probabilistic index-based disjunction construct 3210 for another use in other constructs of the IO pipeline. Different processing core resources 48 and/or nodes 37 can be assigned to process the different source elements 3014, and/or the set of source elements 3014 can otherwise be processed in parallel.

A set of filter elements 3016 can be included in parallel downstream of the respective source elements to filter the rows identified by respective index elements based on whether the corresponding data values for the corresponding column satisfy the corresponding operand. Each filter element filter rows based on whether the corresponding data values for the corresponding column satisfy the corresponding operand. The set of filtering elements thus filter out the false-positive rows for each respective column, A set union 3218 can be applied to the output of the filter elements to render the true disjunction output of the disjunction, as the input to the set union included no false-positive rows for any given parallel track.

As illustrated in FIG. 32A, additional source elements for one or more columns can be applied after the set union element 3218. This may be necessary for one or more given columns, as rows included in the union whose data values for a given column may be necessary later.

The data values of a given column for some rows included the union may not be available, and thus require sourcing after the union. For example, the data values of a given column for some rows included the union may not be available based these rows not satisfying the operand for the given column, and not being identified via the probabilistic index for the given column based on not being false-positive rows identified via the probabilistic index. These rows were therefore not read for the given column due to not being identified via the probabilistic index. However, these rows are included in the set union output based on these rows satisfying the operand for a different column, thus satisfying the disjunction. The column values for the given column are then read for these rows the first time via the downstream source element of the given column.

Alternatively or in addition, the data values of a given column for some rows included the union may not be available, and thus require sourcing after the union, based on these rows having had respective data values read for the given column via source elements 3014 due being false-positive rows identified by the respective probabilistic index utilized for the given column. However, after being sourced via the respective source element, the respective filtering element filters out these rows due to not satisfying the respective operand, which can render the respective data values unavailable downstream. However, these rows are included in the set union output based on these rows satisfying the operand for a different column, thus satisfying the disjunction. The column values for the given column are then re-read for these rows via the downstream source element of the given column.

Execution of an example probabilistic index-based disjunction construct 3210 is illustrated in FIG. 32B. Each parallel probabilistic index element 3012 can access a corresponding probabilistic index structure 3020 for a corresponding column. In this example, both column 3023.A and column 3023.B are indexed via a probabilistic indexing scheme, and respective probabilistic index elements 3012.A and 3012.B access corresponding probabilistic index structures 3020.A and 3020.B.

This results in identification of a set of row identifier sets 3044 via each probabilistic index element 3012. As each operand 3114 can be treated as a given predicate 2822, each row identifier set 3044.A and 3044.B can be guaranteed to include the true predicate-satisfying row set 3034 satisfying the corresponding operand 3114.A and/or 3148.B, respectively, as discussed previously. Each row identifier set 3044.A and 3044.B may also have false positive rows of corresponding false-positive row sets 3035.A and 3035.B, respectively, that are not distinguishable from the corresponding true operand-satisfying row sets 3034 until the corresponding data values are read and processed as discussed previously.

Each source element 3014 can read rows of the corresponding row identifier set 3044 from row storage 3022, such as from one or more segments, to render a corresponding data value set 3046 as discussed previously. Each filter element 3016 can be implemented to identify rows satisfying the corresponding operand. For example, a first filter element 3016.A applies a first function F(data value 3024.A) for rows in row identifier set 3044.A based on data values in data values set 3046.A to identify true operandA-satisfying row set 3034.A, filtering out false-positive row set 3035.A. A second filter element 3016.B can apply a second function G(data value 3024.B) for rows in row identifier set 3044.B based on data values in data values set 3046.B to identify true operandB-satisfying row set 3034.B, filtering out false-positive row set 3035.B. F(data value 3024.A) can be based on the operand 3114.A and, for a given data value 3024 of column A for a given row evaluates to either true or false, where the given row only satisfies the operand 3114.A when the function evaluates to true, and function G(data value 3024.B) can be based on the operand 3114.B and, for a given data value 3024 of column B for a given row evaluates to either true or false, where the given row only satisfies the operand 3114.B when the function evaluates to true.

Only ones of the rows included in either row identifier set 3044.A or 3044.B having data values in data value sets 3046.A and 3046.B that satisfy either operand 3114.A or 3148.B are included in a true disjunction satisfying row set 3234 outputted by the filter element 3016. This true disjunction satisfying row set 3234 can be guaranteed to be equivalent to a set union between the true operandA-satisfying row set 3034.A and the true operandB-satisfying row set 3034.B. Note that, due to the potential presence of false-positives in row identifier set 3044.A and/or 3044.B, the true disjunction satisfying row set 3234 may be a proper subset of the set union of row identifier sets 3044.A and 3044.B. A set difference between the set union of row identifier sets 3044.A and 3044.B, and the true disjunction satisfying row set 3234, can include: one or more rows included in false-positive row set 3035.A and in false-positive row set 3035.B; one or more rows included in false-positive row set 3035.A and not included in row identifier set 3044.B; and/or one or more rows included in false-positive row set 3035.B and not included in row identifier set 3044.A. In some cases, the true disjunction satisfying row set 3234 can be equivalent to the intersection of row identifier sets 3044.A and 3044.B when the union of row identifier sets 3044.A and 3044.B includes only rows in either true operandA-satisfying row set 3034.A or true operandB-satisfying row set 3034.B. The true disjunction satisfying row set 3234 can be guaranteed to be a subset of the union of row identifier sets 3044.A and 3044.B as either an equivalent set or a proper subset.

FIG. 32C illustrates an embodiment of an example of the execution of a probabilistic index-based disjunction construct 3210 that includes additional source elements 3014 for the previously sourced columns A and B after the set union element 3218 to ensure all required data values for rows in the output of the disjunction are read for these columns as discussed previously to render data value sets 3247.A and 3247.B, respectively, that include column values read for columns A and B for all rows in the disjunction.

Data value set 3247.A can include at least data value not included in data value set 3046.A, for example, based on the corresponding row satisfying operandB but not operandA. A data value set 3247.A can include at least data value included in data value set 3046.A that is filtered out as a false positive, for example, based on the corresponding row being included in the false-positive row set 3035.A and being included in the true operandB-satisfying row set 3034.B. A data value set 3046.A can include at least data value not included in data value set 3247.A, for example, based on the corresponding row being included in the false-positive row set 3035.A, and not being included in the true operandB-satisfying row set 3034.B, thus causing the row to be not included in the set union. Similar differences between data value set 3247.B and data value set 3247.B can similarly exist for similar reasons.

In some cases, not all of the columns sourced for the disjunction are re-sourced, due to some or all columns not being required for further use downstream. For example, columns A and B are both sourced via source elements 3014 prior to the set union element 3218 as illustrated in FIGS. 32B and 32C, but column A and/or column B is not re-sourced via additional source elements 3014 after the set union element 3218 due to their data values for rows in the disjunction output not being required for further processing and/or not being required for inclusion in the query resultant.

FIG. 32D illustrates a particular example of the execution of the probabilistic index-based disjunction construct 3210 of FIG. 32C. In this particular example, the probabilistic index-based disjunction construct 3210 is implemented to identify rows with a data value in column 3023.A equal to "hello" or a data value in column 3023.B equal to "world". In this example, a set of rows including a set of rows a, b, c, d, e, and f are included in an initial row set 3032 against which the disjunction is performed, which can be the same as rows a, b, c, d, e, and f of FIG. 31C.

Rows a, b, d, e, and f are included in the row identifier set 3044.A, for example, based on having data values of column A hashing to a same value indexed in the probabilistic index structure 3020.A or otherwise being indexed together, despite not all being equal to "hello". Their respective values are read from memory in row storage 3022 via source element 3014.A, and filter element 3016.A automatically removes the false-positive row set 3035.A based on filtering out: row b due to having a column A value not equal to "hello," and row d due to having a column A value not equal to "hello". This renders true operandA-satisfying row set 3034.A.

Rows a, b, d, and f are included in the row identifier set 3044.B, for example, based on having data values of column B hashing to a same value indexed in the probabilistic index structure 3020.B or otherwise being indexed together, despite not all being equal to "world". Their respective values are read from memory in row storage 3022 via source element 3014.B, and filter element 3016.B automatically removes the false-positive row set 3035.B based on filtering out row d due to having a column A value not equal to "world." This renders true operandB-satisfying row set 3034.B.

Set union element 3218 performs a set union upon true operandA-satisfying row set 3034.A and true operandB-satisfying row set 3034.B to render true disjunction satisfying row set 3234.

Another source element for column A is performed to read data values of column A for rows in true disjunction satisfying row set 3234, and/or only for rows in true disjunction satisfying row set 3234 whose data values were not already read and/or not already included in output of the set union based on being previously read and not filtered out. For example, this additional source element is included based on column A values for true disjunction satisfying row set 3234 being required further downstream. The resulting data value set 3047.A includes values of column A. In this case, the resulting data value set 3047.A includes the column A data value for false-positive rows b, which was previously read via the prior source element for column A due to being identified in row identifier set 3044.A. For example, the data value 3024.A.b is re-read via this source element 3014 and included in data value set 3047.A due to row b being included in output of set union element 3218.

Another source element for column B is performed to read data values of column B for rows in true disjunction satisfying row set 3234, and/or only for rows in true disjunction satisfying row set 3234 whose data values were not already read and/or not already included in output of the set union based on being previously read and not filtered out. For example, this additional source element is included based on column B values for true disjunction satisfying row set 3234 being required further downstream. The resulting data value set 3047.B includes values of column B. In this case, the resulting data value set 3047.B includes the column B data value row e, which was not read via the prior source element for row B due to not being identified in row identifier set 3044.B. For example, the data value 3024.B.e is read for the first time via this source element 3014 and included in data value set 3047.B due to row e being included in output of set union element 3218.

FIGS. 32E and 32F illustrates another example of execution of another embodiment of probabilistic index-based disjunction construct 3210 via an IO operator execution module 2840 where not all columns of operands for the disjunction are indexed via a probabilistic indexing scheme. In this case, only column A is indexed via a probabilistic indexing scheme, while column B is indexed in a different manner or is not indexed at all. Column B can be sourced directly, where all data values of column B are read, or where a different non-probabilistic index is utilized to identify the relevant rows for column B satisfying operand B. As illustrated in FIG. 32F, column B can optionally be re-sourced as discussed in conjunction with FIG. 32C if column B data values for the output of the set union are required downstream, despite not being indexed via the probabilistic index.

In various embodiments, a query processing system includes at least one processor and a memory that stores operational instructions. The operational instructions, when executed by the at least one processor, can cause the query processing system to: determine a query operator execution flow that includes a logical disjunction indicating a first column of a plurality of rows in a first operand and indicating a second column of the plurality of rows in a second operand; and/or facilitate execution of the logical disjunction of the query operator execution flow against the plurality of rows. Facilitating execution of the logical disjunction of the query operator execution flow against the plurality of rows can include utilizing first index data of a probabilistic indexing scheme for the first column of the plurality of rows to identify a first subset of rows as a proper subset of the plurality of rows based on the first operand; filtering the first subset of rows to identify a second subset of rows as a subset of the first subset of rows based on identifying ones of the first subset of rows having first column values of the first column that compare favorably to the first operand; identifying a third subset of rows as a proper subset of the plurality of rows based on identifying rows of the plurality of rows having second column values of the second column that compare favorably to the second operand; and/or identifying a final subset of rows as a union of the second subset of rows and the third subset of rows.

FIG. 32G illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32G. In particular, a node 37 can utilize the query processing module 2435 to execute some or all of the steps of FIG. 32G, where multiple nodes 37 implement their own query processing modules 2435 to independently execute the steps of FIG. 32G, for example, to facilitate execution of a query as participants in a query execution plan 2405.

Some or all of the method of FIG. 32G can be performed by the query processing system 2802, for example, by utilizing an operator execution flow generator module 2803 and/or a query execution module 2504. For example, some or all of the method of FIG. 32G can be performed by the IO pipeline generator module 2834, the index scheme determination module 2832, and/or the IO operator execution module 2840. Some or all of the method of FIG. 32G can be performed via the query processing system 2802 based on implementing IO operator execution module of FIGS. 32A-32F that execute IO pipelines that include probabilistic index-based disjunction constructs 3210. Some or all of the method of FIG. 32G can be performed via communication with and/or access to a segment storage system 2508, such as memory drives 2425 of one or more nodes 37. Some or all of the steps of FIG. 32G can optionally be performed by any other processing module of the database system 10.

Some or all of the steps of FIG. 32G can be performed to implement some or all of the functionality of the segment processing module 2502 as described in conjunction with FIGS. 28A-28C and/or FIG. 29A. Some or all of the steps of FIG. 32G can be performed to implement some or all of the functionality regarding execution of a query via the plurality of nodes in the query execution plan 2405 as described in conjunction with FIGS. 24A-24E. Some or all steps of FIG. 32G can be performed by database system 10 in accordance with other embodiments of the database system 10 and/or nodes 37 discussed herein. Some or all steps of FIG. 32G can be performed in conjunction with some or all steps of FIG. 25E, FIG. 26B, FIG. 27D, FIG. 28D, and/or FIG. 29B. For example, some or all steps of FIG. 32G can be utilized to implement step 2598 of FIG. 25E, step 2790 of FIG. 27D, and/or step 2886 of FIG. 28D. Some or all steps of FIG. 32G can be performed in conjunction with some or all steps of FIG. 30H.

Step 3282 includes determining a query operator execution flow that includes a logical disjunction indicating a first column of a plurality of rows in a first operand and indicating a second column of the plurality of rows in a second operand. Step 3284 includes facilitating execution of the logical disjunction of the query operator execution flow against the plurality of rows.

Performing step 3284 can include performing step 3286, 3288, 3290, and/or 3292. Step 3286 utilizing first index data of a probabilistic indexing scheme for the first column of the plurality of rows to identify a first subset of rows as a proper subset of the plurality of rows based on the first operand. Step 3288 includes filtering the first subset of rows to identify a second subset of rows as a subset of the first subset of rows based on identifying ones of the first subset of rows having first column values of the first column that compare favorably to the first operand. Step 3290 includes identifying a third subset of rows as a proper subset of the plurality of rows based on identifying rows of the plurality of rows having second column values of the second column that compare favorably to the second operand. Step 3292 includes identifying a final subset of rows as a union of the second subset of rows and the third subset of rows.

In various embodiments, facilitating execution of the logical disjunction of the query operator execution flow against the plurality of rows further includes reading a first set of column values from memory based on reading column values of the first column only for rows in the first subset of rows. Filtering the first subset of rows to identify the second subset of rows can include utilizing the first set of column values. In various embodiments, facilitating execution of the logical disjunction of the query operator execution flow against the plurality of rows further includes reading another set of column values from memory based on reading column values of the first column for rows in the final subset of rows as output column values of the logical disjunction. A set difference between the another set of column values and the first set of column values can be non-null.

In various embodiments, a set difference between the first subset of rows and the second subset of rows is non-null. In various embodiments, a set intersection between the set difference and the final subset of rows is non-null.

In various embodiments, facilitating execution of the logical disjunction of the query operator execution flow against the plurality of rows further includes utilizing second index data of a probabilistic indexing scheme for the second column of the plurality of rows to identify a fourth subset of rows as another proper subset of the plurality of rows based on the second operand. The third subset of rows can be identified based on filtering the fourth subset of rows. The third subset of rows can be a subset of the fourth subset of rows. In various embodiments, facilitating execution of the logical disjunction of the query operator execution flow against the plurality of rows further includes reading a first set of column values from memory based on reading column values of the first column only for rows in the first subset of rows, where filtering the first subset of rows to identify the second subset of rows includes utilizing the first set of column values. In various embodiments, facilitating execution of the logical disjunction of the query operator execution flow against the plurality of rows further includes reading a second set of column values from memory based on reading column values of the second column only for rows in the fourth subset of rows, where filtering the fourth subset of rows to identify the third subset of rows includes utilizing the second set of column values.

In various embodiments, facilitating execution of the logical disjunction of the query operator execution flow against the plurality of rows further includes reading a third set of column values from memory based on reading column values of the first column for rows in the final subset of rows as first output column values of the logical disjunction, where a set difference between the third set of column values and the first set of column values is non-null. In various embodiments, facilitating execution of the logical disjunction of the query operator execution flow against the plurality of rows further includes reading a fourth set of column values from memory based on reading column values of the second column for rows in the final subset of rows as second output column values of the logical disjunction, where a set difference between the fourth set of column values and the second set of column values is non-null.

In various embodiments, the second subset of rows and the third subset of rows are identified in parallel via a first set of processing resources and a second set of processing resources, respectively. In various embodiments, the first index data of the probabilistic indexing scheme for the first column includes a first plurality of hash values computed by performing a first hash function on corresponding first column values of the first column. The first subset of rows can be identified based on a first hash value computed for a first value indicated in the first operand. In various embodiments, the second index data of the probabilistic indexing scheme for the second column includes a second plurality of hash values computed by performing a second hash function on corresponding second column values of the second column. The fourth subset of rows can be identified based on a second hash value computed for a second value indicated in the second operand.

In various embodiments, the first operand indicates a first equality condition requiring equality with the first value. The first subset of rows can be identified based on having hash values for the first column equal to the first hash value computed for the first value. In various embodiments, the second operand can indicate a second equality condition requiring equality with the second value. The fourth subset of rows can be identified based on having hash values for the second column equal to the second hash value computed for the second value.

In various embodiments, the final subset of rows includes every row of the plurality of rows with a corresponding first column value of the first column and second column value of the second column comparing favorably to the logical disjunction. In various embodiments, the final subset of rows is a proper subset of a set union of the first subset of rows and the fourth subset of rows. In various embodiments, the probabilistic indexing scheme is an inverted indexing scheme. The first subset of rows can be identified based on index data of the inverted indexing scheme.

In various embodiments, a plurality of column values for the first column are variable-length values. In various embodiments, a plurality of hash values were generated from the plurality of column values for the first column based on the probabilistic indexing scheme for the first column, for example, as the first index data for the first column. The plurality of hash values can be fixed-length values. Identifying the first subset of rows can be based on the plurality of hash values.

In various embodiments, at least one of the first subset of rows having a first column value for the first column that compares unfavorably to the first operand is included in the first subset of rows based on the probabilistic indexing scheme for the first column. In various embodiments, the at least one of the first subset of rows is not included in the second subset of rows based on the first column value for the first column comparing unfavorably to the first operand. In various embodiments, the at least one of the first subset of rows is included in the final subset of rows based on being included in the third subset of rows.

In various embodiments, facilitating execution of the logical disjunction of the query operator execution flow against the plurality of rows includes applying at least one probabilistic index-based IO construct of an IO pipeline generated for the query operator execution flow. For example, at least one probabilistic index-based IO construct of FIGS. 30A-30H is included in an IO pipeline utilized to facilitate execution of the logical disjunction of the query operator execution flow against the plurality of rows.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a non-transitory computer readable storage medium includes at least one memory section that stores operational instructions that, when executed by a processing module that includes a processor and a memory, causes the processing module to: determine a query operator execution flow that includes a logical disjunction indicating a first column of a plurality of rows in a first operand and indicating a second column of the plurality of rows in a second operand; and/or facilitate execution of the logical disjunction of the query operator execution flow against the plurality of rows. Facilitating execution of the logical disjunction of the query operator execution flow against the plurality of rows can include utilizing first index data of a probabilistic indexing scheme for the first column of the plurality of rows to identify a first subset of rows as a proper subset of the plurality of rows based on the first operand; filtering the first subset of rows to identify a second subset of rows as a subset of the first subset of rows based on identifying ones of the first subset of rows having first column values of the first column that compare favorably to the first operand; identifying a third subset of rows as a proper subset of the plurality of rows based on identifying rows of the plurality of rows having second column values of the second column that compare favorably to the second operand; and/or identifying a final subset of rows as a union of the second subset of rows and the third subset of rows.

FIGS. 33A-33G present embodiments of a database system implemented to utilize probabilistic indexing to implement negation of a logical connective in query executions. In particular, the probabilistic index-based IO construct 3010 of FIGS. 30A-30H can be adapted for implementation of negation of a logical connective, such as negation of a conjunction or negation of a disjunction. Such a construct can be distinct from simply applying a set difference to the probabilistic index-based conjunction construct 3110 of FIGS. 31A-31F and/or the probabilistic index-based disjunction construct 3210 of FIGS. 32A-32G. For example, additional source elements may be required upstream of applying a set difference to negate the output of the respective logical connective, as its indexing and/or filtering may eliminate some of the required column values.

FIG. 33A illustrates an embodiment of generation of an IO pipeline that includes at least one probabilistic index-based logical connective negation construct 3310 based on a negation 3314 of a logical connective 3312 of an operator execution flow 2817. For example, the negation of the logical connective is included based on a corresponding query expression including a NOT or negation operator applied to output of an AND and/or an OR operator, the corresponding query expression including a NAND and/or a NOR operator, and/or the corresponding operator execution flow 2817 including a set difference applied to a full set and a set generated as output of either an intersection or a union of subsets derived from the full set. The negation of the logical connective can be implemented as some or all predicates 2822 of FIGS. 30A-30H. The negation 3314 of the logical connective 3312 can be implemented upstream and/or downstream of other query predicate constructs, such as other disjunctions 3212, conjunctions 3112, negations 3314, or other operators in the operator execution flow 2817.

The logical connective 3312 can indicate a set of operands 3114, which can include at least two operands 3114. Each operand 3114 can involve at least one corresponding column 3023 of the dataset identified via a corresponding one or more column identifiers. In this example, two operands 3114.A and 3114.B are included, where operand 3114.A indicates a first column 3023.A identified by column identifier 3041.A, and operand 3114.B indicates a second column 3023.B identified by column identifier 3041.B. While not illustrated, logical connective 3312 can optionally indicate more than two operands in other embodiments. The operands 3114.A and 3114.B of FIGS. 33A-33G can be the same as or different from the operands 3114.A and 3114.B of FIGS. 31A-31E and/or FIGS. 32A-32F. Corresponding operand parameters 3148 can similarly indicate requirements for the data values in the corresponding columns of the operand 3114 as discussed in conjunction with FIG. 31A.

The IO pipeline generator module 2834 can generate a corresponding IO pipeline 2835 based on pushing the negation of the logical connective to the IO level as discussed previously. This can include adapting the probabilistic index-based IO construct 3010 of FIGS. 30A-30H to implement a probabilistic index-based logical connective negation construct 3310. For example, the probabilistic index-based logical connective negation construct 3310 can be considered an adapted combination of multiple probabilistic index-based IO constructs 3010 in parallel to source corresponding operands of the logical connective. However, similar to the probabilistic index-based IO conjunction construct 3010, a single filter element 3016 can be applied to perform the filtering, for example, after a set operator element 3318 for the logical connective 3312, which can output a set of rows corresponding to output of the logical connective 3312. A set difference element 3308 can follow this filter element 3016 implement the negation 3314 of the logical connective 3312. Similar to the probabilistic index-based disjunction construct 3210, the column values of this output can be again sourced when the column values for the output of the negated logical connective are required downstream, as some or all of these values may not have been read previously due to the prior source element only reading rows indicated via utilizing the probabilistic indexing constructs for these columns.

The probabilistic index-based logical connective negation construct 3310 can alternatively or additionally be considered a type of probabilistic index-based IO construct 3010 specific to implementing predicates 2822 that include negations of logical connectives. The probabilistic index-based logical connective negation construct 3310 can be implemented upstream and/or downstream of other IO constructs of the IO pipeline, such as other IO probabilistic index-based IO constructs 3010 or other source utilize different non-probabilistic indexing schemes, and/or other constructs of the IO pipeline as discussed herein.

FIG. 33B illustrates an example of type of probabilistic index-based logical connective negation construct 3310 implemented for logical connectives 3312 that correspond to conjunctions 3112. In particular, a probabilistic index-based conjunction negation construct 3311 can be considered a type of probabilistic index-based logical connective negation construct 3310 of FIG. 33A. As illustrated in FIG. 33B, when the logical connective 3312 is a conjunction 3112, the set operator element 3318 can be implemented as a set intersect element 3319, and the filter element 3016 can filter based on outputting only rows satisfying both operand parameters 3148.A and 3148.B.

Execution of an example probabilistic index-based conjunction negation construct 3311 is illustrated in FIG. 32C. Each parallel probabilistic index element 3012 can access a corresponding probabilistic index structure 3020 for a corresponding column. In this example, both column 3023.A and column 3023.B are indexed via a probabilistic indexing scheme, and respective probabilistic index elements 3012.A and 3012.B access corresponding probabilistic index structures 3020.A and 3020.B.

This results in identification of a set of row identifier sets 3044 via each probabilistic index element 3012. As each operand 3114 can be treated as a given predicate 2822, each row identifier set 3044.A and 3044.B can be guaranteed to include the true predicate-satisfying row set 3034 satisfying the corresponding operand 3114.A and/or 3148.B, respectively, as discussed previously. Each row identifier set 3044.A and 3044.B may also have false positive rows of corresponding false-positive row sets 3035.A and 3035.B, respectively, that are not distinguishable from the corresponding true operand-satisfying row sets 3034 until the corresponding data values are read and processed as discussed previously.

Each source element 3014 can read rows of the corresponding row identifier set 3044 from row storage 3022, such as from one or more segments, to render a corresponding data value set 3046 as discussed previously. A set intersect element 3319 can be applied these data values sets 3046.A and 3046.B to render an intersect set 3329, which can include identifiers of rows included in both the row identifier set 3044.A and 3044.B. Note that in this example, the set intersect element 3319 can simply implement an intersection based on row identifiers, without processing the sourced data values in this stage. The implementation of a set intersect element 3319 prior to filtering via read data values by filtering element 3016 as illustrated in FIG. 33C can optionally be similarly implemented for the probabilistic index-based conjunction construct 3110 of FIGS. 31A-31F.

Filter element 3016 can be implemented to identify rows satisfying the logical connective based on data values of data value sets 3046.A and 3046.B with row values included in the intersect set 3329. Alternatively or in addition, the implicit implementation of a set intersection via the filtering element 3016 as discussed in conjunction with FIGS. 31A-31F can be utilized to implement the filtering element 3016 of FIG. 33C, where the set intersect element 3319 is not implemented based on not being required to identify the intersection.

For example, a function F(data value 3024.A) is based on the operand 3114.A and, for a given data value 3024 of column A for a given row evaluates to either true or false, where the given row only satisfies the operand 3114.A when the function evaluates to true; and a function G(data value 3024.B) is based on the operand 3114.B and, for a given data value 3024 of column B for a given row evaluates to either true or false, where the given row only satisfies the operand 3114B when the function evaluates to true. Only ones of the rows included in intersect set 3329 having data values in data value sets 3046.A and 3046.B that satisfy both operands 3114.A and 3148.B are included in a true conjunction satisfying row set 3134 outputted by the filter element 3016. This true conjunction satisfying row set 3134 can be guaranteed to be equivalent to a set intersection between the true operandA-satisfying row set 3034.A and the true operandB-satisfying row set 3034.B. This true conjunction satisfying row set 3134 can be a proper subset of the intersect set 3329 based on the intersect set 3329 including at least one false-positive row of false-positive row set 3035.A or false-positive row set 3035.B.

A set difference element 3308 can be applied to the initial row set 3032 and the true conjunction satisfying row set 3134 to identify the true negated row set 3334. As discussed previously, the initial row set 3032 can correspond to the row set inputted to the probabilistic index-based conjunction negation construct 3311. This initial row set 3032 can correspond to a full row set, such as a set of all rows in a corresponding data set against which a corresponding query is executed against. For example, the initial row set 3032 can be the full set of rows of the dataset when no prior upstream filtering of the full set of rows has been applied in prior operators of the IO pipeline. Alternatively, the initial row set 3032 can be a subset of the full set of rows of the dataset when prior upstream filtering of the full set of rows has already been applied in prior operators of the IO pipeline, and/or when the set difference is against this subset rather than the full set of rows in the operator execution flow 2817.

As illustrated in FIG. 33C, additional source elements 3014 for column A and/or column B can be included if column A and/or column B data values for rows in the true negated row set 3334 are required downstream, such as for input to further operators of the IO pipeline and/or for inclusion in the query resultant. For example, as the true negated row set 3334 is likely to include rows not included in the row identifier set 3044.A and/or 3044.B due to the true negated row set 3334 corresponding to the negation of the intersect of the operands utilized to identify these row identifier set 3044.A and/or 3044.B, their respective data values for column A and/or column B are not likely to have been read, as these values are not required for identifying the true conjunction satisfying row set.

Data value set 3347.A can include at least data value included in data value set 3046.A, for example, based on the corresponding row satisfying operandA but not operandB, and thus not being included in the true conjunction satisfying row set 3134, which is mutually exclusive from the true negated row set 3334, thus rendering the corresponding row being included in the true negated row set 3334. In this case, the corresponding data value can be re-read via the subsequent source element for column A based on having been filtered out due to not satisfying operandB and/or can be retrieved from local memory based on having already been read via the prior source element 3014 for column A based on being identified in row identifier set 3044.A.

Data value set 3347.A can include at least data value included in data value set 3046.A, for example, based on the corresponding row being a false-positive row of false-positive row set 3035.A, and thus not being included in the true conjunction satisfying row set 3134, which is mutually exclusive from the true negated row set 3334, thus rendering the corresponding row being included in the true negated row set 3334. In this case, the corresponding data value can be re-read via the subsequent source element for column A based on having been filtered out due to being a false-positive row for column A and/or can be retrieved from local memory based on having already been read via the prior source element 3014 for column A based on being identified in row identifier set 3044.A.

Data value set 3347.A can include at least data value not included in data value set 3046.A, for example, based on the corresponding row not being identified in row identifier set 3044.A due to not satisfying the operandA or being a false-positive, and thus not being included in the true conjunction satisfying row set 3134, which is mutually exclusive from the true negated row set 3334, thus rendering the corresponding row being included in the true negated row set 3334. In this case, the corresponding data value can be read via the subsequent source element for column A for the first time based on never having been read via the prior source element 3014 for column A.

FIG. 33D illustrates an embodiment of an example of the execution of a probabilistic index-based conjunction negation construct 3311 that implements the conjunction prior to the negation based on applying a probabilistic index-based conjunction construct 3110 of FIGS. 31A-31F. The probabilistic index-based conjunction negation construct 3311 can utilize this probabilistic index-based conjunction construct 3110 for some or all embodiments instead of the logically equivalent construct to implement conjunction illustrated in FIG. 33C.

FIG. 33E illustrates an example of type of probabilistic index-based logical connective negation construct 3310 implemented for logical connectives 3312 that correspond to disjunctions 3212. In particular, a probabilistic index-based disjunction negation construct 3313 can be considered a type of probabilistic index-based logical connective negation construct 3310 of FIG. 33A. As illustrated in FIG. 33E, when the logical connective 3312 is a conjunction 3112, the set operator element 3318 can be implemented as a set union element 3218, and the filter element 3016 can filter based on outputting only rows satisfying either operand parameters 3148.A or 3148.B.

Execution of an example probabilistic index-based disjunction negation construct 3313 is illustrated in FIG. 32F. Similar to FIG. 32D, each parallel probabilistic index element 3012 can access a corresponding probabilistic index structure 3020 to result in identification of a set of row identifier sets 3044 via each probabilistic index element 3012. Each row identifier set 3044.A and 3044.B can similarly be guaranteed to include the true predicate-satisfying row set 3034 satisfying the corresponding operand 3114.A and/or 3148.B, respectively, as discussed previously, and may also have false positive rows of corresponding false-positive row sets 3035.A and 3035.B, respectively, that are not distinguishable from the corresponding true operand-satisfying row sets 3034 until the corresponding data values are read and processed as discussed previously.

Each source element 3014 can read rows of the corresponding row identifier set 3044 from row storage 3022, such as from one or more segments, to render a corresponding data value set 3046 as discussed previously. A set union element 3218 can be applied these data values sets 3046.A and 3046.B to render a union set 3339, which can include identifiers of rows included in either the row identifier set 3044.A and 3044.B. Note that in this example, the set union element 3218 can simply implement an intersection based on row identifiers prior to filtering out false-positives. The implementation of set union element 3218 prior to filtering via read data values by filtering element 3016 as illustrated in FIG. 33E can optionally be similarly implemented for the probabilistic index-based disjunction construct 3210 of FIGS. 32A-32G.

Filter element 3016 can be implemented to identify rows satisfying the logical connective based on data values of data value sets 3046.A and 3046.B with row values included in the union set 3339. Alternatively or in addition, the implementation of filtering elements for each data value set 3046 prior to applying the set union element 3218 as discussed in conjunction with FIGS. 32A-32G can be utilized to implement the disjunction of FIG. 33E.

For example, a function F(data value 3024.A) is based on the operand 3114.A and, for a given data value 3024 of column A for a given row evaluates to either true or false, where the given row only satisfies the operand 3114.A when the function evaluates to true; and a function G(data value 3024.B) is based on the operand 3114.B and, for a given data value 3024 of column B for a given row evaluates to either true or false, where the given row only satisfies the operand 3114B when the function evaluates to true. Only ones of the rows included in intersect set 3329 having data values in data value sets 3046.A and 3046.B that satisfy either operands 3114.A or 3148.B are included in a true disjunction satisfying row set 3234 outputted by the filter element 3016. This true disjunction satisfying row set 3234 can be guaranteed to be equivalent to a set union between the true operandA-satisfying row set 3034.A and the true operandB-satisfying row set 3034.B. This true conjunction satisfying row set 3134 can be a proper subset of the union set 3339 based on the union set 3339 including at least one false-positive row of false-positive row set 3035.A or false-positive row set 3035.B.

A set difference element 3308 can be applied to the initial row set 3032 and the true disjunction satisfying row set 3234 to identify the true negated row set 3334. As discussed previously, the initial row set 3032 can correspond to the row set inputted to the probabilistic index-based conjunction negation construct 3311. This initial row set 3032 can correspond to a full row set, such as a set of all rows in a corresponding data set against which a corresponding query is executed against. For example, the initial row set 3032 can be the full set of rows of the dataset when no prior upstream filtering of the full set of rows has been applied in prior operators of the IO pipeline. Alternatively, the initial row set 3032 can be a subset of the full set of rows of the dataset when prior upstream filtering of the full set of rows has already been applied in prior operators of the IO pipeline, and/or when the set difference is against this subset rather than the full set of rows in the operator execution flow 2817.

As illustrated in FIG. 33F, additional source elements 3014 for column A and/or column B can be included if column A and/or column B data values for rows in the true negated row set 3334 are required downstream, such as for input to further operators of the IO pipeline and/or for inclusion in the query resultant. For example, as the true negated row set 3334 is likely to include rows not included in the row identifier set 3044.A and/or 3044.B due to the true negated row set 3334 corresponding to the negation of the union of the operands utilized to identify these row identifier set 3044.A and/or 3044.B, their respective data values for column A and/or column B are not likely to have been read, as these values are not required for identifying the true conjunction satisfying row set.

Data value set 3347.A can include at least data value included in data value set 3046.A, for example, based on the corresponding row being a false-positive row of false-positive row set 3035.A and also not satisfying operandB, and thus not being included in the true disjunction satisfying row set 3234, which is mutually exclusive from the true negated row set 3334, thus rendering the corresponding row being included in the true negated row set 3334. In this case, the corresponding data value can be re-read via the subsequent source element for column A based on having been filtered out due to being a false-positive row for column A and due to the row also not satisfying operandB, and/or can be retrieved from local memory based on having already been read via the prior source element 3014 for column A based on being identified in row identifier set 3044.A.

Data value set 3347.A can include at least data value not included in data value set 3046.A, for example, based on the corresponding row not being identified in row identifier set 3044.A due to not satisfying the operandA or being a false-positive, and based on operandB for the row also not being satisfied and the row thus not being included in the true disjunction satisfying row set 3234, which is mutually exclusive from the true negated row set 3334, thus rendering the corresponding row being included in the true negated row set 3334. In this case, the corresponding data value can be read via the subsequent source element for column A for the first time based on never having been read via the prior source element 3014 for column A.

FIG. 33G illustrates an embodiment of an example of the execution of a probabilistic index-based conjunction negation construct 3311 that implements the disjunction prior to the negation based on applying a probabilistic index-based disjunction construct 3210 of FIGS. 32A-32G. The probabilistic index-based conjunction negation construct 3311 can utilize this probabilistic index-based disjunction construct 3210 for some or all embodiments instead of the logically equivalent construct to implement conjunction illustrated in FIG. 33F.

In various embodiments, a query processing system includes at least one processor and a memory that stores operational instructions. The operational instructions, when executed by the at least one processor, can cause the query processing system to: determine a query operator execution flow that includes a negation of a logical connective indicating a first column of a plurality of rows in a first operand of the logical connective and indicating a second column of the plurality of rows in a second operand of the logical connective; and/or facilitate execution of the negation of the logical connective of the query operator execution flow against the plurality of rows. Facilitating execution of the negation of the logical connective of the query operator execution flow against the plurality of rows can include: utilizing first index data of a probabilistic indexing scheme for the first column of the plurality of rows to identify a first subset of rows as a first proper subset of a set of rows of the plurality of rows based on the first operand; utilizing second index data of a probabilistic indexing scheme for the second column of the plurality of rows to identify a second subset of rows as a second proper subset of the set of rows based on the second operand; applying a set operation upon the first subset of rows and the second subset of rows based on a logical operator of the logical connective to identify a third subset of rows from the set of rows; filtering the third subset of rows to identify a fourth subset of rows based on comparing first column values and second column values of the third subset of rows to the first operand and the second operand; and/or identifying a final subset of rows as a set difference of the fourth subset of rows and the set of rows based on the negation.

FIG. 33H illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 33H. In particular, a node 37 can utilize the query processing module 2435 to execute some or all of the steps of FIG. 33H, where multiple nodes 37 implement their own query processing modules 2435 to independently execute the steps of FIG. 33H, for example, to facilitate execution of a query as participants in a query execution plan 2405.

Some or all of the method of FIG. 33H can be performed by the query processing system 2802, for example, by utilizing an operator execution flow generator module 2803 and/or a query execution module 2504. For example, some or all of the method of FIG. 33H can be performed by the IO pipeline generator module 2834, the index scheme determination module 2832, and/or the IO operator execution module 2840. Some or all of the method of FIG. 33H can be performed via the query processing system 2802 based on implementing IO operator execution module of FIGS. 33A-33G that execute IO pipelines that include probabilistic index-based logical connective negation constructs 3310. Some or all of the method of FIG. 33H can be performed via communication with and/or access to a segment storage system 2508, such as memory drives 2425 of one or more nodes 37. Some or all of the steps of FIG. 33H can optionally be performed by any other processing module of the database system 10.

Some or all of the steps of FIG. 33H can be performed to implement some or all of the functionality of the segment processing module 2502 as described in conjunction with FIGS. 28A-28C and/or FIG. 29A. Some or all of the steps of FIG. 33H can be performed to implement some or all of the functionality regarding execution of a query via the plurality of nodes in the query execution plan 2405 as described in conjunction with FIGS. 24A-24E. Some or all steps of FIG. 33H can be performed by database system 10 in accordance with other embodiments of the database system 10 and/or nodes 37 discussed herein. Some or all steps of FIG. 33H can be performed in conjunction with some or all steps of FIG. 25E, FIG. 26B, FIG. 27D, FIG. 28D, and/or FIG. 29B. For example, some or all steps of FIG. 33H can be utilized to implement step 2598 of FIG. 25E, step 2790 of FIG. 27D, and/or step 2886 of FIG. 28D. Some or all steps of FIG. 33H can be performed in conjunction with some or all steps of FIG. 30H.

Step 3382 includes determining a query operator execution flow that includes a negation of a logical connective indicating a first column of a plurality of rows in a first operand of the logical connective and indicating a second column of the plurality of rows in a second operand of the logical connective. Step 3384 includes facilitating execution of the negation of the logical connective of the query operator execution flow against the plurality of rows.

Performing step 3384 can include performing step 3386, 3388, 3390, 3392, and/or 3394. Step 3386 includes utilizing first index data of a probabilistic indexing scheme for the first column of the plurality of rows to identify a first subset of rows as a first proper subset of a set of rows of the plurality of rows based on the first operand. Step 3388 includes utilizing second index data of a probabilistic indexing scheme for the second column of the plurality of rows to identify a second subset of rows as a second proper subset of the set of rows based on the second operand. Step 3390 includes applying a set operation upon the first subset of rows and the second subset of rows based on a logical operator of the logical connective to identify a third subset of rows from the set of rows. Step 3392 includes filtering the third subset of rows to identify a fourth subset of rows based on comparing first column values and second column values of the third subset of rows to the first operand and the second operand. Step 3394 includes identifying a final subset of rows as a set difference of the fourth subset of rows and the set of rows based on the negation.

In various embodiments, the set of rows is a proper subset of the plurality of rows identified based on at least one prior operator of the query operator execution flow. In various embodiments, the set of rows is the plurality of rows. Alternatively, the set of rows can be a proper subset of the plurality of rows.

In various embodiments facilitating execution of the negation of the logical connective of the query operator execution flow against the plurality of rows further includes reading a first set of column values from memory based on reading column values of the first column only for rows in the first subset of rows. Filtering the third subset of rows to identify the fourth subset of rows can include utilizing the ones of the first set of column values for rows in the third subset of rows. In various embodiments facilitating execution of the negation of the logical connective of the query operator execution flow against the plurality of rows further includes reading a second set of column values from memory based on reading column values of the second column only for rows in the second subset of rows. Filtering the third subset of rows to identify the fourth subset of rows can further include utilizing the ones of the second set of column values for rows in the third subset of rows.

In various embodiments, facilitating execution of the negation of the logical connective of the query operator execution flow against the plurality of rows further includes reading a third set of column values from memory based on reading column values of the first column for rows in the final subset of rows as first output column values of the negation of the logical connective. An intersection between the third set of column values and the first set of column values can be non-null. In various embodiments, facilitating execution of the negation of the logical connective of the query operator execution flow against the plurality of rows further includes reading a fourth set of column values from memory based on reading column values of the second column for rows in the final subset of rows as second output column values of the negation of the logical connective. An intersection between the fourth set of column values and the second set of column values can be non-null.

In various embodiments, the set operation is an intersection operation based on the logical connective including a logical conjunction. Filtering the third subset of rows can include identifying ones of the third subset of rows with first column values comparing favorably to the first operand and second column values comparing favorably to the second operand.

In various embodiments, the set operation is a union operation based on the logical connective including a logical disjunction. Filtering the third subset of rows includes identifying ones of the third subset of rows with either first column values comparing favorably to the first operand or second column values comparing favorably to the second operand.

In various embodiments, a set difference between the third subset of rows and the fourth subset of rows includes at least one row based on: the at least one row having a first column values comparing unfavorably to the first operand and being identified in the first subset of rows based on the probabilistic indexing scheme for the first column, and/or the at least one row having a second column values comparing unfavorably to the second operand and being identified in the second subset of rows based on the probabilistic indexing scheme for the second column. In various embodiments, an intersection between the third subset of rows and the final subset of rows includes at least one row based on: the at least one row having a first column values comparing unfavorably to the first operand and being identified in the first subset of rows based on the probabilistic indexing scheme for the first column, and/or the at least one row having a second column values comparing unfavorably to the second operand and being identified in the second subset of rows based on the probabilistic indexing scheme for the second column.

In various embodiments, the fourth subset of rows includes every row of the plurality of rows with a corresponding first column value of the first column and second column value of the second column comparing favorably to the logical connective. The fourth subset of rows can be a proper subset of the third subset of rows. In various embodiments, the first subset of rows and the second subset of rows are identified in parallel via a first set of processing resources and a second set of processing resources, respectively.

In various embodiments, the first index data of the probabilistic indexing scheme for the first column includes a first plurality of hash values computed by performing a first hash function on corresponding first column values of the first column. The first subset of rows can be identified based on a first hash value computed for a first value indicated in the first operand. In various embodiments, the second index data of the probabilistic indexing scheme for the second column includes a second plurality of hash values computed by performing a second hash function on corresponding second column values of the second column. The second subset of rows can be identified based on a second hash value computed for a second value indicated in the second operand.

In various embodiments, the first operand indicates a first equality condition requiring equality with the first value. The first subset of rows can be identified based on having hash values for the first column equal to the first hash value computed for the first value. In various embodiments, the second operand indicates a second equality condition requiring equality with the second value. The second subset of rows can be identified based on having hash values for the second column equal to the second hash value computed for the second value.

In various embodiments, the probabilistic indexing scheme for the first column is an inverted indexing scheme. The first subset of rows can be identified based on index data of the inverted indexing scheme. In various embodiments, a plurality of column values for the first column are variable-length values. In various embodiments, a plurality of hash values were generated from the plurality of column values for the first column based on the probabilistic indexing scheme. In various embodiments, the plurality of hash values are fixed-length values. Identifying the first subset of rows can be based on the plurality of hash values.

In various embodiments, at least one of the first subset of rows having a first column value for the first column that compares unfavorably to the first operand is included in the first subset of rows based on the probabilistic indexing scheme for the first column. In various embodiments, the at least one of the first subset of rows is not included in the fourth subset of rows based on the first column value for the first column comparing unfavorably to the first operand. In various embodiments, the at least one of the first subset of rows is included in the final subset of rows based on being included in the second subset of rows.

In various embodiments, facilitating execution of the negation of the logical connective of the query operator execution flow against the plurality of rows includes applying at least one probabilistic index-based IO construct of an IO pipeline generated for the query operator execution flow. For example, at least one probabilistic index-based IO construct of FIGS. 30A-30H is included in an IO pipeline utilized to facilitate execution of the negation of the logical connective of the query operator execution flow against the plurality of rows.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a non-transitory computer readable storage medium includes at least one memory section that stores operational instructions that, when executed by a processing module that includes a processor and a memory, causes the processing module to: determine a query operator execution flow that includes a negation of a logical connective indicating a first column of a plurality of rows in a first operand of the logical connective and indicating a second column of the plurality of rows in a second operand of the logical connective; and/or facilitate execution of the negation of the logical connective of the query operator execution flow against the plurality of rows. Facilitating execution of the negation of the logical connective of the query operator execution flow against the plurality of rows can include: utilizing first index data of a probabilistic indexing scheme for the first column of the plurality of rows to identify a first subset of rows as a first proper subset of a set of rows of the plurality of rows based on the first operand; utilizing second index data of a probabilistic indexing scheme for the second column of the plurality of rows to identify a second subset of rows as a second proper subset of the set of rows based on the second operand; applying a set operation upon the first subset of rows and the second subset of rows based on a logical operator of the logical connective to identify a third subset of rows from the set of rows; filtering the third subset of rows to identify a fourth subset of rows based on comparing first column values and second column values of the third subset of rows to the first operand and the second operand; and/or identifying a final subset of rows as a set difference of the fourth subset of rows and the set of rows based on the negation.

FIGS. 34A-34D illustrate embodiments of a database system that utilizes a probabilistic indexing scheme, such as an inverted indexing scheme, that indexes variable-length values of a variable-length column. For example, probabilistic inverted indexing of text values can be utilized to implement text equality filtering, such as equality of varchar data types, string data types, text data types, and/or other variable-length data types. Each variable-length data value, for example, of a given column of a dataset, can be indexed based on computing and storing a fixed-length via a probabilistic index structure 3020. For example, the fixed-length value indexing the variable-length value of a given row is a hash value computed by performing a hash function upon the variable-length value of the given row. A given value, such as a string literal, of a query for filtering the dataset based on equality with the given variable-length value, can have its fixed-length value computed, where this fixed-length value is utilized to identify row identifiers via the probabilistic index structure. For example, the same hash function is performed upon the given value to generate a hash value for the given value, and row identifiers indexed to the given hash value in the probabilistic index structure are identified. The index structure can be probabilistic in nature due to the possibility of having multiple different variable-length values mapped to a given fixed-length value of the probabilistic index structure, for example, due to hash collisions of the hash function.

Thus, a set of row identifiers identified for a given fixed-length value generated for the given value is guaranteed to include all rows with variable-length values matching or otherwise comparing favorably to the given value, with the possibility of also including false-positive rows. The variable-length data values of these identified rows can be read from memory, and can each be compared to the given value to identify ones of the rows with variable-length values comparing favorably to the given value, filtering out the false positives. For example, each variable-length data values of the identified rows, once read from memory, are tested for equality with the given value to render a true output set of rows that is guaranteed to include all rows with variable-length values equal to the given value, and that is further guaranteed to include no rows with variable-length values not equal to the given value.

These steps can be implemented by utilizing some or all properties of the IO pipeline constructs of FIGS. 30A-33H. In particular, one or more embodiments of the probabilistic index-based IO construct 3010 can be applied and/or adapted to implement text equality filtering and/or to otherwise utilize a probabilistic index structure indexing variable-length values. This improves the technology of database systems by enabling variable-length values, such as text data, to be indexed and accessed efficiently in query execution, based on leveraging the properties of the probabilistic index-based IO construct 3010 discussed previously. This can be ideal in efficiently implementing queries filtering for text equality, or other queries involving variable-length and/or unstructured data, as it can be efficiently indexed via a probabilistic indexing scheme, where only a small subset of rows need have their data values read to test for equality and filter out false-positives based on utilizing the probabilistic index-based IO construct 3010.

As illustrated in FIG. 34A, a query processing system 2802 can implement an IO pipeline generator module 2834 via processing resources of the database system 10 to determine an IO pipeline 2835 for execution of a given query based on an equality condition 3422. The equality condition 3422 can optionally be implemented as predicates 2822 of FIG. 30C, can be indicated in the operator execution flow 2817, and/or can otherwise be indicated by a given query for execution.

The equality condition 3422 can indicate a column identifier 3041 of a variable-length column 3023, such as a column storing text data or other data having variable-lengths and/or having unstructured data. The equality condition 3422 can further indicate a literal value 3448, such as particular text value or other variable-length value for comparison with values in the column. Thus, a true set of rows satisfying equality condition 3422 can correspond to all rows with data values in the column 3023 denoted by column identifier 3041 that are equivalent to literal value 3448.

An IO pipeline can be generated via IO pipeline generator module 2834, for example, as discussed in conjunction with FIGS. 28A-28D. The IO pipeline generator module 2834 can be implemented via one or more nodes 37 of one or more computing devices 18 in conjunction with execution of a given query. For example, an operator execution flow 2817 that indicates the equality condition 3422 is determined for a given query, for example, based on processing and/or optimizing a given query expression. The IO pipeline can otherwise be determined by processing resources of the database system 10 as a flow of elements for execution to filter a dataset based on the equality condition 3422.

The IO pipeline generator module 2834 can determine a fixed-length value 3458 for utilization to probe a probabilistic index structure 3020 for the variable-length column based on performing a fixed-length conversion function 3450 upon the literal value 3448 of the equality condition 3422. For example, the fixed-length conversion function 3450 can be a hash function applied to the literal value 3448, where the fixed-length value 3458 is a hash value. The fixed-length conversion function 3450 can correspond to a function utilized to index the variable-length column via a corresponding probabilistic indexing scheme.

The corresponding IO pipeline can include a probabilistic index element 3012, where the index probe parameter data 3042 is implemented to indicate the column identifier for the variable-length column and the fixed-length value 3458 generated for the literal value via the fixed-length value 3458. A source element 3014 can be applied downstream from the probabilistic index element to source variable-length data values of the column denoted by the column identifier 3041 for only the rows indicated in output of the probabilistic index element. A filter element 3016 can be applied downstream from the source element 3014 to compare the read data values to the literal value 3448 to identify which ones of the rows with data values are equivalent to the literal value, filtering out other ones of the rows with data values that are not equivalent to the literal value as false-positive rows identified due to the probabilistic nature of the probabilistic indexing scheme.

These elements of the IO pipeline 2835 can be implemented as a probabilistic index-based IO construct 3010 of FIGS. 30A-30H. Queries involving additional predicates in conjunctions, disjunctions, and/or negations that involve the variable-length column and/or other variable-length columns similarly indexed via their own probabilistic index structures 3020 can be implemented via adaptations of the probabilistic index-based IO construct 3010 of FIGS. 30A-30H, such as one or more probabilistic index-based conjunction constructs 3110, one or more probabilistic index-based disjunction constructs 3210, and/or more probabilistic index-based logical connective negations constructs 3310.

FIG. 34B illustrates an embodiment of a segment indexing module 2510 that generates the probabilistic index structure 3020.A of a given variable-length column 3023.A for access by index elements 3012 for use in executing queries as discussed herein. In particular, the example probabilistic index structure 3020.A of FIG. 34B illustrates an example of indexing variable-length data for access by the index element of FIG. 34A.

A fixed-length conversion function 3450 can be performed upon data values 3024 of the given column to determine a corresponding index value 3043 for each data value, rendering a fixed-length value mapping 3462 indicating the index value 3043 for each data value 3024. This fixed-length value mapping 3462 can be utilized to generate a probabilistic index structure 3020 via a probabilistic index structure generator module 3470. The resulting probabilistic index structure 3020 can indicate, for each given index value, ones of the set of rows, such as row numbers, memory locations, or other row identifiers of these rows, having data values 3024 for the given column that map to this given fixed-length value. For example, this probabilistic index structure 3020 is implemented as an inverted index structure mapping the fixed-length index values, such as hash values, to respective rows.

In some embodiments, the resulting probabilistic index structure 3020 can be stored as index data, such as a secondary index 2546, of a corresponding segment having the set of rows for the given column. Other sets of rows of a given dataset that are included in different segments can similarly have their rows indexed via the same type of probabilistic index structure 3020 via the same or different fixed-length conversion function 3450 performed upon data values of its columns. In some cases, different fixed-length conversion functions 3450 are selected for performance for sets of rows of different segments, for example, based on different cardinality, different access frequency, different query types, or other different properties of the column data for different segments. In some embodiments, a false-positive rate induced by the fixed-length conversion function 3450 is selected as a false-positive tuning parameter, where the false-positive tuning parameter is selected differently for different segments based on user input and/or automatic determination. Configuration of false-positive rate is discussed in further detail in conjunction with FIGS. 37A-37C.

In other embodiments, the resulting probabilistic index structure 3020 can be stored as index data, such as a secondary index 2546, for all rows of the given dataset in one or more locations. For example, a common probabilistic index structure 3020 can be generated for all rows of a dataset, even if these rows are stored across different segments, different storage structures, and/or different memory locations.

In this example, the values "hello" and "blue" map to a same index value 3043.$i$, and the value "planet" maps to a different index value 3043.1. For example, the fixed-length conversion function 3450 is a hash function that, when performed upon "hello" renders a same hash value as when performed upon "blue", which is different from the hash value outputted when performed upon "planet." While this simple example is presented for illustrative purposes, much larger text data can be implemented as data values 3024 in other embodiments. The number Z of index values 3043 in the probabilistic index structure 3020 can be a large number, such as thousands of different index values.

The probabilistic index structure 3020 of FIG. 34B can be utilized to implement the probabilistic index structure 3020 of FIGS. 30A-33H, such as the prior example probabilistic index structure 3020.A for example IO pipelines that utilize filtering element to identify rows having data values equivalent to "hello", rendering the false-positive rows having data values equivalent to "hello." The generation of any probabilistic index structure 3020 described herein can be performed as illustrated in FIG. 34B, for example, via utilizing at least one processor to perform the fixed-length conversion function 3450 and/or to implement the probabilistic index structure generator module 3470.

FIG. 34C illustrates an example execution of a query filtering the example dataset of FIG. 34B by equality with a literal value 3448 of "hello" via a query processing system 2802. The fixed-length conversion function 3450 is performed upon the literal value 3448 to render the corresponding fixed-length value 3458.$i$.

Index access 3452 is performed to utilize fixed-length value 3458.$i$ to identify a corresponding row identifier set 3044.$i$ based on probabilistic index structure 3020. For example, the fixed-length value 3458.$i$ is determined to be equal to index value 3043.$i$, and the row identifier set 3044.$i$ is determined based on being mapped to index value 3043.$i$ via probabilistic index structure 3020.A as discussed in conjunction with FIG. 34B. The index access 3452 performed by query processing system 2802 can be implemented as index element 3012 of a corresponding IO pipeline 2834, and/or can otherwise be performed via other processing performed by a query processing system 2802 executing a corresponding query against a dataset.

Data value access 3454 is performed to read rows identified in row identifier set 3044.$i$ from row storage 3022, such as rows stored in a corresponding one or more segments. A data value set 3046 that includes the corresponding data values 3024 for rows identified in row identifier set 3044 is identified accordingly. The data value access 3454 performed by query processing system 2802 can be implemented as source element 3014 of a corresponding IO pipeline 2834, and/or can otherwise be performed via other processing performed by a query processing system 2802 executing a corresponding query against a dataset.

Equality-based filtering 3459 is performed by determining ones of the data value set 3046 equal to the given literal value "hello" to render a row identifier subset 3045, and/or optionally a corresponding subset of data values 3024 of data value set 3046. This can be based on comparing each data value 3024 in data value set 3046 to the given literal value, and including only ones of row identifiers in row identifier set 3044 with corresponding ones of the set of data values 3024 in data value set 3046 that are equivalent to the literal value. In this case rows a, e, and f are included based on having data values 3024 of "hello", while rows b and d are filtered out based on being false-positive rows with values of "blue" that were indexed to the same index value. The equality-based filtering 3459 performed by query processing system 2802 can be implemented as filtering element 3016 of a corresponding IO pipeline 2834, and/or can otherwise be performed via other processing performed by a query processing system 2802 executing a corresponding query against a dataset.

Applying a probabilistic index, such as an inverted index, in this fashion to variable-length columns, such as varchar columns, can reduce the size of the index data being stored as fixed-length values are stored. In particular, a number of fixed length values Z are generated and stored, where Z is smaller than the number of columns X due to the hash collision or otherwise probabilistic nature of the index. Furthermore, the size of each fixed length value can be smaller than most and/or all corresponding variable length data, such as length text data, of the corresponding variable length column. Thus, the probabilistic index structure 3020 is relatively inexpensive to store, and can be comparable in size to the index structures of fixed-length data. Furthermore, the use of the probabilistic index structure 3020 for variable length data only induces only a minor increase in processing relative to identifying only the true rows via a true index, as only a small number of additional false positive rows may be expected to be read and/or filtered from memory, relative to the IO requirements that would be necessitated if all data values needed to be read in the case where no indexing scheme was utilized due to the column including variable-length values. The reduction in IO cost for variable length data via storage of an index comparable to indexes of fixed-length columns improves the technology of database systems by efficiently utilizing memory resources to index variable length data to improve the efficiency of reading variable length data.

The size of the fixed-length index values outputted by the fixed-length conversion function 3450 to generate the probabilistic index structure can be tuned to increase and/or reduce the rate of false positives. As the rate of false positives increases, increasing the IO cost in performing query executions, the corresponding storage cost of the probabilistic index structure 3020 as a whole can decrease. In particular, in the case of a hash function, increasing the number of hash values and/or fixed-length of the hash values increases the storage cost of the probabilistic index structure 3020, while reducing the rate of hash collisions and thus reducing the IO cost as less false-positives need be read and filtered in query executions. Configuration of this trade-off between IO cost and index storage cost via selection of a false-positive tuning parameter, such as the fixed-length of the hash values, is discussed in further detail in conjunction with FIGS. 37A-37C.

In various embodiments, a query processing system includes at least one processor and a memory that stores operational instructions. The operational instructions, when executed by the at least one processor, can cause the query processing system to: identify a filtered subset of a plurality of rows having variable-length data of a column equal to a given value. Identify the filtered subset of the plurality of rows having variable-length data of the column equal to the given value can be based on: identifying a first subset of rows as a proper subset of the plurality of rows based on a plurality of fixed-length index values of the column; and/or comparing the variable-length data of only rows in the first subset of rows to the given value to identify the filtered subset as a subset of the first subset of rows.

FIG. 34D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 34D. In particular, a node 37 can utilize the query processing module 2435 to execute some or all of the steps of FIG. 34D, where multiple nodes 37 implement their own query processing modules 2435 to independently execute the steps of FIG. 34D, for example, to facilitate execution of a query as participants in a query execution plan 2405.

Some or all of the method of FIG. 34D can be performed by the query processing system 2802, for example, by utilizing an operator execution flow generator module 2803 and/or a query execution module 2504. For example, some or all of the method of FIG. 34D can be performed by the IO pipeline generator module 2834, the index scheme determination module 2832, and/or the IO operator execution module 2840. Some or all of the method of FIG. 34D can be performed via communication with and/or access to a segment storage system 2508, such as memory drives 2425 of one or more nodes 37. Some or all of the steps of FIG. 34D can optionally be performed by any other processing module of the database system 10.

Some or all of the method of FIG. 34D can be performed via the IO pipeline generator module 2834 of FIG. 34A to generate an IO pipeline utilizing a probabilistic index for a variable-length column. Some or all of the method of FIG. 34D can be performed via the segment indexing module of FIG. 34B to generate a probabilistic index structure for data values of a variable-length column. Some or all of the method of FIG. 34D can be performed via the query processing system 2802 based on implementing IO operator execution module of FIG. 34C that executes IO pipelines by utilizing a probabilistic index for a variable-length column.

Some or all of the steps of FIG. 34D can be performed to implement some or all of the functionality of the segment processing module 2502 as described in conjunction with FIGS. 28A-28C and/or FIG. 29A. Some or all of the steps of FIG. 34D can be performed to implement some or all of the functionality regarding execution of a query via the plurality of nodes in the query execution plan 2405 as described in conjunction with FIGS. 24A-24E. Some or all steps of FIG. 34D can be performed by database system 10 in accordance with other embodiments of the database system 10 and/or nodes 37 discussed herein. Some or all steps of FIG. 34D can be performed in conjunction with some or all steps of FIG. 25E, FIG. 26B, FIG. 27D, FIG. 28D, and/or FIG. 29B. For example, some or all steps of FIG. 34D can be utilized to implement step 2598 of FIG. 25E, step 2790 of FIG. 27D, and/or step 2886 of FIG. 28D. Some or all steps of FIG. 34D can be performed in conjunction with some or all steps of FIG. 30H.

Step 3482 includes storing a plurality of variable-length data of a column of a plurality of rows. Step 3484 includes storing a plurality of fixed-length index values of a probabilistic indexing scheme for the column. Step 3486 includes identifying a filtered subset of the plurality of rows having variable-length data of the column equal to a given value.

Performing step 3486 can include performing step 3488 and/or 3490. Step 3488 includes identifying a first subset of rows as a proper subset of the plurality of rows based on the plurality of fixed-length index values. Step 3490 includes comparing the variable-length data of only rows in the first subset of rows to the given value to identify the filtered subset as a subset of the first subset of rows.

In various embodiments, identifying the filtered subset of the plurality of rows is further based on reading a set of variable-length data based on reading the variable-length data from only rows in the first subset of rows. Comparing the variable-length data of only the rows in the first subset of rows to the given value can be based on utilizing only variable-length data in the set of variable-length data.

In various embodiments, the variable-length data is implemented via a string datatype, a varchar datatype, a text datatype, or other variable-length datatype. In various embodiments, a set difference between the filtered subset and the first subset of rows is non-null. In various embodiments, the probabilistic indexing scheme for the column is an inverted indexing scheme. The first subset of rows can be identified based on inverted index values of the inverted indexing scheme.

In various embodiments, the plurality of fixed-length index values of the probabilistic indexing scheme are a plurality of hash values computed by performing a hash function on corresponding variable-length data of the column. In various embodiments, identifying the filtered subset of the plurality of rows includes computing a first hash value for the given value and/or identifying ones of the plurality of rows having corresponding ones of the plurality of hash value equal to the first hash value. In various embodiments, a set difference between the first subset of rows and the filtered subset includes ones of the plurality of rows with variable-length data of the column having hash collisions with the given value.

In various embodiments, the fixed-length is based on a false-positive tuning parameter of the hash function. A first number of rows included in the first subset of rows can be based on the false-positive tuning parameter of the hash function. A second number of rows included in a set difference between the first subset of rows and the filtered subset can be based on the tuning parameter of the hash function. In various embodiments, the method further includes determining the false-positive tuning parameter as a selected false-positive tuning parameter from a plurality of false-positive tuning parameter options.

In various embodiments, identifying the filtered subset of the plurality of rows includes applying at least one probabilistic index-based IO construct of an IO pipeline generated for a query indicating the given value in at least one query predicate. For example, at least one probabilistic index-based IO construct of FIGS. 30A-30H is included in an IO pipeline utilized to identify the filtered subset of the plurality of rows.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a non-transitory computer readable storage medium includes at least one memory section that stores operational instructions that, when executed by a processing module that includes a processor and a memory, causes the processing module to: store variable-length data of a column of a plurality of rows; store a plurality of fixed-length index values of a probabilistic indexing scheme for the column; and/or identify a filtered subset of the plurality of rows having variable-length data of the column equal to a given value. Identifying the filtered subset of the plurality of rows can be based on: identifying a first subset of rows as a proper subset of the plurality of rows based on the plurality of fixed-length index values; and/or comparing the variable-length data of only rows in the first subset of rows to the given value to identify the filtered subset as a subset of the first subset of rows.

FIGS. 35A-35D illustrate embodiments of a database system that implements subset-based indexing to index text data, adapting probabilistic-indexing based techniques discussed previously to filter text data based on inclusion of a given text pattern. Subset-based indexing, such as n-gram indexing of text values, can be utilized to implement text searches for substrings that match a given string pattern, such as LIKE filtering. Every n-gram, such as every consecutive n-character substring, of each text data of a dataset can be determined and stored via an index structure, such as an inverted index structure. Every n-gram of a given string pattern of the LIKE filtering can enable identification of rows that include a given n-gram via the index structure. Each of the set of n-grams can be applied in parallel, such as in parallel tracks of a corresponding IO pipeline. to identify rows with matching n-grams, with the resulting rows being intersected to identify rows with all n-grams.

While the set of rows identified for each n-gram can be guaranteed to be the true set of rows rather than being probabilistic in nature, possible false-positive rows may be inherently present in the resulting intersection based on ordering not being considered when applying the intersection. These false-positives can thus be filtered out via reading and filtering of the text data of the identified rows in the intersection to identify only rows with text data having the n-grams in the appropriate ordering as dictated by the given text pattern. Such searches for inclusion of a text pattern can thus be implemented by leveraging techniques of the probabilistic index-based constructs described previously, despite the index structure not necessarily indexing the n-grams of text data in a probabilistic fashion.

As illustrated in FIG. 35A, a query processing system 2802 can implement an IO pipeline generator module 2834 via processing resources of the database system 10 to determine an IO pipeline 2835 for execution of a given query based on a text inclusion condition 3522. The text inclusion condition 3522 can optionally be implemented as predicates 2822 of FIG. 30C, can be indicated in the operator execution flow 2817, and/or can otherwise be indicated by a given query for execution.

The text inclusion condition 3522 can indicate a column identifier 3041 of a column 3023, such as the column variable-length column 3023 of FIGS. 34A-34D. The text inclusion condition 3522 can further indicate a consecutive text pattern 3548, such as particular text value, a particular one or more words, a particular ordering of characters, or other text pattern of text with an inherent ordering that could be included within text data of the column denoted by the text column identifier 3041. Thus, a true set of rows satisfying text inclusion condition 3522 can correspond to all rows with data values in the column 3023 denoted by column identifier 3041 that include the consecutive text pattern 3548 and/or contain text matching or otherwise comparing favorably to the consecutive text pattern 3548. The text inclusion condition 3522 can be implemented as and/or based on a LIKE condition of a corresponding query expression and/or operator execution flow 2817 for text data containing the text pattern 3548.

An IO pipeline can be generated via IO pipeline generator module 2834, for example, as discussed in conjunction with FIGS. 28A-28D. The IO pipeline generator module 2834 can be implemented via one or more nodes 37 of one or more computing devices 18 in conjunction with execution of a given query. For example, an operator execution flow 2817 that indicates the text inclusion condition 3522 is determined for a given query, for example, based on processing and/or optimizing a given query expression. The IO pipeline can otherwise be determined by processing resources of the database system 10 as a flow of elements for execution to filter a dataset based on the text inclusion condition 3522.

The IO pipeline generator module 2834 can determine a substring set 3552 for utilization to probe an index structure for the column based on performing a substring generator function 3550 upon the consecutive text pattern 3548 of the text inclusion condition 3522. For example, the text inclusion condition 3522 can generate substrings 3554.1-3554.R as all substrings of the consecutive text pattern 3548 of a given fixed-length 3551, such as the value n of a corresponding set of n-grams implementing the substring set 3552. The fixed-length 3551 can be predetermined and can correspond to a fixed-length 3551 utilized to index the text data via a subset-based index structure as described in further detail in conjunction with FIG. 35B.

In cases where the consecutive text pattern 3548 includes wildcard characters or other indications of breaks between words and/or portions of the pattern, these wildcard characters can be skipped and/or ignored in generating the substrings of the substring set. For example, a consecutive text pattern 3548 having one or more wildcard characters can render a substring set 3552 with no substrings 3554 that include wildcard characters.

The corresponding IO pipeline can include a plurality of R parallel index elements 3512 that each correspond to one of the R substrings 3554.1-3554.R of the substring set 3552. Each index element 3512 can be utilized to identify ones of the rows having text data in the column identified by the text column identifier that includes the substring based on a corresponding substring-based index structure. A set intersect element can be applied to the output of the R parallel index elements 3512 to identify rows having all of the substrings 3554.1-3554.R, in any order.

This plurality of R parallel index elements 3512 and set intersect element 3319 can be collectively considered a probabilistic index element 3012 of FIG. 30B, as the output of the set intersect element 3319 is guaranteed to include the true set of rows satisfying the text inclusion condition 3522, as all rows that have the set of relevant substrings will be identified and included in the output of the intersection. However, false-positive rows, corresponding to rows with text values having all of the substrings 3554 of the substring set 3552 in a wrong ordering, with other text in between, and/or in a pattern that otherwise does not match the given consecutive text pattern 3548, could also be included in this intersection, and thus need filtering out via sourcing of the corresponding text data for all rows outputted via the intersection, and comparison of the data values to the given consecutive text pattern 3548 to filter out these false-positives.

These steps can be applied as source element 3014 and filter element 3016 accordingly, and the entire process can thus be considered an adapted implementation of the probabilistic index-based IO construct 3010 of FIG. 30B. Queries involving additional predicates in conjunctions, disjunctions, and/or negations that involve the variable-length column and/or other variable-length columns similarly indexed via their own probabilistic index structures 3020 can be implemented via adaptations of the probabilistic index-based IO construct 3010 of FIGS. 30A-30H, such as one or more probabilistic index-based conjunction constructs 3110, one or more probabilistic index-based disjunction constructs 3210, and/or more probabilistic index-based logical connective negations constructs 3310.

FIG. 35B illustrates an embodiment of a segment indexing module 2510 that generates a substring-based index structure 3570.A of a given column 3023.A of text data for access by index elements 3512 for use in executing queries as discussed herein. In particular, the example substring-based index structure 3570.A of FIG. 34B illustrates an example of indexing text data for access by the index elements 3512 of FIG. 35A.

A substring generator function 3550 can be performed upon data values 3024 of the given column to determine a corresponding substring set 3552 for each data value, rendering a substring mapping 3562 indicating the substring set 3552 of one or more substrings for each data value 3024. Each substring can correspond to an index value 3043, where a given row is indexed via multiple index values based on its text value including multiple corresponding substrings. The fixed-length 3551 of the substring generator function 3550 utilized to build the corresponding substring-based index structure 3570 can dictate the fixed-length 3551 of the substring generator function 3550 performed by the IO pipeline generator module 2834 of FIG. 35A.

This substring mapping 3562 can be utilized to generate a substring-based index structure 3570 via an index structure generator module 3560. The resulting substring-based index structure 3570 can indicate, for each given substring, ones of the set of rows, such as row numbers, memory locations, or other row identifiers of these rows, having data values 3024 for the given column corresponding to text data that includes the given substring. For example, this substring-based index structure 3570 is implemented as an inverted index structure mapping the substrings as index values 3043 to respective rows.

In some embodiments, the resulting substring-based index structure 3570 can be stored as index data, such as a secondary index 2546, of a corresponding segment having the set of rows for the given column. Other sets of rows of a given dataset that are included in different segments can similarly have their rows indexed via the same type of substring-based index structure 3570 via the same or different fixed-length 3551 performed upon data values of its columns. In some cases, different substring generator functions 3550 are selected for performance for sets of rows of different segments, for example, based on different cardinality, different access frequency, different query types, or other different properties of the column data for different segments. In some embodiments, a false-positive rate induced by the fixed-length 3551 is selected as a false-positive tuning parameter, where the false-positive tuning parameter is optionally selected differently for different segments based on user input and/or automatic determination. Configuration of false-positive rate is discussed in further detail in conjunction with FIGS. 37A-37C.

In other embodiments, the resulting substring-based index structure 3570 can be stored as index data, such as a secondary index 2546, for all rows of the given dataset in one or more locations. For example, a common substring-based index structure 3570 can be generated for all rows of a dataset, even if these rows are stored across different segments, different storage structures, and/or different memory locations.

The substring-based index structure 3570 can be considered a type of probabilistic index structure 3020 as a result of rows being identified for inclusion of subsets of a consecutive text pattern that may not include the consecutive text pattern. However, unlike the example probabilistic index structure of FIG. 34B that includes hash collisions for variable length values, where accessing the index for a given fixed-length value of a given variable-length value can render false positives, the substring-based index structure 3570 can ensure that the exact set of rows including a given substring are returned, as the substrings are utilized as the indexes with no hash collisions between substrings.

The substring-based index structure 3570 of FIG. 35B can be utilized to implement the probabilistic index structure 3020 of FIGS. 30A-33H. The generation of any probabilistic index structure 3020 described herein can be performed as illustrated in FIG. 34B, for example, via utilizing at least one processor to perform the substring generator function 3550 and/or to implement the index structure generator module 3560.

In some embodiments, a given column storing text data, such as a given column 3023.A, can be indexed via both the probabilistic index structure 3020 of FIG. 34B and the substring-based index structure 3570 of FIG. 35B, where both a probabilistic index structure 3020 a substring-based index structure 3570 are generated and stored for the given column 3023.A accordingly. This can be ideal in facilitating execution of different types of queries. In particular, the probabilistic index structure 3020 of FIG. 34B can be utilized for queries involving equality-based filtering of the text data as illustrated in FIGS. 34A and 34C, while the substring-based index structure 3570 of FIG. 35B can be utilized for queries involving filtering based on inclusion of a text pattern of the text data as illustrated in FIGS. 35A and 35C. Generation of the corresponding IO pipelines can be based on whether the given query involves equality-based filtering of the text data or filtering based on inclusion of a text pattern of the text data.

Selection of whether to index a given column of text data via the probabilistic index structure 3020 of FIG. 34B, the substring-based index structure 3570, or both, can be determined based on the type of text data stored in the column and/or whether queries are known and/or expected to include equality-based filtering or searching for inclusion of a text pattern. This determination for a given column can optionally be performed via the secondary indexing scheme selection module 2530 of FIGS. 25A-25E. Different text data columns can be indexed differently, where some columns are indexed via a probabilistic index structure 3020 only, where some columns are indexed via a substring-based index structure 3570 only, and/or where some columns are indexed via both a probabilistic index structure 3020 and a substring-based index structure 3570.

FIG. 35C illustrates an example execution of a query filtering the example dataset of FIG. 35B based on inclusion of a consecutive text pattern 3548 of "red%bear", where '%' is a wildcard character. The substring generator function 3550 with a fixed-length parameter of 3 is performed upon the consecutive text pattern 3548 of "red%bear", to render the corresponding substring set 3552 of 3-character substrings, skipping and ignoring the wildcard character, that includes "red", "bea" and "ear".

A set of corresponding index accesses 3542.1, 3542.2, and 3542.3 are performed to utilize each corresponding substring 3554 to identify each of a corresponding set of row identifier sets 3044 based on substring-based index structure 3570. This can include probing the substring-based index structure 3570 for index values corresponding to the substrings in the substring set. For example, the row identifier set 3044.6 is determined via index access 3542.1 based on being mapped to the index value 3043 for "red"; the row identifier set 3044.2 is determined via index access 3542.2 based on being mapped to the index value 3043 for "bea"; and the row identifier set 3044.4 is determined via index access 3542.3 based on being mapped to the index value 3043 for "ear". The index accesses can be optionally performed in parallel, for example, via parallel processing resources, such as a set of distinct nodes and/or processing core resources. Each index access 3452 performed by query processing system 2802 can be implemented as an index element 3512 of a corresponding IO pipeline 2834 as illustrated in FIG. 35A, and/or can otherwise be performed via other processing performed by a query processing system 2802 executing a corresponding query against a dataset.

An intersect subset 3544 can be generated based on performing a set intersection upon the outputted row identifier sets 3044 of the index accesses 3542 via a set intersect element 3319. The intersect subset 3544 in this example includes row a and row c, indicating that rows a and row c include all substrings "red", "bea", and "ear". The intersect subset 3544 can be implemented as a row identifier set 3044 of embodiments of FIGS. 30A-33H, for example, based on corresponding to output of intersection of rows identified in parallelized index elements that collectively implements a probabilistic index element 3012 as discussed in conjunction with FIG. 35A.

Data value access 3454 is performed to read rows identified in intersect subset 3544 from row storage 3022, such as rows stored in a corresponding one or more segments. A data value set 3046 that includes the corresponding data values 3024 for rows identified in intersect subset 3544 is identified accordingly. The data value access 3454 performed by query processing system 2802 can be implemented as source element 3014 of a corresponding IO pipeline 2834, and/or can otherwise be performed via other processing performed by a query processing system 2802 executing a corresponding query against a dataset.

Inclusion-based filtering 3558 is performed by determining ones of the data value set 3046 that include the consecutive text pattern "red%bear" to render a row identifier subset 3045, and/or optionally a corresponding subset of data values 3024 of data value set 3046. This can be based on comparing each data value 3024 in data value set 3046 to the given consecutive text pattern 3548, and including only ones of row identifiers in row identifier set 3044 with corresponding ones of the set of data values 3024 in data value set 3046 that include the consecutive text pattern 3548. In this case row a is included based on having a data value 3024 of "huge red bear" that includes the text pattern "red%bear" while row c is filtered out based on being false-positive rows with a value of "bear red" that does not match the text pattern due to including all substrings in a wrong ordering not matching the given text pattern. The inclusion-based filtering 3558 performed by query processing system 2802 can be implemented as filtering element 3016 of a corresponding IO pipeline 2834, and/or can otherwise be performed via other processing performed by a query processing system 2802 executing a corresponding query against a dataset.

Note that if the consecutive text pattern 3548 is a pattern, such as a string literal, with length less than or equal to the fixed-length 3551, the filtering element need not be applied. A plurality of index accesses 3452 may still be necessary to probe for all possible substrings that include the given pattern. However, a set union, rather than a set intersection can be applied to the output of row identifiers identified via this plurality of index accesses 3452.

In various embodiments, a query processing system includes at least one processor and a memory that stores operational instructions. The operational instructions, when executed by the at least one processor, can cause the query processing system to identify a filtered subset of a plurality of rows having text data of a column of the plurality of rows that includes a consecutive text pattern. Identifying the filtered subset of the plurality of rows having text data of the column of the plurality of rows that includes the consecutive text pattern can be based on: identifying a set of substrings included in the consecutive text pattern; identifying a set of subsets of rows by utilizing the index data of the column to identify, for each substring of the set of substrings, a corresponding subset of the set of subsets as a proper subset of the plurality of rows having text data of the first column that includes the each substring of the set of substrings; identifying a first subset of rows as an intersection of the set of subsets of rows; and/or comparing the text data of only rows in the first subset of rows to the consecutive text pattern to identify the filtered subset as a subset of the first subset of rows that includes rows having text data that includes the consecutive text pattern.

FIG. 35D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 35D. In particular, a node 37 can utilize the query processing module 2435 to execute some or all of the steps of FIG. 35D, where multiple nodes 37 implement their own query processing modules 2435 to independently execute the steps of FIG. 35D, for example, to facilitate execution of a query as participants in a query execution plan 2405.

Some or all of the method of FIG. 35D can be performed by the query processing system 2802, for example, by utilizing an operator execution flow generator module 2803 and/or a query execution module 2504. For example, some or all of the method of FIG. 35D can be performed by the IO pipeline generator module 2834, the index scheme determination module 2832, and/or the IO operator execution module 2840. Some or all of the method of FIG. 35D can be performed via communication with and/or access to a segment storage system 2508, such as memory drives 2425 of one or more nodes 37. Some or all of the steps of FIG. 35D can optionally be performed by any other processing module of the database system 10.

Some or all of the method of FIG. 35D can be performed via the IO pipeline generator module 2834 of FIG. 35A to generate an IO pipeline utilizing a subset-based index for text data. Some or all of the method of FIG. 35D can be performed via the segment indexing module of FIG. 35B to generate a subset-based index structure for text data. Some or all of the method of FIG. 35D can be performed via the query processing system 2802 based on implementing IO operator execution module of FIG. 35C that executes IO pipelines by utilizing a subset-based index for text data.

Some or all of the steps of FIG. 35D can be performed to implement some or all of the functionality of the segment processing module 2502 as described in conjunction with FIGS. 28A-28C and/or FIG. 29A. Some or all of the steps of FIG. 35D can be performed to implement some or all of the functionality regarding execution of a query via the plurality of nodes in the query execution plan 2405 as described in conjunction with FIGS. 24A-24E. Some or all steps of FIG. 35D can be performed by database system 10 in accordance with other embodiments of the database system 10 and/or nodes 37 discussed herein. Some or all steps of FIG. 35D can be performed in conjunction with some or all steps of FIG. 25E, FIG. 26B, FIG. 27D, FIG. 28D, and/or FIG. 29B. For example, some or all steps of FIG. 35D can be utilized to implement step 2598 of FIG. 25E, step 2790 of FIG. 27D, and/or step 2886 of FIG. 28D. Some or all steps of FIG. 35D can be performed in conjunction with some or all steps of FIG. 30H.

Step 3582 includes storing a plurality of text data as a column of a plurality of rows. Step 3584 includes storing index data corresponding to the column indicating, for each given substring of a plurality of substrings having a same fixed-length, ones of the plurality of rows with text data that include the given substring of the plurality of substrings. Step 3586 includes identifying a filtered subset of the plurality of rows having text data of the column that includes a consecutive text pattern.

Performing step 3586 can include performing step 3588, 3590, 3592, and/or 3594. Step 3588 includes identifying a set of substrings included in the consecutive text pattern. Each substring of the set of substrings can have the same fixed-length as substrings of the plurality of substrings. Step 3590 includes identifying a set of subsets of rows by utilizing the index data to identify, for each substring of the set of substrings, a corresponding subset of the set of subsets as a proper subset of the plurality of rows having text data of the first column that includes the each substring of the set of substrings. Step 3592 includes identifying a first subset of rows as an intersection of the set of subsets of rows. Step 3594 includes comparing the text data of only rows in the first subset of rows to the consecutive text pattern to identify the filtered subset as a subset of the first subset of rows that includes rows having text data that includes the consecutive text pattern.

In various embodiments, identifying the filtered subset of the plurality of rows is further based on reading a set of text data based on reading the text data from only rows in the first subset of rows. Comparing the text data of only the rows in the first subset of rows to the consecutive text pattern can be based on utilizing only text data in the set of text data.

In various embodiments, the text data is implemented via a string datatype, a varchar datatype, a text datatype, a variable-length datatype, or another datatype operable to include and/or depict text data.

In various embodiments, a set difference between the filtered subset and the first subset of rows is non-null. In various embodiments, the set difference includes at least one row having text data that includes every one of the set of substrings in a different arrangement than an arrangement dictated by the consecutive text pattern. In various embodiments, the index data for the column is in accordance with an inverted indexing scheme. In various embodiments, each subset of the set of subsets is identified in parallel with other subset of the set of subsets via a corresponding set of parallelized processing resources.

In various embodiments, the text data for at least one row in the filtered subset has a first length greater than a second length of the consecutive text pattern. In various embodiments, the consecutive text pattern includes at least one wildcard character. Identifying the set of substrings can be based on skipping the at least one wildcard character. In various embodiments, each of the set of substrings includes no wildcard characters.

In various embodiments, the method includes determining the same fixed-length for the plurality of substrings as a selected fixed-length parameter from a plurality of fixed-length options. For example, the selected fixed-length parameter is automatically selected or is selected based on user input. In various embodiments, each of the plurality of substrings include exactly three characters. In various embodiments, identifying the set of substrings included in the consecutive text pattern includes identifying every possible substring of the same-fixed length included in the consecutive text pattern.

In various embodiments, the index data corresponding to the column further indicates, for each row in the plurality of rows, a corresponding set of substrings for the text data of the row. In various embodiments, the corresponding set of substrings for the text data of the each row includes every possible substring of the same-fixed length included in the text data.

In various embodiments, identifying the filtered subset includes applying at least one probabilistic index-based IO construct of an IO pipeline generated for a query indicating the consecutive text pattern in at least one query predicate. For example, at least one probabilistic index-based IO construct of FIGS. 30A-30H is included in an IO pipeline utilized to identify the filtered subset.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a non-transitory computer readable storage medium includes at least one memory section that stores operational instructions that, when executed by a processing module that includes a processor and a memory, causes the processing module to: store a plurality of text data as a column of a plurality of rows; store index data corresponding to the column indicating, for each substring of a plurality of substrings having a same fixed-length, ones of the plurality of rows with text data that include the each substring of the plurality of substrings; and/or identify a filtered subset of a plurality of rows having text data of a column of the plurality of rows that includes a consecutive text pattern. Identifying the filtered subset of the plurality of rows having text data of the column of the plurality of rows that includes the consecutive text pattern can be based on: identifying a set of substrings included in the consecutive text pattern; identifying a set of subsets of rows by utilizing the index data of the column to identify, for each substring of the set of substrings, a corresponding subset of the set of subsets as a proper subset of the plurality of rows having text data of the first column that includes the each substring of the set of substrings; identifying a first subset of rows as an intersection of the set of subsets of rows; and/or comparing the text data of only rows in the first subset of rows to the consecutive text pattern to identify the filtered subset as a subset of the first subset of rows that includes rows having text data that includes the consecutive text pattern.

FIGS. 36A-36D illustrate embodiments of a database system 10 that implements suffix-based indexing of text data to index text data, adapting probabilistic-indexing based techniques discussed previously to filter text data based on inclusion of a given text pattern. Suffix-based indexing, such as utilization of a suffix array, suffix tree, and/or string B-tree, can be utilized to implement text searches for substrings that match a given string pattern, such as LIKE filtering.

A given text pattern can be split into a plurality of substrings. Unlike the substrings generated for the text pattern as illustrated in FIGS. 35A-35D, these substrings can be strictly non-overlapping. For example, the text pattern is split at one or more split points, such as at wildcard characters and/or breaks between individual words in the text pattern.

Each of these non-overlapping substrings can be utilized to identify corresponding rows with text data that includes the given non-overlapping substring, based on the suffix-based index. A set intersection can be applied to the set of outputs to identify rows with all of the non-overlapping substrings of the text pattern.

While the set of rows identified for each non-overlapping substring can be guaranteed to be the true set of rows rather than being probabilistic in nature, possible false-positive rows may be inherently present in the resulting intersection based on ordering not being considered when applying the intersection. These false-positives can thus be filtered out via reading and filtering of the text data of the identified rows in the intersection to identify only rows with text data having the non-overlapping substrings in the appropriate ordering as dictated by the given text pattern. Such searches for inclusion of a text pattern can thus be implemented by leveraging techniques of the probabilistic index-based constructs described previously, despite the index structure not necessarily indexing the text data via suffix-based indexing in a probabilistic fashion.

As illustrated in FIG. 36A, a query processing system 2802 can implement an IO pipeline generator module 2834 via processing resources of the database system 10 to determine an IO pipeline 2835 for execution of a given query based on a text inclusion condition 3522. The text inclusion condition 3522 can optionally be implemented as predicates 2822 of FIG. 30C, can be indicated in the operator execution flow 2817, and/or can otherwise be indicated by a given query for execution. The text inclusion condition 3522 of FIG. 36A can be the same as and/or similar to the text inclusion condition 3522 of FIG. 35A.

An IO pipeline can be generated via IO pipeline generator module 2834, for example, as discussed in conjunction with FIGS. 28A-28D. The IO pipeline generator module 2834 can be implemented via one or more nodes 37 of one or more computing devices 18 in conjunction with execution of a given query. For example, an operator execution flow 2817 that indicates the text inclusion condition 3522 is determined for a given query, for example, based on processing and/or optimizing a given query expression. The IO pipeline can otherwise be determined by processing resources of the database system 10 as a flow of elements for execution to filter a dataset based on the text inclusion condition 3522.

The IO pipeline generator module 2834 can determine a substring set 3652 for utilization to probe an index structure for the column based on performing a substring generator function 3650 upon the consecutive text pattern 3548 of the text inclusion condition 3522. For example, the text inclusion condition 3522 can generate substrings 3654.1-3654.R as a set of non-overlapping substrings of the consecutive text pattern 3548 split at a plurality of split points.

In cases where the consecutive text pattern 3548 includes wildcard characters or other indications of breaks between words and/or portions of the pattern, these wildcard characters can be skipped and/or ignored in generating the substrings of the substring set. For example, a consecutive text pattern 3548 having one or more wildcard characters can render a substring set 3652 with no substrings 3654 that include wildcard characters.

The plurality of split points can optionally be dictated by a split parameter 3651 denoting where these split points be located. For example, the split parameter 3651 denotes that split points occur at wildcard characters of the consecutive text pattern 3548, and that these wildcard characters not be included in any of the non-overlapping substrings. As another example, the split parameter 3651 denotes that split points be breaks between distinct words of the consecutive text pattern that includes a plurality of words. A particular ordered combination of the non-overlapping substrings can collectively include all of the consecutive text pattern 3548, and/or can include all of the consecutive text pattern 3548 except for characters, such as wildcard characters and/or breaks between words, utilized as the plurality of split points. The split parameter 3651 can correspond to a split parameter 3651 utilized to index the text data via a suffix-based index structure as described in further detail in conjunction with FIG. 36B.

The corresponding IO pipeline can include a plurality of R parallel index elements 3512 that each correspond to one of the R substrings 3654.1-3654.R of the substring set 3652. Each index element 3512 can be utilized to identify ones of the rows having text data in the column identified by the text column identifier that includes the substring based on a corresponding suffix-based index structure. A set intersect element can be applied to the output of the R parallel index elements 3512 to identify rows having all of the substrings 3654.1-3654.R, in any order.

This plurality of R parallel index elements 3512 and set intersect element 3319 can be collectively considered a probabilistic index element 3012 of FIG. 30B, as the output of the set intersect element 3319 is guaranteed to include the true set of rows satisfying the text inclusion condition 3522, as all rows that have the set of relevant substrings will be identified and included in the output of the intersection. However, false-positive rows, corresponding to rows with text values having all of the substrings 3554 of the substring set 3552 in a wrong ordering, with other text in between, and/or in a pattern that otherwise does not match the given consecutive text pattern 3548, could also be included in this intersection, and thus need filtering out via sourcing of the corresponding text data for all rows outputted via the intersection, and comparison of the data values to the given consecutive text pattern 3548 to filter out these false-positives.

These steps can be applied as source element 3014 and filter element 3016 accordingly, and the entire process can thus be considered an adapted implementation of the probabilistic index-based IO construct 3010 of FIG. 30B. Queries involving additional predicates in conjunctions, disjunctions, and/or negations that involve the variable-length column and/or other variable-length columns similarly indexed via their own probabilistic index structures 3020 can be implemented via adaptations of the probabilistic index-based IO construct 3010 of FIGS. 30A-30H, such as one or more probabilistic index-based conjunction constructs 3110, one or more probabilistic index-based disjunction constructs 3210, and/or more probabilistic index-based logical connective negations constructs 3310.

FIG. 36B illustrates an embodiment of a segment indexing module 2510 that generates a suffix-based index structure 3670.A of a given column 3023.A of text data for access by index elements 3512 for use in executing queries as discussed herein. In particular, the example suffix-based index structure 3670.A of FIG. 34B illustrates an example of indexing text data for access by the index elements 3512 of FIG. 36A. A suffix index structure generator module 3660 can generate the suffix-based index structure 3670 to index the text data of the variable length column.

Generating the suffix-based index structure 3670 can optionally include performing the substring generator function 3650 upon data values 3024 of the given column to determine a corresponding substring set 3652 of non-overlapping substrings, such as a plurality of distinct words, for each data value. This can optionally render a substring mapping indicating the substring set 3652 of one or more non-overlapping substrings, such as words, for each data value 3024.

It can be infeasible for each non-overlapping substrings, such as each word, to correspond to an index value 3043, for example, of an inverted index structure, as these non-overlapping substrings are not of a fixed-length like the substrings of the substring-based index structure of FIG. 35B. In some embodiments a plurality of suffix-based substrings, such as all possible suffix based substrings, are determined for each non-overlapping substring, such as each word, of a given text data. For example, for row c, the text data is split into words "bear" and "red", a first set of suffix-based substrings "r", "ar", "ear", and "bear" word "bear" is determined, while a second set of suffix-based substrings "d", "ed", and "red" are determined for the word "red". A plurality of possible words can be indexed via a suffix structure such as a suffix array, suffix tree, and/or suffix B-tree, where a given suffix substring of the structure indicates all rows that include a word having the suffix substring and/or indicates all further suffix substrings that include the given suffix substrings, for example, as an array and/or tree of substrings of increasing length. The structure can be probed, via a given index element 3512, for each individual word of a consecutive text pattern, progressing down a corresponding array and/or tree, until the full word is identified and mapped to a set of rows containing the full word to render a set of rows with text data containing the word.

In some embodiments, the resulting suffix-based index structure 3670 can be stored as index data, such as a secondary index 2546, of a corresponding segment having the set of rows for the given column. Other sets of rows of a given dataset that are included in different segments can similarly have their rows indexed via the same type of suffix-based index structure 3670 via the same or different fixed-length 3551 performed upon data values of its columns. In some cases, different substring generator functions 3650 are selected for performance for sets of rows of different segments, for example, based on different cardinality, different access frequency, different query types, or other different properties of the column data for different segments.

In other embodiments, the resulting suffix-based index structure 3670 can be stored as index data, such as a secondary index 2546, for all rows of the given dataset in one or more locations. For example, a common suffix-based index structure 3670 can be generated for all rows of a dataset, even if these rows are stored across different segments, different storage structures, and/or different memory locations.

The suffix-based index structure 3670 can be considered a type of probabilistic index structure 3020 as a result of rows being identified for inclusion of subsets of a consecutive text pattern that may not include the consecutive text pattern. However, unlike the example probabilistic index structure of FIG. 34B that includes hash collisions for variable length values, where accessing the index for a given fixed-length value of a given variable-length value can render false positives, the substring-based index structure 3570 can ensure that the exact set of rows including a given substring are returned, as the substrings are utilized as the indexes with no hash collisions between substrings.

The substring-based index structure 3570 of FIG. 36B can be utilized to implement the probabilistic index structure 3020 of FIGS. 30A-33H. The generation of any probabilistic index structure 3020 described herein can be performed as illustrated in FIG. 36B, for example, via utilizing at least one processor to perform the substring generator function 3550 and/or to implement the index structure generator module 3560.

In some embodiments, a given column storing text data, such as a given column 3023.A, can be indexed via both the probabilistic index structure 3020 of FIG. 34B and the suffix-based index structure 3670 of FIG. 36B, where both a probabilistic index structure 3020 a substring-based index structure 3570 are generated and stored for the given column 3023.A accordingly. This can be ideal in facilitating execution of different types of queries. In particular, the probabilistic index structure 3020 of FIG. 34B can be utilized for queries involving equality-based filtering of the text data as illustrated in FIGS. 34A and 34C, while suffix-based index structure 3670 of FIG. 36B can be utilized for queries involving filtering based on inclusion of a text pattern of the text data as illustrated in FIGS. 36A and 36C. Generation of the corresponding IO pipelines can be based on whether the given query involves equality-based filtering of the text data or filtering based on inclusion of a text pattern of the text data.

Selection of whether to index a given column of text data via the probabilistic index structure 3020 of FIG. 34B, the suffix-based index structure 3670, or both, can be determined based on the type of text data stored in the column and/or whether queries are known and/or expected to include equality-based filtering or searching for inclusion of a text pattern. This determination for a given column can optionally be performed via the secondary indexing scheme selection module 2530 of FIGS. 25A-25E. Different text data columns can be indexed differently, where some columns are indexed via a probabilistic index structure 3020 only, where some columns are indexed via a suffix-based index structure 3670 only, and/or where some columns are indexed via both a probabilistic index structure 3020 and a substring-based index structure 3570.

In some embodiments, a given column storing text data, such as a given column 3023.A, can indexed via either the substring-based index structure 3570 of FIG. 35B or the suffix-based index structure 3670 of FIG. 36B, but not both, as these index structures both facilitate inclusion-based filtering where only one of these index structures is necessary to facilitate inclusion-based filtering. Selection of whether to index a given column of text data via the substring-based index structure 3570 of FIG. 35B, the suffix-based index structure 3670, or neither, can be determined based on the type of text data stored in the column and/or whether queries are known and/or expected to include equality-based filtering or searching for inclusion of a text pattern. This determination for a given column can optionally be performed via the secondary indexing scheme selection module 2530 of FIGS. 25A-25E. Different text data columns can be indexed differently, where some columns are indexed via a substring-based index structure 3570, where some columns are indexed via a suffix-based index structure 3670, and/or where some columns are indexed via neither of these indexing structures.

FIG. 36C illustrates an example execution of a query filtering the example dataset of FIG. 36B based on inclusion of a consecutive text pattern 3548 of "red%bear", where '%' is a wildcard character. The substring generator function 3650 with a split parameter 3651 splitting at '%' characters is performed upon the consecutive text pattern 3548 of "red%bear", to render the corresponding substring set 3652 of non-overlapping substrings "red" and "bear".

A set of corresponding index accesses 3542.1 and 3542.2 are performed to utilize each corresponding substring 3654 to identify each of a corresponding set of row identifier sets 3044 based on suffix-based index structure 3670. This can include probing the suffix-based index structure 3670 to determine the set of rows with text data that includes the corresponding substring 3654. This can include traversing down a suffix-structure such as a suffix array and/or suffix tree, progressing one character at a time based on the given corresponding substring 3654, to reach a node of an array and/or tree structure corresponding to the full substring 3654, and/or identify the set of rows mapped to this node of the array and/or tree structure. For example, the row identifier set 3044.1 is determined via index access 3542.1 based on being mapped to suffix index data for "red"; and the row identifier set 3044.2 is determined via index access 3542.2 based on being mapped to the suffix index data, such as corresponding index values 3043, for "bear." The index accesses can be optionally performed in parallel, for example, via parallel processing resources, such as a set of distinct nodes and/or processing core resources. Each index access 3452 performed by query processing system 2802 can be implemented as an index element 3512 of a corresponding IO pipeline 2834 as illustrated in FIG. 36A, and/or can otherwise be performed via other processing performed by a query processing system 2802 executing a corresponding query against a dataset.

An intersect subset 3544 can be generated based on performing a set intersection upon the outputted row identifier sets 3044 of the index accesses 3542 via a set intersect element 3319. The intersect subset 3544 in this example includes row a and row c, indicating that rows a and row c include all substrings "red" and "bear". The intersect subset 3544 can be implemented as a row identifier set 3044 of embodiments of FIGS. 30A-33H, for example, based on corresponding to output of intersection of rows identified in parallelized index elements that collectively implements a probabilistic index element 3012 as discussed in conjunction with FIG. 36A.

Data value access 3454 is performed to read rows identified in intersect subset 3544 from row storage 3022, such as rows stored in a corresponding one or more segments. A data value set 3046 that includes the corresponding data values 3024 for rows identified in intersect subset 3544 is identified accordingly. The data value access 3454 performed by query processing system 2802 can be implemented as source element 3014 of a corresponding IO pipeline 2834, and/or can otherwise be performed via other processing performed by a query processing system 2802 executing a corresponding query against a dataset.

Inclusion-based filtering 3558 is performed by determining ones of the data value set 3046 that include the consecutive text pattern "red%bear" to render a row identifier subset 3045, and/or optionally a corresponding subset of data values 3024 of data value set 3046. This can be based on comparing each data value 3024 in data value set 3046 to the given consecutive text pattern 3548, and including only ones of row identifiers in row identifier set 3044 with corresponding ones of the set of data values 3024 in data value set 3046 that include the consecutive text pattern 3548. In this case row a is included based on having a data value 3024 of "huge red bear" that includes the text pattern "red%bear" while row c is filtered out based on being false-positive rows with a value of "bear red" that does not match the text pattern due to including all substrings in a wrong ordering not matching the given text pattern. The inclusion-based filtering 3558 performed by query processing system 2802 can be implemented as filtering element 3016 of a corresponding IO pipeline 2834, and/or can otherwise be performed via other processing performed by a query processing system 2802 executing a corresponding query against a dataset. Note that if the consecutive text pattern 3548 is a single word and/or is not split into more than one substring 3654 via the split parameter, the filtering element need not be applied, as no false-positives will be identified in this case.

In various embodiments, a query processing system includes at least one processor and a memory that stores operational instructions. The operational instructions, when executed by the at least one processor, can cause the query processing system to identifying a filtered subset of the plurality of rows having text data of the column that includes a consecutive text pattern. Identifying the filtered subset of the plurality of rows having text data of the column that includes the consecutive text pattern can be based on: identifying a non-overlapping set of substrings of the consecutive identifying a filtered subset of the plurality of rows having text data of the column that includes a consecutive text pattern; splitting the text pattern into the non-overlapping set of substrings at a corresponding set of split points; identifying a set of subsets of rows by utilizing suffix-based index data corresponding to the plurality of rows to identify, for each substring of the non-overlapping set of substrings, a corresponding subset of the set of subsets as a proper subset of the plurality of rows having text data of the first column that includes the each substring of the set of substrings; identifying a first subset of rows as an intersection of the set of subsets of rows; and/or comparing the text data of only rows in the first subset of rows to the consecutive text pattern to identify the filtered subset as a subset of the first subset of rows that includes rows having text data that includes the consecutive text pattern.

FIG. 36D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 36D. In particular, a node 37 can utilize the query processing module 2435 to execute some or all of the steps of FIG. 36D, where multiple nodes 37 implement their own query processing modules 2435 to independently execute the steps of FIG. 36D, for example, to facilitate execution of a query as participants in a query execution plan 2405.

Some or all of the method of FIG. 36D can be performed by the query processing system 2802, for example, by utilizing an operator execution flow generator module 2803 and/or a query execution module 2504. For example, some or all of the method of FIG. 36D can be performed by the IO pipeline generator module 2834, the index scheme determination module 2832, and/or the IO operator execution module 2840. Some or all of the method of FIG. 36D can be performed via communication with and/or access to a segment storage system 2508, such as memory drives 2425 of one or more nodes 37. Some or all of the steps of FIG. 36D can optionally be performed by any other processing module of the database system 10.

Some or all of the method of FIG. 36D can be performed via the IO pipeline generator module 2834 of FIG. 36A to generate an IO pipeline utilizing a suffix-based index for text data. Some or all of the method of FIG. 36D can be performed via the segment indexing module of FIG. 36B to generate a suffix-based index structure for text data. Some or all of the method of FIG. 36D can be performed via the query processing system 2802 based on implementing IO operator execution module of FIG. 36C that executes IO pipelines by utilizing a suffix-based index for text data.

Some or all of the steps of FIG. 36D can be performed to implement some or all of the functionality of the segment processing module 2502 as described in conjunction with FIGS. 28A-28C and/or FIG. 29A. Some or all of the steps of FIG. 36D can be performed to implement some or all of the functionality regarding execution of a query via the plurality of nodes in the query execution plan 2405 as described in conjunction with FIGS. 24A-24E. Some or all steps of FIG. 35D can be performed by database system 10 in accordance with other embodiments of the database system 10 and/or nodes 37 discussed herein. Some or all steps of FIG. 36D can be performed in conjunction with some or all steps of FIG. 25E, FIG. 26B, FIG. 27D, FIG. 28D, and/or FIG. 29B. For example, some or all steps of FIG. 36D can be utilized to implement step 2598 of FIG. 25E, step 2790 of FIG. 27D, and/or step 2886 of FIG. 28D. Some or all steps of FIG. 36D can be performed in conjunction with some or all steps of FIG. 30H.

Step 3682 includes storing a plurality of text data as a column of a plurality of rows in conjunction with corresponding suffix-based index data for the plurality of text data. Step 3684 includes identifying a filtered subset of the plurality of rows having text data of the column that includes a consecutive text pattern.

Performing step 3684 can include performing step 3686, 3688, 3690, and/or 3692. Step 3686 includes identifying a non-overlapping set of substrings of the consecutive text pattern based on splitting the text pattern into the non-overlapping set of substrings at a corresponding set of split points. Step 3688 includes identifying a set of subsets of rows by utilizing the suffix-based index data to identify, for each substring of the non-overlapping set of substrings, a corresponding subset of the set of subsets as a proper subset of the plurality of rows having text data of the first column that includes the each substring of the set of substrings. Step 3690 includes identifying a first subset of rows as an intersection of the set of subsets of rows. Step 3692 includes comparing the text data of only rows in the first subset of rows to the consecutive text pattern to identify the filtered subset as a subset of the first subset of rows that includes rows having text data that includes the consecutive text pattern.

In various embodiments, identifying the filtered subset of the plurality of rows is further based on reading a set of text data based on reading the text data from only rows in the first subset of rows. Comparing the text data of only the rows in the first subset of rows to the consecutive text pattern can be based on utilizing only text data in the set of text data.

In various embodiments, the text data is implemented via a string datatype, a varchar datatype, a text datatype, a variable-length datatype, or another datatype operable to include and/or depict text data. In various embodiments, the suffix-based indexing data is implemented via a suffix array, a suffix tree, a string B-tree, or another type of indexing structure.

In various embodiments, a set difference between the filtered subset and the first subset of rows is non-null. In various embodiments, the set difference includes at least one row having text data that includes every one of the set of substrings in a different arrangement than an arrangement dictated by the consecutive text pattern.

In various embodiments, the text data for at least one row in the filtered subset has a first length greater than a second length of the consecutive text pattern. In various embodiments, each of the set of split points correspond to separation between each of a plurality of different words of the consecutive text data. In various embodiments, the consecutive text pattern includes at least one wildcard character. Each of the set of split points can correspond to one wildcard character of the at least one wildcard character. In various embodiments, each of the non-overlapping set of substrings includes no wildcard characters.

In various embodiments, each subset of the set of subsets is identified in parallel with other subsets of the set of subsets via a corresponding set of parallelized processing resources.

In various embodiments, the corresponding suffix-based index data for the plurality of text data indicates, for at least one of the plurality of text data, a set of suffix substrings of each of a plurality of non-overlapping substrings of the text data. The plurality of non-overlapping substrings of the text data can be split at a corresponding plurality of split points of the text data. Every row included in the first subset of rows can include each of the set of non-overlapping substrings in the plurality of non-overlapping substrings of its text data.

In various embodiments, identifying the corresponding subset of the set of subsets for the each substring of the set of substrings includes identifying ones of the plurality of rows indicated in the suffix-based index data as including the each substring as one of plurality of non-overlapping substrings of the text data based on the set of suffix substrings of the one of plurality of non-overlapping substrings being indexed in the suffix-based index data.

In various embodiments, identifying the filtered subset includes applying at least one probabilistic index-based IO construct of an IO pipeline generated for a query indicating the consecutive text pattern in at least one query predicate. For example, at least one probabilistic index-based IO construct of FIGS. 30A-30H is included in an IO pipeline utilized to identify the filtered subset.

In various embodiments, a filtering element of the probabilistic index-based IO construct is included in the IO pipeline based on the non-overlapping set of substrings including a plurality of substrings. In various embodiments, the method further includes identifying a filtered subset of the plurality of rows having text data of the column that includes a second consecutive text pattern. Identifying the filtered subset of the plurality of rows having text data of the column that includes the second consecutive text pattern can be based on identifying a non-overlapping set of substrings of the second consecutive text pattern as a single substring; identifying a single subset of rows by utilizing the suffix-based index data to identify, for each substring of the non-overlapping set of substrings, a corresponding subset of the set of subsets as a proper subset of the plurality of rows having text data of the first column that includes the each substring of the set of substrings; and/or foregoing filtering of the single subset of rows based on identifying the non-overlapping set of substrings of the second consecutive text pattern as the single substring. In various embodiments, the non-overlapping set of substrings of the second consecutive text pattern is identified as a single substring based on the consecutive text pattern including a single word and/or the consecutive text pattern not including any wildcard characters.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a non-transitory computer readable storage medium includes at least one memory section that stores operational instructions that, when executed by a processing module that includes a processor and a memory, causes the processing module to: store a plurality of text data as a column of a plurality of rows in conjunction with corresponding suffix-based index data for the plurality of text data; and/or identify a filtered subset of the plurality of rows having text data of the column that includes a consecutive text pattern. Identifying the filtered subset of the plurality of rows having text data of the column that includes the consecutive text pattern can be based on: identifying a non-overlapping set of substrings of the consecutive text pattern based on splitting the text pattern into the non-overlapping set of substrings at a corresponding set of split points; identifying a set of subsets of rows by utilizing the suffix-based index data to identify, for each substring of the non-overlapping set of substrings, a corresponding subset of the set of subsets as a proper subset of the plurality of rows having text data of the first column that includes the each substring of the set of substrings; identifying a first subset of rows as an intersection of the set of subsets of rows; and/or comparing the text data of only rows in the first subset of rows to the consecutive text pattern to identify the filtered subset as a subset of the first subset of rows that includes rows having text data that includes the consecutive text pattern.

FIGS. 37A-37C illustrate embodiments of a database systems that facilitates utilization of a probabilistic indexing scheme via a selected false-positive tuning parameter. A false-positive tuning parameter can be a function parameter, tunable variable, or other selectable parameter that dictates and/or influences the expected and/or actual rate of false positives, for example, that are identified via a probabilistic index element 3012 and/or that are thus read via a source element 3014 in query execution as described herein. The rate of false positives for a given query, and/or of a given probabilistic index-based IO construct 3010 of a given query, can be equal to and/or based on a proportion of identified rows that are false positive rows that are read from memory and then filtered out to render the correct resultant, for example, based on using a probabilistic indexing scheme as described herein. For example, the rate of false positives for a given probabilistic index-based IO construct 3010 can be based on and/or equal to a proportion of rows identified in row identifier set 3044 that are included in the false-positive row set 3035.

The false-positive tuning parameter utilized by a given probabilistic indexing scheme to index a given column of a given dataset can be selected automatically by processing resources of the database system 10 and/or based on user input, for example, from a discrete and/or continuous set of possible false-positive tuning parameter options. For example, the false-positive tuning parameter can be intelligently selected for probabilistic indexing based on weighing the trade-off of size of index vs. rate of false positive rows to have values read and filtered out.

As illustrated in FIG. 37A, a given column 3023 can be indexed via a probabilistic index structure generator module 3470 to render a corresponding probabilistic index structure 3020 that is stored in memory of the database system for access in performing query executions involving the column as discussed previously, such as any embodiment of probabilistic index structure 3020 described previously herein. For example, the probabilistic index structure generator module 3470 generates the probabilistic index structure 3020 as the inverted index structure with fixed-length values stored for variable-length data of FIG. 34B, the substring-based index structure 3570 of FIG. 35B implemented as a probabilistic index structure 3020 for identifying text patterns included in text data, and/or the suffix-based index structure 3670 of FIG. 36B implemented as a probabilistic index structure 3020 for identifying text patterns included in text data, and/or any other type of probabilistic index structure for fixed-length data or variable-length data of a given column.

As illustrated in FIG. 37A, the probabilistic index structure generator module 3470 is implemented by segment indexing module 2510 to generate at least one probabilistic index structure 3020 for the given column 3023. For example, the probabilistic index structure generator module 3470 is implemented as the secondary index generator module 2540 of FIG. 25A. In such embodiments, the probabilistic index structure generator module 3470 can optionally generate separate probabilistic index structures 3020 for each different segment storing rows of the dataset via secondary index generator module 2540 of FIG. 25B as discussed previously. In other embodiments, the probabilistic index structure 3020 can optionally be generated by the probabilistic index structure generator module 3470 as same and/or common index data for all rows of a given dataset that include the given column 3023, such as all rows of a given column 3023 stored across one or more different segments.

The probabilistic index structure generator module 3470 can generate a corresponding probabilistic index structure 3020 based on applying a selected false-positive tuning parameter 3720. This false-positive tuning parameter 3720 can be selected from a discrete or continuous set of possible false-positive tuning parameters indicated in false-positive tuning parameter option data 3715.

In some cases, a first false-positive tuning parameter inducing a first false-positive rate rendering a greater rate of false positives than a second false-positive rate induced by a second false-positive tuning parameter can be selected based on being more favorable than the second false-positive tuning parameter due to the first false-positive tuning parameter inducing a more favorable IO efficiency in query execution than the second false-positive tuning parameter due to less false-positive rows needing to be read and filtered out. Alternatively, the second false-positive tuning parameter can be selected based on being more favorable than the first false-positive tuning parameter due to the second false-positive tuning parameter inducing a more favorable storage efficiency of the index data for the probabilistic indexing scheme than the second false-positive tuning parameter.

As discussed previously, a probabilistic indexing scheme can be implemented as an inverted index function that indexes column data based on a hash value computed for the column values via a hash function, for example, as discussed in conjunction with FIGS. 34A-34D. In such embodiments, the false-positive tuning parameter can correspond to a function parameter of the hash function, such as fixed-length conversion function 3450, dictating the fixed-length of the hash values and/or dictating a number of possible hash values outputted by the hash function. The corresponding rate of false-positives can correspond to a rate of hash collisions by the hash function, and can further be dictated by a range of values of the column relative to the number of possible hash values. Hash functions with false-positive tuning parameters dictating larger fixed-length values and/or larger numbers of possible hash values can have more favorable IO efficiency and less favorable storage efficiency than hash functions with false-positive tuning parameters dictating smaller fixed-length values and/or smaller numbers of possible hash values.

As discussed previously, a probabilistic indexing scheme can be implemented as a substring-based indexing scheme indexes text data based on its fixed-length substrings, for example, as discussed in conjunction with FIGS. 35A-35D. In such embodiments, the false-positive tuning parameter can correspond to a fixed-length of the substrings, such as fixed-length 3551 of substring generator function 3550. In some embodiments, substring generator functions 3550 false-positive tuning parameters dictating larger fixed-lengths of the substrings and/or can have more favorable IO efficiency and less favorable storage efficiency than hash functions with false-positive tuning parameters dictating smaller fixed-lengths of the substrings. In particular, a larger number of possible substrings are likely to be indexed via an inverted indexing scheme when the fixed-length is larger, as this induces a larger number of possible substrings. However, a given consecutive text pattern has a smaller number of possible substrings identified when the fixed-length is larger, which can result in in fewer text data being identified as false positives due to having the substrings in a different ordering.

Different columns of a given dataset can be indexed via a same or different type of probabilistic indexing scheme utilizing different respective false-positive tuning parameters of the set of possible false-positive tuning parameter options. Alternatively or in addition, different segments can index a same column via a probabilistic indexing scheme utilizing different respective false-positive tuning parameters of the set of possible false-positive tuning parameter options.

In some embodiments, the false-positive tuning parameter selection module 3710 is selected from the options in the false-positive tuning parameter option data 3715 via user input to an interactive user interface displayed via a display device of a client device communicating with the database system 10. For example, an administrator can set the false-positive tuning parameter option data 3715 of probabilistic indexing structures 3020 for one or more columns of a dataset as a user configuration sent to and/or determined by the database system 10.

Alternatively, as illustrated in FIG. 37A, a false-positive tuning parameter selection module 3710 can be implemented to select the false-positive tuning parameter automatically. For example, the false-positive tuning parameter selection module 3710 can be implemented via the secondary indexing scheme selection module 2530 of FIGS. 25C-25D. In such cases, the false-positive tuning parameter 3720 selected for the probabilistic indexing structure 3020 can be implemented as a configurable parameter 2534 of an indexing type 2532 corresponding to a type of probabilistic indexing scheme. The false-positive tuning parameter option data 3715 can be implemented as a continuous and/or discrete set of different options for the configurable parameter 2534 of the indexing type 2532 corresponding to the type of probabilistic indexing scheme. The false-positive tuning parameter selection module 3710 can otherwise be implemented to select the false-positive tuning parameter automatically via a deterministic function, one or more heuristics, an optimization, and/or another determination.

As illustrated in FIG. 37A, the false-positive tuning parameter selection module 3710 can be implemented to select the false-positive tuning parameter automatically based on index storage conditions and/or requirements 3712, IO efficiency conditions and/or requirements 3714, other measured conditions, and/or other determined requirements. For example, the index storage conditions and/or requirements 3712 and/or the IO efficiency conditions and/or requirements 3714 are implemented as user-generated secondary indexing hint data 2620 and/or system-generated indexing hint data 2630 generated via indexing hint generator system 2551. The false-positive tuning parameter selection module 3710 can otherwise be implemented to select the false-positive tuning parameter automatically based on given index storage conditions and/or requirements 3712 and/or IO efficiency conditions and/or requirements 3714, for example to render an index storage space meet the index storage conditions, to render an IO efficiency meeting the IO efficiency conditions, and/or to apply a trade-off and/or optimization of storage space and IO efficiency.

In some embodiments, the false-positive tuning parameter is automatically selected for one or more segments by the secondary indexing scheme selection module 2530 of the segment indexing module 2510 of FIG. 2510 of FIGS. 25A-25D. In some embodiments, the false-positive tuning parameter is automatically changed for one or more existing segments by the segment indexing evaluation system 2710 of FIGS. 27A-27D to re-index via a newly selected false-positive tuning parameter based on the secondary indexing efficiency metrics for the segment indicating the prior false-positive tuning parameter caused the segment to be an inefficiently indexed segment. The rate of false-positives can be a secondary indexing efficiency metric 2715 of FIGS. 27A-27D. For example, a metric corresponding to the rate of false-positives can be equivalent to and/or based on the IO efficiency value and/or the processing efficiency value discussed in conjunction with FIG. 27A, and/or can be a function of the "values read", "values processed", and/or "values emitted metrics discussed in conjunction with FIG. 27A.

One or more false-positive tuning parameters can otherwise be automatically selected and/or optionally changed overtime for one or more corresponding columns that are indexed via a corresponding probabilistic indexing scheme via at least one processor of the database system 10, for example, based on automatic optimization of and/or evaluation of a trade-off between IO efficiency and storage efficiency. Alternatively or in addition, one or more false-positive tuning parameters can be selected and/or optionally changed overtime for one or more corresponding columns that are indexed via a corresponding probabilistic indexing scheme based on user configuration data received from a client device of a corresponding user, such as an administrator.

FIG. 37B illustrates an embodiment of the probabilistic index structure generator module 3470 that applies false-positive tuning parameter 3720 to map each data value 3024.A of the given column 3023.A to a corresponding index value 3043 via a fixed-length conversion function 3450, for example, as discussed in conjunction with FIGS. 34A-34D. For example, the index value for a given row i is determined as a function H of a given data value 3024.A.i and the false-positive tuning parameter 3720. As a particular example, H is a hash function, where all index values 3043 are hash values with a fixed-length dictated by the false-positive tuning parameter 3720.

In various embodiments, a database system includes at least one processor and a memory that stores operational instructions. The operational instructions, when executed by the at least one processor, can cause the database system to: determine a selected false-positive tuning parameter of a plurality of false-positive tuning parameter options; store index data for a plurality of column values for a first column of a plurality of rows in accordance with a probabilistic indexing scheme that utilizes the selected false-positive tuning parameter; and/or facilitating execution of a query including a query predicate indicating the first column. Facilitating execution of a query including a query predicate indicating the first column includes identifying a first subset of rows as a proper subset of the plurality of rows based on the index data of the probabilistic indexing scheme for the first column; and/or identifying a second subset of rows as a proper subset of the first subset of rows based on identifying ones of a first subset of the plurality of column values corresponding to the first subset of rows that compare favorably to the query predicate. A number of rows included in a set difference between the first subset of rows and the second subset of rows can be based on the selected false-positive tuning parameter.

FIG. 37C illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 37C. In particular, a node 37 can utilize the query processing module 2435 to execute some or all of the steps of FIG. 37C, where multiple nodes 37 implement their own query processing modules 2435 to independently execute the steps of FIG. 37C, for example, to facilitate execution of a query as participants in a query execution plan 2405.

Some or all of the method of FIG. 37C can be performed by the segment indexing module of FIG. 37A, for example, by implementing the false-positive tuning parameter selection module 3710 and/or the probabilistic index structure generator module 3470. Some or all of the method of FIG. 37C can be performed by the query processing system 2802, for example, by utilizing an operator execution flow generator module 2803 and/or a query execution module 2504. For example, some or all of the method of FIG. 37C can be performed by the IO pipeline generator module 2834, the index scheme determination module 2832, and/or the IO operator execution module 2840. Some or all of the method of FIG. 37C can be performed via communication with and/or access to a segment storage system 2508, such as memory drives 2425 of one or more nodes 37. Some or all of the method of FIG. 37C can be performed by the segment indexing evaluation system 2710. Some or all of the steps of FIG. 37C can optionally be performed by any other processing module of the database system 10.

Some or all of the steps of FIG. 37C can be performed to implement some or all of the functionality of the segment processing module 2502 as described in conjunction with FIGS. 28A-28C and/or FIG. 29A. Some or all of the steps of FIG. 37C can be performed to implement some or all of the functionality regarding execution of a query via the plurality of nodes in the query execution plan 2405 as described in conjunction with FIGS. 24A-24E. Some or all of the steps of FIG. 37C can be performed to implement some or all of the functionality regarding evaluation of segment indexes by the segment indexing evaluation system 2710 described in conjunction with FIGS. 27A-27D. Some or all steps of FIG. 35D can be performed by database system 10 in accordance with other embodiments of the database system 10 and/or nodes 37 discussed herein. Some or all steps of FIG. 37C can be performed in conjunction with some or all steps of FIG. 25E, FIG. 26B, FIG. 27D, FIG. 28D, and/or FIG. 29B. For example, some or all steps of FIG. 37C can be utilized to implement step 2598 of FIG. 25E, step 2790 of FIG. 27D, and/or step 2886 of FIG. 28D. Some or all steps of FIG. 37C can be performed in conjunction with some or all steps of FIGS. 30H, 31F, 32G, 33H, 34D, 35D, and/or 36D.

Step 3782 includes determining a selected false-positive tuning parameter of a plurality of false-positive tuning parameter options. Step 3784 includes storing index data for a plurality of column values for a first column of a plurality of rows in accordance with a probabilistic indexing scheme that utilizes the selected false-positive tuning parameter. Step 3786 includes facilitating execution of a query including a query predicate indicating the first column.

Performing step 3786 can include performing step 3788 and/or 3790. Step 3788 includes identifying a first subset of rows as a proper subset of the plurality of rows based on the index data of the probabilistic indexing scheme for the first column. Step 3790 includes identifying a second subset of rows as a proper subset of the first subset of rows based on identifying ones of a first subset of the plurality of column values corresponding to the first subset of rows that compare favorably to the query predicate. A number of rows included in a set difference between the first subset of rows and the second subset of rows is based on the selected false-positive tuning parameter.

In various embodiments, determining the selected false-positive tuning parameter is based on user input selecting the selected false-positive tuning parameter from the plurality of false-positive tuning parameter options. In various embodiments, a storage size of the index data is dictated by the selected false-positive tuning parameter. A false-positive rate of the probabilistic indexing scheme can be dictated by the selected false-positive tuning parameter. The false-positive rate can be a decreasing function of the storage size of the index data.

In various embodiments, determining the selected false-positive tuning parameter is based on automatically selecting the selected false-positive tuning parameter. In various embodiments, the selected false-positive tuning parameter is automatically selected based on at least one of: index data storage efficiency, or IO efficiency conditions. In various embodiments, the selected false-positive tuning parameter is automatically selected based on a cardinality of the column values of the first column.

In various embodiments, the method further includes generating index efficiency data based on execution of a plurality of queries that includes the query. In various embodiments, the method further includes determining to update the probabilistic indexing scheme for the first column based on the index efficiency data compares unfavorably to an index efficiency threshold. In various embodiments, the method further includes generating updated index data in accordance with an updated probabilistic indexing scheme for the first column that utilizes a newly selected false-positive tuning parameter that is different from the selected false-positive tuning parameter based on determining to update the probabilistic indexing scheme.

In various embodiments, the selected false-positive tuning parameter is selected for the first column. The method can further include determining a second selected false-positive tuning parameter of the plurality of false-positive tuning parameter options for a second column of the plurality of rows. The method can further include storing second index data for a second plurality of column values for the second column of the plurality of rows in accordance with a second probabilistic indexing scheme that utilizes the second selected false-positive tuning parameter.

In various embodiments, the probabilistic indexing scheme and the second probabilistic indexing scheme utilize a same indexing type. The second selected false-positive tuning parameter can be different from the first false-positive tuning parameter. In various embodiments, the second selected false-positive tuning parameter is different from the first false-positive tuning parameter based on: the first column having a different cardinality from the second column; the first column having a different data type from the second column; the first column having a different access rate from the second column; the first column appearing in different types of query predicates from the second column; column values of the first column having different storage requirements from column values of the second column; column values of the first column having different IO efficiency from column values of the second column; and/or other factors.

In various embodiments, the plurality of rows are stored via a set of segments. The selected false-positive tuning parameter can be selected for a first segment of the set of segments. The index data for a first subset of the plurality of column values can be in accordance with the probabilistic indexing scheme that utilizes the selected false-positive tuning parameter for ones of the plurality of rows in the first segment of the set of segments. In various embodiments the method further includes determining a second selected false-positive tuning parameter of the plurality of false-positive tuning parameter options for a second segment of the set of segments. various embodiments the method further includes storing second index data for a second subset of the plurality of column values for the first column in accordance with a second probabilistic indexing scheme that utilizes the second selected false-positive tuning parameter for other ones of the plurality of rows in the second segment of the set of segments.

In various embodiments, the probabilistic indexing scheme and the second probabilistic indexing scheme utilize a same indexing type. The second selected false-positive tuning parameter can be different from the first false-positive tuning parameter. In various embodiments, the second selected false-positive tuning parameter is different from the first false-positive tuning parameter based on: column values for rows in first segment having a different cardinality from column values for rows in second segment; column values for rows in first segment having a different access rate from column values for rows in second segment; column values for rows in first segment appearing in different types of query predicates from column values for rows in second segment; and/or other factors.

In various embodiments, the index data of the probabilistic indexing scheme includes a plurality of hash values computed by performing a hash function on corresponding ones of the plurality of column values. The hash function can utilize the selected false-positive tuning parameter. In various embodiments, a rate of hash collisions of the hash function is dictated by the selected false-positive tuning parameter. In various embodiments, a same fixed-length of the plurality of hash values is dictated by the selected false-positive tuning parameter.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a non-transitory computer readable storage medium includes at least one memory section that stores operational instructions that, when executed by a processing module that includes a processor and a memory, causes the processing module to: determine a selected false-positive tuning parameter of a plurality of false-positive tuning parameter options; store index data for a plurality of column values for a first column of a plurality of rows in accordance with a probabilistic indexing scheme that utilizes the selected false-positive tuning parameter; and/or facilitating execution of a query including a query predicate indicating the first column. Facilitating execution of a query including a query predicate indicating the first column includes identifying a first subset of rows as a proper subset of the plurality of rows based on the index data of the probabilistic indexing scheme for the first column; and/or identifying a second subset of rows as a proper subset of the first subset of rows based on identifying ones of a first subset of the plurality of column values corresponding to the first subset of rows that compare favorably to the query predicate. A number of rows included in a set difference between the first subset of rows and the second subset of rows can be based on the selected false-positive tuning parameter.

FIGS. 38A-38I present embodiments of a database system 10 operable to index data based on one or more special indexing conditions 3817. For example, in addition to indexing data under "normal" conditions (e.g. indexing by their non-null values), additional indexing conditions can be applied to further index data (e.g. indexing null values, indexing empty arrays, indexing arrays containing null values, etc.). This can be useful in generating and applying IO pipelines 2835 for query expressions requiring rows having these special conditions be included and/or reflected in a query resultant, and/or requiring these rows having these special conditions be filtered out (e.g. when a negation is applied rendering use of a set difference against a full set of rows). In particular, index elements can be utilized as described previously to identify rows having these special conditions without sourcing the data and reading the row values in a same or similar fashion as applying index elements in IO pipelines discussed previously. IO pipelines can be generated to include index elements for special conditions based on determining types of rows that need identified for inclusion and/or filtering by applying set logic rules to the query predicate and/or operators in the query expression.

Such functionality can improve the technology of database systems by improving the efficiency of query executions. In particular, fewer rows need be read via source elements in executing queries when identifying rows having special conditions for inclusion and/or filtering in generating the query resultant, based on generating and utilizing corresponding index data for these special conditions.

Such functionality can be applied at a massive scale, where a massive number of rows are processed and indexed via one or more special index conditions, and/or where index data is applied to identify a massive number of rows, or a subset of a massive number of rows, in executing queries. Some or all functionality described herein with regards to generating index data for special conditions, or utilizing index data for special conditions in query execution, cannot practically be performed by the human mind.

FIG. 38A illustrates an embodiment of a database system 10 that implements an indexing module 3810. The indexing module 3810 can be implemented via at least one processor and/or at least one memory of the database system 10 to generate index data for a dataset 2502 of records 2422. The index data 3820 can be stored via a storage system 3830 in conjunction with storage of the dataset 2502, where the index data 3820 and/or records 2422 themselves can be accessed in query executions via a query execution module 2504 as discussed previously. Some or all features and/or functionality of the database system 10 of FIG. 38A can implement the database system 10 of FIG. 25A and/or any other embodiment of database system 10 described herein. Some or all features and/or functionality index generation, index storage, and/or query execution of FIG. 38A can any other embodiment of index generation, index storage, and/or query execution described herein.

The indexing module 3810 can be implemented as a segment indexing module 2510 of a segment generator module 2506. In such embodiments, the storage system 3830 can be implemented as segment storage system 2508, where the index data 3810 generated for different segments are stored in conjunction with storage of corresponding segments as discussed previously. Such an embodiment is discussed in further detail in conjunction with FIG. 38B. In other embodiments, the indexing module 3810 can be otherwise implemented to generate index data for storage in conjunction with row data of a data set stored in any structure, and/or the storage system 3830 can otherwise be implemented via any one or more memories operable to store the index data 3810 and/or the records 2422 of a corresponding dataset 2502.

The index data 3820 can be generated and stored in conjunction with a probabilistic index structure, such as a probabilistic index structure 3020 and/or a non-probabilistic index structure. When the index data 3820 is generated and stored in conjunction with a probabilistic index structure, the index data can indicate proper supersets of rows satisfying each of a set of index values and/or conditions as discussed in conjunction with some or all of 30A-37C, where false positive rows identified by index elements need be filtered out via sourcing of rows and applying a filtering element, for example, where corresponding IO pipelines implement one or more probabilistic index-based IO constructs 3010 as described previously. When the index data 3820 is generated and stored in conjunction with a non-probabilistic index structure, the index data can indicate exactly the set of rows satisfying each of a set of index values and/or conditions as discussed in conjunction with some or all of 30A-37C, where false positive rows identified by index elements need not be filtered out via sourcing of rows and applying a filtering element in some or all cases.

In some embodiments, some or all of the index data 3820 is implemented via an inverted index structure. In some embodiments, some or all of the index data 3820 is implemented via a substring-based index structure 3570 of FIGS. 35A-35D. In some embodiments, some or all of the index data 3820 is implemented via a suffix-based index structure 3760 of FIGS. 36A-36D. In some embodiments, some or all of the index data 3820 is implemented as secondary index data 2545 of some or all of FIGS. 25A-27D. The index data 3820 can be in accordance with any other type of index structure described herein, and/or any other index structure utilized to index data in database systems.

Index data 3820 can be implemented to index one or more different columns 3023 as discussed previously. Different columns can be indexed via the same or different type of index structure. Index data 3820 can be implemented to index one or more different segments 2424 as discussed previously. One more columns of records stored in different segments can be indexed via the same or different type of index structures for different segments as discussed in conjunction with FIGS. 25A-27D.

Generating the index data 3820 for some or all columns and/or for some or all segments can include generating value-based index data 3822, and special index data 3824.1-3824.F for a set of F different special indexing conditions 3817.1-3817.F of a special indexing condition set 3815.

The value-based index data 3822 can correspond to a mapping of non-null values to rows in accordance with a probabilistic or non-probabilistic structure. For example, the mapping is based on actual and/or hashed values of a set of all non-null values for a given column, where a set of rows having a given actual and/or hashed value are identified as being mapped to the given actual and/or hashed value in the mapping.

The special index data 3824 can correspond to additional mapping of special conditions to rows having these special conditions in accordance with a probabilistic or non-probabilistic structure. For example, a set of rows having a given special condition are identified as being mapped to the given special condition in the mapping. Generating the special index data 3824 for a given special indexing condition and a given column 3023 can include identifying which ones of the set of records 2422 of the dataset 2502 satisfy the special indexing condition, where all rows satisfying the special indexing condition are mapped to the special indexing condition in the corresponding index data 3824. In some embodiments, a probabilistic structure can be applied to these special conditions, where multiple different special conditions are hashed to a same value in the mapping. Alternatively, a non-probabilistic index structure is applied to these special conditions, where only rows satisfying the special indexing condition are mapped to the special indexing condition in the corresponding index data 3824, guaranteeing that exactly the set of rows satisfying the special indexing condition are mapped to the special indexing condition.

In some embodiments, some or all index data 3824 is stored in accordance with a different index structure from the value-based index data 3822 and/or from other index data 3824, for example, in accordance with a same or different type of indexing scheme from the value-based index data 3822 and/or from other index data 3824.

Alternatively, the index data 3820 is stored via a single indexing structure, such as an inverted index structure. For example, a set of index values, such as index values 3043, are utilized to identify each of a set of non-null values mapped to corresponding ones of the set of rows, and additional index values unique from this set of index values are utilized to identify each of the set of special indexing conditions 3817 mapped to corresponding ones of the set of rows. As a particular example, the index values 3043 utilized to identify each of the set of special indexing conditions 3817 are guaranteed to fall outside a set of hash values to which non-null values can be hashed to in value-based index data 3822 and/or the index values 3043 utilized to identify each of the set of special indexing conditions 3817 otherwise are unique from index values 3043 corresponding to non-values. Alternatively, the index values 3043 utilized to identify each of the set of special indexing conditions 3817 are not guaranteed to be unique from index values 3043 corresponding to non-values based on the corresponding indexing structure of index data 3820 being a probabilistic indexing structure, where further sourcing and filtering is necessary to differentiate rows having the special indexing conditions 3817 vs. non-null values mapped to the given index value 3043 as discussed in conjunction with some or all of FIGS. 30A-37D.

The special indexing condition set 3815 utilized to determine the number and types of the set of special index data 3824.1-3824.F that be generated can be the same or different for different columns 3023 of the dataset 2502. For example, a first column 3023 can be indexed via a first set of special index conditions 3815 to render a first set of index special index data 3824.1-3824.F1, and a second column 3023 can be indexed via a second set of special index conditions 3815 to render a second set of index special index data 3824.1-3824.F2, where the first set of special index conditions 3815 and the second set of special index conditions have a non-null set difference, and/or where number of conditions F1 and F2 in the first and second set of special index conditions are different.

As a particular example, a first column can include array structures as discussed in further detail in conjunction with FIG. 38E, and includes a special index data 3824 for three special indexing conditions 3817 including: a first condition corresponding equality with the null value, a second condition corresponding to equality with an empty array containing no elements, and a third condition corresponding to including at least one array element of the array with a value equal to the null value, based on storing array structures where this second condition and third condition are applicable. A second column includes fixed length values or variable length values not included in an array structure (e.g. integers, strings, etc.), and includes a special index data 3824 for only the first condition corresponding to equality with a null value, based on not storing array structures, where the second condition and third condition are thus not applicable.

The special indexing condition set 3815 utilized to determine the number and types of the set of special index data 3824.1-3824.F that be generated for a given column 3023 can be the same or different for different segments 2424 generated for the dataset 2502. For example, a full set of special indexing condition types can be indicated in the secondary indexing scheme option data 2531 and/or a given special indexing condition set 3815 for a given segment is selected in generating secondary indexing scheme selection data 2532 for the given segment. For example, a first segment 2424 can have a given column indexed via a first set of special index conditions 3815 to render a first set of index special index data 3824.1-3824.F1, and a second segment 2424 can have the given column 3023 indexed via a second set of special index conditions 3815 to render a second set of index special index data 3824.1-3824.F2, where the first set of special index conditions 3815 and the second set of special index conditions have a non-null set difference, and/or where number of conditions F1 and F2 in the first and second set of special index conditions are different.

As a particular example, the row data clustering module 2507 sorts groupings of rows having particular special conditions (e.g. rows with a null value for a given column, rows with empty arrays for a given column, rows having arrays for a given column containing null values, etc.,) into different segments. In some embodiments, only segments with rows having the given special condition for the given column have index data generated for the given special condition for the given column based on including rows where this special condition applies. In some embodiments, other segments can optionally have index generated for these special conditions indicating that none of its rows satisfy the special condition for the given column.

FIG. 38B illustrates an embodiment of generating special index data 3824 included in secondary index data 2545 for different segments 2424, for example, via some or all features and/or functionality discussed in conjunction with FIG. 25A. Some or all features and/or functionality of the database system 10 of FIG. 38B can implement the database system 10 of FIG. 38A, of FIG. 25A, and/or any other embodiment of database system 10 described herein.

FIG. 38C illustrates an embodiment of indexing module 3810 that generates missing data-based indexing data 3824.1-3824.G based on the special index condition set 3815 indicating a corresponding missing data-based condition set 3835. Some or all features and/or functionality of the indexing module 3810 of FIG. 38C can implement the indexing module 3810 of FIG. 38A and/or any embodiment of database system 10 described herein.

The missing data-based condition set 3835 can be implemented as some or all of the special index condition set 3815, where all special indexing conditions 3815 correspond to missing data-based conditions 3837 of the missing data-based condition set 3835, and/or where some special indexing conditions 3815 correspond to additional special indexing conditions that are not missing data-based conditions 3837, such as other user-defined conditions, administrator-defined conditions, and/or automatically selected conditions not related to missing data, but useful in optimizing query execution, for example, based on these conditions arising frequently in dataset and/or query expressions against the dataset (e.g. indexing arrays meeting the condition of having all of its elements equal to the same value, regardless of what this same value is)

Each missing data-based conditions 3837 can correspond to a type of condition for a given row, such as a given column of a given row, that is based on some form of missing data. For example, values of columns meeting one of the set of missing data-based condition set 3835 can correspond to columns having missing and/or undefined values.

In some embodiments, one missing data-based condition 3837 can correspond to a null value condition. The null value condition can be applied to a one or more given columns 3023 being indexed. The null value condition can be satisfied for a given column for rows having a value of NULL for the given column, and/or based on a non-null value for the given column never having been supplied and/or being missing for the corresponding row.

Alternatively or in addition, one missing data-based condition 3837 can correspond to an empty array condition. The empty array condition can be applied to a one or more given columns 3023 being indexed. The empty array condition can be satisfied for a given column for rows having an empty array (e.g. [ ]) as the value for the given column, and/or based on elements of a corresponding array never having been supplied and/or being missing for the given column of the corresponding row. The empty array condition can be distinct from the null value condition, where, for a given column, no row can satisfy both the empty array condition and the null value condition (e.g. a given column value for a given row cannot have a value of [ ] because it has the value of NULL, or vice versa).

Alternatively or in addition, one missing data-based condition 3837 can correspond to a null-inclusive array condition. The null-inclusive array condition can be applied to one or more given columns 3023 being indexed. The null-inclusive array condition can be satisfied for a given column for rows having an array where one or more of its array elements are null values (e.g. [ . . . , NULL, . . . ]), and/or based on one or more elements of a corresponding array never having been supplied with non-null elements and/or being missing for the given column of the corresponding row. In particular, the null-inclusive array condition can be implemented via an existential quantifier applied to sets of elements of array structures of a given column, requiring equality with the null value (e.g. index rows where the statement for_some(array element)=null is true to the given column). The null-inclusive array condition can be distinct from both the empty array condition and the null value condition, where, for a given column: no row can satisfy both the null-inclusive array condition and empty array condition (e.g. a given column value for a given row cannot have a value of [ ] because it is non-empty array having one or more NULL-valued elements, or vice versa); and/or no row can satisfy both the null-inclusive array condition and empty array condition (e.g. e.g. a given column value for a given row cannot have a value of NULL because it is non-empty array having one or more NULL-valued elements, or vice versa)

Alternatively or in addition, one or more missing data-based condition 3837 can correspond to a different type of missing data-based condition 3837 corresponding to any other type of condition where a data value for a corresponding one or more columns 3023 is unknown, null, empty, not supplied, intentionally left blank, or otherwise missing. For example, another missing data-based condition 3837 corresponds to a universal quantifier condition applied to array structures for equality with the null value, where rows having all elements of corresponding arrays equal to the null value are indexed accordingly (e.g. index rows where the statement for_all(array element) null is true to the given column). As discussed in further detail herein, a row having a column value meeting a missing data-based condition 3837 can still have data/meaning associated with this column value.

In some embodiments, some or all missing data-based condition 3837 can be distinct conditions, where, for a given column or given set of columns of the corresponding index structure, no given row can satisfy more than one missing data-based condition 3837. In some embodiments, some or all special indexing conditions 3817 can be distinct conditions, where, for a given column or given set of columns of the corresponding index structure, no given row can satisfy more than one special indexing conditions 3817.

Alternatively, in other embodiments, two or more missing data-based condition 3837 can optionally be satisfied by a given row, where the given row is indexed a given column or given set of columns of a corresponding index structure for multiple ones of the missing data-based conditions 3837. Alternatively or in addition, two or more special indexing conditions 3817 can optionally be satisfied by a given row, where the given row is indexed a given column or given set of columns of a corresponding index structure for multiple ones of the special indexing conditions 3817.

In some embodiments, some or all missing data-based condition 3837 can be distinct conditions from the value-based indexing of value-based index data 3822, where, for a given column or given set of columns of the corresponding index structure, no given row can satisfy both a missing data-based condition 3837 and be indexed for a given actual and/or hashed value in value-based index data 3822. This can apply to the null value condition and/or the empty array condition, as given column values that are either null or empty arrays have no non-null value, and are thus not mapped to non-null values for the given column in the value-based index data 3822.

Alternatively or in addition, some rows can satisfy both a missing data-based condition 3837 and be mapped to a value in value-based index data 3822 for a given column. This can apply to the null-inclusive array condition, for example, where a given row has a column value of the given column that is an array having one array element with a null value, rendering mapping of the given row to the null-inclusive array condition in the index data for the given column, and where this array for the given column has another element with a non-null value, rendering mapping of the given row to this given non-value in for the given column.

In some embodiments, the missing data-based condition set 3835 fully encompass all possible states a given column value that a given column can have, in addition to the non-null values of the value-based index data 3822, where a given row is guaranteed to be mapped to exactly one, or at least one, index value of the index data 3820 based on being guaranteed to either have having a non-null value mapped in an index value in value-based index data 3822 or to have a value with missing data met by one of the missing data-based conditions 3837 of the missing data-based condition set 3835.

FIG. 38D presents an example embodiment of generating index data via an indexing module 3810 for some or all columns of a dataset 2502 containing a set of X rows a, b, c, d, . . . X having a set of columns 1-Y. Some or all features and/or functionality of the indexing module 3810 and/or index data 3820 of FIG. 38D can be utilized to implement the indexing module 3810 and/or index data 3820 of FIG. 38A, and/or any embodiment of database system 10 described herein.

In this example, at least columns 1, 2, and Y are populated by column values 3024 that are integer values for some or all rows, for example, based on these columns having an integer data type. However, some column values for at least columns 1, 2, and Y have values 3024 corresponding to null value 3852 for the corresponding row (e.g. NULL, or another defined and/or special "value" denoting the corresponding data is missing, unknown, undefined, was never supplied, etc.). In some embodiments, if a column is not supplied with a non-null value (e.g. is not supplied with an integer value or other value of the corresponding data type), its value is automatically set as and/or designated as the null value 3852.

The indexing module 3810 can generate index data 3820 based on a missing data-based condition set 3835 denoting a null value condition 3842, such as the null value condition discussed in conjunction with FIG. 38C. Other missing data-based conditions 3837 may not be relevant for some or all columns, for example, based on the columns containing integer values or other simple data types rather than more complex datatypes such as arrays.

Value-based index data 3822.1 of the index data 3820.1 of column 1 maps a set of rows to each non-null column value (or a hashed value for column values, for example, where the index data is in accordance with a probabilistic index structure), In particular, each non-null column value corresponds to one of a plurality of different index values 3043 of the value-based index data 3822.1, for example, which can be probed by corresponding index elements in IO pipelines to render the corresponding row identifier sets 3044 indicating ones of the plurality of rows mapped to these index values 3043 as discussed previously.

Furthermore, an additional index value 3843 can correspond to the null value condition 3842, and is mapped to all rows in the set of rows having the null value 3852 for column 1 (in this example, at least row X), as null value index data 3863 for the null value condition 3842, where the special index data 3824 for column 1 corresponds to this null value index data 3863. For example, this index value 3843 of the column 1 index data 3820.1 can be probed by corresponding index elements in IO pipelines to render the corresponding row identifier set 3044 indicating ones of the plurality of rows mapped to this index values 3843 to identify ones of the plurality of rows satisfying the null value condition 3842 for column 1.

Such value-based index data 3822 and special index data 3824 can be generated for some or all additional columns, such as column 2 as illustrated in FIG. 38E. In this example, the additional index value 3843 in the index data 3820.2 for column 2 is mapped to all rows in the set of rows having the null value 3852 for column 2, which includes at least row a and row b, as these rows have the null value 3852 as the value 3024 of column 2.

FIG. 38E illustrates an embodiment of a dataset 2502 having one or more columns 3023 implemented as array fields 2712. Some or all features and/or functionality of the dataset 2502 of FIG. 38E can be utilized to implement the dataset 2502 of FIG. 38A, FIG. 38D, and/or any embodiment of dataset received, stored, and processed via the database system 10 as described herein.

Columns 3023 implemented as array fields 2712 can include array structures 2718 as values 3024 for some or all rows. A given array structure 2718 can have a set of elements 2709.1-2709.M. The value of M can be fixed for a given array field 2712, or can be different for different array structures 2718 of a given array field 2712. In embodiments where the number of elements is fixed, different array fields 2712 can have different fixed numbers of array elements 2709, for example, where a first array field 2712.A has array structures having M elements, and where a second array field 2712.B has array structures having N elements.

Note that a given array structure 2718 of a given array field can optionally have zero elements, where such array structures are considered as empty arrays satisfying the empty array condition. An empty array structure 2718 is distinct from a null value 3852, as it is a defined structure as an array 2718, despite not being populated with any values.

For example, consider an example where an array field for rows corresponding to people is implemented to note a list of spouse names for all marriages of each person. An empty array for this array field for a first given row denotes a first corresponding person was never married, while a null value for this array field for a second given row denotes that it is unknown as to whether the second corresponding person was ever married, or who they were married to.

Array elements 2709 of a given array structure can have the same or different data type. In some embodiments, data types of array elements 2709 can be fixed for a given array field (e.g. all array elements 2709 of all array structures 2718 of array field 2712.A are string values, and all array elements 2709 of all array structures 2718 of array field 2712.B are integer values). In other embodiments, data types of array elements 2709 can be different for a given array field and/or a given array structure.

Some array structures 2718 that are non-empty can have one or more array elements having the null value 3852, where the corresponding value 3024 thus meets the null-inclusive array condition. This is distinct from the null value condition 3842, as the value 3024 itself is not null, but is instead an array structure 2718 having some or all of its array elements 2709 with values of null. Continuing example where an array field for rows corresponding to people is implemented to note a list of spouse names for all marriages of each person, a null value for this array field for the second given row denotes that it is unknown as to whether the second corresponding person was ever married or who they were married to, while a null value within an array structure for a third given row denotes that the name of the spouse for a corresponding one of a set of marriages of the person is unknown.

Some array structures 2718 that are non-empty can have all non-null values for its array elements 2709, where all corresponding array elements 2709 were populated and/or defined. Some array structures 2718 that are non-empty can have values for some of its array elements 2709 that are null, and values for others of its array elements 2709 that are non-null values.

Some array structures 2718 that are non-empty can have values for all of its array elements 2709 that are null. This is still distinct from the case where the value 3024 denotes a value of null with no array structure 2718. Continuing example where an array field for rows corresponding to people is implemented to note a list of spouse names for all marriages of each person, a null value for this array field for the second given row denotes that it is unknown as to whether the second corresponding person was ever married, how many times they were married or who they were married to, while the array structure for the third given row denotes a set of three null values and non-null values, denoting that the person was married three times, but the names of the spouses for all three marriages are unknown.

FIG. 38F presents an example embodiment of generating index data via an indexing module 3810 for a given column 3023.A of a dataset 2502 implemented as an array field 2712.A Some or all features and/or functionality of the indexing module 3810 and/or index data 3820 of FIG. 38F can be utilized to implement the indexing module 3810 and/or index data 3820 of FIG. 38A, FIG. 38D, and/or any embodiment of database system 10 described herein.

The indexing module can generate value-based index data 3822 to map rows to index values 3043 denoting rows having array structures 2718 for the given column 3023 that contain a corresponding non-null value. In some embodiments, the value-based index data 3822 can be implemented as probabilistic index data (e.g. values of elements 2709 are hashed to a hash value implemented as index value 3043, where a given index value 3043 indicates a set of rows with array structures that include a given value hashed to index value 3043, and possibly rows with array structures that instead include another given value that also hashes to this index value 3043, and would possibly require filtering as false positive rows in query execution). The value-based index data 3822 can be implemented as non-probabilistic data in other embodiments, where a given value-based index value 3043 is mapped to all rows having array structures 2718 for the given column 3023 that contain a corresponding value, and is further mapped to only rows having array structures 2718 for the given column 3023 that contain the corresponding value.

In some embodiments, unlike the value-based index data 3822 of the example of FIG. 38D where rows are mapped to index values 3043 based on their column value 3024 for the given column having equality with a corresponding value, value-based index data 3822 for some or all array fields 2712 can be generated where rows are mapped to index values 3043 based on their column value 3024 for the given column being an array structure containing the corresponding value as one of its elements, even if the given array structure also contains other values. Thus, while the index data 3822 of the example of FIG. 38D reflects an equality condition applied to the corresponding column based on the columns being implemented to contain a single value (e.g. index rows for a given value when col==value or hash(col)==val is true), the index data 3822 of FIG. 38F reflects an existential qualifier condition applied to sets of elements included in array structures of the corresponding column (e.g. index rows for a given value when for_some(col)==value or for_some(hash(col))==val is true). This structure can be leveraged to simplify the IO pipeline for queries having query predicates indicating existential qualifier condition applied to sets of elements included in array structures, as discussed in further detail in conjunction with FIG. 40B.

Furthermore, in embodiments where the value-based index data 3822 for some or all array fields 2712 is generated by mapping rows to index values 3043 based on their column value 3024 for the given column being an array structure containing the corresponding value as one of its elements, a given row can be mapped to multiple different index values 3043 for the given column due to having an array structure containing multiple different elements. In this example, row A is mapped to index value 3043.A.2 and 3043.A.3 due to containing value 13 as one of its elements and value 332 as another one of its elements.

The missing data-based condition set 3835 applied to some or all columns implemented as array fields 2712 can include the null value condition 3842, as well as an empty array condition 3844, such as the empty array condition discussed in conjunction with FIG. 38C, and/or a null-inclusive array condition 3846, such as the null-inclusive array condition discussed in conjunction with FIG. 38C. In this example, additional index values 3843, 3845, and 3847 correspond to the null value condition 3842, the empty array condition 3844, and the null-inclusive array condition 3846, respectively, and each are mapped to rows meeting the corresponding condition for the corresponding array field 2712.A as null value index data 3863, empty array index data 3865, and null-inclusive array index data 3867 implementing special index data 3824 for each condition for the given column.

In particular, index value 3843 maps to a row identifier set 3044 indicating at least row c due to row c having a value 3024 for the array field 2712 equal to the null value 3852, and thus satisfying the null value condition 3842. Index value 3845 maps to a row identifier set 3044 indicating at least row b due to row b having a value 3024 for the array field 2712 equal to the empty array 3854 having zero elements 2709, and thus satisfying the empty array condition 3844. Index value 3847 maps to a row identifier set 3044 indicating at least row a and row X due to rows a and X having a value 3024 for the array field 2712 equal to an array structure 2718 including a set of elements 2709 that includes the null value 3852 as at least one of its elements, and thus satisfying the null-inclusive array condition 3846.

Note that the row identifier set 3044 for index value 3843 does not include row a or row X despite their values including null value 3852, as these null values are elements 2709 of a corresponding array structure 2718, rather than the value of the array structure 2718 as a whole, as required to meet the null value condition 3842. Similarly, the row identifier set 3044 for index value 3847 does not include row c despite row c having hull value 3852, as null value 3852 of row c is the value for the column value 3024, and thus the column value 3024 does not include any array structure containing any elements 2907, as required to meet the null-inclusive array condition 3846.

Note that the row identifier set 3044 for index value 3843 also does not include row b, as the corresponding value 3024 is the empty array 3854, which is different from the null value 3852 required to meet the null value condition 3842. Similarly, the row identifier set 3044 for index value 3845 does not include row c, as the corresponding value 3024 is the null value 3852, which is different from the empty array 3854 required to meet the empty array condition 3844.

Note that the row identifier set 3044 for index value 3845 does not include row a or row X, as rows have non-empty array structure 2718 despite containing null valued elements, rather than being empty with zero elements 2709, as required to meet the empty array condition 3844. Similarly, that the row identifier set 3044 for index value 3847 does not include row b, rows b is empty with no elements, and thus does not containing null valued elements, as required to meet the empty array condition 3846.

In particular, as discussed previously, the null value condition 3842, the empty array condition 3844, and the null-inclusive condition 3846 implemented as the missing data-based conditions 3837.1-3837.3 of the missing data-based condition set 3835 are distinct conditions, where their corresponding row identifier sets 3044 of the respective null value index data 3863, the empty array index data 3865, and the null-inclusive array index data 3867 are guaranteed to be mutually exclusive sets of rows.

The row identifier sets 3044 of the null value index data 3863, the empty array index data 3865, and the value based index data 3822 can also be guaranteed to be mutually exclusive sets of rows. The row identifier sets 3044 of all of the value-based index data 3822, the null value index data 3863, the empty array index data 3865, and the null-inclusive array index data 3867, can be guaranteed to be collectively exhaustive with respect to the set of rows 1-X.

Some or all rows in the row identifier set 3044 of null-inclusive array index data 3867 can have a non-null intersection with rows included in a union of row identifier sets 3044 of value-based index data 3822 based on some rows in row identifier set 3044 of value-based index data 3822 having array structures containing some non-null elements and also some null elements. A set difference between rows in the row identifier set 3044 of null-inclusive array index data 3867 and rows included in a union of row identifier sets 3044 of value-based index data 3822 can be non-null, for example, based on some rows in row identifier set 3044 of value-based index data 3822 having array structures containing only non-null elements, and/or based on some rows in row identifier set 3044 of null-inclusive array index data 3867 having array structures containing only null elements.

Note that despite the index values 3043 of value-based index data 3822 being mapped based on satisfying an existential quantifier condition applied to the set of elements of column values 3024, index values 3843 and 3845 are further unique based on instead being mapped based on satisfying an equality condition applied to the column value 3024 as a whole (e.g. these conditions column value 3024 must be equal to the null value 3852 or the empty set 3854, rather than these conditions requiring the column value 3024 have one or more of its set of elements 2709 meeting a condition). Index value 3847 can be considered as most similar to the index values 3043 of value-based index data 3822 based on its condition also corresponding to an existential quantifier condition applied to the set of elements of column values 3024 (e.g. the array must contain a value equal to null, rather than another non-null value denoted by another index value 3043). Despite these differences in tests for equality conditions vs. existential quantifier condition, all index values can optionally be mapped to rows within a same index structure for the given column and/or can be probed via index elements in an identical fashion.

FIG. 38G illustrates an example embodiment of an IO pipeline generator module 2834 of a query processing system 2802 that generates an IO pipeline 2835 for an operator execution flow 2817 containing predicates 2822. Some or all features and/or functionality of the query processing system 2802, IO pipeline generator module 2834, and/or IO pipeline 2835 of FIG. 38G can be utilized to implement any embodiment of the query processing system 2802, IO pipeline generator module 2834, and/or IO pipeline 2835 discussed herein. The IO pipeline 2835 of FIG. 38G can be implemented via the query execution module 2504 of FIG. 38A, for example, applied to index data 3820 having some or all features and/or functionality described in conjunction with FIGS. 38A-38F. The IO pipeline 2835 of FIG. 38G can be implemented via any other embodiment of query execution module 2504 described herein in a same or similar fashion as discussed in conjunction with FIGS. 28C, 29A, and/or some or all of FIGS. 30A-37D.

A given operator execution flow 2817 can include one or more query predicates 2822. For example, the operator execution flow 2817 is generated by a query processing system to push some or all predicates of a given query expression to the IO level for implementation at the IO level as discussed previously.

An IO pipeline 2835 generated for a given operator execution flow 2817 can optionally contain one or more index elements 3862 applied serially or in parallel. These index elements 3862 can be based on column identifiers 3041 denoting the column for the corresponding index data, and index probe parameter data 3042 indicating the index value to be probed. These index elements 3862 can be implemented in a same or similar fashion as IO operators of FIGS. 28C and/or 29A having types sourcing index structures for the corresponding column denoted by column identifier 3041. Alternatively or in addition, these index elements 3862 can be implemented in a same or similar fashion as probabilistic index elements 3012 of FIGS. 30B and/or any other probabilistic index element 3012 described herein. However, the corresponding index structure can be probabilistic or non-probabilistic as discussed previously. Alternatively or in addition, these index elements 3862 can be implemented in a same or similar fashion as index elements 3512 of FIG. 35A and/or any other index element 3512 described herein. However, the corresponding index structure can be a substring-based index structure 3570.A, or any other type of index structure described herein.

One or more index elements 3862 can have index probe parameter data 3042 indicating a non-null value 3863 denoted by given filter parameters 3048. For example, the non-null value 3863 is denoted in filter parameters 3048, where the corresponding predicates 2833 indicate identification of rows having values, for the given column 3041, satisfying: equality with the non-null value 3863; inequality with the non-null value 3863, being greater than or less than the non-null value 3863; containing the non-null value 3863 as a substring; being a substring of the non-null value 3863; having at least one of its set of array elements being equal to the non-null value 3863; having at least one of its set of array elements being unequal to the non-null value 3863, having at least one of its set of array elements being greater than or less than the non-null value 3863; having at least one of its set of array elements containing the non-null value 3863 as a substring; having at least one of its set of array elements set of array elements being a substring of the non-null value 3863; having all of its set of array elements being equal to the non-null value 3863; having all of its set of array elements being unequal to the non-null value 3863, having all of its set of array elements being greater than or less than the non-null value 3863; having all of its set of array elements containing the non-null value 3863 as a substring; having all its set of array elements set of array elements being a substring of the non-null value 3863; and/or other requirements based on and/or involving the non-null value 3863.

When executed via a query execution module 2504, these index elements 3862 can identify sets of rows that are guaranteed to include all rows satisfying this given condition involving the non-null value 3863, for example, when combined with other index elements and/or with other operators (e.g. intersection, union, set difference, source elements, filtering operators, etc.) to apply the query predicate 2822 at the IO level. The need for some or all source elements and/or filtering operators can be based on the corresponding index being implemented as a probabilistic index structure as discussed previously in conjunction with some or all of FIGS. 30A-37D.

In some cases, source elements and/or filtering operators are not necessary due to the corresponding index being implemented as a non-probabilistic index structure. In some cases, source elements and/or filtering operators are still necessary despite the corresponding index being implemented as a non-probabilistic index structure, due to set logic applied to the predicates 2822 and/or the nature of the corresponding index structure.

In some embodiments, the IO pipeline 2835 can further include one or more additional index elements 3862 can have index probe parameter data 3042 indicating a special indexing condition 3817. For example, the need for these one or more additional index elements 3862 to identify rows satisfying the special indexing condition 3817 is required, in combination with the index elements 3862 involving the one or more non-null values and/or other operators (e.g. intersection, union, set difference, source elements, filtering operators, etc.) to appropriately apply the query predicate 2822 at the IO level to render the correct result.

Different types of predicates for different queries may require utilizing different additional index elements 3862, where some special conditions are relevant to the execution of the given query and other special conditions are not relevant, for example, based on types of operators in its predicate 2822 and/or based on applying corresponding set logic. Some types of predicates for some queries may not require any of these additional index elements 3862, where rows having special conditions are not relevant to the execution of the given query, for example, based on types of operators in its predicate 2822 and/or based on applying corresponding set logic.

Generating the IO pipeline 2835, and/or determining whether one or more such additional index elements 3862 for one or more different special indexing conditions 3817 of the special indexing condition set 3815 be applied, can be based on selecting a subset of special indexing conditions 3817 of the special indexing condition set 3815, and including an index element 3862 for each selected special indexing conditions 3817 in this subset to be applied in executing the corresponding IO pipeline 2835.

For some types of query predicates 2822, this subset of special indexing conditions 3817 of the special indexing condition set 3815 can include: all of the special indexing conditions 3817 of the special indexing condition set 3815. For other types of query predicates 2822, this subset of special indexing conditions 3817 of the special indexing condition set 3815 can include none of the special indexing conditions 3817 of the special indexing condition set 3815, where only index elements 2835 for non-null values 3863 of the query predicates 2822 are applied. For other types of query predicates 2822, this subset of special indexing conditions 3817 of the special indexing condition set 3815 can include a proper subset of the special indexing conditions 3817 of the special indexing condition set 3815, where index elements 2835 for only some of the special indexing conditions 3817 of the special indexing condition set 3815 are applied.

Selecting this subset of special indexing conditions 3817 of the special indexing condition set 3815 can be based on one or more operators of the given query, a serialized and/or parallelized set of operators to implement the query predicates 2822 in the operator execution flow 2817, a predetermined mapping of subsets of special indexing conditions 3817 for different types of query predicates 2822 and/or query operators 2822; known set logic rules; and/or another determination. Different query predicates 2822 for different queries can have different subsets of special indexing conditions 3817 with different numbers and/or types of special indexing conditions 3817 identified, where different sets of corresponding additional index elements 3862 are applied in different corresponding IO pipelines 2835 accordingly.

Selecting this subset of special indexing conditions 3817 of the special indexing condition set 3815 for a given query can be based on guaranteeing the correct query resultant and/or identification exactly the correct set of rows satisfying the query predicate (i.e. all rows that satisfy the query predicate and only rows that satisfy the query predicate), as correctness of the query resultant can be based on rows satisfying special indexing conditions 3817 rendering the query predicates 2822 true or false, and thus determining whether rows satisfying special indexing conditions 3817 should be included in, or be candidates for inclusion in, the corresponding output of rows satisfying the query predicates. In some embodiments, selecting this subset of special indexing conditions 3817 of the special indexing condition set 3815 can be based on identifying a subset of special indexing conditions 3817 that render the query predicates 2822 as true, for example, based on a predetermined mapping and/or applying known set logic rules, where the corresponding index elements are applied to ensure corresponding rows are identified as part of the set of rows identified as satisfying the query predicates 2822 in conjunction with executing the query. Alternatively or in addition, selecting this subset of special indexing conditions 3817 of the special indexing condition set 3815 can be based on identifying a subset of special indexing conditions 3817 that render the query predicates 2822 as false, for example, based on a predetermined mapping and/or applying known set logic rules, where the corresponding index elements are applied to ensure corresponding rows are identified as part of an intermediate set of rows identified as not satisfying the query predicates 2822 in conjunction with executing the query, where a set difference is applied to this intermediate set of rows and a full set of rows to which the query is applied to render a set of rows satisfying the query predicates 2822.

As a particular example, selecting the subset of special indexing conditions 3817 can further include selecting the null value condition 3842 when an inequality condition is applied and/or when a set difference is applied to apply a negation of a condition of filtering parameters, such as a negation of an equality condition, due to the null value condition 3842 not satisfying the inequality condition and/or other negated condition (e.g. null !=literal is false, and null values should not be identified), and being filtered via the set difference.

For example, an IO pipeline for a negated condition includes applying the negation via a set difference to filter out rows satisfying the condition (e.g. the negated query predicates) and to further filter out rows that satisfy neither the condition nor the negated condition (e.g. rows with values of null for the column) by applying an index element for the null value condition to filter out identified rows. Examples of IO pipelines 2835 that include such negated conditions are discussed in further detail in conjunction with FIGS. 39B, 39C, and 41B.

Alternatively or in addition, selecting the subset of special indexing conditions 3817 can further include not selecting the null value condition 3842 when a non-negated equality condition is applied, when another non-negated condition is applied, and/or when a set difference is not applied, due to the null value condition 3842 not satisfying the equality condition and/or other non-negated condition (e.g. null "literal" is false, and null values should not be identified). Examples of IO pipelines 2835 that include such non-negated conditions are discussed in further detail in conjunction with FIGS. 39A, 41A, 41C, and 41D.

The subset of special indexing conditions 3817 of the special indexing condition set 3815 can be applied via a set of corresponding index elements 3862 implemented in parallel, for example, via different nodes 37 and/or different processing resources independently and/or without coordination. This set of corresponding index elements 3862 can be further implemented in parallel with some or all index elements 3862 indicating non-null values 3863, for example, via different nodes 37 and/or different processing resources independently and/or without coordination.

The IO pipeline 2835 generated via IO pipeline generator module 2834 can be generated as the same IO pipeline 2835 or different IO pipeline 2835 for different segments 2424. For example, different IO pipelines 2835 are generated for different segments due to different segments having different index structures as discussed previously. In some embodiments, for a given query, an IO pipeline 2835 for a first segment includes at least one index element 3862 having index probe parameter data 3042 indicating a special indexing condition 3817, while an IO pipeline 2835 for a second segment does not includes any index element 3862 having index probe parameter data 3042 indicating the special indexing condition 3817, for example, based on the special indexing condition being indexed for rows of the first segment, but not for rows of the second segment.

FIG. 38H illustrates an example embodiment of an IO pipeline generator module 2834 of a query processing system 2802 that generates an IO pipeline 2835 for an operator execution flow 2817 containing predicates 2822 applied to a column implemented as an array field 2712. Some or all features and/or functionality of the query processing system 2802, IO pipeline generator module 2834, and/or IO pipeline 2835 of FIG. 38G can be utilized to implement the query processing system 2802, IO pipeline generator module 2834, and/or IO pipeline 2835 of FIG. 38G, and/or any other embodiment of the query processing system 2802, IO pipeline generator module 2834, and/or IO pipeline 2835 discussed herein.

Some queries can have predicates 2822 applied to an array field 2712. For example, their filter parameters 3048 can include one or more array operations 3857 that involve one or more non-null values 3863. The IO pipeline can apply these predicates 2822 accordingly based on implementing the array operations 3857. This can include applying one or more index elements 3862 indicating the column identifier 3041 denoting this array field 2712 to access the index data for this array field accordingly, such as index data discussed in conjunction with FIG. 38F. For example, at least one index element 3862 denotes the non-null value, and at least one additional index element 3862 denotes a special indexing condition 3817. For example, a subset of special indexing conditions 3817 of the special indexing condition set 3815 are selected based on the query predicate 2822 as discussed in conjunction with FIG. 38G, where the subset of special indexing conditions 3817 are selected based on the array operations 3857 and/or set logic rules for the array operations 3857, such as which types of special indexing conditions 3817 render the array operations 3857 as being true or false.

In some embodiments, the array operations 3857 can include a universal quantifier applied to the set of elements of array structures of the array field 2717. For example, the filter parameters 3048 indicate identification of rows having values, for array structures of the given column 3041, satisfying: having all of its set of array elements being equal to the non-null value 3863; having all of its set of array elements being unequal to the non-null value 3863, having all of its set of array elements being greater than or less than the non-null value 3863; having all of its set of array elements containing the non-null value 3863 as a substring; having all its set of array elements set of array elements being a substring of the non-null value 3863; and/or having all of its set of array elements meeting another defined condition, which can optionally include one or more complex predicates, at least one conjunction, at least one disjunction, a nested quantifier, or other condition.

As used herein, a "for_all(A) [condition]" function can be implemented as an array operation 3857 implemented to perform a universal quantifier for array elements of array structures of a given column "A" meeting the specified condition, and/or where rows satisfying the "for_all(A) [condition] correspond to all rows, and to only rows, with corresponding values 3024 for the given column A having all of its elements meeting the given condition.

In some embodiments, the subset of special indexing conditions 3817 are selected to include the empty array condition 3844 based on the array operations 3857 including a universal quantifier. For example, the empty array condition 3844 is selected to identify rows satisfying the empty array condition 3844 for the given column due to rows satisfying the empty array condition 3844 for the given column satisfying the universal quantifier in accordance with set logic (e.g. as its contents are empty, all of its zero elements automatically satisfy the condition). The corresponding query resultant, and/or subsequent processing, can be applied to the identified rows of empty array condition 3844 accordingly. Alternatively or in addition, the null value condition 3842 does not satisfy the universal quantifier in accordance with set logic (e.g. the value is null and not an array) and/or the null-inclusive array condition 3846 does not satisfy the universal quantifier in accordance with set logic (e.g. the null values does not satisfy the condition involving the non-null value, and thus all elements do not satisfy the condition), where these conditions are not selected as corresponding sets of rows should not be identified as meeting the query predicates. For example, the subset of special indexing conditions 3817 is selected to include the empty array condition 3844, and to not include the null value condition 3842 nor the null-inclusive array condition 3846, based on the array operations 3857 including a universal quantifier, such as a non-negated universal quantifier. Example IO pipelines for query predicates that include universal quantifiers are discussed in further detail in conjunction with FIGS. 40A and 42B.

In some embodiments, the array operations 3857 can include an existential quantifier applied to the set of elements of array structures of the array field 2717. For example, the filter parameters 3048 indicate identification of rows having values, for array structures of the given column 3041, satisfying: having at least one of its set of array elements being equal to the non-null value 3863; having at least one of its set of array elements being unequal to the non-null value 3863, having at least one of its set of array elements being greater than or less than the non-null value 3863; having at least one of its set of array elements containing the non-null value 3863 as a substring; having at least one of its set of array elements set of array elements being a substring of the non-null value 3863; and/or having at least one of its set of array elements meeting another defined condition, which can optionally include one or more complex predicates, at least one conjunction, at least one disjunction, a nested quantifier, or other condition.

As used herein, a "for_some(A) [condition]" function can be implemented as an array operation 3857 implemented to perform an existential quantifier for array elements of array structures of a given column "A" meeting the specified condition, and/or where rows satisfying the "for_some(A) [condition] correspond to all rows, and to only rows, with corresponding values 3024 for the given column A having at least one of its elements meeting the given condition.

In some embodiments, the subset of special indexing conditions 3817 are selected based on the array operations 3857 including an existential quantifier. For example, none of the special indexing conditions 3817 are selected due to rows satisfying the existential quantifier for the given column. For example, the null value condition 3842 does not satisfy the existential quantifier in accordance with set logic (e.g. the value is null and not an array), the empty array condition 3844 does not satisfy the existential quantifier in accordance with set logic (e.g. the array is empty and thus does not include at least one value satisfying the condition), and/or the null-inclusive array condition 3846 does not satisfy the existential quantifier in accordance with set logic (e.g. the null values do not satisfy the condition involving the non-null value, and thus none of these elements are relevant in determining whether the array satisfies the condition, but these rows can still be identified via other index elements due to the array's non-null values satisfying the existential quantifier), where none of these three conditions are selected for use in index elements, as corresponding sets of rows should not be identified as meeting the query predicates. For example, the subset of special indexing conditions 3817 is selected to not include the null value condition 3842, the empty array condition 3844, nor the null-inclusive array condition 3846 based on the array operations 3857 including an existential quantifier, such as a non-negated existential quantifier. Example IO pipelines for query predicates that include existential quantifiers are discussed in further detail in conjunction with FIGS. 40B and 42C.

In some embodiments, the subset of special indexing conditions 3817 are selected based on the array operations 3857 including a negation of a universal quantifier for a condition. Set logic can be applied to determine this expression is equivalent to an existential quantifier for the negation of the condition, and can be treated as an existential quantifier accordingly. Thus, the null value condition 3842, the empty array condition 3844, and the null-inclusive array condition 3846 do not satisfy the existential quantifier for the negation of the condition. However, in cases where the IO pipeline applies the negation via a set difference, selecting the subset of special indexing conditions 3817 can therefore include selecting all of these special indexing conditions 3817 to ensure their corresponding rows are identified, and all of these rows not meeting the existential quantifier for the negation of the condition are filtered out in applying the set difference. For example, the subset of special indexing conditions 3817 is selected to include the null value condition 3842, the empty array condition 3844, and the null-inclusive array condition 3846 based on the array operations 3857 including a negation of a universal quantifier. Example IO pipelines for query predicates that include negations of universal quantifiers are discussed in further detail in conjunction with FIGS. 40C and 42D.

In some embodiments, the subset of special indexing conditions 3817 are selected based on the array operations 3857 including a negation of an existential quantifier for a condition. Set logic can be applied to determine this expression is equivalent to a universal quantifier for the negation of the condition, and can be treated as a universal quantifier accordingly. Thus, only the empty array condition 3844 satisfies the universal quantifier of the negated condition, while the null value condition 3842 and the null-inclusive array condition 3846 do not satisfy the universal quantifier of the negated condition. However, in cases where the IO pipeline applies the negation via a set difference, selecting the subset of special indexing conditions 3817 can therefore include selecting the null value condition 3842 and the null-inclusive array condition 3846 to ensure their corresponding rows are identified, and all of these rows not meeting the universal quantifier for the negation of the condition are filtered out in applying the set difference. Selecting the subset of special indexing conditions 3817 can further include not selecting the empty array condition 3844 in these cases as these rows should be included in the resulting set of rows after applying the set difference, and should thus not be identified for filtering via the set difference. For example, the subset of special indexing conditions 3817 is selected to include the null value condition 3842 and the null-inclusive array condition 3846, and to not include the empty array condition 3844, based on the array operations 3857 including a negation of an existential quantifier. Example IO pipelines for query predicates that include negations of existential quantifiers are discussed in further detail in conjunction with FIGS. 40D and 42E.

FIG. 38I illustrates an example embodiment of an IO operator execution module 2840 of a query processing system 2802 that executes an IO pipeline having index elements 3862, such as the IO pipeline of FIGS. 38G and/or 38H, based on accessing corresponding index data 3820 of one or more index structures 3859 storing the index data 3820 in storage system 3830, such as the storage system 3830 of FIG. 38A storing the index data 3820 having some or all features and/or functionality described in conjunction with FIGS. 38A-38F. Some or all features and/or functionality of the query processing system 2802 and/or IO operator execution module 2840 of FIG. 38I can be utilized to implement any embodiment of the query processing system 2802 and/or IO operator execution module discussed herein. The IO operator execution module of FIG. 38I can apply index elements 3862 to access index structures 3859 in a same or similar fashion as IO operator execution module of FIGS. 30F and/or 30G applying index elements 3012 to access probabilistic index structures 3020. The index structure 3859 can be implemented as an inverted index structure or another type of index structure.

One or more index elements 3862 having index probe parameter data 3042 indicating non-null values 3863 can be applied based on accessing corresponding value-based index data 3822. For example, the non-null value 3863 is utilized to access the index value 3043 in the index structure 3859 having this non-null value 3863, or being equal to the hash value when a hash function is applied to the non-null value 3863, and the corresponding row identifier set 3044.A mapped to the index value 3043 corresponding to this non-null value 3863 is retrieved accordingly and utilized in further operations by the IO operator execution module, or other operators utilized to execute the corresponding query.

One or more index elements 3862 having index probe parameter data 3042 indicating special indexing conditions 3817 can be similarly applied based on accessing corresponding special index data 3824. For example, the special indexing conditions 3817 is utilized to access the index value 3043 in the index structure 3859 having a corresponding index value 3043, such as index value 3843, 3845, and/or 3847 corresponding to the null value condition 3842, the empty array condition 3844, and/or the null-inclusive condition 3846. The corresponding row identifier set 3044.B mapped to the index value corresponding to this special indexing conditions 3817 is retrieved accordingly and utilized in further operations by the IO operator execution module, or other operators utilized to execute the corresponding query. For example, executing the query and generating the resultant is based on processing rows in one or more row identifier sets 3044.A accessed via index elements 3862 having index probe parameter data 3042 indicating non-null values 3863, and further based on processing rows in one or more row identifier sets 3044.B accessed via index elements 3862 having index probe parameter data 3042 indicating special indexing conditions 3817.

FIG. 38J illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 34D. In particular, a node 37 can utilize the query processing module 2435 to execute some or all of the steps of FIG. 38J, where multiple nodes 37 implement their own query processing modules 2435 to independently execute the steps of FIG. 38J, for example, to facilitate execution of a query as participants in a query execution plan 2405.

Some or all of the method of FIG. 38J can be performed by the query processing system 2802, for example, by utilizing an operator execution flow generator module 2803 and/or a query execution module 2504. For example, some or all of the method of FIG. 38J can be performed by the IO pipeline generator module 2834 and/or the IO operator execution module 2840. Some or all of the method of FIG. 38J can be performed via communication with and/or access to a segment storage system 2508, such as memory drives 2425 of one or more nodes 37. Some or all of the steps of FIG. 38J can optionally be performed by any other processing module of the database system 10.

Some or all of the method of FIG. 38J can be performed via the IO pipeline generator module 2834 to generate an IO pipeline utilizing at least one index element for a given column. Some or all of the method of FIG. 38J can be performed via the segment indexing module generate an index structure for data values of the given column. Some or all of the method of FIG. 38J can be performed via the query processing system 2802 based on implementing IO operator execution module that executes IO pipelines by utilizing at least one index element for the given column.

Some or all of the steps of FIG. 38J can be performed to implement some or all of the functionality of the segment processing module 2502 as described in conjunction with FIGS. 38A-38I. Some or all of the steps of FIG. 38J can be performed to implement some or all of the functionality regarding execution of a query via the plurality of nodes in the query execution plan 2405 as described in conjunction with FIGS. 24A-24E. Some or all steps of FIG. 38K can be performed by database system 10 in accordance with other embodiments of the database system 10 and/or nodes 37 discussed herein. Some or all steps of FIG. 38J can be performed in conjunction with some or all steps of any other method described herein.

Step 3872 includes storing a plurality of column values for a first column of a plurality of rows. Step 3874 includes indexing each of a set of missing data-based conditions for the first column via an indexing scheme. Step 3876 includes determining a query including a query predicate indicating the first column. Step 3878 includes identifying a subset of the set of missing data-based conditions for the first column based on the query predicate. Step 3880 includes generating an IO pipeline for access of the first column based on the query predicate and further based on the subset of the set of missing data-based conditions. Step 3882 includes applying the IO pipeline in conjunction with execution of the query.

Performing step 3882 can include performing step 3884 and/or step 3886. Step 3884 includes applying at least one index element to identify a proper subset of the plurality of rows based on index data of the indexing scheme for the first column; Step 3886 includes generating a query resultant for the query based on the proper subset of the plurality of rows.

In various embodiments, the proper subset of the plurality of rows includes ones of the plurality of rows having values for the first column included in the subset of the set of missing data-based conditions.

In various embodiments, the indexing scheme is a probabilistic indexing scheme, and wherein the IO pipeline includes at least one index-based IO construct. In various embodiments, the indexing scheme implements an inverted index structure.

In various embodiments, the set of missing data-based conditions includes a null value condition, and wherein a first subset of the plurality of column values satisfy the null value condition based on the first subset of the plurality of column values of the first column each being a null value. In various embodiments, another subset of the plurality of column values do not satisfy any of the set of missing data-based conditions based on each having a non-null value, and/or the proper subset of the plurality of rows includes ones of the other subset of the plurality of column values satisfying the query predicate.

In various embodiments, the plurality of column values of first column correspond to an array data type, and/or the set of missing data-based conditions further includes: an empty array condition, where a second subset of the plurality of column values satisfy the empty array condition based on the second subset of the plurality of column values of the first column each having an empty array value; and/or a null-inclusive array condition, where a third subset of the plurality of column values satisfy the null-inclusive array condition based on the third subset of the plurality of column values of the third column including a set of array elements, and further based on at least one of the set of array elements having the null value.

In various embodiments, the first subset, the second subset, and the third subset are mutually exclusive. In various embodiments, a fourth subset of the plurality of column values do not satisfy any of the set of missing data-based conditions based on being an array including at least one array element and having no array elements having the null value, and/or the proper subset of the plurality of rows includes ones of the fourth subset of the plurality of column values satisfying the query predicate.

In various embodiments, none of the proper subset of the plurality of rows have values for the first column included in the subset of the set of missing data-based conditions based on the subset of the set of missing data-based conditions for the first column being identified as null.

In various embodiments, applying the at least one index element includes applying an index element for values satisfying one the set of missing data-based conditions included in subset of the set of missing data-based conditions. In various embodiments, applying the at least one index element includes applying an index element for values satisfying one the set of missing data-based conditions not included in subset of the set of missing data-based conditions to identify another proper subset of the plurality of rows. In various embodiments, applying the IO pipeline further includes filtering the another proper subset of the plurality of rows to generate the proper subset of the plurality of rows.

In various embodiments, the method further includes indexing a set of values for the first column via the indexing scheme, where the set of values for the first column meet none of the set of missing data-based conditions, and/or where the plurality of column values include the set of values. In various embodiments, applying the at least one index element includes: applying a first index element for values satisfying one the set of missing data-based conditions, and/or applying a second index element for values equal to one of the set of values.

In various embodiments, indexing each of the set of missing data-based conditions for the first column via the indexing scheme includes: identifying ones of the plurality of rows having column values of the first column meeting one of the set of missing data-based conditions; and/or indexing the each of the ones of the plurality of rows for the one of the set of missing data-based conditions via the indexing scheme.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a database system includes at least one processor and a memory storing operational instructions. The operational instructions, when executed via the at least one processor, can cause the database system to store a plurality of column values for a first column of a plurality of rows; index each of a set of missing data-based conditions for the first column via an indexing scheme; determine a query including a query predicate indicating the first column; identify a subset of the set of missing data-based conditions for the first column based on the query predicate; generate an IO pipeline for access of the first column based on the query predicate and further based on the subset of the set of missing data-based conditions; and/or apply the IO pipeline in conjunction with execution of the query. Applying apply the IO pipeline in conjunction with execution of the query can include: applying at least one index element to identify a proper subset of the plurality of rows based on index data of the indexing scheme for the first column, wherein the proper subset of the plurality of rows includes ones of the plurality of rows having values for the first column included in the subset of the set of missing data-based conditions; and/or generating a query resultant for the query based on the proper subset of the plurality of rows.

FIG. 38K illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 34D. In particular, a node 37 can utilize the query processing module 2435 to execute some or all of the steps of FIG. 38K, where multiple nodes 37 implement their own query processing modules 2435 to independently execute the steps of FIG. 38K, for example, to facilitate execution of a query as participants in a query execution plan 2405.

Some or all of the method of FIG. 38K can be performed by the query processing system 2802, for example, by utilizing an operator execution flow generator module 2803 and/or a query execution module 2504. For example, some or all of the method of FIG. 38K can be performed by the IO pipeline generator module 2834 and/or the IO operator execution module 2840. Some or all of the method of FIG. 38K can be performed via communication with and/or access to a segment storage system 2508, such as memory drives 2425 of one or more nodes 37. Some or all of the steps of FIG. 38K can optionally be performed by any other processing module of the database system 10.

Some or all of the method of FIG. 38K can be performed via the IO pipeline generator module 2834 to generate an IO pipeline utilizing at least one index element for a given column. Some or all of the method of FIG. 38K can be performed via the segment indexing module generate an index structure for data values of the given column. Some or all of the method of FIG. 38K can be performed via the query processing system 2802 based on implementing IO operator execution module that executes IO pipelines by utilizing at least one index element for the given column.

Some or all of the steps of FIG. 38K can be performed to implement some or all of the functionality of the segment processing module 2502 as described in conjunction with FIGS. 38A-38I. Some or all of the steps of FIG. 38K can be performed to implement some or all of the functionality regarding execution of a query via the plurality of nodes in the query execution plan 2405 as described in conjunction with FIGS. 24A-24E. Some or all steps of FIG. 38K can be performed by database system 10 in accordance with other embodiments of the database system 10 and/or nodes 37 discussed herein. Some or all steps of FIG. 38K can be performed in conjunction with some or all steps of FIG. 38J and/or any other method described herein.

Step 3871 includes storing a plurality of array field values for an array field of a plurality of rows. Step 3873 includes generating index data for the array field. Step 3875 includes determining a query including a query predicate indicating an array operation for the array field. Step 3877 includes applying an IO pipeline in conjunction with execution of the query.

Performing step 3873 can include performing some or all of steps 3881-3887. Step 3881 includes indexing non-null values of the plurality of array fields for the plurality of rows, for example, as value-based index data 3822. Step 3883 includes indexing null-valued ones of the plurality of array fields for the plurality of rows, for example, as null value index data 3863. Step 3885 includes indexing ones of the plurality of array fields for the plurality of rows having an empty set of elements, for example, as empty array index data 3865. Step 3887 includes indexing ones of the plurality of fields for the plurality of rows having at least one null element value, for example, as null-inclusive array index data 3867.

Performing step 3877 can include performing some or all of steps 3889-3993. Step 3889 includes applying a first index element to identify a first proper subset of the plurality of rows having array field values that include a given non-null value denoted in the query predicate as one of the set of elements based on the index data for the array field. Step 3891 includes applying at least one second index element to identify a second proper subset of the plurality of rows satisfying a subset of a set of missing data-based conditions based on the index data for the array field. Step 3893 includes generating a query resultant for the query based on the first proper subset and the second proper subset.

In various embodiments, the array operation includes a universal quantifier of a universal statement indicating the given non-null value and/or an existential quantifier or an existential statement indicating the given non-null value. In various embodiments, the query predicate includes a negation of the universal quantifier and/or a negation of the existential quantifier. In various embodiments, the query predicate indicates the universal statement indicating equality of all of the set of elements of array field values with the given non-null value, and/or the existential statement indicating equality of at least one of the set of elements of array field values with the given non-null value. In various embodiments, the query predicate indicates the universal statement indicating satisfaction of a like-based condition by all of the set of elements of array field values with the given non-null value, and/or the existential statement indicating satisfaction of a like-based condition by at least one of the set of elements of array field values with the given non-null value.

In various embodiments, the set of missing data-based conditions includes a null value condition, an empty array condition, and a null-inclusive array condition. In various embodiments, the subset of the set of missing data-based conditions is a proper subset of the set of missing data-based conditions. In various embodiments, the subset of the set of missing data-based conditions is all of the set of missing data-based conditions.

In various embodiments, the index data maps each of a first plurality of subsets of the plurality of rows to non-null values of ones of their sets of elements of the array field. In various embodiments, the index data further maps each of a second plurality of subsets of the plurality of rows to a corresponding one of the set of missing data-based conditions. In various embodiments, the second plurality of subsets are mutually exclusive. In various embodiments, each of a set of non-null values of the index data is mapped to a corresponding one of the first plurality of subsets that includes all rows of the plurality of rows having array field values with a set of elements satisfying an equality-based existential statement for the each of the set of non-null values.

In various embodiments, at least one of the set of missing data-based conditions is mapped to a corresponding one of the second plurality of subsets that includes all rows of the plurality of rows having array field values equal to a corresponding array field value. In various embodiments, at least one additional one of the set of missing data-based conditions is mapped to a corresponding one of the second plurality of subsets that includes all rows of the plurality of rows having array field values with a set of elements satisfying an equality-based existential statement denoting equality with a null value.

In various embodiments, the index data is generated in accordance with a probabilistic indexing scheme, and wherein the IO pipeline includes at least one index-based IO construct. In various embodiments, the index data is generated in accordance with an inverted index structure.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a database system includes at least one processor and a memory storing executable instructions. The executable instructions, when executed via the at least one processor, can cause the database system to store a plurality of array field values for an array field of a plurality of rows. The executable instructions, when executed via the at least one processor, can further cause the database system to generate index data for the array field based on: indexing non-null element values of the plurality of array fields for the plurality of rows; indexing null-valued ones of the plurality of array fields for the plurality of rows; indexing ones of the plurality of array fields for the plurality of rows having an empty set of elements; and/or indexing ones of the plurality of fields for the plurality of rows having at least one null element value. The executable instructions, when executed via the at least one processor, can further cause the database system to determine a query including a query predicate indicating an array operation for the array field, and to applying an IO pipeline in conjunction with execution of the query by: applying a first index element to identify a first proper subset of the plurality of rows having array field values that include a given non-null value denoted in the query predicate as one of the set of elements based on the index data for the array field; applying at least one second index element to identify a second proper subset of the plurality of rows satisfying a subset of a set of missing data-based conditions based on the index data for the array field; and/or generating a query resultant for the query based on the first proper subset and the second proper subset.

FIG. 39A illustrates an example embodiment of an IO pipeline generator module 2834 of a query processing system 2802 that generates an IO pipeline 2835 for execution of an operator execution flow 2817 that includes an equality condition 3912, such as a non-negated equality condition. Some or all features and/or functionality of the query processing system 2802 of FIG. 39A can be utilized to implement the query processing system 2802 of FIG. 38G and/or any other embodiment of the query processing system described herein. The IO pipeline 2835 of FIG. 39A can be executed via an IO operator execution module 2840, such as the IO operator execution module 2840 of FIG. 38I and/or any other IO operator execution module 2840 described herein.

An IO pipeline 2835 generated for an operator execution flow 2817 that includes an equality condition 3912 (e.g. the condition A=="literal", where "literal" is the given non-null value 3863 and where A is the given column identifier 3041). This IO pipeline 2835 can be generated to include a subset of the set of special index conditions 3815 that includes none of the missing data-based indexing conditions 3837. For example, the subset of the set of special index conditions 3815 is selected to include none of the missing data-based indexing conditions 3837 based on determining that the set of rows satisfying the equality condition 3912, and that should be included in output of the IO pipeline 2835 when executed via the IO operator execution module 2840, includes rows with values for the column equal to the given non-null value 3863. Rows not satisfying the equality condition 3912, and that should thus not be included in output of the IO pipeline 2835 when executed via the IO operator execution module 2840, includes rows with non-null values for the column not equal to the given value, as well as rows with null values. Thus, only one index element 3862 is required to identify rows having the non-null value as their value 3024 for the given column.

If the index structure 3859 storing index data 3820 corresponds to a probabilistic structure, a source element 3014 and filter element 3016 can be applied to filter out false positive rows, for example, as discussed in conjunction with FIGS. 30A-30H, where this source element 3014 and filter element 3016 are implemented to implement a probabilistic index-based IO construct 3010. The filter element can confirm equality with the non-null value 3863, where rows having sourced values for the column not equal to the non-null value 3863 identified by the index element are removed from the outputted set of rows. If the index structure 3859 storing index data 3820 corresponds to a non-probabilistic structure, only the index element 3862 is necessary, as its output is guaranteed to include only rows having the non-null value as their value 3024 for the given column.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the equality condition 3912. Another arrangement and/or set of elements of IO pipeline 2835 rendering logically equivalent output to the example IO pipeline 2835 of FIG. 39A can optionally be applied instead of the IO pipeline 2835 of FIG. 39A to implement some or all equality conditions 3912 of query predicates 2822.

FIG. 39B illustrates an example embodiment of an IO pipeline generator module 2834 of a query processing system 2802 that generates an IO pipeline 2835 for execution of an operator execution flow 2817 that includes an inequality condition 3913. Some or all features and/or functionality of the query processing system 2802 of FIG. 39B can be utilized to implement the query processing system 2802 of FIG. 38G and/or any other embodiment of the query processing system described herein. The IO pipeline 2835 of FIG. 39B can be executed via an IO operator execution module 2840, such as the IO operator execution module 2840 of FIG. 38I and/or any other IO operator execution module 2840 described herein.

An IO pipeline 2835 generated for an operator execution flow 2817 that includes an inequality condition 3913 (e.g. the condition A !="literal", where "literal" is the given non-null value 3863 and where A is the given column identifier 3041). The inequality condition 3913 can be based on and/or logically equivalent to the negation of an equality condition 3912 indicating the non-null value 3863 for the given column.

This IO pipeline 2835 can be generated to include a subset of the set of special index conditions 3815 that includes one of the missing data-based indexing conditions 3837 such as the null value condition 3842. For example, the subset of the set of special index conditions 3815 is selected to include the null value condition 3842 based on determining that the set of rows satisfying the equality condition 3912, and that should be included in output of the IO pipeline 2835 when executed via the IO operator execution module 2840, includes rows with values for the column not equal to the given non-null value 3863. Rows not satisfying the equality condition 3912, and that should thus not be included in output of the IO pipeline 2835 when executed via the IO operator execution module 2840, includes rows with non-null values for the column equal to the given value, as well as rows with null values.

Identifying the rows not equal to the given value can thus include applying a set difference to the full set of rows (or previously filtered rows via downstream elements) to render the negation, and thus the set of rows not equal to the given value. However, as the set difference applied to this set of rows equal to the given value alone would render inclusion of rows having a null value, but null values rows do not satisfy the inequality condition 3913, and therefore must not be included in the output. Thus, the set difference can be applied to a union of both rows having the non-null value as well as rows having the null value, enabling removal of rows meeting either of these conditions from the output generated via IO pipeline 2835.

Two index elements 3862 can therefore be applied, for example, in parallel, where one index element 3862, when executed via the IO operator execution module 2840, identifies the set of rows having the non-null value 3863, and the other index element 3862, when executed via the IO operator execution module 2840, identifies the set of rows with null values, or otherwise meeting the null value condition 3842. A set union element 3218 is applied to combine the outputs of these two index elements 3862.

If the index structure 3859 storing index data 3820 corresponds to a probabilistic structure, a source element 3014 and filter element 3016 can be applied to filter out false positive rows, for example, as discussed in conjunction with FIGS. 30A-30H, where this source element 3014 and filter element 3016 are implemented to implement a probabilistic index-based IO construct 3010. The filter element can confirm that rows in the set union are either equal to the non-null value 3863 or are null (e.g. whether rows meet the condition "A !="literal" or A is null", where "is null" is a function applied to determine whether a value is null, which can be different from the equality operator "==" or the inequality operator "!=" applied to determine equality of non-null values), thus removing all false positive rows included in output of either one of the two index elements 3862. If the index structure 3859 storing index data 3820 corresponds to a non-probabilistic structure, only the union applied to output of the pair of index element 3862 is necessary prior to the set difference element 3308 as its output is guaranteed to include only rows having either non-null value or the null value as their value 3024 for the given column.

A set difference element 3308 can be applied to the output of the set union element 3218, or the output of the filter element 3016 if applicable due to use of a probabilistic index. The set difference element removes rows having either non-null value or the null value as their value 3024 for the given column to render all rows of the set of input rows having non-null values not equal to the non-null value 3863, thus correctly implementing the inequality condition 3913.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the inequality condition 3913. Another arrangement and/or set of elements of IO pipeline 2835 rendering logically equivalent output to the example IO pipeline 2835 of FIG. 39B can optionally be applied instead of the IO pipeline 2835 of FIG. 39B to implement some or all inequality conditions 3913 of query predicates 2822.

FIG. 39C illustrates an example embodiment of an IO pipeline generator module 2834 of a query processing system 2802 that generates an IO pipeline 2835 for execution of an operator execution flow 2817 that includes a negation 3314 of a condition 3915. Some or all features and/or functionality of the query processing system 2802 of FIG. 39C can be utilized to implement the query processing system 2802 of FIG. 38G and/or any other embodiment of the query processing system described herein. The IO pipeline 2835 of FIG. 39C can be executed via an IO operator execution module 2840, such as the IO operator execution module 2840 of FIG. 38I and/or any other IO operator execution module 2840 described herein.

An IO pipeline 2835 generated for an operator execution flow 2817 that includes a negation 3314 of a condition 3915, for example, applied to one or more non-null values 3863 (e.g. ! (condition), where "!" denotes negation). For example, the negation 3314 of the condition 3915 corresponds to a negation 3314 of the equality condition 3912, and is thus implemented as the inequality condition 3913, for example, where the inequality condition 3913 and corresponding IO pipeline 2835 of FIG. 39B are one example of the negation 3314 of a condition 3915, and corresponding IO pipeline 2835, of FIG. 39C. The condition 3915 can include one or more operations 3916 applied to the one or more non-null values, such as one or more Boolean operations rendering Boolean output, an equality operation, a like-based function, a conjunction, a disjunction, a complex predicate, a quantifier, or other operations.

In particular, negations of other types of conditions (e.g. conditions beyond mere equality) can be similarly implemented in a similar fashion as discussed in conjunction with FIG. 39B, where rows satisfying the condition are identified, and where a set difference is applied to the union of these rows with rows having null values in cases where the null-valued rows do not satisfy the negation 3314 of the condition 3915, and should thus not be included in output. The condition 3915 can correspond to a greater than condition, less than condition, conjunction, disjunction, complex predicate, a quantifier, a like-based condition such as a condition requiring text includes a given subset, or any other condition indicated in query predicates 2822. Note that while the negation is applied after the condition in the operator execution flow 2817 for illustrative purposes, the negation can be pushed within the condition in accordance with set logic (e.g. De Morgan's law is applied, the type of quantifier changes, etc.)

In particular, the rows with null values for the given column are identified to implement the negation of the equality condition in FIG. 39B because they neither satisfy the equality condition nor the equality condition. Thus, applying the set difference to remove all rows satisfying the equality condition to render rows satisfying the inequality condition is not sufficient, as all of the null rows remain in the output as they do not satisfy the equality condition and are not identified and removed via the set difference. As these rows also do not satisfy the inequality condition, the resulting output could be incorrect based on possibly including such rows.

A similar strategy can be applied for negations of other conditions where some rows, such as rows with null values for the column, satisfy neither the condition nor its negation. In particular, some or all rows satisfying a special index condition can fall in this category, and the resulting IO pipeline 2835 can be generated to include a subset of the set of special index conditions 3815 that includes one of these special index condition 3817, such as the null value condition 3842. For example, the subset of the set of special index conditions 3815 is selected based on identifying ones of the set of special index conditions 3815 that can and/or always do not satisfy neither the condition nor its negation.

A first set of one or more index elements 3862, and or other elements such as set intersections, set unions, source elements, filtering elements, etc., can be applied to implement identification for rows satisfying condition 3915, where the corresponding output includes all rows satisfying the condition 3915, and also including only rows satisfying the condition 3915, prior to and/or after applying source element 3014 and filter element 3016 as required. A second set of one or more index elements 3862, and or other elements such as set intersections, set unions, source elements, filtering elements, etc., can be applied to implement identification for rows satisfying not satisfying condition 3915 and also not satisfying the negation of condition 3915, where the corresponding output includes all rows satisfying neither the condition 3915 nor its negation, and also including only rows satisfying neither the condition 3915 nor its negation, prior to and/or after applying source element 3014 and filter element 3016 as required. For example, rows satisfying neither the condition nor its negation can include rows with null values for the given column (e.g. all rows satisfying the null value condition 3842), rows with an array structure for the given column containing only null values (e.g. a subset of rows satisfying the null-inclusive condition 3846), or rows satisfying other special conditions or subsets of special conditions.

The outputs of the first set of index element 3862 and second set of index elements 3862 can be combined with the output of the second set of index elements 3862 that identifies all rows not satisfying the negation of the condition that must be removed in applying the set difference, thus rendering identification of all rows satisfying the negation of the condition, and only rows satisfying the negation of the condition.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the negation of the conditions 3915. Another arrangement and/or set of elements of IO pipeline 2835 rendering logically equivalent output to the example IO pipeline 2835 of FIG. 39C can optionally be applied instead of the IO pipeline 2835 of FIG. 39C to implement some or all negations of conditions 3915 of query predicates 2822.

FIG. 39D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 39D. In particular, a node 37 can utilize the query processing module 2435 to execute some or all of the steps of FIG. 39D, where multiple nodes 37 implement their own query processing modules 2435 to independently execute the steps of FIG. 39D, for example, to facilitate execution of a query as participants in a query execution plan 2405.

Some or all of the method of FIG. 39D can be performed by the query processing system 2802, for example, by utilizing an operator execution flow generator module 2803 and/or a query execution module 2504. For example, some or all of the method of FIG. 39D can be performed by the IO pipeline generator module 2834 and/or the IO operator execution module 2840. Some or all of the method of FIG. 39D can be performed via communication with and/or access to a segment storage system 2508, such as memory drives 2425 of one or more nodes 37. Some or all of the steps of FIG. 39D can optionally be performed by any other processing module of the database system 10.

Some or all of the method of FIG. 39D can be performed via the IO pipeline generator module 2834 to generate an IO pipeline utilizing at least one index element for a given column. Some or all of the method of FIG. 39D can be performed via the segment indexing module to generate an index structure for data values of the given column. Some or all of the method of FIG. 39D can be performed via the query processing system 2802 based on implementing IO operator execution module that executes IO pipelines by utilizing at least one index element for the given column.

Some or all of the steps of FIG. 39D can be performed to implement some or all of the functionality of the segment processing module 2502 as described in conjunction with FIGS. 38A-38I and/or FIGS. 39B-39C. Some or all of the steps of FIG. 39D can be performed to implement some or all of the functionality regarding execution of a query via the plurality of nodes in the query execution plan 2405 as described in conjunction with FIGS. 24A-24E. Some or all steps of FIG. 39D can be performed by database system 10 in accordance with other embodiments of the database system 10 and/or nodes 37 discussed herein. Some or all steps of FIG. 39D can be performed in conjunction with some or all steps of FIG. 38J, FIG. 38K, and/or any other method described herein.

Step 3972 includes storing a plurality of column values for a first column of a plurality of rows. Step 3974 includes determining a query including a query predicate indicating a negation of a condition for the first column based on a given value. Step 3976 includes applying an IO pipeline in conjunction with execution of the query.

Performing step 3976 can include performing some or all of steps 3978-3982. Step 3978 includes applying a first index element to identify a first proper subset of the plurality of rows having values for the first column meeting the condition based on index data for the first column. Step 3980 includes applying at least one second index element to identify a second proper subset of the plurality of rows having values for the first column meeting at least one missing data-based condition based on index data for the first column. Step 3982 includes generating a query resultant for the query based on applying a set difference between the plurality of rows and a union of the first proper subset and the second proper subset.

In various embodiments, the condition is an equality condition with the given value, and wherein the negation of the condition is an inequality condition with the given value. In various embodiments, the first proper subset of the plurality of rows have values for the first column equal to the given value based on index data for the first column. In various embodiments, the second proper subset of the plurality of rows have values for the first column meeting a null value condition based on index data for the first column.

In various embodiments, the at least one second index element is applied to identify a second proper subset of the plurality of rows having values that do not meet the condition and that further do not meet the negation of the condition. In various embodiments, the at least one missing data-based condition includes a null value condition, and/or the second proper subset of the plurality of rows include ones of the plurality of rows having null values for the first column.

In various embodiments, the index data maps the second proper subset of the plurality of rows to the null value for the first column. In various embodiments, the index data further maps other proper subsets of the plurality of rows to non-null values of the first column. In various embodiments, one of the other proper subsets is the first proper subset mapped to the given value.

In various embodiments, the method includes generating the index data. In various embodiments, generating the index data is based on: indexing the null value for the first column of the of plurality of rows via an indexing scheme, where the second index element is applied based on indexing the null value for the first column; and/or indexing a plurality of non-null values for the first column of the of plurality of rows via the indexing scheme, where the plurality of non-null values includes the given value, and wherein the first index element is applied based on indexing given value for the first column.

In various embodiments, the method further includes identifying ones of the plurality of rows having column values of the first column equal to the null value. In various embodiments, indexing the null value for the first column of the of plurality of rows via the indexing scheme is based on indexing identified ones of the of the of plurality of rows. In various embodiments, identifying ones of the plurality of rows having column values of the first column equal to the null value includes performing a null-test operator upon column values of the first column for each of the plurality of rows. The null-test operator is different from an equality operator utilized to test equality between non-null values. For example, the "is NULL" function is implemented as the null-test operator, and the "==" operator is implemented as the equality operator.

In various embodiments, the indexing scheme is a probabilistic indexing scheme, and/or the IO pipeline includes at least one index-based IO construct. In various embodiments, the indexing scheme implements an inverted index structure.

In various embodiments, a subset of the plurality of column values do not satisfy the null value condition based on each having a non-null value, where the union includes ones of the subset of the plurality of column values satisfying the condition, and where the set difference includes ones of the subset of the plurality of column values satisfying the query predicate.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a database system includes at least one processor and a memory storing executable instructions. The executable instructions, when executed via the at least one processor, can cause the database system to store a plurality of column values for a first column of a plurality of rows, determine a query including a query predicate indicating a negation of a condition for the first column based on a given value, and/or apply an IO pipeline in conjunction with execution of the query. Applying the IO pipeline in conjunction with execution of the query can include applying a first index element to identify a first proper subset of the plurality of rows having values for the first column meeting the condition based on index data for the first column; applying at least one second index element to identify a second proper subset of the plurality of rows having values for the first column meeting at least one missing data-based condition based on index data for the first column; and/or generating a query resultant for the query based on applying a set difference between the plurality of rows and a union of the first proper subset and the second proper subset.

FIGS. 40A-40D illustrate example embodiments of an IO pipeline generator module 2834 of a query processing system 2802 that generates IO pipelines 2835 for execution of operator execution flows 2817 that include conditions upon sets of elements of array structures of array fields 2712. Some or all features and/or functionality of the query processing system 2802 of FIGS. 40A-40D can be utilized to implement the query processing system 2802 of FIG. 38H and/or any other embodiment of the query processing system described herein. The IO pipeline 2835 of FIGS. 40A-40D can be executed via an IO operator execution module 2840, such as the IO operator execution module 2840 of FIG. 38I and/or any other IO operator execution module 2840 described herein.

FIG. 40A illustrates an example IO pipeline 2835 generated for an operator execution flow 2817 that includes a universal quantifier applied to one or more non-null values 3863 (e.g. for_all(A)=="literal", or other operation denoting all elements of the array field are equal to the non-null value, or that all elements satisfy another condition based on the non-null value).

The resulting IO pipeline 2835 can be generated to include a subset of the set of special index conditions 3815 that includes one of the missing data-based indexing conditions 3837 such as the empty array condition 3844. For example, the subset of the set of special index conditions 3815 is selected to include the empty array condition 3844 based on determining that the set of rows satisfying the universal quantifier 4012, and that should be included in output of the IO pipeline 2835 when executed via the IO operator execution module 2840, includes rows with values for the column with at least one value equal to the non-null value, and rows with values for the column having no values, as all of the array structures zero values satisfy the condition of the universal quantifier 4012 by default.

Rows with values for the column having zero values can be identified via a first index element 3862 that identifies the empty array condition 3844. A set union 3218 can be applied to combine this set of rows with rows with values for the column with at least one value equal to the non-null value identified via another index element 3862. This another index element can identify the non-null value based on the indexing for array fields having a mapping of values of elements to rows with array structures that include this value as at least one of its elements as discussed in conjunction with FIG. 38F.

However, as the outputted rows by this other index element thus indicate rows satisfying the existential quantifier, and not the universal quantifier, for equality with the given non-null value 3863, false-positive rows can possibly be included in the output of this other index element, as some rows may include arrays having only some elements, and not all elements, equal to the given value that must be filtered from the output. By nature, the corresponding index structure can be considered a probabilistic index structure when utilized for universal quantifiers, with the exception that the output does not also include the empty set which must be identified separately. Thus, a corresponding source element 3014 and filter element 3016 can be applied regardless of whether the indexing of included element values is probabilistic or not, as the existential quantifier-based quality of the resulting index structure deems that further identification of whether all elements have equal values is met. Note that the filter element 3016 maintains inclusion of rows having empty arrays, as well as only rows with all elements equal to the non-null value 3863, based on filtering upon the condition for_all(A)=="literal", where "literal" is the given non-null value 3863 and where A is the given column identifier 3041, or another logically equivalent expression.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the universal quantifier 4012. Another arrangement and/or set of elements of IO pipeline 2835 rendering logically equivalent output to the example IO pipeline 2835 of FIG.

40A can optionally be applied instead of the IO pipeline 2835 of FIG. 40A to implement some or all universal quantifiers 4012 of query predicates 2822.

The IO pipeline of FIG. 40A can be guaranteed to render a correct set of rows further based on the outputted set of rows being guaranteed to not include any rows with values for the array field meeting either the null value condition 3842 or the null-inclusive array condition 3846, as values for the array field meeting either of these conditions do not satisfy the universal quantifier 4012. In particular, rows having null values can be guaranteed not to be included in sets of rows identified via the index elements, and rows having arrays that include null elements, for example, in addition to the non-null value, can be filtered via filtering element 3016. The IO pipeline can be generated based on selecting to not include index elements 3862 for either the null value condition 3842 or the null-inclusive array condition 3846 due to the universal quantifier 4012, and/or due to the universal quantifier 4012 not being negated.

In some embodiments, to further leverage the additional indexing possible via special index conditions, one special index condition 3817 can optionally correspond to an "all values equal" condition. For example, this all values equal condition for a given column, such as an array field 2712, can apply to all array elements having a set of elements that are all equal to each other, where the value to which they are equal is not relevant, and/or can optionally include the null value. Rows satisfying this all values equal condition for the given array field 2712 can be indexed via corresponding special index data 3824 for the given array field 2712. Note that arrays equal to the empty set can optionally be identified as satisfying this condition, as by nature it satisfies any universal quantifier applied to its set of zero elements.

While not illustrated, in such embodiments, the IO pipeline 2835 for a universal quantifier requiring equality with a given value by all elements of an array structure can alternatively be generated to include a further index element 3862 with index probe parameter data 3042 identifying this all values equal condition, where the identified set of rows include all rows with arrays having all their values being equal to a same value. A set intersection element can be implemented to apply a set intersection to the first set of rows outputted by the index element probing for rows having at least one element equal to the non-null value, and to the second set of rows outputted by this further index element for this all values equal condition, where the output of the set intersection element thus identifies all rows having more than one value, where all of its values are equal to the non-null value 3863. As empty sets would not be identified in this intersection due to not being included in the first set of rows outputted by the index element probing for rows having at least one element equal to the non-null value, the index element for the empty array condition 3844 can be implemented as illustrated in FIG. 40A, where the set union element 3218 is applied to the output set of rows, and to the output of the set intersection element applied to the first set of rows outputted by the index element probing for rows having at least one element equal to the non-null value, and to the second set of rows outputted by this further index element for the all values equal condition. Thus, the output of the set union element 3218 can correspond to the correct output for the universal quantifier in cases where the index structure is non-probabilistic, despite being based on the existential quantifier condition, due to the use of this additional indexing of arrays having all equal vales. This can be useful in rendering the source element 3014 and filter element 3016 of FIG. 40A unnecessary, and/or only necessary in cases where a probabilistic structure is utilized to index element values of the array field (e.g. hashing element values in arrays to a given value).

FIG. 40B illustrates an example IO pipeline 2835 generated for an operator execution flow 2817 that includes an existential quantifier applied to one or more non-null values 3863 (e.g. for_some(A)=="literal", or other operation denoting at least one element of the array field are equal to the non-null value, or that at least one element satisfies another condition based on the non-null value).

The resulting IO pipeline 2835 can be generated to include a subset of the set of special index conditions 3815 that none of the missing data-based indexing conditions 3837 such as the empty array condition 3844. For example, the subset of the set of special index conditions 3815 is selected to include none of the missing data-based indexing conditions 3837 based on determining that the set of rows satisfying the existential quantifier 4013, and that should be included in output of the IO pipeline 2835 when executed via the IO operator execution module 2840, includes rows with values for the column with at least one value equal to the non-null value, and no rows with values for the column equal to null or equal to the empty set. Note that some rows meeting the null-inclusive array condition 3846 can satisfy the existential quantifier if they also include rows equal to the non-null value 3863. However, these rows can be identified based on their inclusion of the non-null value 3863, and it is irrelevant as to whether they also include null valued elements.

The resulting IO pipeline can be very simple based on leveraging the fact that the index structure 3859 indexes the rows for the column based on the existential quantifier for equality with various non-null values indexed via the index data, as discussed in conjunction with FIG. 38F. In particular, in the case where a non-probabilistic index structure is applied and where the existential quantifier 4013 requires equality of at least one element in the array structure with the given non-null value, the corresponding IO pipeline can simply include an index element 3862 for the non-null value, and the set of rows identified via this index element 3862 when executed via an IO operator execution module 2840 can be guaranteed to be correct based on including every row with an array structure for the array field 2712 having at least one element equal to the non-null value 3863, and based on including only rows with an array structure for the array field 2712 having at least one element equal to the non-null value 3863, due to the row identifier sets 3044 of the index data 3822 for the array field being populated to satisfy this existential quantifier-based property.

In embodiments where a probabilistic index structure is utilized, a corresponding source element 3014 and filter element 3016 can be applied to filter out false positive rows, for example, as discussed in conjunction with FIGS. 30A-30H, where this source element 3014 and filter element 3016 are implemented to implement a probabilistic index-based IO construct 3010. The filter element can confirm that rows identified via the index element 3862 include at least one element equal to the non-null value 3863 or are null (e.g. whether rows meet the condition "for_some(A)==literal", where "literal" is the given non-null value 3863 and where A is the given column identifier 3041 for the array field 2712, or another logically equivalent expression), thus removing all false positive rows included in output of index elements 3862.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the existential quantifier 4013. Another arrangement and/or set of elements of IO pipeline 2835 rendering logically equivalent output to the example IO pipeline 2835 of FIG. 40B can optionally be applied instead of the IO pipeline 2835 of FIG. 40B to implement some or all existential quantifiers 4013 of query predicates 2822.

The IO pipeline of FIG. 40B can be guaranteed to render a correct set of rows further based on the outputted set of rows being guaranteed to not include any rows with values for the array field meeting either the null value condition 3842 or the empty set condition 3846, as values for the array field meeting either of these conditions do not satisfy the existential quantifier 4013. In particular, rows having null values or empty arrays of elements can be guaranteed not to be included in sets of rows identified via the index elements, and need not be filtered via filter element 3016. The IO pipeline can be generated based on selecting to not include index elements 3862 for the null value condition 3842, the empty array condition 3844, the null-inclusive array condition 3846 due to the existential quantifier 4013, and/or due to the existential quantifier 4013 not being negated.

FIG. 40C illustrates an embodiment of an example IO pipeline 2835 generated for an operator execution flow 2817 that includes a negation of a universal quantifier applied to one or more non-null values 3863 (e.g. ! (for_all(A)=="literal"), the logically equivalent expression for_some (A) !="literal", or other operation denoting the negation of all elements being equal to the non-null value, denoting that at least one element of the array field are not equal to the non-null value, or that negation of all elements satisfying another condition based on the non-null value).

As the negation is applied to the universal quantifier 4012, the resulting IO pipeline can optionally be constructed in a similar fashion as discussed in conjunction with the negated condition 3915 of FIG. 39C. In this case, the identification of rows satisfying condition 3915 of FIG. 39C can correspond to implementing the universal quantifier 4012 as discussed in conjunction with FIG. 40A. This can include implementing a first index element 3862 indexing for non-null value 3863 and also indexing a second index element 3862 indexing for the empty array condition 3844, where the output is combined via a set union and is then sourced and filtered to identify false positive rows not satisfying the universal quantifier as discussed in conjunction with FIG. 40A. Note that this sourcing and filtering can be applied after applying a union with additional index elements as illustrated in FIG. 40C.

Furthermore, in constructing the IO pipeline to implement the negation in a similar fashion as discussed in conjunction with the negated condition 3915 of FIG. 39C, the identification of rows not satisfying condition 3915 and also not satisfying the negation of condition 3915 can correspond to rows satisfying the null value condition, as well as rows containing only null values. The rows satisfying the null value condition can be identified via an index element 3862 indexing for the null value condition 3842, which are maintained via the filter element and then removed from the output via the set difference as they do not satisfy the negation of the universal quantifier. The rows satisfying the condition of containing only null values can be identified via an index element 3862 indexing for the null-inclusive condition, where outputted rows that include null values as well as non-null values are filtered out via filter element 3016 to render only arrays with all of its elements being equal to the null value (e.g. for_all(A)==null), which are then removed from the output via the set difference as they do not satisfy the negation of the universal quantifier.

Thus, identifying all and only rows that satisfy the universal quantifier, or that do not satisfy either the universal quantifier or the negation of the universal quantifier, can include applying a union to output of this set of index elements, sourcing the values for the array column, and further filtering the rows based on maintaining only rows that satisfy the expression for_all(A)=="literal" OR A is NULL OR for_all(A) is NULL. Removal of these rows from the full set of input rows via the set difference element 3308 can thus render the correct resultant for the negation of the universal quantifier.

In some embodiments, a further condition that satisfies condition 3915 and also does not satisfy the negation of condition 3915 can correspond to rows having array structures for the given column containing only values that are either null or equal to the given non-null value. For example, the given non-null value 3863 is 13, and the condition for the universal quantifier is equality with the non-null value 3863. In some embodiments, a row having an array structure for the column as [13, 13, null, null, 13] does not satisfy the universal quantifier because not all of its elements are equal to 13, and also does not satisfy the negation of the universal quantifier because it does not contain a non-null value not equal to 13, thus not satisfying the existential quantifier of the negated condition, which is equivalent to the negation of the universal quantifier. In such embodiments, these rows can be further identified as a subset of rows identified via the filter element probing for rows satisfying null-inclusive condition 3846, and can be maintained in the output of filter element 3016 (e.g. filter element 3016 filters the rows based on maintaining only rows that satisfy the expression for_all (A)(=="literal" OR is NULL) OR A is NULL, that satisfy the expression ! for_some(A) !="literal" or otherwise further identifying rows with array structures where every element is either null or equal to the given non-null value 3863).

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the negation of the universal quantifier 4012. Another arrangement and/or set of elements of IO pipeline 2835 rendering logically equivalent output to the example IO pipeline 2835 of FIG. 40C can optionally be applied instead of the IO pipeline 2835 of FIG. 40C to implement some or all negation of the universal quantifiers 4012 of query predicates 2822.

The IO pipeline of FIG. 40C can be guaranteed to render a correct set of rows further based on the outputted set of rows being guaranteed to not include any rows with values for the array field meeting either the null value condition 3842 or the empty array condition, as values for the array field meeting these conditions do not satisfy the negation of the universal quantifier 4012. In particular, rows having null values or empty arrays of elements can be identified via respective index elements for the null value condition and the empty array condition, can be maintained via the filter element 3016, and can be ultimately removed from inclusion in the final output via the set difference element 3308.

Furthermore, the IO pipeline of FIG. 40C can be guaranteed to render a correct set of rows further based on the outputted set of rows being guaranteed to not include any rows with arrays having all array element values equal to null and/or based on the outputted set of rows being guaranteed to not include any rows with all array element values equal to either null or the non-null value 3863. In particular, rows having array values with array element values equal to null, and/or rows having array values with array element values equal to either null or the non-null value, can be identified via an index element for the null-inclusive condition, can be maintained via the filter element 3016 to be ultimately removed from inclusion in the final output via the set difference element 3308, where other rows satisfying the null-inclusive condition that satisfy the negation of the universal quantifier, such as rows with array elements that include a non-null element not equal to the given non-null element 3863, are filtered out via filter element 3016 to ensure they inclusion in the final output when the set difference element is applied.

The IO pipeline can be generated based on selecting to not include index elements 3862 for the null value condition 3842, the empty array condition 3844, the null-inclusive array condition 3846 due to the negation of the universal quantifier 4012, and/or due to an existential quantifier 4013 having a negated condition or an inequality condition.

FIG. 40D illustrates an embodiment of an example IO pipeline 2835 generated for an operator execution flow 2817 that includes a negation of an existential quantifier applied to one or more non-null values 3863 (e.g. ! (for_some(A) =="literal"), the logically equivalent expression for_all(A) !="literal", or other operation denoting the negation of some elements being equal to the non-null value, denoting that all elements of the array field are not equal to the non-null value, or the negation of some elements satisfying another condition based on the non-null value).

As the negation is applied to the existential quantifier 4013, the resulting IO pipeline can optionally be constructed in a similar fashion as discussed in conjunction with the negated condition 3915 of FIG. 39C. In this case, the identification of rows satisfying condition 3915 of FIG. 39C can correspond to implementing the existential quantifier 4013 as discussed in conjunction with FIG. 40B. This can include simply implementing a first index element 3862 indexing for non-null value 3863 as discussed in conjunction with FIG. 40B. Note that sourcing and filtering can be applied for this condition when the filtering structure is a probabilistic index.

Furthermore, in constructing the IO pipeline to implement the negation in a similar fashion as discussed in conjunction with the negated condition 3915 of FIG. 39C, the identification of rows not satisfying condition 3915 and also not satisfying the negation of condition 3915 can correspond to all rows satisfying the null value condition, as well as all rows satisfying the null-inclusive condition. The rows satisfying the null value condition can be identified via an index element 3862 indexing for the null value condition 3842. The rows satisfying the null-inclusive array condition can be identified via an index element 3862 indexing for the null-inclusive condition.

Thus, identifying all and only rows that satisfy the universal quantifier, or that do not satisfy either the universal quantifier or the negation of the universal quantifier, can include applying a union to output of this set of index elements. As every row satisfying any of these given indexed conditions for these index elements do not satisfy the negation of the universal quantifier, no sourcing and subsequent filtering is required unless the index structure is implemented as a probabilistic index structure.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the negation of the existential quantifier 4013. Another arrangement and/or set of elements of IO pipeline 2835 rendering logically equivalent output to the example IO pipeline 2835 of FIG. 40D can optionally be applied instead of the IO pipeline 2835 of FIG. 40D to implement some or all negation of the existential quantifiers 4013 of query predicates 2822.

The IO pipeline of FIG. 40D can be guaranteed to render a correct set of rows further based on the outputted set of rows being guaranteed to not include any rows with values for the array field meeting either the null value condition 3842 or the null-inclusive condition 3846, as values for the array field meeting these conditions do not satisfy the negation of the existential quantifier 4013. In particular, rows at least one null-valued element cannot satisfy a condition requiring all of a set of elements are non-null values that are not equal to the given non-null value, as required by the universal quantifier for the negated condition, logically equivalent to the negation of the existential quantifier 401 (e.g. the negated condition is inequality with the non-null value when the condition for the negated existential quantifier 4013 was equality with the non-null value).

Furthermore, the IO pipeline of FIG. 40D can be guaranteed to render a correct set of rows further based on the outputted set of rows being guaranteed to include any rows with arrays equal to the empty array. In particular, because the negation of the existential quantifier 4013 is logically equivalent to the universal quantifier for the negated condition, the condition is thus treated as a universal quantifier, which is true for empty arrays as all of their zero elements are guaranteed to satisfy any condition as discussed previously. Thus, the rows having empty arrays are not identified in an index element for the empty array condition 3844, and rows with empty arrays are guaranteed to not be included in rows identified via the set of applied index elements, (e.g. unless a probabilistic index is utilized), and therefore the set difference element is guaranteed to output all rows in the full set of input rows having empty arrays as outputted rows satisfying the negation of the existential quantifier 4013.

The IO pipeline can be generated based on selecting to include index elements 3862 for the null value condition 3842 and the null-inclusive array condition 3846, and selecting to not include index elements 3862 for the empty array condition, due to the negation of the existential quantifier 4013, and/or due to a universal quantifier 4012 having a negated condition or an inequality condition.

FIG. 40E illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 40E. In particular, a node 37 can utilize the query processing module 2435 to execute some or all of the steps of FIG. 40E, where multiple nodes 37 implement their own query processing modules 2435 to independently execute the steps of FIG. 40E, for example, to facilitate execution of a query as participants in a query execution plan 2405.

Some or all of the method of FIG. 40E can be performed by the query processing system 2802, for example, by utilizing an operator execution flow generator module 2803 and/or a query execution module 2504. For example, some or all of the method of FIG. 40E can be performed by the IO pipeline generator module 2834 and/or the IO operator execution module 2840. Some or all of the method of FIG. 40E can be performed via communication with and/or access to a segment storage system 2508, such as memory drives 2425 of one or more nodes 37. Some or all of the steps of FIG. 40E can optionally be performed by any other processing module of the database system 10.

Some or all of the method of FIG. 40E can be performed via the IO pipeline generator module 2834 to generate an IO pipeline utilizing at least one index element for a given column. Some or all of the method of FIG. 40E can be performed via the segment indexing module to generate an index structure for data values of the given column. Some or all of the method of FIG. 40E can be performed via the query processing system 2802 based on implementing IO operator execution module that executes IO pipelines by utilizing at least one index element for the given column.

Some or all of the steps of FIG. 40E can be performed to implement some or all of the functionality of the segment processing module 2502 as described in conjunction with FIGS. 38A-38I and/or FIG. 40A. Some or all of the steps of FIG. 40E can be performed to implement some or all of the functionality regarding execution of a query via the plurality of nodes in the query execution plan 2405 as described in conjunction with FIGS. 24A-24E. Some or all steps of FIG. 40E can be performed by database system 10 in accordance with other embodiments of the database system 10 and/or nodes 37 discussed herein. Some or all steps of FIG. 40E can be performed in conjunction with some or all steps of FIG. 38J, FIG. 38K, FIG. 39D and/or any other method described herein.

Step 4072 includes storing a plurality of array field values for an array field of a plurality of rows. Step 4074 includes determining a query including a query predicate indicating a universal quantifier applied to a set of elements of each array field value of the array field. Step 4076 includes applying an IO pipeline in conjunction with execution of the query.

Performing step 4076 can include performing some or all of steps 4078-4084. Step 4078 includes applying a first index element to identify a first proper subset of the plurality of rows having array field values that include a given non-null value denoted in the universal quantifier as one of the set of elements based on index data for the array field. Step 4080 includes applying a second index element to identify a second proper subset of the plurality of rows having an empty sets of elements for their array field values based on the index data for the array field. Step 4082 includes generating intermediate output by applying a union of the first proper subset and the second proper subset. Step 4084 includes generating a query resultant based on applying a filter element to intermediate output.

In various embodiments, an output of the filter element can include only rows of the union of the first proper subset and the second proper subset satisfying the universal quantifier. In various embodiments, a set difference between the output of the filter element and the intermediate output of the union is non-null.

In various embodiments, applying the IO pipeline in conjunction with execution of the query further includes: applying a filter element to the union of the first proper subset and the second proper subset, where an output of the filter element includes only rows of the union of the first proper subset and the second proper subset satisfying the universal quantifier, and/or where a set difference between the output of the filter element and the union is non-null, and the query resultant is further based on the output of the of the filter element.

In various embodiments, all of the second proper subset are included in the output of the filter element. In various embodiments, applying the IO pipeline in conjunction with execution of the query further include applying a source element to read a subset of the plurality of array field values corresponding to the union of the first proper subset and the second proper subset, wherein the filter element is applied to the output of the source element.

In various embodiments, the index data maps the second proper subset of the plurality of rows to empty sets of elements for the array field, where the index data further maps other proper subsets of the plurality of rows to non-null values of ones of their sets of elements of the array field. In various embodiments, the universal quantifier indicates equality of all of the set of elements of array field values of the array field with the given non-null value, and wherein one of the other proper subsets is the first proper subset. In various embodiments, generating the query resultant for the query further includes identifying a final proper subset of ones of the union of the first proper subset and the second proper subset having array field values of the array field with all of the set of elements equal to the given value. In various embodiments, a set difference between the final proper subset and the union includes at least one having an array field value of the array field with at least one of the set of elements equal to the given value, and with at least one of the set of elements not equal to the given value.

In various embodiments, a set difference between the plurality of rows and the union of the first proper subset and the second proper subset includes at least one row having null array field values and/or at least one row having a non-null array field value with a set of elements that includes at least one element having a null element value.

In various embodiments, the method further includes generating the index data. In various embodiments, generating the index data can include indexing the empty sets of elements for the array field of the of plurality of rows via the indexing scheme, wherein the second index element is applied based on indexing the empty sets of elements for the array field; and/or indexing a plurality of non-null values for the array field of the of plurality of rows via an indexing scheme, wherein the first index element is applied based on indexing of the given non-null value for the array field.

In various embodiments, the method further includes identifying ones of the plurality of rows having array field values of the array field equal to the empty sets of elements. In various embodiments, indexing the empty sets of elements for the array field of the of plurality of rows via the indexing scheme is based on indexing identified ones of the of the of plurality of rows.

In various embodiments, the indexing scheme is a probabilistic indexing scheme, and/or the IO pipeline includes at least one index-based IO construct. In various embodiments, the indexing scheme implements an inverted index structure.

In various embodiments, the first proper subset includes all rows of the plurality of rows having sets of elements of their array field values for the array field that all satisfy an equality condition with the given non-null value indicated by the universal quantifier.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a database system includes at least one processor and a memory storing executable instructions. The executable instructions, when executed via the at least one processor, can cause the database system to store a plurality of array field values for an array field of a plurality of rows, determine a query including a query predicate indicating a universal quantifier applied to a set of elements of each array field value of the array field, and/or apply an IO pipeline in conjunction with execution of the query. Applying an IO pipeline in conjunction with execution of the query can include applying a first index element to identify a first proper subset of the plurality of rows having array field values that include a given non-null value denoted in the universal quantifier as one of the set of elements based on index data for the array field; applying a second index element to identify a second proper subset of the plurality of rows having an empty sets of elements for their array field values based on the index data for the array field; generating intermediate output by applying a union of the first proper subset and the second proper subset; and/or generating a query resultant based on applying a filter element to intermediate output, where an output of the filter element includes only rows of the union of the first proper subset and the second proper subset satisfying the universal quantifier.

FIG. 40F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 40F. In particular, a node 37 can utilize the query processing module 2435 to execute some or all of the steps of FIG. 40E, where multiple nodes 37 implement their own query processing modules 2435 to independently execute the steps of FIG. 40F, for example, to facilitate execution of a query as participants in a query execution plan 2405.

Some or all of the method of FIG. 40F can be performed by the query processing system 2802, for example, by utilizing an operator execution flow generator module 2803 and/or a query execution module 2504. For example, some or all of the method of FIG. 40F can be performed by the IO pipeline generator module 2834 and/or the IO operator execution module 2840. Some or all of the method of FIG. 40F can be performed via communication with and/or access to a segment storage system 2508, such as memory drives 2425 of one or more nodes 37. Some or all of the steps of FIG. 40F can optionally be performed by any other processing module of the database system 10.

Some or all of the method of FIG. 40F can be performed via the IO pipeline generator module 2834 to generate an IO pipeline utilizing at least one index element for a given column. Some or all of the method of FIG. 40F can be performed via the segment indexing module to generate an index structure for data values of the given column. Some or all of the method of FIG. 40F can be performed via the query processing system 2802 based on implementing IO operator execution module that executes IO pipelines by utilizing at least one index element for the given column.

Some or all of the steps of FIG. 40F can be performed to implement some or all of the functionality of the segment processing module 2502 as described in conjunction with FIGS. 38A-38I, FIG. 39C, and/or FIGS. 40C-40D. Some or all of the steps of FIG. 40F can be performed to implement some or all of the functionality regarding execution of a query via the plurality of nodes in the query execution plan 2405 as described in conjunction with FIGS. 24A-24E. Some or all steps of FIG. 40F can be performed by database system 10 in accordance with other embodiments of the database system 10 and/or nodes 37 discussed herein. Some or all steps of FIG. 40F can be performed in conjunction with some or all steps of FIG. 38J, FIG. 38K, FIG. 39D, FIG. 40E, and/or any other method described herein.

Step 4071 includes storing a plurality of array field values for an array field of a plurality of rows. Step 4073 includes determining a query including a query predicate indicating a negation of an array operation for the array field. Step 4075 includes applying an IO pipeline in conjunction with execution of the query.

Performing step 4075 can include performing some or all of steps 4077, 4079, and/or 4081. Step 4077 includes applying a first index element to identify a first proper subset of the plurality of rows having array field values that include a given non-null value denoted in the array operation as one of its set of elements based on index data for the array field. Step 4079 includes applying a set of second index elements to identify a second proper subset of the plurality of rows based on index data of the indexing scheme for the first column. In various embodiments, each of the set of second index elements corresponds to one of a subset of a set of missing data-based conditions, and/or the proper subset of the plurality of rows includes ones of the plurality of rows having values for the first column included in the subset of the set of missing data-based conditions based on the index data for the array field. Step 4081 includes generating a query resultant for the query based on applying a set difference between the plurality of rows and a union of the first proper subset and the second proper subset.

In various embodiments, the method further includes indexing each of the set of missing data-based conditions for the array field via an indexing scheme. In various embodiments, the indexing scheme is a probabilistic indexing scheme, and/or the IO pipeline includes at least one index-based IO construct. In various embodiments, the indexing scheme implements an inverted index.

In various embodiments, the set of missing data-based conditions includes a null value condition, an empty array condition, and/or a null-inclusive array condition. In various embodiments, a first subset of the second proper subset have array field values satisfying the null value condition based on each array field value of the first subset each being a null value. In various embodiments, a second subset of the second proper subset satisfy the empty array condition based on each having an empty sets of elements for their array field value. In various embodiments, a third subset of the plurality of column values satisfy the null-inclusive array condition based each having a set of elements for their array field value that includes at least one element value having the null value.

In various embodiments, the array operation includes a universal quantifier applied to the set of elements of array field values. In various embodiments, the subset of the set of missing data-based conditions includes the null value condition, the empty array condition, and the null-inclusive array condition based on the array operation including the universal quantifier. In various embodiments, the second proper subset includes the first subset, the second subset, and the third subset based on the subset of the set of missing data-based conditions including the null value condition, the empty array condition, and the null-inclusive array condition.

In various embodiments, applying the IO pipeline in conjunction with execution of the query further includes applying a filtering element upon output of the union of the first proper subset and the second proper subset. In various embodiments output of the filtering element includes only rows of the union having array field values that satisfy at least one of: a universal statement that includes the universal quantifier; the null condition; the empty array condition; and/or the null-inclusive array condition. In various embodiments, the set difference is applied to the output of the filtering element and the plurality of rows. In various embodiments the output of the filtering element is a proper subset of the output of the union based on the output of filtering element not including at least one row of the union that: satisfies none of the set of missing data-based conditions, includes the given non-null value as one of its set of elements, and includes at least one other non-null value as another one of its set of elements.

In various embodiments, the array operation includes an existential quantifier applied to the set of elements of array field values, where the subset of the set of missing data-based conditions includes the null value condition, the null-inclusive array condition, and not the empty array condition based on the array operation including the existential quantifier. In various embodiments, the second proper subset includes the first subset and the third subset based on the subset of the set of missing data-based conditions including the null value condition and the null-inclusive array condition. In various embodiments, the output of the set difference includes at least one row having an array field value equal to the empty set of elements based on array operation including the existential quantifier.

In various embodiments, the method further includes generating the index data. In various embodiments, generating the index data includes indexing a plurality of non-null values for the array field of the of plurality of rows via an indexing scheme, where the first index element is applied based on indexing of the given non-null value for the array field. In various embodiments, indexing each of the set of missing data-based conditions for the array field via the indexing scheme includes: identifying ones of the plurality of rows having column values of the array field meeting one of the set of missing data-based conditions; and/or indexing the each of the ones of the plurality of rows for the one of the set of missing data-based conditions via the indexing scheme.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a database system includes at least one processor and a memory storing executable instructions. The executable instructions, when executed via the at least one processor, can cause the database system to store a plurality of array field values for an array field of a plurality of rows, determine a query including a query predicate indicating a negation of an array operation for the array field, and/or apply an IO pipeline in conjunction with execution of the query. Applying an IO pipeline in conjunction with execution of the query can include: applying a first index element to identify a first proper subset of the plurality of rows having array field values that include a given non-null value denoted in the array operation as one of its set of elements based on index data for the array field; applying a set of second index elements to identify a second proper subset of the plurality of rows based on index data of the indexing scheme for the first column, wherein each of the set of second index elements corresponds to one of a subset of a set of missing data-based conditions, and wherein the proper subset of the plurality of rows includes ones of the plurality of rows having values for the first column included in the subset of the set of missing data-based conditions based on the index data for the array field; and/or generating a query resultant for the query based on applying a set difference between the plurality of rows and a union of the first proper subset and the second proper subset.

FIGS. 41A-41D illustrate example embodiments of an IO pipeline generator module 2834 of a query processing system 2802 that generates IO pipelines 2835 for execution of operator execution flows 2817 that include predicates that include text inclusion conditions 3522. Some or all features and/or functionality of the query processing system 2802 of FIGS. 41A-41D can be utilized to implement the query processing system 2802 of FIG. 38G and/or any other embodiment of the query processing system described herein. The IO pipeline 2835 of FIGS. 41A-41D can be executed via an IO operator execution module 2840, such as the IO operator execution module 2840 of FIG. 38I and/or any other IO operator execution module 2840 described herein. The IO pipeline 2835 of FIGS. 41A-41D can be executed based on accessing a substring-based index structure 3560 of FIGS. 35A-35C. The IO pipeline generator module 2834 can implement the substring generator function 3550 of FIG. 35A.

FIG. 41A illustrates an embodiment of generating an IO pipeline 2835 for execution based on a text inclusion condition 3522, such as the text inclusion condition 3522 of FIG. 35A. A substring-based index structure 3560 and/or N-gram index structure can be implemented, where a set of substrings 3554.1-3554.R are generated for a given consecutive text pattern 3548 based on generating all substrings having a fixed length corresponding to a length of substrings in the indexing scheme included in the consecutive text pattern 3548 as discussed in conjunction with FIGS. 35A-35C. A corresponding set of R index elements 3862 of the corresponding IO pipeline can be implemented in a same or similar fashion as the index elements 3512 of FIG. 35A, where a set intersection of sets of rows identified by the set of R index elements 3862 corresponds to all rows having text in the corresponding column including every one of the set of substrings 3554.1-3554.R. A source element 3014 and corresponding filter element 3016 can be applied to identify which ones of the rows outputted by the set intersect element have text with the set of substrings 3554.1-3554 in accordance with the consecutive text pattern 3548, such as in an ordering defined by the consecutive text pattern 3548.

This can include performing a like-based function, such as a "LIKE" operator in SQL or another query language, or otherwise determining whether the sourced text for each row includes and/or matches the requirements of consecutive text pattern 3548 as discussed in conjunction with FIG. 35A. As a particular example, the text inclusion condition 3522 is implemented as A LIKE "abcd", where "abcd" is consecutive text pattern 3548, where A is the column identifier 3041, and where LIKE is the like-based function.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the text inclusion condition 3522. Another arrangement and/or set of elements of IO pipeline 2835 rendering logically equivalent output to the example IO pipeline 2835 of FIG. 41A can optionally be applied instead of the IO pipeline 2835 of FIG. 41A to implement some or all text inclusion conditions 3522 of query predicates 2822.

The IO pipeline can be generated based on selecting to a subset of the special index condition set 3815 that include no special indexing conditions 3817 and/or no missing data-based indexing conditions 3837, for example, based on the text inclusion condition 3522 and/or based on the text inclusion condition being non-negated and/or not corresponding to a quantifier applied to an array field containing text as elements of its arrays. Generating the IO pipeline can include selecting to not include index elements 3862 for the null value condition 3842, the empty array condition 3844, or the null-inclusive array condition 3846.

FIG. 41B illustrates an embodiment of generating an IO pipeline 2835 for execution based on a negation of text inclusion condition 3522, such as the negation of the text inclusion condition 3522 of FIGS. 35A and/or 41A. The negation of the text inclusion condition 3522 can correspond to identification of rows whose text for the given column do not include and/or match the consecutive text pattern 3548, and/or text for the given column where a like-based function for the consecutive text pattern 3548 renders false due to the text not including and/or match the consecutive text pattern 3548.

As a particular example, the negated text inclusion condition 3522 is implemented as A NOT LIKE "abcd", where "abcd" is consecutive text pattern 3548, where A is the column identifier 3041, where LIKE is the like-based function, and where NOT denotes negation.

The text inclusion condition 3522 of FIG. 41B can correspond to a type of non-negated condition 3915 of FIG. 39C. Thus, generating IO execution flows for operator execution flows 2817 negating the text inclusion condition 3522 can be generated based on some or all features discussed in conjunction with FIG. 39C.

In particular, the index elements for identifying rows satisfying this condition 3915 as discussed in conjunction with FIG. 39C includes the set of R index elements, the set intersect element 3319 applied to their output, and the subsequent souring and filtering to remove false positive (e.g. remove rows having text with the R substrings in the wrong ordering or in an arrangement that does not compare favorably to the consecutive text pattern 3548.)

The index elements for identifying rows not satisfying this condition 3915 and also not satisfying the negation of this condition 3915 includes an index element 3862 for the null value condition 3842 for same or similar reasons as discussed in conjunction with FIGS. 39B and 39C, for example, where a null value neither satisfies the text inclusion condition 3522 and/or its respective like-based function, nor the negation of the text inclusion condition 3522 and/or its respective like-based function, similarly to not satisfying equality or inequality conditions. A set union element 3218 can be applied to combine the output of set intersect element 3319 with a set of rows having null values for the given column identified via the index element 3862 for null value condition 3842, where the filtering element 3016 further filters for the condition A is NULL, or otherwise testing whether the text value for the given column is the null value, to include null valued text in the output set of rows, enabling these rows not satisfying the negated condition to be removed from output to ensure correct output for the negation of the text inclusion condition.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the negated text inclusion condition 3522. Another arrangement and/or set of elements of IO pipeline 2835 rendering logically equivalent output to the example IO pipeline 2835 of FIG. 41B can optionally be applied instead of the IO pipeline 2835 of FIG. 41B to implement some or all negations of text inclusion conditions 3522 of query predicates 2822.

The IO pipeline can be generated based on selecting to a subset of the special index condition set 3815 that includes the null value condition 3842, for example, based on the text inclusion condition 3522 being negated. Generating the IO pipeline can further include selecting to not include index elements 3862 for the empty array condition 3844 nor the null-inclusive array condition 3846.

FIG. 41C illustrates an embodiment of generating an IO pipeline 2835 for execution based on a disjunction 3212 of text inclusion conditions 3522, such as a text inclusion condition 3522 of FIGS. 35A and/or 41A. The disjunction of the text inclusion conditions 3522 can correspond to identification of rows whose text for a given column match either one of two consecutive text patterns 3548.A or 3548.B, and/or text for the given column where a like-based function for the consecutive text pattern 3548 renders true due to the text including and/or matching consecutive text pattern 3548.A and/or 3548.B.

The disjunction 3212 can be implemented in a same or similar fashion as discussed in conjunction with FIGS. 32A-32F. For example, the operands 3114.A and 3114.B of FIG. 32A can be implemented as like-based functions for the given column (or two different columns) for each of the two respective consecutive text patterns 3548.A or 3548.B. As a particular example, the disjunction 3212 is implemented as "A LIKE "abcd" OR A LIKE "efg%h", where A is column identifier 3041, where "%" is a wildcard character as discussed previously, where "abcd" is consecutive text pattern 3548.A, and where "efg%h" is consecutive text pattern 3548.B.

Based on the disjunction, a set union element 3319 can be applied to the output of sets of rows outputted by a respective set of index elements 3862. The first set of index elements can include R1 elements for a first one of the two set intersect elements 3319 and can be implemented to probe for R1 substrings for consecutive text pattern 3548.R1, for example, based on performing the substring generator function 3550 for consecutive text pattern 3548.A, while the second set of index elements can include R2 elements for a second one of the two set intersect elements 3319 and can be implemented to probe for R2 substrings for consecutive text pattern 3548.B, for example, based on performing the substring generator function 3550 for consecutive text pattern 3548.R2. R1 and R2 can be the same or different integer value. The values of R1 and R2 can be greater than or equal to 1 based on the number of substrings of the fixed length in each respective consecutive text pattern 3548.

Based on the disjunction, a set intersect element 3119 can be applied to the output of two set intersect elements 3319, each applied to sets of rows outputted by a respective set of index elements 3862. The first set of index elements can include R1 elements for a first one of the two set intersect elements 3319 and can be implemented to probe for R1 substrings for consecutive text pattern 3548.R1, for example, based on performing the substring generator function 3550 for consecutive text pattern 3548.A, while the second set of index elements can include R2 elements for a second one of the two set intersect elements 3319 and can be implemented to probe for R2 substrings for consecutive text pattern 3548.B, for example, based on performing the substring generator function 3550 for consecutive text pattern 3548.R2. R1 and R2 can be the same or different integer value. The values of R1 and R2 can be greater than or equal to 1 based on the number of substrings of the fixed length in each respective consecutive text pattern 3548.

The output of the set union element 3218 can thus include all rows that either include all of the R1 substrings of consecutive text pattern 3548.A, or all of the R2 substrings of consecutive text pattern 3548.B (or both). The source element 3014 and filter element 3016 can be applied to filter elements based on whether their text satisfies either consecutive text pattern 3548, for example, based on applying an OR operator.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the disjunction of text inclusion conditions 3522. Another arrangement and/or set of elements of IO pipeline 2835 rendering logically equivalent output to the example IO pipeline 2835 of FIG. 41C can optionally be applied instead of the IO pipeline 2835 of FIG. 41C to implement some or all disjunctions of text inclusion conditions 3522 of query predicates 2822.

The IO pipeline can be generated based on selecting to a subset of the special index condition set 3815 that include no special indexing conditions 3817 and/or no missing data-based indexing conditions 3837, for example, based on the disjunction of text inclusion conditions 3522, based on the disjunction of text inclusion conditions 3522 being non-negated, and/or based on neither operand of the disjunction being a negated text inclusion condition. Generating the IO pipeline can include selecting to not include index elements 3862 for the null value condition 3842, the empty array condition 3844, or the null-inclusive array condition 3846.

FIG. 41D illustrates an embodiment of generating an IO pipeline 2835 for execution based on a conjunction 3112 of text inclusion conditions 3522, such as a text inclusion condition 3522 of FIGS. 35A and/or 41A. The conjunction of the text inclusion conditions 3522 can correspond to identification of rows whose text for a given column match both of two consecutive text patterns 3548.A or 3548.B, and/or text for the given column where a like-based function for the consecutive text pattern 3548 renders true due to the text including and/or matching both consecutive text pattern 3548.A and 3548.B.

The conjunction 3112 can be implemented in a same or similar fashion as discussed in conjunction with FIGS. 31A-31F. For example, the operands 3114.A and 3114.B of FIG. 31A can be implemented as like-based functions for the given column (or two different columns) for each of the two respective consecutive text patterns 3548.A or 3548.B. As a particular example, the conjunction 3112 is implemented as "A LIKE "abcd" AND A LIKE "efg%h"", where A is column identifier 3041, where "%" is a wildcard character as discussed previously, where "abcd" is consecutive text pattern 3548.A, and where "efg%h" is consecutive text pattern 3548.B.

Rather than individually applying a set intersect element to each set separately to identify rows having all substrings for each given consecutive text pattern separately, a single intersect element can be collectively applied across all sets of rows outputted by all of these index elements to identify rows having all required substrings for both consecutive text patterns, for example, to leverage the use of set intersect elements in identifying each set and to further leverage the conjunction.

The output of the set intersect element 3319 can thus include all rows that include all of the R1 substrings of consecutive text pattern 3548.A, and also all of the R2 substrings of consecutive text pattern 3548.B. The source element 3014 and filter element 3016 can be applied to filter elements based on whether their text satisfies both consecutive text patterns 3548, for example, based on applying an AND operator.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the conjunction of text inclusion conditions 3522. Another arrangement and/or set of elements of IO pipeline 2835 rendering logically equivalent output to the example IO pipeline 2835 of FIG. 41D can optionally be applied instead of the IO pipeline 2835 of FIG. 41D to implement some or all conjunction of text inclusion conditions 3522 of query predicates 2822.

The IO pipeline can be generated based on selecting to a subset of the special index condition set 3815 that include no special indexing conditions 3817 and/or no missing data-based indexing conditions 3837, for example, based on the conjunction of text inclusion conditions 3522, based on the conjunction of text inclusion conditions 3522 being non-negated, and/or based on neither operand of the conjunction being a negated text inclusion condition. Generating the IO pipeline can include selecting to not include index elements 3862 for the null value condition 3842, the empty array condition 3844, or the null-inclusive array condition 3846.

FIG. 41E illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 41E. In particular, a node 37 can utilize the query processing module 2435 to execute some or all of the steps of FIG. 41E, where multiple nodes 37 implement their own query processing modules 2435 to independently execute the steps of FIG. 41E, for example, to facilitate execution of a query as participants in a query execution plan 2405.

Some or all of the method of FIG. 41E can be performed by the query processing system 2802, for example, by utilizing an operator execution flow generator module 2803 and/or a query execution module 2504. For example, some or all of the method of FIG. 41E can be performed by the IO pipeline generator module 2834 and/or the IO operator execution module 2840. Some or all of the method of FIG. 41E can be performed via communication with and/or access to a segment storage system 2508, such as memory drives 2425 of one or more nodes 37. Some or all of the steps of FIG. 41E can optionally be performed by any other processing module of the database system 10.

Some or all of the method of FIG. 41E can be performed via the IO pipeline generator module 2834 to generate an IO pipeline utilizing at least one index element for a given column. Some or all of the method of FIG. 41E can be performed via the segment indexing module to generate an index structure for data values of the given column. Some or all of the method of FIG. 41E can be performed via the query processing system 2802 based on implementing IO operator execution module that executes IO pipelines by utilizing at least one index element for the given column.

Some or all of the steps of FIG. 41E can be performed to implement some or all of the functionality of the segment processing module 2502 as described in conjunction with FIGS. 32A-32F, FIGS. 35A-35C, FIGS. 38A-38I, and/or FIG. 41C. Some or all of the steps of FIG. 41E can be performed to implement some or all of the functionality regarding execution of a query via the plurality of nodes in the query execution plan 2405 as described in conjunction with FIGS. 24A-24E. Some or all steps of FIG. 41E can be performed by database system 10 in accordance with other embodiments of the database system 10 and/or nodes 37 discussed herein. Some or all steps of FIG. 41E can be performed in conjunction with some or all steps of FIG. 32G, FIG. 35D, FIG. 38J, FIG. 38K, FIG. 39D, FIG. 40E, FIG. 40F, and/or any other method described herein.

Step 4172 includes storing a plurality of text data as a column of a plurality of rows. Step 4174 includes storing index data corresponding to the column indicating, for each substring of a plurality of substrings, ones of the plurality of rows with text data of the column that include the each substring of the plurality of substrings. Step 4176 includes determining a query having a query predicate that indicates a disjunction having a first operand and a second operand applied to the column of the plurality of rows. The first operand can indicate a first consecutive text pattern, and/or the second operand can indicate a second consecutive text pattern. Step 4178 includes executing the query.

Performing step 4178 can include performing some or all of steps 4180-4194. Step 4180 includes identifying a first set of substrings included in the first consecutive text pattern. Step 4182 includes identifying a first set of subsets of rows by utilizing the index data to identify, for each substring of the first set of substrings, a corresponding subset of the first set of subsets as a proper subset of the plurality of rows having text data of the column that includes the each substring of the first set of substrings. Step 4184 includes identifying a second set of substrings included in the second consecutive text pattern. Step 4186 includes identifying a second set of subsets of rows by utilizing the index data to identify, for each substring of the second set of substrings, a corresponding subset of the second set of subsets as a proper subset of the plurality of rows having text data of the column that includes the each substring of the second set of substrings. Step 4188 includes identifying a first intermediate subset of rows as a first intersection applied to the first set of subsets of rows. Step 4190 includes identifying a second intermediate subset of rows as a second intersection applied to the second set of subsets of rows. Step 4192 includes identifying a third intermediate subset of rows as a union applied to the first intermediate subset of rows and the second intermediate subset of rows. Step 4194 includes identifying a filtered subset based on comparing the text data of only rows in the third intermediate subset of rows to the first consecutive text pattern and the second consecutive text pattern to identify ones of the intermediate subset of rows with text data comparing favorably to at least one of: the first consecutive text pattern or the second consecutive text pattern.

In various embodiments identifying the filtered subset of the plurality of rows is further based on reading a set of text data based on reading the text data from only rows in the third intermediate subset of rows. In various embodiments, comparing the text data of only the rows in the third intermediate subset of rows to the first consecutive text pattern and the second consecutive text pattern is based on utilizing only text data in the set of text data.

In various embodiments, identifying the filtered subset of the plurality of rows is further based on applying the disjunction having the first operand and the second operand to the text data of rows in the third intermediate subset of rows.

In various embodiments, the text data is implemented via one of: a string datatype or a varchar datatype. In various embodiments, the index data for the column is in accordance with an inverted indexing scheme.

In various embodiments, a set difference between the filtered subset and the third intermediate subset of rows is non-null. In various embodiments, the set difference includes at least one row having text data that includes every one of the first set of substrings in a different arrangement than an arrangement dictated by the first consecutive text pattern, and further having text data that does not include at least one of the second set of substrings.

In various embodiments, the first set of substrings includes more than one substring, and the first set of subsets of rows includes more than one subset of rows. In various embodiments, the first set of substrings includes exactly one substring, and the first set of subsets of rows includes exactly one subset of rows.

In various embodiments, the text data for at least one row in the filtered subset has a first length that is at least one of: greater than a length of the first consecutive text pattern, or greater than a length of the second consecutive text pattern. In various embodiments, the first consecutive text pattern includes at least one wildcard character. In various embodiments identifying the first set of substrings is based on skipping the at least one wildcard character. In various embodiments, each of the first set of substrings includes no wildcard characters.

In various embodiments, identifying the filtered subset includes applying at least one probabilistic index-based IO construct of an IO pipeline generated for a query indicating the first consecutive text pattern and/or the second consecutive text pattern in at least one query predicate.

In various embodiments, the method includes determining a same fixed-length for the first plurality of substrings and the second plurality of substrings. In various embodiments, the same fixed-length is based on a fixed length of a substring-based indexing scheme for the column. In various embodiments, the same fixed-length for the substring-based indexing scheme is a selected fixed-length parameter from a plurality of fixed-length options. In various embodiments, each of the first plurality of substrings and each of the second plurality of substrings include exactly three characters.

In various embodiments, identifying the first set of substrings included in the first consecutive text pattern includes identifying every possible substring of the same-fixed length included in the first consecutive text pattern. In various embodiments, each subset of the first set of subsets and the second set of subsets is identified in parallel with other subset of the set of subsets via a corresponding set of parallelized processing resources.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a database system includes at least one processor and a memory storing executable instructions. The executable instructions, when executed via the at least one processor, can cause the database system to store a plurality of text data as a column of a plurality of rows, and to store index data corresponding to the column indicating, for each substring of a plurality of substrings, ones of the plurality of rows with text data of the column that include the each substring of the plurality of substrings. The executable instructions, when executed via the at least one processor, can cause the database system to determine a query having a query predicate that indicates a disjunction having a first operand and a second operand applied to the column of the plurality of rows, where the first operand indicates a first consecutive text pattern, and where the second operand indicates a second consecutive text pattern. The executable instructions, when executed via the at least one processor, can cause the database system to execute the query by: identifying a first set of substrings included in the first consecutive text pattern; identifying a first set of subsets of rows by utilizing the index data to identify, for each substring of the first set of substrings, a corresponding subset of the first set of subsets as a proper subset of the plurality of rows having text data of the column that includes the each substring of the first set of substrings; identifying a second set of substrings included in the second consecutive text pattern; identifying a second set of subsets of rows by utilizing the index data to identify, for each substring of the second set of substrings, a corresponding subset of the second set of subsets as a proper subset of the plurality of rows having text data of the column that includes the each substring of the second set of substrings; identifying a first intermediate subset of rows as a first intersection applied to the first set of subsets of rows; identifying a second intermediate subset of rows as a second intersection applied to the second set of subsets of rows; identifying a third intermediate subset of rows as a union applied to the first intermediate subset of rows and the second intermediate subset of rows; and/or identifying a filtered subset based on comparing the text data of only rows in the third intermediate subset of rows to the first consecutive text pattern and the second consecutive text pattern to identify ones of the intermediate subset of rows with text data comparing favorably to at least one of: the first consecutive text pattern or the second consecutive text pattern.

FIG. 41F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 41F. In particular, a node 37 can utilize the query processing module 2435 to execute some or all of the steps of FIG. 41F, where multiple nodes 37 implement their own query processing modules 2435 to independently execute the steps of FIG. 41F, for example, to facilitate execution of a query as participants in a query execution plan 2405.

Some or all of the method of FIG. 41F can be performed by the query processing system 2802, for example, by utilizing an operator execution flow generator module 2803 and/or a query execution module 2504. For example, some or all of the method of FIG. 41F can be performed by the IO pipeline generator module 2834 and/or the IO operator execution module 2840. Some or all of the method of FIG. 41F can be performed via communication with and/or access to a segment storage system 2508, such as memory drives 2425 of one or more nodes 37. Some or all of the steps of FIG. 41F can optionally be performed by any other processing module of the database system 10.

Some or all of the method of FIG. 41F can be performed via the IO pipeline generator module 2834 to generate an IO pipeline utilizing at least one index element for a given column. Some or all of the method of FIG. 41F can be performed via the segment indexing module to generate an index structure for data values of the given column. Some or all of the method of FIG. 41F can be performed via the query processing system 2802 based on implementing IO operator execution module that executes IO pipelines by utilizing at least one index element for the given column.

Some or all of the steps of FIG. 41F can be performed to implement some or all of the functionality of the segment processing module 2502 as described in conjunction with FIGS. 31A-31E, FIGS. 35A-35C, FIGS. 38A-38I, and/or FIG. 41D. Some or all of the steps of FIG. 41F can be performed to implement some or all of the functionality regarding execution of a query via the plurality of nodes in the query execution plan 2405 as described in conjunction with FIGS. 24A-24E. Some or all steps of FIG. 41F can be performed by database system 10 in accordance with other embodiments of the database system 10 and/or nodes 37 discussed herein. Some or all steps of FIG. 41F can be performed in conjunction with some or all steps of FIG. 31F, FIG. 35D, FIG. 38J, FIG. 38K, FIG. 39D, FIG. 40E, FIG. 40F, FIG. 41E, and/or any other method described herein.

Step 4171 includes storing a plurality of text data as a column of a plurality of rows. Step 4173 includes storing index data corresponding to the column indicating, for each substring of a plurality of substrings, ones of the plurality of rows with text data of the column that include the each substring of the plurality of substrings. Step 4175 includes determining a query having a query predicate that indicates a conjunction having a first operand and a second operand applied to the column of the plurality of rows. The first operand can indicate a first consecutive text pattern, and/or the second operand can indicate a second consecutive text pattern. Step 4177 includes executing the query.

Performing step 4177 can include performing some or all of steps 4179-4189. Step 4179 includes identifying a first set of substrings included in the first consecutive text pattern. Step 4181 includes identifying a first set of subsets of rows by utilizing the index data to identify, for each substring of the first set of substrings, a corresponding subset of the first set of subsets as a proper subset of the plurality of rows having text data of the column that includes the each substring of the first set of substrings; Step 4183 includes identifying a second set of substrings included in the second consecutive text pattern. Step 4185 includes identifying a second set of subsets of rows by utilizing the index data to identify, for each substring of the second set of substrings, a corresponding subset of the second set of subsets as a proper subset of the plurality of rows having text data of the column that includes the each substring of the second set of substrings. Step 4187 includes identifying an intermediate subset of rows as an intersection applied across all subsets included in the first set of subsets of rows and the second set of subsets of rows. In various embodiments, each row of the intermediate subset of rows is included in all subsets of first set of subsets and is further included in all subsets of the second set of subsets. Step 4189 includes identifying a filtered subset based on comparing the text data of only rows in the intermediate subset of rows to the first consecutive text pattern and the second consecutive text pattern to identify ones of the intermediate subset of rows with text data comparing favorably to both the first consecutive text pattern and the second consecutive text pattern.

In various embodiments identifying the filtered subset of the plurality of rows is further based on reading a set of text data based on reading the text data from only rows in the intermediate subset of rows. In various embodiments, comparing the text data of only the rows in the intermediate subset of rows to the first consecutive text pattern and the second consecutive text pattern is based on utilizing only text data in the set of text data.

In various embodiments, identifying the filtered subset of the plurality of rows is further based on applying the conjunction having the first operand and the second operand to the text data of rows in the intermediate subset of rows.

In various embodiments, the text data is implemented via one of: a string datatype or a varchar datatype. In various embodiments, the index data for the column is in accordance with an inverted indexing scheme.

In various embodiments, a set difference between the filtered subset and the intermediate subset of rows is non-null. In various embodiments, the set difference includes at least one row having text data that includes every one of the first set of substrings in a different arrangement than an arrangement dictated by the first consecutive text pattern.

In various embodiments, the first set of substrings includes more than one substring and/or the first set of subsets of rows includes more than one subset of rows. In various embodiments, the first set of substrings includes exactly one substring and/or the first set of subsets of rows includes exactly one subset of rows.

In various embodiments, the text data for at least one row in the filtered subset has a first length greater than a length of the first consecutive text pattern and greater than a length of the second consecutive text pattern. In various embodiments, the first consecutive text pattern includes at least one wildcard character. In various embodiments, identifying the first set of substrings is based on skipping the at least one wildcard character. In various embodiments, each of the first set of substrings includes no wildcard characters.

In various embodiments, identifying the filtered subset includes applying at least one probabilistic index-based IO construct of an IO pipeline generated for a query indicating the first consecutive text pattern in at least one query predicate.

In various embodiments, the method includes determining a same fixed-length for the first plurality of substrings and the second plurality of substrings. In various embodiments, the same fixed-length is based on a fixed length of a substring-based indexing scheme for the column. In various embodiments, the same fixed-length for the substring-based indexing scheme is a selected fixed-length parameter from a plurality of fixed-length options. In various embodiments, each of the first plurality of substrings and each of the second plurality of substrings include exactly three characters.

In various embodiments, identifying the first set of substrings included in the first consecutive text pattern includes identifying every possible substring of the same-fixed length included in the first consecutive text pattern. In various embodiments, each subset of the first set of subsets and the second set of subsets is identified in parallel with other subset of the set of subsets via a corresponding set of parallelized processing resources.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a database system includes at least one processor and a memory storing executable instructions. The executable instructions, when executed via the at least one processor, can cause the database system to store a plurality of text data as a column of a plurality of rows, and to store index data corresponding to the column indicating, for each substring of a plurality of substrings, ones of the plurality of rows with text data of the column that include the each substring of the plurality of substrings. The executable instructions, when executed via the at least one processor, can cause the database system to determine a query having a query predicate that indicates a conjunction having a first operand and a second operand applied to the column of the plurality of rows, where the first operand indicates a first consecutive text pattern, and where the second operand indicates a second consecutive text pattern. The executable instructions, when executed via the at least one processor, can cause the database system to execute the query by: identifying a first set of substrings included in the first consecutive text pattern; identifying a first set of subsets of rows by utilizing the index data to identify, for each substring of the first set of substrings, a corresponding subset of the first set of subsets as a proper subset of the plurality of rows having text data of the column that includes the each substring of the first set of substrings; identifying a second set of substrings included in the second consecutive text pattern; identifying a second set of subsets of rows by utilizing the index data to identify, for each substring of the second set of substrings, a corresponding subset of the second set of subsets as a proper subset of the plurality of rows having text data of the column that includes the each substring of the second set of substrings; identifying an intermediate subset of rows as an intersection applied across all subsets included in the first set of subsets of rows and the second set of subsets of rows, wherein each row of the intermediate subset of rows is included in all subsets of first set of subsets and is further included in all subsets of the second set of subsets; and/or identifying a filtered subset based on comparing the text data of only rows in the intermediate subset of rows to the first consecutive text pattern and the second consecutive text pattern to identify ones of the intermediate subset of rows with text data comparing favorably to both the first consecutive text pattern and the second consecutive text pattern.

FIG. 42A illustrates an example embodiment of a database system implementing a substring-based index structure 3570 for substrings included in text data of array elements of array structures of an array field. The substring-based index structure 3570.A for a given column A can be generated via an index structure generator module 3560. Some or all feature and/or functionality of the segment indexing module 2510, index structure generator module 3560, and/or substring-based index structure 3570 of FIG. 42A can be utilized to implement any embodiment of the segment indexing module 2510, index structure generator module 3560, and/or substring-based index structure 3570 described herein.

The segment indexing module 2510, index structure generator module 3560, and/or substring-based index structure 3570 of FIG. 42A can be implemented in a similar fashion as discussed in conjunction with FIG. 35B. In particular, any given substring implemented as an index value 3043 can be similarly mapped to all rows having text that include the substring.

However, as the given column is an array field 2712 where some or all individual array elements of array structures that are values 3024 for the given column are text data, the substring-based index structure 3570 can be implemented in a similar fashion as the index data 3820 of FIG. 38F. In particular, any given substring implemented as an index value 3043 can be similarly mapped to all rows having at least one array element of its array structure that include the substring, again implementing the indexing as existential quantifier-based indexing as discussed previously. While only determination of substring sets for the first array element of each array of the first three rows is illustrated, every given array element of the array for every row can have its text data segregated into substrings to enable mapping of any given substring to all rows containing at least one text element containing the given substring. The index values 3843, 3845, and 3847 can also be indexed to identify rows with the null value as its value 3024, with an empty array containing zero elements, and with arrays containing at least one null element as discussed in conjunction with FIG. 38F.

FIGS. 42B-42E illustrate example embodiments of a illustrate example embodiments of an IO pipeline generator module 2834 of a query processing system 2802 that generates IO pipelines 2835 for execution of operator execution flows 2817 that include predicates that include text inclusion conditions 3522 applied to array operations, such as quantifiers, for text data of array elements included in array structures of array fields. Some or all features and/or functionality of the query processing system 2802 of FIGS. 42B-42E can be utilized to implement the query processing system 2802 of FIG. 38H and/or any other embodiment of the query processing system described herein. The IO pipeline 2835 of FIGS. 42B-42E can be executed via an IO operator execution module 2840, such as the IO operator execution module 2840 of FIG. 38I and/or any other IO operator execution module 2840 described herein. The IO pipeline 2835 of FIGS. 42B-42E can be executed based on accessing a substring-based index structure 3560 of FIG. 42A. The IO pipeline generator module 2834 can implement the substring generator function 3550 of FIG. 35A.

FIG. 42B illustrates an embodiment of generating an IO pipeline 2835 for execution based on a universal quantifier for a text inclusion conditions 3522 applied to array elements of arrays of an array field 2712. The universal quantifier for a text inclusion condition 3522 can correspond to identification of rows whose array fields have a set of array elements whose text data all include and/or match a given consecutive text pattern 3548, and/or where a like-based function applied to the text of all array elements renders true for all array elements due to the text of all array elements including and/or matching consecutive text pattern 3548.

The universal quantifier 4012 can be implemented in a same or similar fashion as discussed in conjunction with FIG. 40A. For example, the non-null value 3863 can be implemented as the consecutive text pattern 3548, where a like-based condition being satisfied for this non-null value 3863 is required for each element of the array rather than equality with this non-null value 3863. As a particular example, the query expression is implemented as: for_all(A) LIKE "abcd", where A is column identifier 3041, where "abcd" is consecutive text pattern 3548, where for_all( ) applies the universal quantifier, and where LIKE implements the like-based function.

As illustrated in FIG. 42B, rather than implementing a single index element to probe for the non-null value 3863 as discussed in conjunction with FIG. 40A, the corresponding IO pipeline can implement a set intersection of a set of R index elements for the set of R substrings identified for the consecutive text pattern based on the index being a substring-based index and/or based on the condition for the universal quantifier being a like-based function applied to text-data array elements of the arrays of the array field.

The output of the set intersect element 3319 can correspond to all rows having array for the array field with each substring included in one of its array elements. Note that a given row in this output may not have any array elements whose text includes all of the substrings due to the nature of the substring-based index structure 3570 as discussed in conjunction with FIG. 40A, where different array elements for a given row's array structure can include different ones of the substrings 1-R. However, as both the universal quantifier for indexing on arrays and the like-based function applied to substring-based index structures require sourcing and indexing due to their output being considered probabilistic, the combination of these features requires such sourcing and filtering.

The IO pipeline can further apply another index element 3862 for the empty array condition 3844 as discussed in conjunction with FIG. 40A, for example, due to the universal quantifier 4012 and/or due to the universal quantifier 4012 being non-negated, as empty arrays will satisfy the universal quantifier 4012 due to all of their zero elements including and/or matching the consecutive text pattern 3548.

A set union element can be applied to the output of this additional index element and output of the set intersect element 3319, where all rows are sourced and filtered via a source element and filtering element. The filtering element 3016 can be operable to identify and retain only rows meeting the universal quantifier, such as for_all(A) LIKE "abcd" or other consecutive text pattern 3548, which includes retention of the empty arrays identified via the additional index element as discussed in conjunction with FIG. 40A. Enforcing this requirement via filtering element 3016 removes any identified rows having all substrings included in different text of different array elements of their array structure, and further removes any identified rows having all substrings included in the text of given array elements of their array structure in a wrong ordering or otherwise in an arrangement not comparing favorably to consecutive text pattern 3548. Only rows where all substrings are included in all given array elements in the arrangement required by the consecutive text pattern 3548 remain in the output (including rows with empty arrays), guaranteeing a correct output. The output can be guaranteed to include all rows having empty arras as values for the array field. The output can be guaranteed to include no rows having null values as values for the array field, and no rows having any null values as values for array elements of the array field.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the universal quantifiers for text inclusion conditions 3522. Another arrangement and/or set of elements of IO pipeline 2835 rendering logically equivalent output to the example IO pipeline 2835 of FIG. 42B can optionally be applied instead of the IO pipeline 2835 of FIG. 42B to implement some or all universal quantifiers for text inclusion conditions 3522 of query predicates 2822.

The IO pipeline can be generated based on selecting to a subset of the special index condition set 3815 that include the empty array condition 3844, for example, based on the universal quantifier 4012 and/or based on the universal quantifier 4012 being applied for a non-negated inclusion condition 3522. Generating the IO pipeline can further include selecting to not include index elements 3862 for the null value condition 3842 or the null-inclusive array condition 3846.

FIG. 42C illustrates an embodiment of generating an IO pipeline 2835 for execution based on an existential quantifier for a text inclusion conditions 3522 applied to array elements of arrays of an array field 2712. The existential quantifier for a text inclusion condition 3522 can correspond to identification of rows whose array fields have a set of array elements where text data for at least one of this set of array elements include and/or match a given consecutive text pattern 3548, and/or where a like-based function applied to the text of all array elements renders true for at least one array elements due to the text of at least one array elements including and/or matching consecutive text pattern 3548.

The existential quantifier 4013 can be implemented in a same or similar fashion as discussed in conjunction with FIG. 40B. For example, the non-null value 3863 can be implemented as the consecutive text pattern 3548, where a like-based condition being satisfied for this non-null value 3863 is required for at least one element of the array rather than equality with this non-null value 3863. As a particular example, the query expression is implemented as "for_some (A) LIKE "abcd", where A is column identifier 3041, where "abcd" is consecutive text pattern 3548, where for_some( ) applies the existential quantifier, and where LIKE implements the like-based function.

As illustrated in FIG. 42C, rather than implementing a single index element to probe for the non-null value 3863 as discussed in conjunction with FIG. 40B, the corresponding IO pipeline can implement a set intersection of a set of R index elements for the set of R substrings identified for the consecutive text pattern based on the index being a substring-based index and/or based on the condition for the existential quantifier being a like-based function applied to text-data array elements of the arrays of the array field.

The output of the set intersect element 3319 can correspond to all rows having array for the array field with each substring included in one of its array elements. Thus, as both the indexing of substrings for arrays and the like-based function applied to substring-based index structures require sourcing and indexing due to their output being considered probabilistic, the combination of these features again requires sourcing and filtering, despite the existential quantifier-based nature of the index structure. The filtering element 3016 can be operable to identify and retain only rows meeting the existential quantifier, such as for_some(A) LIKE "abcd" or other consecutive text pattern 3548, which includes retention of the empty arrays identified via the additional index element as discussed in conjunction with FIG. 40A. Enforcing this requirement via filtering element 3016 removes any identified rows having all substrings included in different text of different array elements of their array structure, and further removes any identified rows having all substrings included in the text of a given array element of their array structure in a wrong ordering or otherwise in an arrangement not comparing favorably to consecutive text pattern 3548. Only rows where all substrings are included in at least one given array element in the arrangement required by the consecutive text pattern 3548 remain in the output, guaranteeing a correct output.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the existential quantifiers for text inclusion conditions 3522. Another arrangement and/or set of elements of IO pipeline 2835 rendering logically equivalent output to the example IO pipeline 2835 of FIG. 42C can optionally be applied instead of the IO pipeline 2835 of FIG. 42C to implement some or all existential quantifiers for text inclusion conditions 3522 of query predicates 2822.

The IO pipeline can be generated based on selecting a subset of the special index condition set 3815 that includes none of the special indexing conditions and/or none of the missing data-based conditions based on the existential quantifier 4013 and/or the existential quantifier being applied to non-negated being applied for a non-negated text inclusion condition 3522. Generating the IO pipeline can include selecting to not include index elements 3862 for the null value condition 3842, the empty array condition 3844, or the null-inclusive array condition 3846.

FIG. 42D illustrates an embodiment of generating an IO pipeline 2835 for execution based on a negation of a universal quantifier for a text inclusion conditions 3522 applied to array elements of arrays of an array field 2712. The negated universal quantifier for a text inclusion condition 3522 can correspond to an existential quantifier for the negation of the text inclusion condition 3522, which can correspond to identification of rows whose array fields have a set of array elements where text data for at least one of the set of array elements does not include and/or does not match a given consecutive text pattern 3548, and/or where a like-based function applied to the text of all array elements renders false for at least one array elements due to the text of at least one array element not including and/or matching consecutive text pattern 3548.

The negation of the universal quantifier 4012 can be implemented in a same or similar fashion as discussed in conjunction with FIG. 40C. For example, the non-null value 3863 can be implemented as the consecutive text pattern 3548, where a like-based condition being not satisfied for this non-null value 3863 is required for at least one element of the array rather than inequality with this non-null value 3863. As a particular example, the query expression is implemented as NOT for_all(A) LIKE "abcd", or as for_some(A) NOT LIKE "abcd".

As illustrated in FIG. 42D, rather than implementing a single index element to probe for the non-null value 3863 as discussed in conjunction with FIG. 40C, the corresponding IO pipeline can implement a set intersection of a set of R index elements for the set of R substrings identified for the consecutive text pattern based on the index being a substring-based index and/or based on the condition for the universal quantifier being a like-based function applied to text-data array elements of the arrays of the array field. The output of the set intersect element 3319 can correspond to all rows having array for the array field with each substring included in one of its array elements as discussed in conjunction with FIG. 42B.

The IO pipeline can further apply a set of additional index elements 3862 for the null value condition 3842, empty array condition 3844, and null-inclusive array condition 3846 as discussed in conjunction with FIG. 40C, for example, due to the universal quantifier 4012 being negated and/or due to an existential quantifier being applied for a negated text inclusion condition 3522, due to some or all rows satisfying these qualities requiring identification for filtering via the set difference as discussed in in conjunction with FIG. 40C.

A set union element can be applied to the output of these additional index element and output of the set intersect element 3319, where all rows are sourced and filtered via a source element and filtering element. The filtering element 3016 can be operable to identify and retain only rows meeting the universal quantifier, such as: for_all(A) LIKE "abed" OR A is NULL or for_all(A) is NULL. This includes retention of all rows not satisfying the negated condition as discussed in conjunction with FIG. 40C, enabling the corresponding rows to be removed to apply the negation via the set difference. Rows where all substrings are included in all given array elements in the arrangement required by the consecutive text pattern 3548 (including rows with empty arrays), rows with null values, and rows with all its values as null will be removed from the output via the set difference, guaranteeing a correct output. In some embodiments, the filtering element can further require !for_some(A) LIKE "abed", or another logically equivalent statement, and/or the output can otherwise be guaranteed to not include any rows having all elements that either: include and/or match the consecutive text pattern, or are null elements.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the negations of universal quantifiers for text inclusion condition, or existential quantifiers of a negation of the text inclusion condition. Another arrangement and/or set of elements of IO pipeline 2835 rendering logically equivalent output to the example IO pipeline 2835 of FIG. 42D can optionally be applied instead of the IO pipeline 2835 of FIG. 42D to implement some or all negations of universal quantifiers for text inclusion conditions 3522, or existential quantifiers of negated text inclusion condition, of query predicates 2822.

The IO pipeline can be generated based on selecting to a subset of the special index condition set 3815 that includes index elements 3862 for the null value condition 3842, the empty array condition 3844, and the null-inclusive array condition 3846, for example, based on the negations of the universal quantifiers for the text inclusion conditions 3522, or based on an existential quantifier of a negation of the text inclusion condition.

FIG. 42E illustrates an embodiment of generating an IO pipeline 2835 for execution based on a negation of an existential quantifier for a text inclusion conditions 3522 applied to array elements of arrays of an array field 2712. The negated existential quantifier for a text inclusion condition 3522 can correspond to a universal quantifier for the negation of the text inclusion condition 3522, which can correspond to identification of rows whose array fields have a set of array elements where text data for all of the set of array elements do not include and/or do not match a given consecutive text pattern 3548, and/or where a like-based function applied to the text of all array elements renders false for all array elements due to the text of all array elements not including and/or matching consecutive text pattern 3548.

The negation of the existential quantifier 4013 can be implemented in a same or similar fashion as discussed in conjunction with FIG. 40D. For example, the non-null value 3863 can be implemented as the consecutive text pattern 3548, where a like-based condition being not satisfied for this non-null value 3863 is required for all elements of the array rather than inequality with this non-null value 3863. As a particular example, the query expression is implemented as NOT for_some(A) LIKE "abed", or as for_all(A) NOT LIKE "abed".

As illustrated in FIG. 42E, rather than implementing a single index element to probe for the non-null value 3863 as discussed in conjunction with FIG. 40D, the corresponding IO pipeline can implement a set intersection of a set of R index elements for the set of R substrings identified for the consecutive text pattern based on the index being a substring-based index and/or based on the condition for the universal quantifier being a like-based function applied to text-data array elements of the arrays of the array field. The output of the set intersect element 3319 can correspond to all rows having array for the array field with each substring included in one of its array elements as discussed in conjunction with FIG. 42B.

The IO pipeline can further apply a set of additional index elements 3862 for the null value condition 3842 and null-inclusive array condition 3846 as discussed in conjunction with FIG. 40D, for example, due to the existential quantifier 4013 being negated and/or due to a universal quantifier being applied for a negated text inclusion condition 3522, due to some or all rows satisfying these qualities requiring identification for filtering via the set difference as discussed in in conjunction with FIG. 40D.

A set union element can be applied to the output of these additional index element and output of the set intersect element 3319, where all rows are sourced and filtered via a source element and filtering element. The filtering element 3016 can be operable to identify and retain only rows meeting the universal quantifier, such as: for_some(A) LIKE "abed" OR A is NULL or for_some(A) is NULL. This includes retention of all rows not satisfying the negated condition as discussed in conjunction with FIG. 40D, enabling the corresponding rows to be removed to apply the negation via the set difference. Rows where all substrings are included in at least one given array element in the arrangement required by the consecutive text pattern 3548, rows with null values, and rows with all its values as null will be removed from the output via the set difference, guaranteeing a correct output. The output can be guaranteed to include all rows with empty arrays for the given column to further guarantee correct output, based on these rows not being identified and/or retained in the indexing and filtering, and thus being included in the output of the set difference.

These elements of IO pipeline 2835 can be optionally applied after one or more other downstream elements, for example, that previously filtered and/or identified subsets of rows based on other portions of the query predicates 2822. Other elements can be applied in the IO pipeline 2835 if the query predicates 2822 include further requirements beyond the negations of existential quantifiers for text inclusion condition, or universal quantifiers of a negation of the text inclusion condition. Another arrangement and/or set of elements of IO pipeline 2835 rendering logically equivalent output to the example IO pipeline 2835 of FIG. 42E can optionally be applied instead of the IO pipeline 2835 of FIG. 42E to implement some or all negations of existential quantifiers for text inclusion conditions 3522, or universal quantifiers of negated text inclusion condition, of query predicates 2822.

The IO pipeline can be generated based on selecting to a subset of the special index condition set 3815 that includes index elements 3862 for the null value condition 3842 and the null-inclusive array condition 3846, and not the empty array condition 3844, for example, based on the negations of the existential quantifiers for the text inclusion conditions 3522, or based on a universal quantifier of a negation of the text inclusion condition.

FIG. 42F illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 42F. In particular, a node 37 can utilize the query processing module 2435 to execute some or all of the steps of FIG. 42F, where multiple nodes 37 implement their own query processing modules 2435 to independently execute the steps of FIG. 42F, for example, to facilitate execution of a query as participants in a query execution plan 2405.

Some or all of the method of FIG. 42F can be performed by the query processing system 2802, for example, by utilizing an operator execution flow generator module 2803 and/or a query execution module 2504. For example, some or all of the method of FIG. 42F can be performed by the IO pipeline generator module 2834 and/or the IO operator execution module 2840. Some or all of the method of FIG. 42F can be performed via communication with and/or access to a segment storage system 2508, such as memory drives 2425 of one or more nodes 37. Some or all of the steps of FIG. 42F can optionally be performed by any other processing module of the database system 10.

Some or all of the method of FIG. 42F can be performed via the IO pipeline generator module 2834 to generate an IO pipeline utilizing at least one index element for a given column. Some or all of the method of FIG. 42F can be performed via the segment indexing module to generate an index structure for data values of the given column. Some or all of the method of FIG. 42E can be performed via the query processing system 2802 based on implementing IO operator execution module that executes IO pipelines by utilizing at least one index element for the given column.

Some or all of the steps of FIG. 42F can be performed to implement some or all of the functionality of the segment processing module 2502 as described in conjunction with FIGS. 35A-35C, FIGS. 38A-38I, FIGS. 40A-40D, and/or FIGS. 42A-42E. Some or all of the steps of FIG. 42E can be performed to implement some or all of the functionality regarding execution of a query via the plurality of nodes in the query execution plan 2405 as described in conjunction with FIGS. 24A-24E. Some or all steps of FIG. 42F can be performed by database system 10 in accordance with other embodiments of the database system 10 and/or nodes 37 discussed herein. Some or all steps of FIG. 42F can be performed in conjunction with some or all steps of FIG. 35D, FIG. 38J, FIG. 38K, FIG. 39D, FIG. 40E, FIG. 40F, FIG. 41E, FIG. 41F, and/or any other method described herein.

Step 4272 includes storing a plurality of sets of text data as a plurality of sets of element values of a plurality of array field values of an array field of a plurality of rows. Step 4274 includes storing index data corresponding to the array field indicating, for each substring of a plurality of substrings, ones of the plurality of rows with text data of one of a set of element value of a corresponding array field value that include the each substring of the plurality of substrings. Step 4276 includes determining a query having a query predicate that indicates an array operation applied to the applied to the array field of the plurality of rows, where the array operation indicates a consecutive text pattern. Step 4278 includes executing the query.

Performing step 4278 can include performing some or all of steps 4280-4286. Step 4280 includes identifying a set of substrings included in the consecutive text pattern. Step 4282 includes identifying a set of subsets of rows by utilizing the index data to identify, for each substring of the set of substrings, a corresponding subset of the set of subsets as a proper subset of the plurality of rows having text data of at least one element of an array field value of the array field that includes the each substring of the first set of substrings. Step 4284 includes identifying an intermediate subset of rows as an intersection to the set of subsets of rows. Step 4286 includes identifying a filtered subset based on comparing the text data of only rows in the intermediate subset of rows to the consecutive text pattern to identify ones of the intermediate subset of rows with array field values satisfying the array operation.

In various embodiments, identifying the filtered subset of the plurality of rows is further based on reading a set of text data based on reading the text data from only rows in the intermediate subset of rows. In various embodiments, comparing the text data of only the rows in the intermediate subset of rows to the is based on utilizing only text data in the set of text data.

In various embodiments, identifying the filtered subset of the plurality of rows is further based on identifying an additional subset of rows having array field values that correspond to empty sets of elements based on the array operation including a universal quantifier, where the additional subset of rows is included in the filtered subset of the plurality of rows.

In various embodiments, the text data is implemented via one of: a string datatype or a varchar datatype. In various embodiments, the index data for the column is in accordance with an inverted indexing scheme.

In various embodiments, a set difference between the filtered subset and the intermediate subset of rows is non-null. In various embodiments, the set difference includes at least one row having text data that includes every one of the first set of substrings in a different arrangement than an arrangement dictated by the first consecutive text pattern.

In various embodiments, the array operation includes a universal quantifier. In various embodiments, the set difference includes, based on the universal quantifier, at least one row having: first text data for a first one of the set of elements of its array field value comparing favorably to the consecutive text pattern; and second data for another one of the set of elements of its array field value comparing unfavorably to the consecutive text pattern.

In various embodiments, the set of substrings includes more than one substring and/or the set of subsets of rows includes more than one subset of rows. In various embodiments, the set of substrings includes exactly one substring and/or the set of subsets of rows includes exactly one subset of rows.

In various embodiments, the text data for at least one row in the filtered subset has a first length greater than a length of the consecutive text pattern and greater than a length of the consecutive text pattern. In various embodiments, the consecutive text pattern includes at least one wildcard character. In various embodiments, identifying the set of substrings is based on skipping the at least one wildcard character. In various embodiments, each of the set of substrings includes no wildcard characters.

In various embodiments, identifying the filtered subset includes applying at least one probabilistic index-based IO construct of an IO pipeline generated for a query indicating the consecutive text pattern in at least one query predicate.

In various embodiments, the method includes determining a same fixed-length for the first plurality of substrings and the second plurality of substrings. In various embodiments, the same fixed-length is based on a fixed length of a substring-based indexing scheme for the column. In various embodiments, the same fixed-length for the substring-based indexing scheme is a selected fixed-length parameter from a plurality of fixed-length options. In various embodiments, each of the first plurality of substrings and each of the second plurality of substrings include exactly three characters.

In various embodiments, identifying the first set of substrings included in the consecutive text pattern includes identifying every possible substring of the same-fixed length included in the consecutive text pattern. In various embodiments, each subset of the set of subsets is identified in parallel with other subsets of the set of subsets via a corresponding set of parallelized processing resources.

In various embodiments, the array operation corresponds to a universal quantifier or an existential quantifier. In various embodiments, the query predicate indicates a universal quantifier, where the filtered subset includes all of the plurality of rows having all element values of its array element field comparing favorably to the consecutive text pattern, and/or where the filtered subset includes only ones of the plurality of rows having all element values of its array element field comparing favorably to the consecutive text pattern. In various embodiments, the query predicate indicates an existential quantifier, where the filtered subset includes all of the plurality of rows having at least one element value of its array element field comparing favorably to the consecutive text pattern, and/or where the filtered subset includes only ones of the plurality of rows having at least one element value of its array element field comparing favorably to the consecutive text pattern.

In various embodiments, the query predicate indicates a negation of a universal quantifier, where the filtered subset includes all of the plurality of rows having at least one element value of its array element field comparing unfavorably to the consecutive text pattern, and/or where the filtered subset includes only ones of the plurality of rows having at least one element value of its array element field comparing unfavorably to the consecutive text pattern. various embodiments, the query predicate indicates a negation of an existential quantifier, where the filtered subset includes all of the plurality of rows having all element values of its array element field comparing unfavorably to the consecutive text pattern, and/or where the filtered subset includes only ones of the plurality of rows having all element values of its array element field comparing unfavorably to the consecutive text pattern.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps described above.

In various embodiments, a database system includes at least one processor and a memory storing executable instructions. The executable instructions, when executed via the at least one processor, can cause the database system to store a plurality of sets of text data as a plurality of sets of element values of a plurality of array field values of an array field of a plurality of rows, and store index data corresponding to the array field indicating, for each substring of a plurality of substrings, ones of the plurality of rows with text data of one of a set of element value of a corresponding array field value that include the each substring of the plurality of substrings. The executable instructions, when executed via the at least one processor, can cause the database system to determine a query having a query predicate that indicates an array operation applied to the applied to the array field of the plurality of rows, where the array operation indicates a consecutive text pattern. The executable instructions, when executed via the at least one processor, can cause the database system to execute the query by: identifying a set of substrings included in the consecutive text pattern; identifying a set of subsets of rows by utilizing the index data to identify, for each substring of the set of substrings, a corresponding subset of the set of subsets as a proper subset of the plurality of rows having text data of at least one element of an array field value of the array field that includes the each substring of the first set of substrings; identifying an intermediate subset of rows as an intersection to the set of subsets of rows; and/or identifying a filtered subset based on comparing the text data of only rows in the intermediate subset of rows to the consecutive text pattern to identify ones of the intermediate subset of rows with array field values satisfying the array operation.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by at least one processor of a database system, comprising:
    storing a plurality of column values for a first column of a plurality of rows;
    indexing each of a set of missing data-based conditions for the first column via an indexing scheme;
    determining a query including a query predicate indicating the first column;
    identifying a subset of the set of missing data-based conditions for the first column based on the query predicate;
    generating an IO pipeline for access of the first column based on the query predicate and further based on the subset of the set of missing data-based conditions; and
    applying the IO pipeline in conjunction with execution of the query by:
        applying at least one index element to identify a proper subset of the plurality of rows based on index data of the indexing scheme for the first column, wherein the proper subset of the plurality of rows includes ones of the plurality of rows having values for the first column included in the subset of the set of missing data-based conditions; and
        generating a query resultant for the query based on the proper subset of the plurality of rows.

2. The method of claim 1, wherein the indexing scheme is a probabilistic indexing scheme, and wherein the IO pipeline includes at least one index-based IO construct.

3. The method of claim 1, wherein the indexing scheme implements an inverted index.

4. The method of claim 1, wherein the set of missing data-based conditions includes a null value condition, and wherein a first subset of the plurality of column values satisfy the null value condition based on the first subset of the plurality of column values of the first column each being a null value.

5. The method of claim 4, wherein another subset of the plurality of column values do not satisfy any of the set of missing data-based conditions based on each having a non-null value, and wherein the proper subset of the plurality of rows includes ones of the other subset of the plurality of column values satisfying the query predicate.

6. The method of claim 4, wherein the plurality of column values of the first column correspond to an array data type, and wherein the set of missing data-based conditions further includes:
    an empty array condition, wherein a second subset of the plurality of column values satisfy the empty array condition based on the second subset of the plurality of column values of the first column each having an empty array value; and a null-inclusive array condition, wherein a third subset of the plurality of column values satisfy the null-inclusive array condition based on the third subset of the plurality of column values of the first column including a set of array elements, and further based on at least one of the set of array elements having the null value;

wherein the first subset, the second subset, and the third subset are mutually exclusive.

7. The method of claim 6, wherein a fourth subset of the plurality of column values do not satisfy any of the set of missing data-based conditions based on being an array including at least one array element and having no array elements having the null value, and wherein the proper subset of the plurality of rows includes ones of the fourth subset of the plurality of column values satisfying the query predicate.

8. The method of claim 1, wherein none of the proper subset of the plurality of rows have values for the first column included in the subset of the set of missing data-based conditions based on the subset of the set of missing data-based conditions for the first column being identified as null.

9. The method of claim 1, wherein applying the at least one index element includes applying an index element for values satisfying one the set of missing data-based conditions included in subset of the set of missing data-based conditions.

10. The method of claim 1, wherein applying the at least one index element includes applying an index element for values satisfying one the set of missing data-based conditions not included in subset of the set of missing data-based conditions to identify another proper subset of the plurality of rows, and wherein applying the IO pipeline further includes filtering the another proper subset of the plurality of rows to generate the proper subset of the plurality of rows.

11. The method of claim 1, further comprising indexing a set of values for the first column via the indexing scheme, wherein the set of values for the first column meet none of the set of missing data-based conditions, and wherein the plurality of column values include the set of values.

12. The method of claim 11, wherein applying the at least one index element includes:
applying a first index element for values satisfying one the set of missing data-based conditions, and
applying a second index element for values equal to one of the set of values.

13. The method of claim 1, wherein indexing each of the set of missing data-based conditions for the first column via the indexing scheme includes:
identifying ones of the plurality of rows having column values of the first column meeting one of the set of missing data-based conditions; and
indexing the each of the ones of the plurality of rows for the one of the set of missing data-based conditions via the indexing scheme.

14. A database system includes:
at least one processor; and
a memory that stores operational instructions that, when executed by the at least one processor, cause the database system to:
store a plurality of column values for a first column of a plurality of rows;
index each of a set of missing data-based conditions for the first column via an indexing scheme;
determine a query including a query predicate indicating the first column;
identify a subset of the set of missing data-based conditions for the first column based on the query predicate;
generate an IO pipeline for access of the first column based on the query predicate and further based on the subset of the set of missing data-based conditions; and
apply the IO pipeline in conjunction with execution of the query by:
applying at least one index element to identify a proper subset of the plurality of rows based on index data of the indexing scheme for the first column, wherein the proper subset of the plurality of rows includes ones of the plurality of rows having values for the first column included in the subset of the set of missing data-based conditions; and
generating a query resultant for the query based on the proper subset of the plurality of rows.

15. The database system of claim 14, wherein the set of missing data-based conditions includes a null value condition, and wherein a first subset of the plurality of column values satisfy the null value condition based on the first subset of the plurality of column values of the first column each being a null value.

16. The database system of claim 15, wherein the plurality of column values of the first column correspond to an array data type, and wherein the set of missing data-based conditions further includes:
an empty array condition, wherein a second subset of the plurality of column values satisfy the empty array condition based on the second subset of the plurality of column values of the first column each having an empty array value; and
a null-inclusive array condition, wherein a third subset of the plurality of column values satisfy the null-inclusive array condition based on the third subset of the plurality of column values of the first column including a set of array elements, and further based on at least one of the set of array elements having the null value;
wherein the first subset, the second subset, and the third subset are mutually exclusive.

17. The database system of claim 14, wherein none of the proper subset of the plurality of rows have values for the first column included in the subset of the set of missing data-based conditions based on the subset of the set of missing data-based conditions for the first column being identified as null.

18. The database system of claim 14, wherein applying the at least one index element includes applying an index element for values satisfying one the set of missing data-based conditions included in subset of the set of missing data-based conditions.

19. The database system of claim 14, wherein applying the at least one index element includes applying an index element for values satisfying one the set of missing data-based conditions not included in subset of the set of missing data-based conditions to identify another proper subset of the plurality of rows, and wherein applying the IO pipeline further includes filtering the another proper subset of the plurality of rows to generate the proper subset of the plurality of rows.

20. A non-transitory computer readable storage medium comprises:
 at least one memory section that stores operational instructions that, when executed by a processing module that includes a processor and a memory, causes the processing module to:
  store a plurality of column values for a first column of a plurality of rows;
  index each of a set of missing data-based conditions for the first column via an indexing scheme;
  determine a query including a query predicate indicating the first column;
  identify a subset of the set of missing data-based conditions for the first column based on the query predicate;
  generate an IO pipeline for access of the first column based on the query predicate and further based on the subset of the set of missing data-based conditions; and
  apply the IO pipeline in conjunction with execution of the query by:
   applying at least one index element to identify a proper subset of the plurality of rows based on index data of the indexing scheme for the first column, wherein the proper subset of the plurality of rows includes ones of the plurality of rows having values for the first column included in the subset of the set of missing data-based conditions; and
   generating a query resultant for the query based on the proper subset of the plurality of rows.

* * * * *